US011797150B2

(12) United States Patent
Walkin et al.

(10) Patent No.: US 11,797,150 B2
(45) Date of Patent: Oct. 24, 2023

(54) DEVICES, METHODS, AND GRAPHICAL USER INTERFACES FOR NAVIGATING BETWEEN USER INTERFACES, DISPLAYING A DOCK, AND DISPLAYING SYSTEM USER INTERFACE ELEMENTS

(71) Applicant: Apple Inc., Cupertino, CA (US)

(72) Inventors: Brandon M. Walkin, San Francisco, CA (US); Wan Si Wan, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 206 days.

(21) Appl. No.: 17/603,879

(22) PCT Filed: May 2, 2019

(86) PCT No.: PCT/US2019/030385

§ 371 (c)(1),
(2) Date: Oct. 14, 2021

(87) PCT Pub. No.: WO2019/217196

PCT Pub. Date: Nov. 14, 2019

(65) Prior Publication Data

US 2022/0350463 A1 Nov. 3, 2022

Related U.S. Application Data

(63) Continuation-in-part of application No. 16/145,081, filed on Sep. 27, 2018, now Pat. No. 11,188,220.
(Continued)

(30) Foreign Application Priority Data

| | | |
|---|---|---|
| Jun. 11, 2018 | (DK) | 201870336 |
| Sep. 29, 2018 | (CN) | 201811166251.1 |

(51) Int. Cl.
*G06F 3/048* (2013.01)
*G06F 3/04817* (2022.01)
(Continued)

(52) U.S. Cl.
CPC ...... *G06F 3/04817* (2013.01); *G06F 3/04842* (2013.01); *G06F 3/04845* (2013.01)

(58) Field of Classification Search
CPC ............ G06F 3/04817; G06F 3/04842; G06F 3/04845
See application file for complete search history.

(56) References Cited

U.S. PATENT DOCUMENTS 10,254,927 B2 * 4/2019 Missig ................ G06F 3/04883
10,409,476 B2 9/2019 Choi et al.
(Continued)

FOREIGN PATENT DOCUMENTS

EP 3 229 120 A1 10/2017
JP 2011-221822 A 11/2011
(Continued)

OTHER PUBLICATIONS

Kjeldsen et al., Toward the Use of Gesture in Traditional User Interfaces, 1996 IEEE, 6 pages.*
(Continued)

*Primary Examiner* — Linh K Pham
(74) *Attorney, Agent, or Firm* — Morgan, Lewis & Bockius LLP

(57) ABSTRACT

An electronic device displays a system user interface element that indicates a location for performing a gesture that triggers a system operation, a first application having a first set of behaviors associated with the element, and a second application having a different, second set of behaviors associated with the element. The first and second applications are both displayed along an edge of the display; the
(Continued)

element overlaps the first application without overlapping the second application; and an appearance of the element is determined based on the first set of behaviors. The device detects an input corresponding to a request to resize the second application; and, in response, resizes the second application in accordance with the input and, if the element overlaps the second application without overlapping the first application, changes the appearance of the element to an appearance based on the second set of behaviors associated with the element.

39 Claims, 272 Drawing Sheets

Related U.S. Application Data

(60) Provisional application No. 62/752,336, filed on Oct. 29, 2018, provisional application No. 62/679,959, filed on Jun. 3, 2018, provisional application No. 62/668,177, filed on May 7, 2018.

(51) Int. Cl.
*G06F 3/04845* (2022.01)
*G06F 3/04842* (2022.01)

(56) References Cited

U.S. PATENT DOCUMENTS

| | | | | |
|---|---|---|---|---|
| 2006/0125803 | A1* | 6/2006 | Westerman | G06F 3/04883 345/173 |
| 2007/0262964 | A1* | 11/2007 | Zotov | G06F 3/041 345/173 |
| 2008/0094370 | A1* | 4/2008 | Ording | G06F 3/0482 345/173 |
| 2008/0309632 | A1 | 12/2008 | Westerman et al. | |
| 2009/0184933 | A1* | 7/2009 | Wei-Wen | G06F 3/04886 345/173 |
| 2010/0020025 | A1 | 1/2010 | Lemort et al. | |
| 2011/0074710 | A1* | 3/2011 | Weeldreyer | G06F 3/0481 345/173 |
| 2011/0078624 | A1 | 3/2011 | Missig et al. | |
| 2011/0179386 | A1 | 7/2011 | Shaffer et al. | |
| 2011/0234503 | A1* | 9/2011 | Fitzmaurice | G06F 3/0425 345/173 |
| 2011/0298732 | A1* | 12/2011 | Yoshimoto | G06F 3/0421 345/173 |
| 2012/0159380 | A1 | 6/2012 | Kocienda et al. | |
| 2012/0327009 | A1* | 12/2012 | Fleizach | G06F 3/04883 345/173 |
| 2013/0058019 | A1* | 3/2013 | Lee | G06F 3/04883 361/679.01 |
| 2013/0076659 | A1* | 3/2013 | Miyaji | G06F 3/0482 345/173 |
| 2013/0082928 | A1* | 4/2013 | Kim | G06F 3/0425 345/168 |
| 2013/0169549 | A1* | 7/2013 | Seymour | G06F 3/041 345/173 |
| 2013/0321340 | A1 | 12/2013 | Seo et al. | |
| 2014/0047380 | A1 | 2/2014 | Mak | |
| 2014/0208333 | A1 | 7/2014 | Beals et al. | |
| 2014/0282110 | A1* | 9/2014 | Chaudhri | G06F 3/04886 715/767 |
| 2014/0361982 | A1* | 12/2014 | Shaffer | G06F 3/017 345/156 |
| 2014/0365945 | A1* | 12/2014 | Karunamuni | G06F 3/04883 715/773 |
| 2015/0100914 | A1* | 4/2015 | Guan | G06F 3/0481 715/781 |
| 2015/0106731 | A1* | 4/2015 | Matas | H04L 51/52 715/744 |
| 2015/0169071 | A1* | 6/2015 | Jitkoff | G06F 3/017 715/863 |
| 2015/0365306 | A1 | 12/2015 | Chaudhri et al. | |
| 2016/0004432 | A1 | 1/2016 | Bernstein et al. | |
| 2016/0085438 | A1* | 3/2016 | Doan | G06F 3/04883 715/863 |
| 2016/0224213 | A1 | 8/2016 | Chen et al. | |
| 2016/0259499 | A1 | 9/2016 | Kocienda et al. | |
| 2016/0259528 | A1* | 9/2016 | Foss | G06F 3/0483 |
| 2016/0357305 | A1 | 12/2016 | Wells et al. | |
| 2017/0046039 | A1 | 2/2017 | Karunamuni et al. | |
| 2017/0075520 | A1 | 3/2017 | Bauer et al. | |
| 2017/0123590 | A1* | 5/2017 | Han | G06F 3/04166 |
| 2017/0357317 | A1 | 12/2017 | Chaudhri et al. | |
| 2017/0357418 | A1 | 12/2017 | Dunn et al. | |
| 2017/0357520 | A1 | 12/2017 | De Vries et al. | |
| 2019/0012008 | A1 | 1/2019 | Yoon et al. | |
| 2019/0042066 | A1 | 2/2019 | Kim et al. | |
| 2019/0179500 | A1 | 6/2019 | Kim et al. | |
| 2019/0339855 | A1 | 11/2019 | Walkin et al. | |
| 2020/0057555 | A1 | 2/2020 | Walkin et al. | |
| 2021/0165564 | A9 | 6/2021 | Walkin et al. | |
| 2022/0350463 | A1* | 11/2022 | Walkin | G06F 3/04883 |

FOREIGN PATENT DOCUMENTS

| | | |
|---|---|---|
| JP | 2013-529339 A | 7/2013 |
| JP | 2014-119914 | 6/2014 |
| JP | 2014-132427 | 7/2014 |
| JP | 2014-519111 A | 8/2014 |
| WO | WO 2013/169846 A1 | 11/2013 |

OTHER PUBLICATIONS

Gadea et al., Finger-Based Gesture Control of a Collaborative Online Workspace, 2012, IEEE, 6 pages.*
Office Action, dated Mar. 12, 2020, received in U.S. Appl. No. 16/145,081, 23 pages.
Notice of Allowance, dated Aug. 12, 2020, received in U.S. Appl. No. 16/145,081, 5 pages.
Notice of Allowance, dated Aug. 11, 2021, received in U.S. Appl. No. 16/145,081, 5 pages.
Innovation Patent, dated May 22, 2019, received in Australian Patent Application No. 2019100488, which corresponds with U.S. Appl. No. 16/145,081, 5 pages.
Certificate of Examination, dated Aug. 9, 2019, received in Australian Patent Application No. 2019100488, which corresponds with U.S. Appl. No. 16/145,081, 1 page.
Office Action, dated May 12, 2021, received in Australian Patent Application No. 2019266126, which corresponds with U.S. Appl. No. 16/145,081, 2 pages.
Notice of Allowance, dated Sep. 17, 2021, received in Australian Patent Application No. 2019266126, which corresponds with U.S. Appl. No. 16/145,081, 3 pages.
Patent, dated Jan. 20, 2022, received in Australian Patent Application No. 2019266126, which corresponds with U.S. Appl. No. 16/145,081, 3 pages.
Office Action, dated Sep. 11, 2018, received in Danish Patent Application No. 201870336, which corresponds with U.S. Appl. No. 16/145,081, 11 pages.
Office Action, dated Jan. 3, 2019, received in Danish Patent Application No. 201870336, which corresponds with U.S. Appl. No. 16/145,081, 3 pages.
Office Action, dated Apr. 1, 2019, received in Danish Patent Application No. 201870336, which corresponds with U.S. Appl. No. 16/145,081, 3 pages.
Intention to Grant, dated Aug. 15, 2019, received in Danish Patent Application No. 201870336, which corresponds with U.S. Appl. No. 16/145,081, 2 pages.
Intention to Grant, dated Oct. 17, 2019, received in Danish Patent Application No. 201870336, which corresponds with U.S. Appl. No. 16/145,081, 2 pages.
Notice of Allowance, dated Jan. 28, 2020, received in Danish Patent Application No. 201870336, which corresponds with U.S. Appl. No. 16/145,081, 2 pages.

(56) References Cited

OTHER PUBLICATIONS

Patent, dated May 13, 2020, received in Danish Patent Application No. 201870336, which corresponds with U.S. Appl. No. 16/145,081, 5 pages.
Office Action, dated May 25, 2022, received in European Patent Application No. 19724034.4, which corresponds with U.S. Appl. No. 16/145,081, 6 pages.
Notice of Allowance, dated Jan. 6, 2022, received in Japanese Patent Application No. 2020-554462, which corresponds with U.S. Appl. No. 16/145,081, 2 pages.
Patent, dated Feb. 9, 2022, received in Japanese Patent Application No. 2020-554462, which corresponds with U.S. Appl. No. 16/145,081, 3 pages.
Office Action, dated Jul. 20, 2022, received in Korean Patent Application No. 2020-7035129, which corresponds with U.S. Appl. No. 16/145,081, 3 pages.
Office Action, dated Aug. 26, 2020, received in U.S. Appl. No. 16/661,964, 6 pages.
Notice of Allowance, dated Apr. 6, 2021, received in U.S. Appl. No. 16/661,964, 10 pages.
Innovation Patent, dated Oct. 2, 2019, received in Australian Patent Application No. 2019101068, which corresponds with U.S. Appl. No. 16/661,964, 4 pages.
Certificate of Examination, dated Dec. 10, 2019, received in Australian Patent Application No. 2019101068, which corresponds with U.S. Appl. No. 16/661,964, 4 pages.
Invitation to Pay Additional Fees, dated Oct. 24, 2019, received in International Patent Application No. PCT/US2019/030385, which corresponds with U.S. Appl. No. 16/145,081, 25 pages.
International Search Report and Written Opinion, dated Dec. 16, 2019, received in International Patent Application No. PCT/US2019/030385, which corresponds with U.S. Appl. No. 16/145,081, 27 pages.
Patent, date Feb. 20, 2023, received in Korean Patent Application No. 2020-7035129, which corresponds with U.S. Appl. No. 16/145,081, 4 pages.
Office Action, dated Feb. 17, 2023, received in Japanese Patent Application No. 2022-017212, which corresponds with U.S. Appl. No. 16/661,964, 2 pages.
Office Action, dated Aug. 26, 2022, received in European Patent Application No. 19724034.4, which corresponds with U.S. Appl. No. 16/145,081, 10 pages.
Office Action, dated Jan. 11, 2023, reeceived in Indian Patent Application No. 202017052584, which corresponds with U.S. Appl. No. 16/145,081, 7 pages.
Notice of Allowance, dated Jan. 6, 2023, received in Korean Patent Application No. 2020-7035129, which corresponds with U.S. Appl. No. 16/145,081, 2 pages.
Office Action, dated Nov. 24, 2022, received in Australian Patent Application No. 2019101068, which corresponds with U.S. Appl. No. 16/661,964, 2 pages.
Notice of Allowance, dated Jan. 24, 2023, received in Australian Patent Application No. 2021282433, which corresponds with U.S. Appl. No. 16/661,964, 3 pages.

* cited by examiner

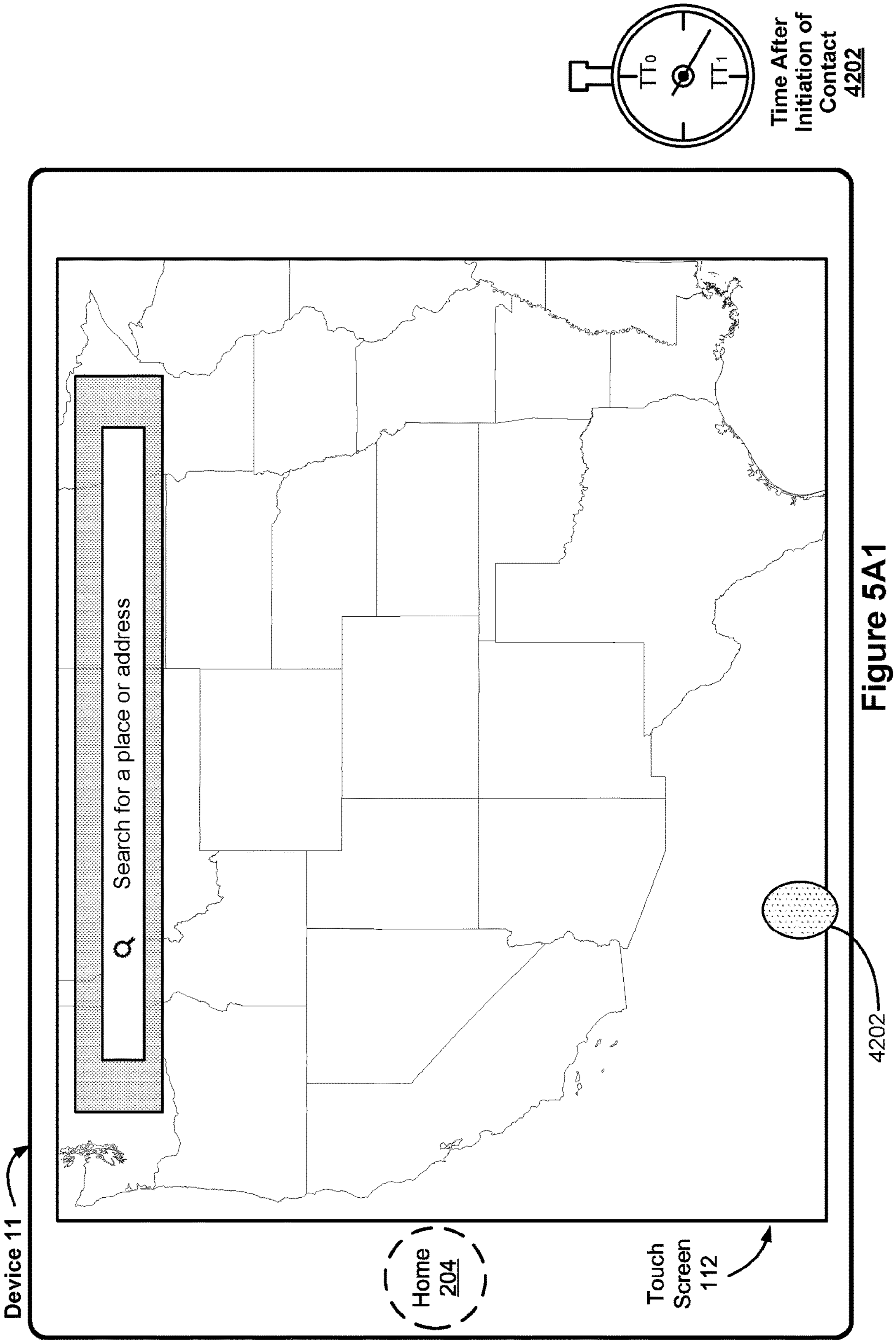
Figure 5A1

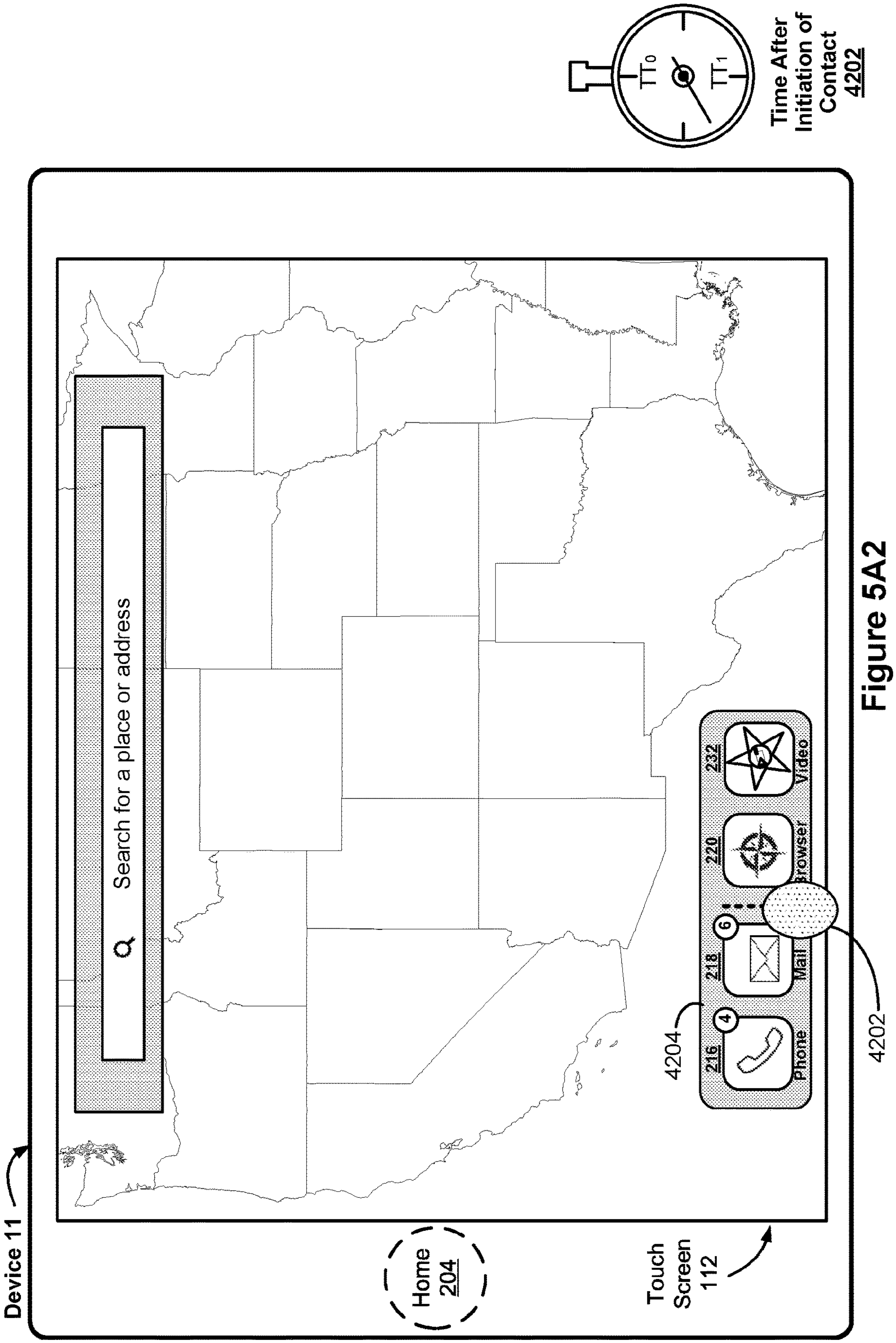
Figure 5A2

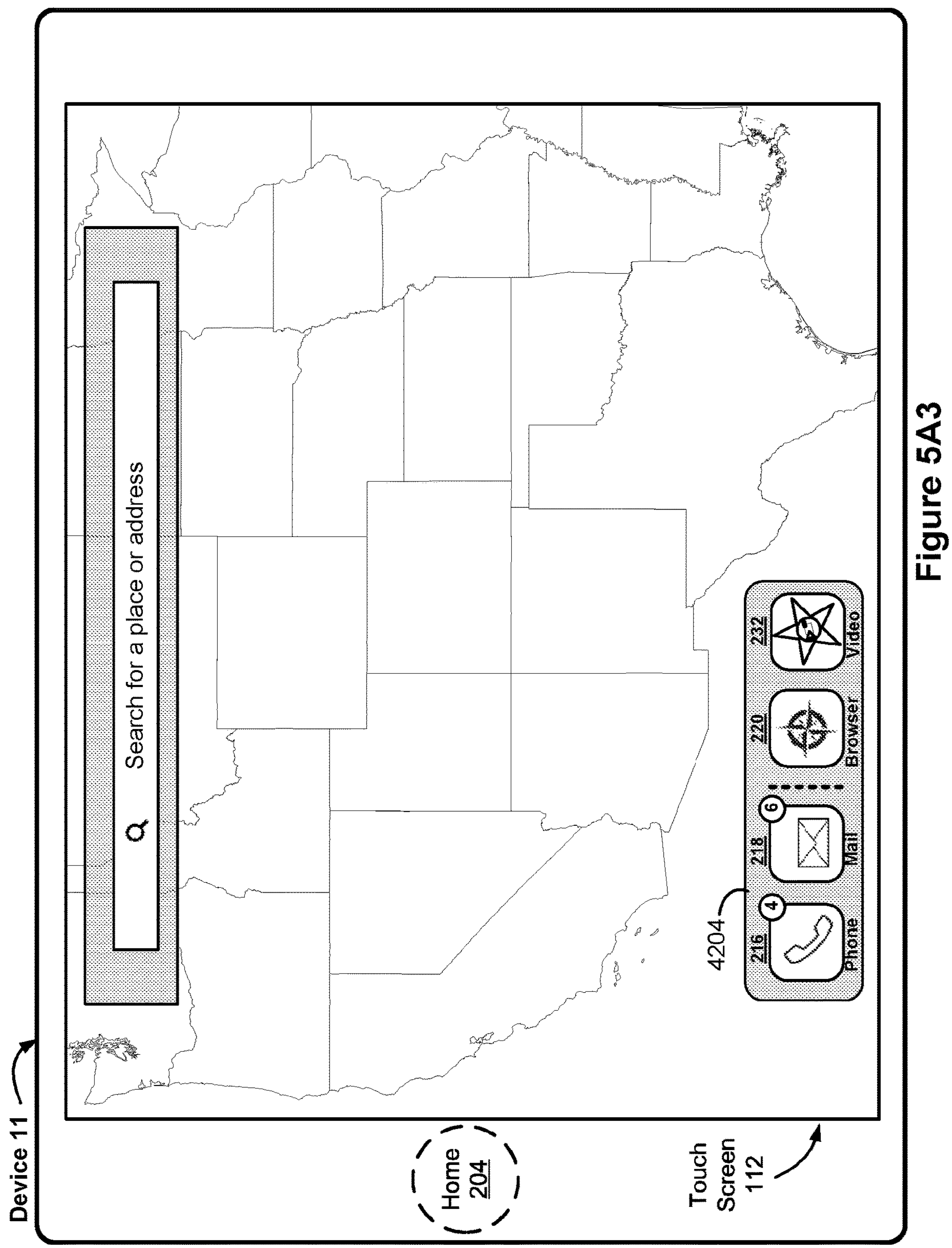
Figure 5A3

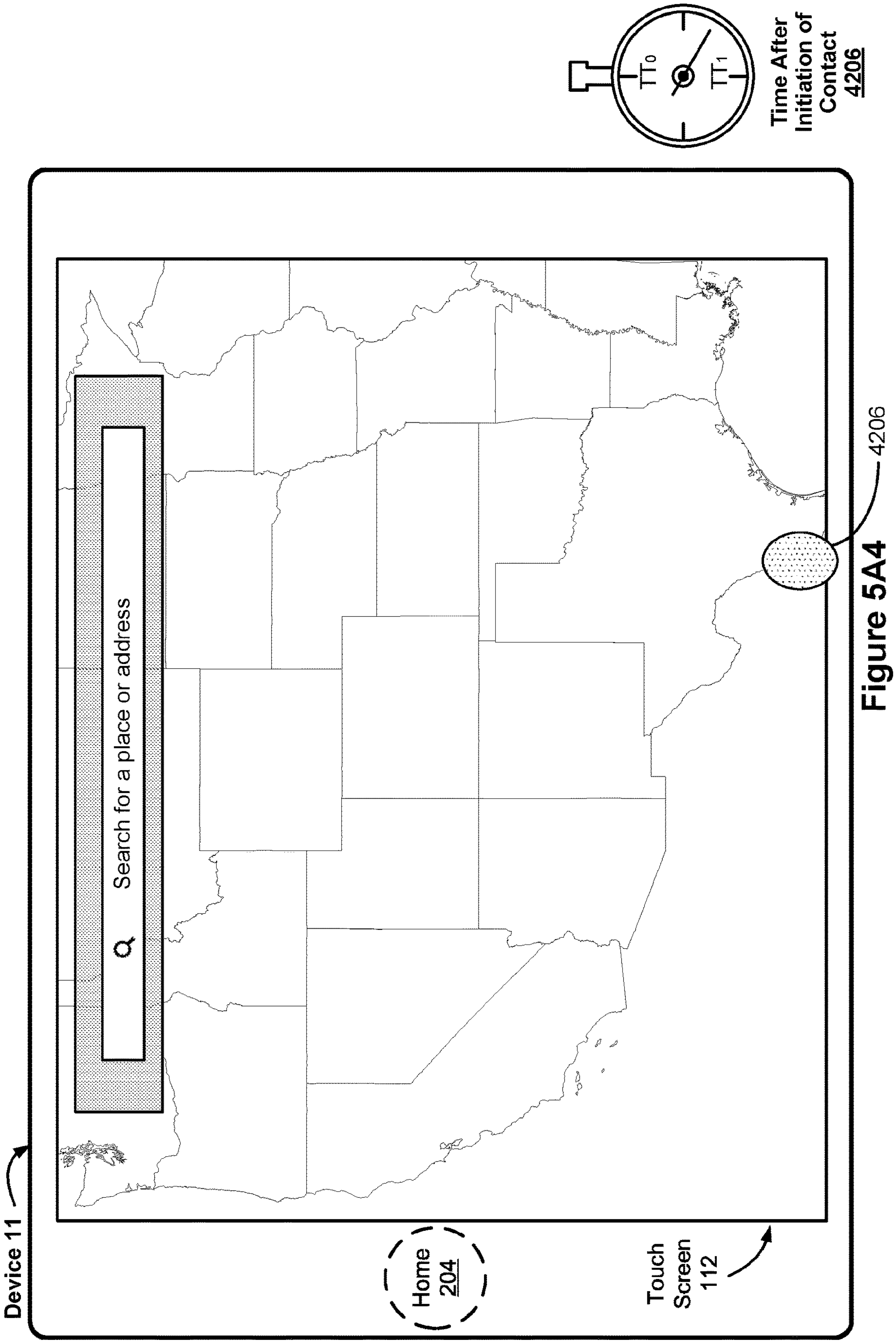
Figure 5A4

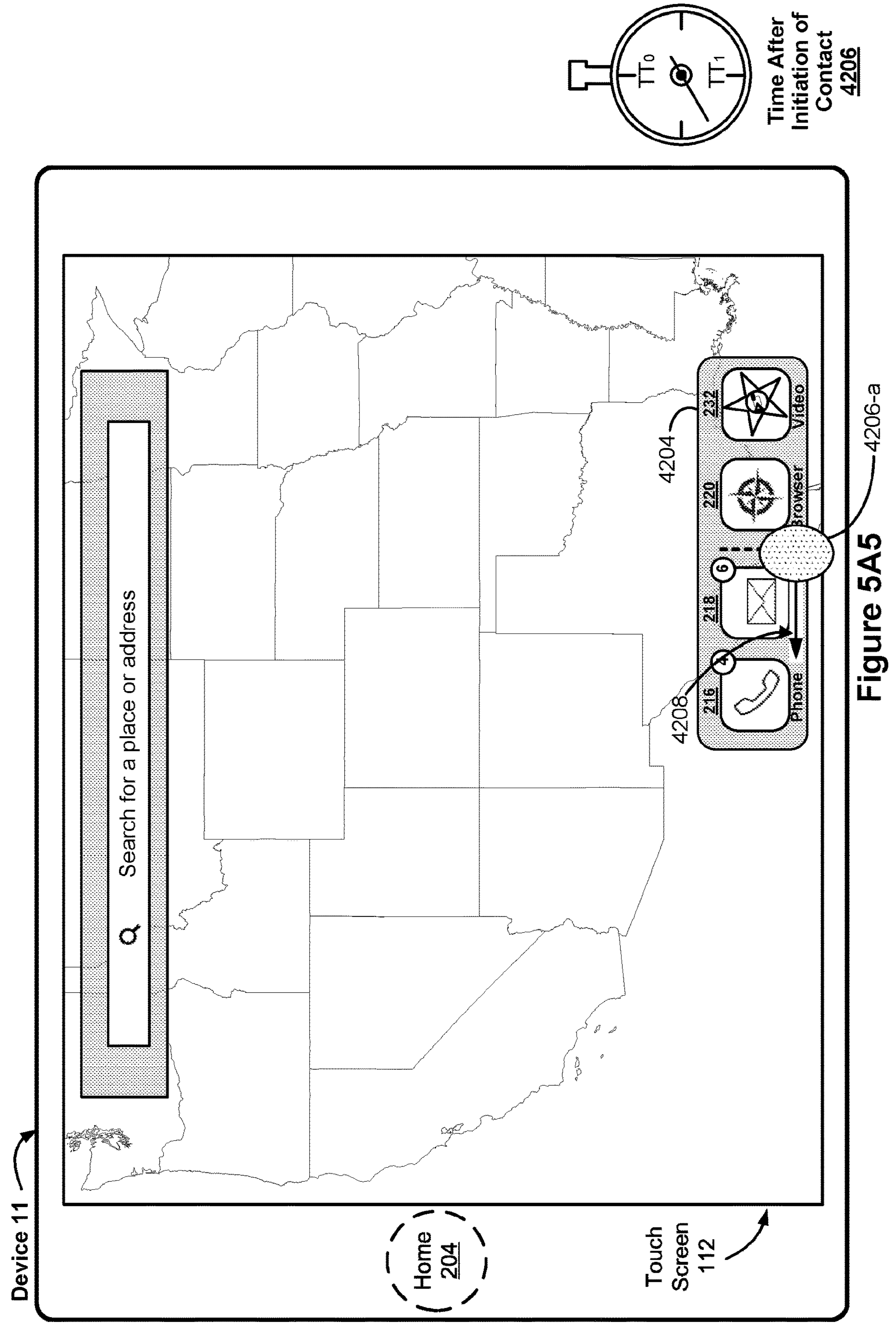
Figure 5A5

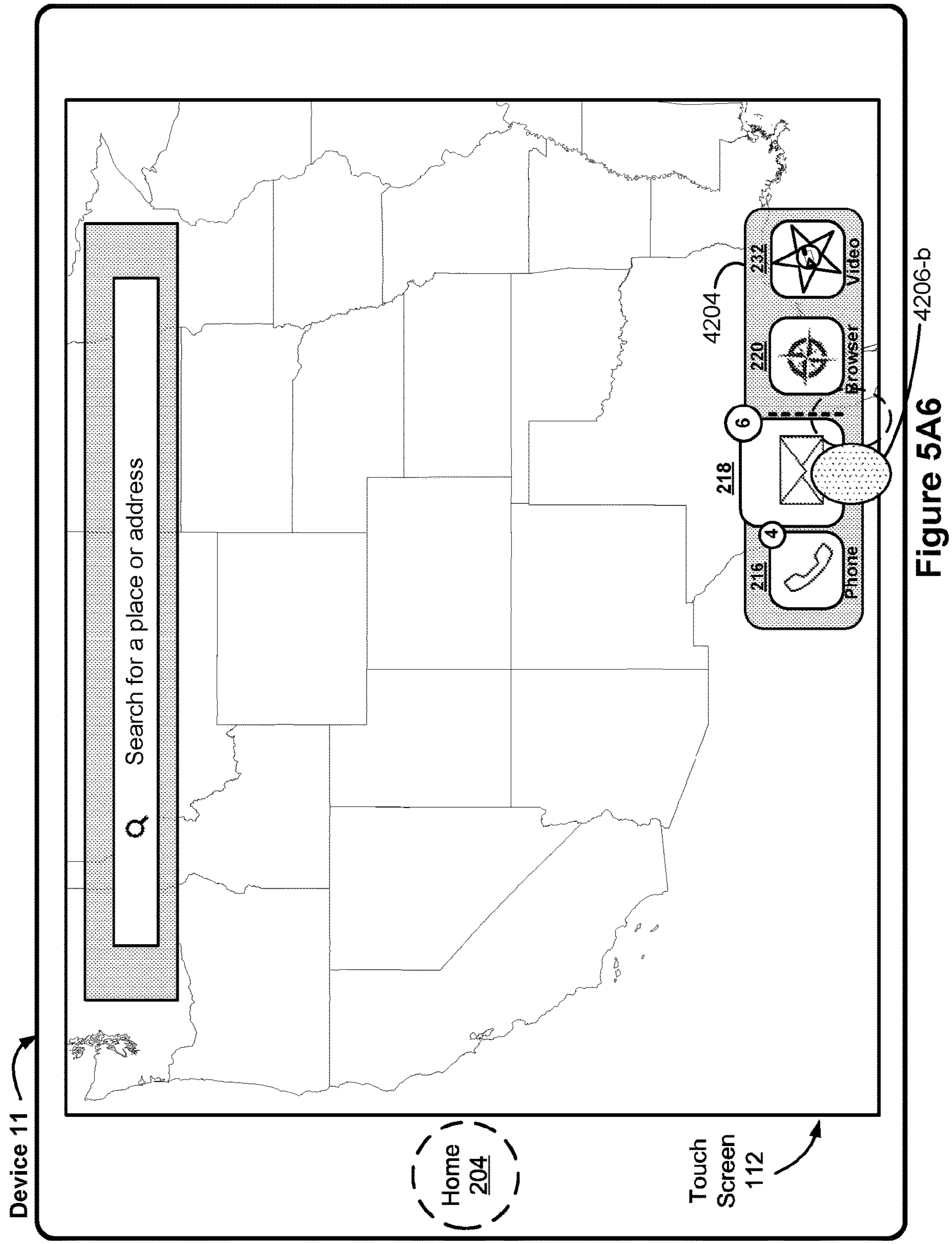
Figure 5A6

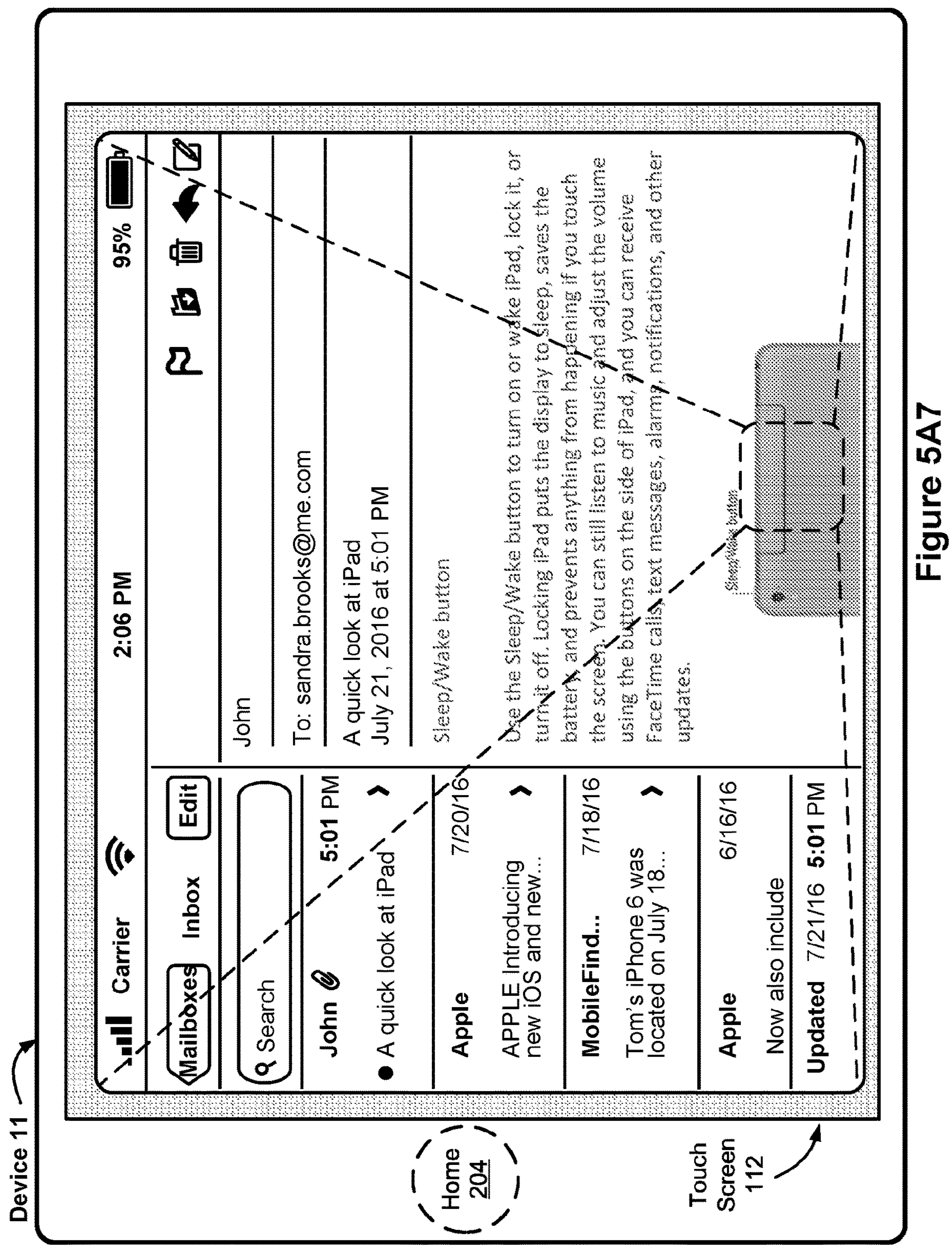
Figure 5A7

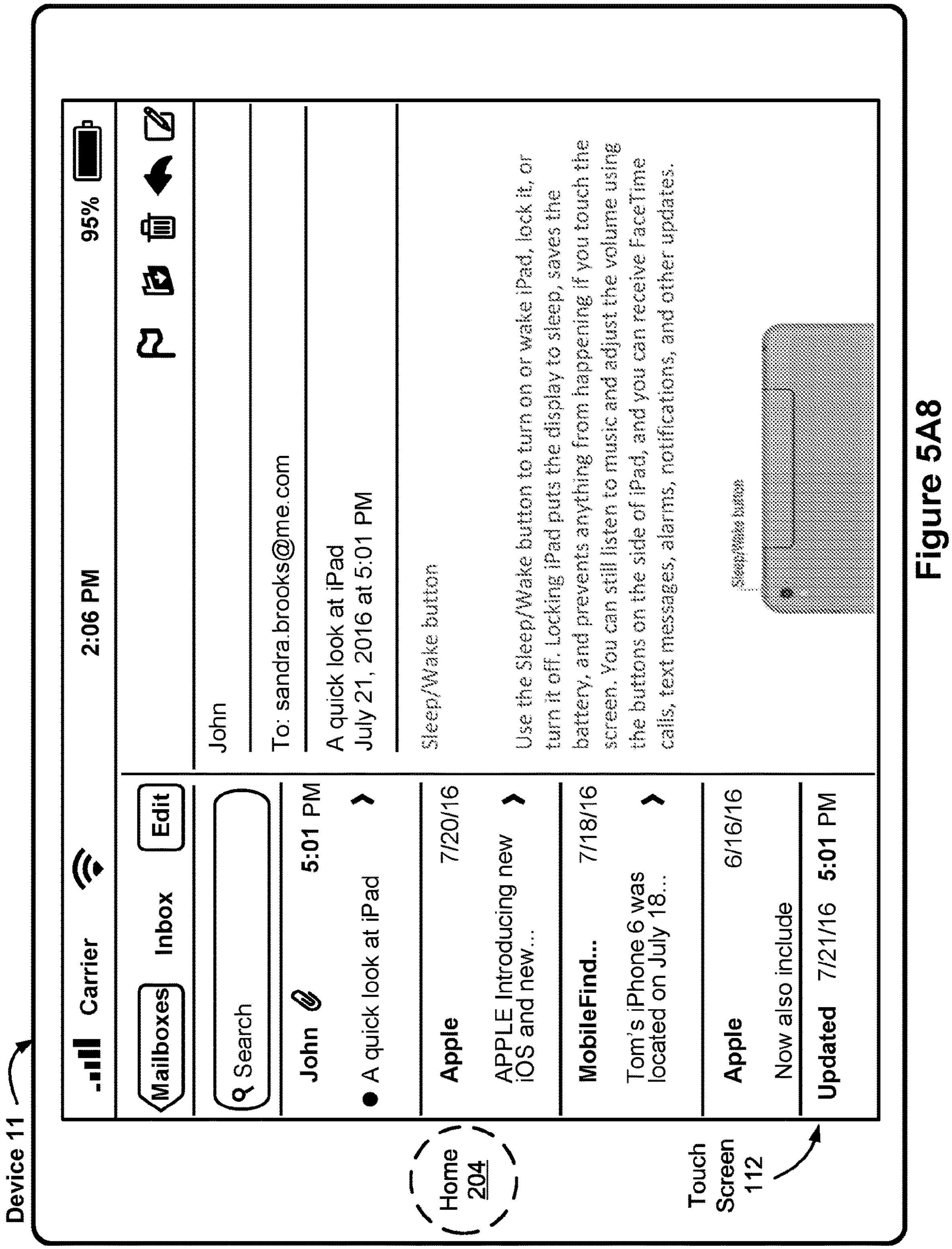
Figure 5A8

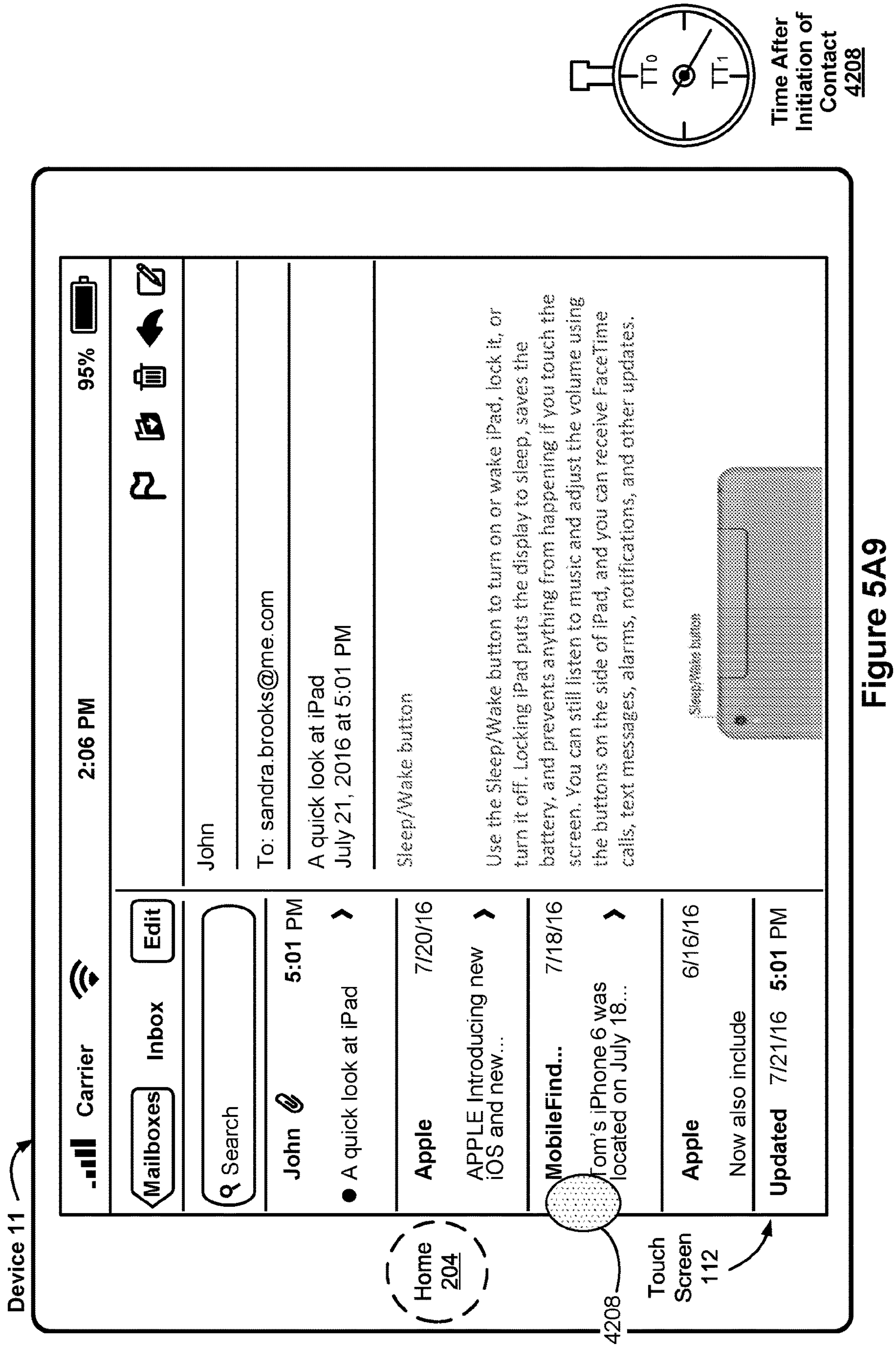
Figure 5A9

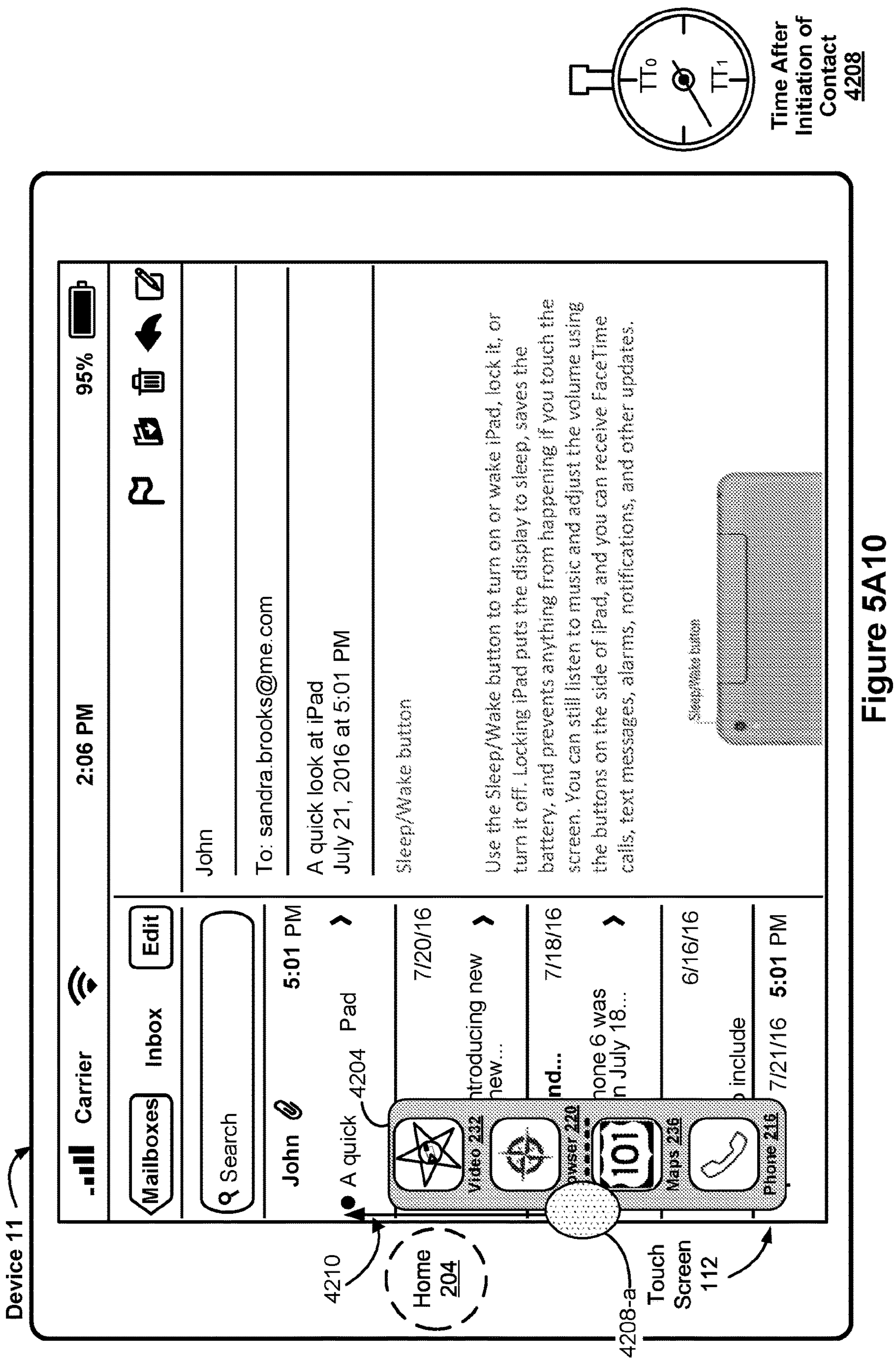
Figure 5A10

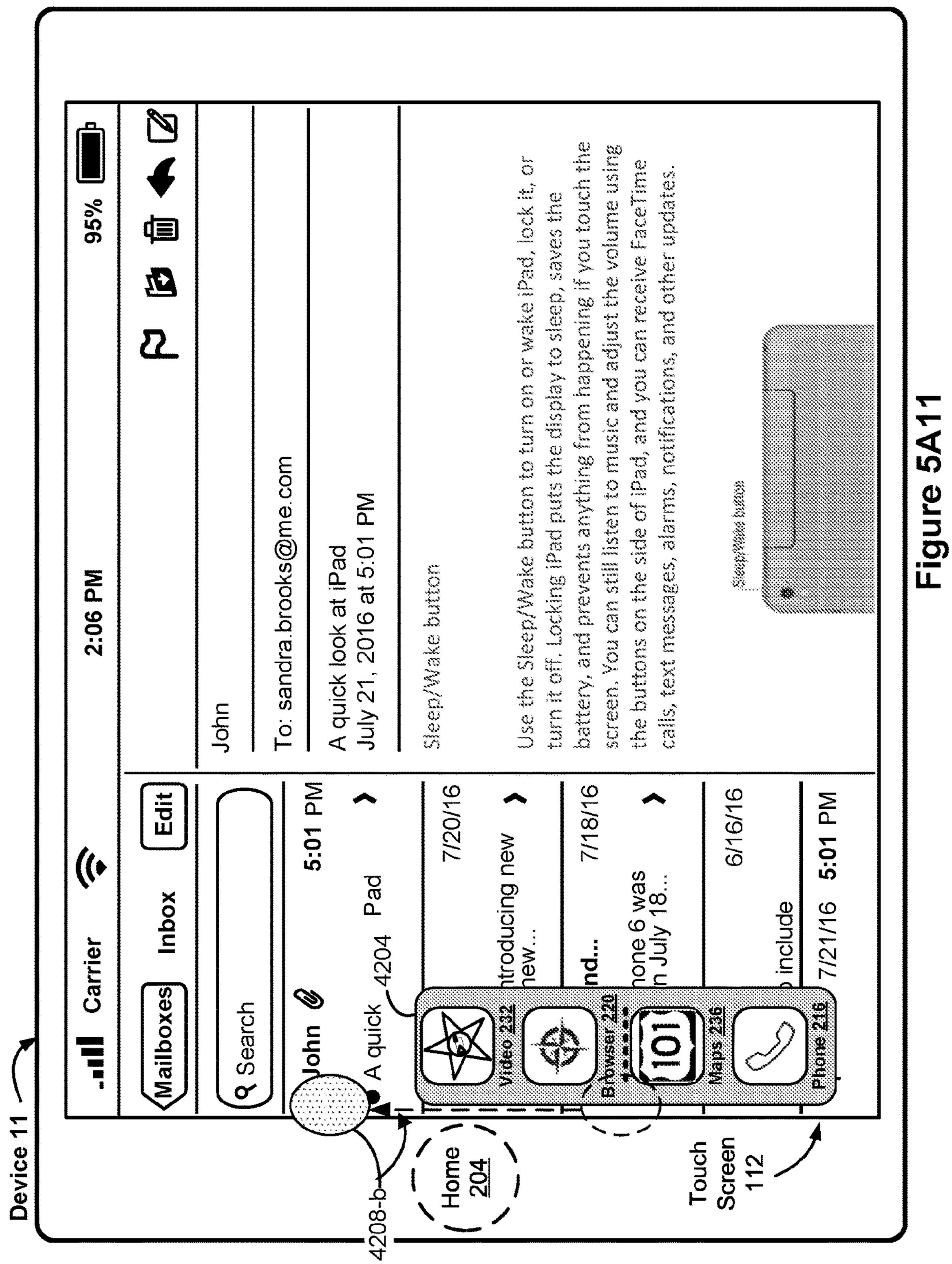
Figure 5A11

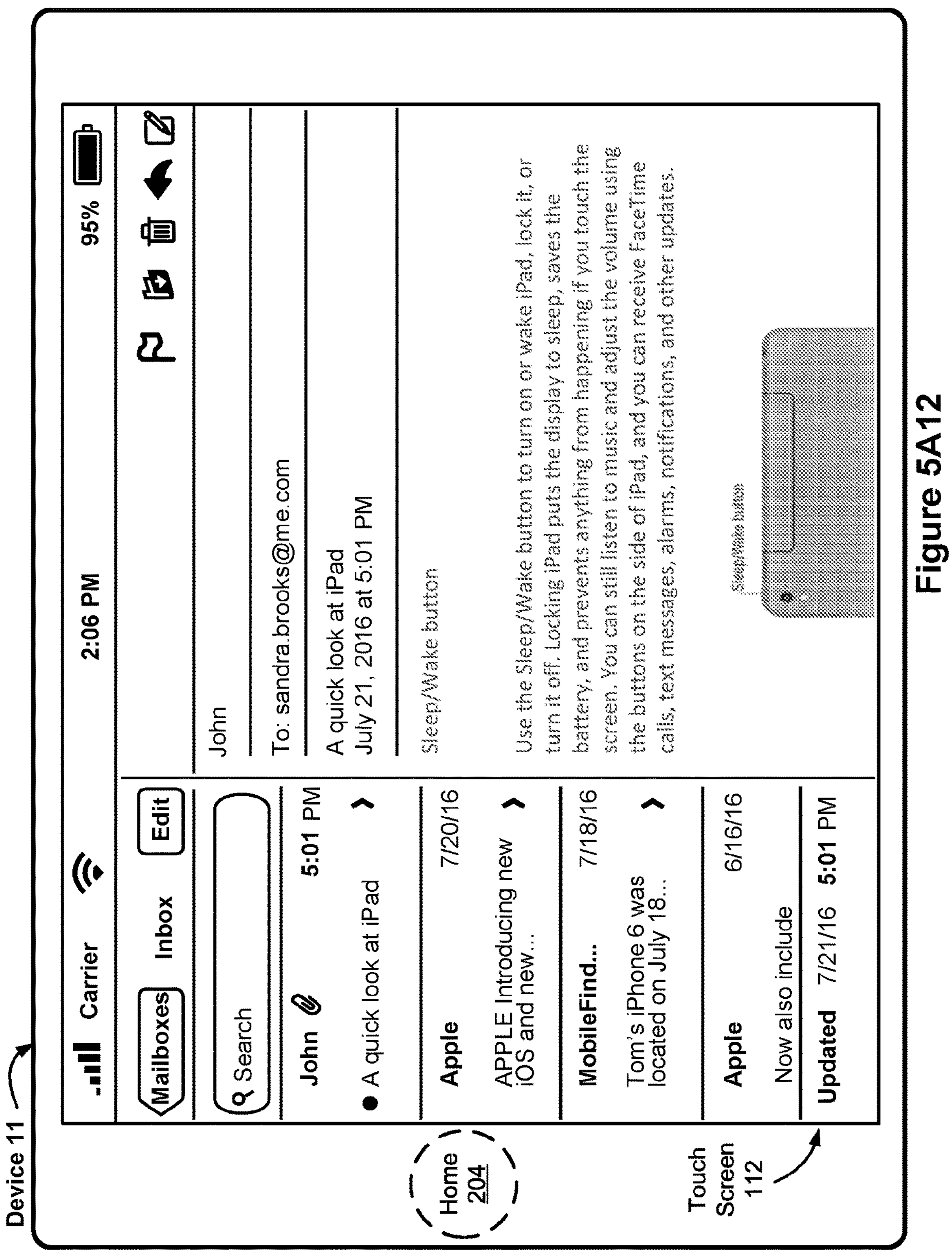
Figure 5A12

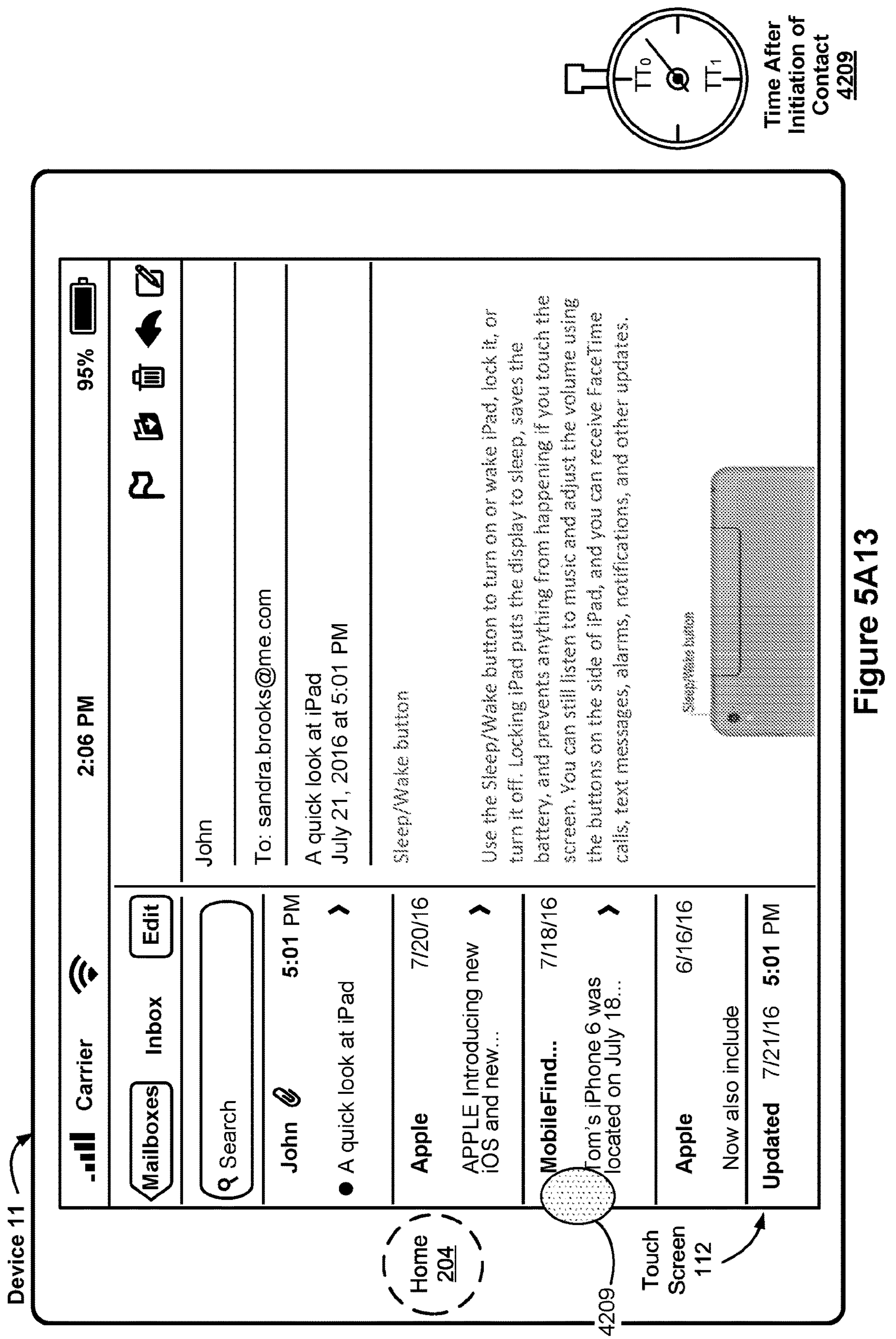
Figure 5A13

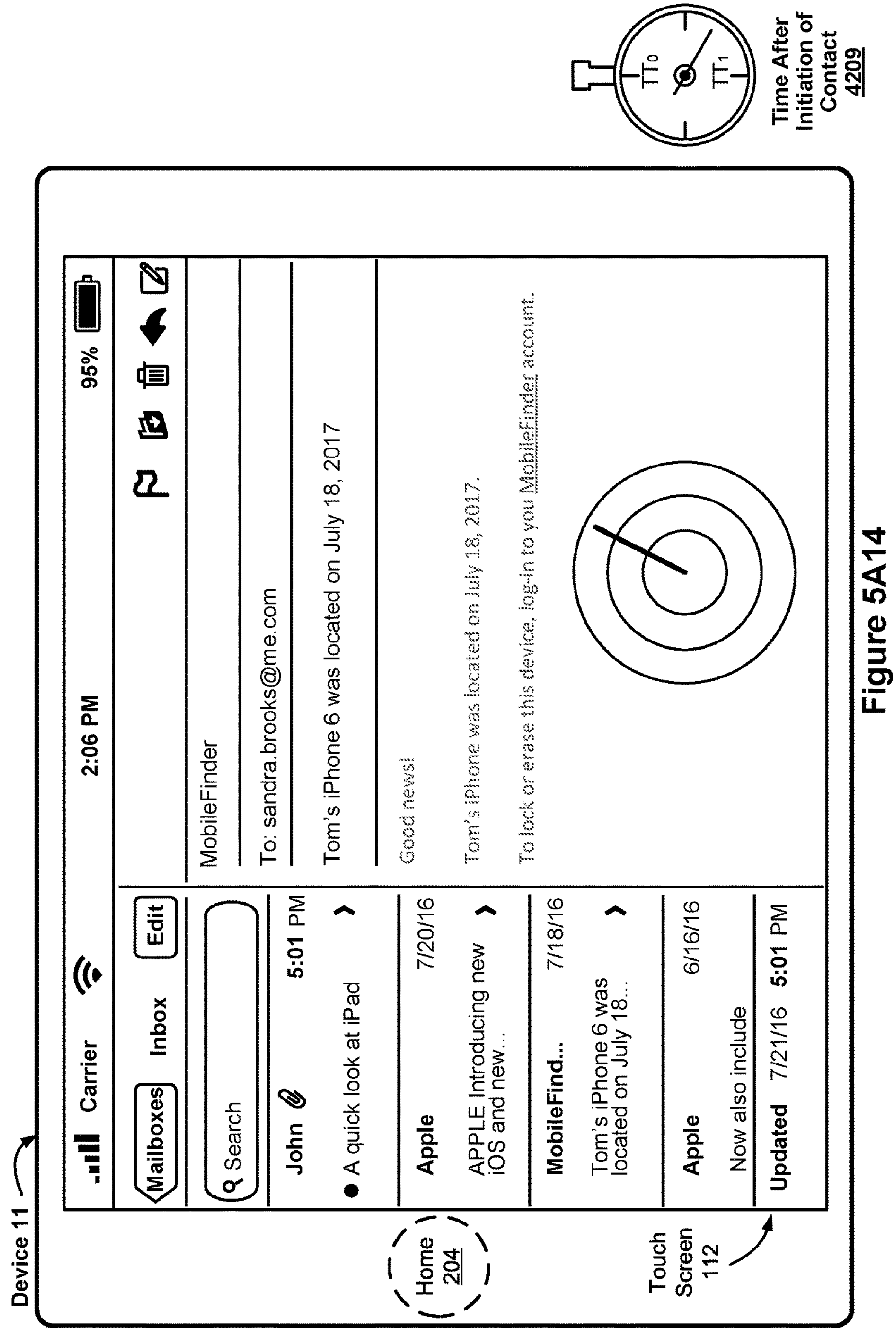
Figure 5A14

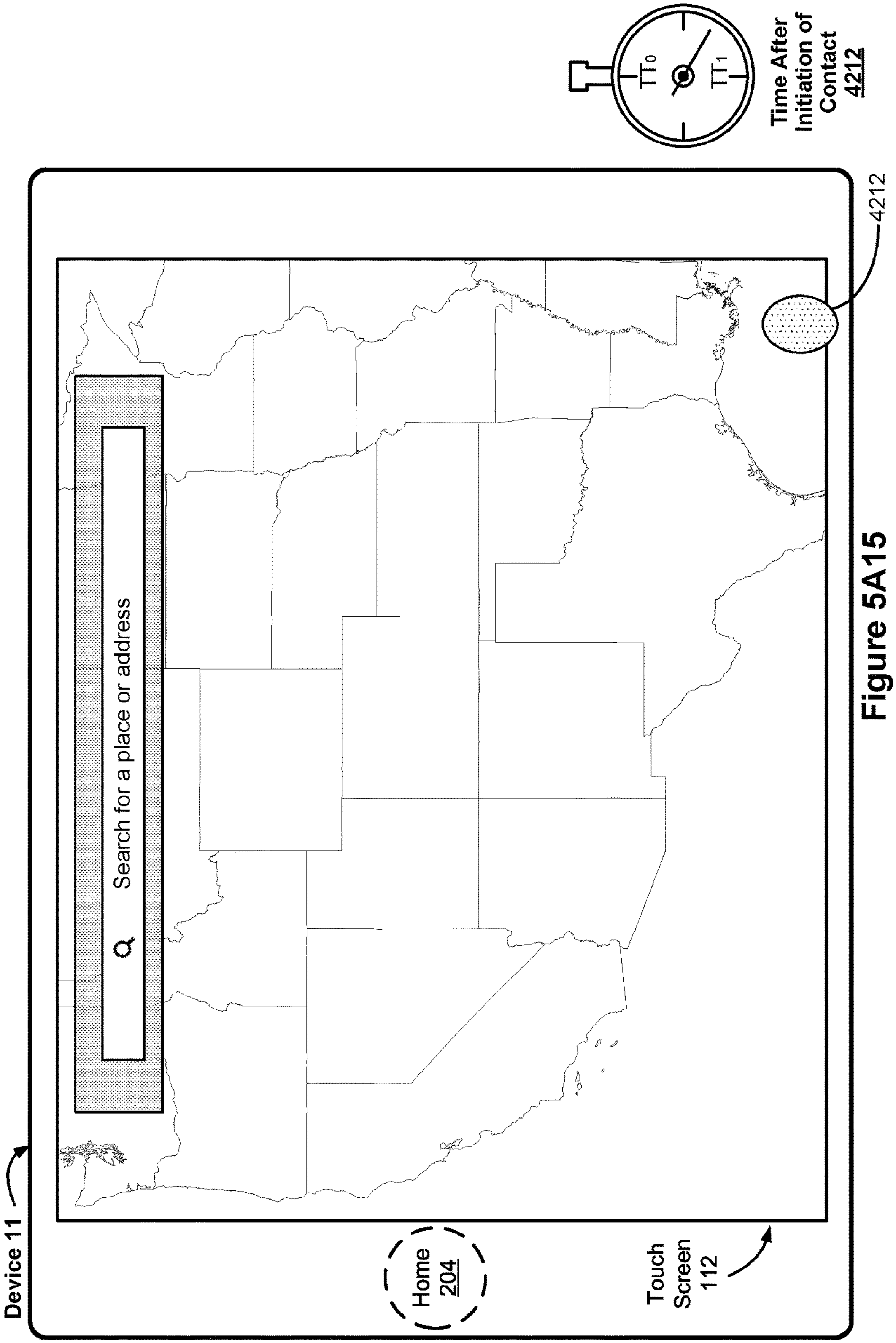
Figure 5A15

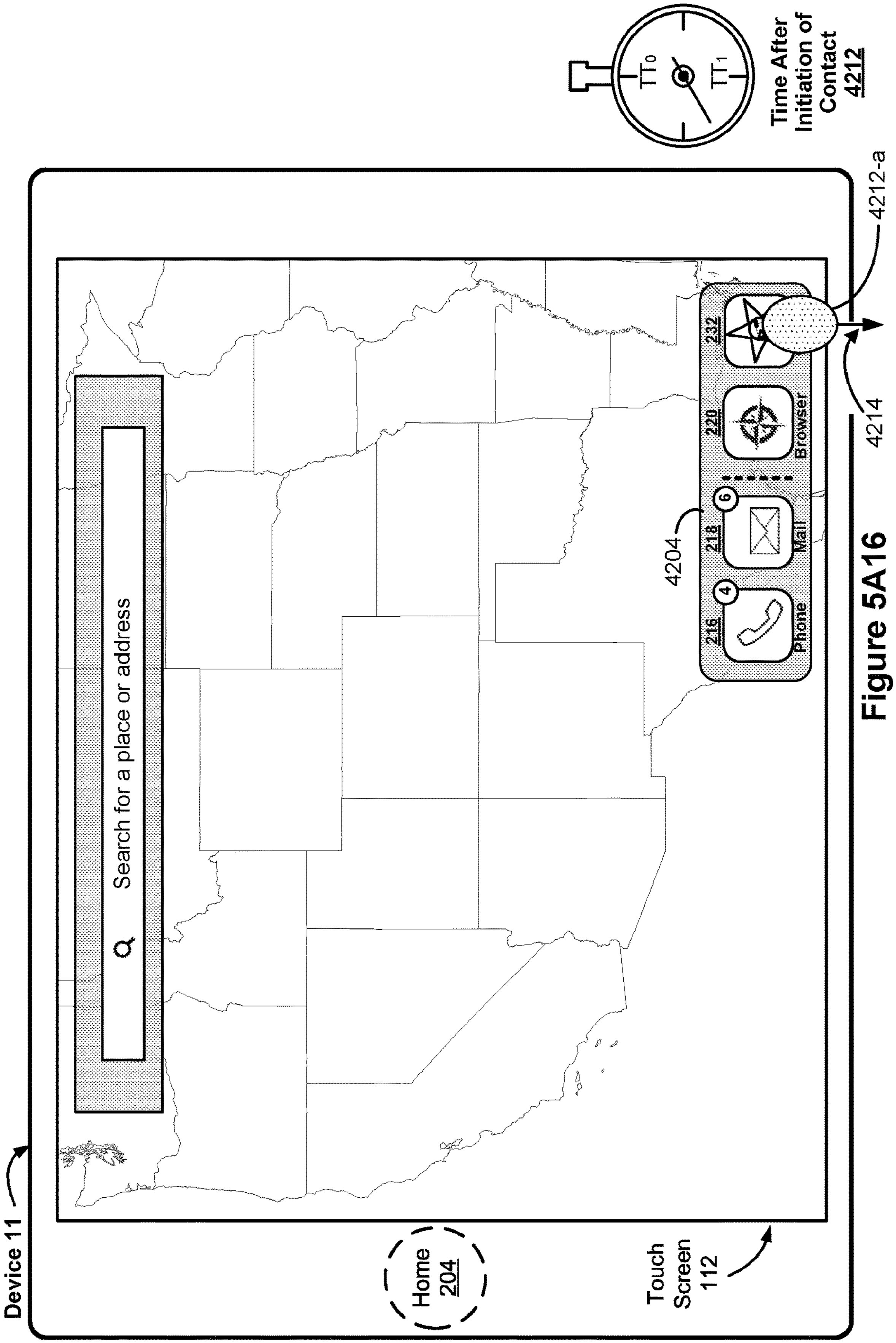
Figure 5A16

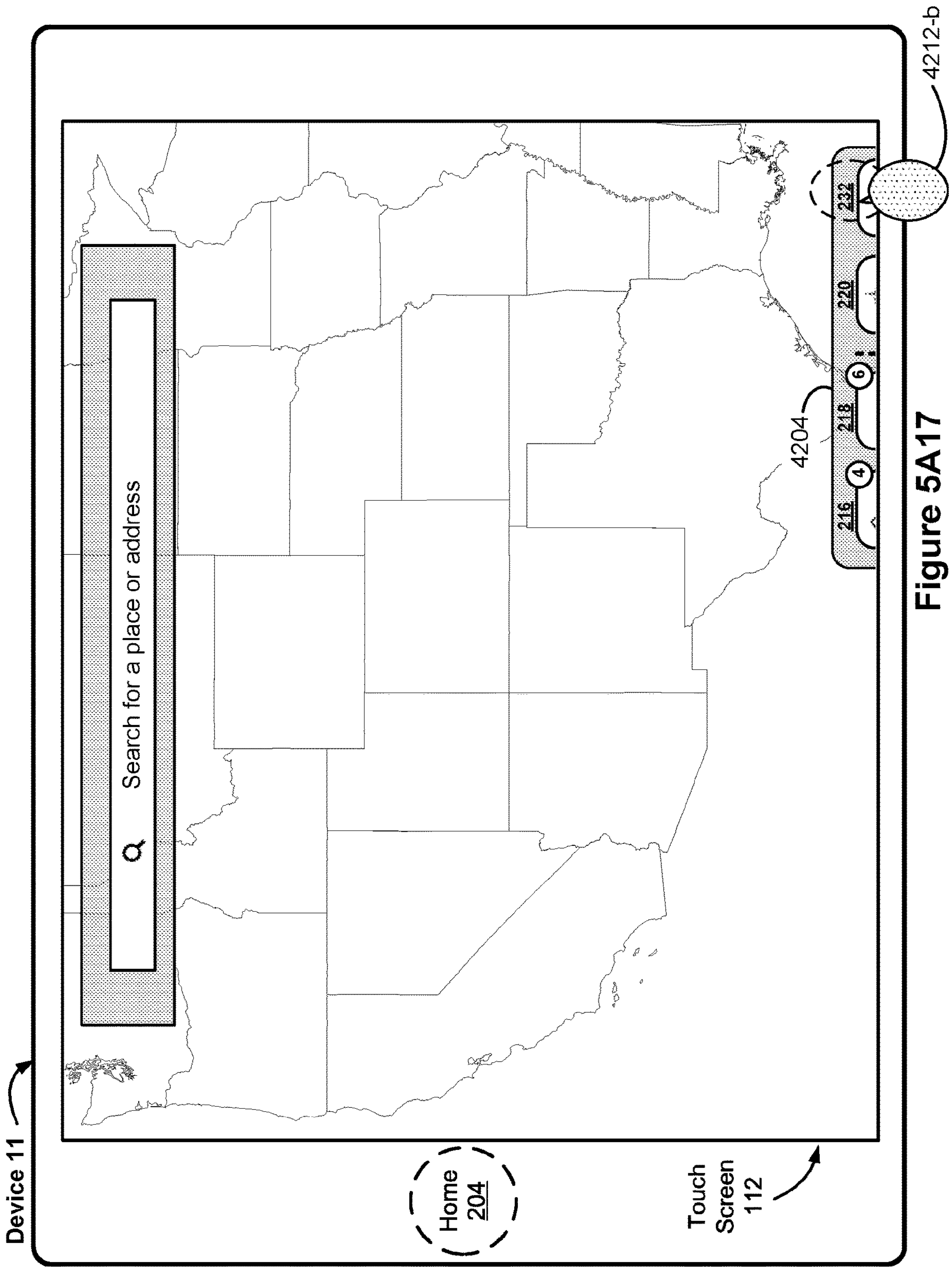
Figure 5A17

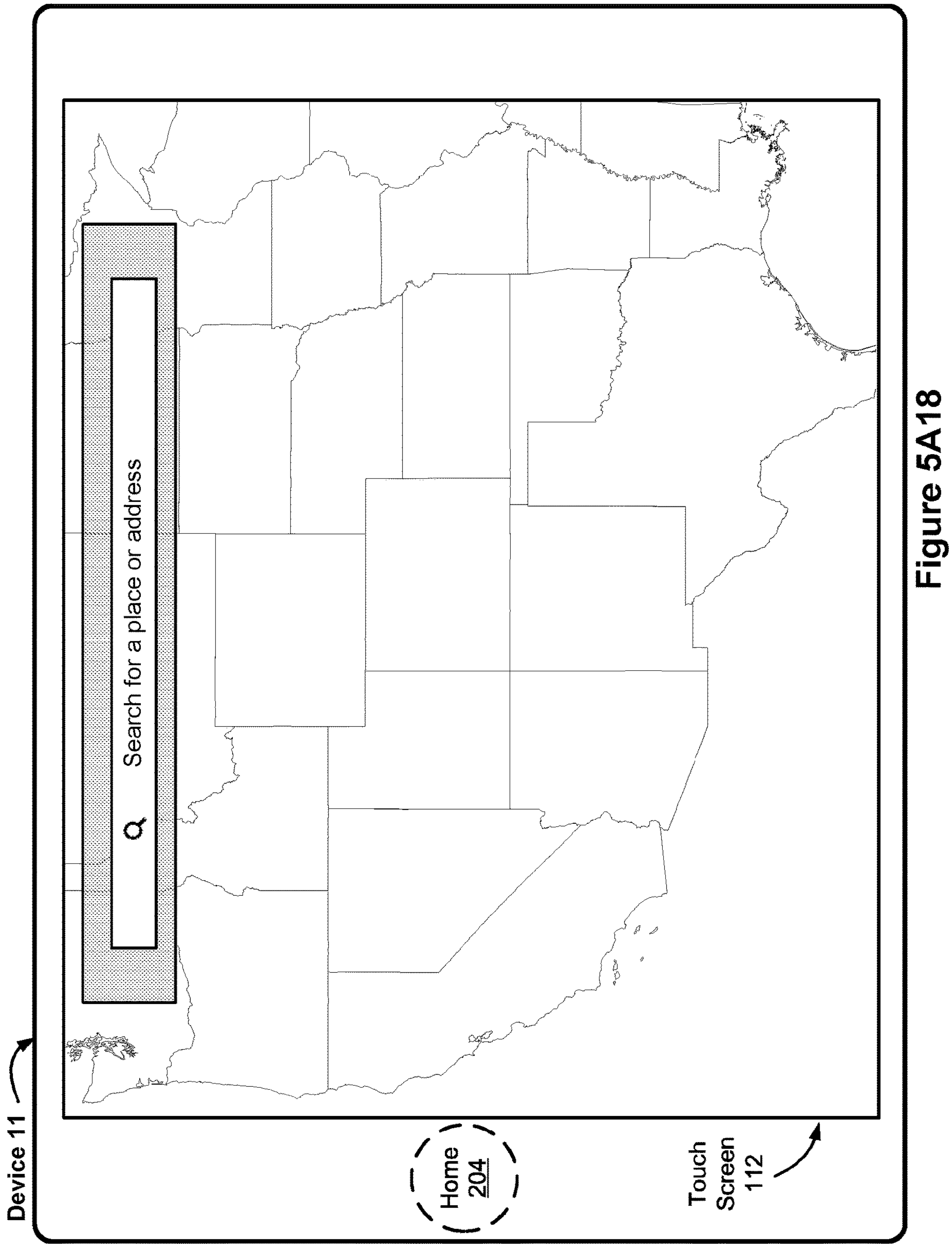
Figure 5A18

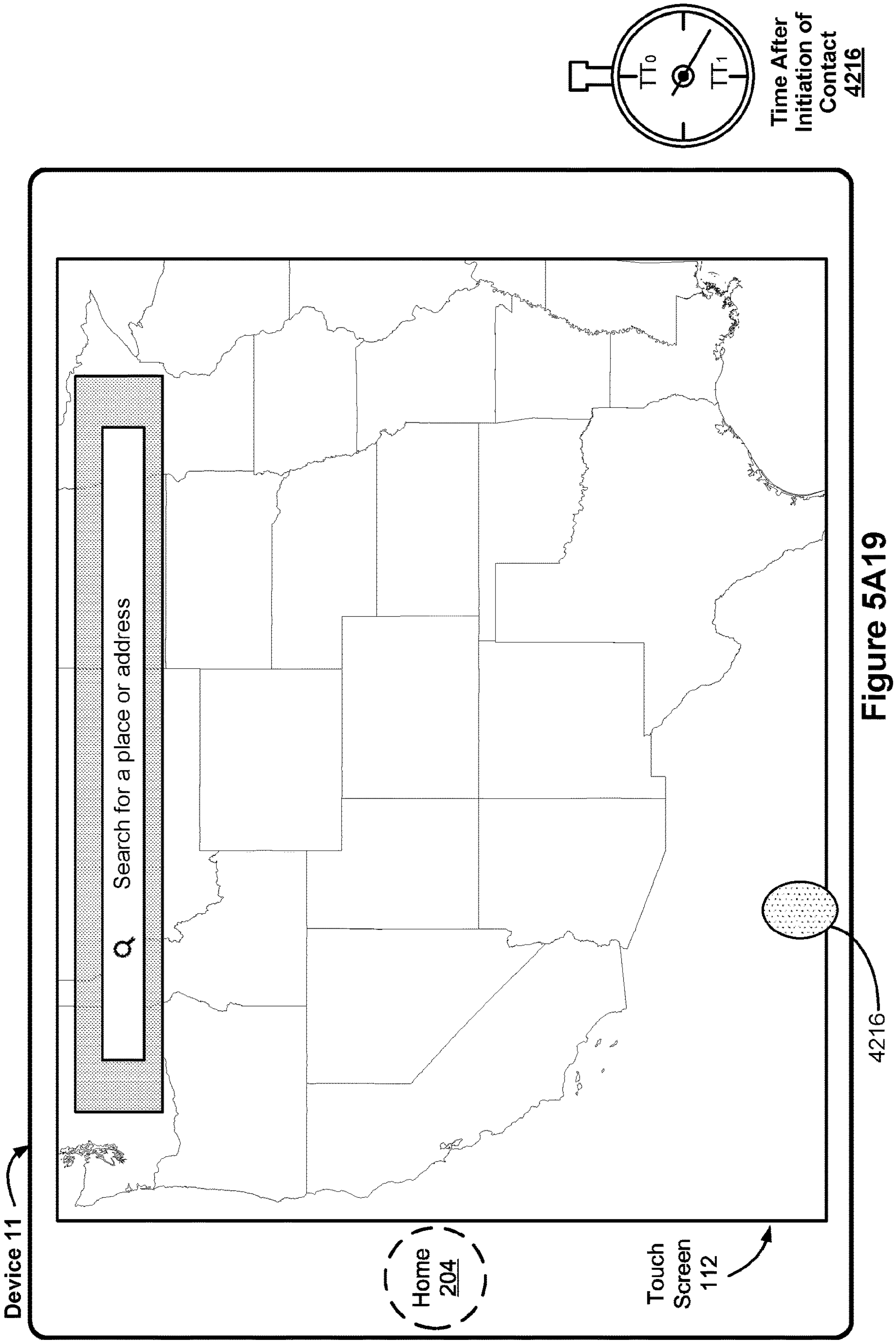
Figure 5A19

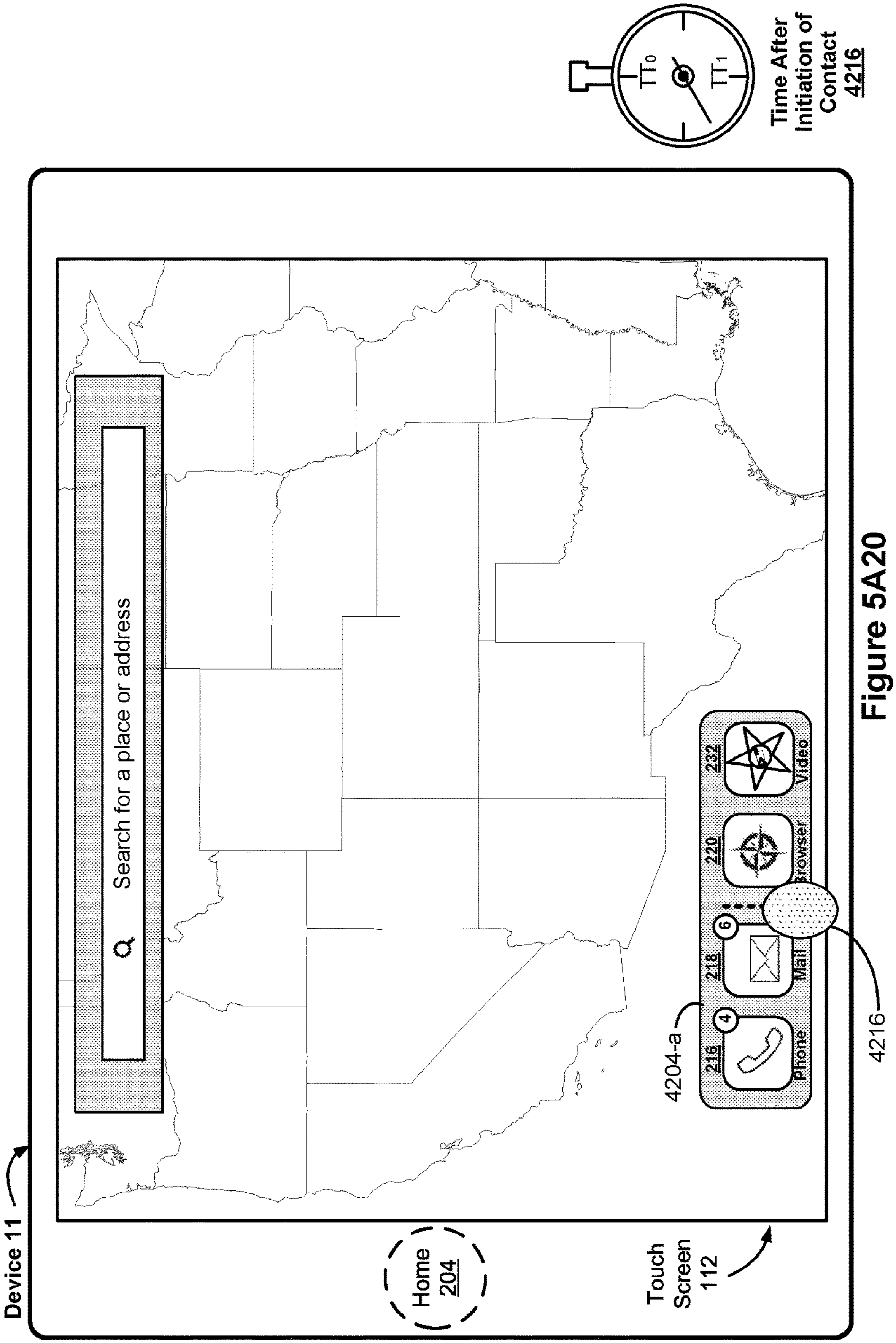
Figure 5A20

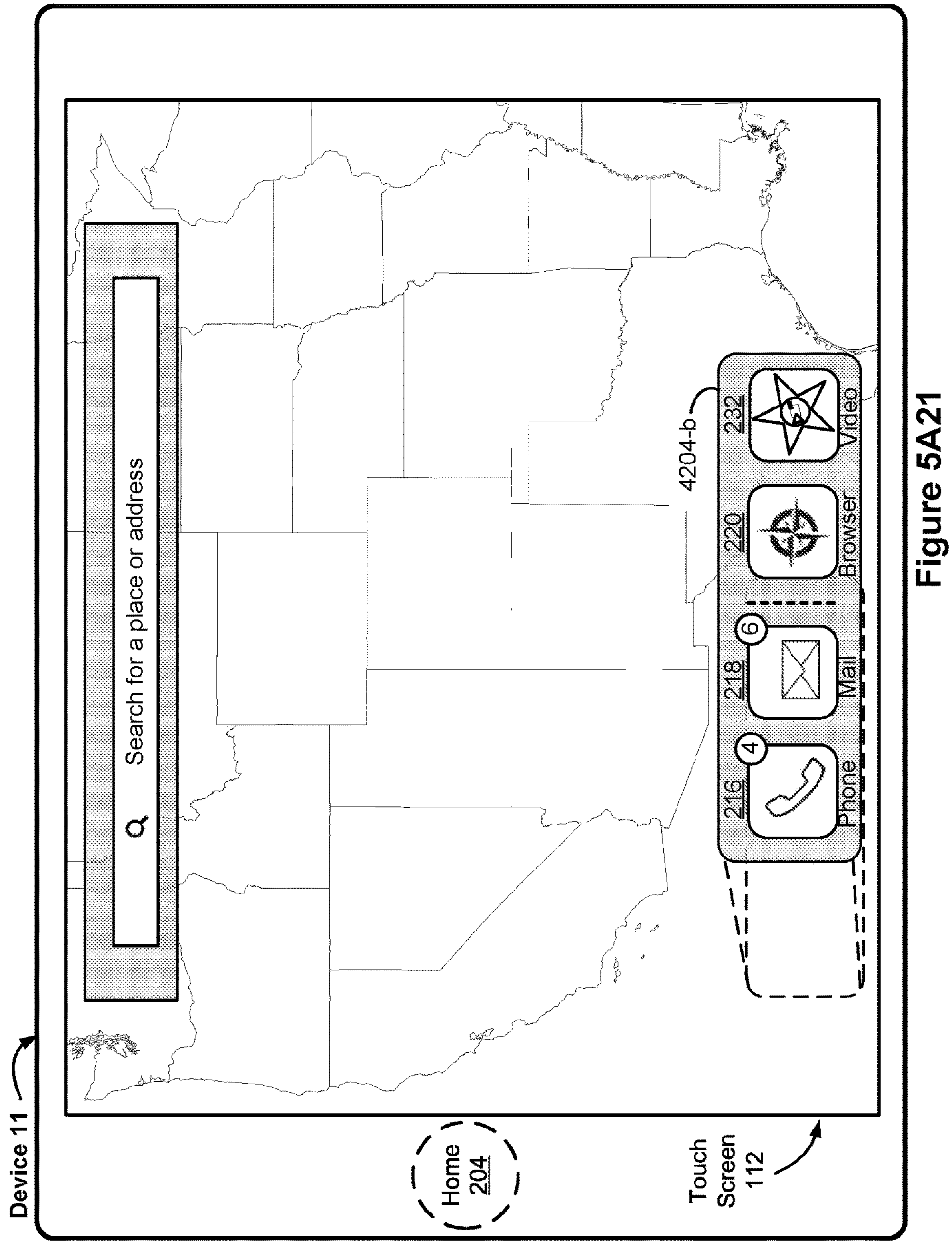
Figure 5A21

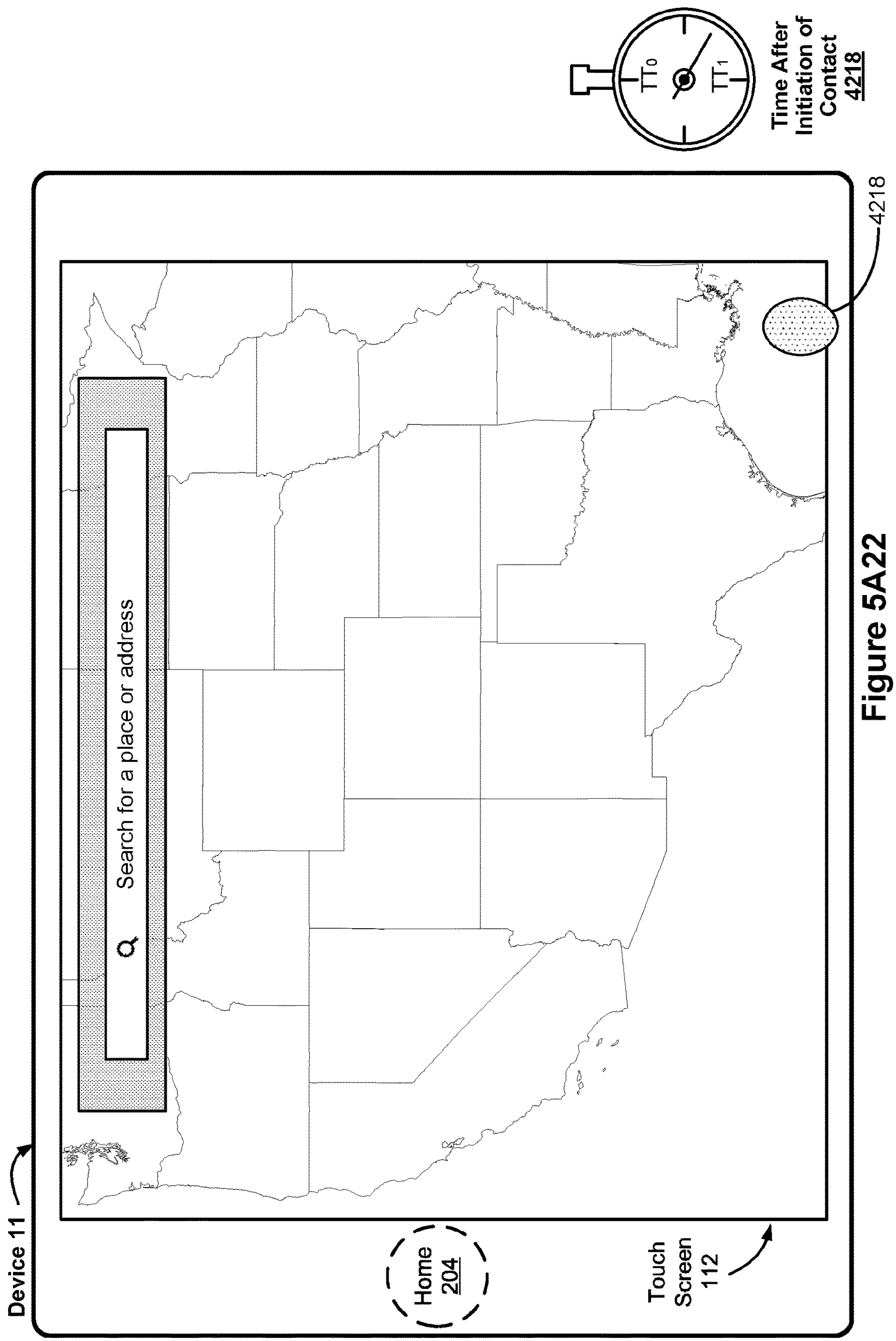
Figure 5A22

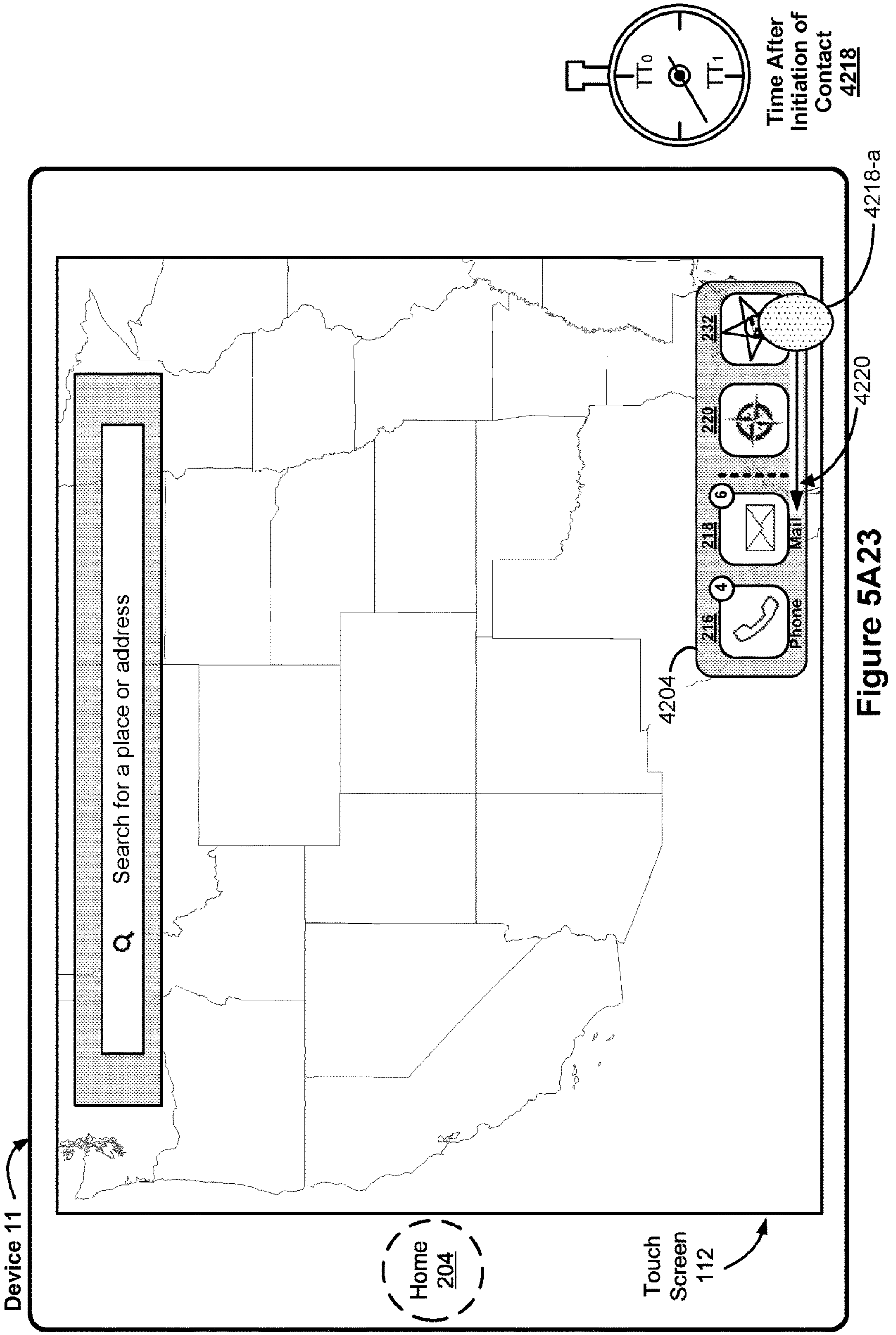
Figure 5A23

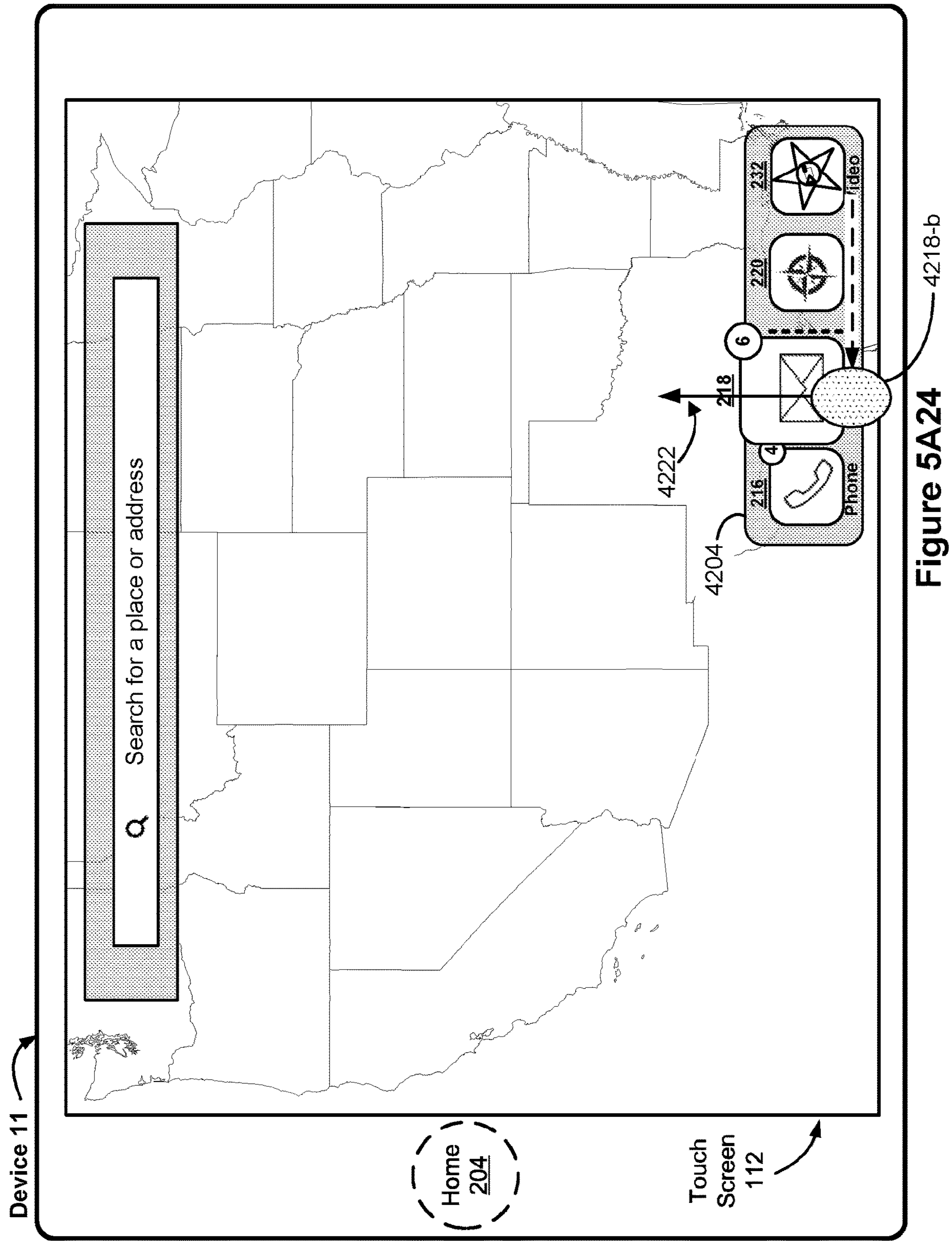
Figure 5A24

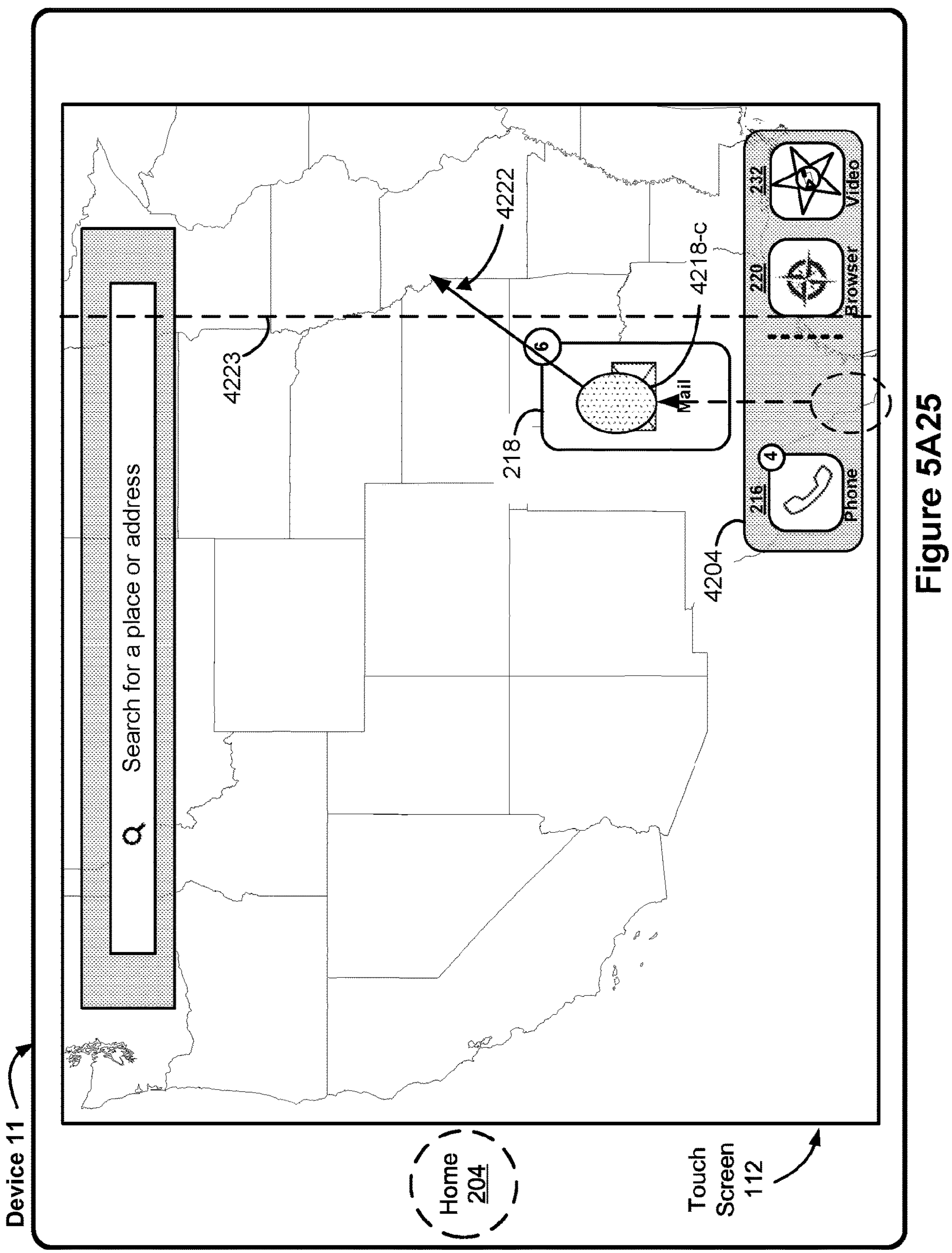
Figure 5A25

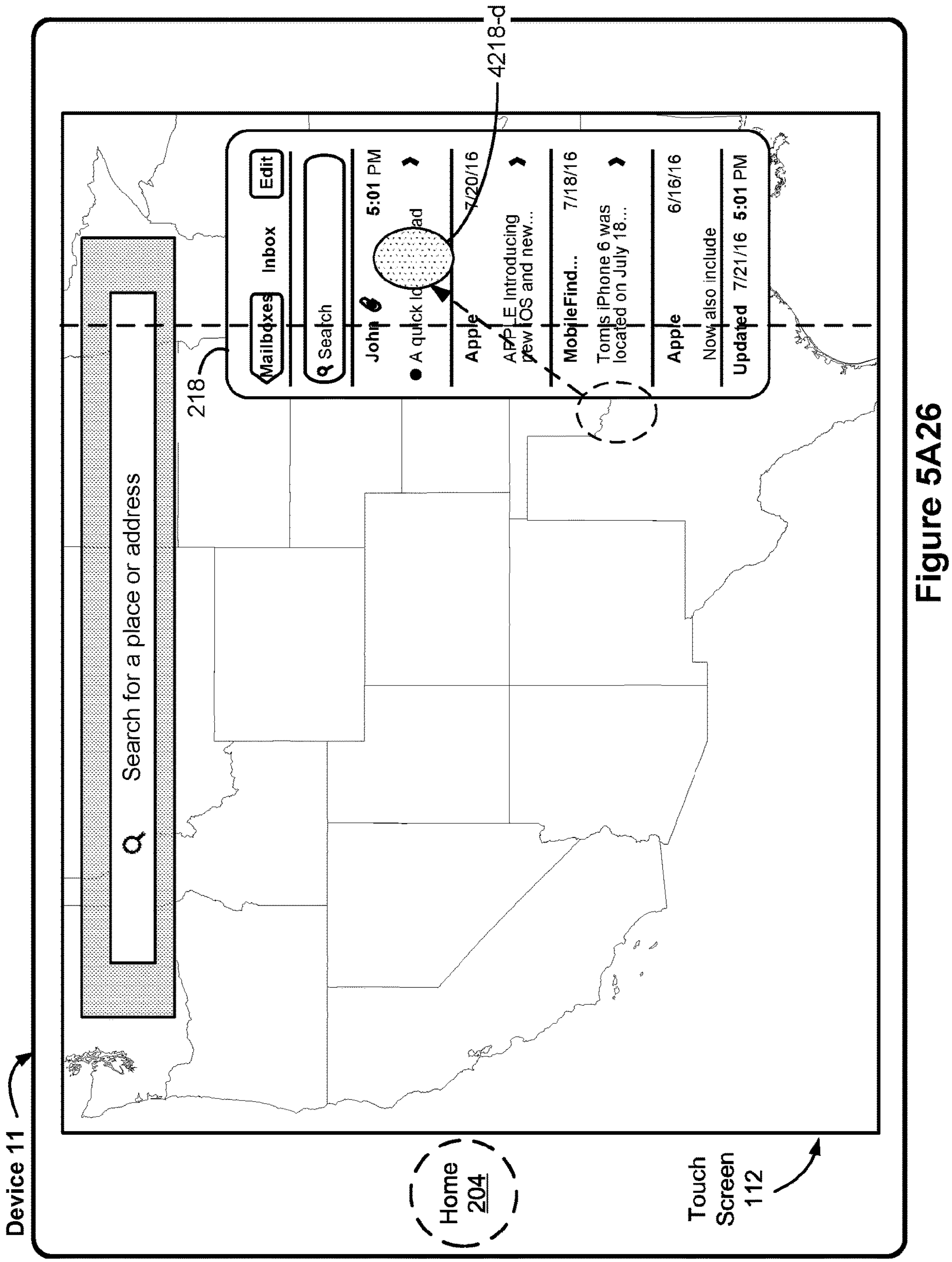
Figure 5A26

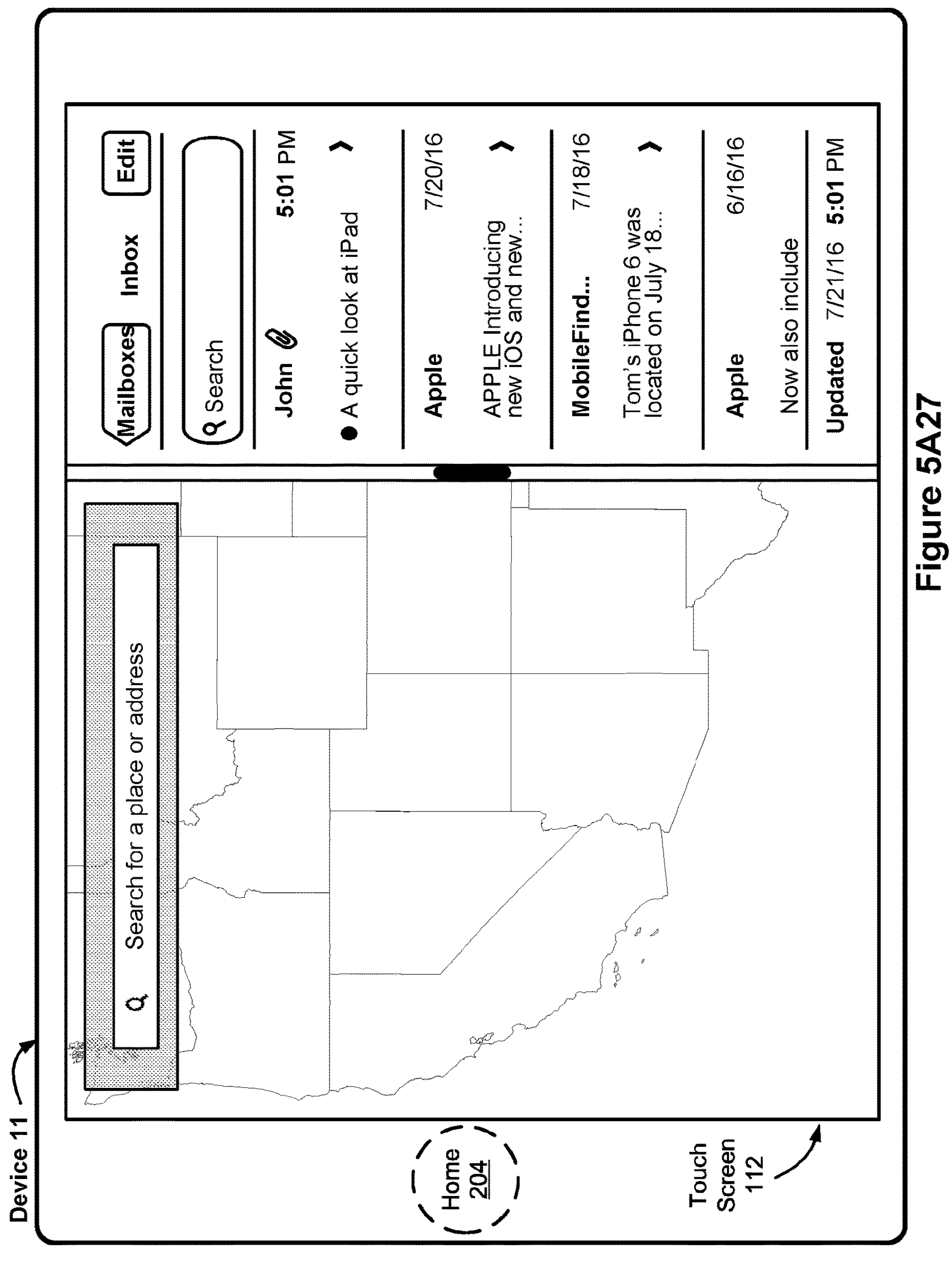
Figure 5A27

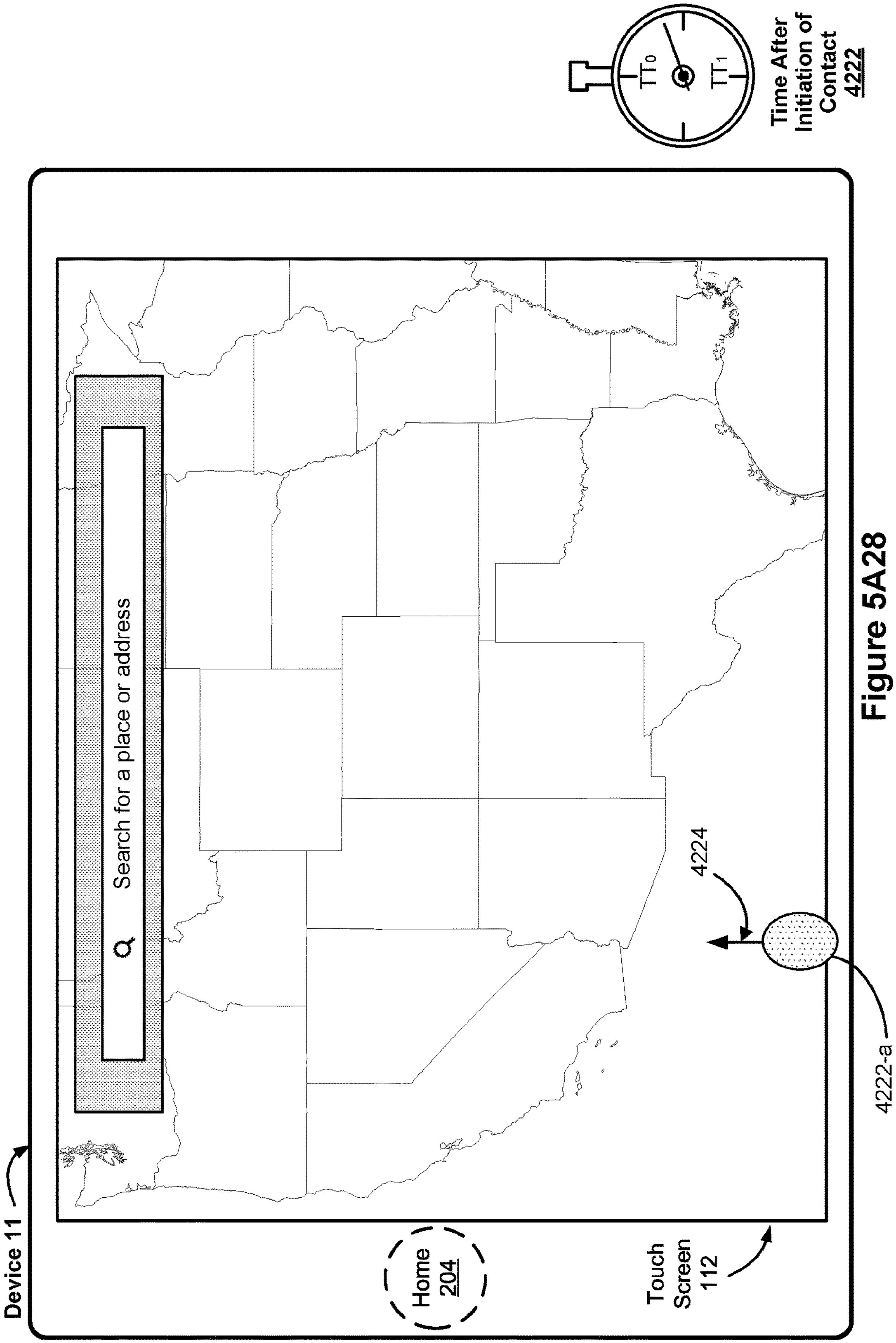
Figure 5A28

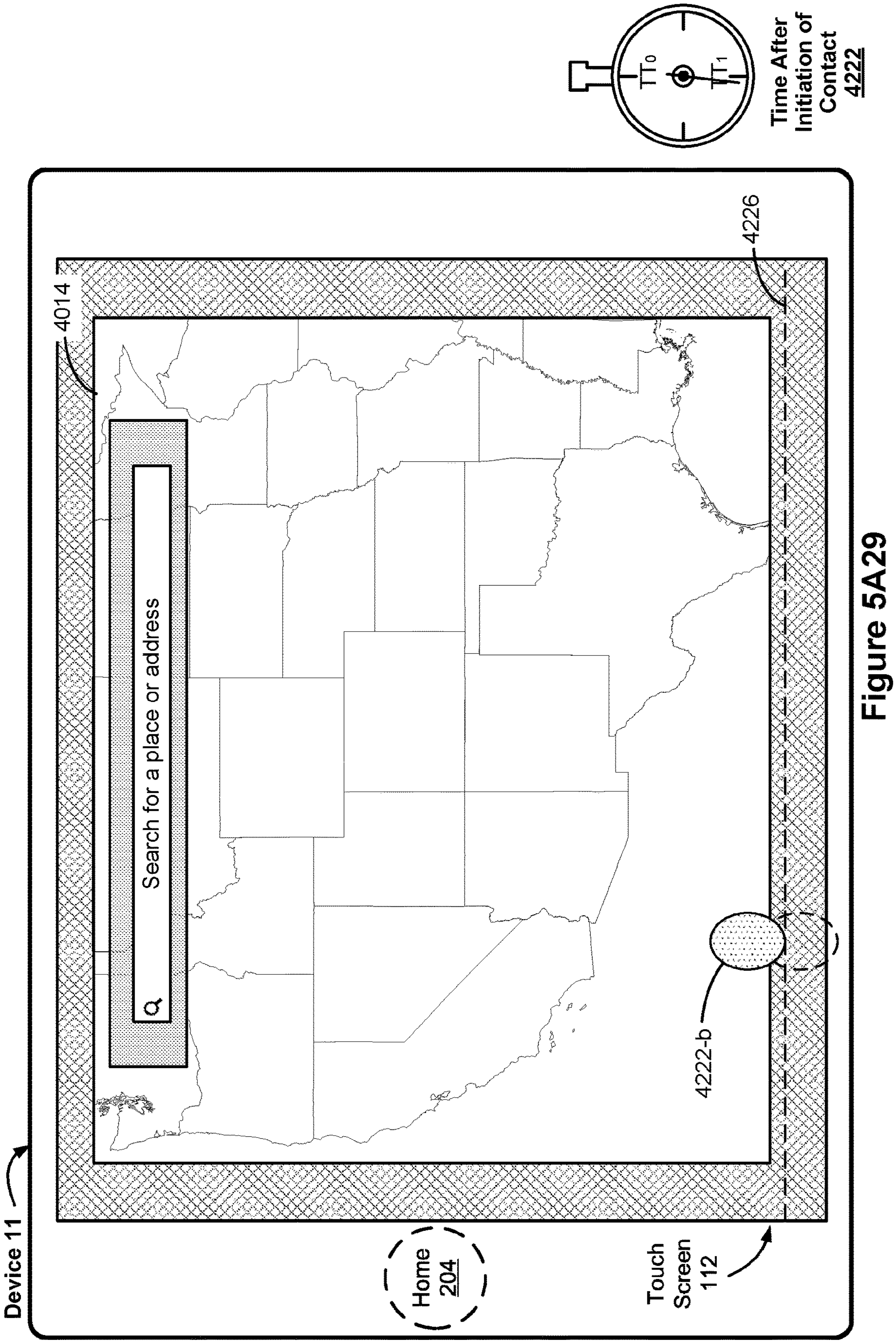
Figure 5A29

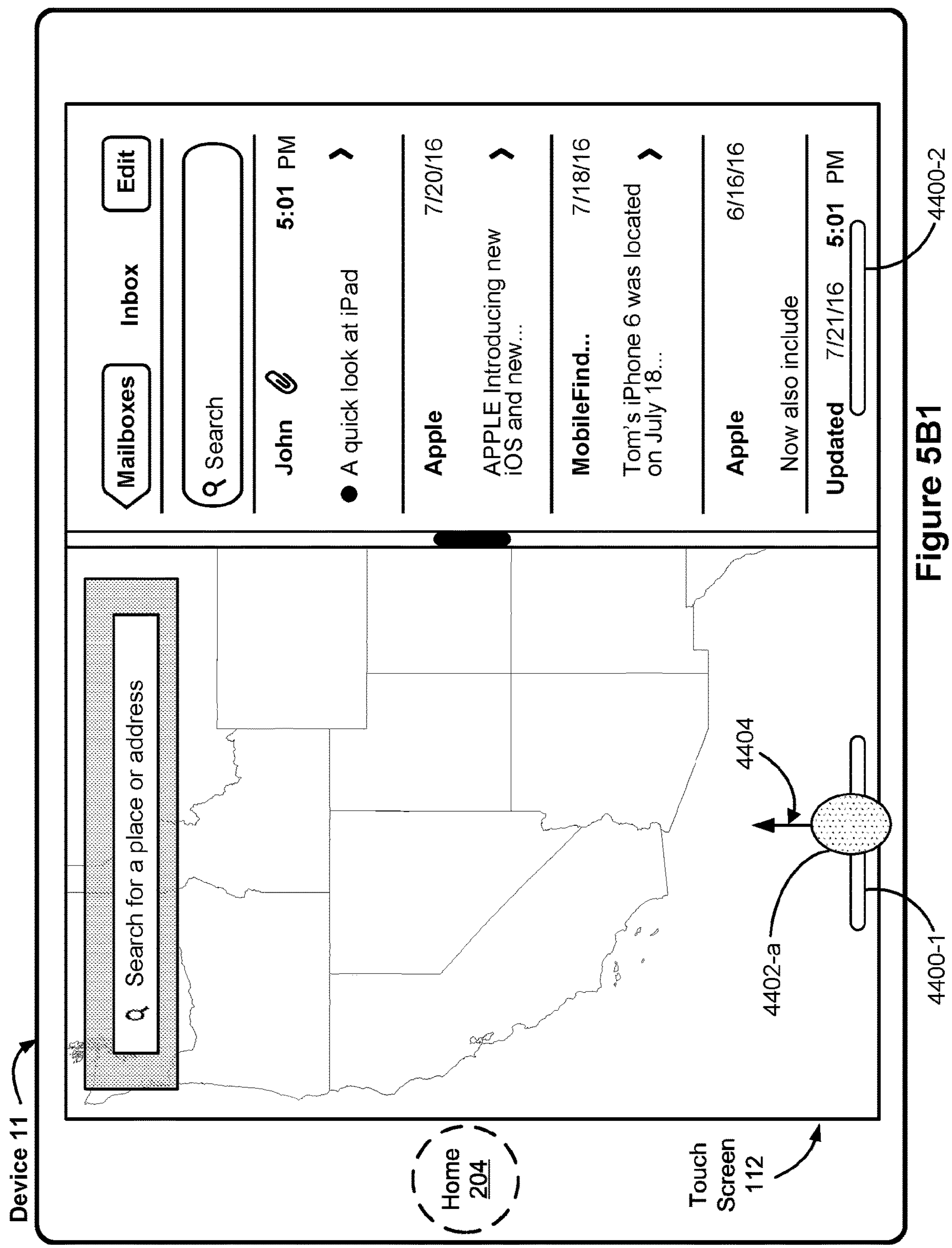
Figure 5B1

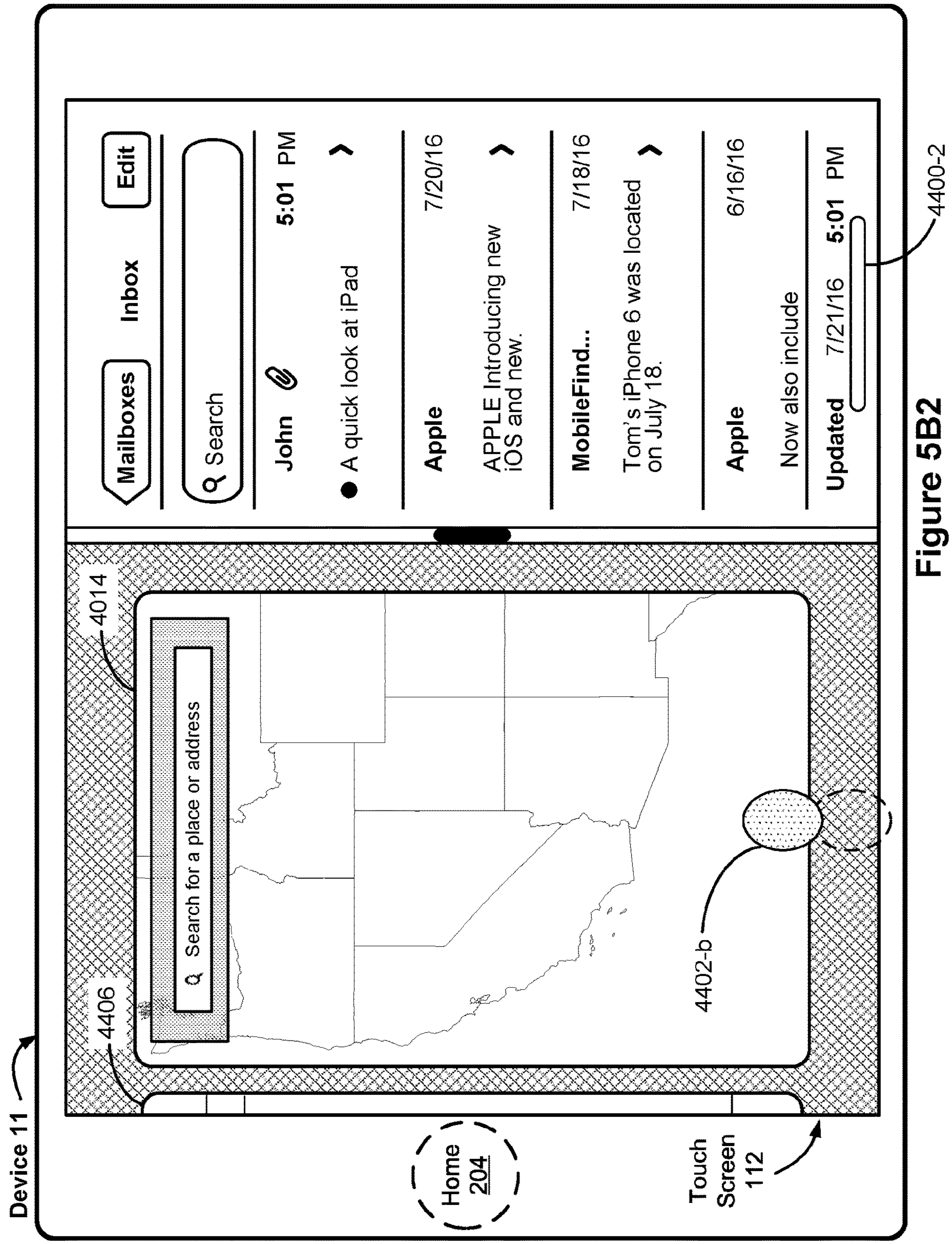
Figure 5B2

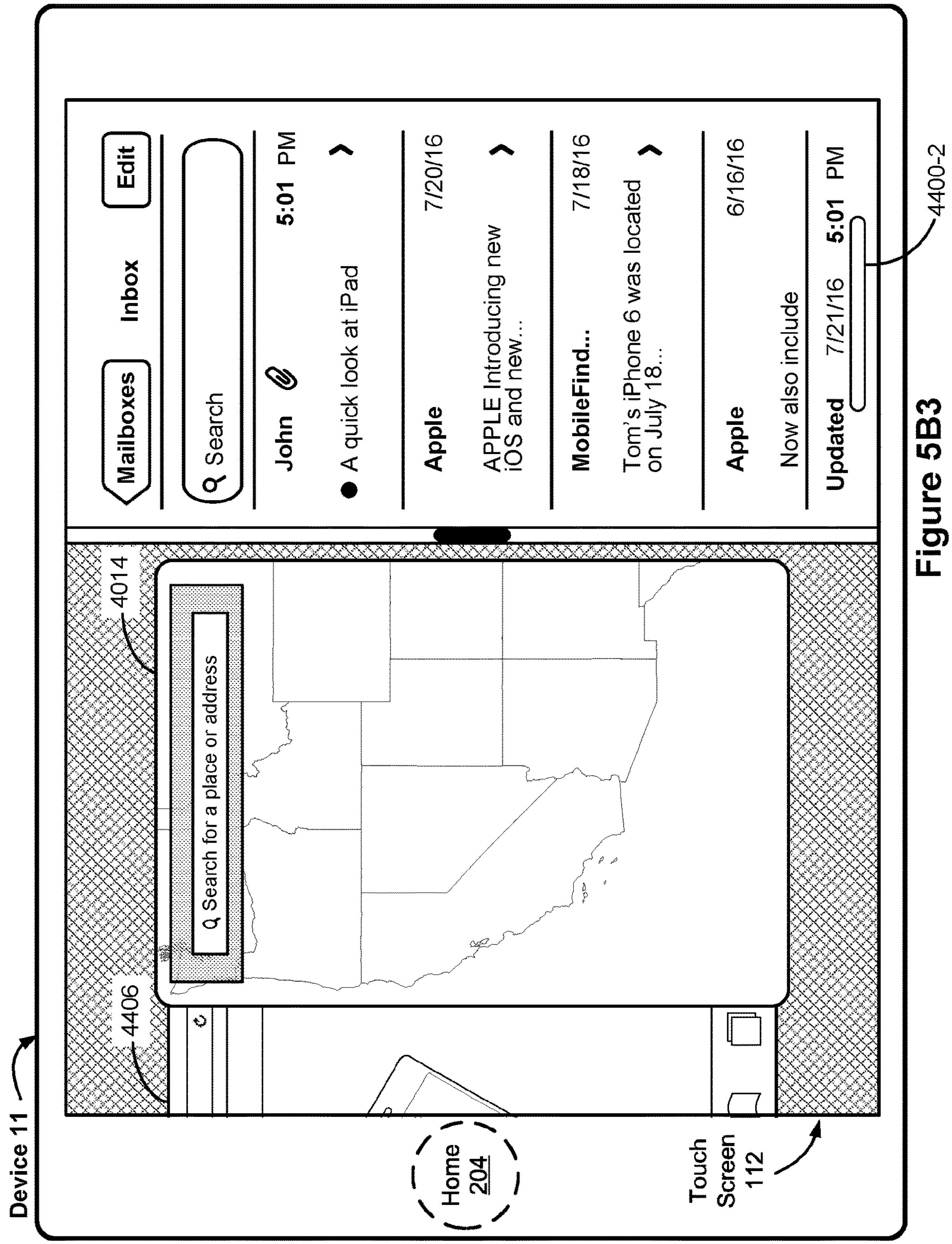
Figure 5B3

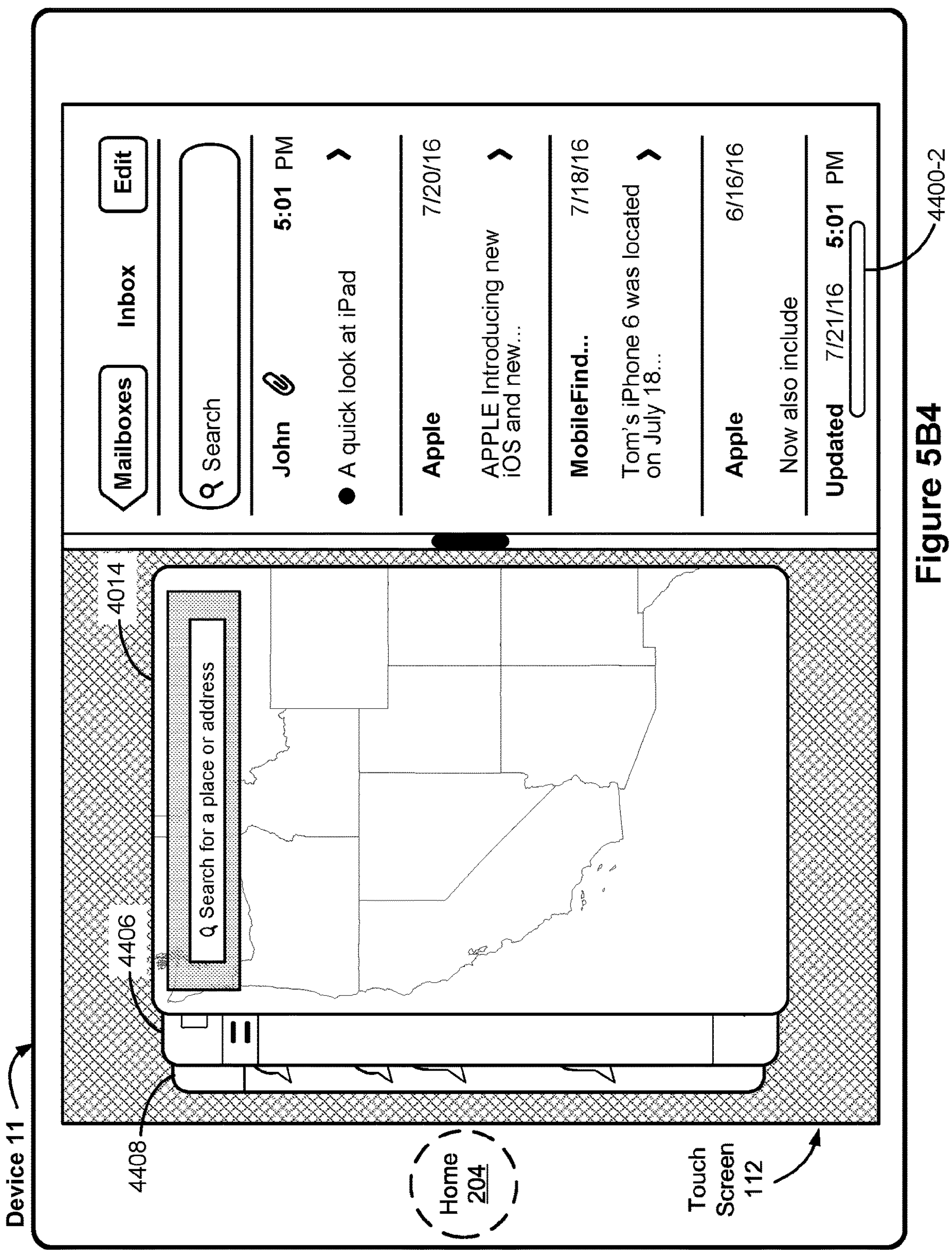
Figure 5B4

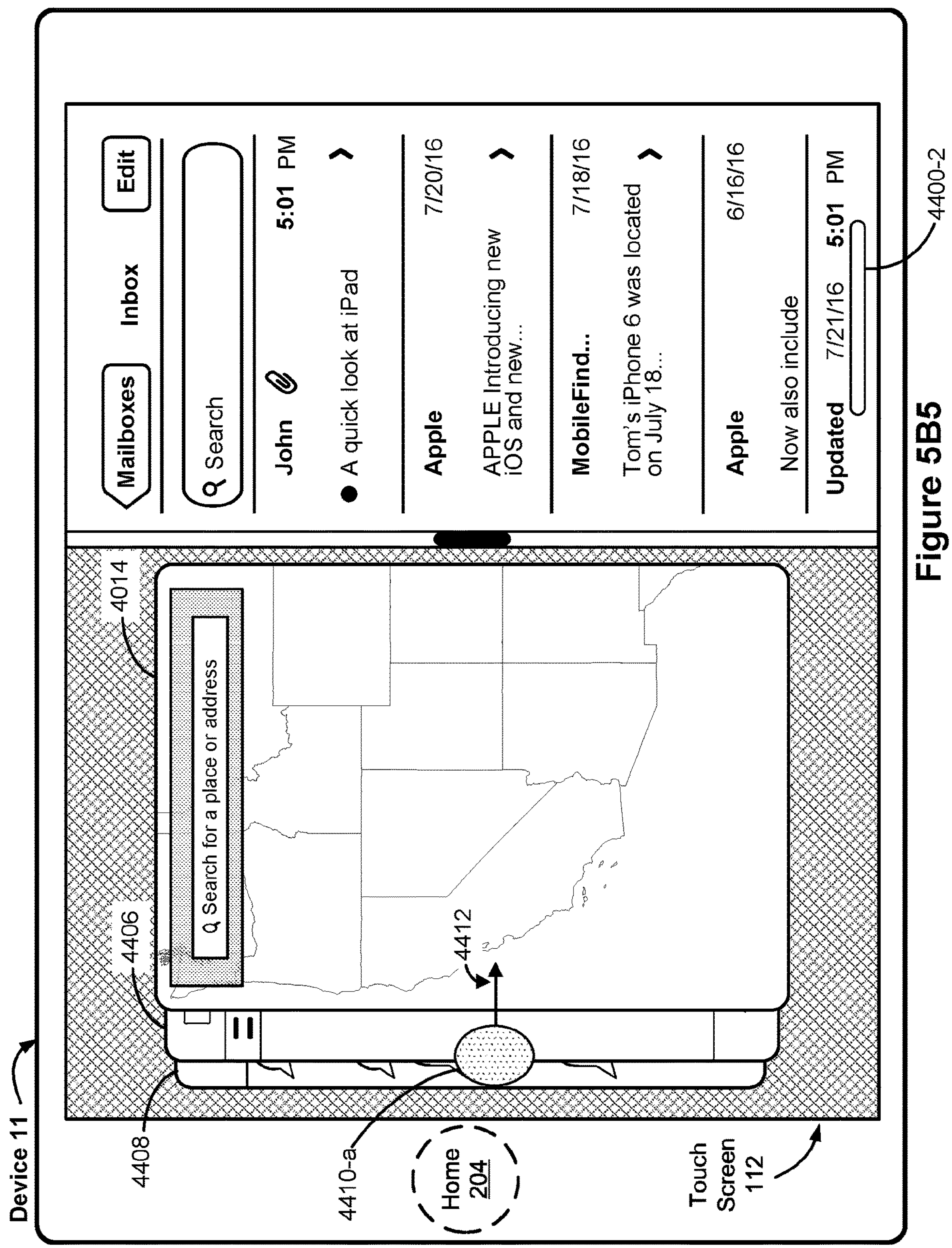
Figure 5B5

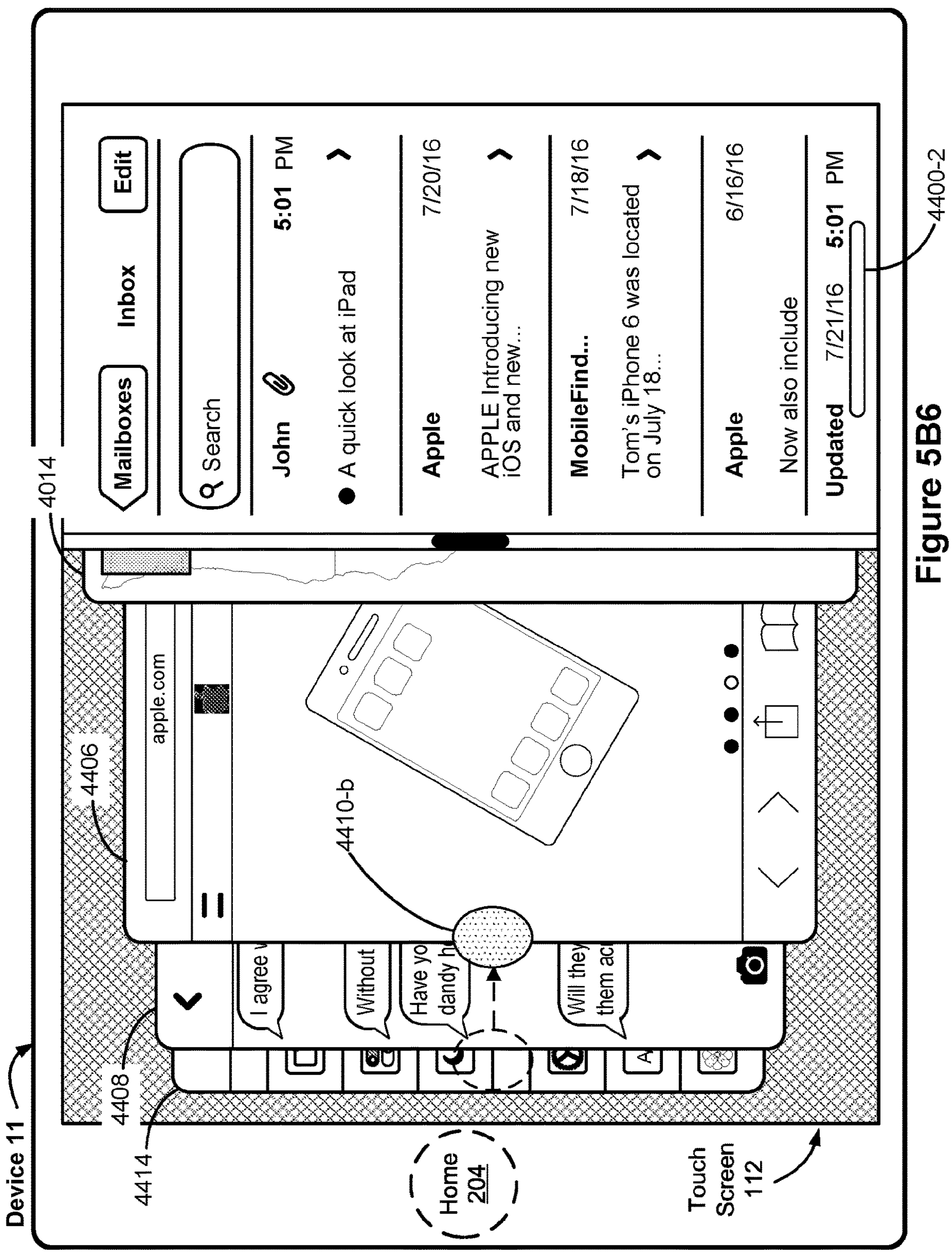
Figure 5B6

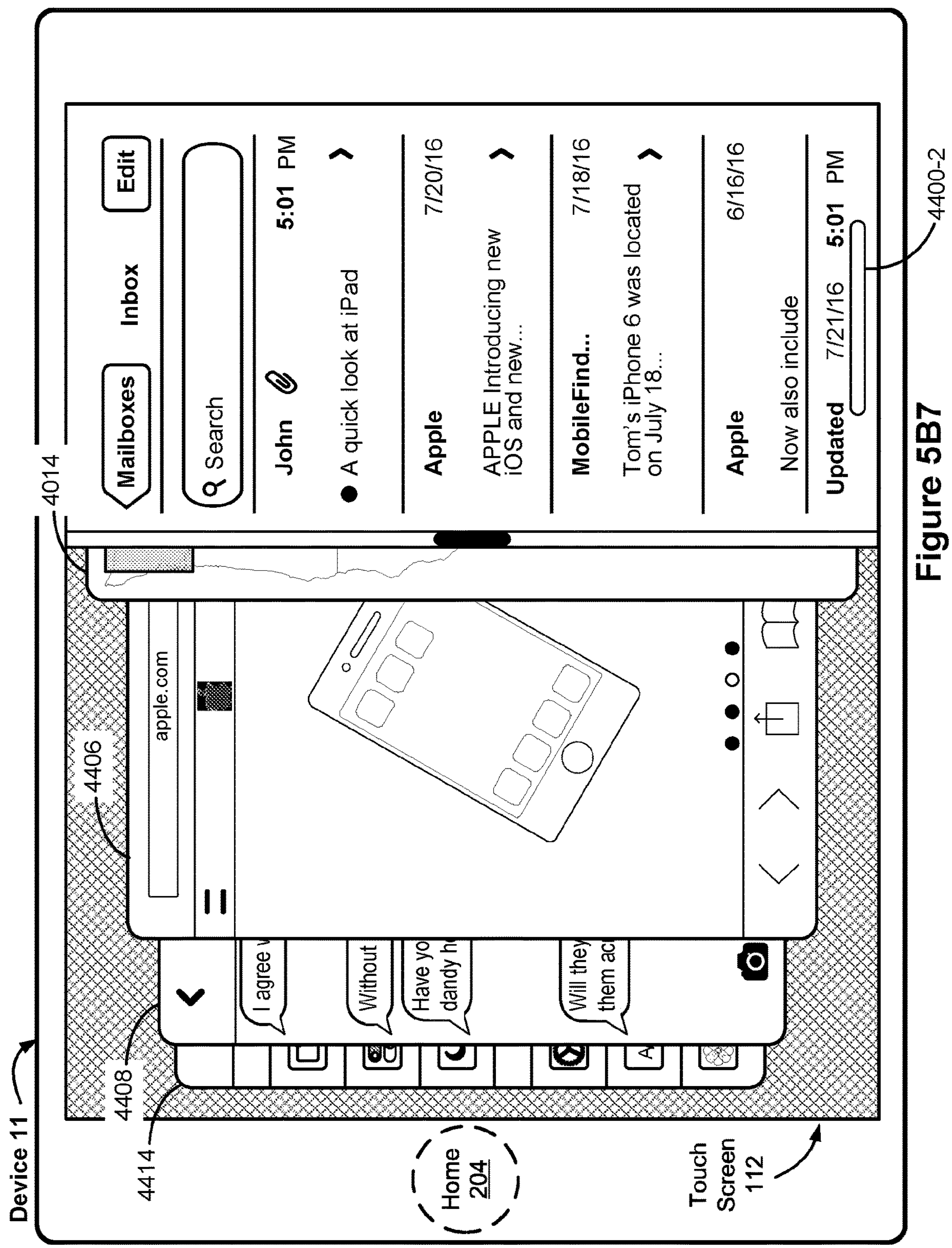
Figure 5B7

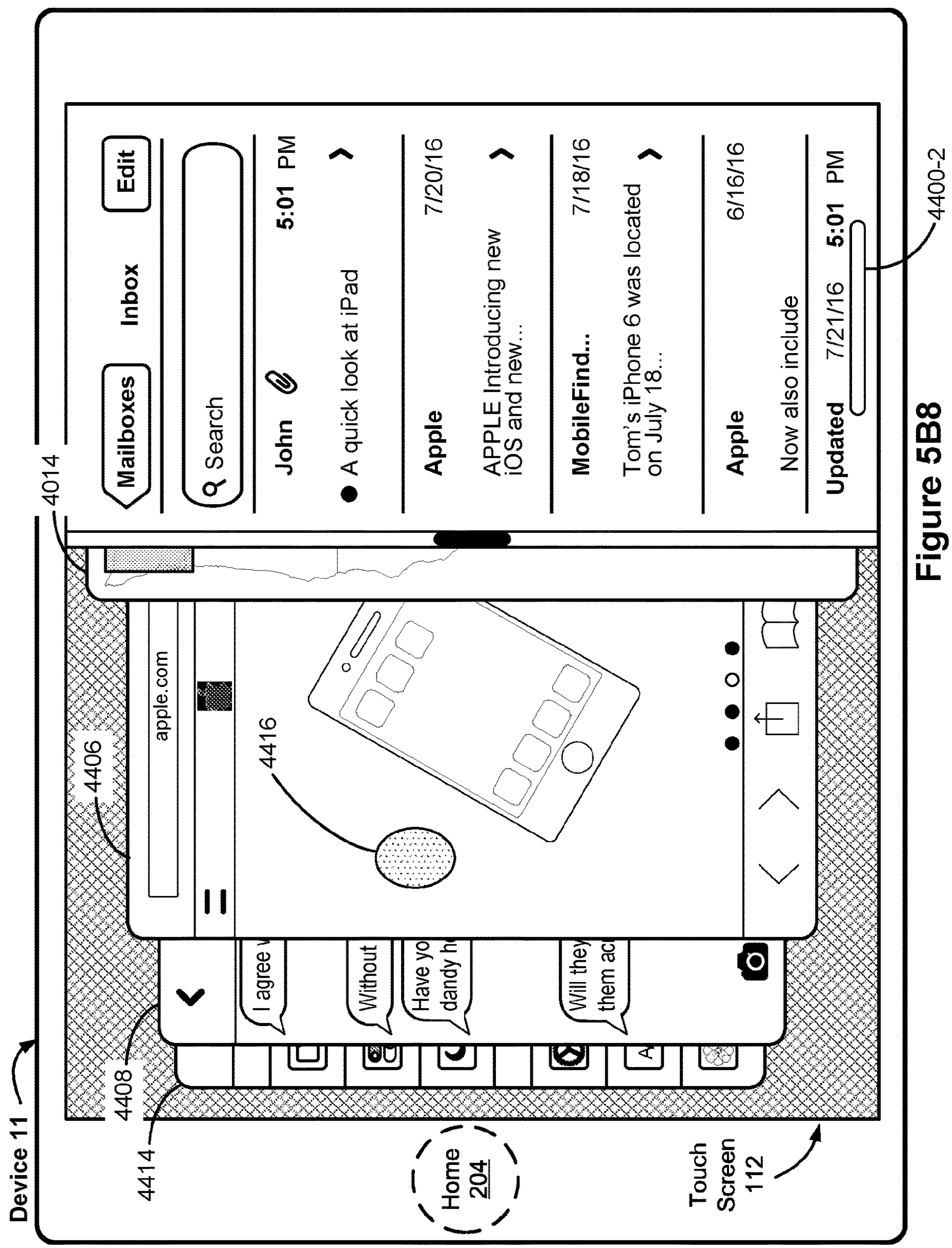
Figure 5B8

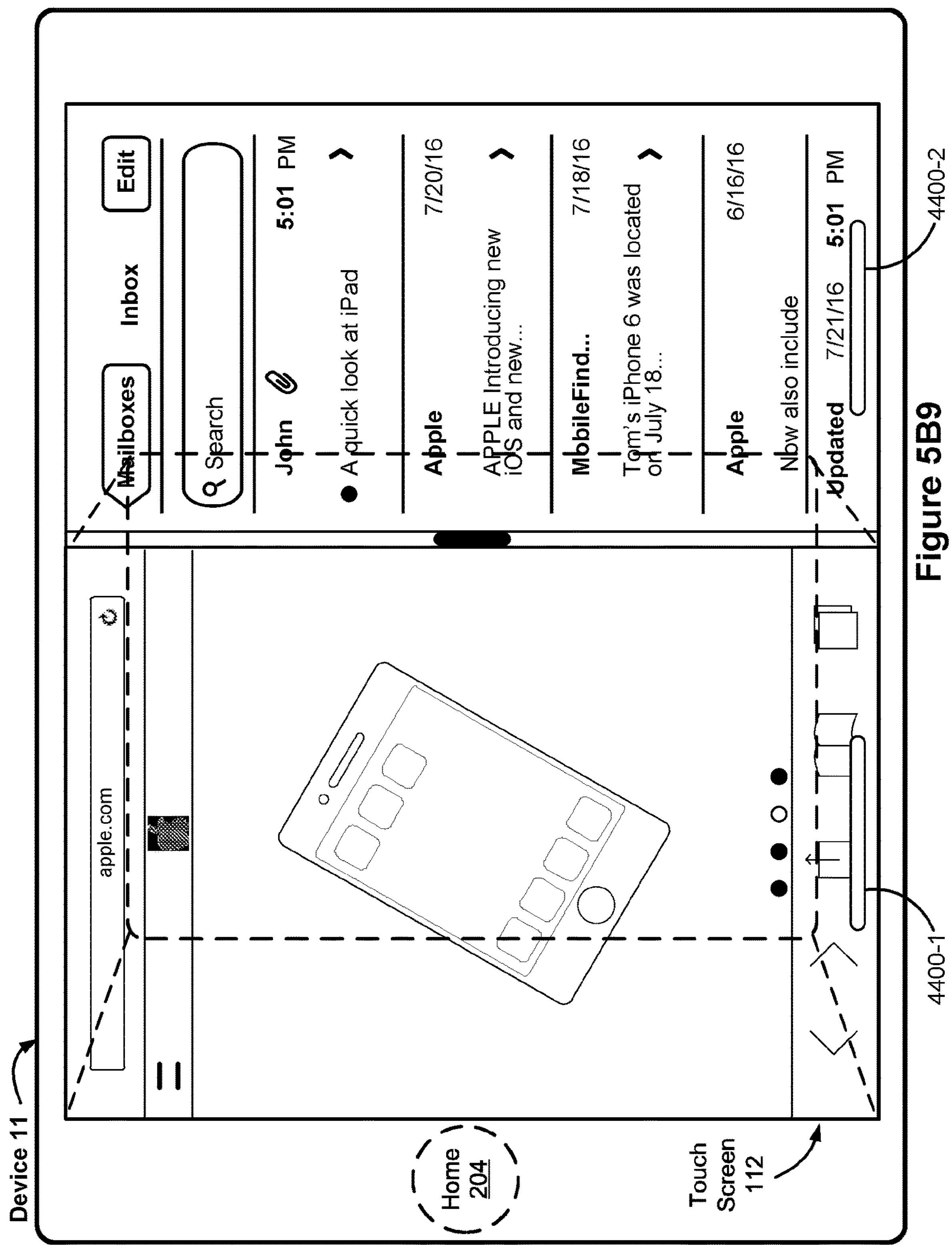
Figure 5B9

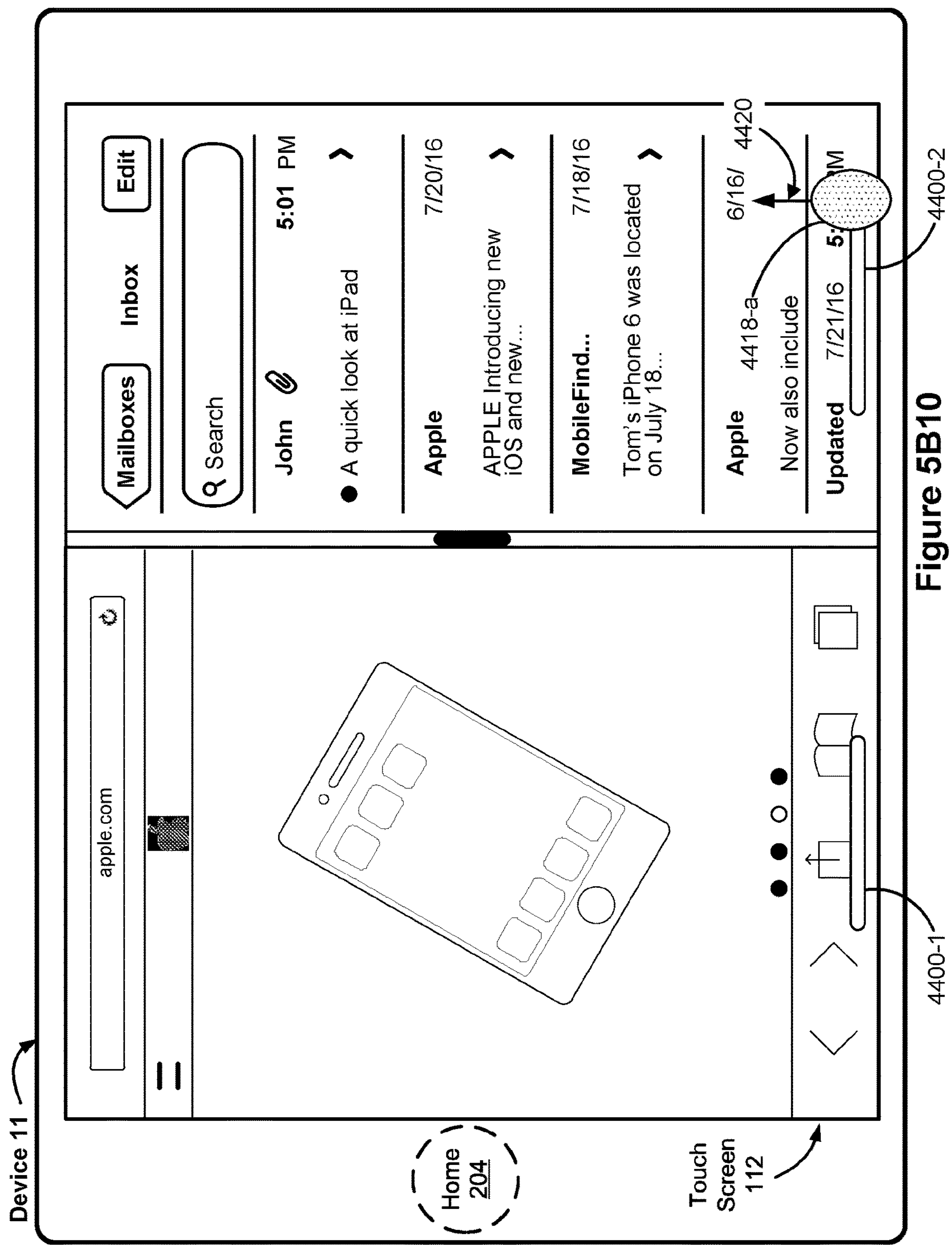
Figure 5B10

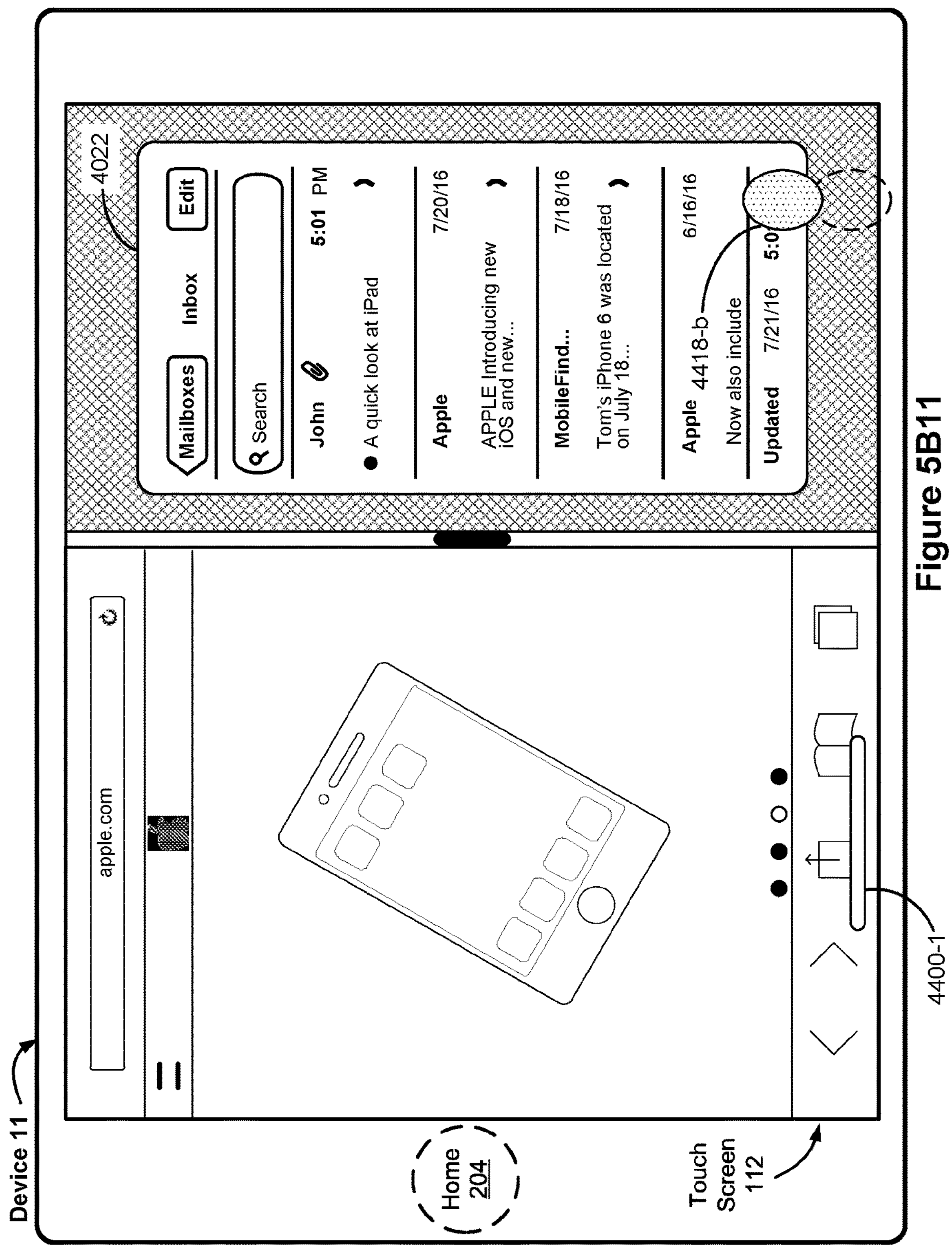
Figure 5B11

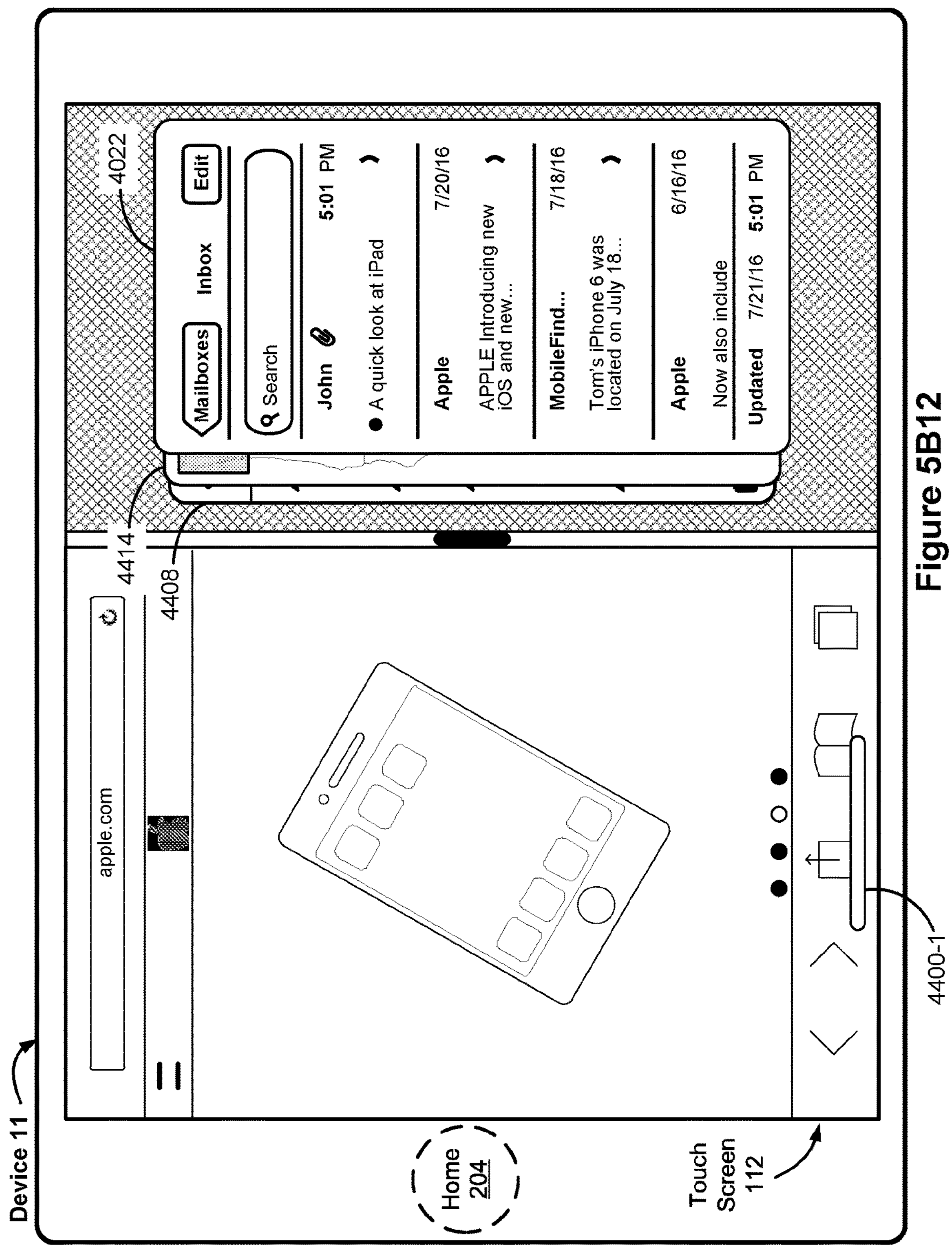
Figure 5B12

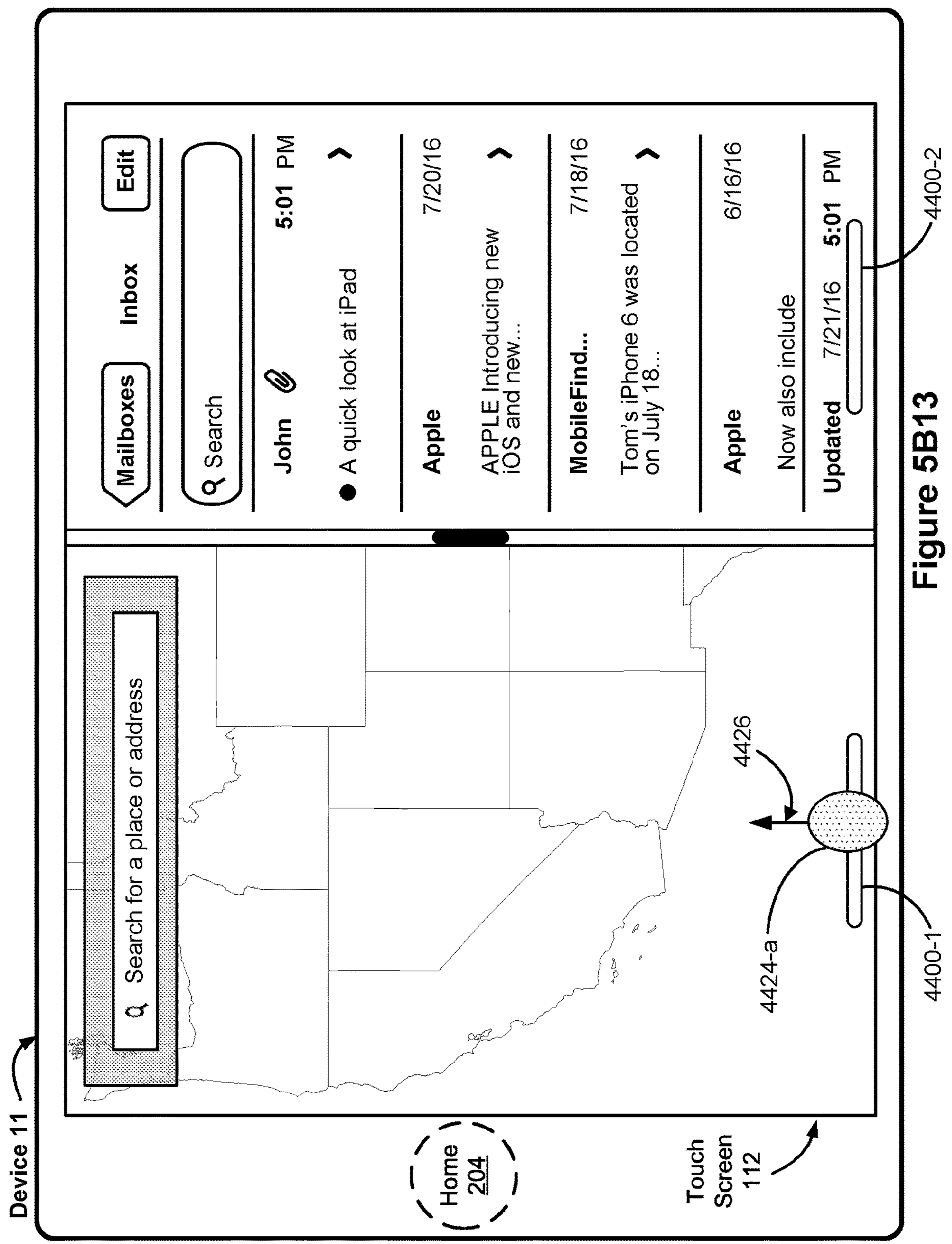
Figure 5B13

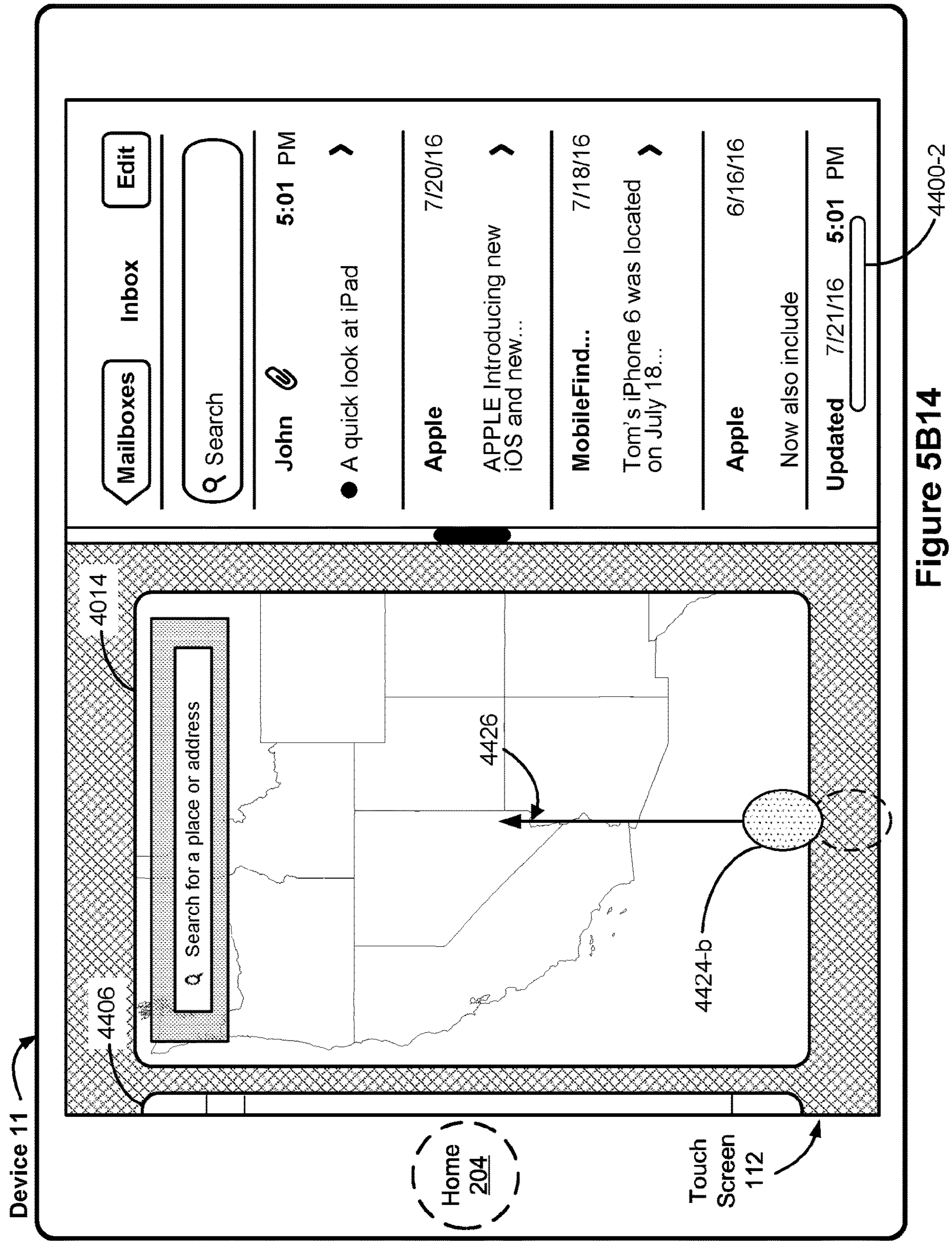
Figure 5B14

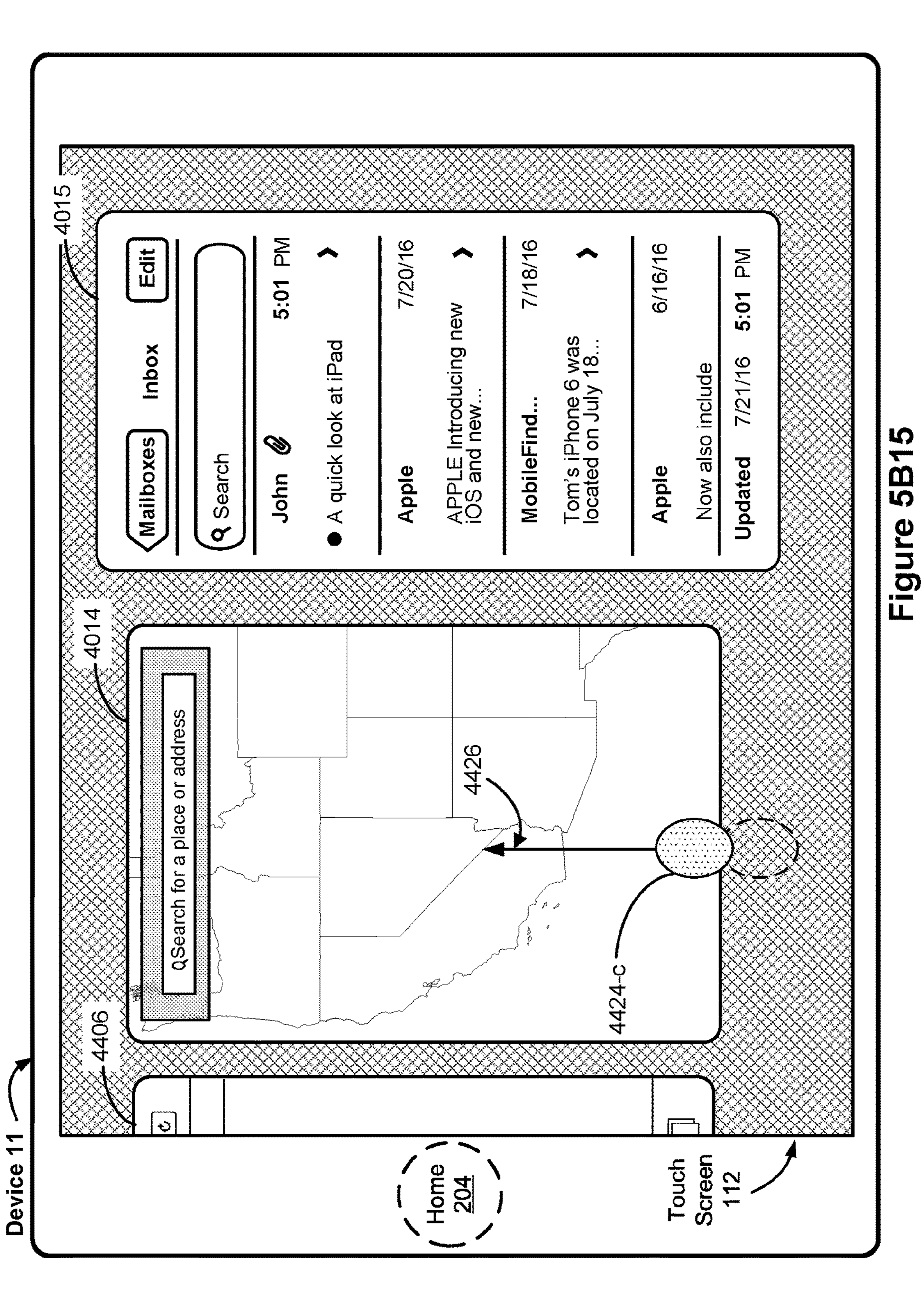
Figure 5B15

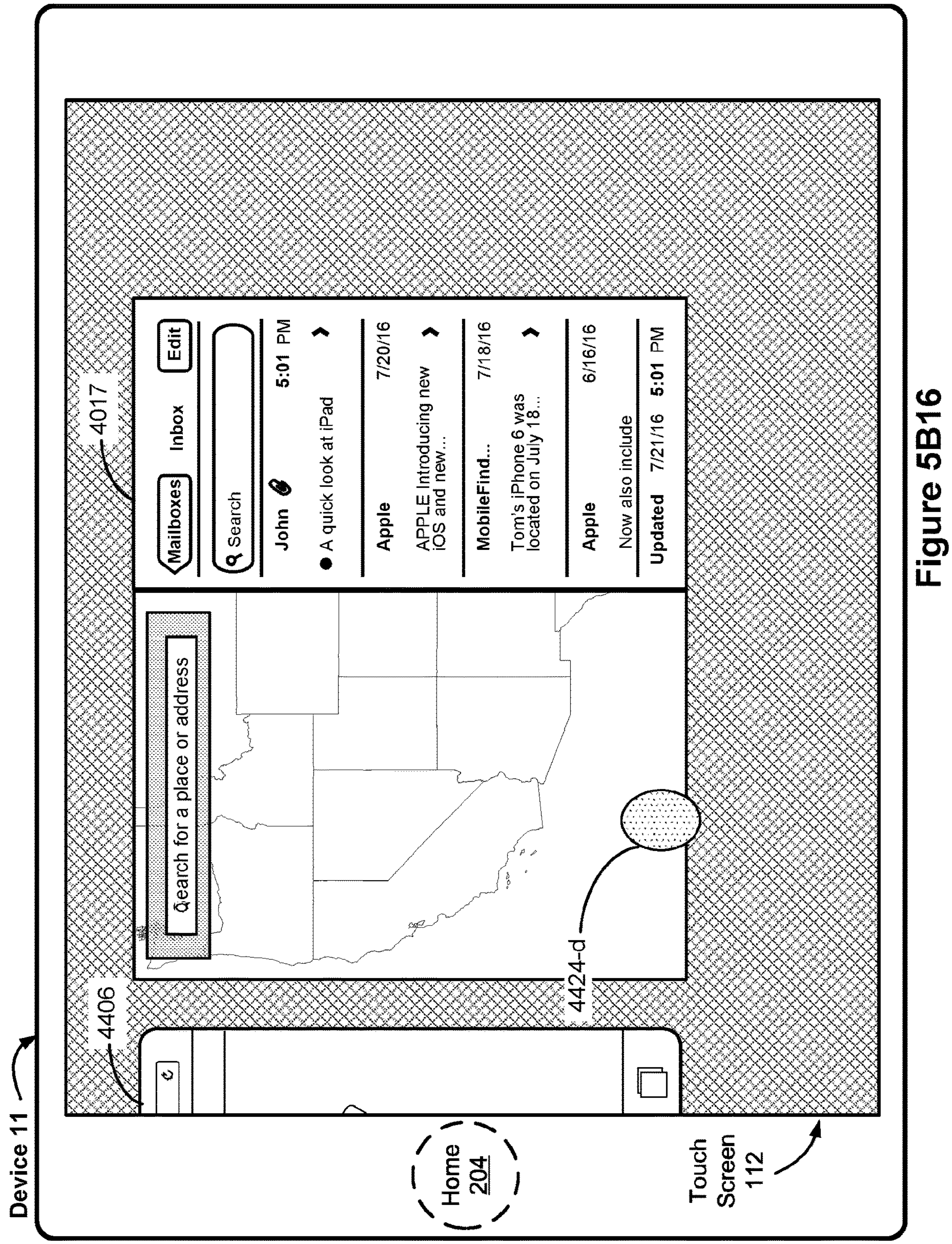
Figure 5B16

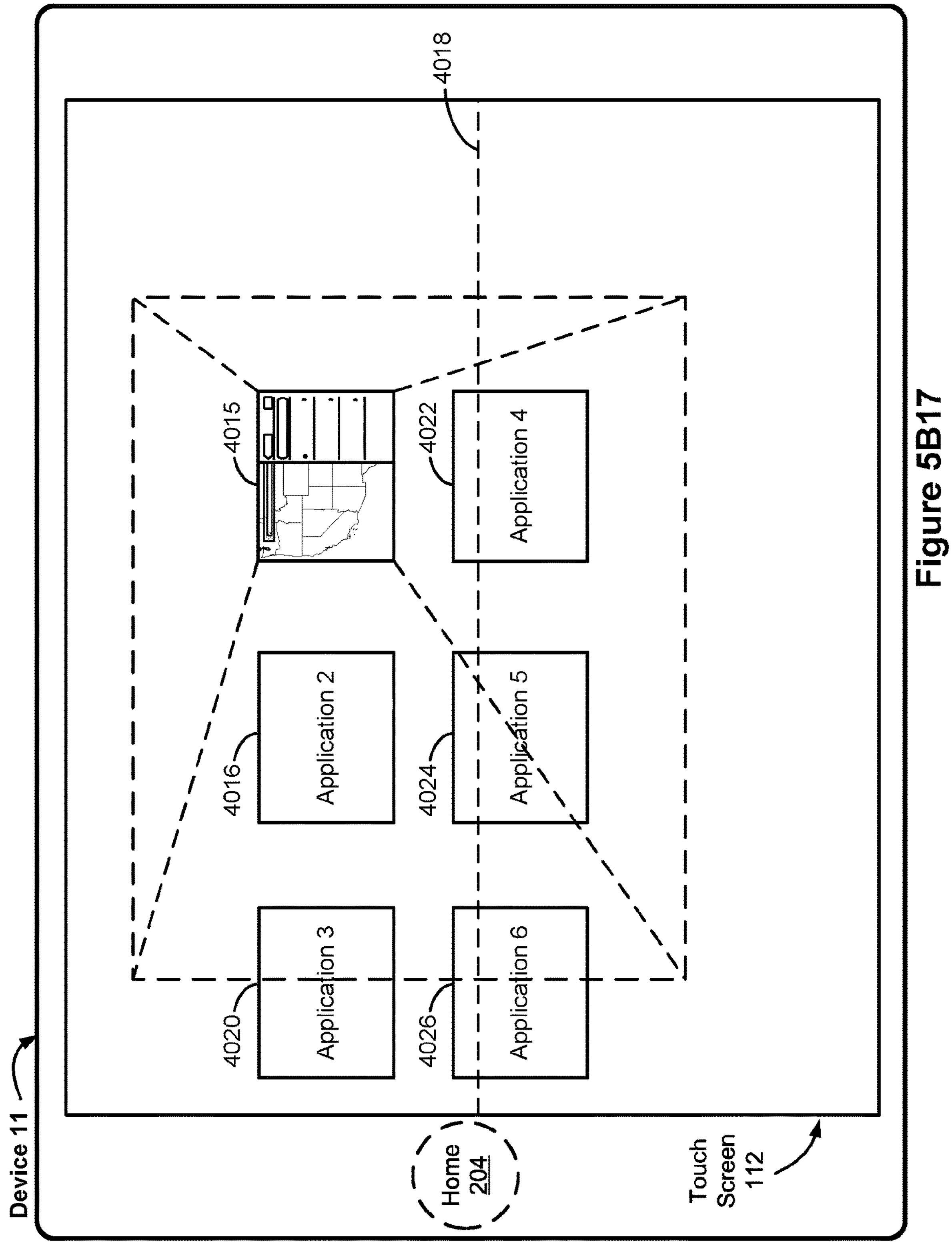
Figure 5B17

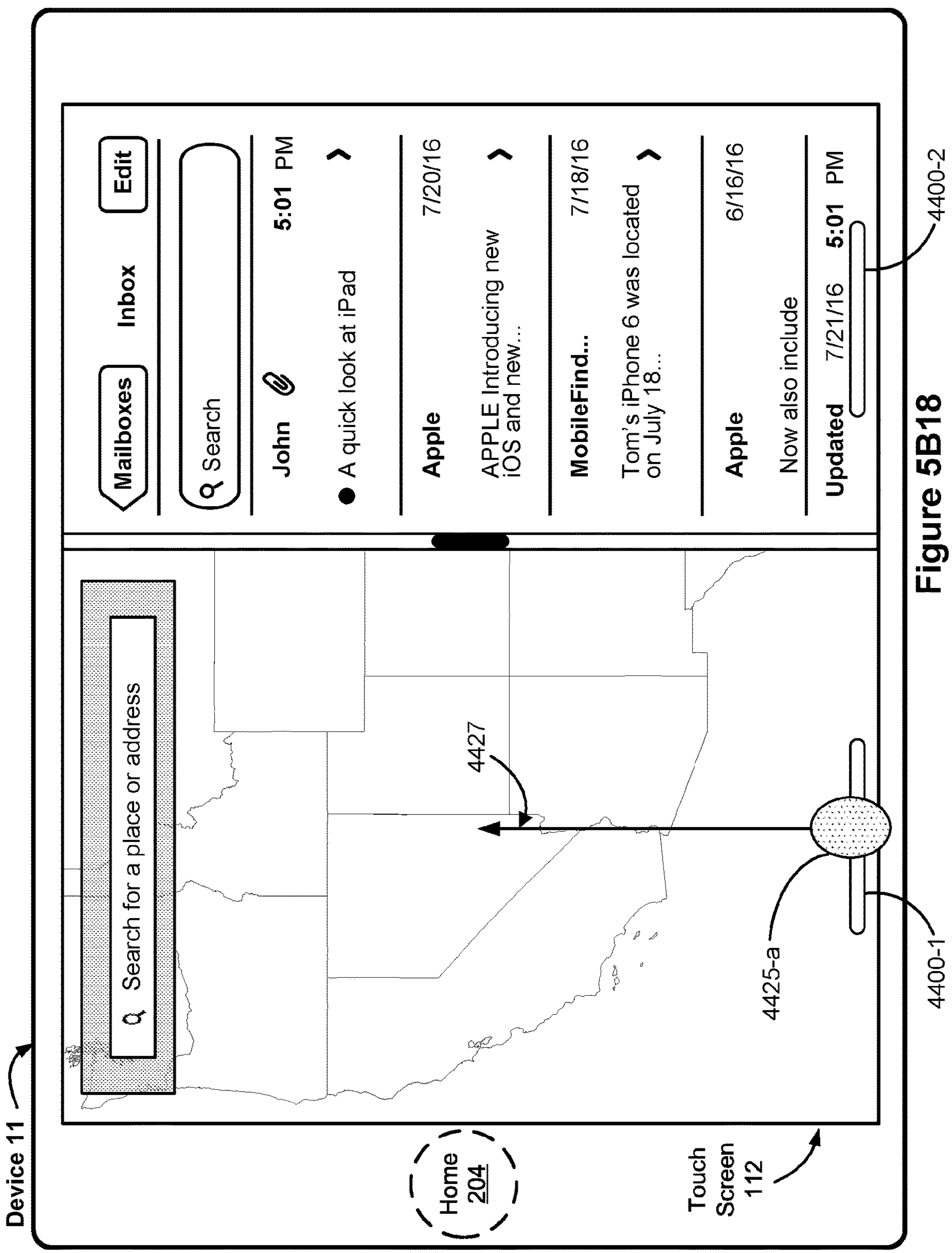
Figure 5B18

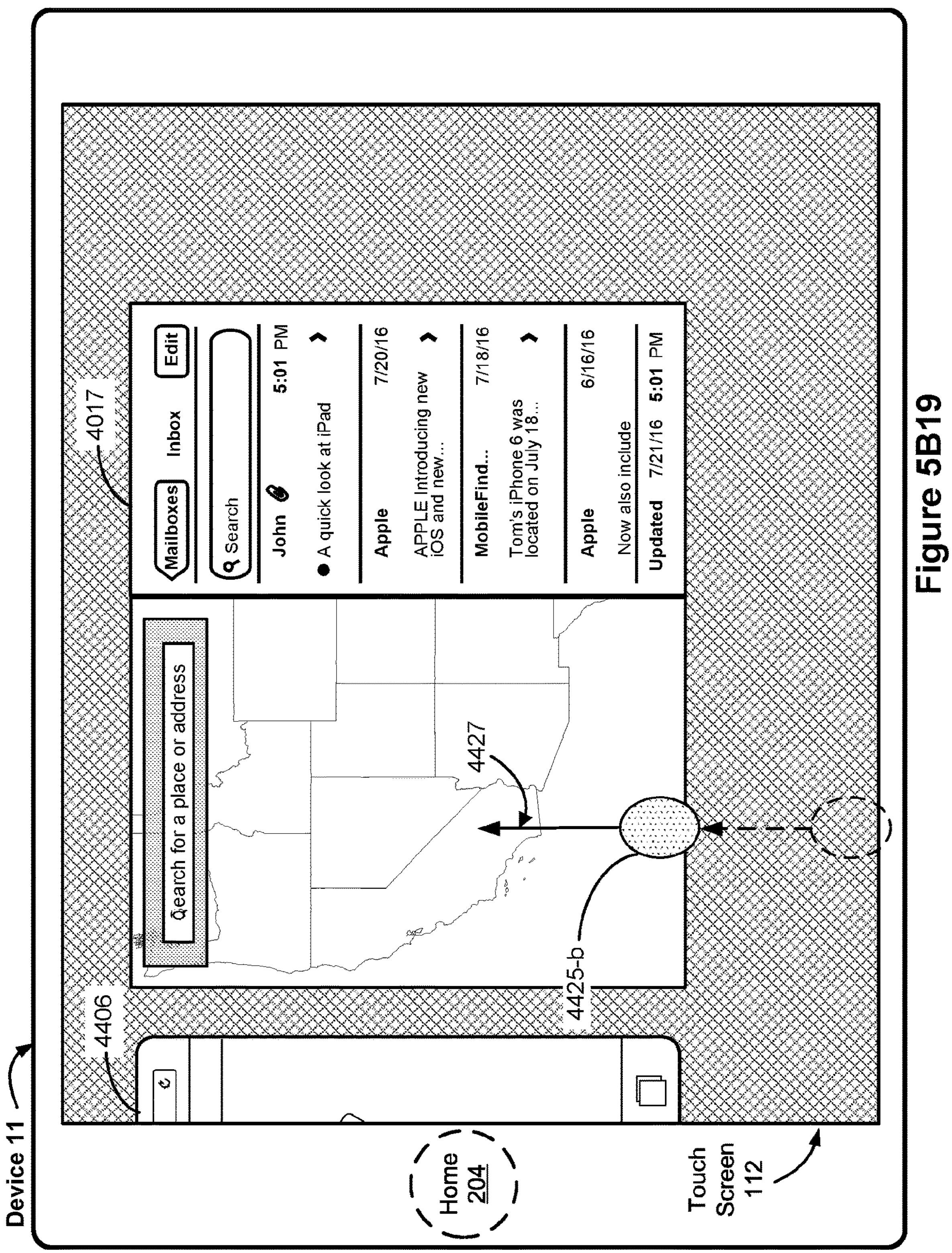
Figure 5B19

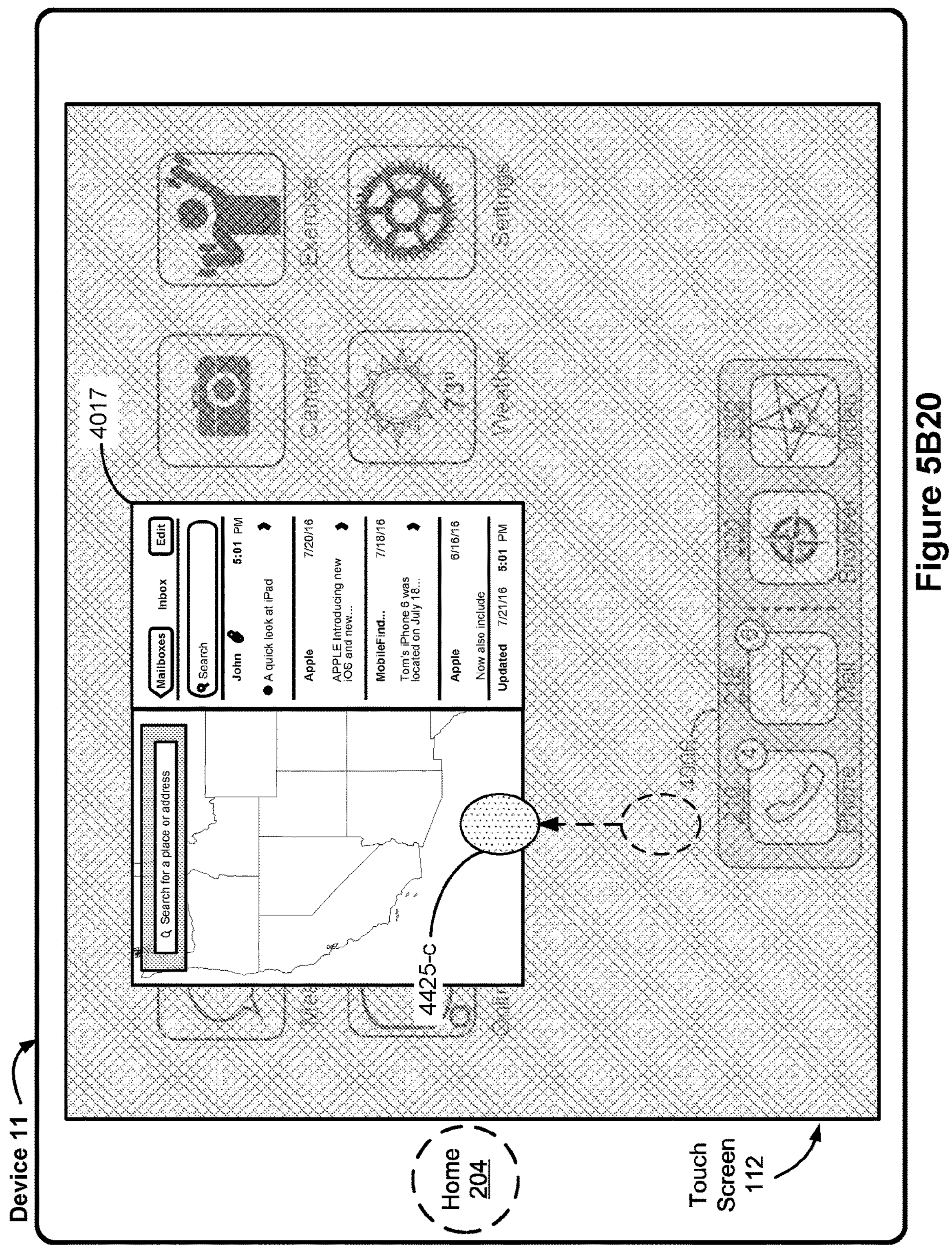
Figure 5B20

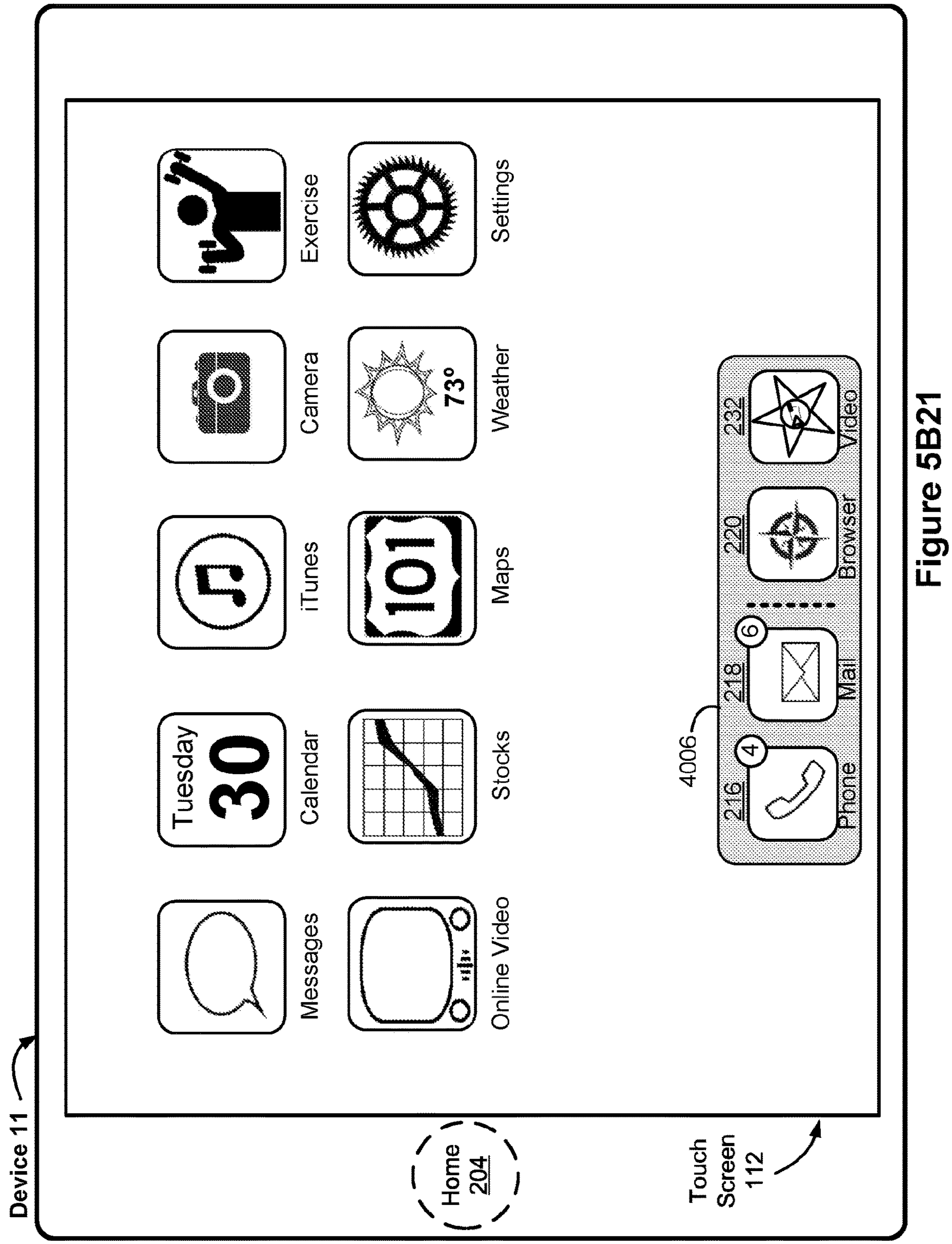
Figure 5B21

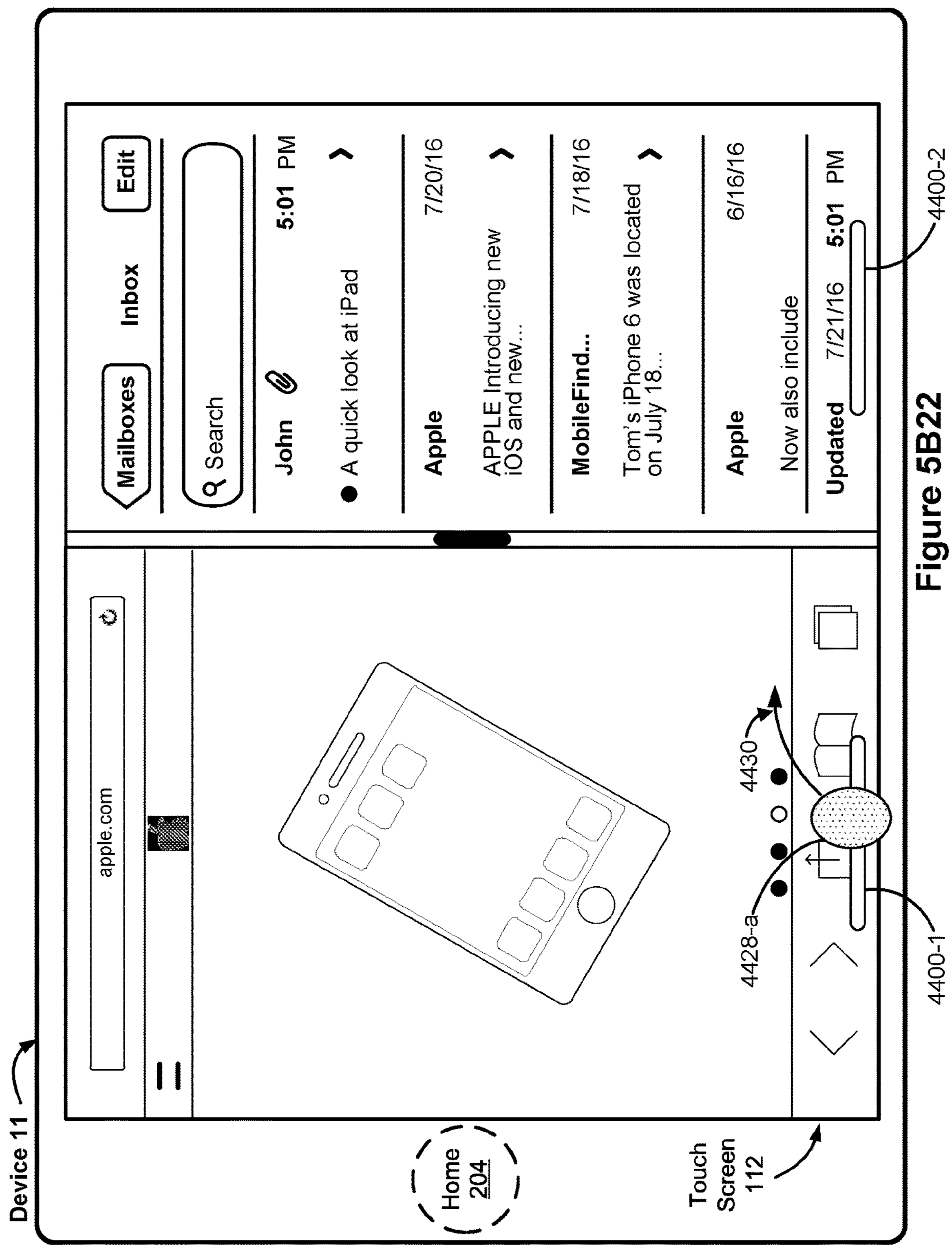
Figure 5B22

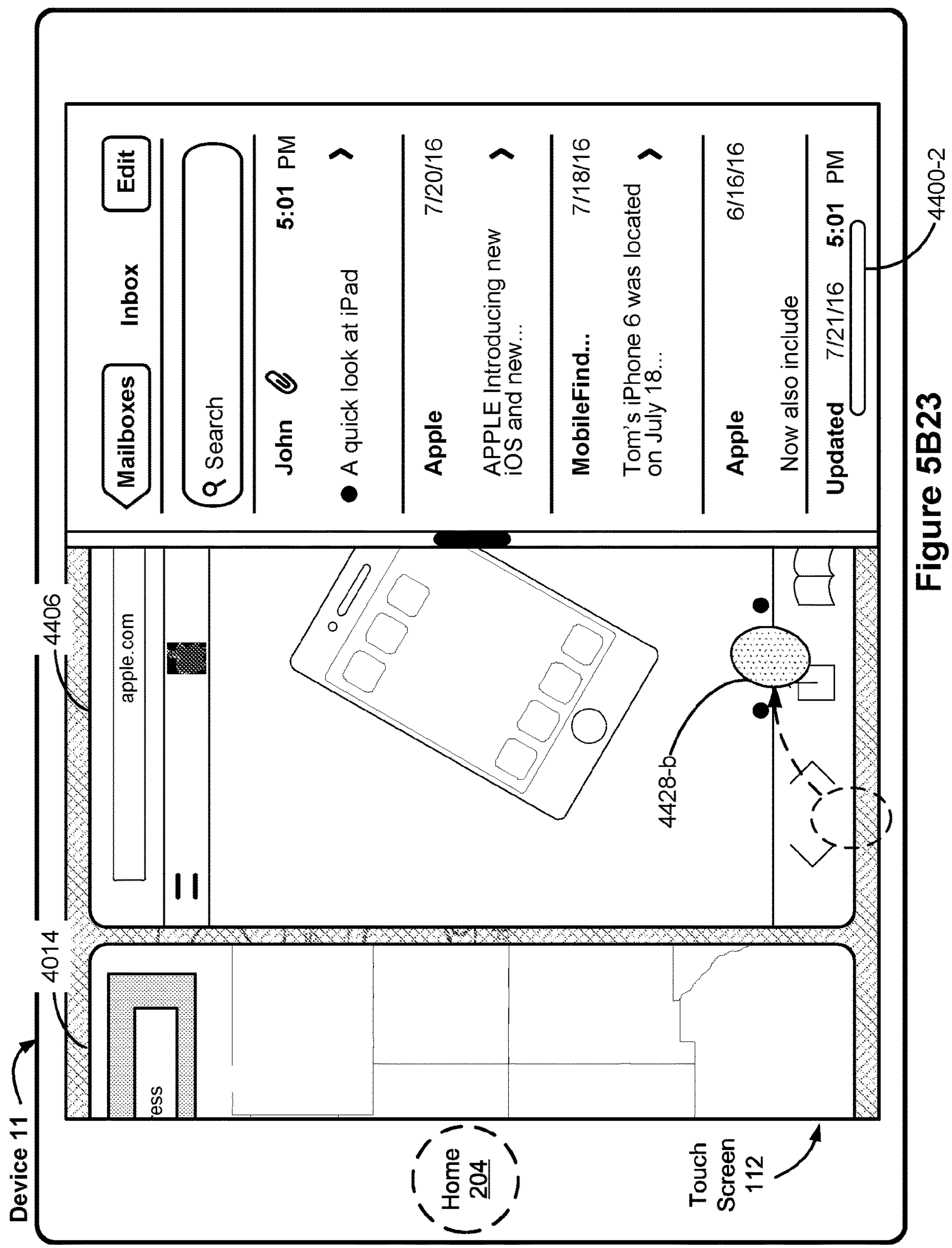
Figure 5B23

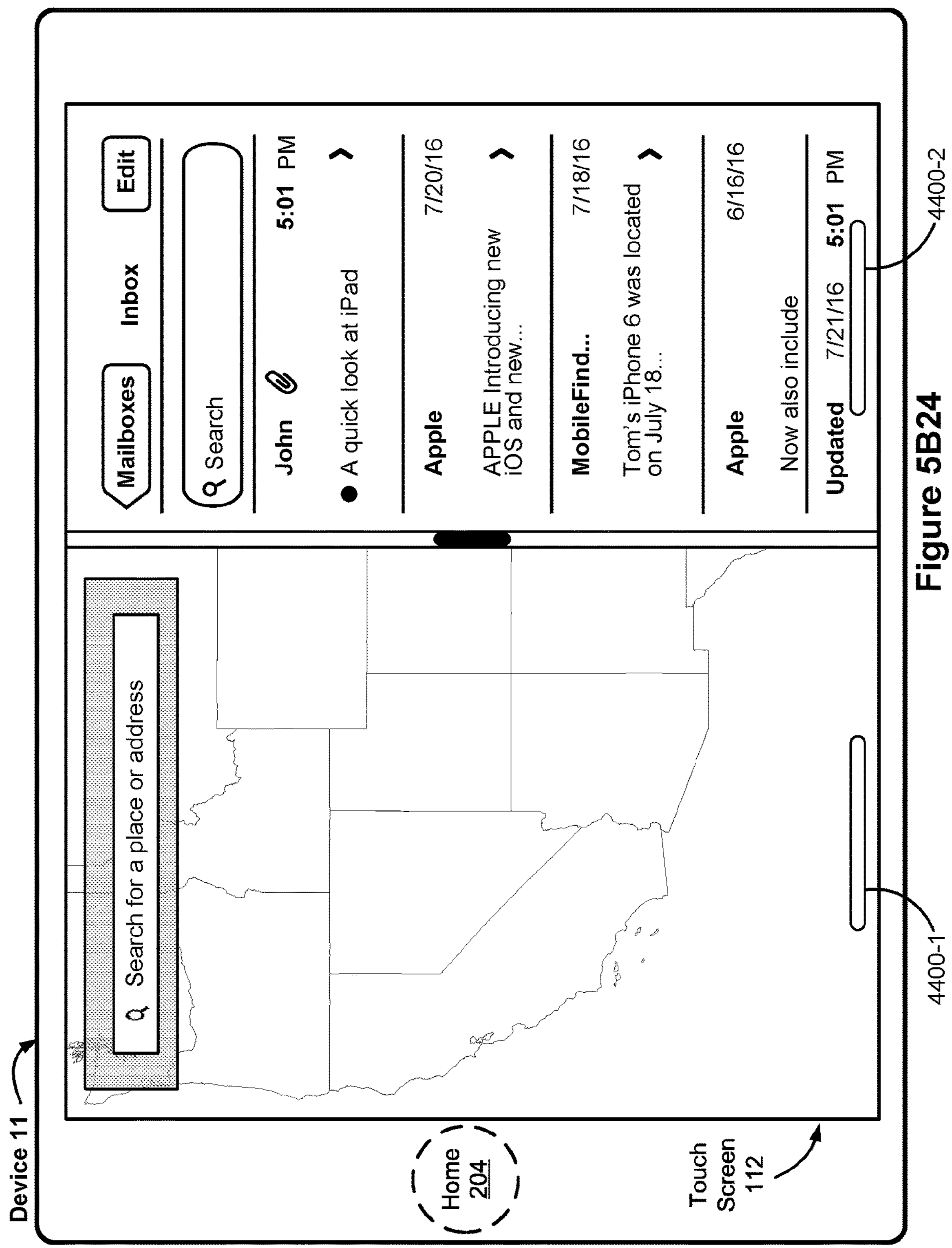
Figure 5B24

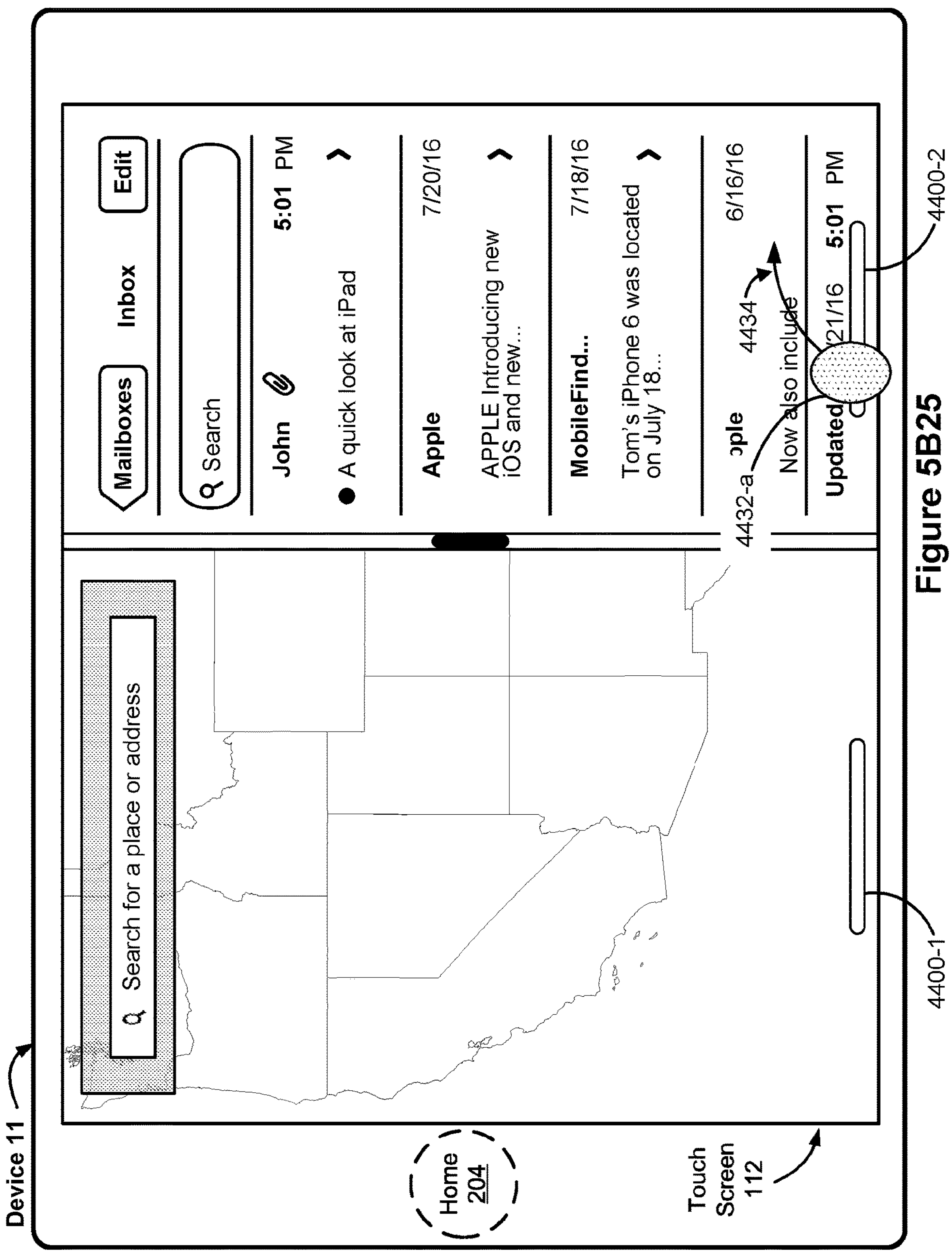
Figure 5B25

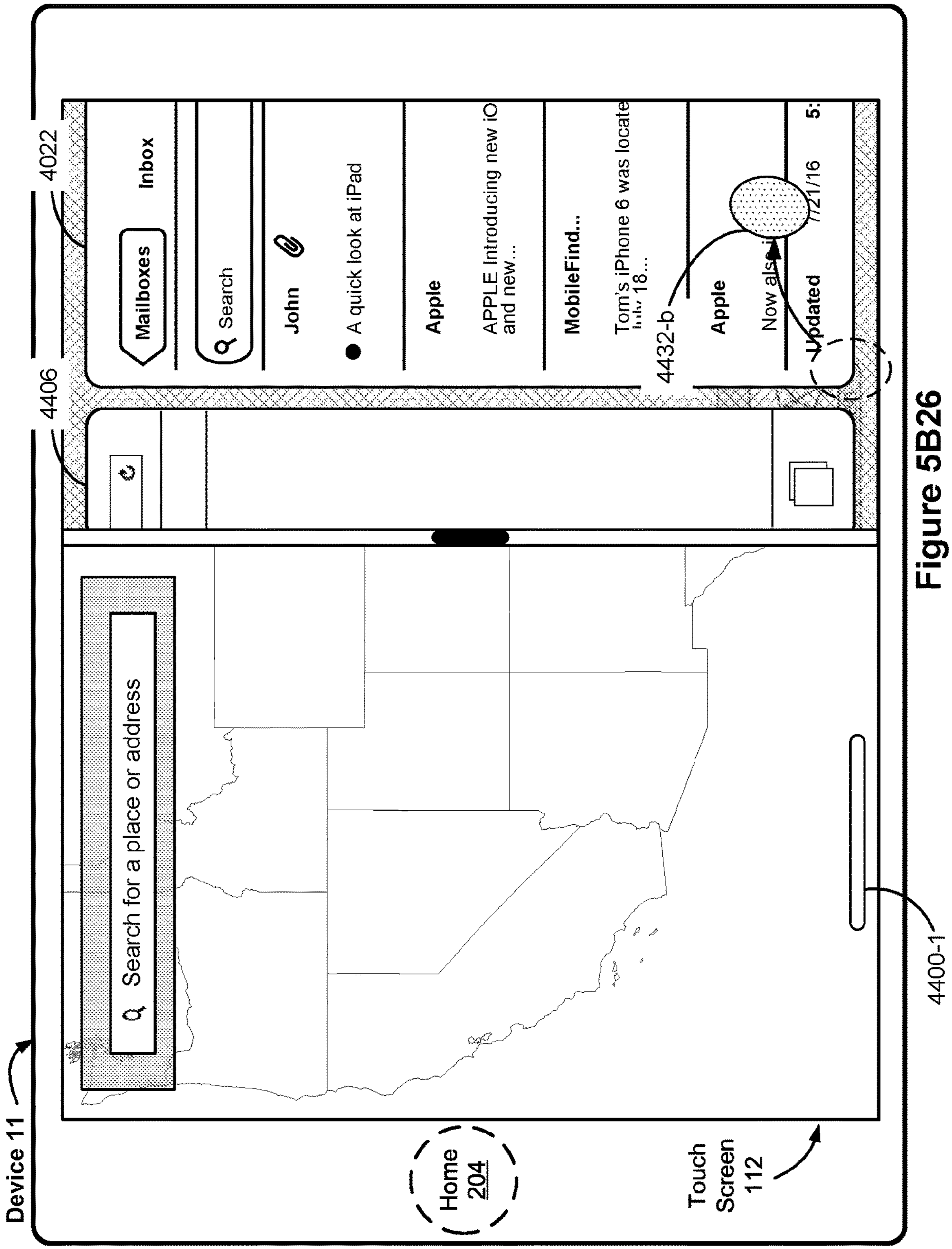
Figure 5B26

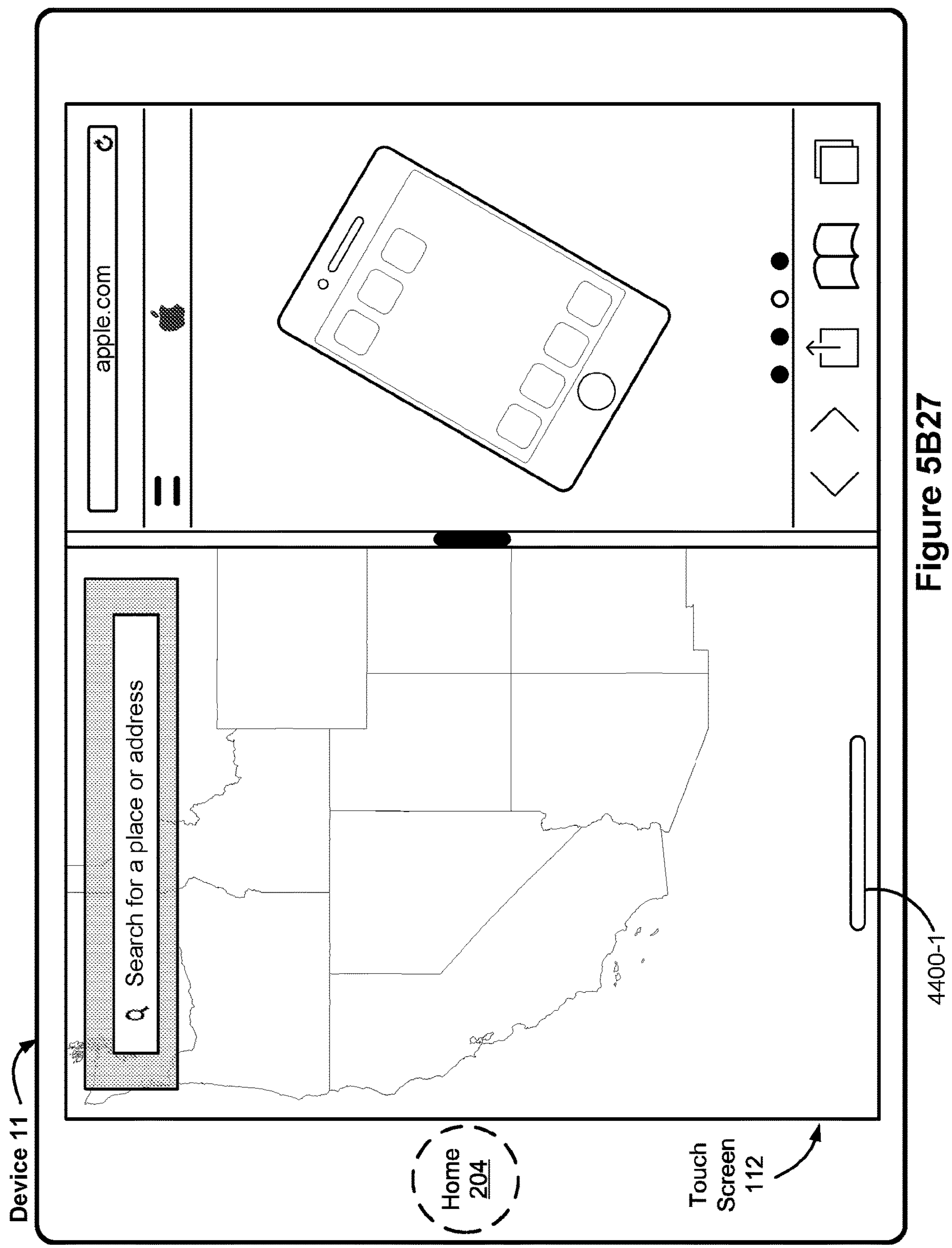
Figure 5B27

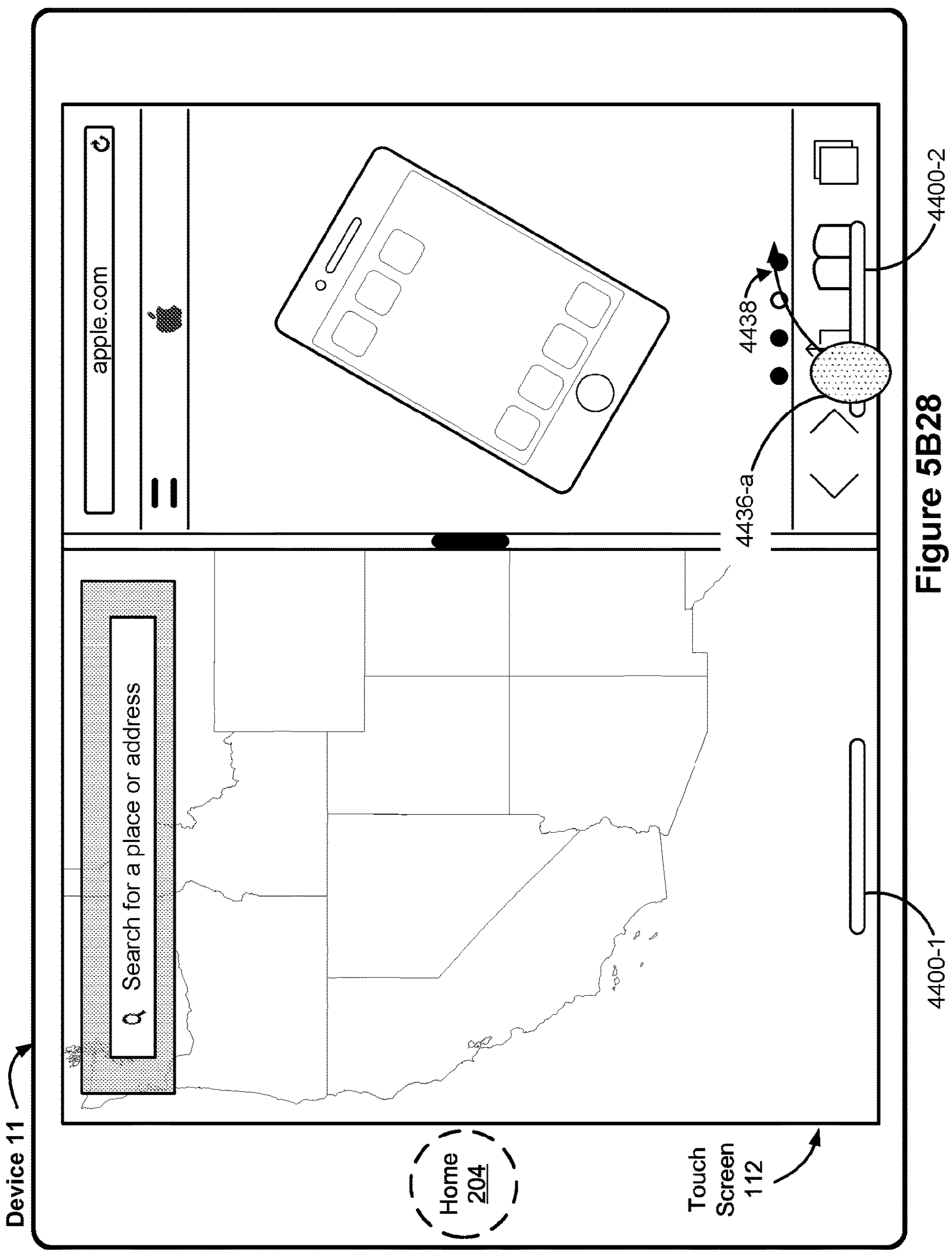
Figure 5B28

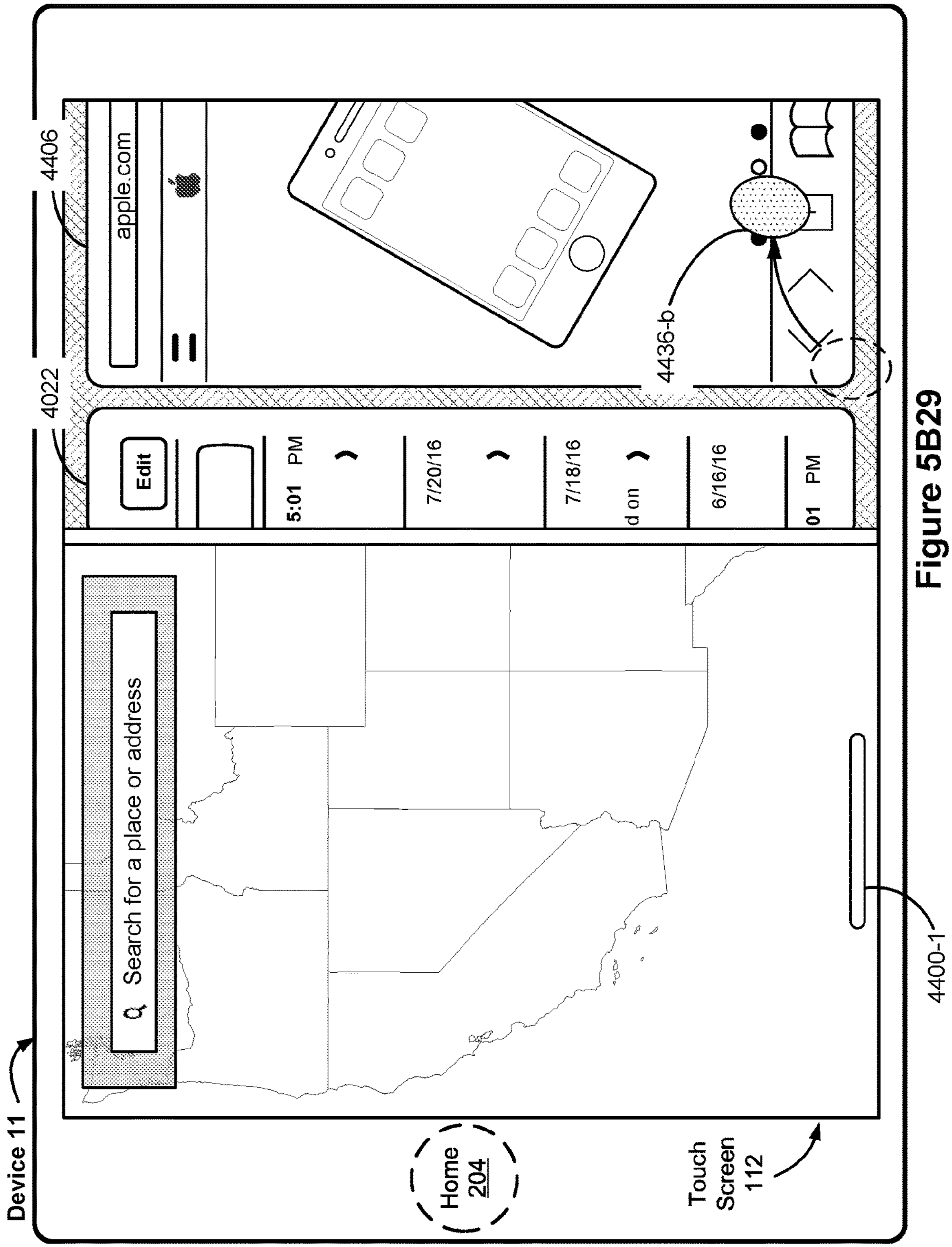
Figure 5B29

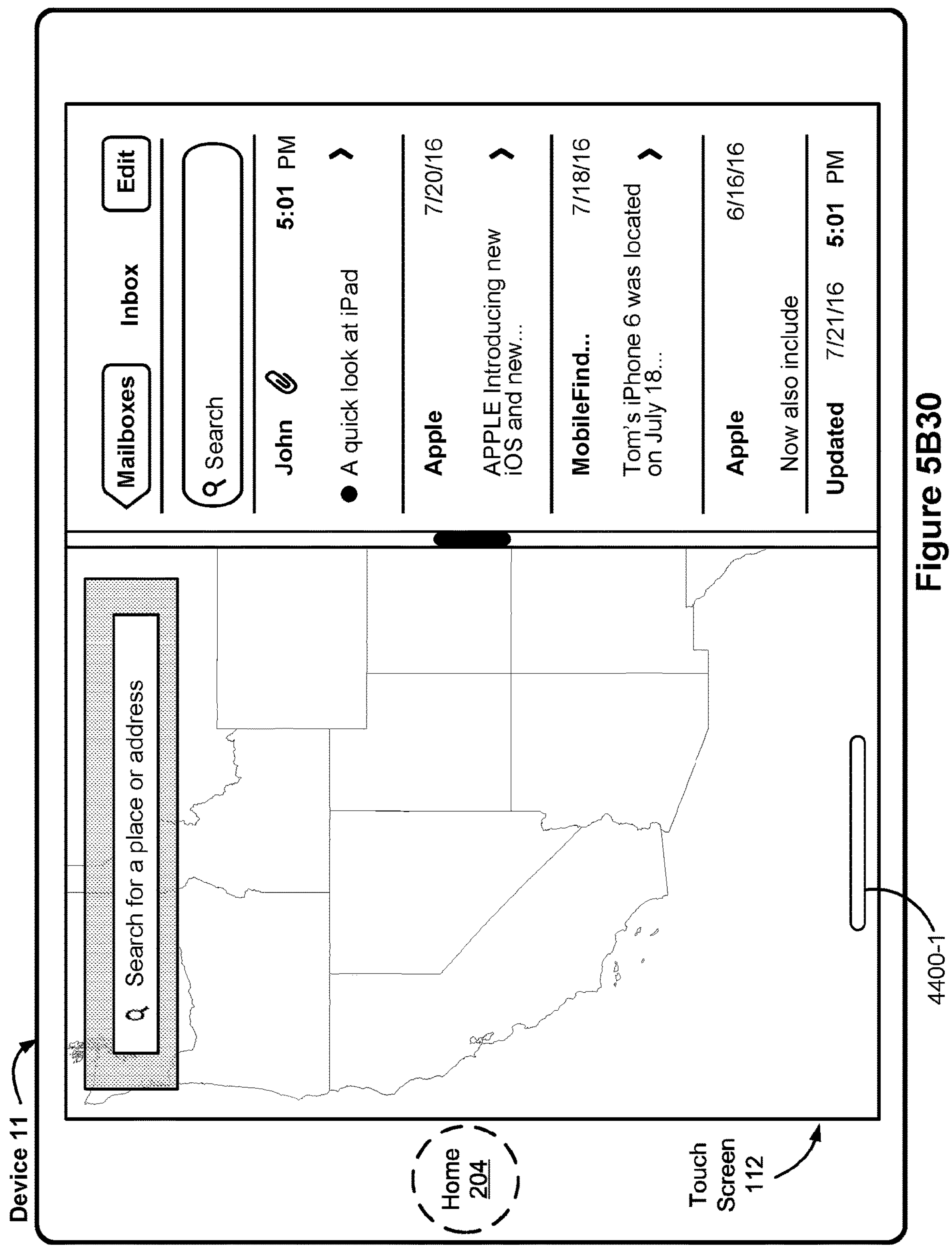
Figure 5B30

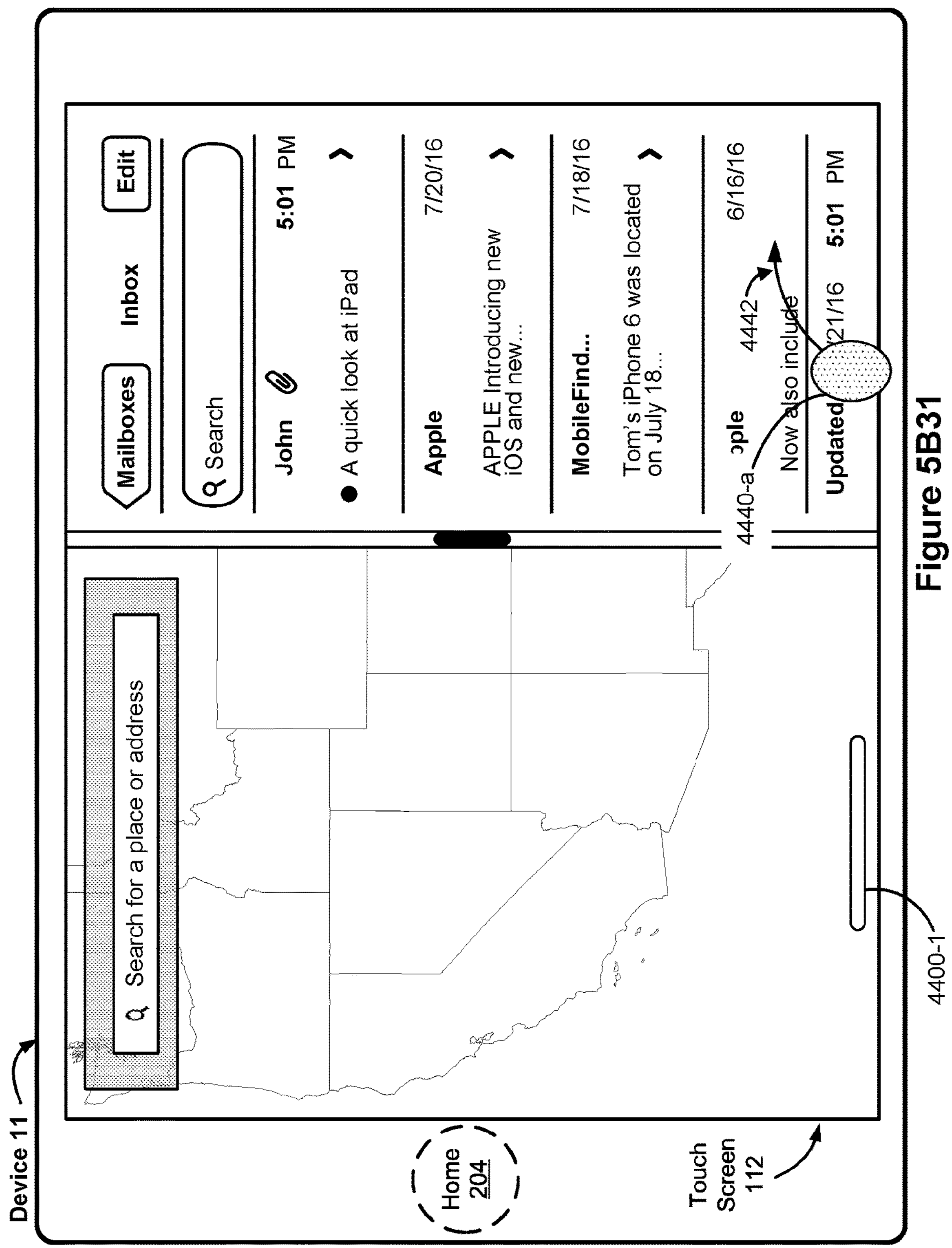
Figure 5B31

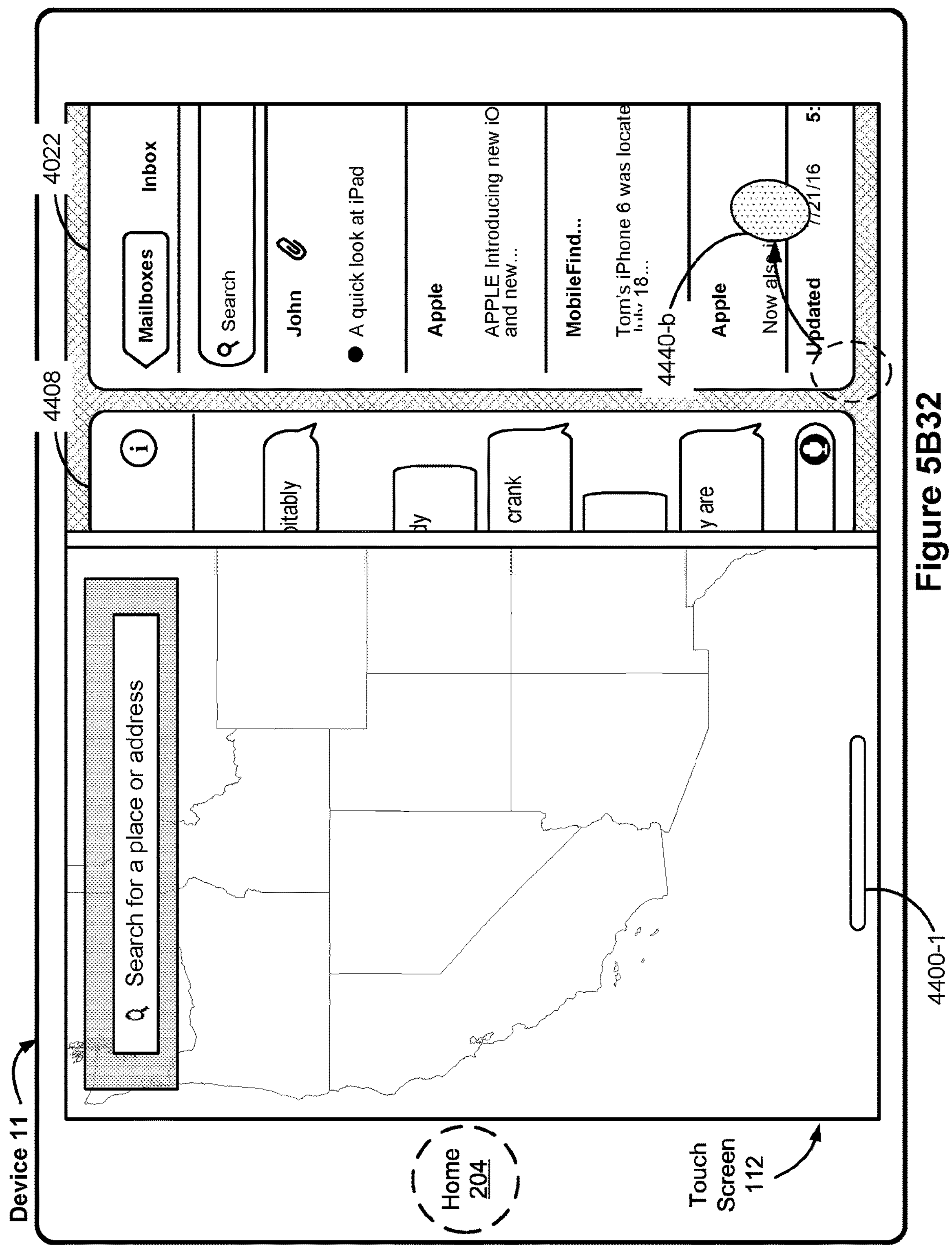
Figure 5B32

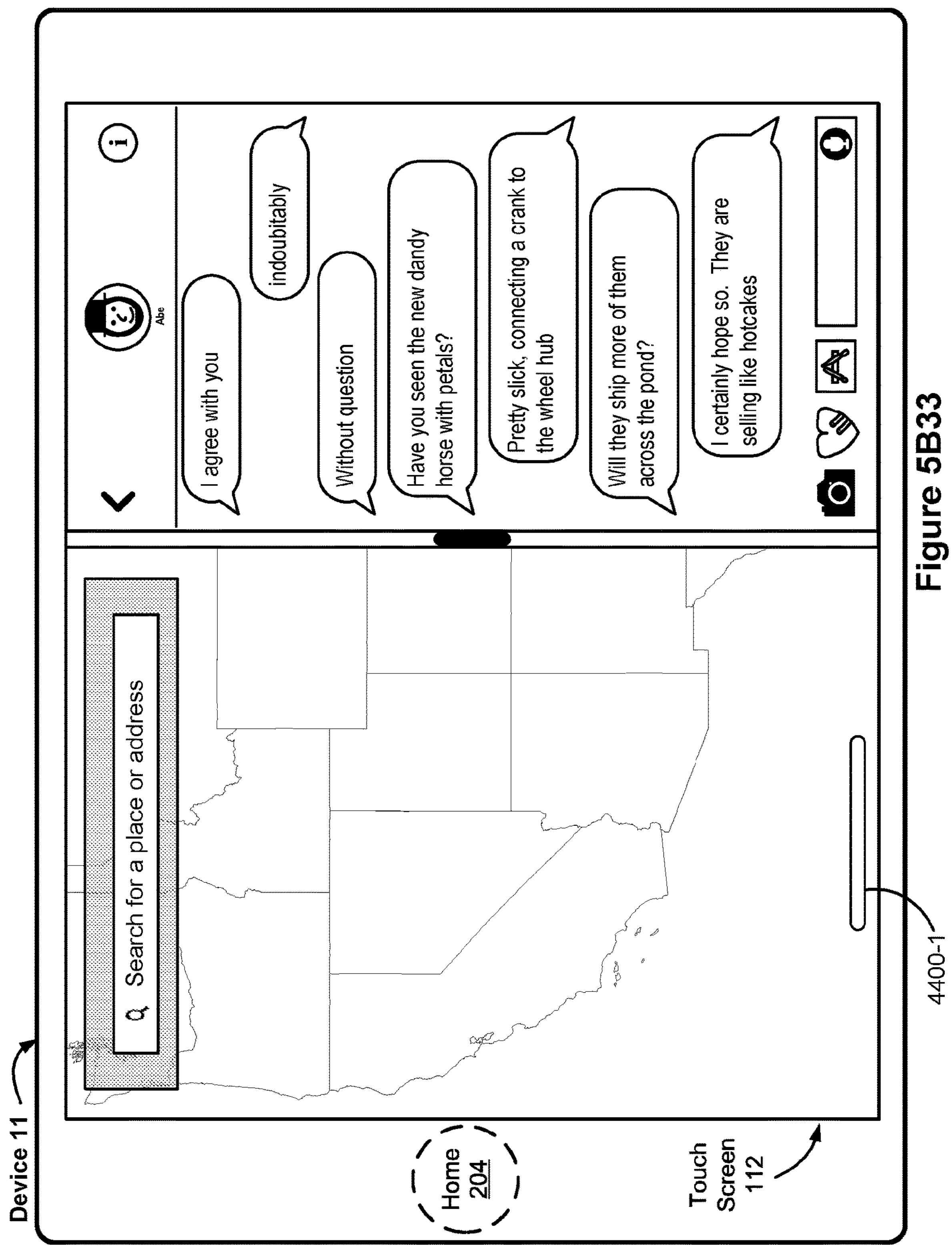
Figure 5B33

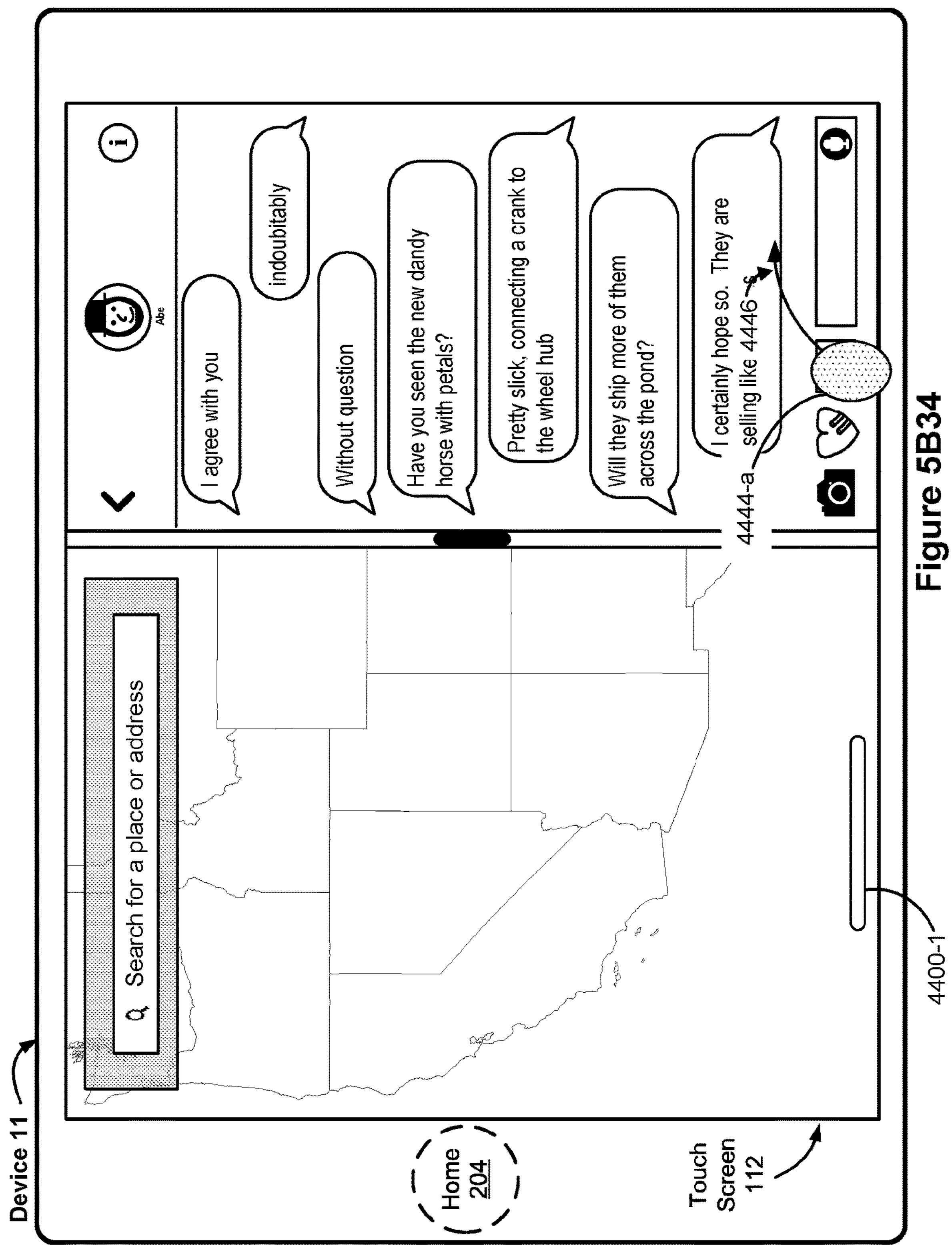
Figure 5B34

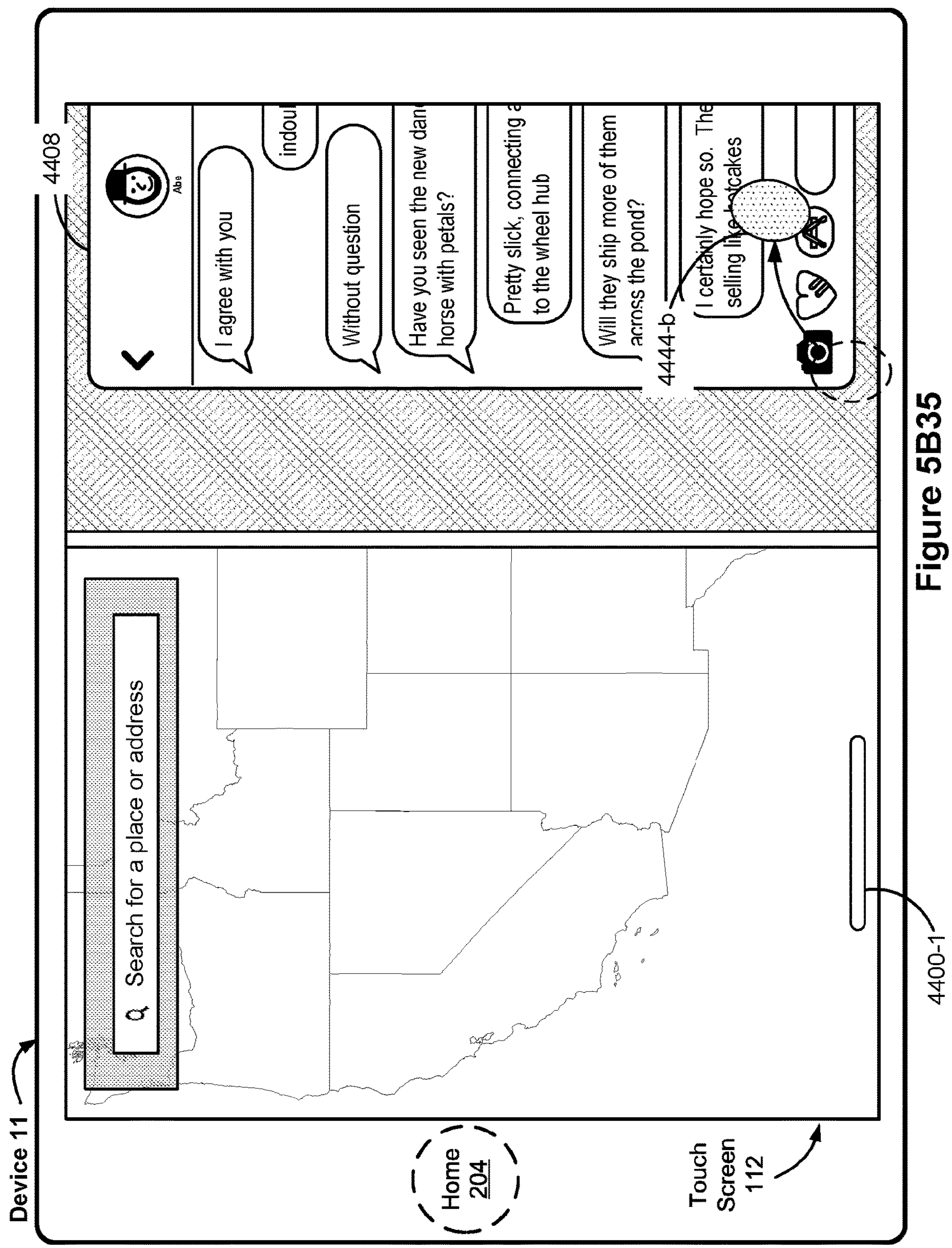
Figure 5B35

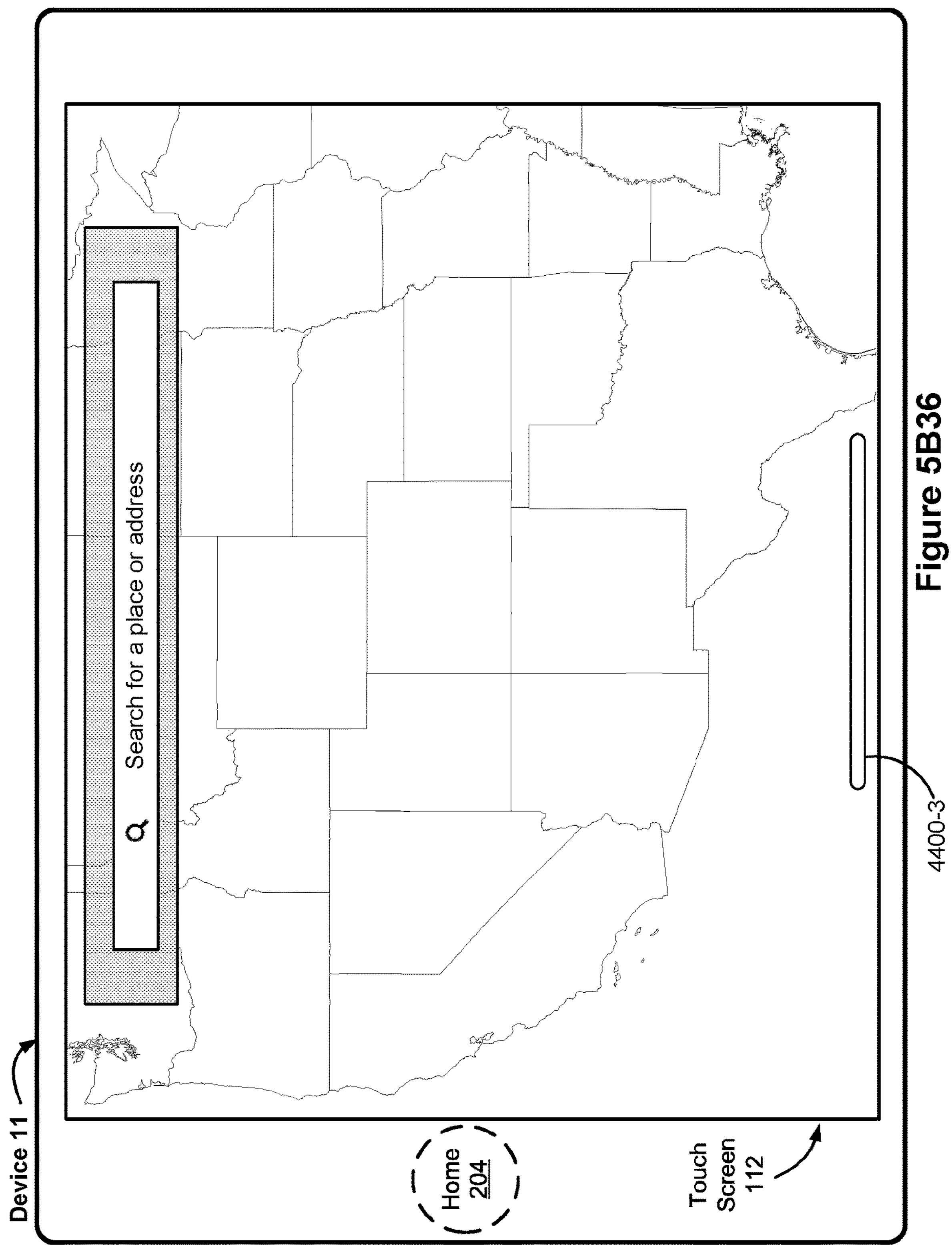
Figure 5B36

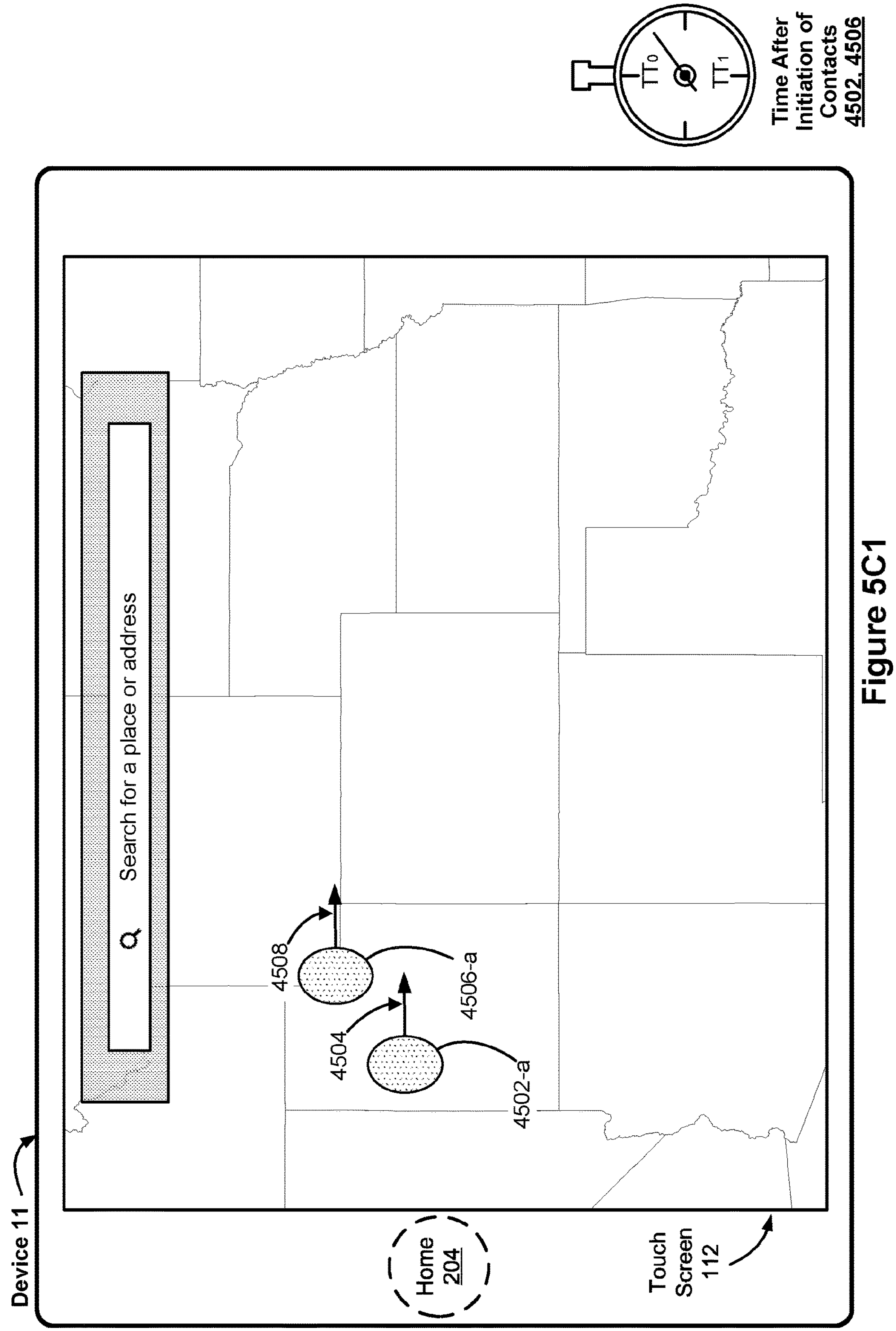
Figure 5C1

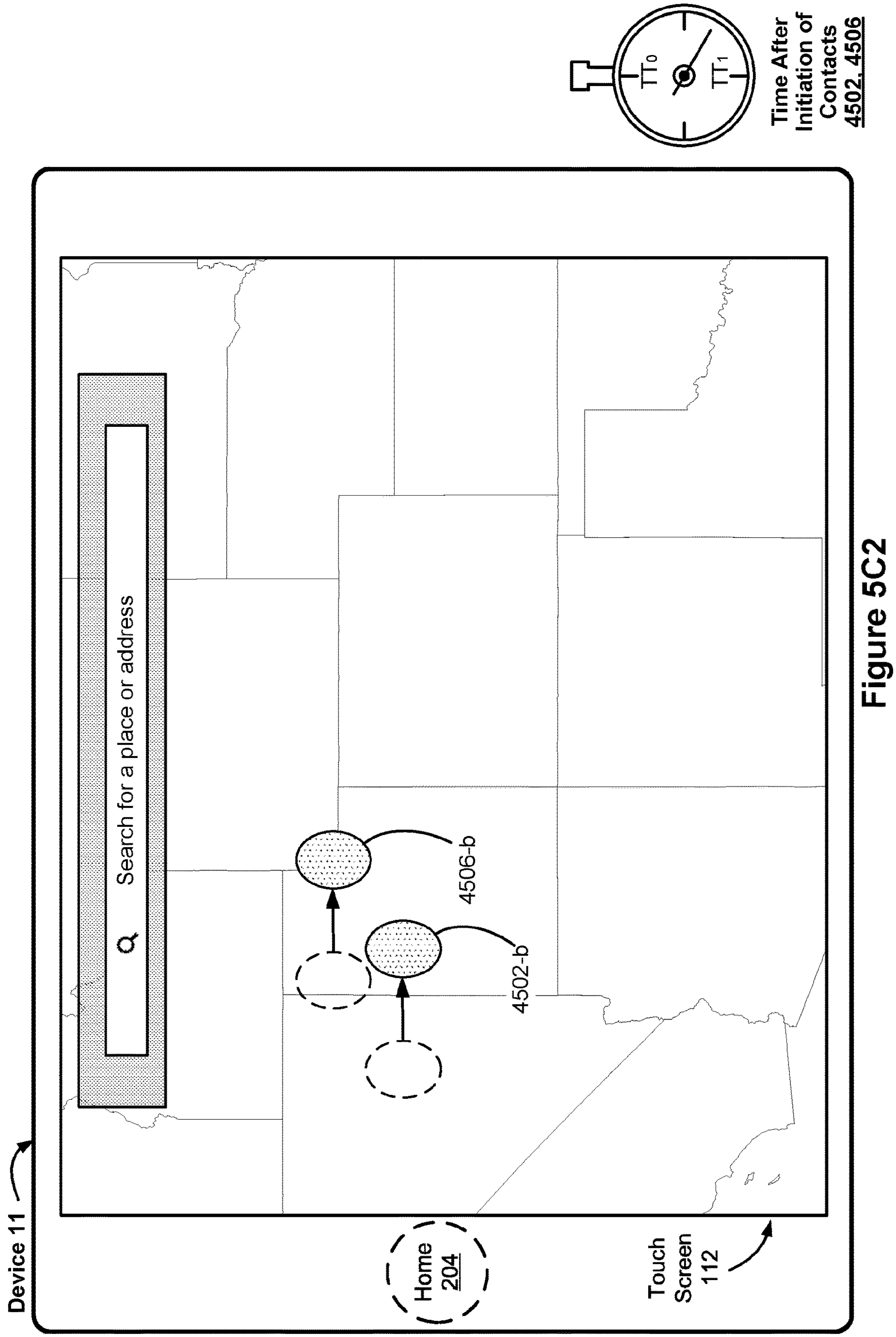
Figure 5C2

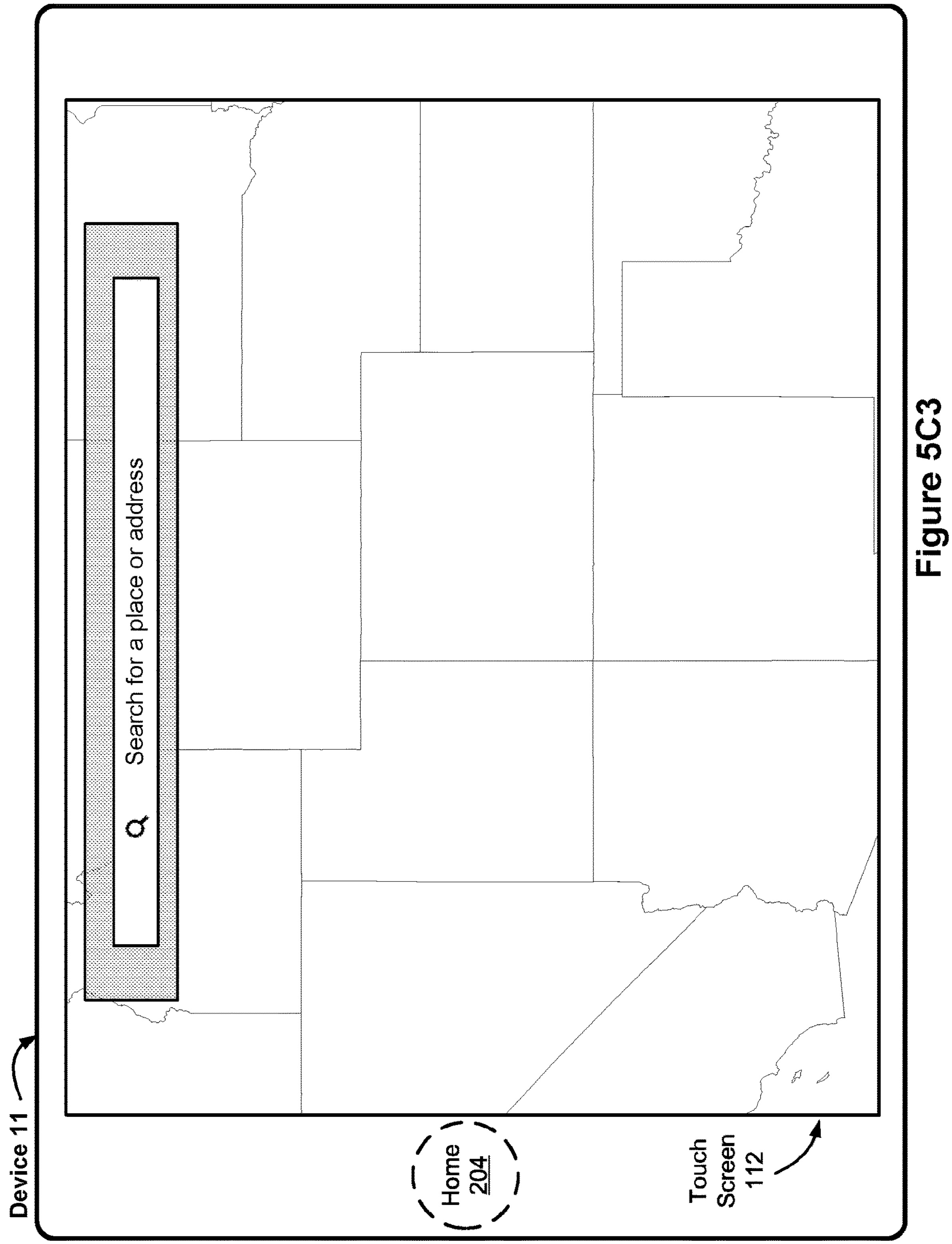
Figure 5C3

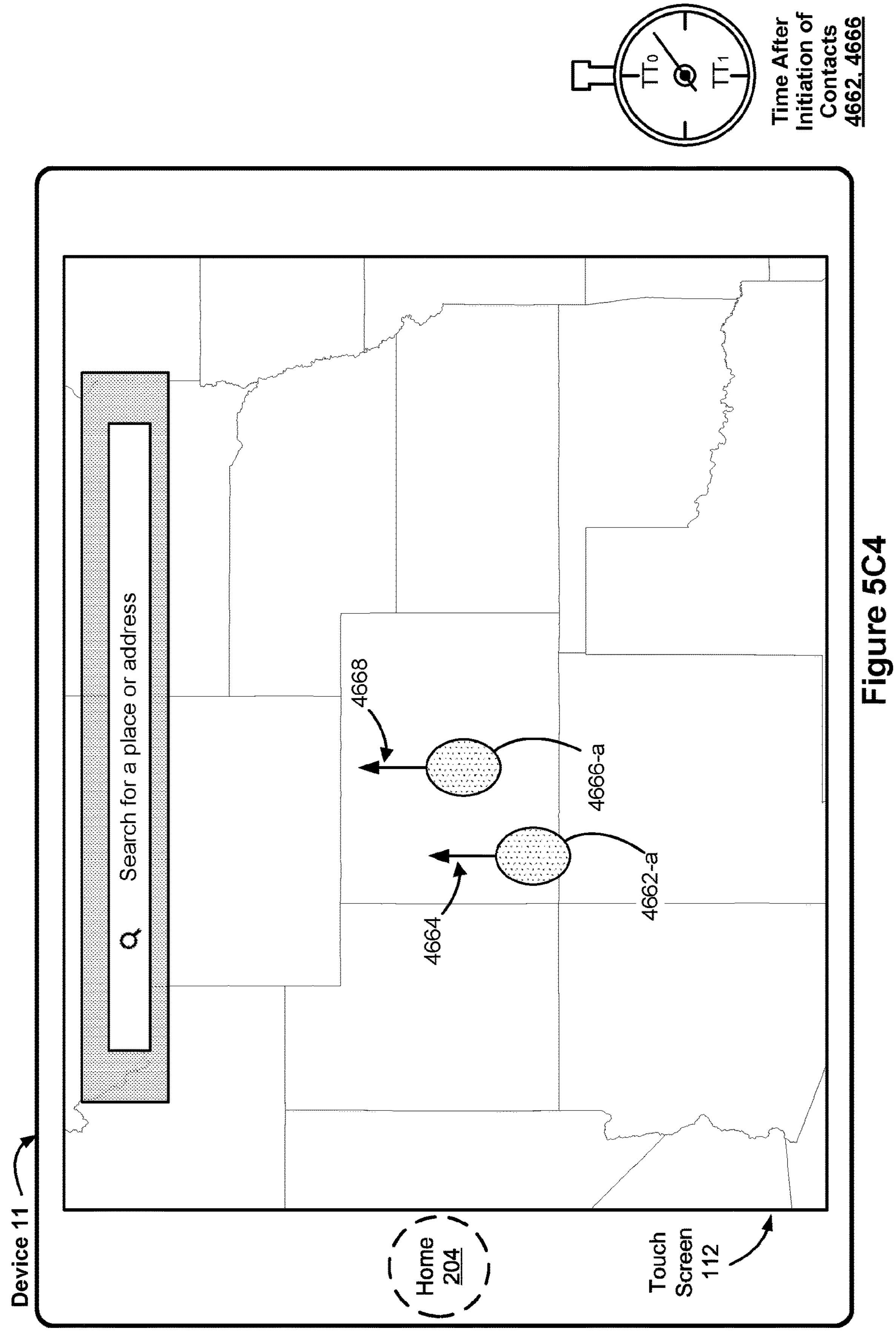
Figure 5C4

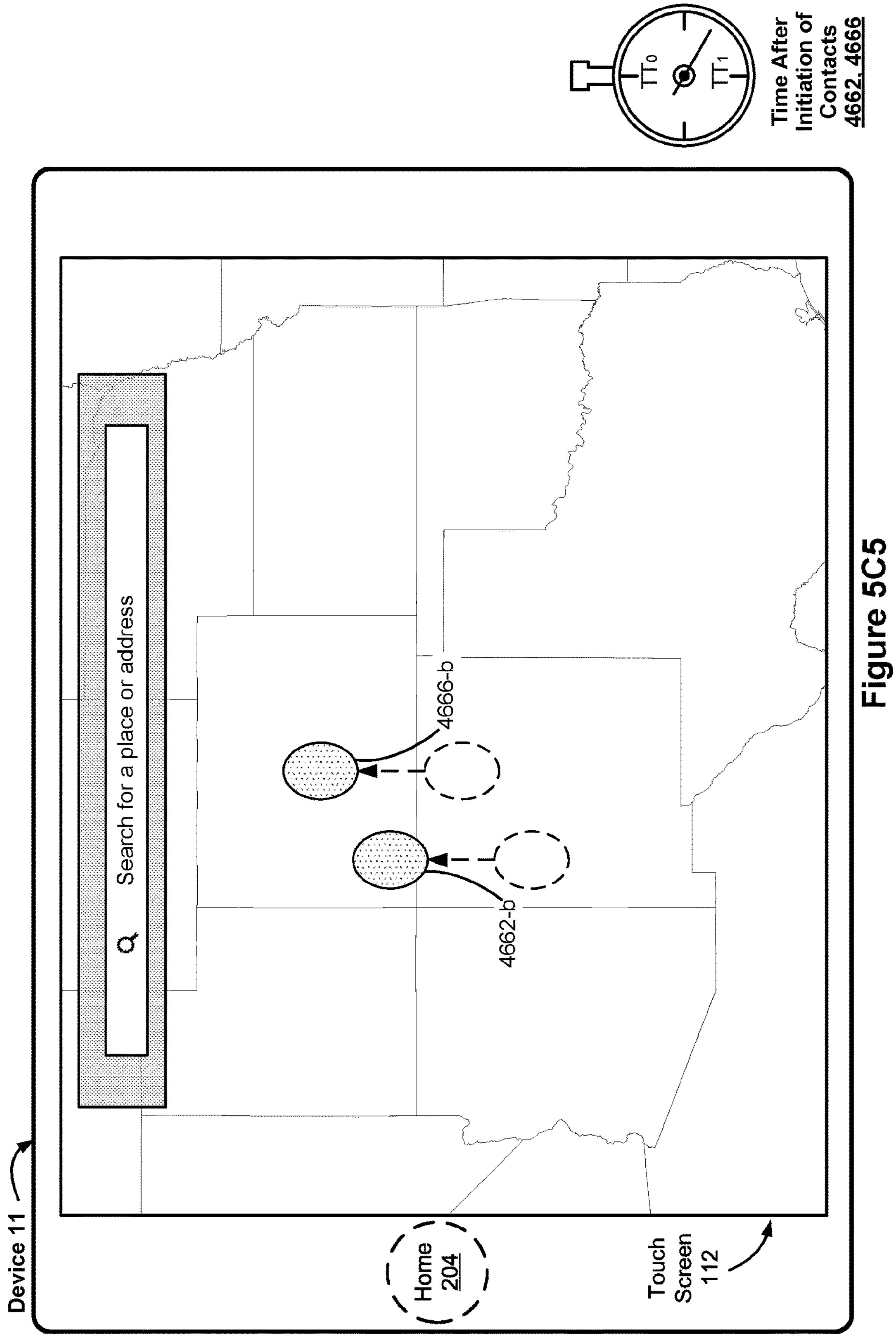
Figure 5C5

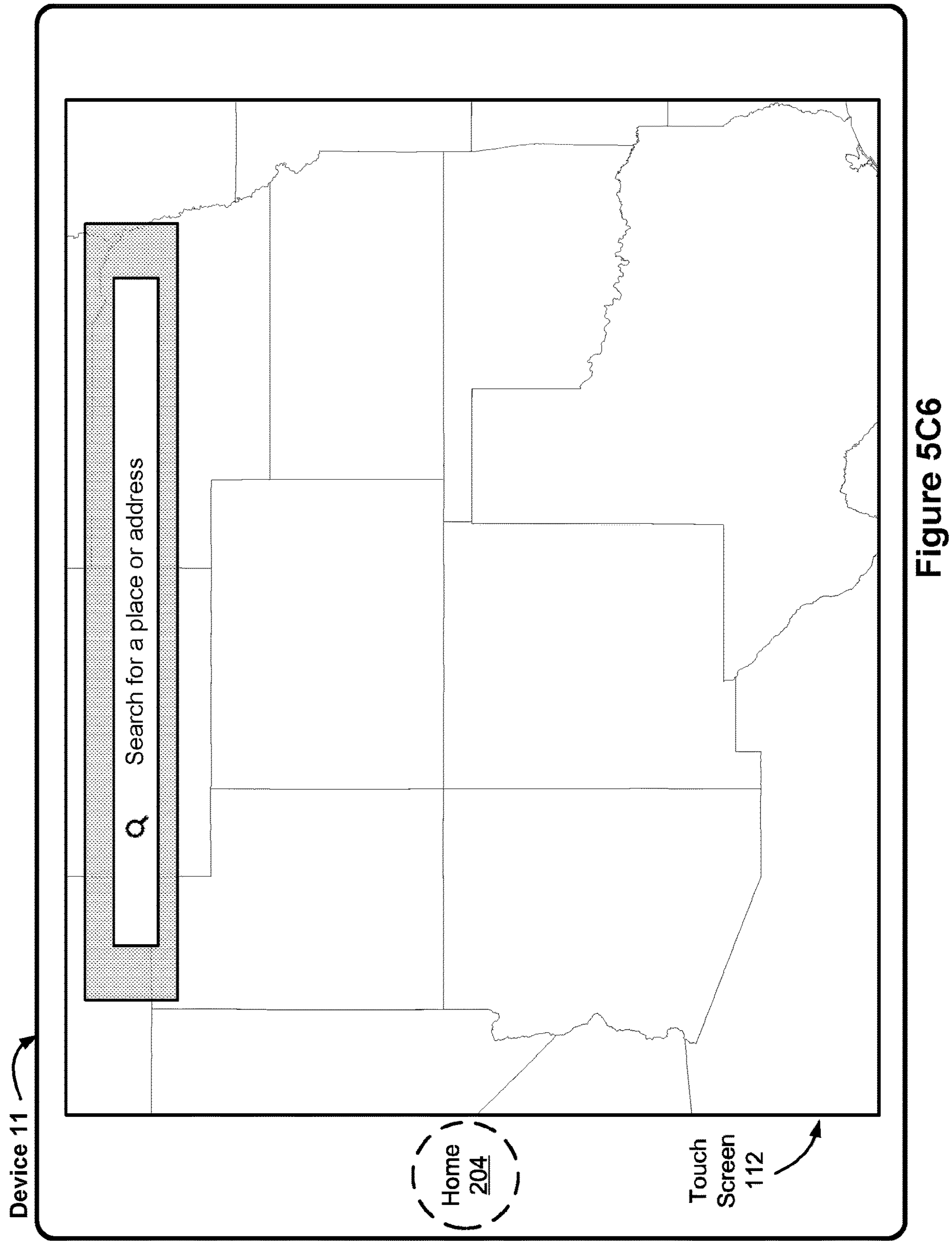
Figure 5C6

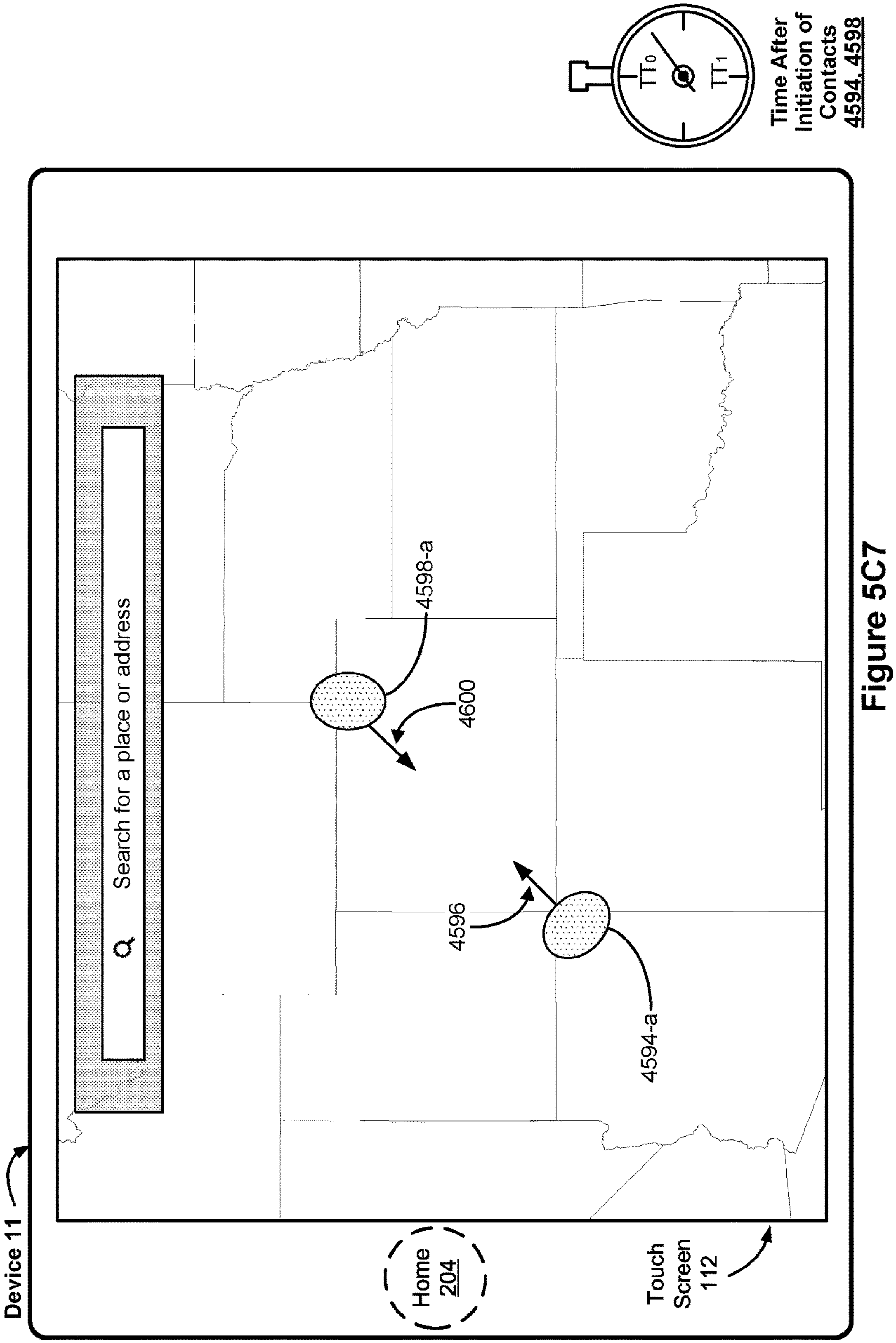
Figure 5C7

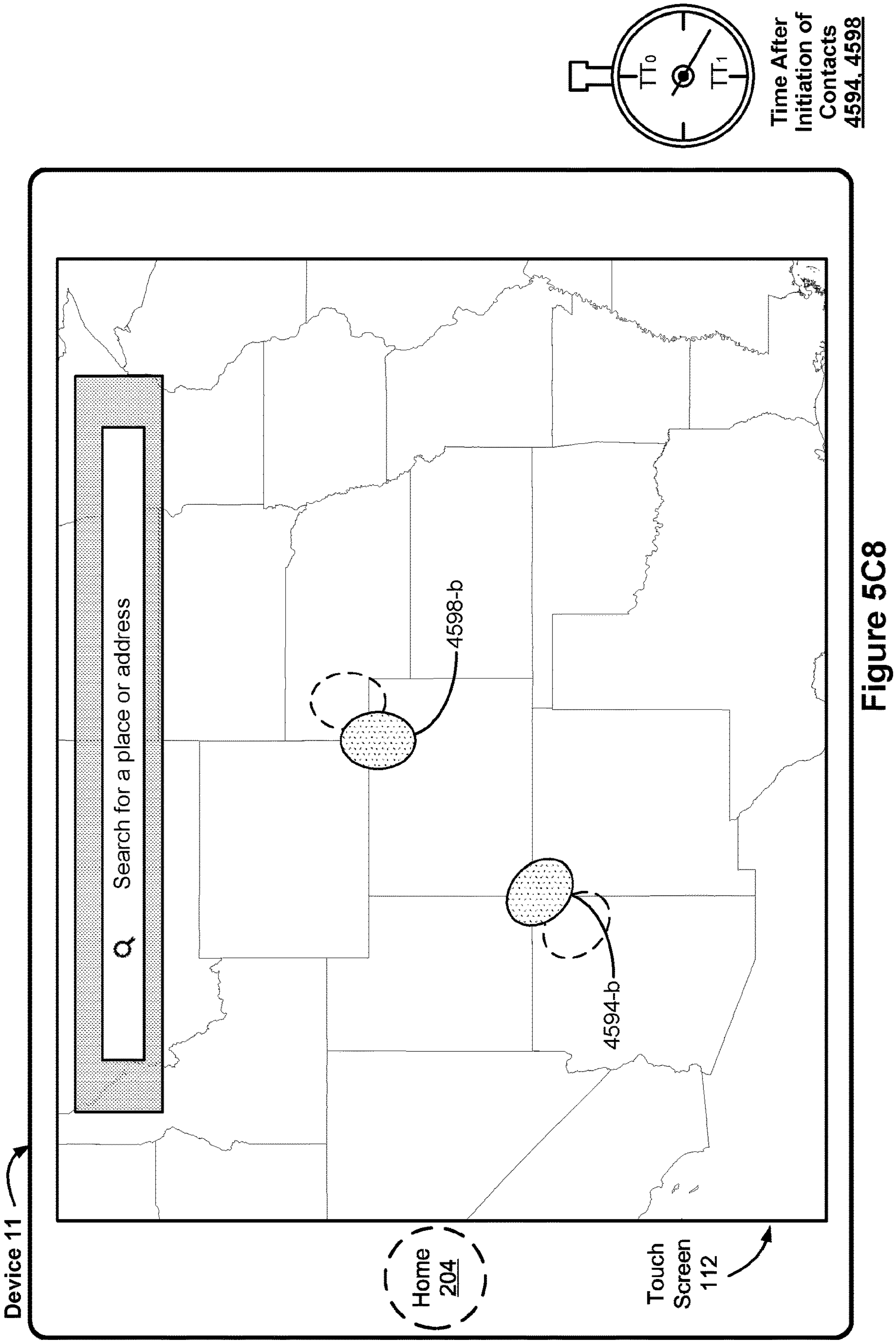
Figure 5C8

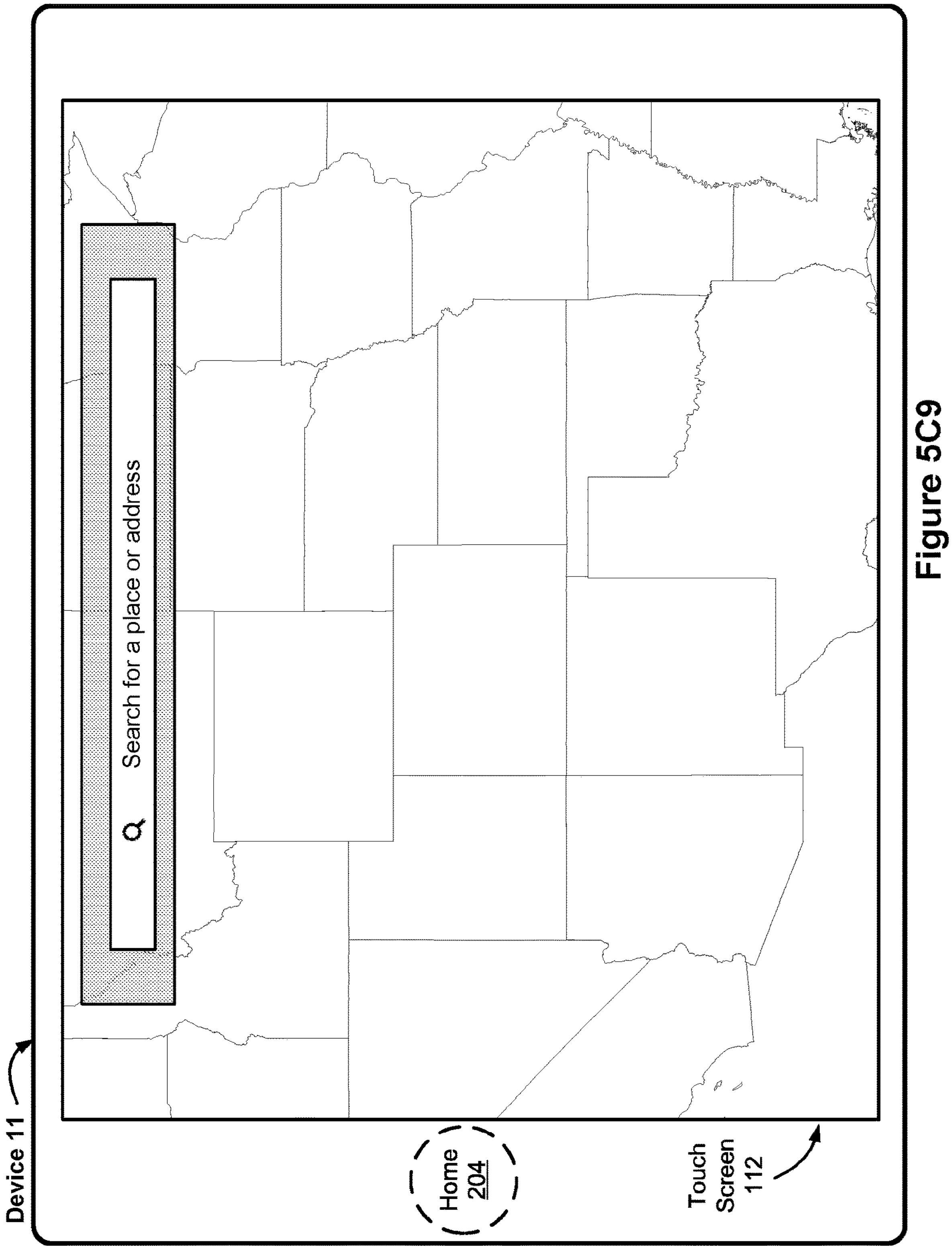
Figure 5C9

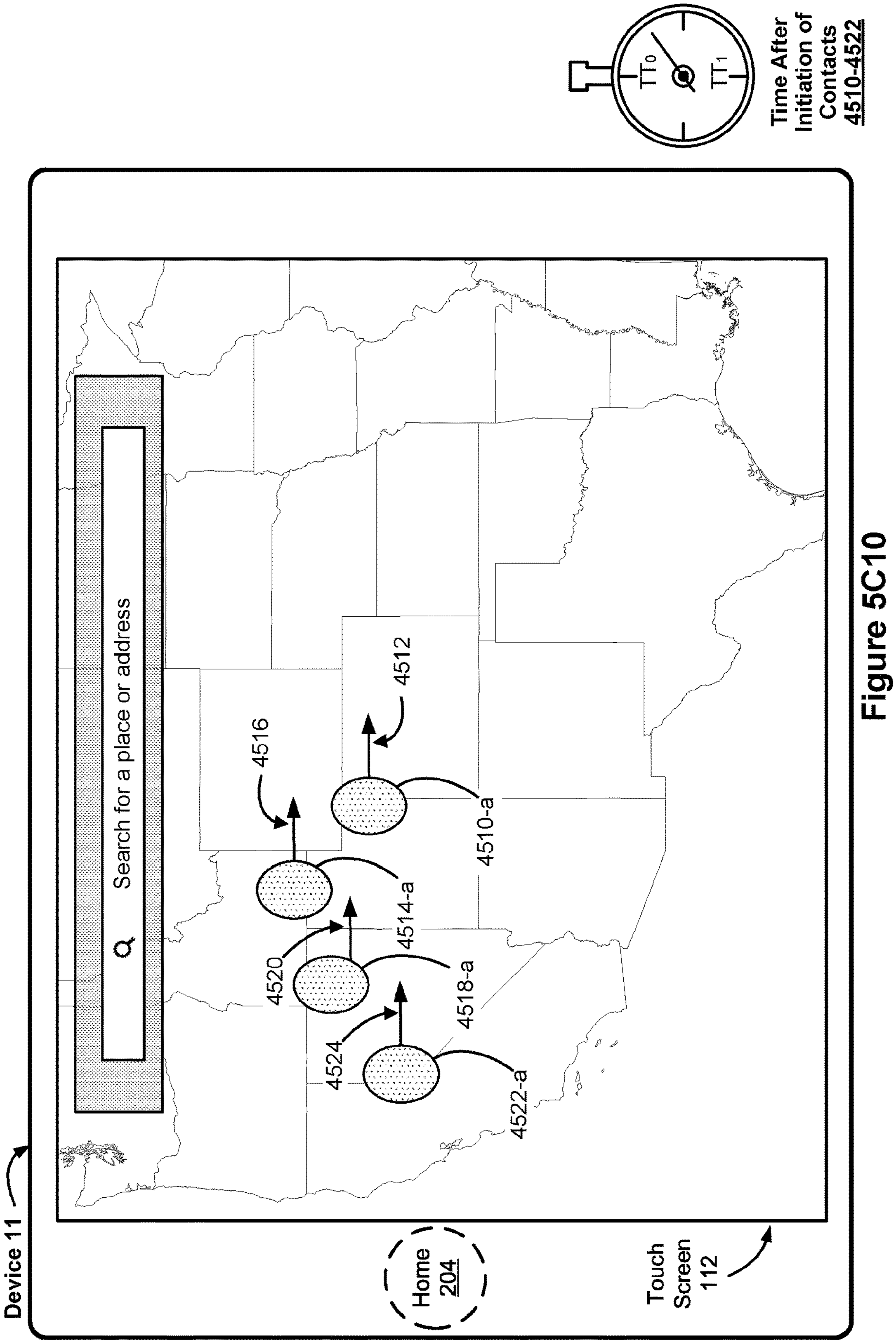
Figure 5C10

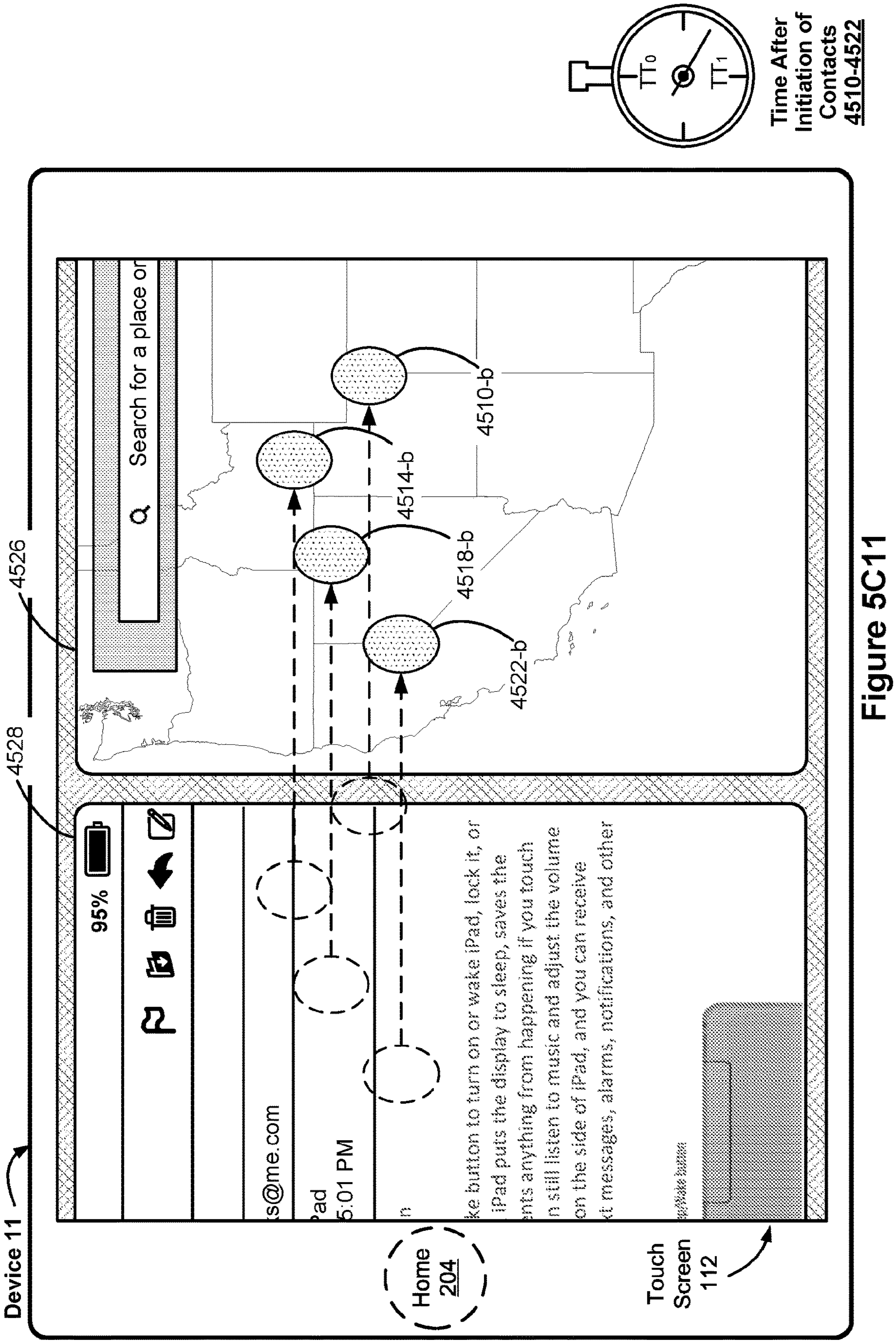
Figure 5C11

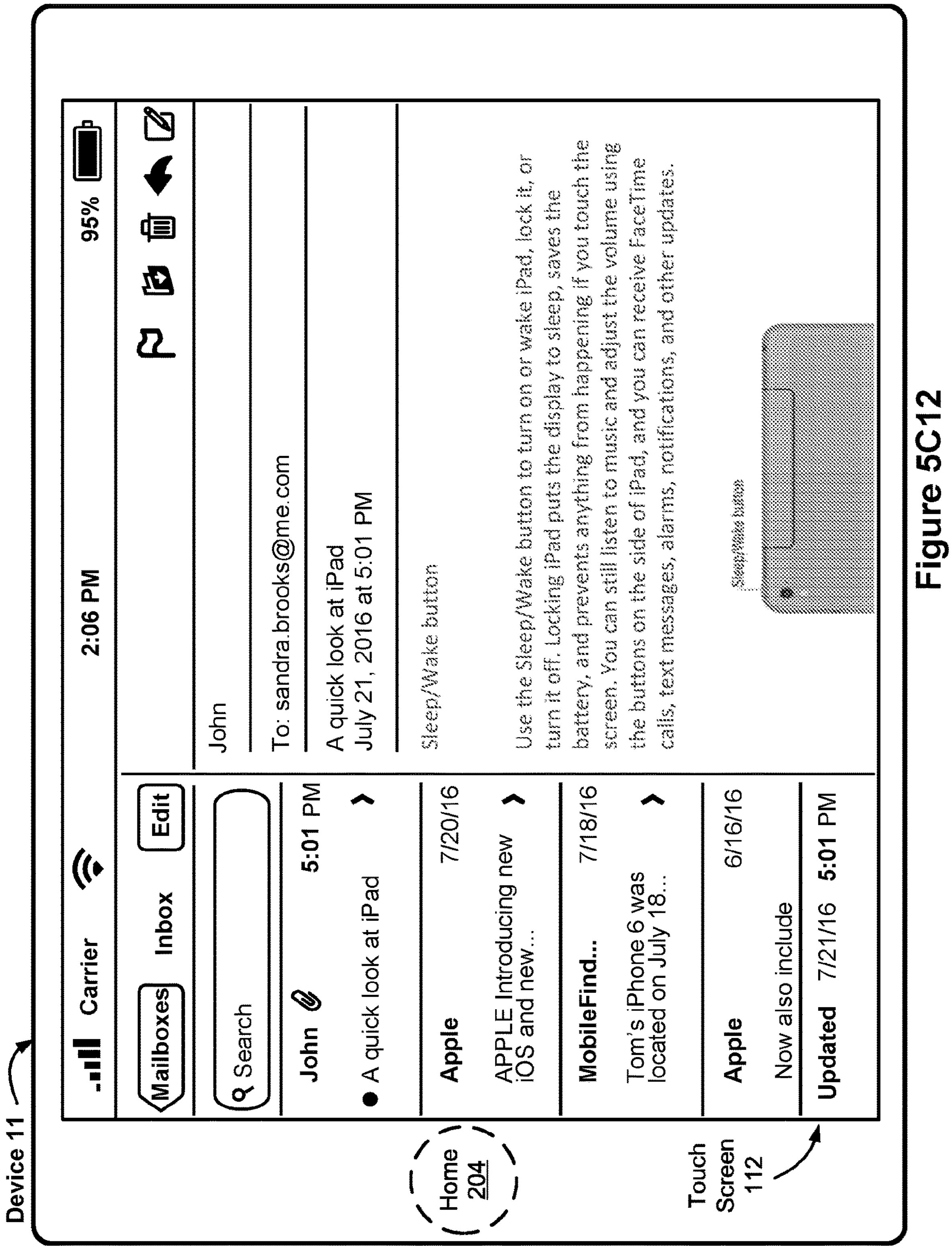
Figure 5C12

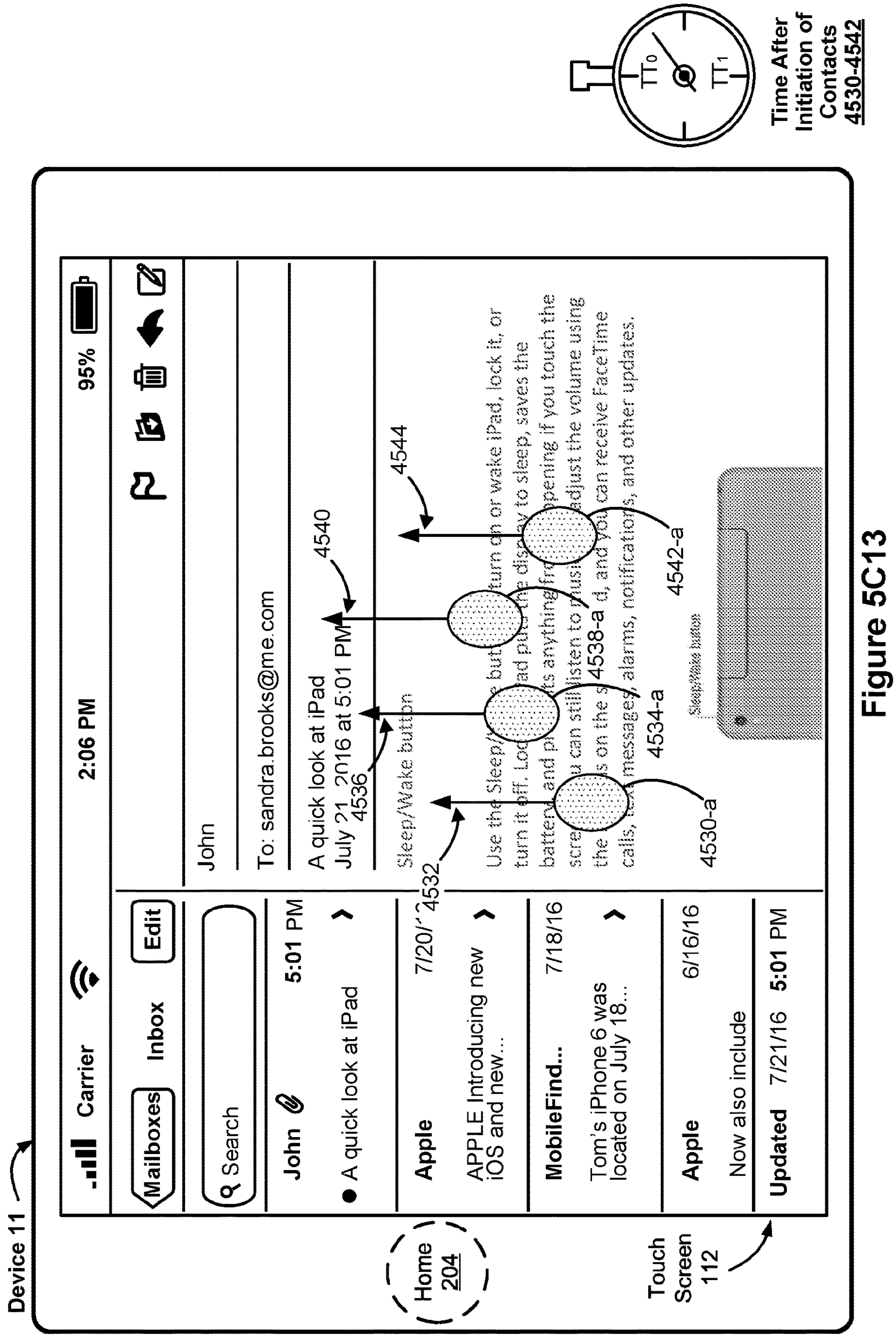
Figure 5C13

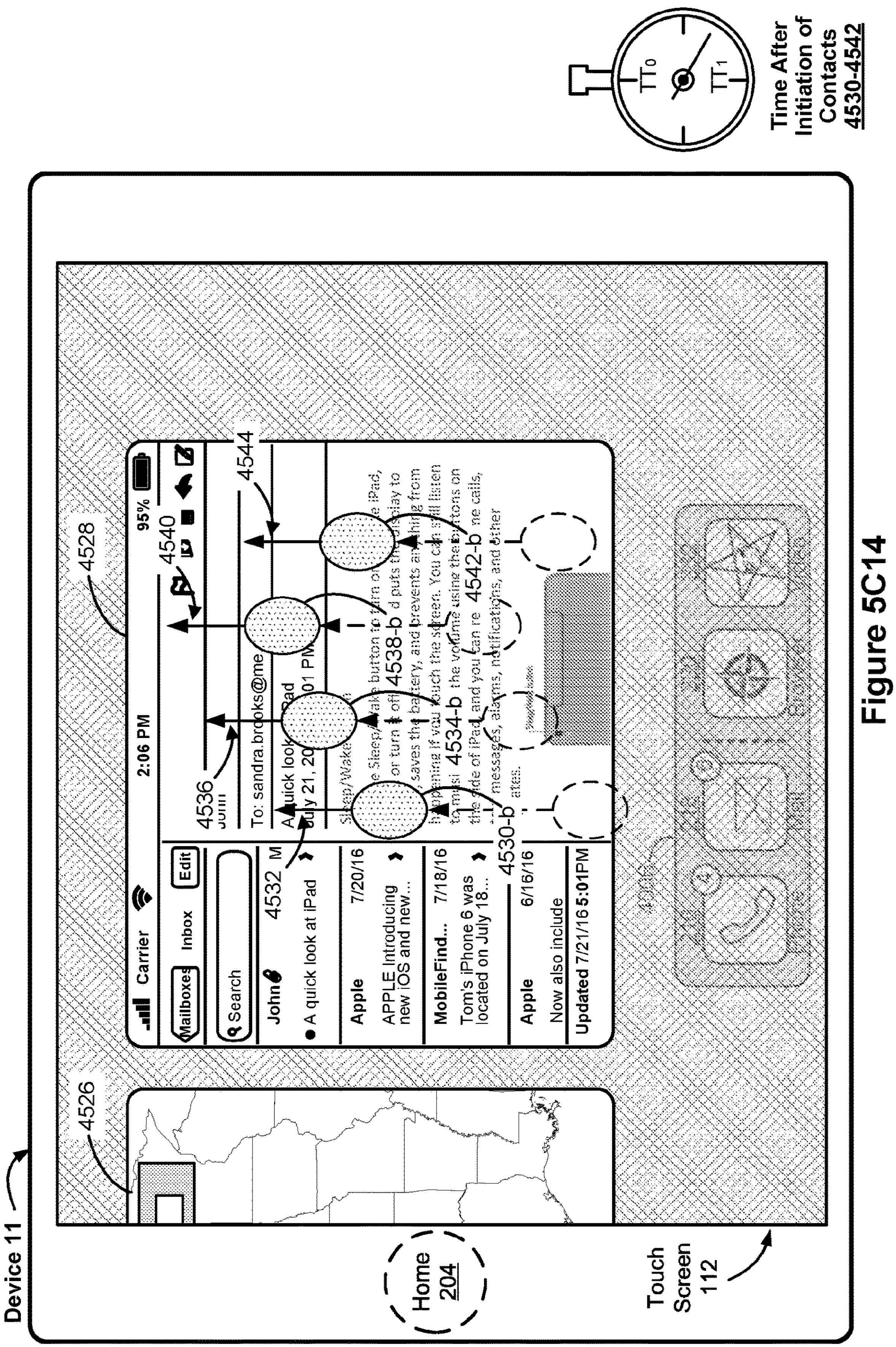
Figure 5C14

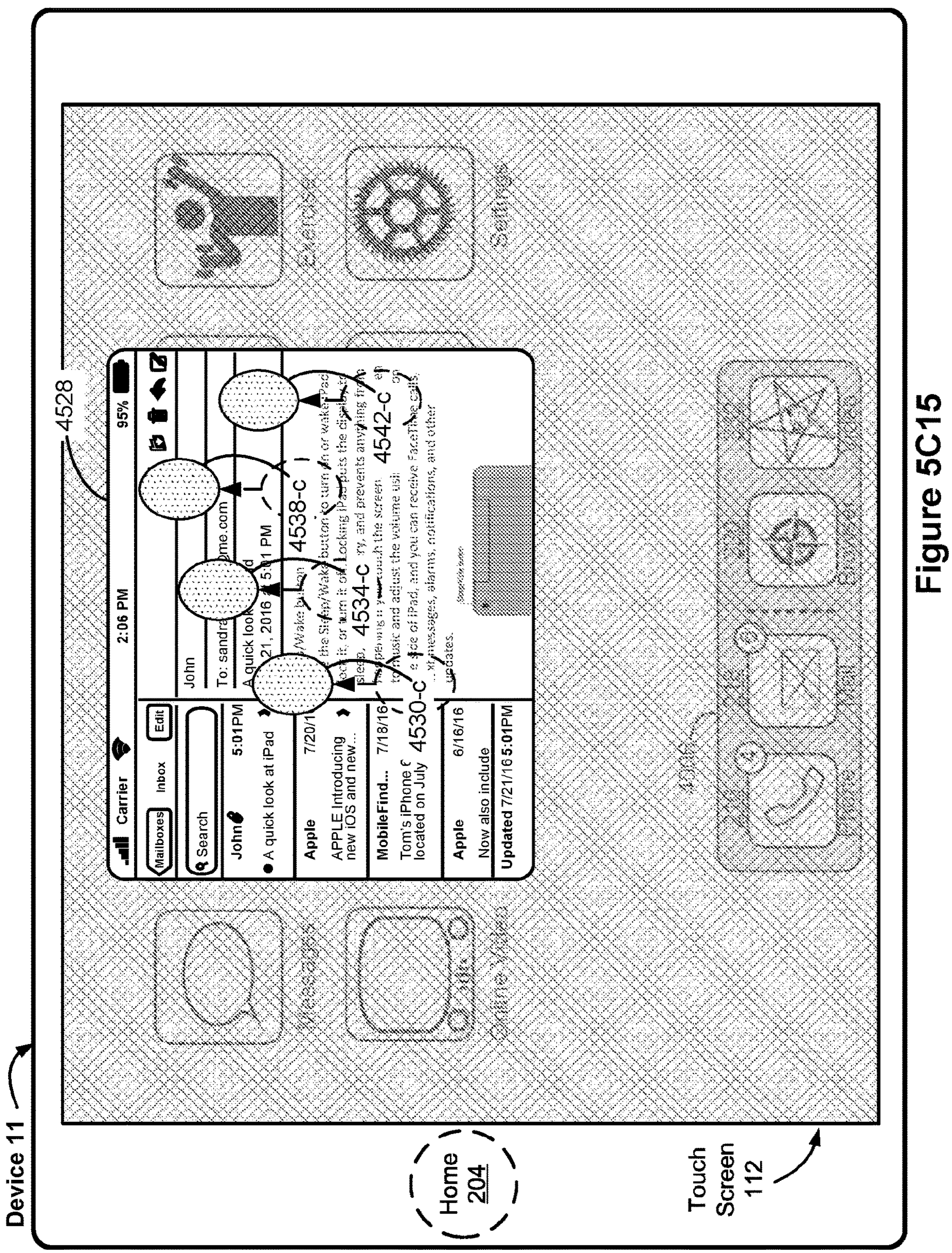
Figure 5C15

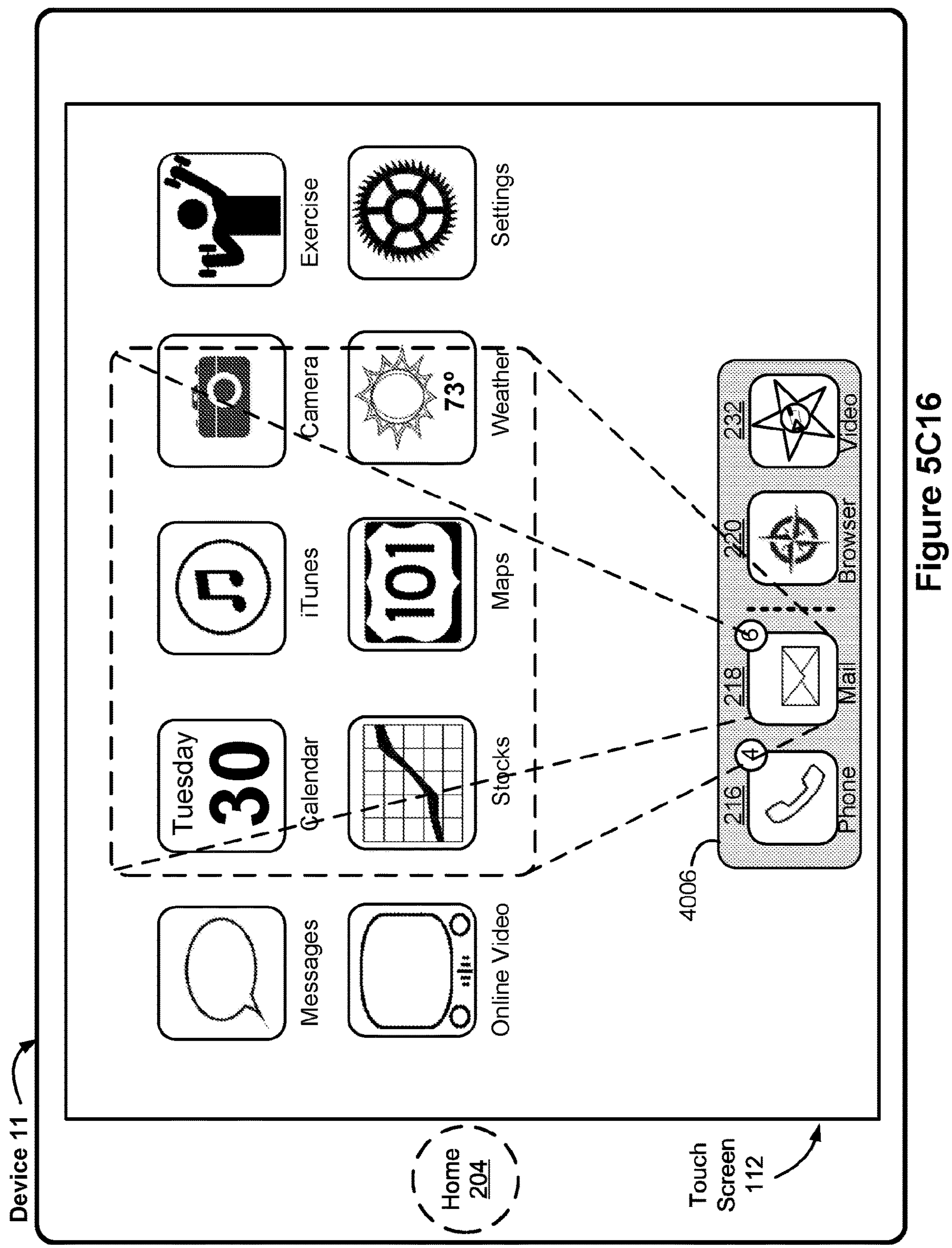
Figure 5C16

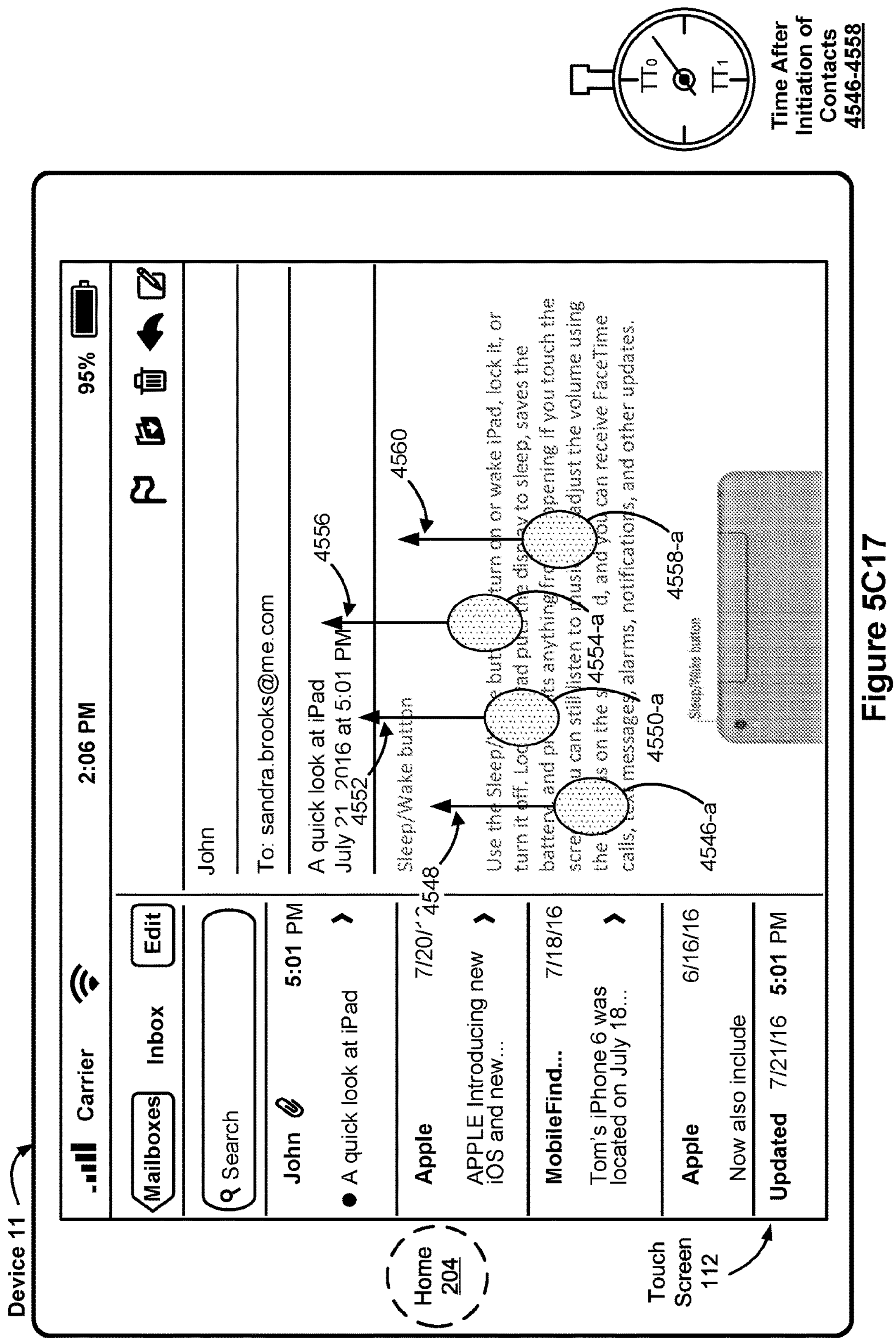
Figure 5C17

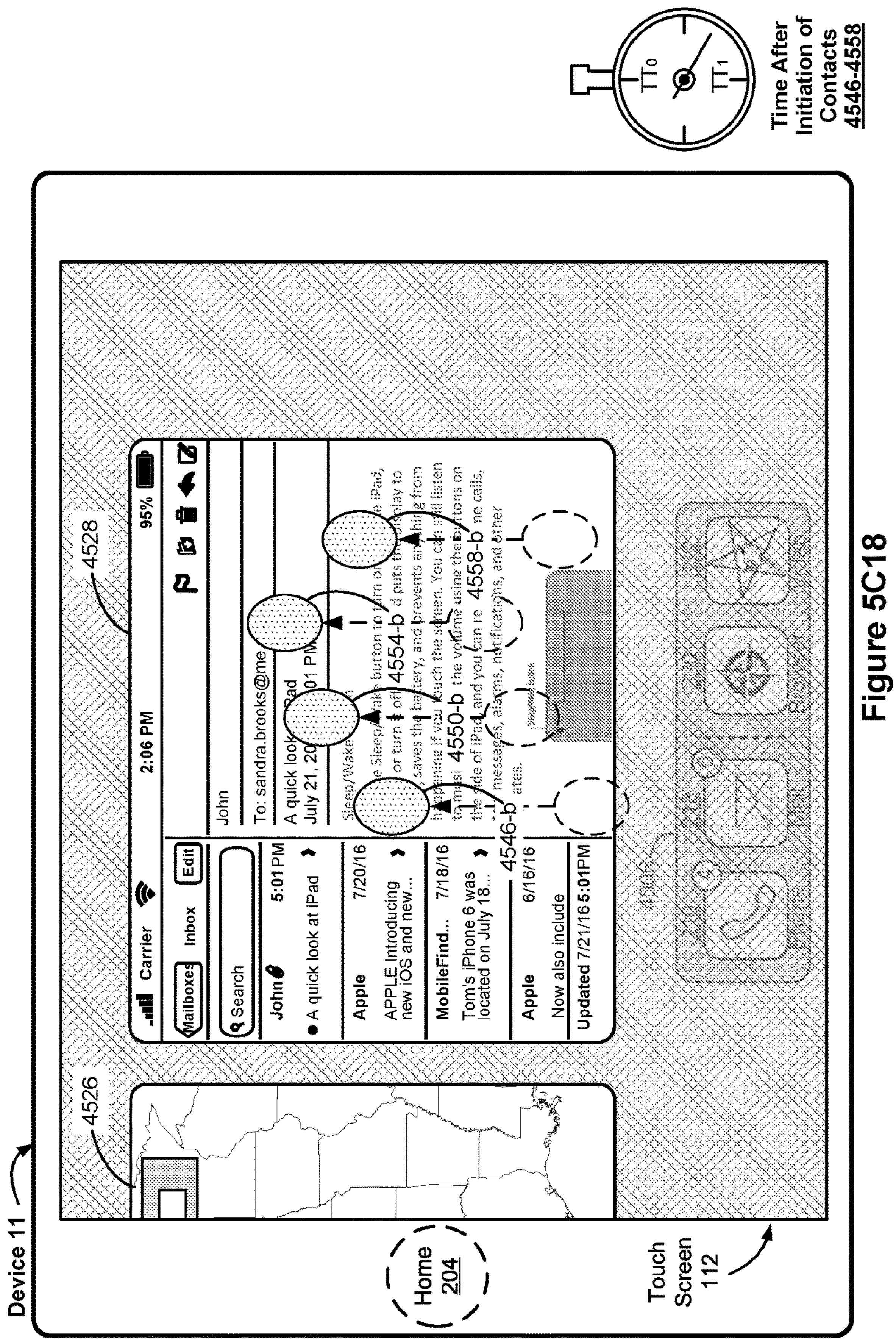
Figure 5C18

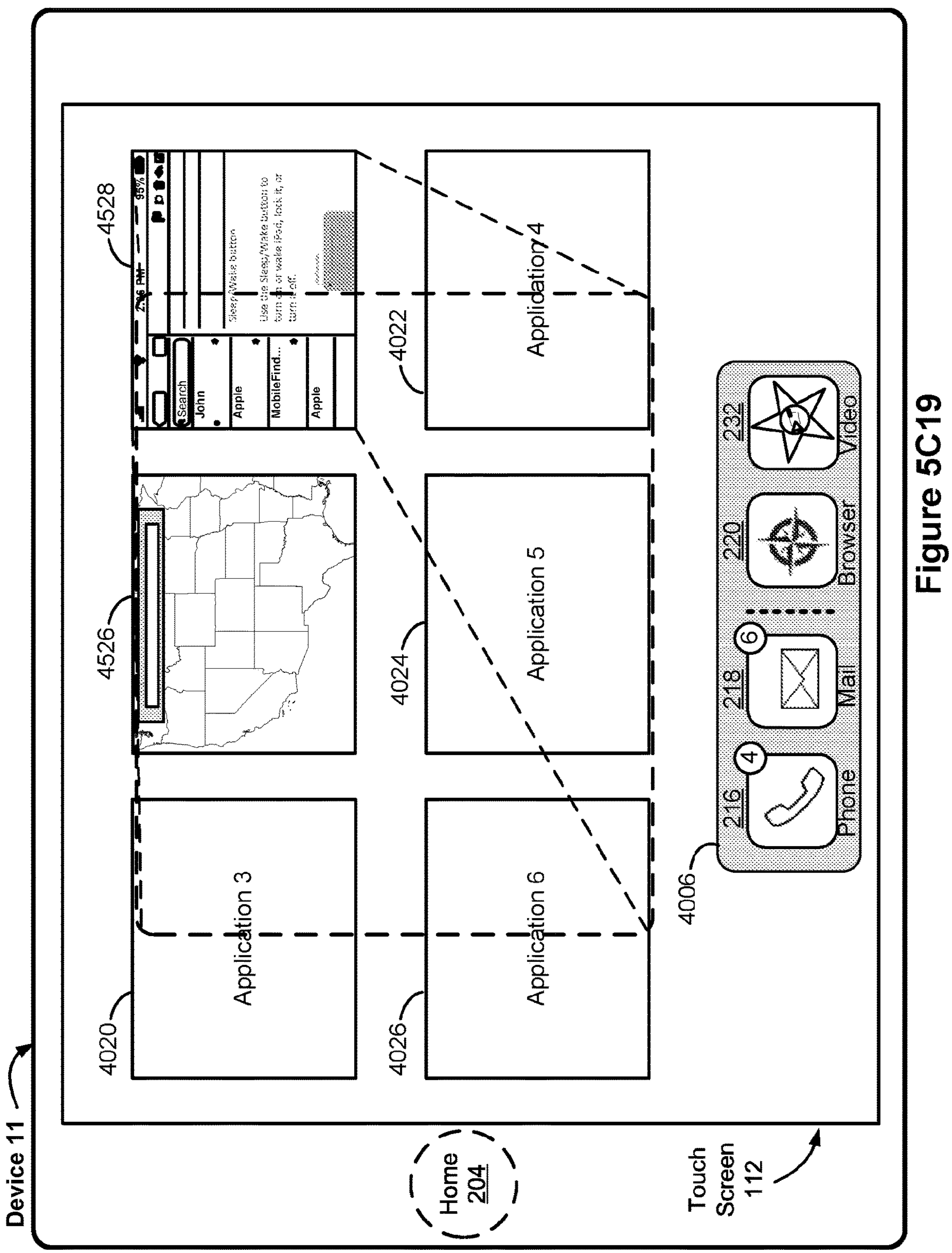
Figure 5C19

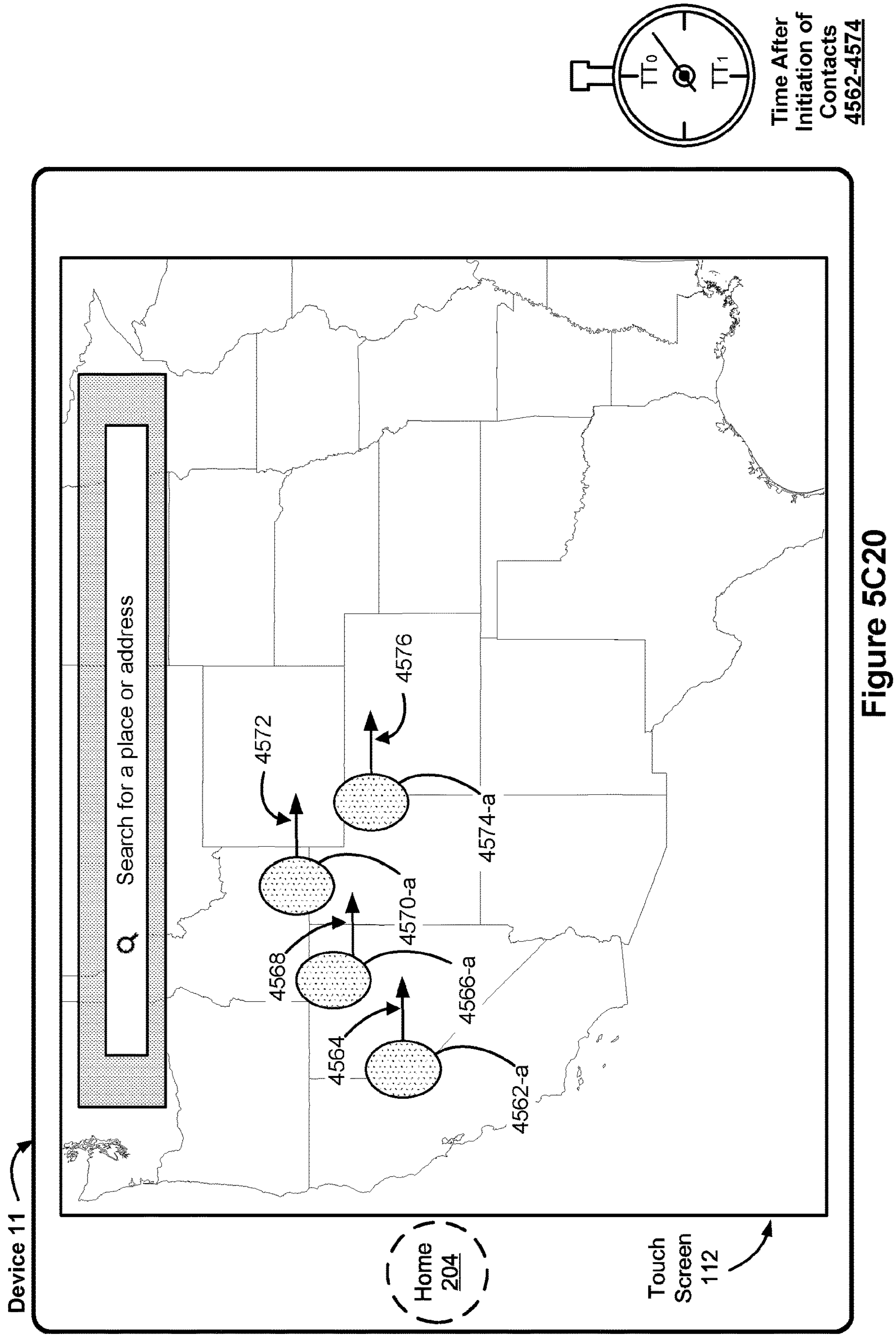
Figure 5C20

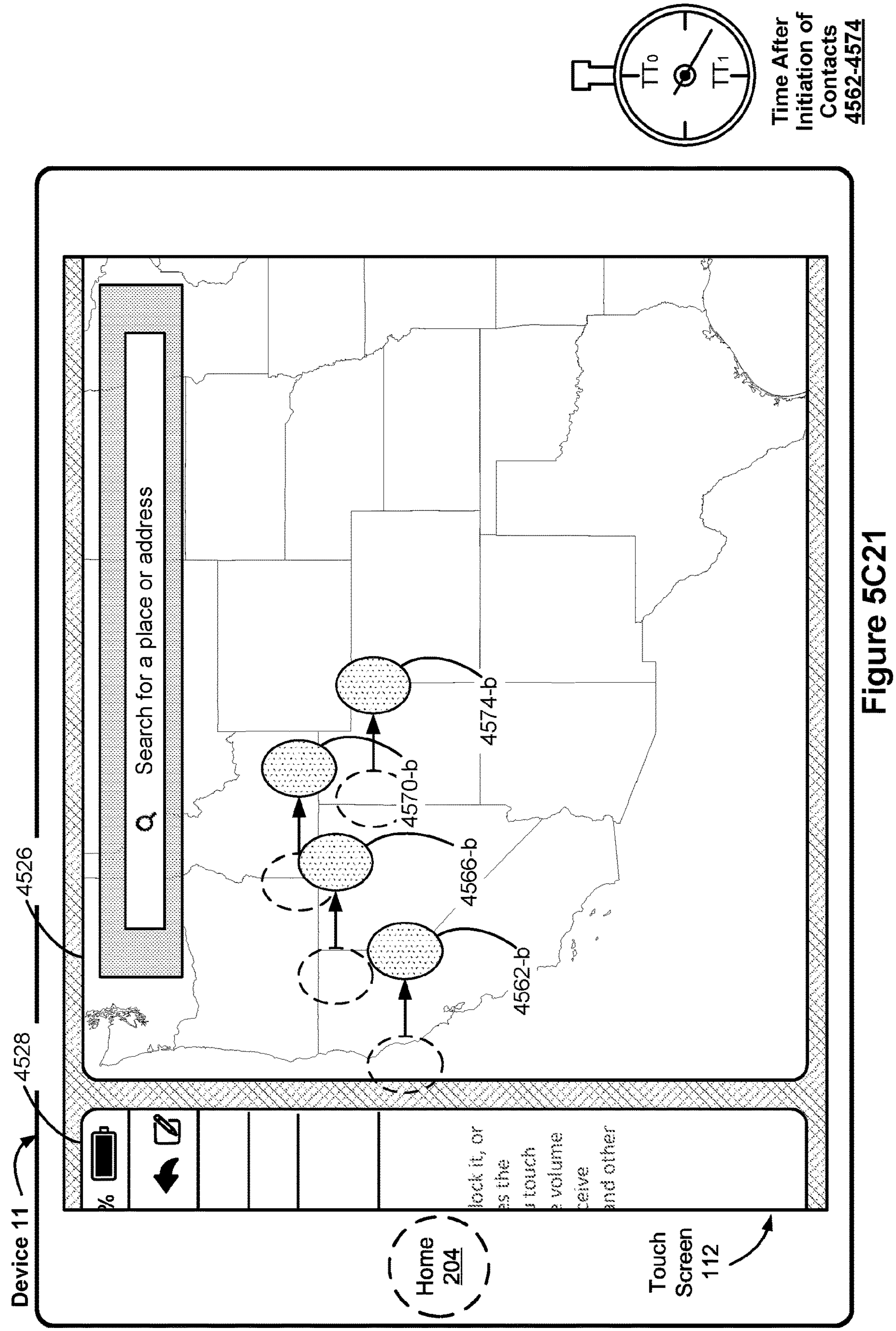
Figure 5C21

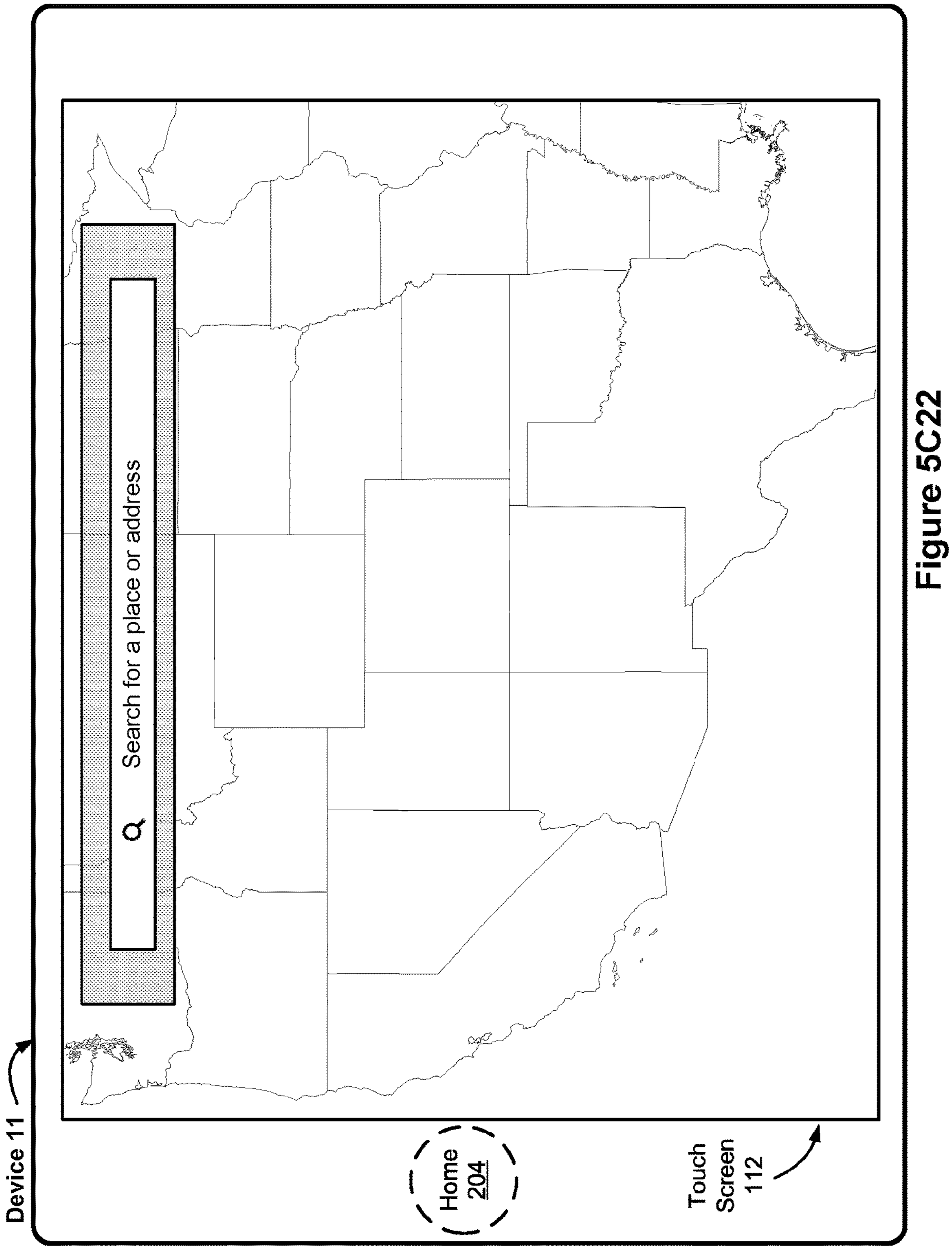
Figure 5C22

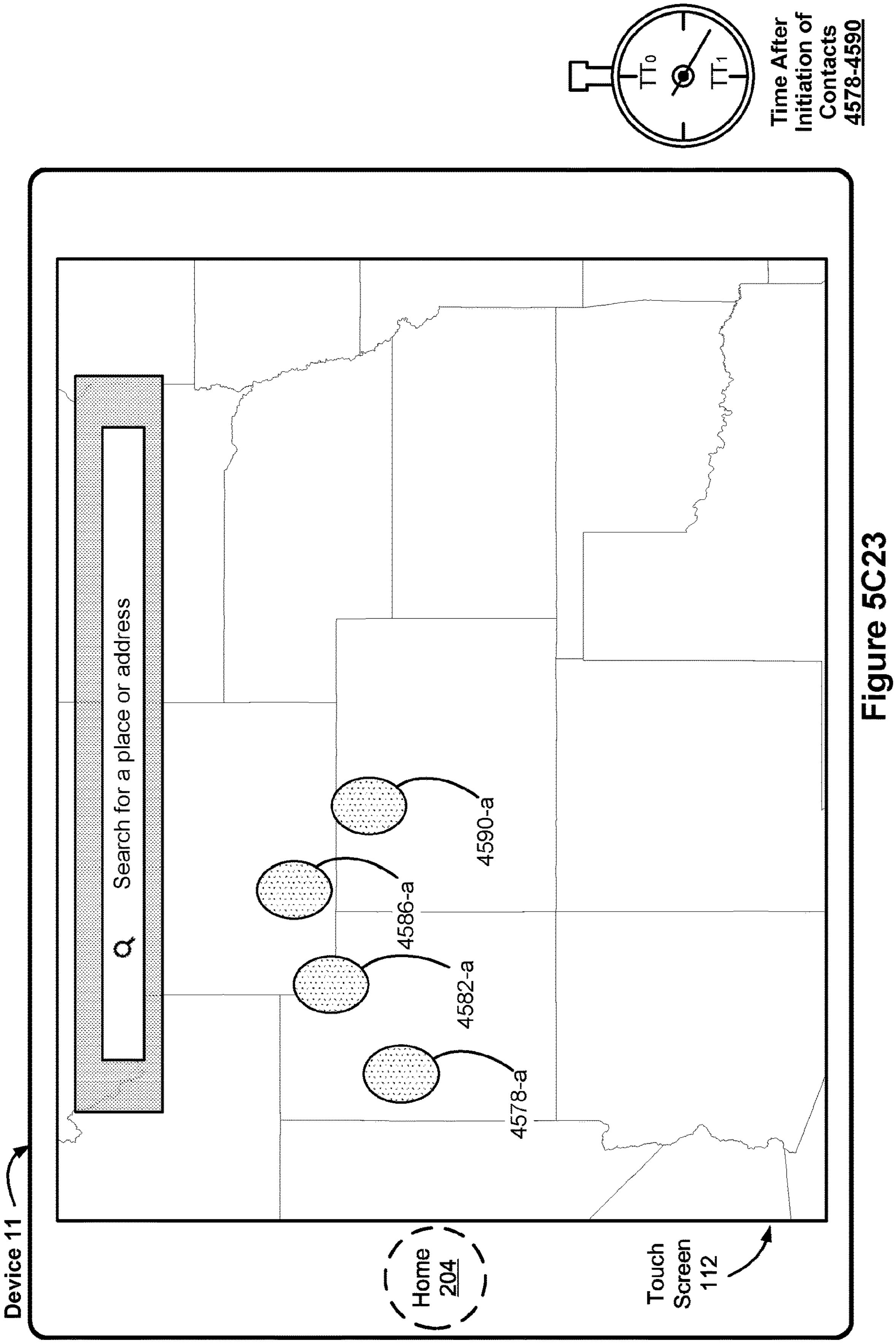
Figure 5C23

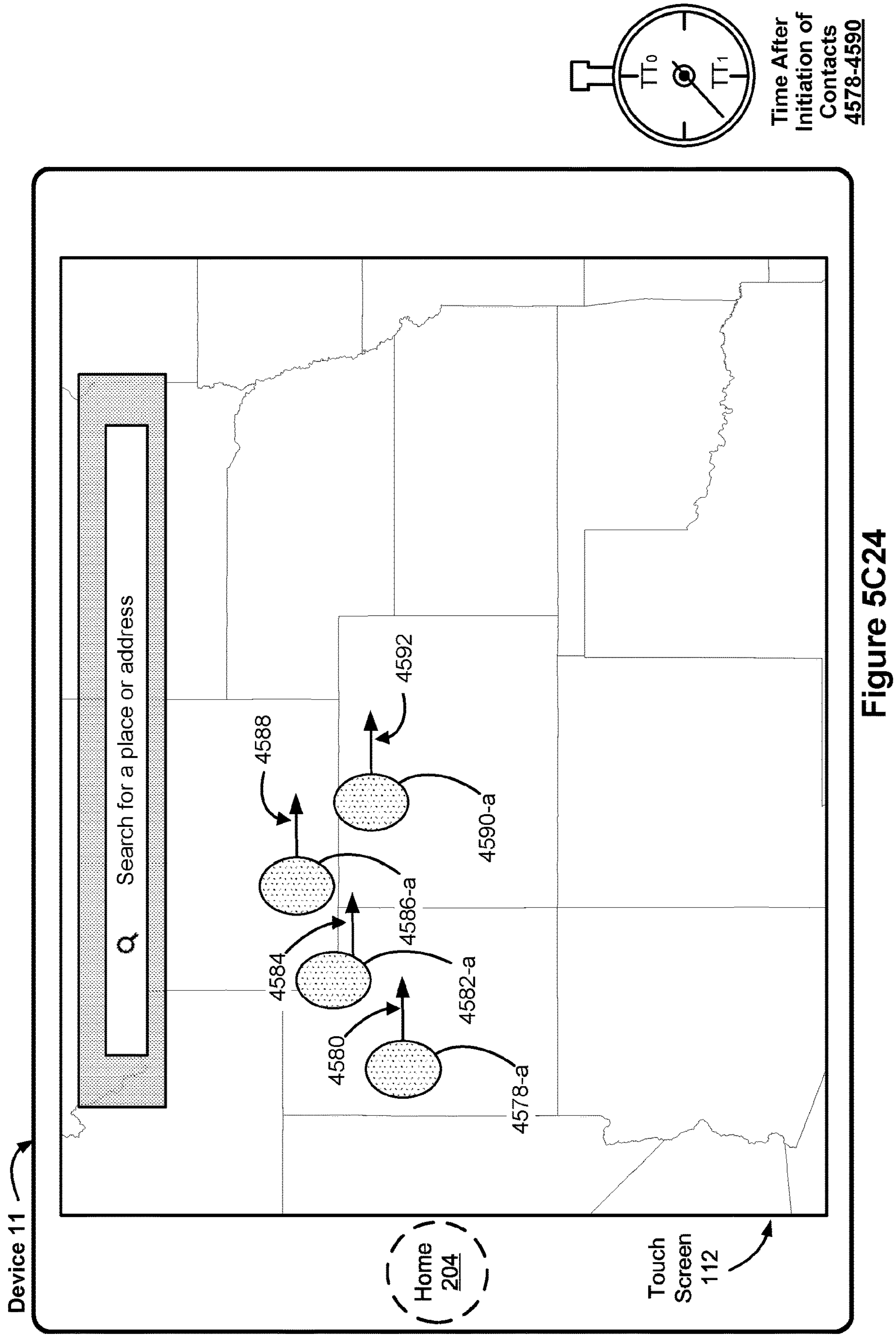
Figure 5C24

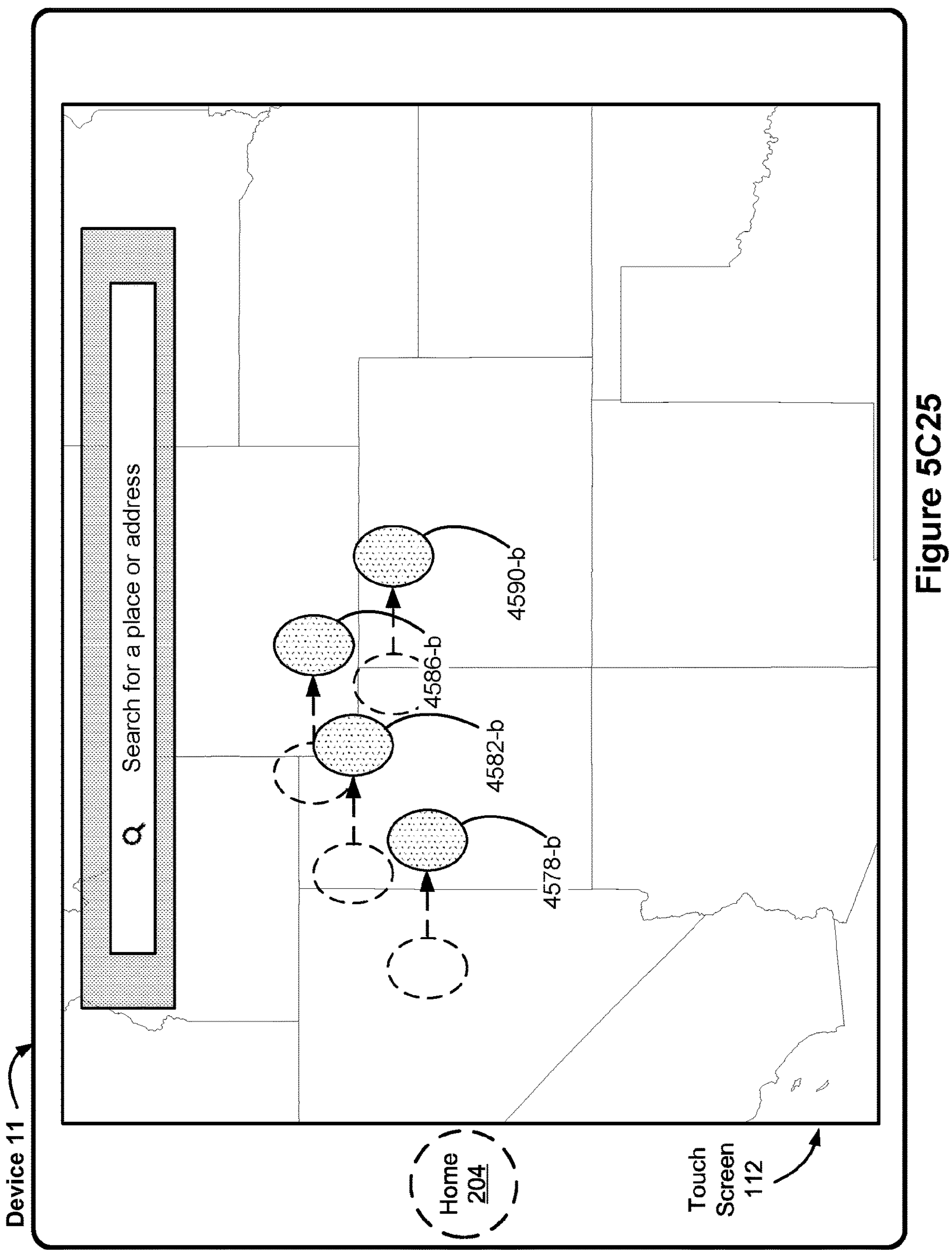
Figure 5C25

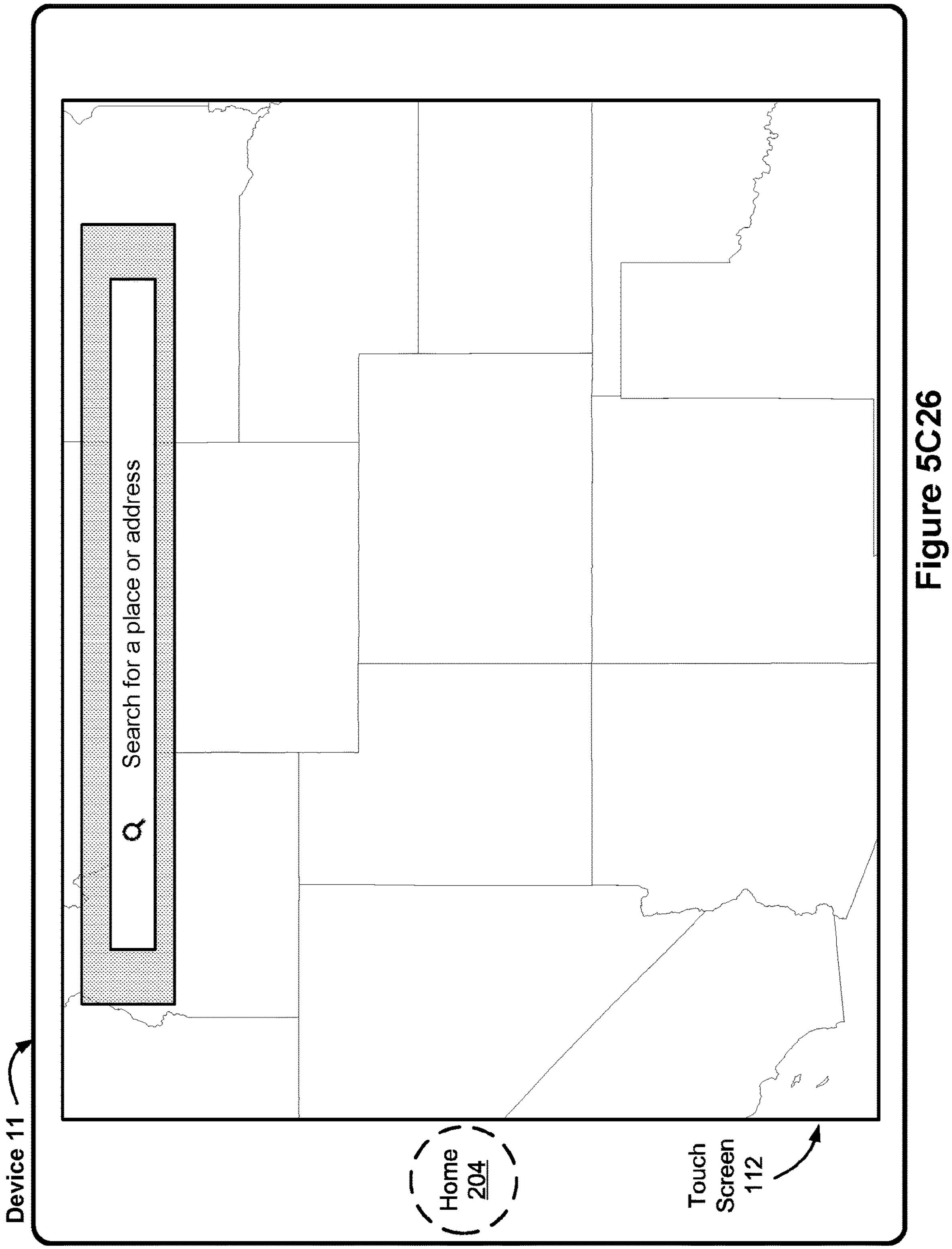
Figure 5C26

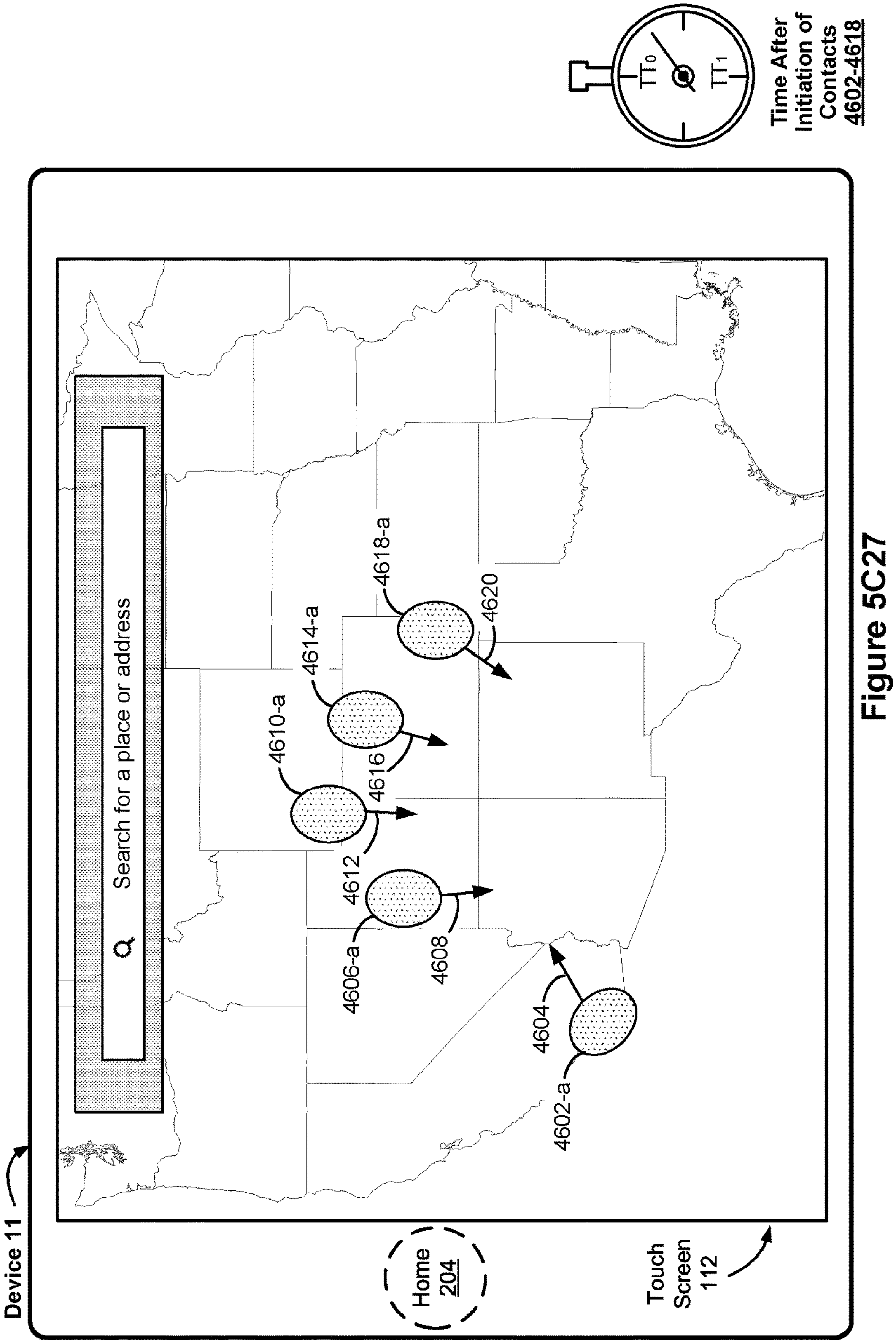
Figure 5C27

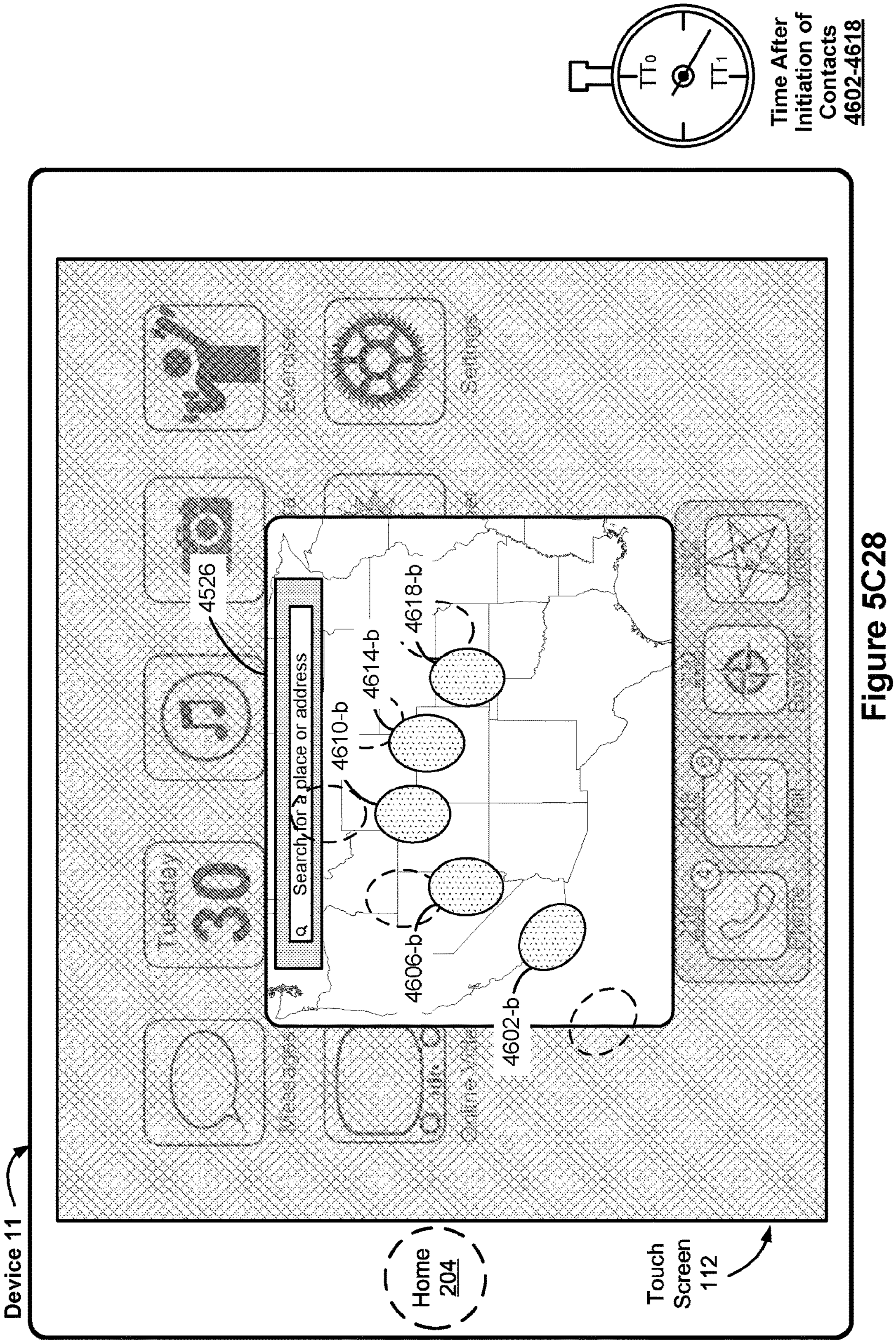
Figure 5C28

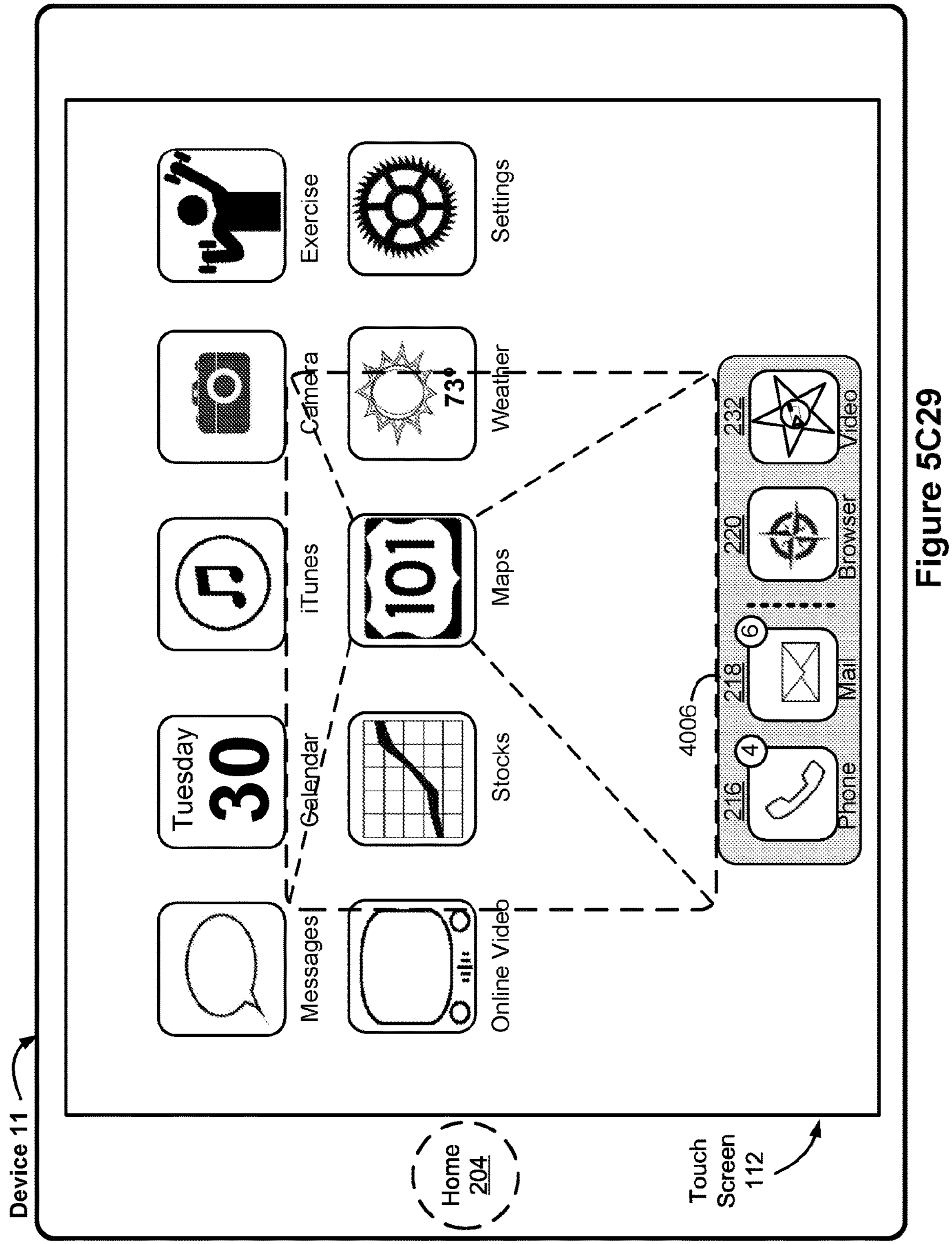
Figure 5C29

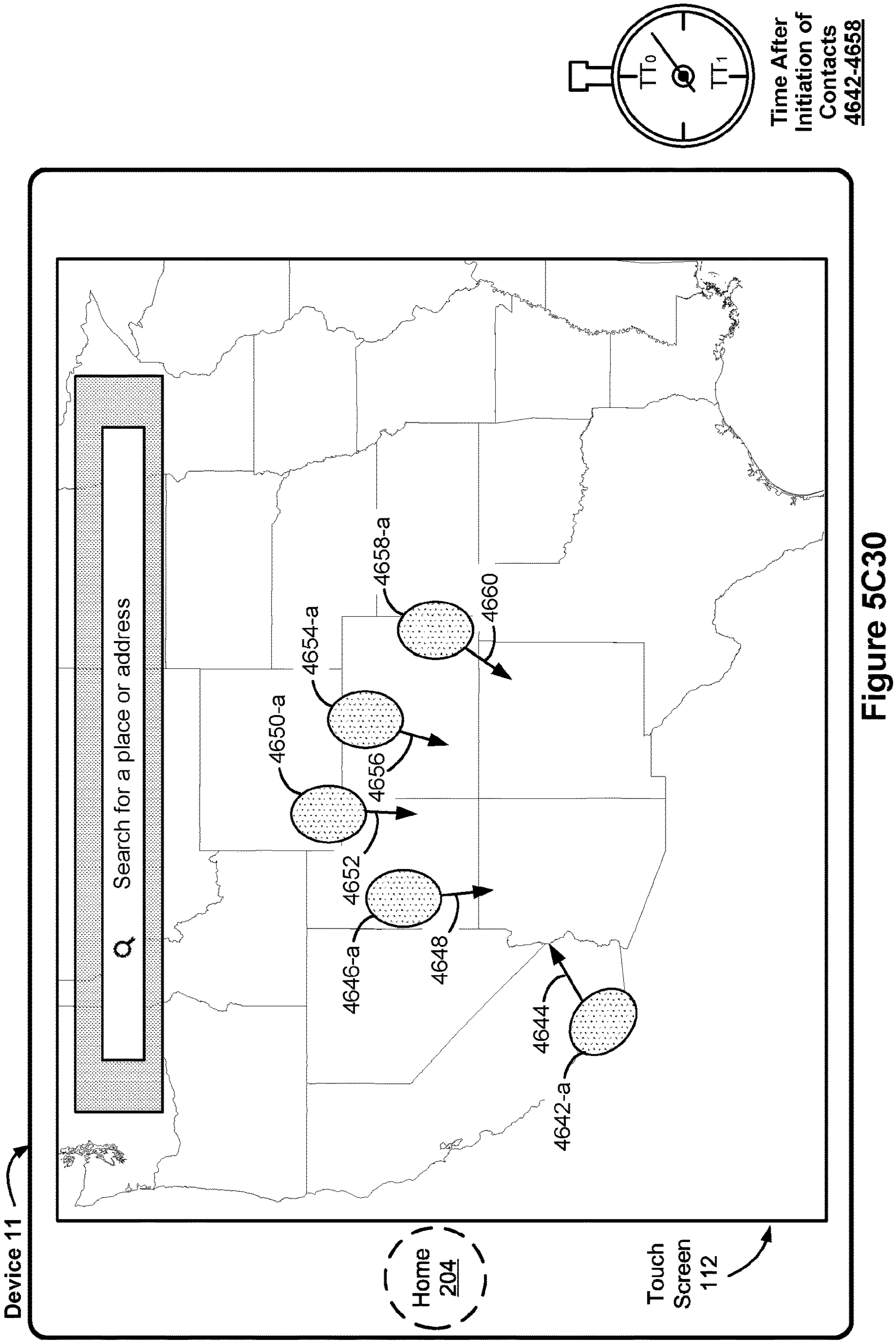
Figure 5C30

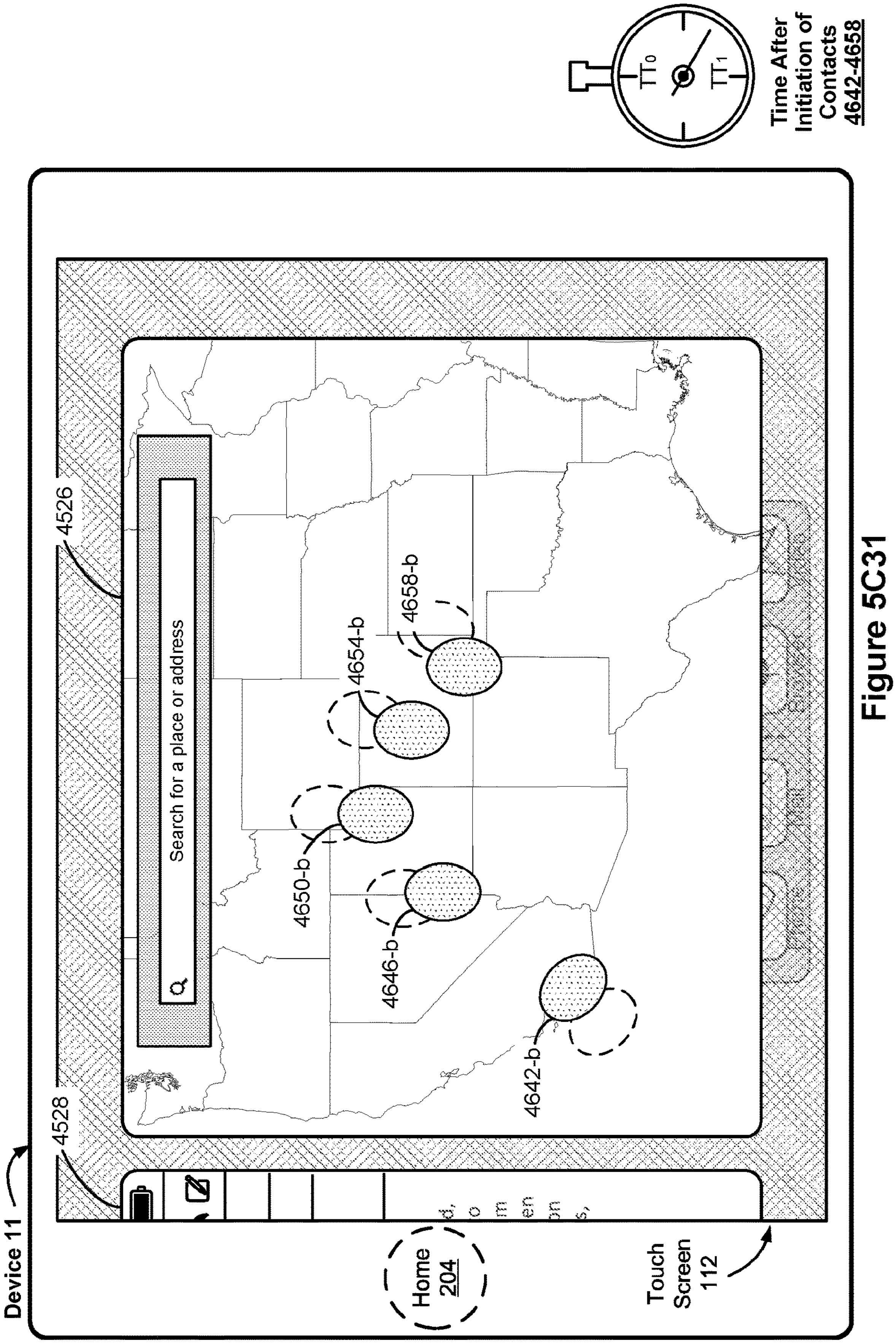
Figure 5C31

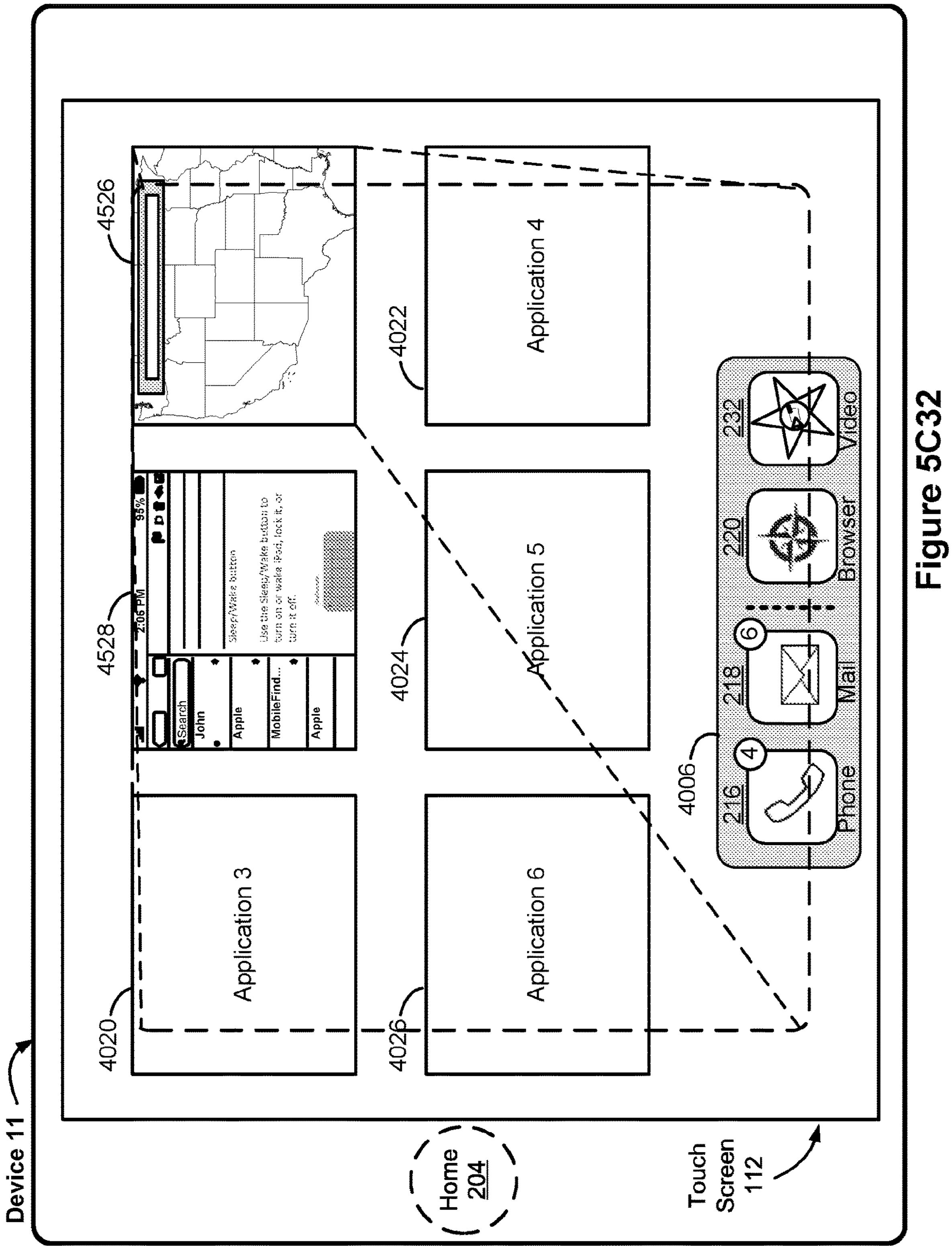
Figure 5C32

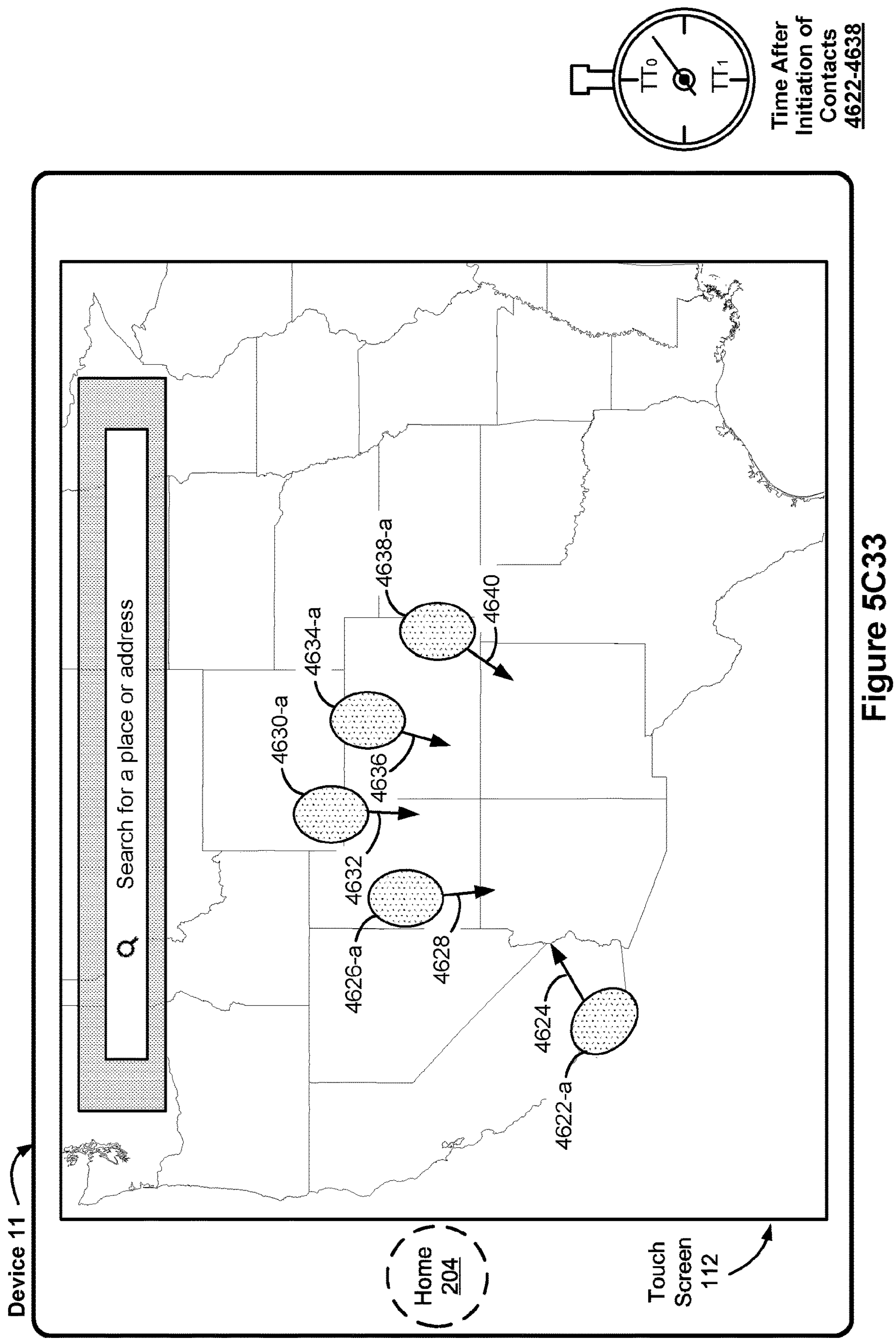
Figure 5C33

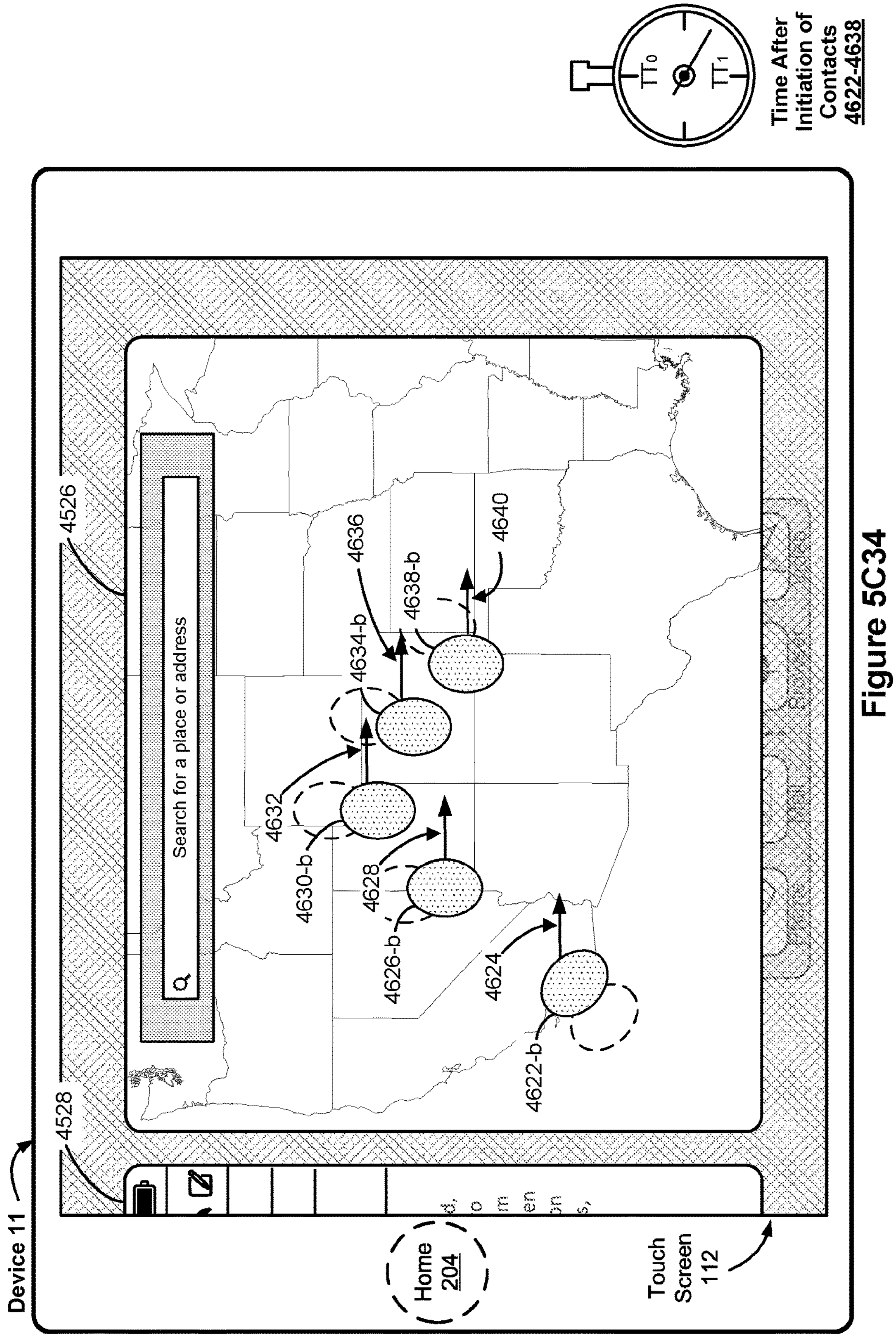
Figure 5C34

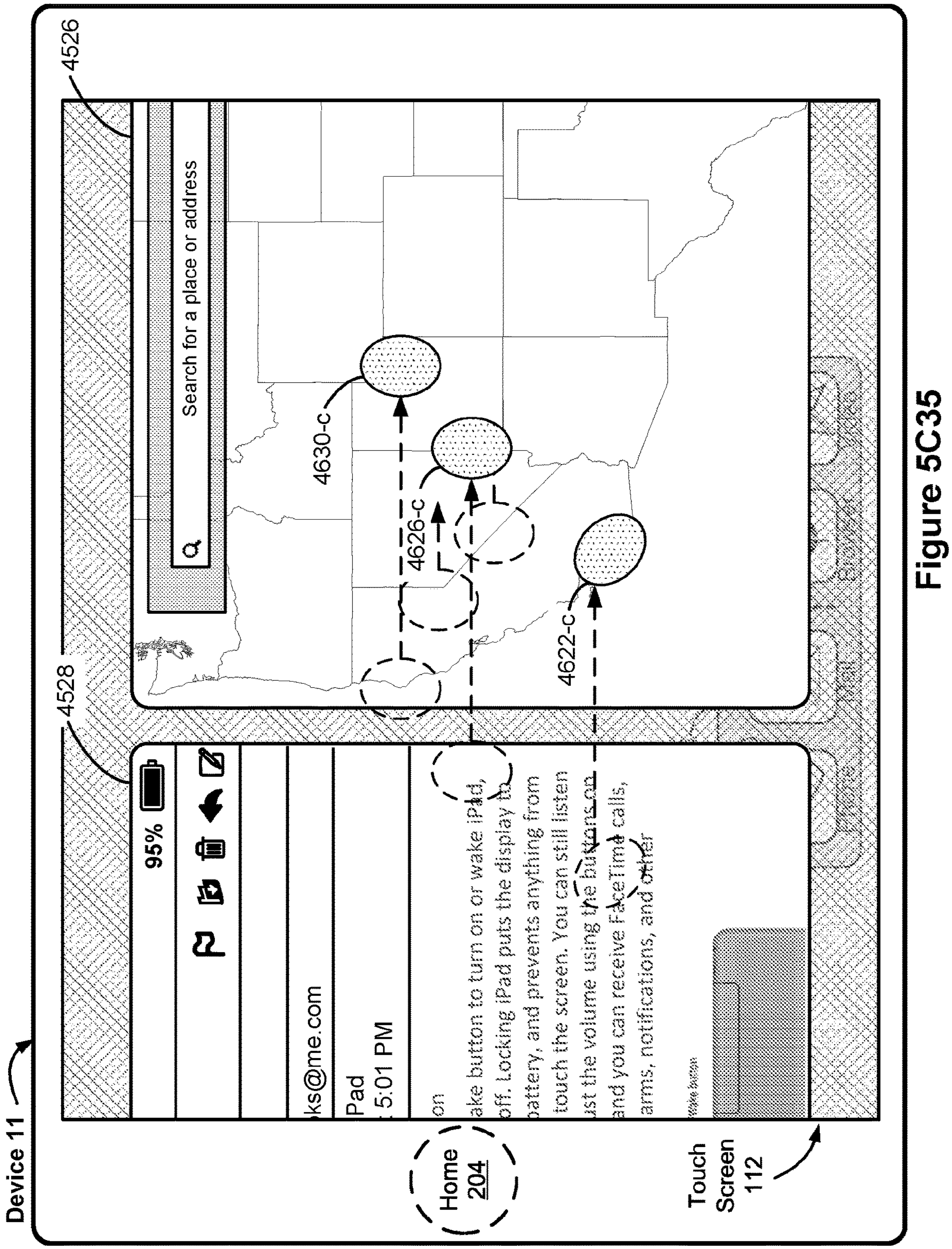
Figure 5C35

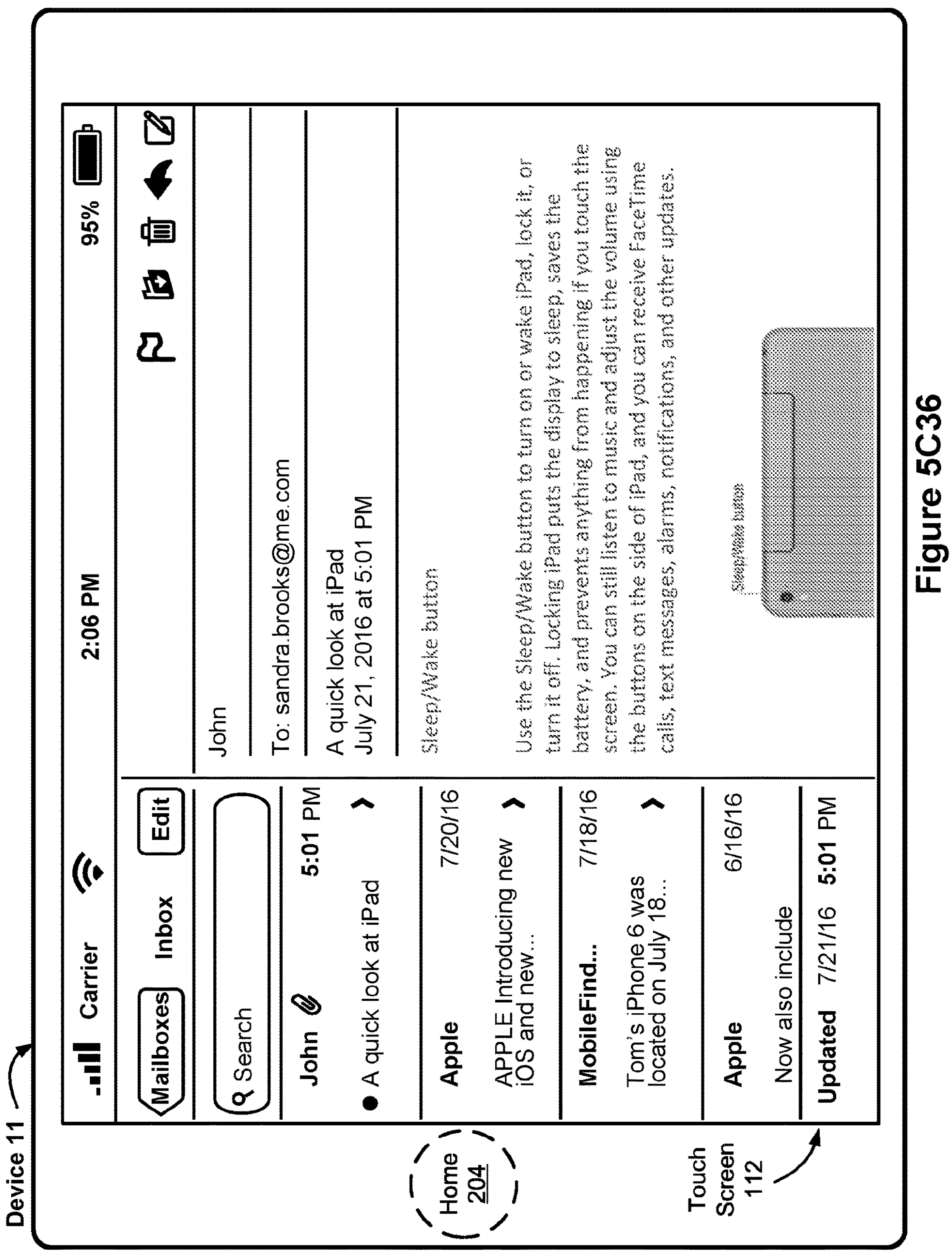
Figure 5C36

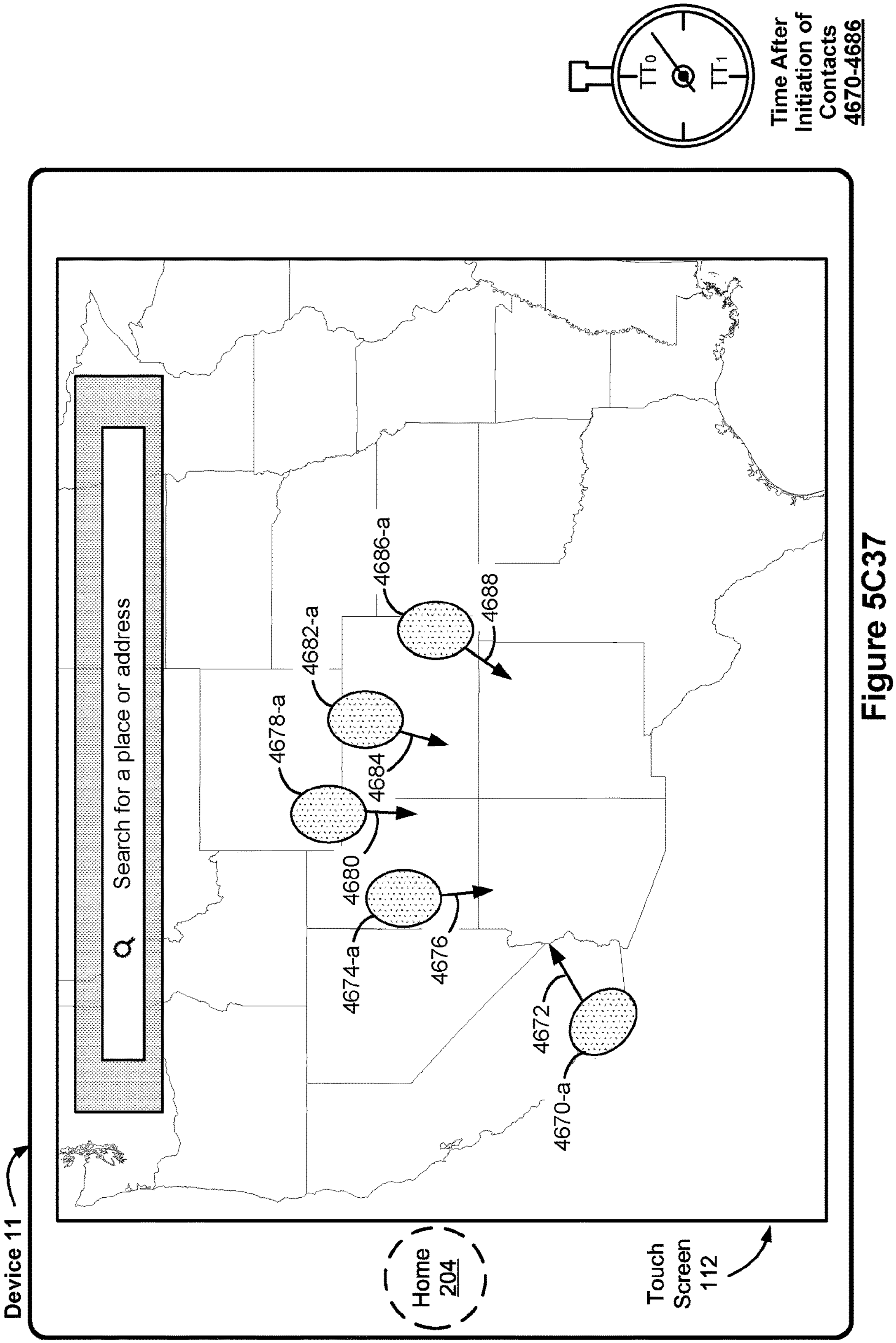
Figure 5C37

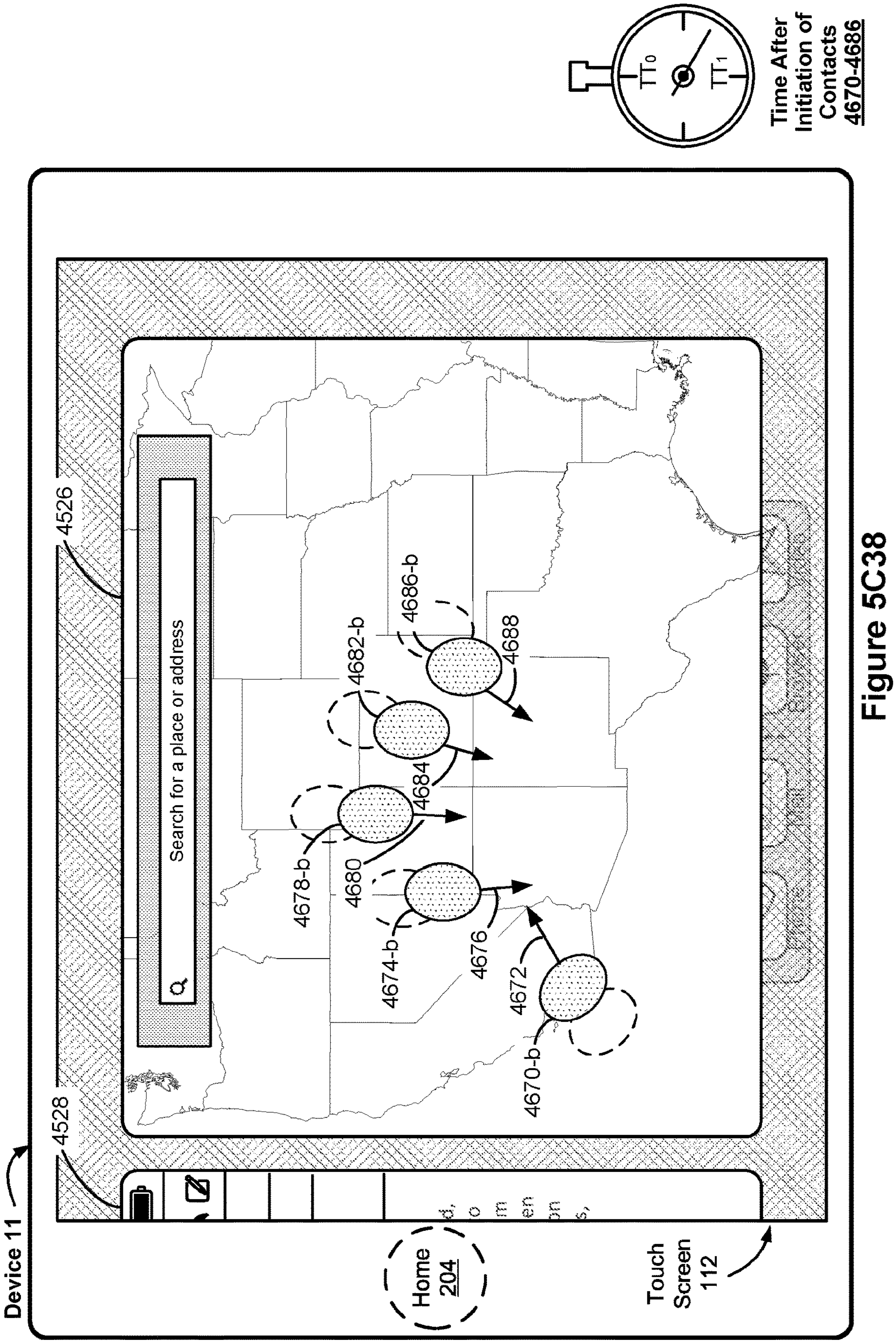
Figure 5C38

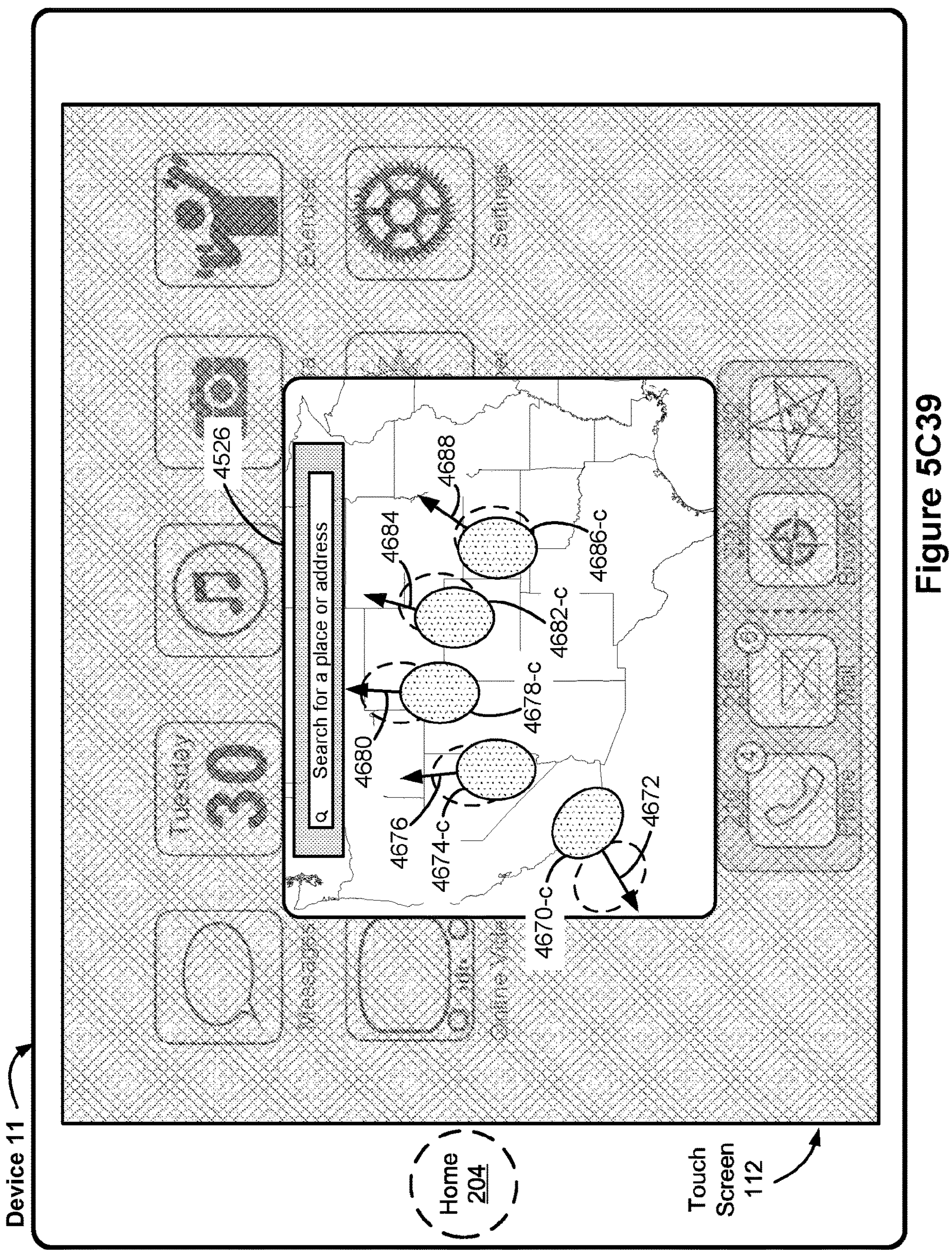
Figure 5C39

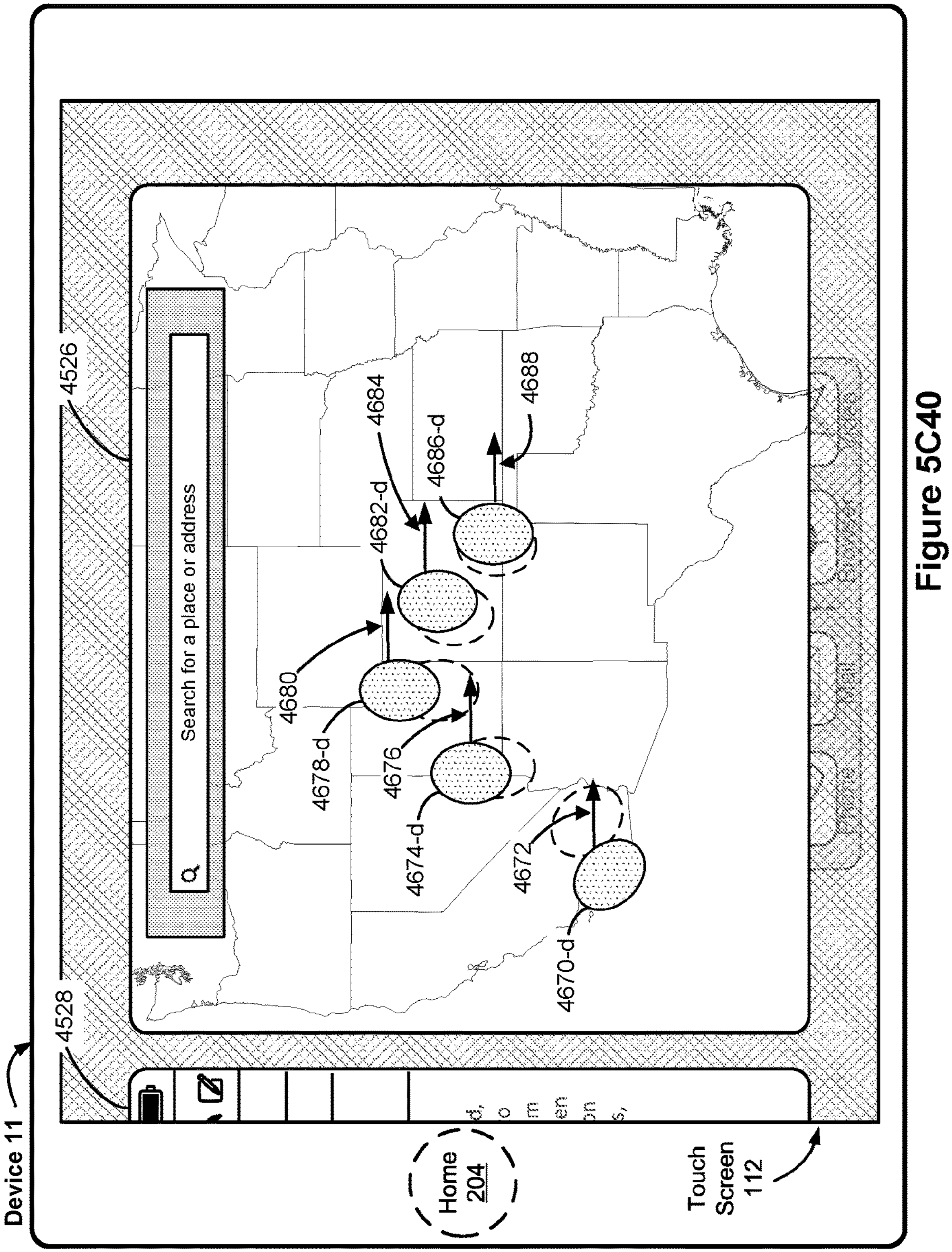
Figure 5C40

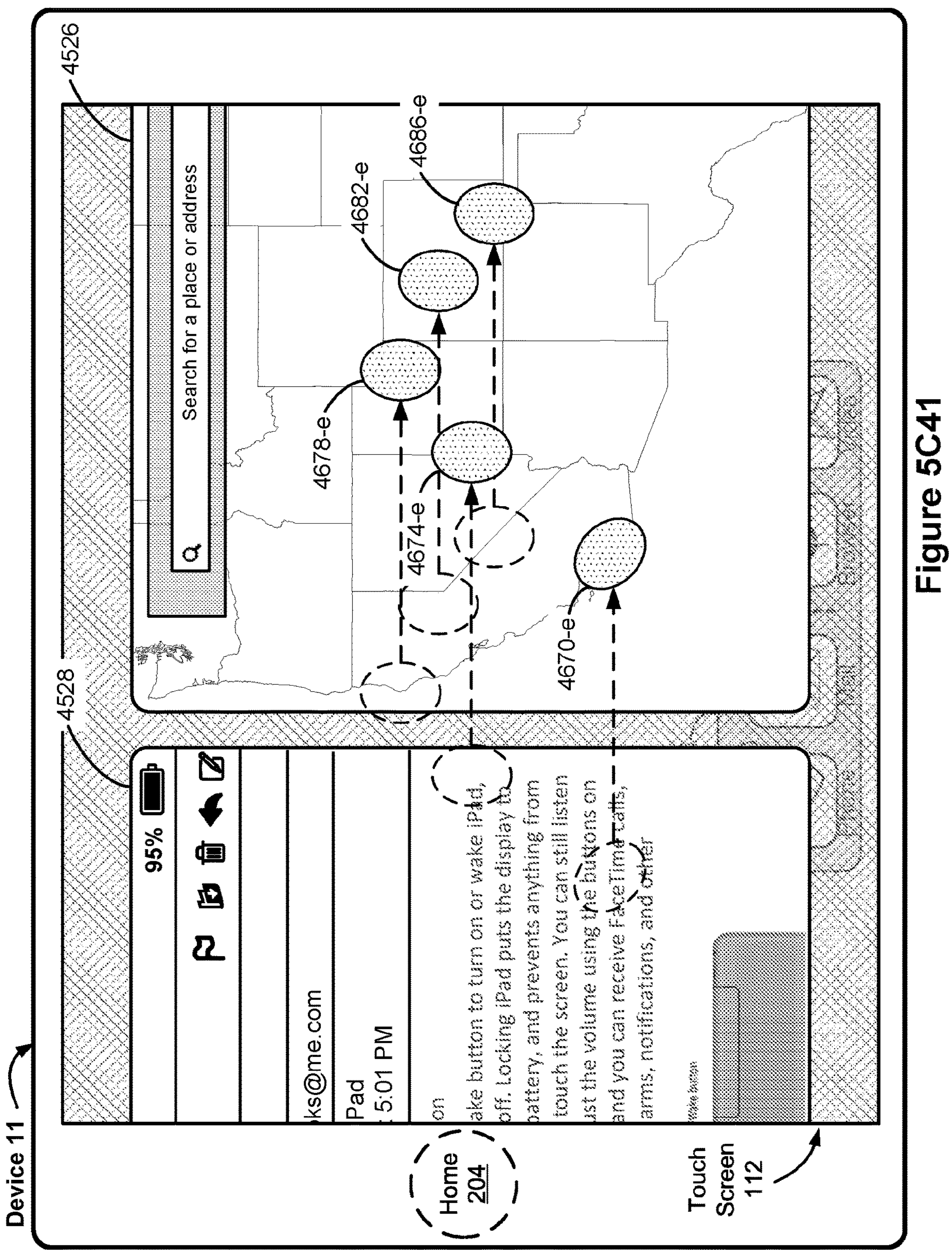
Figure 5C41

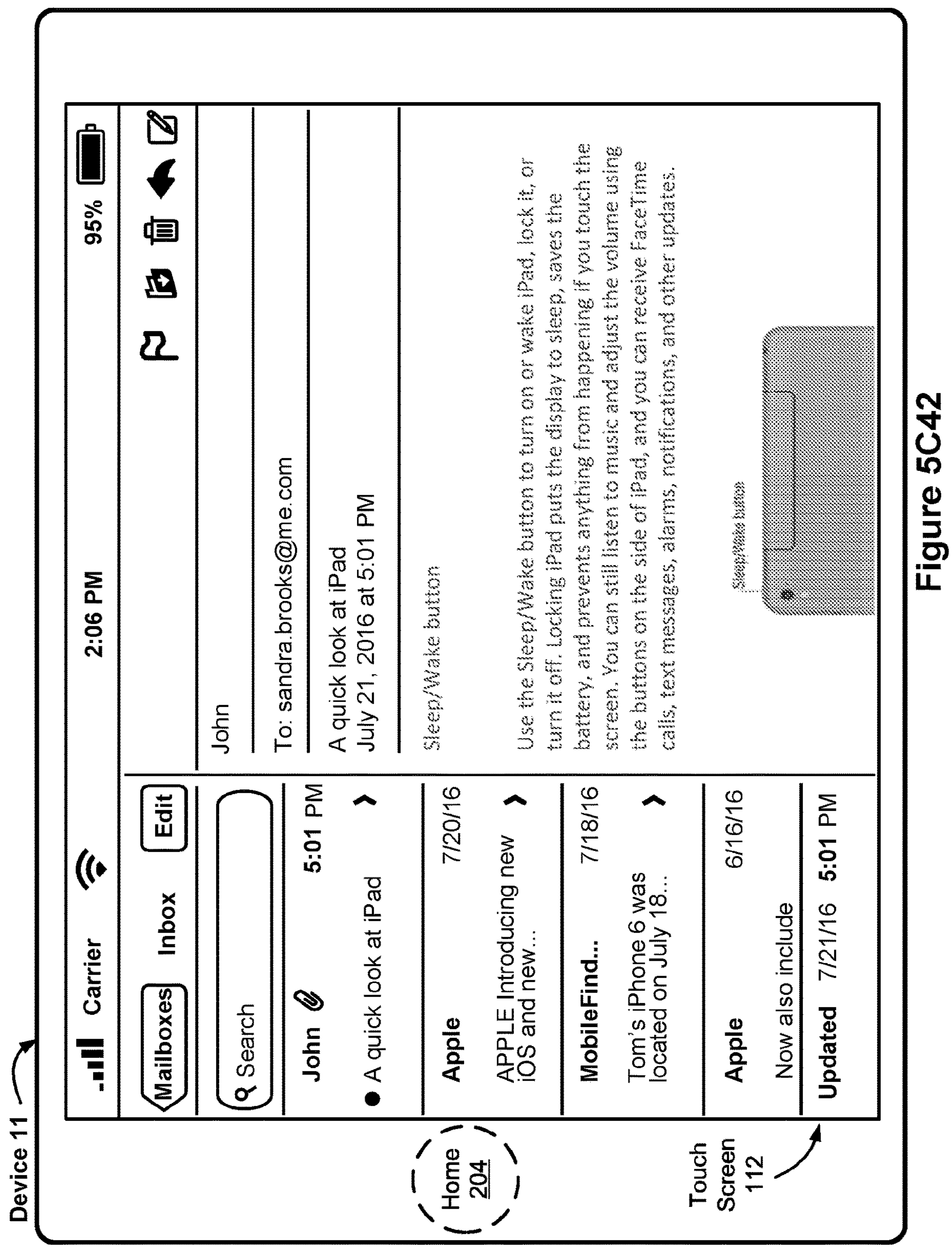
Figure 5C42

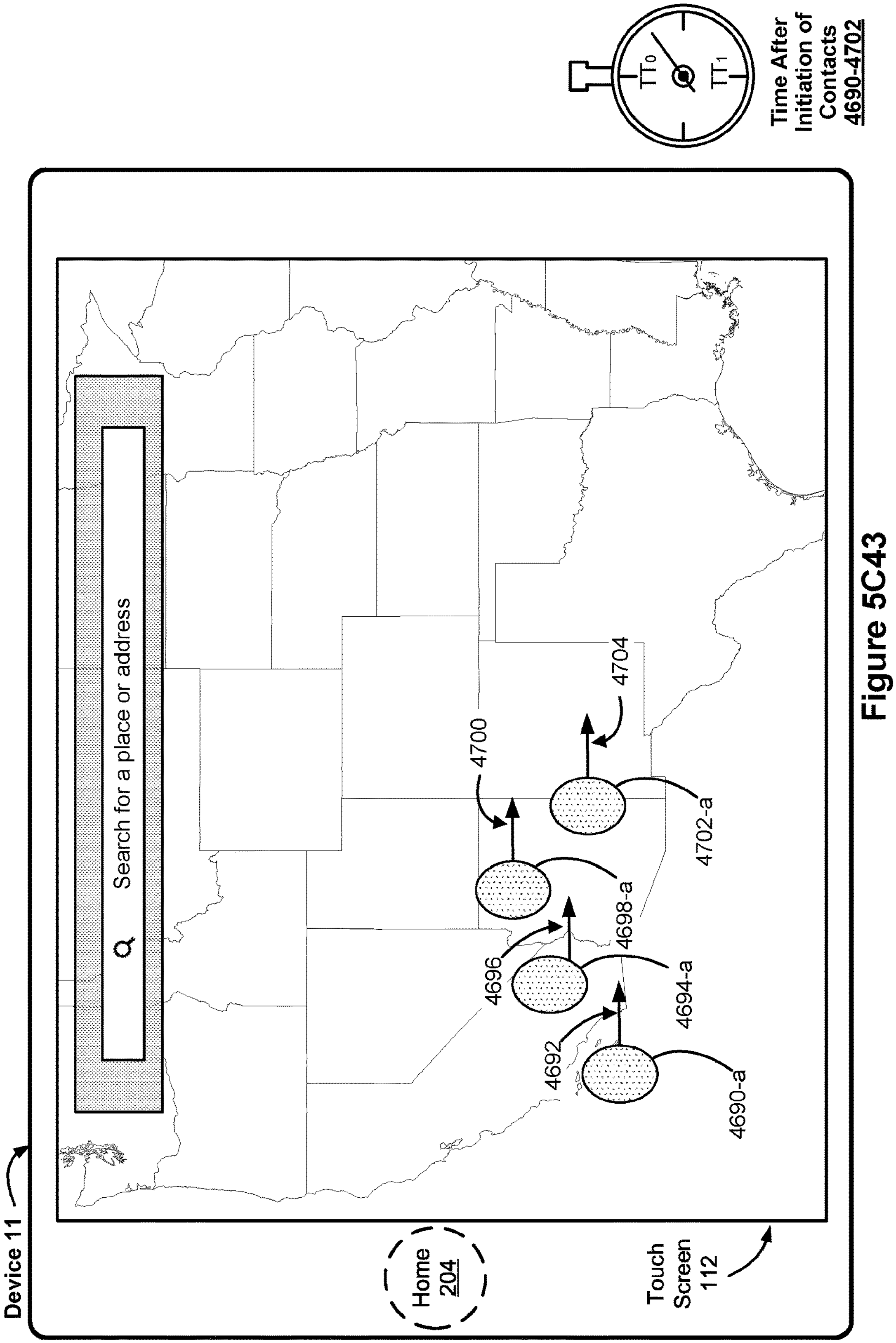
Figure 5C43

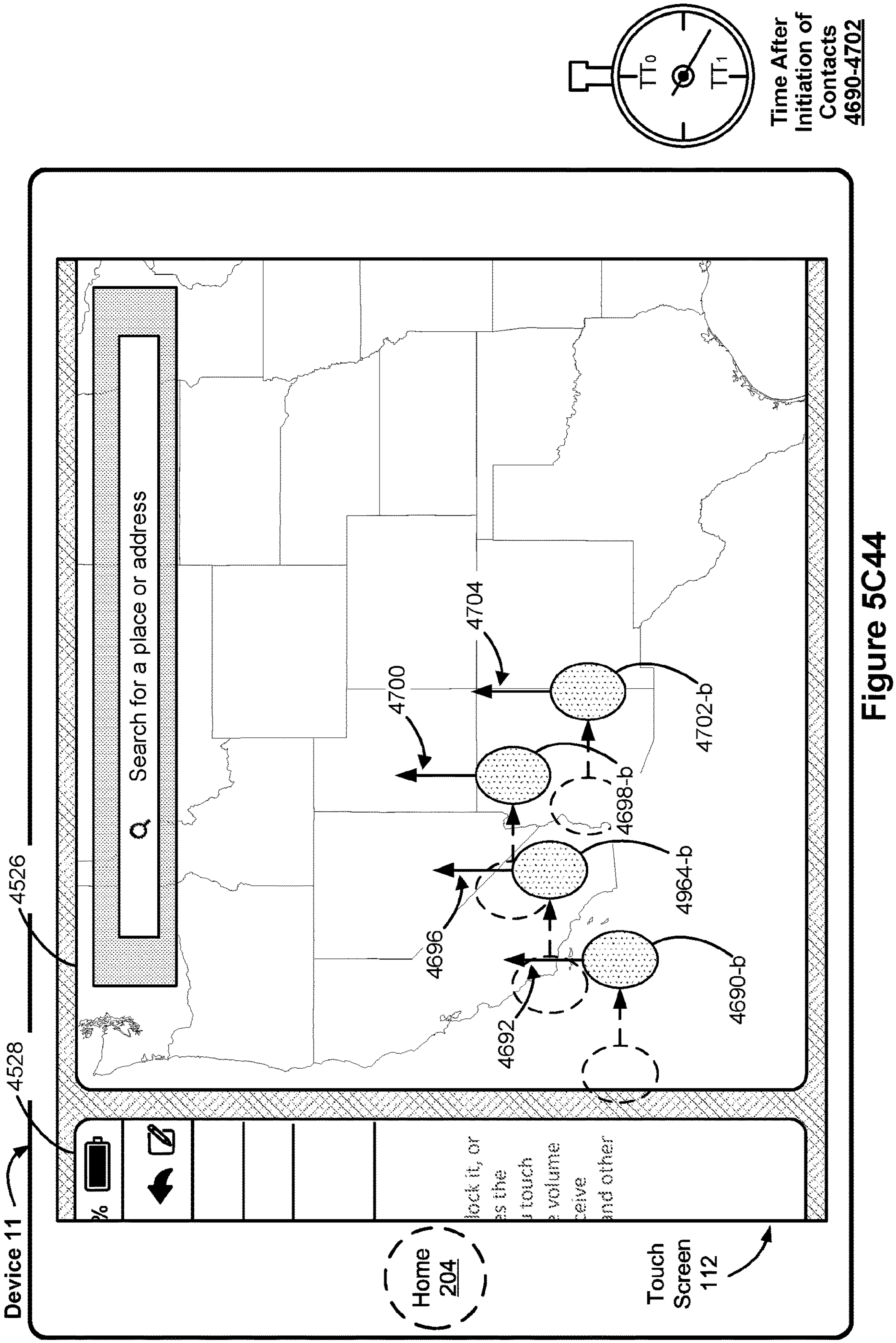
Figure 5C44

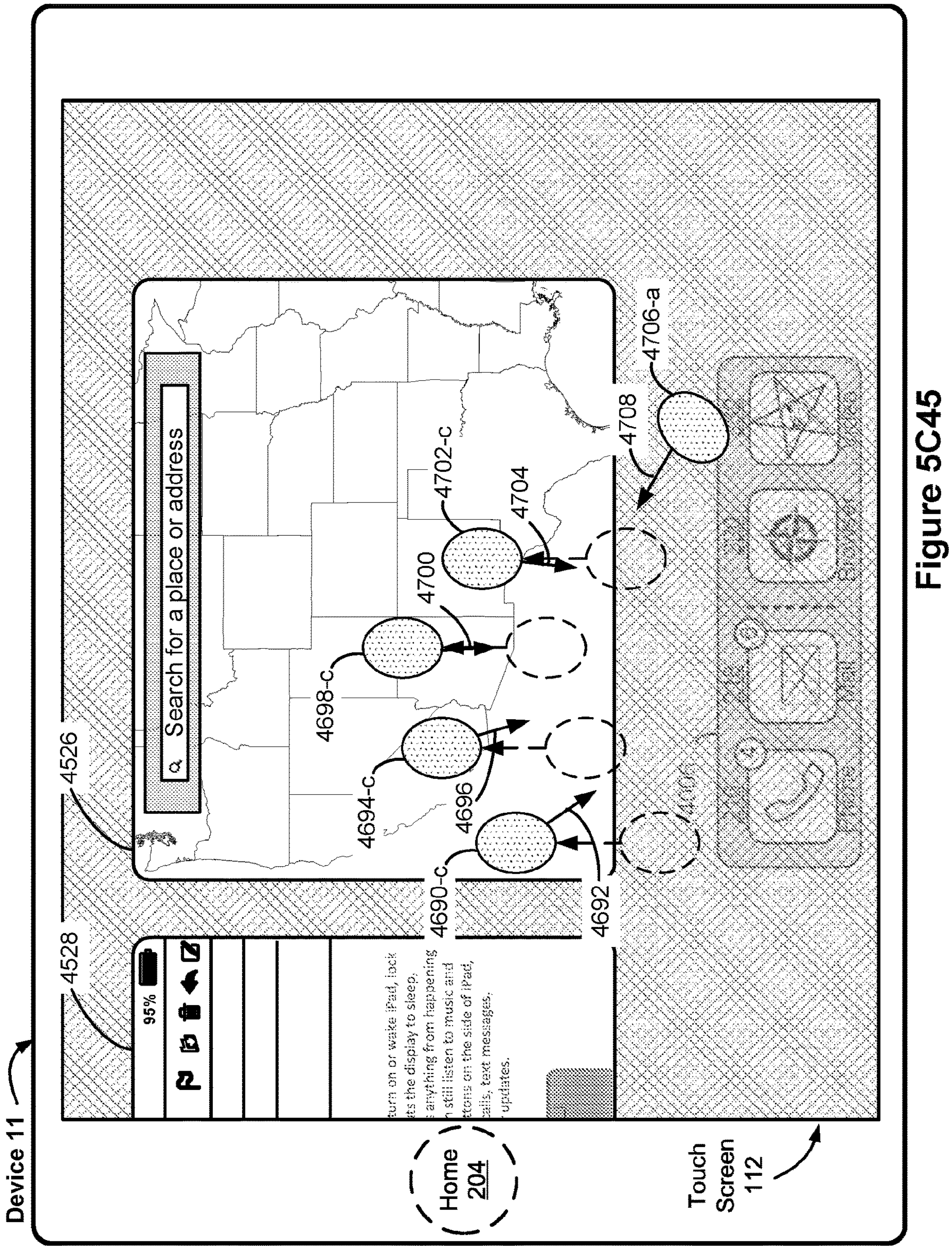
Figure 5C45

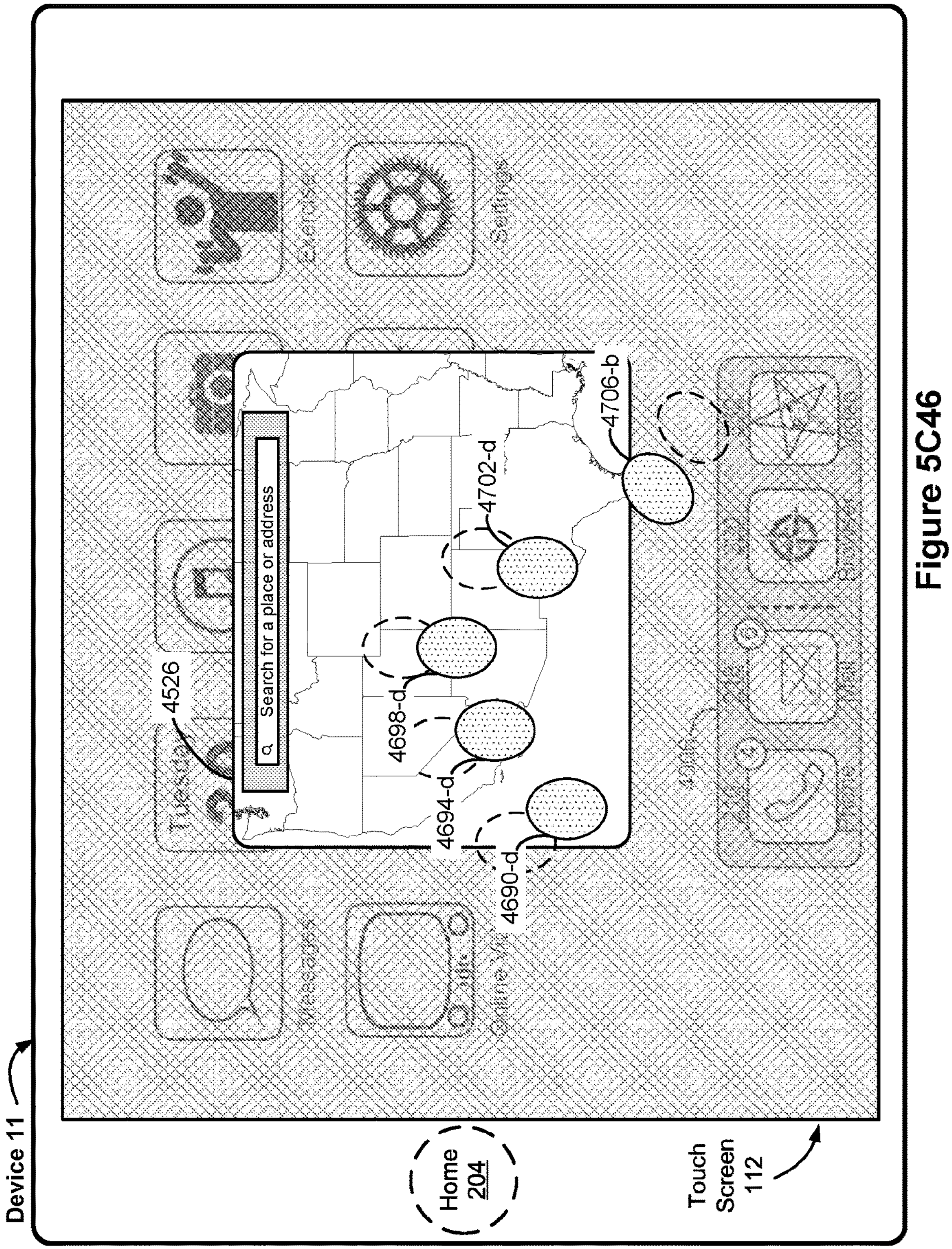
Figure 5C46

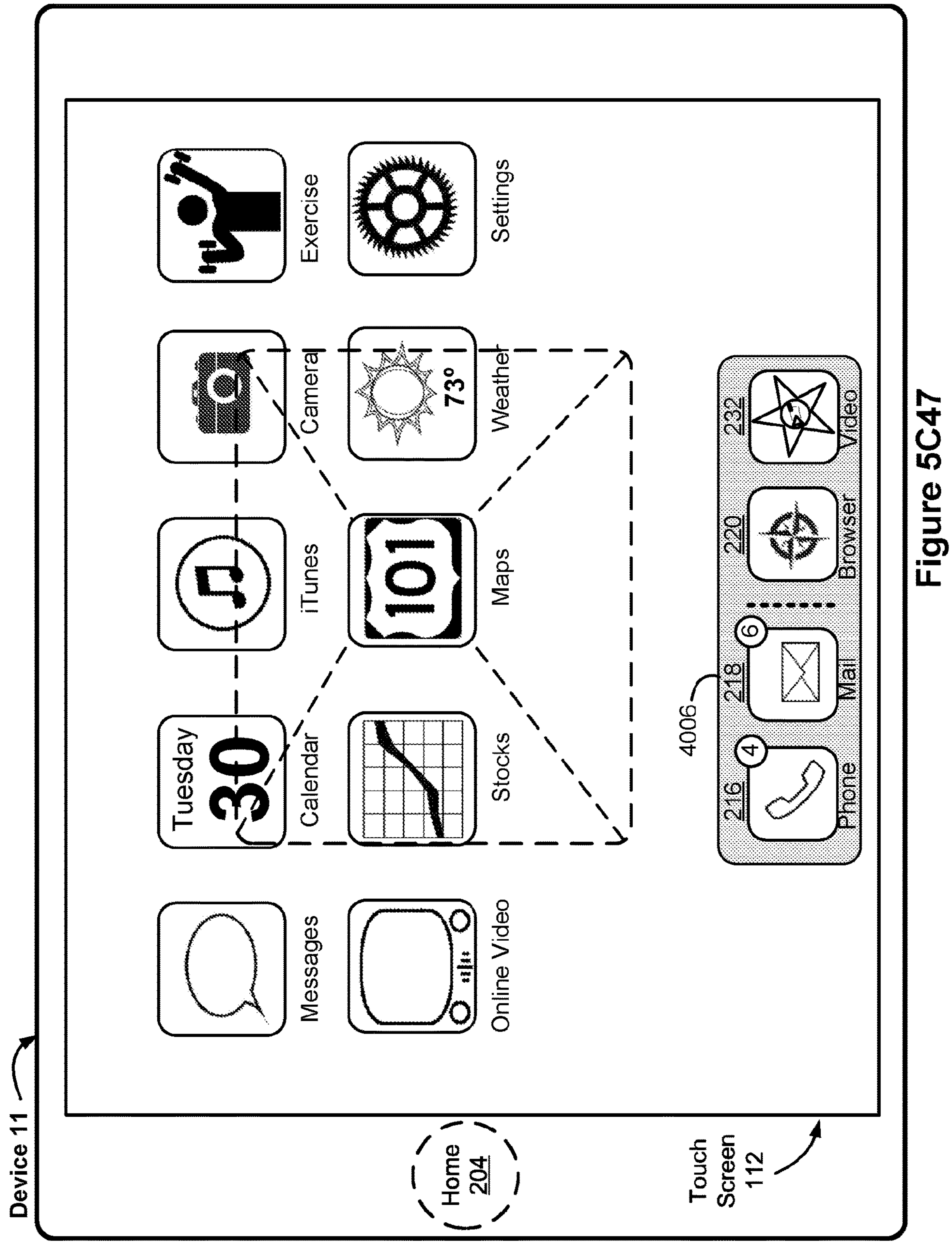
Figure 5C47

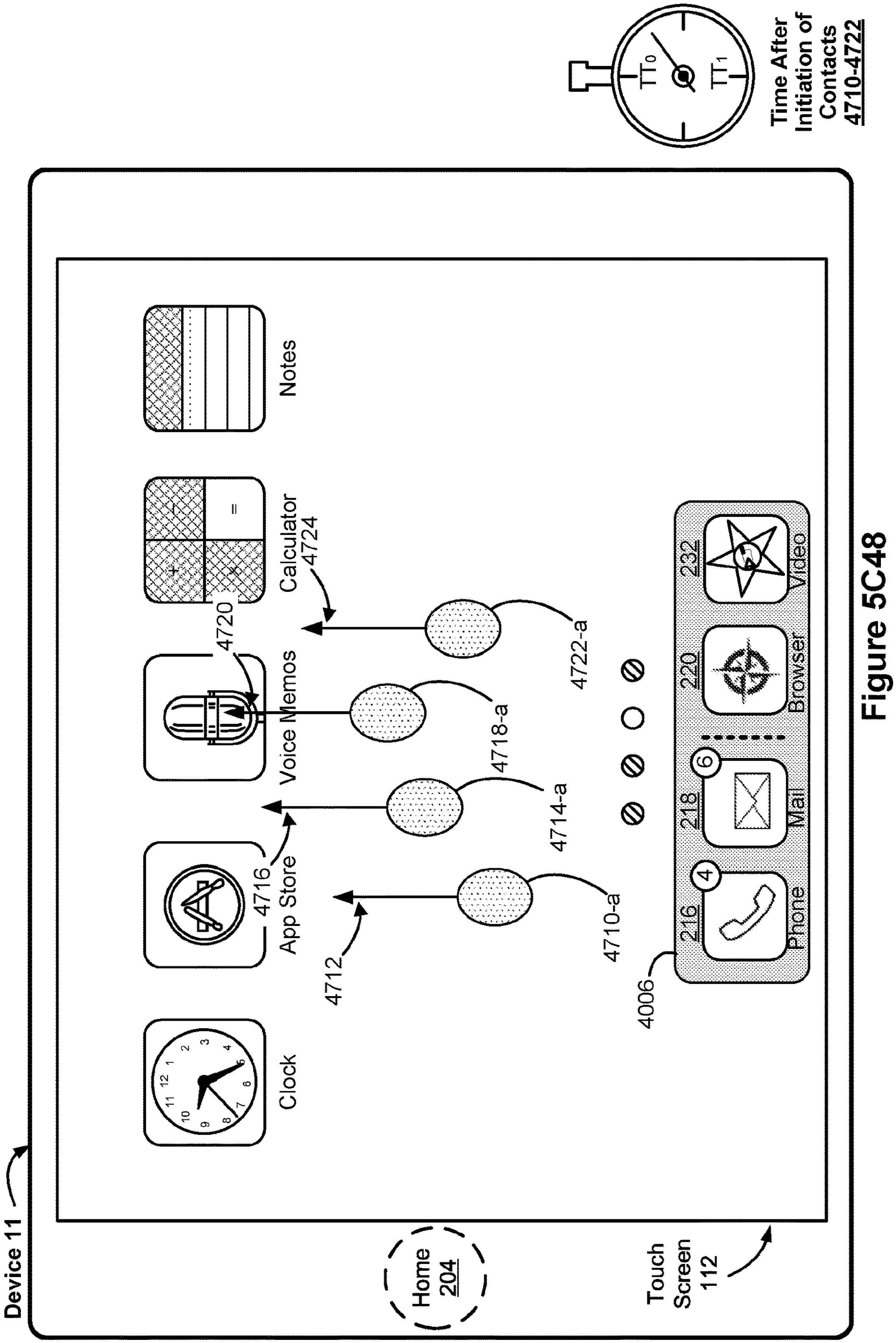
Figure 5C48

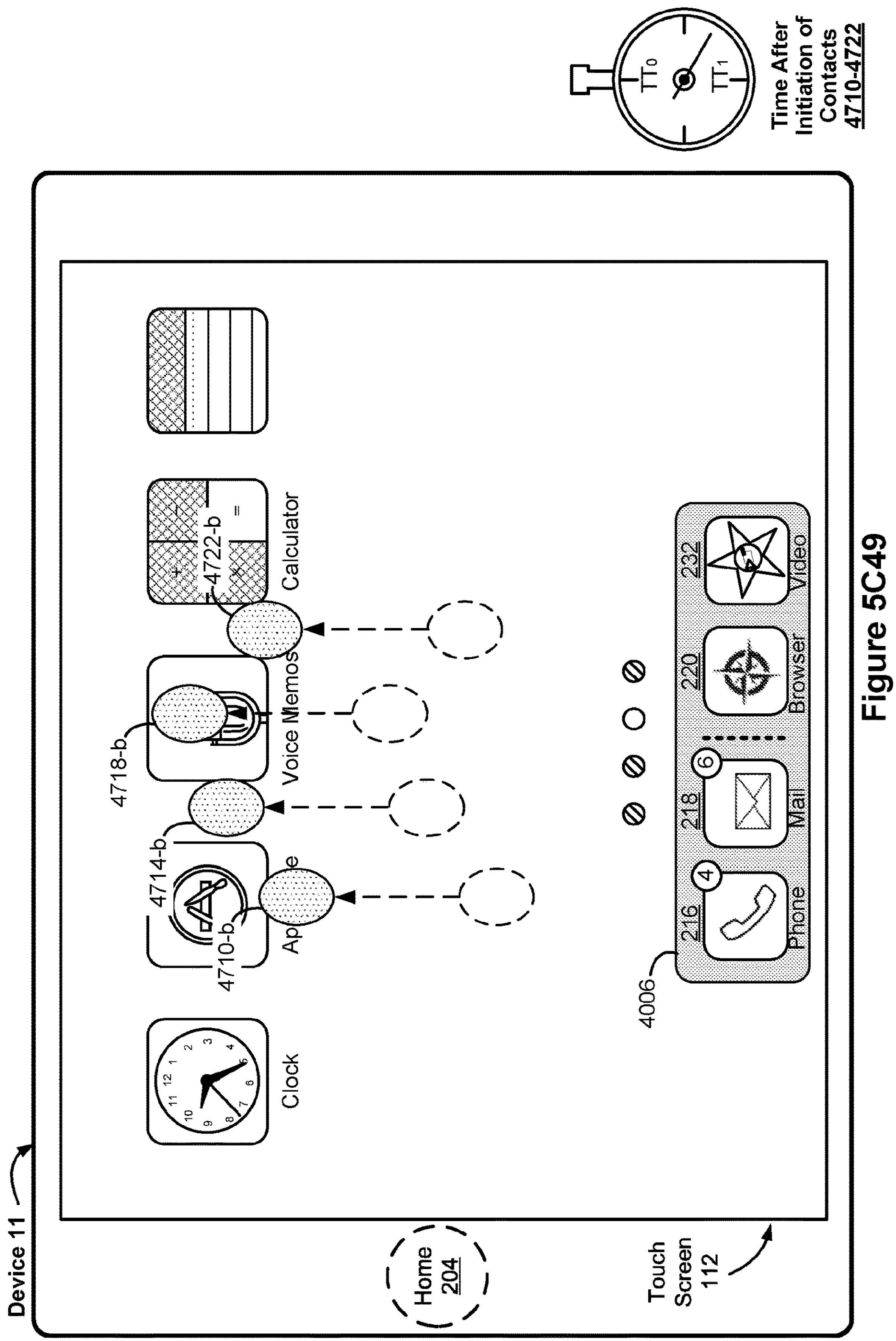
Figure 5C49

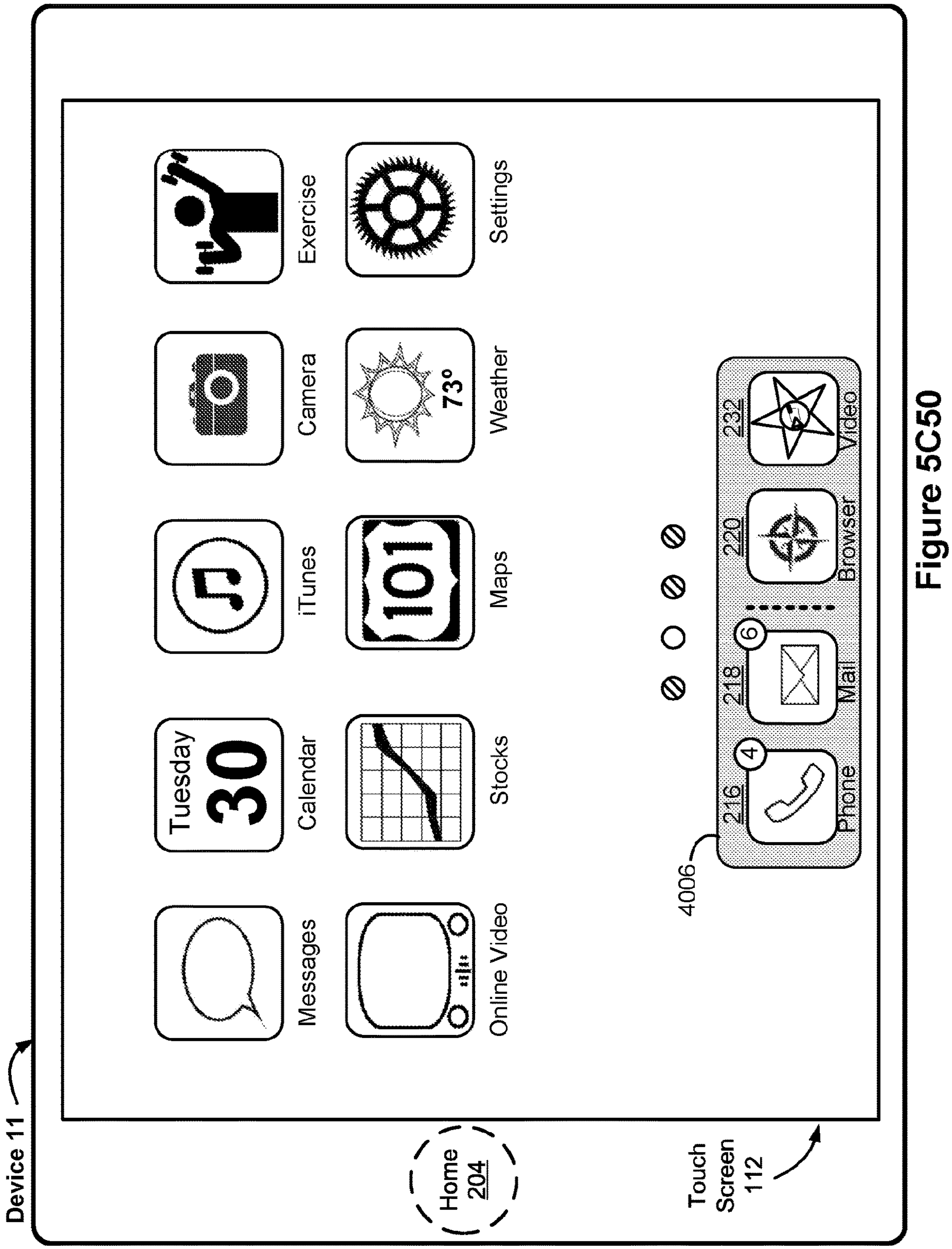
Figure 5C50

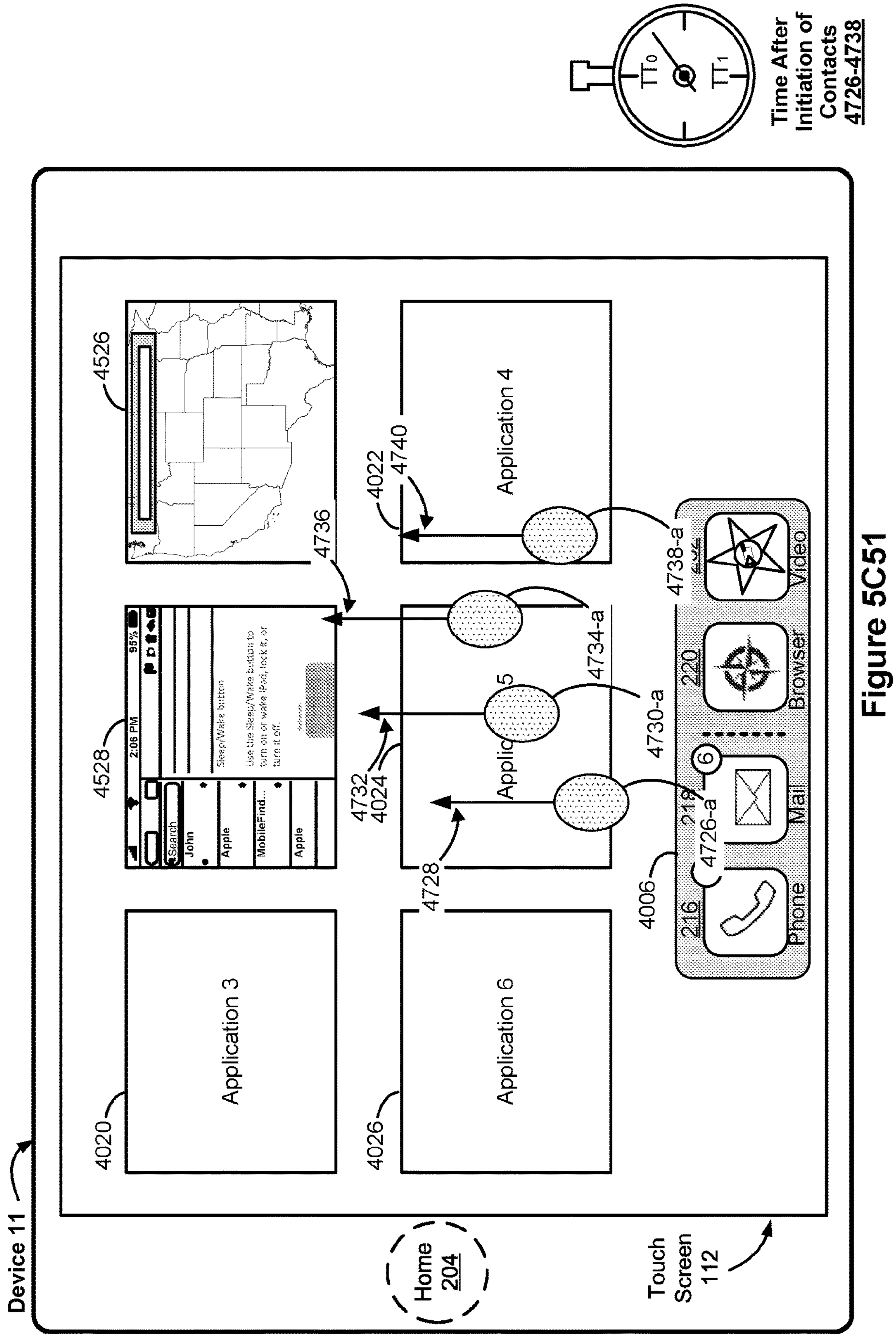
Figure 5C51

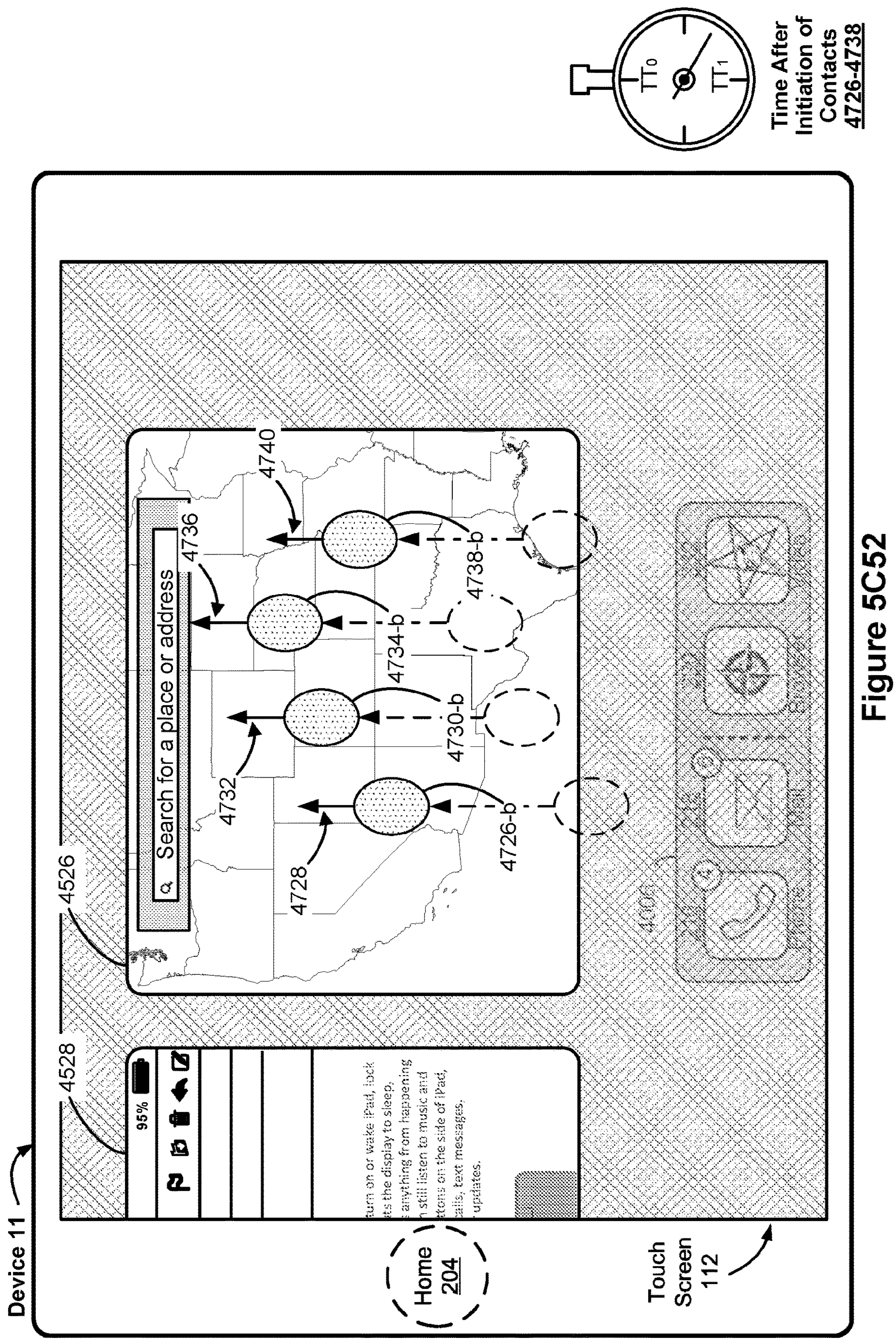
Figure 5C52

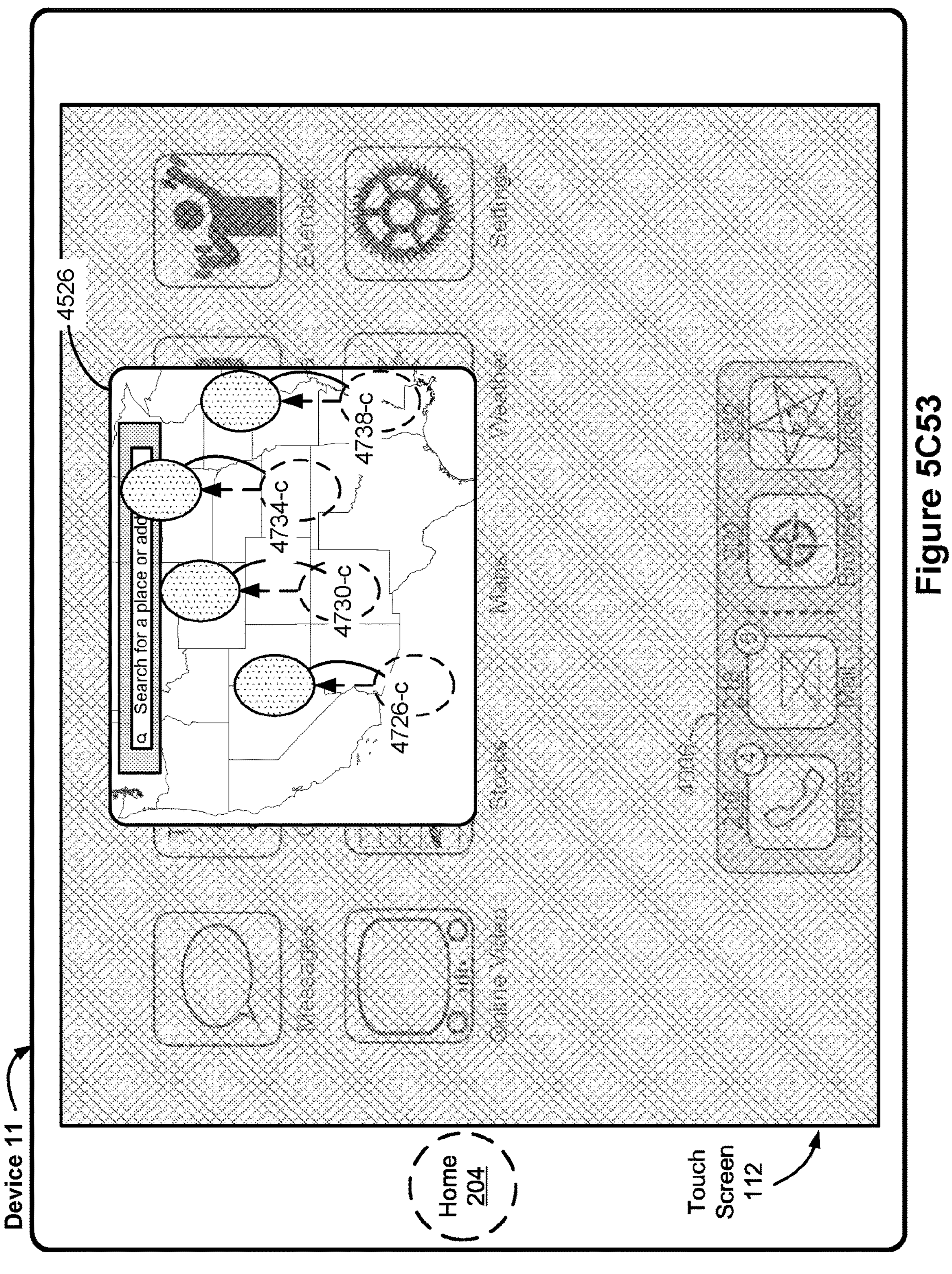
Figure 5C53

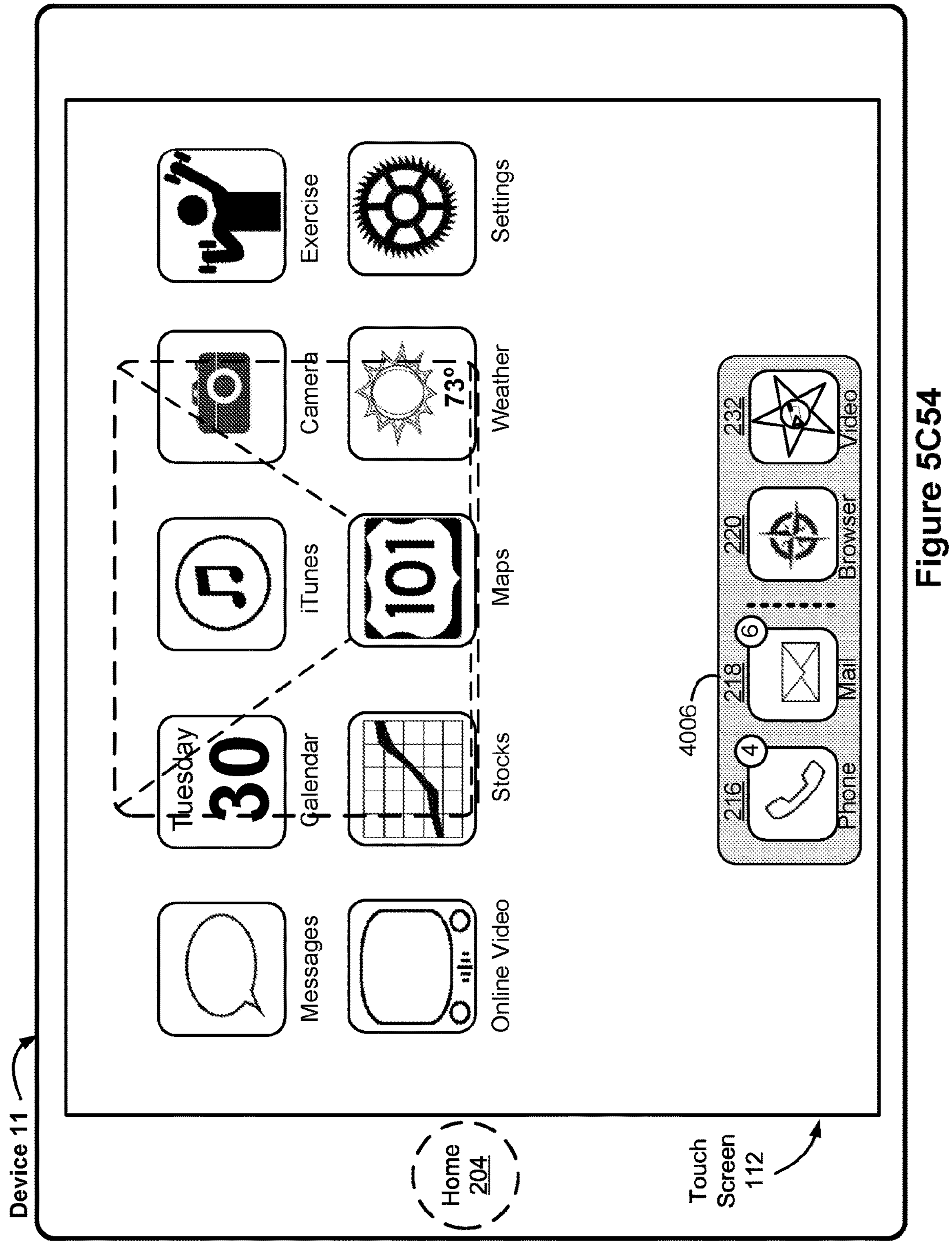
Figure 5C54

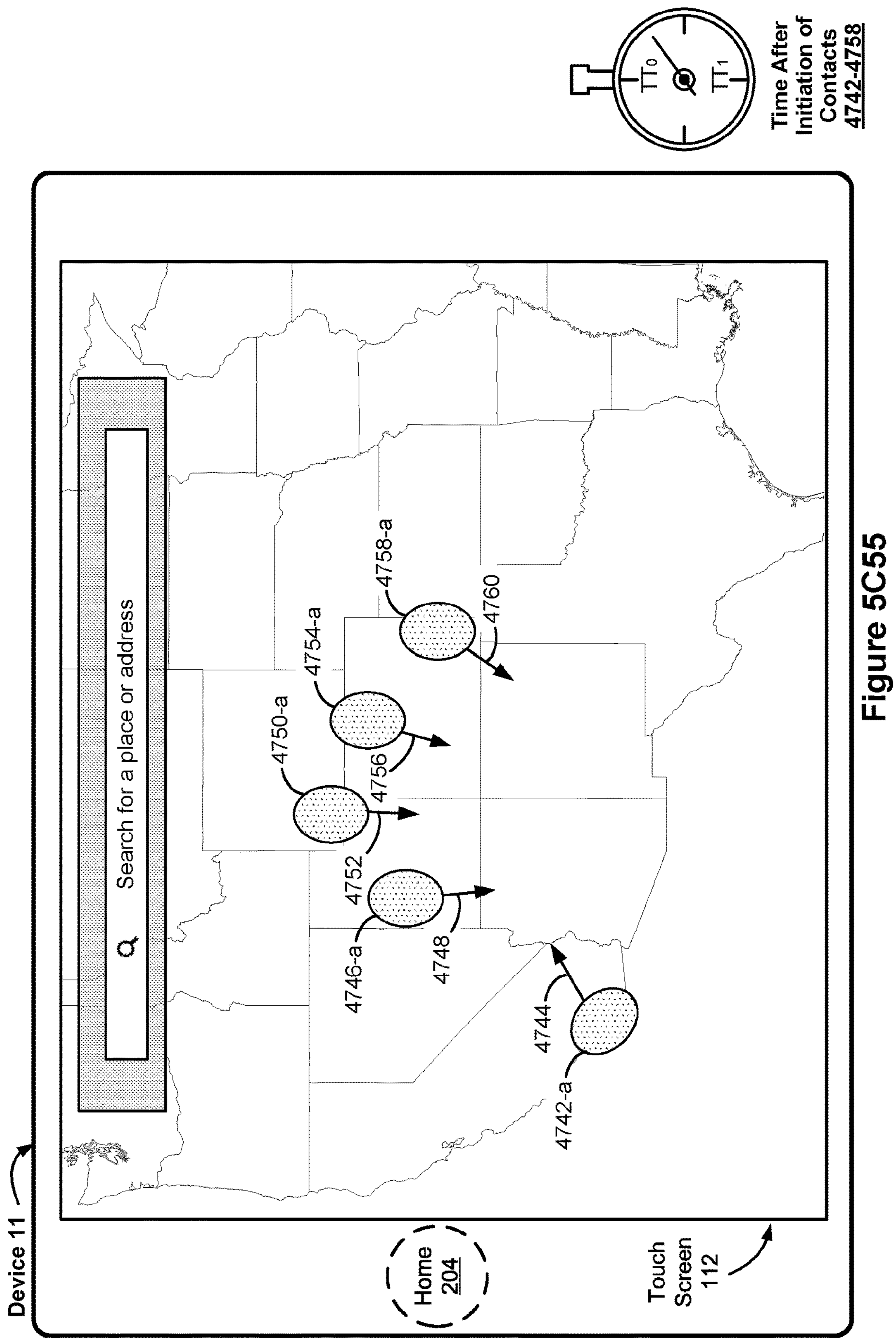
Figure 5C55

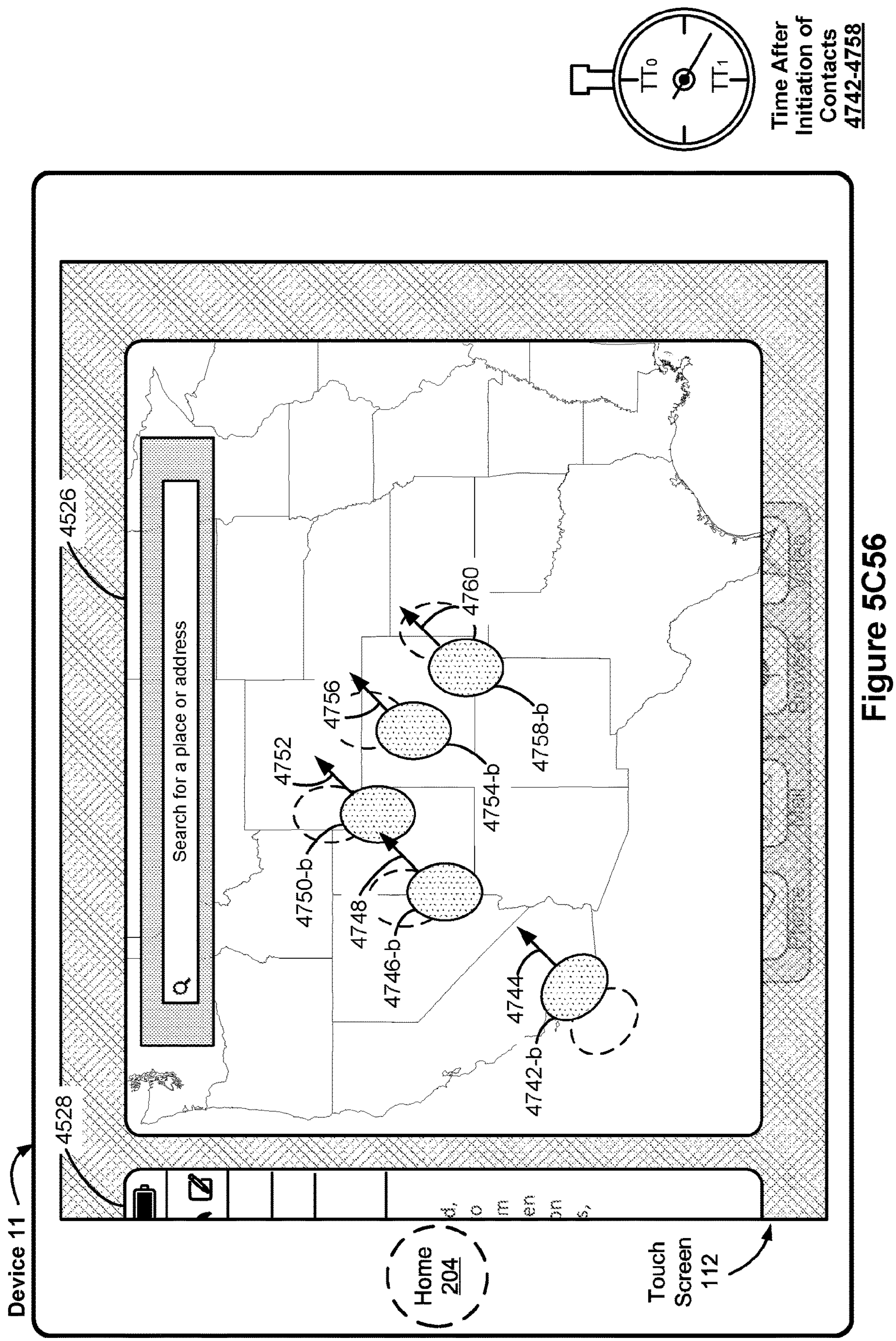
Figure 5C56

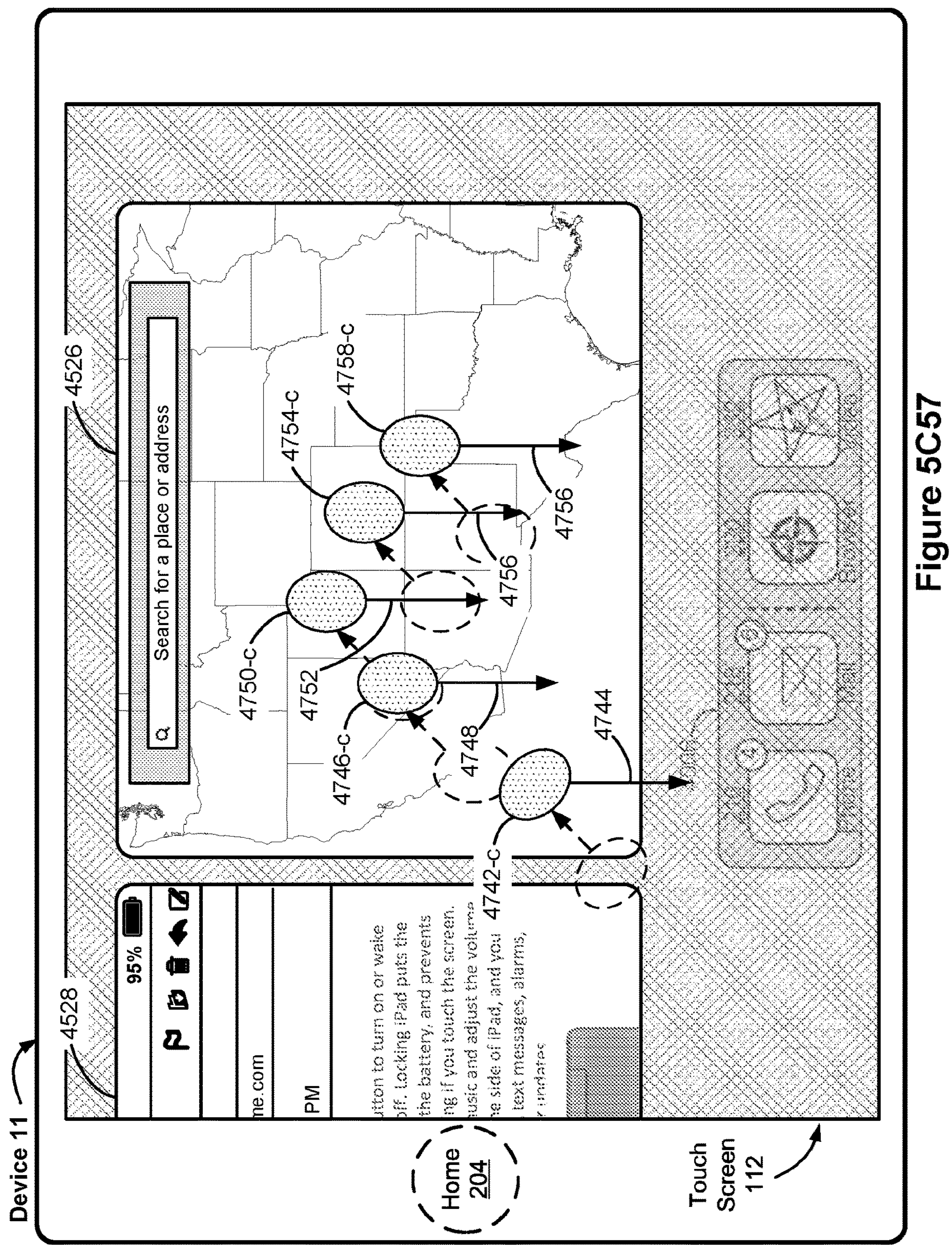
Figure 5C57

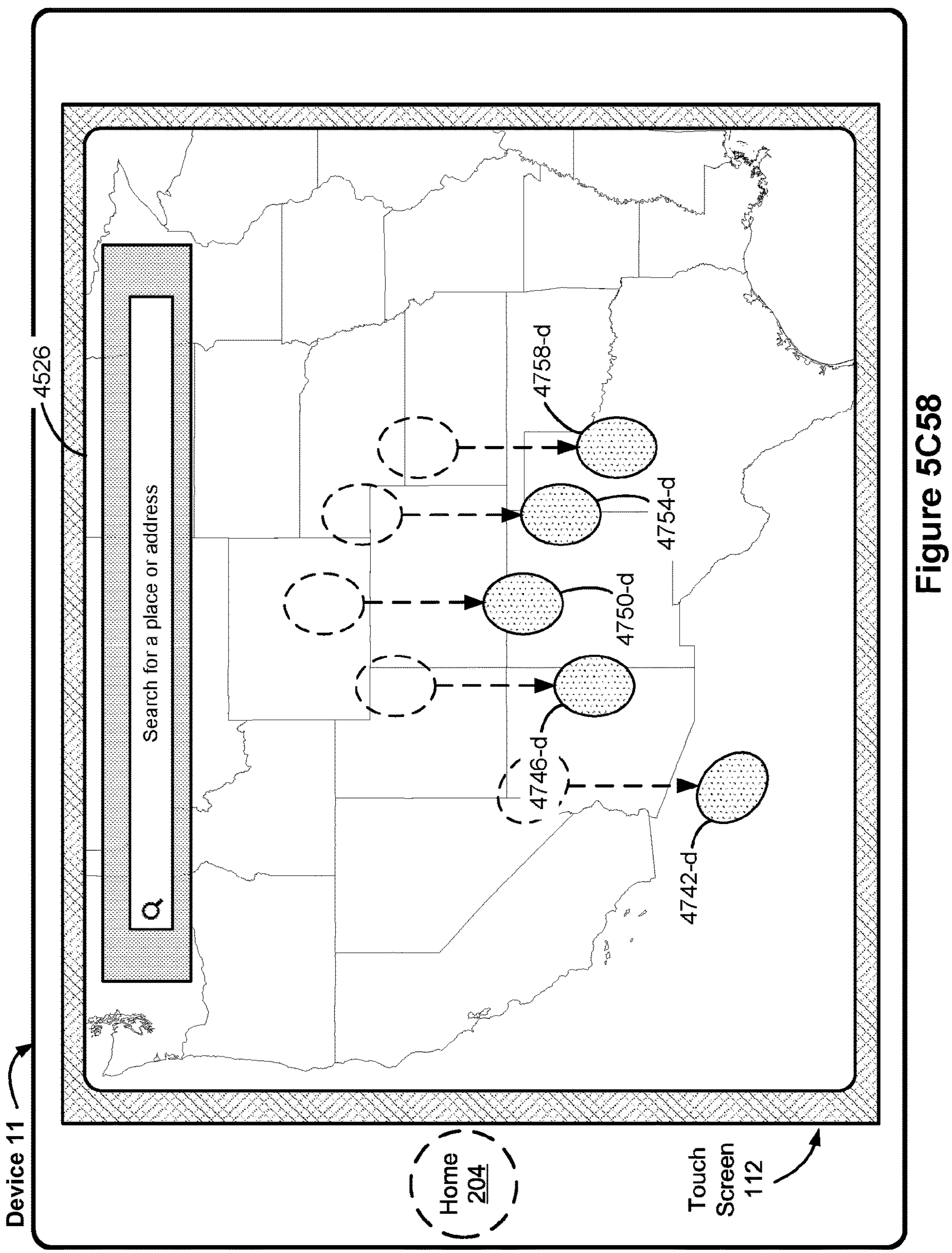
Figure 5C58

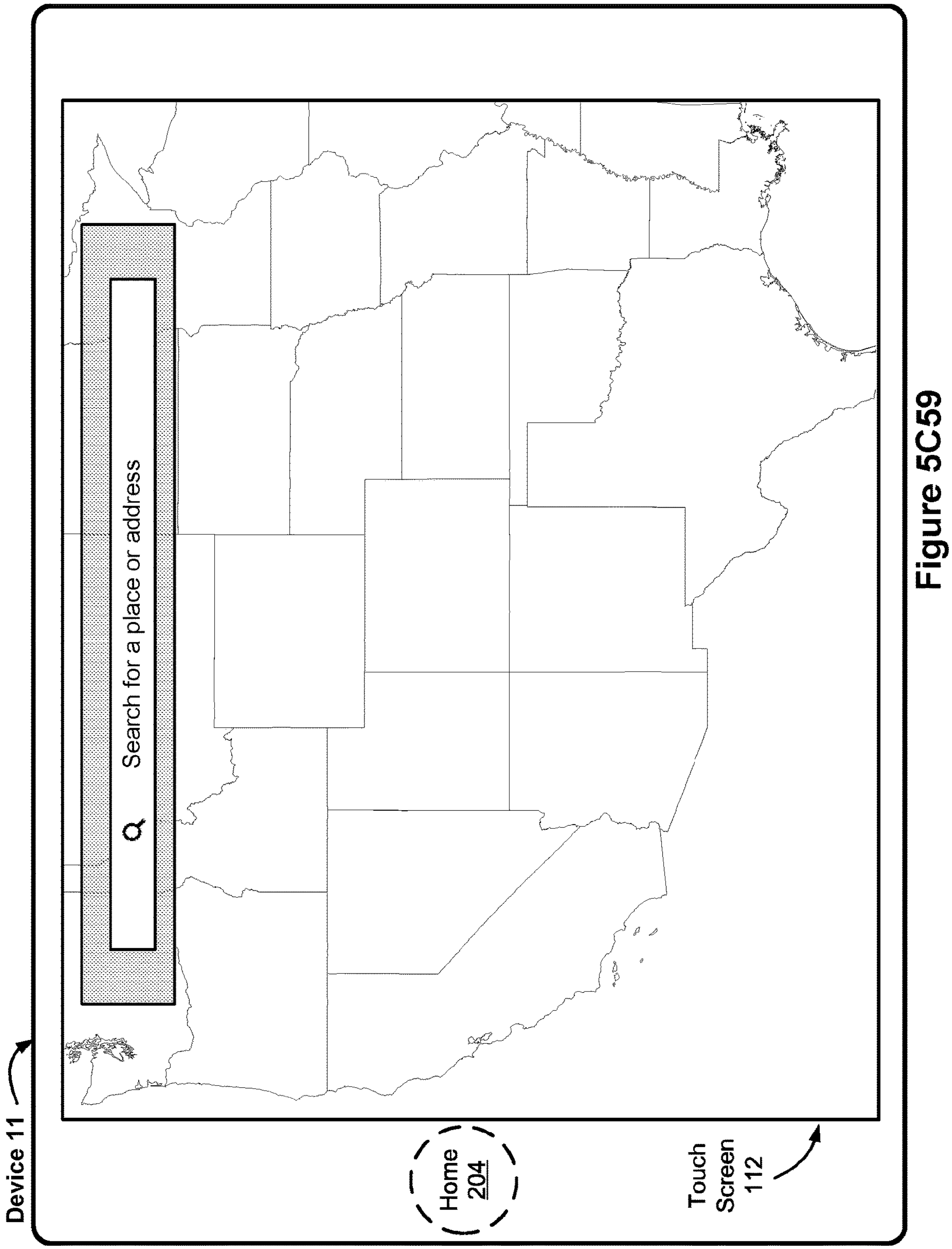
Figure 5C59

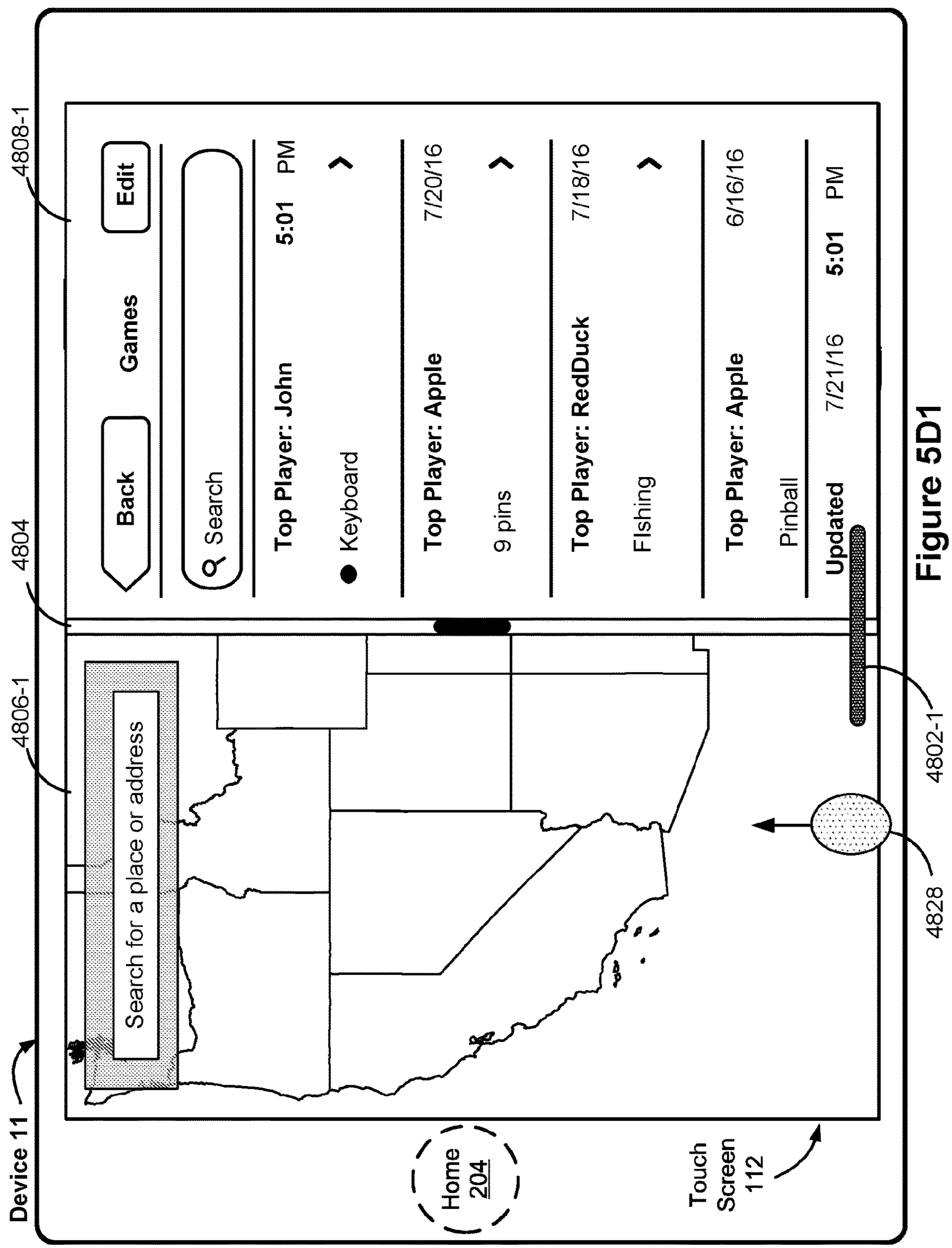
Figure 5D1

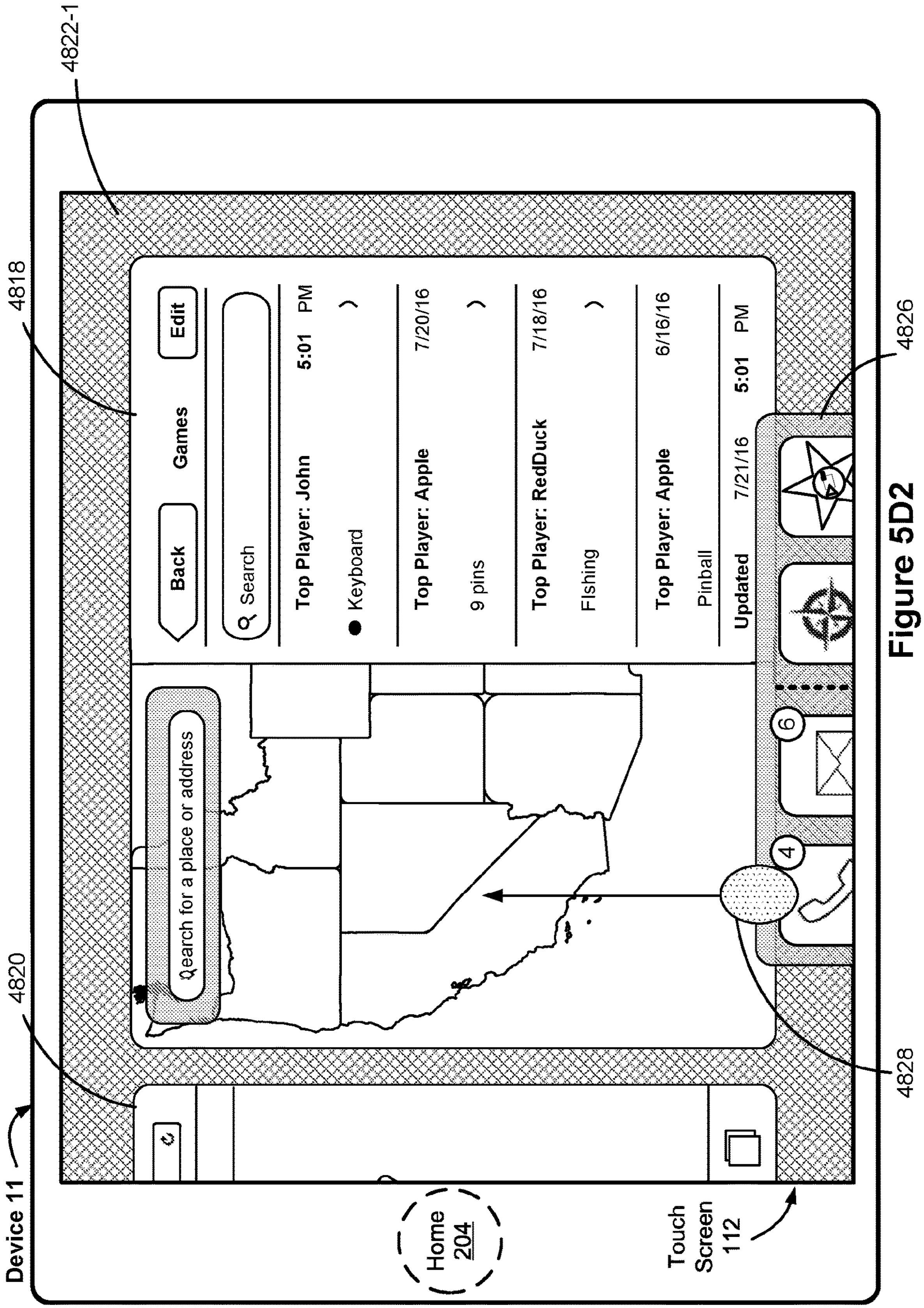
Figure 5D2

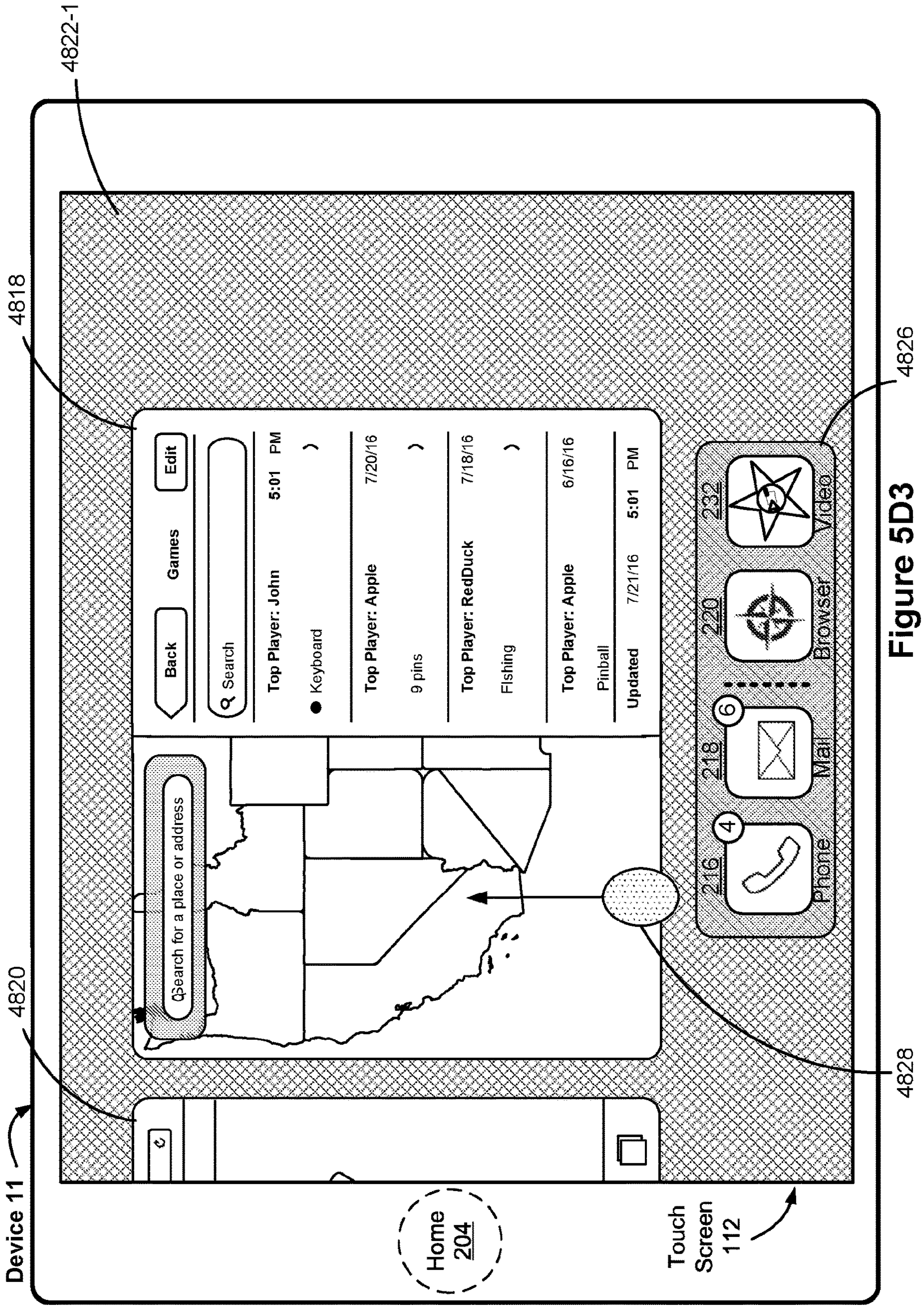
Figure 5D3

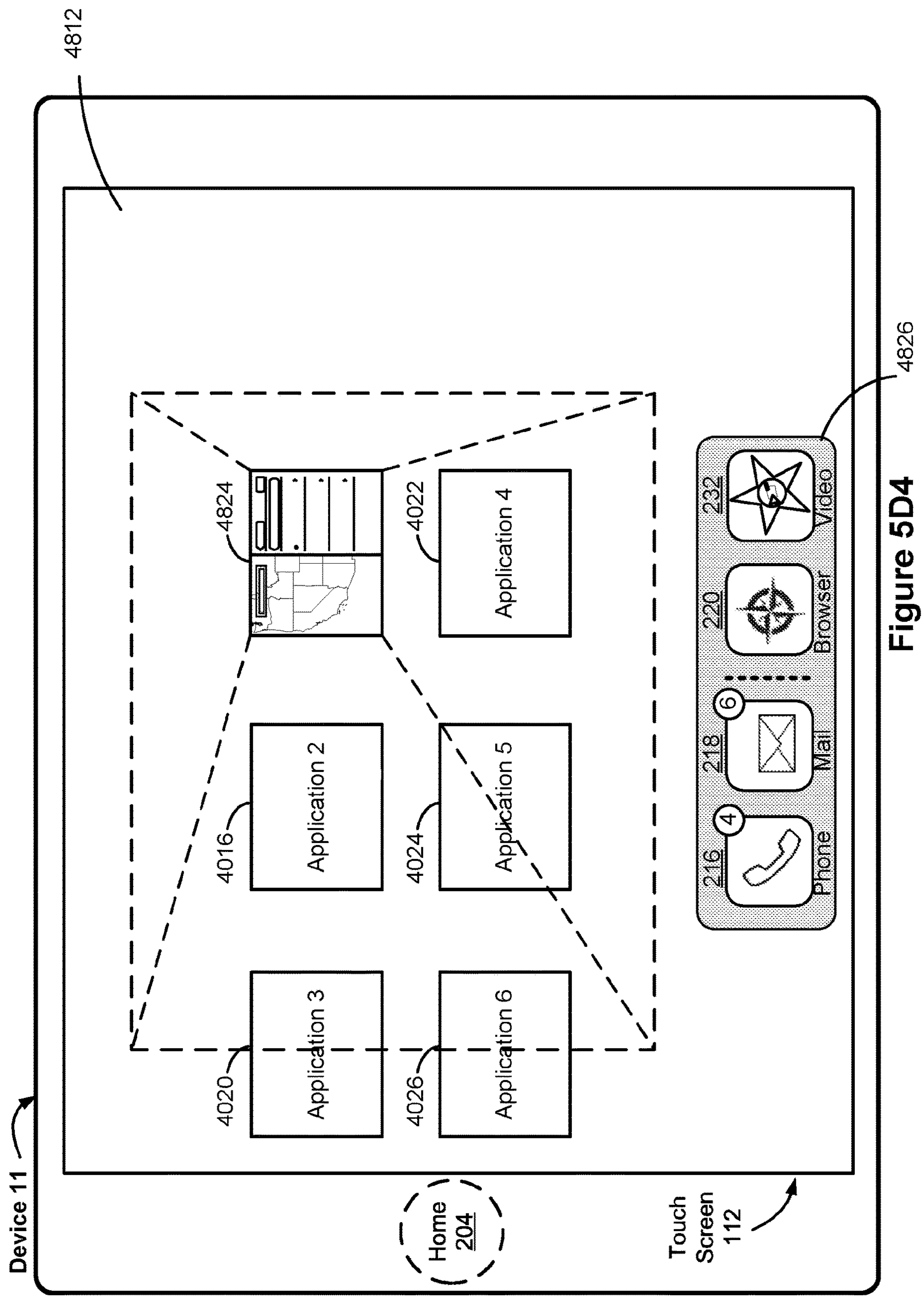
Figure 5D4

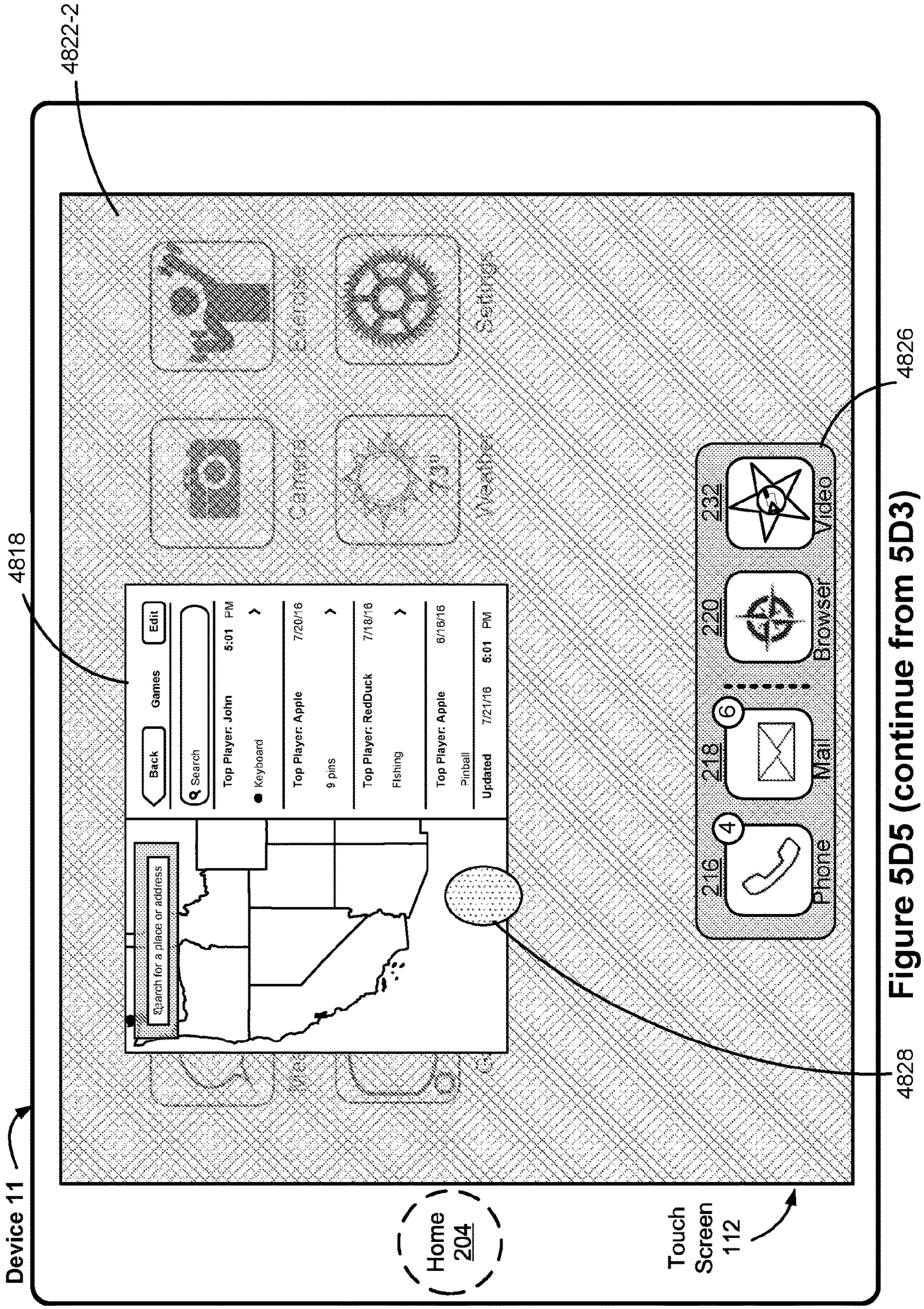
Figure 5D5 (continue from 5D3)

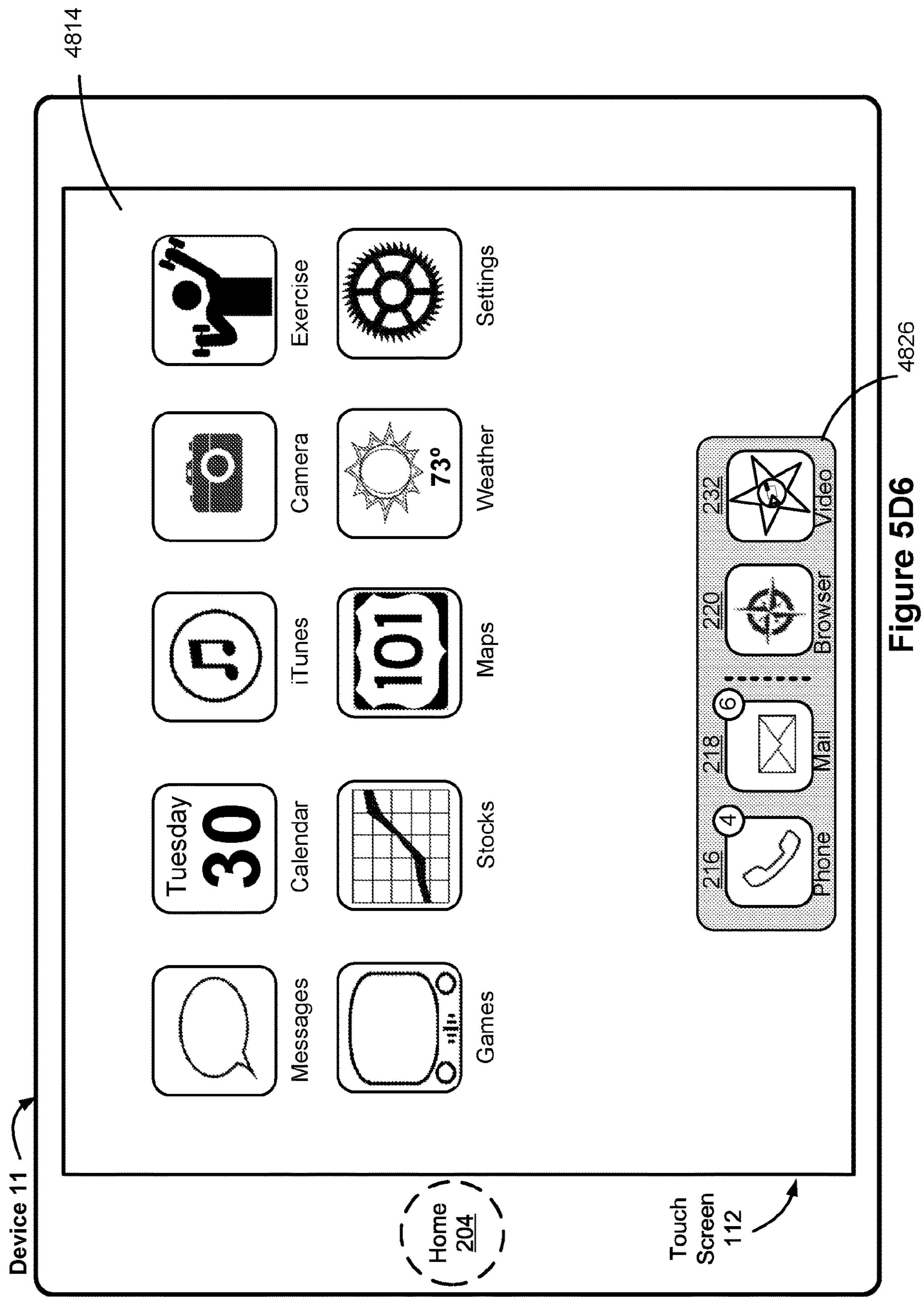
Figure 5D6

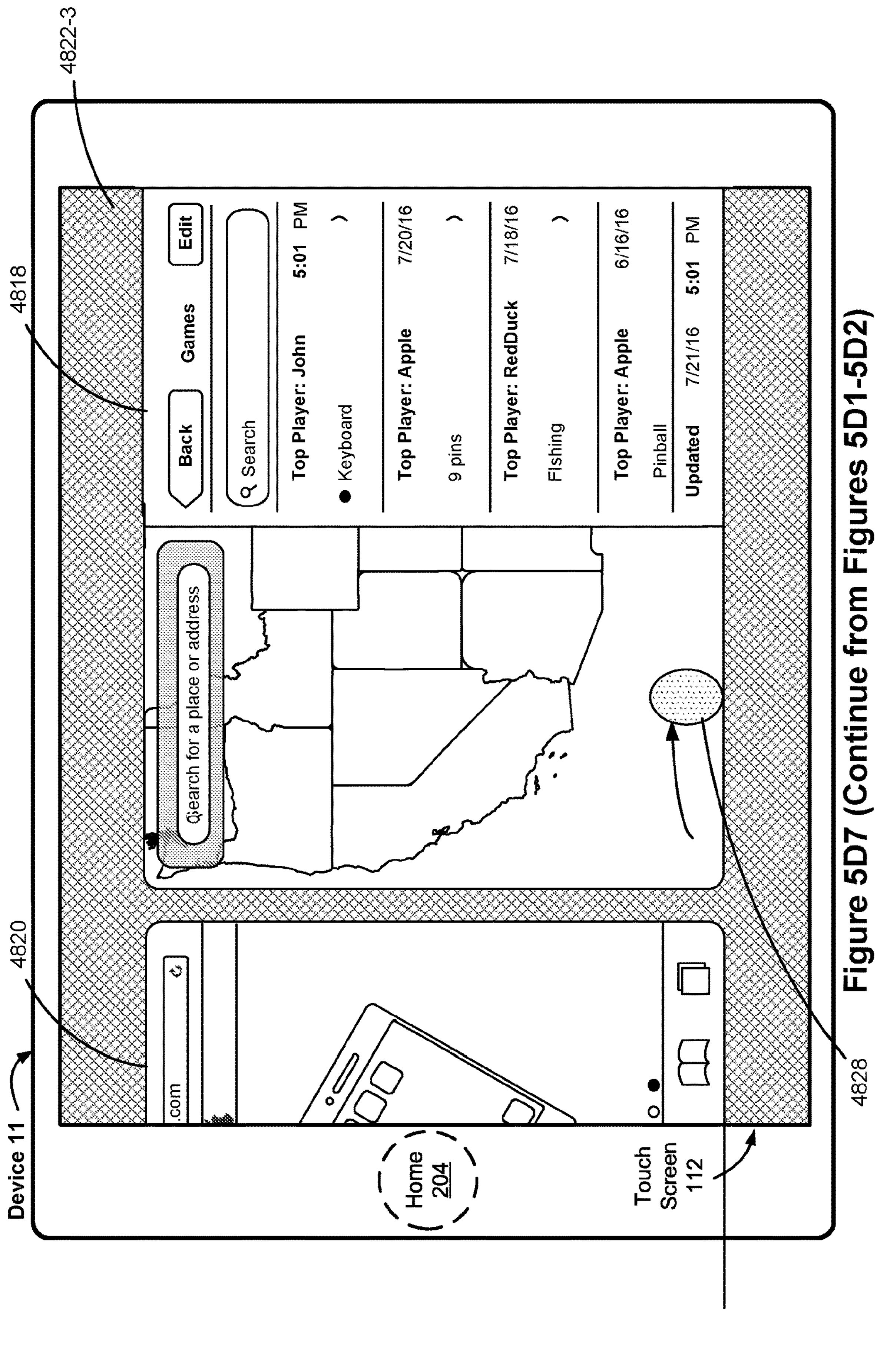
Figure 5D7 (Continue from Figures 5D1-5D2)

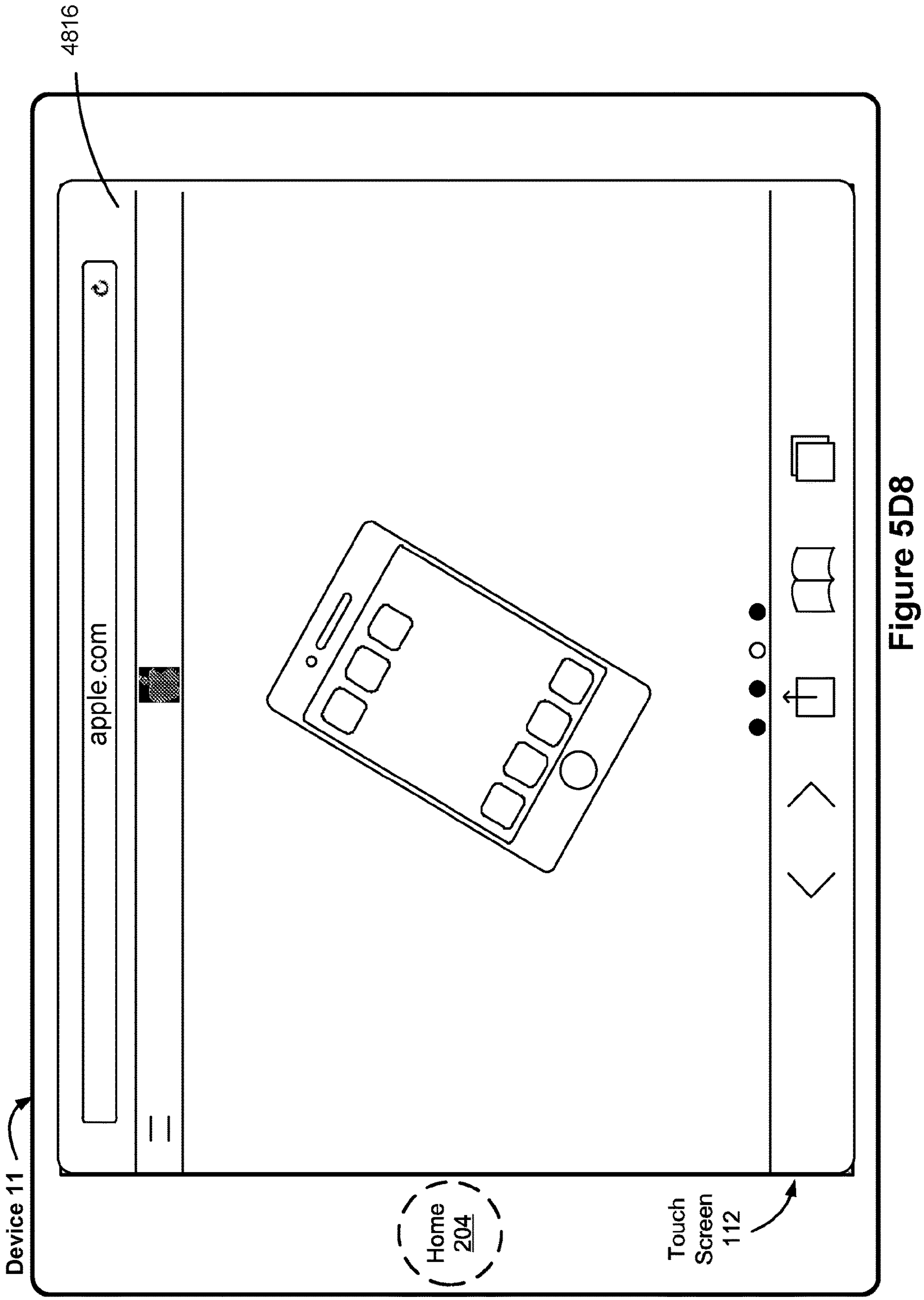
Figure 5D8

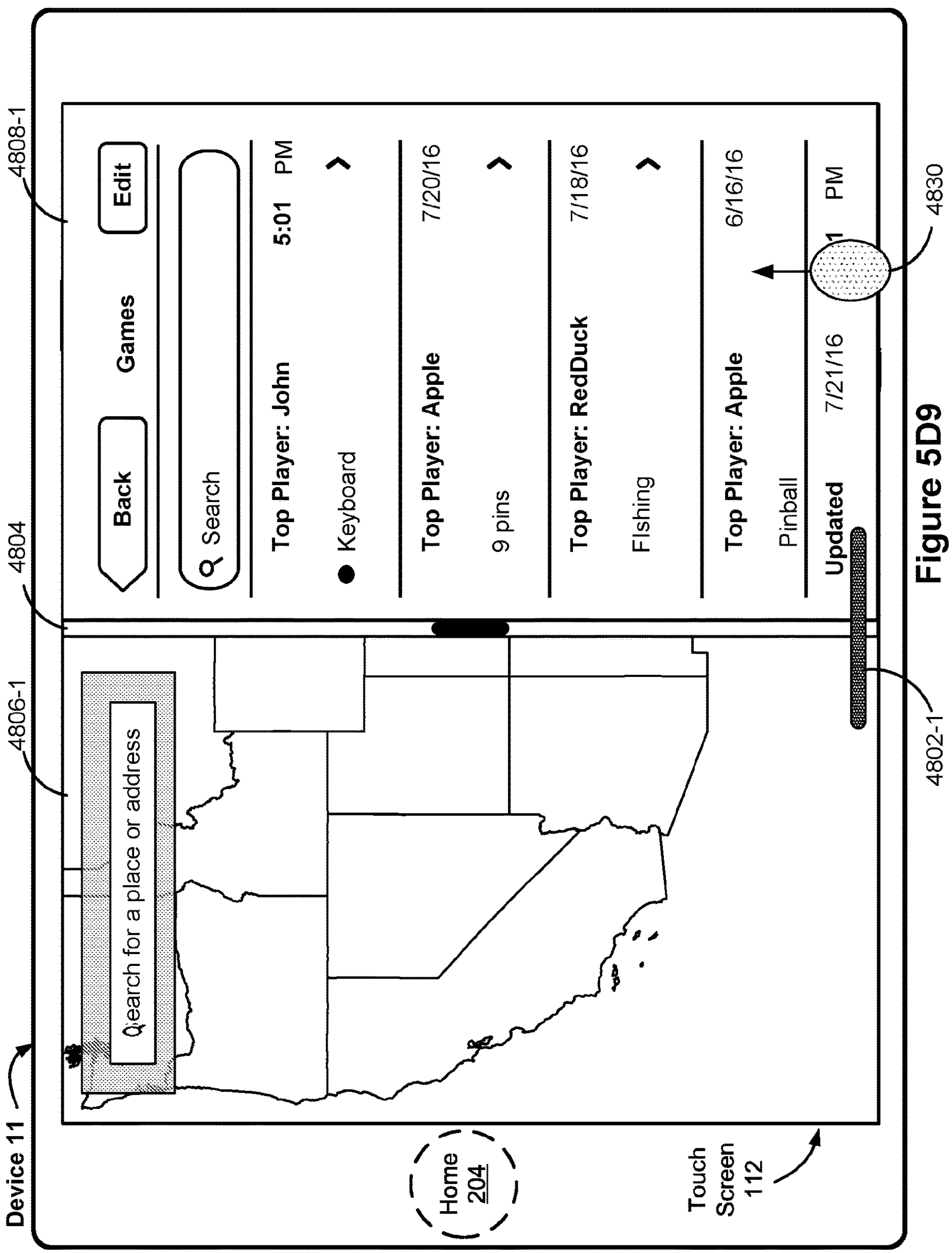
Figure 5D9

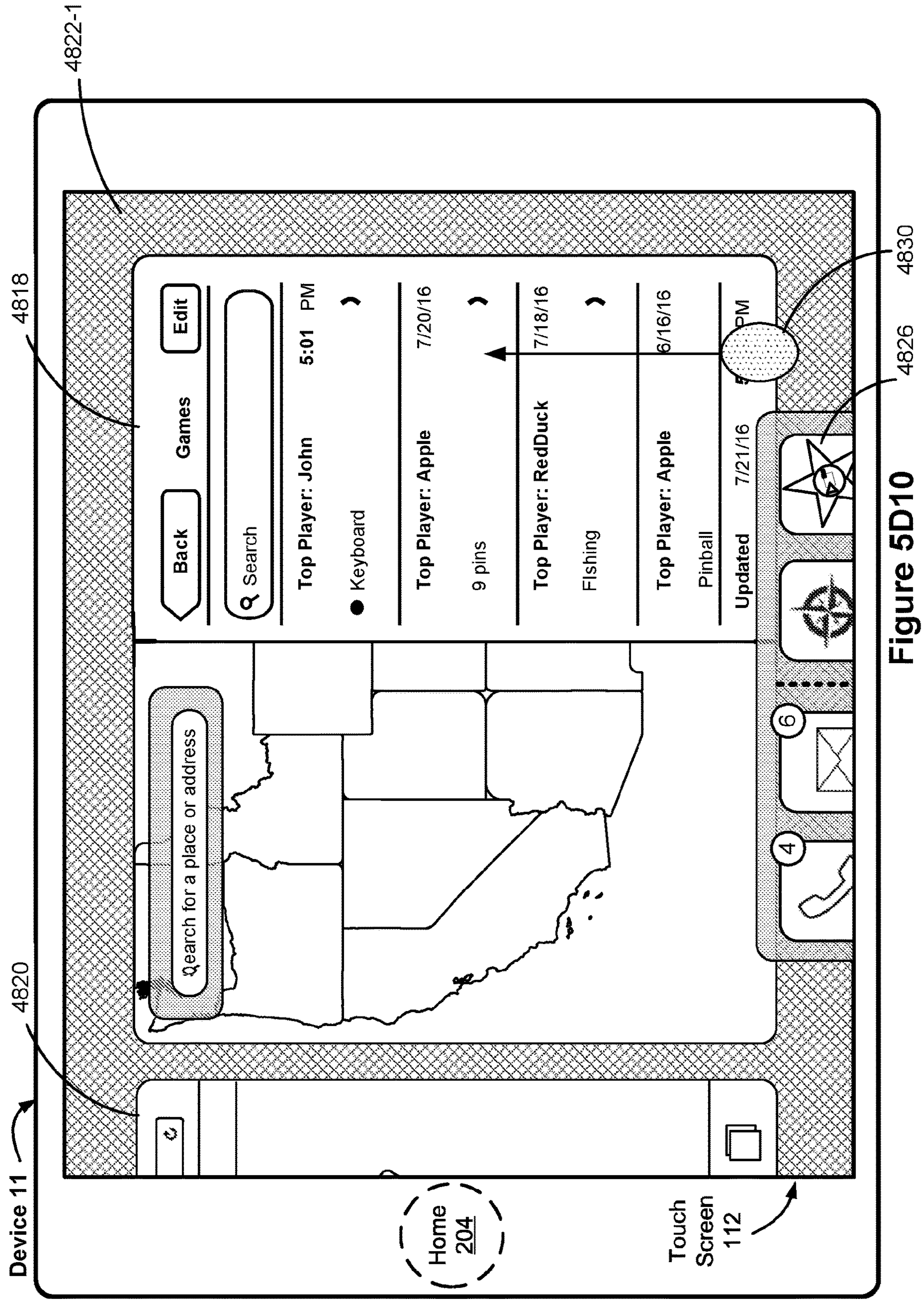
Figure 5D10

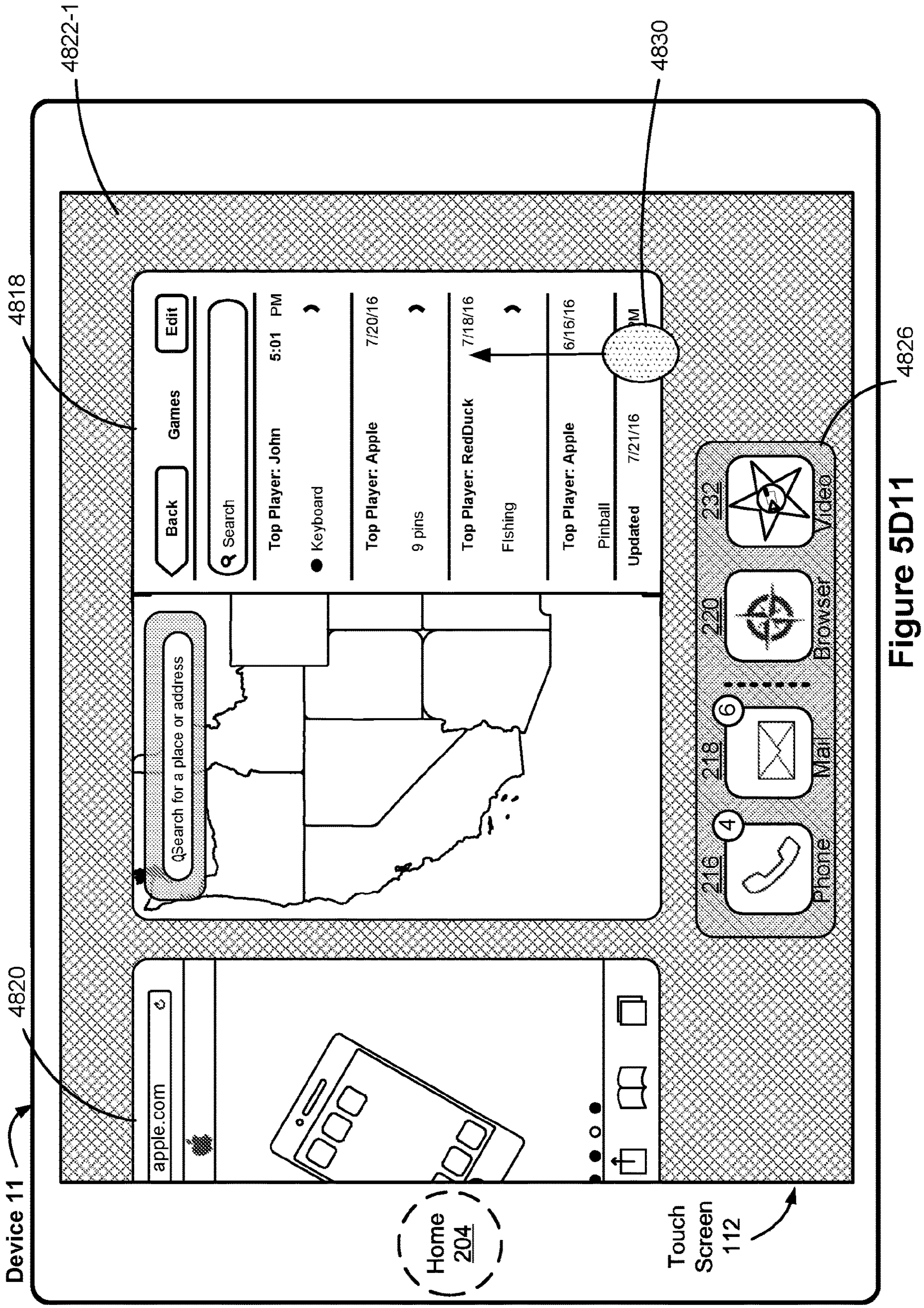
Figure 5D11

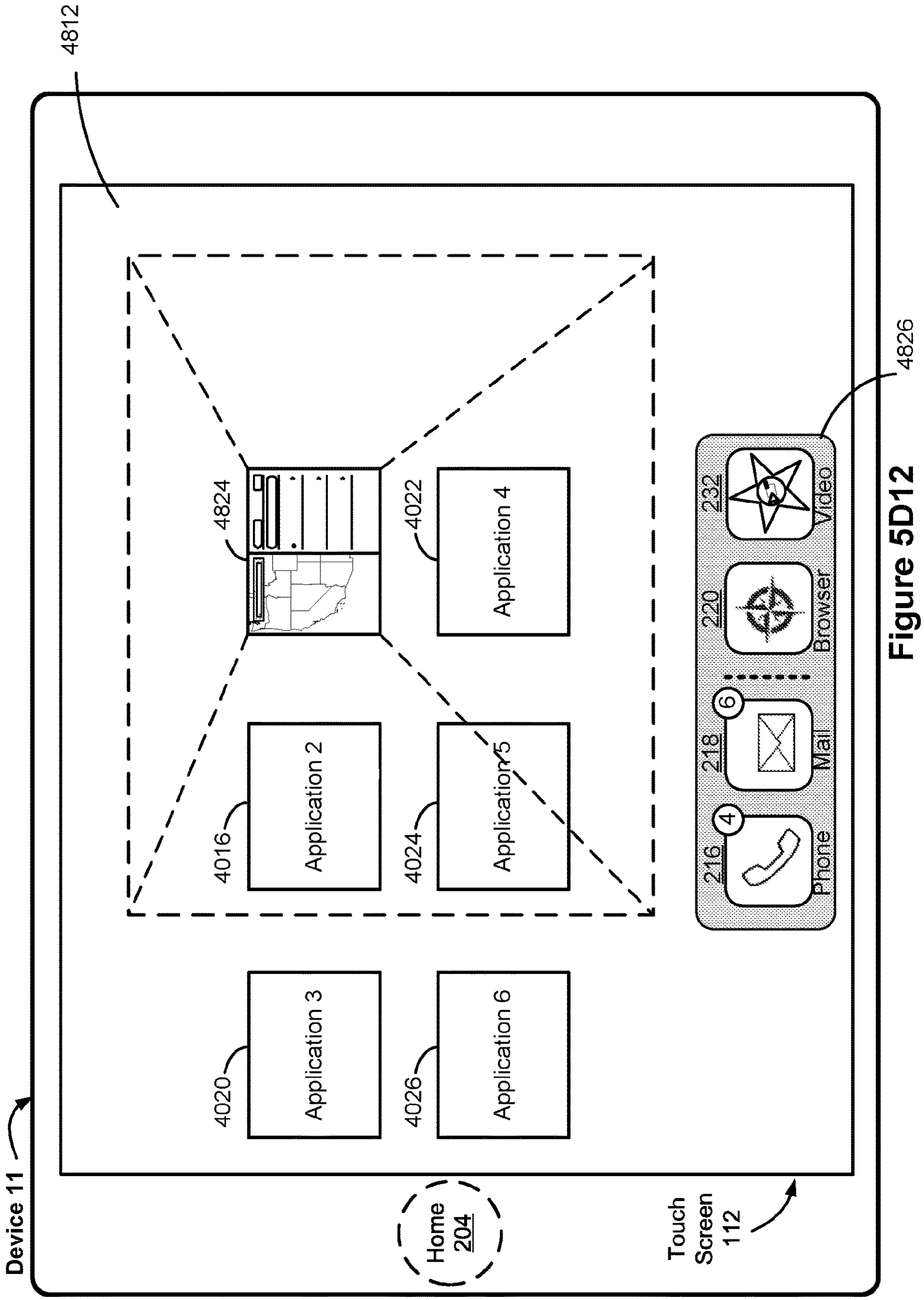
Figure 5D12

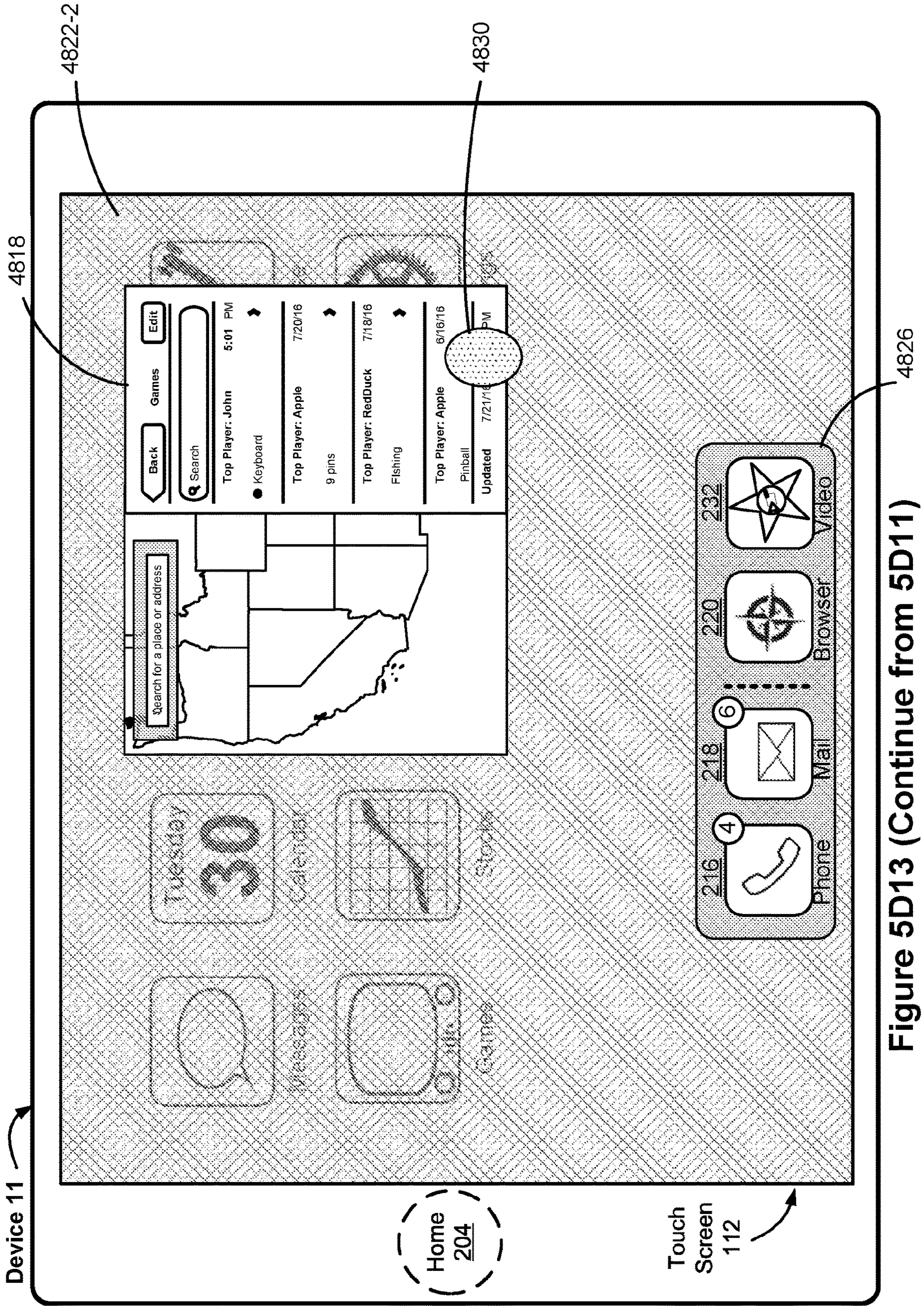
Figure 5D13 (Continue from 5D11)

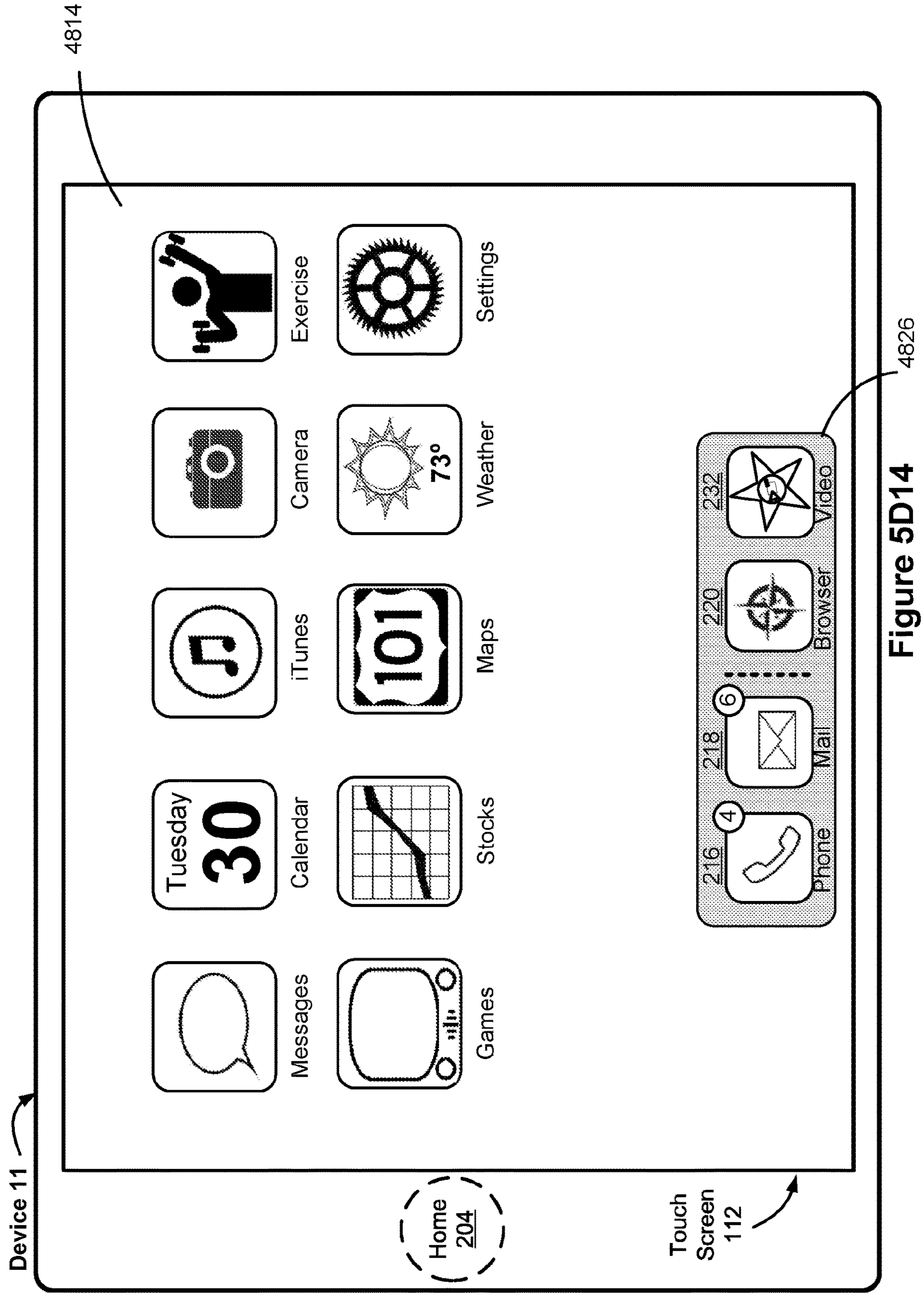
Figure 5D14

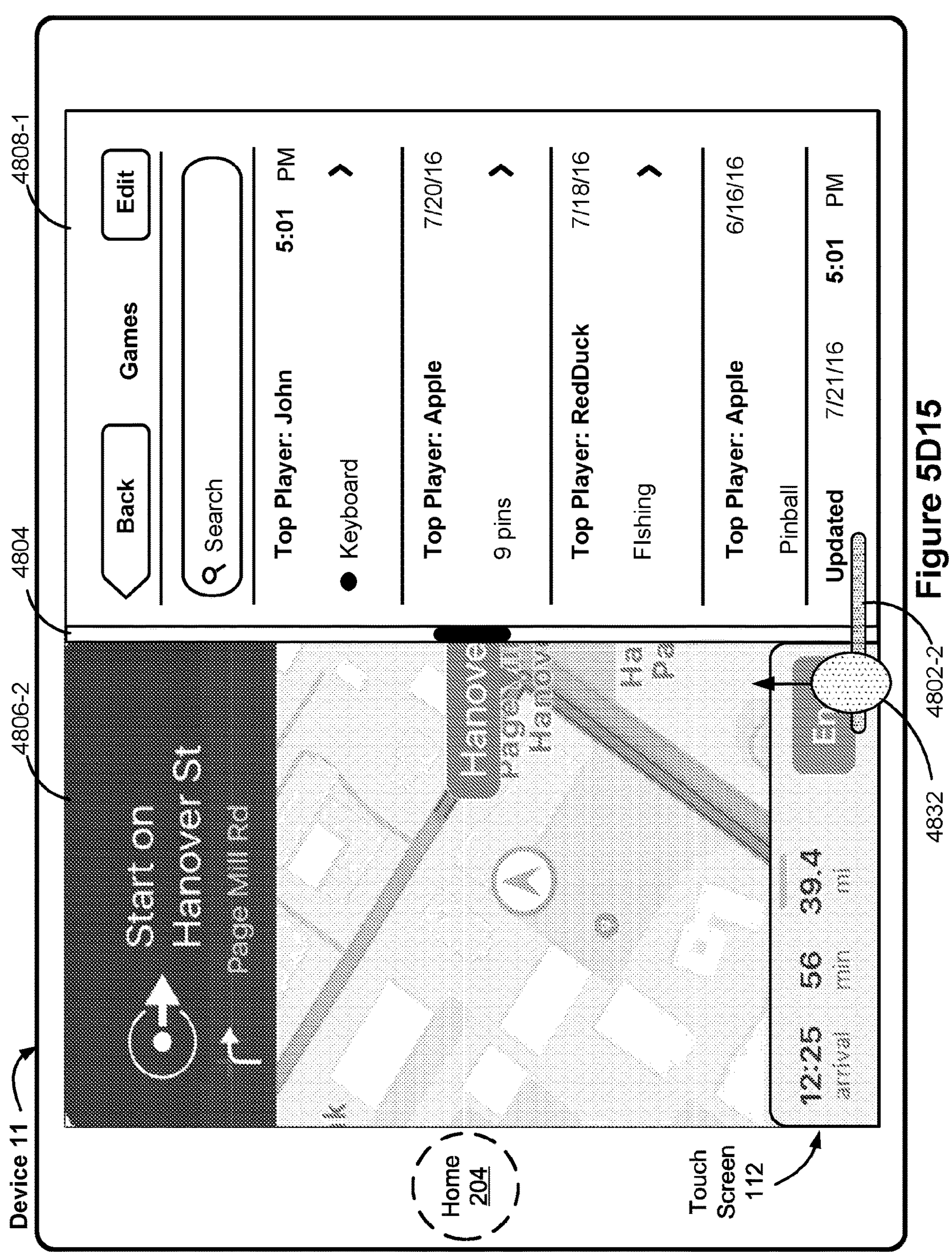
Figure 5D15

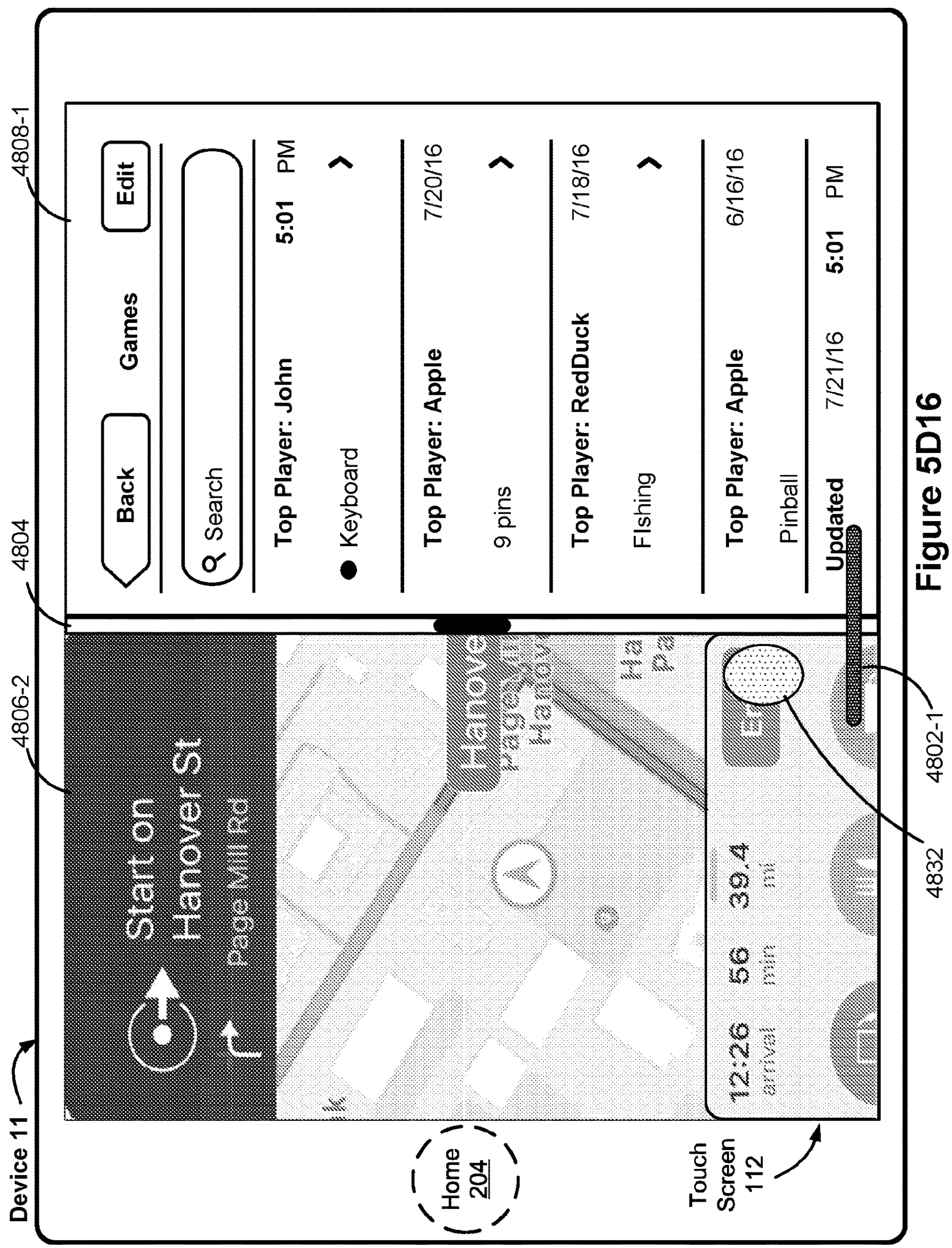
Figure 5D16

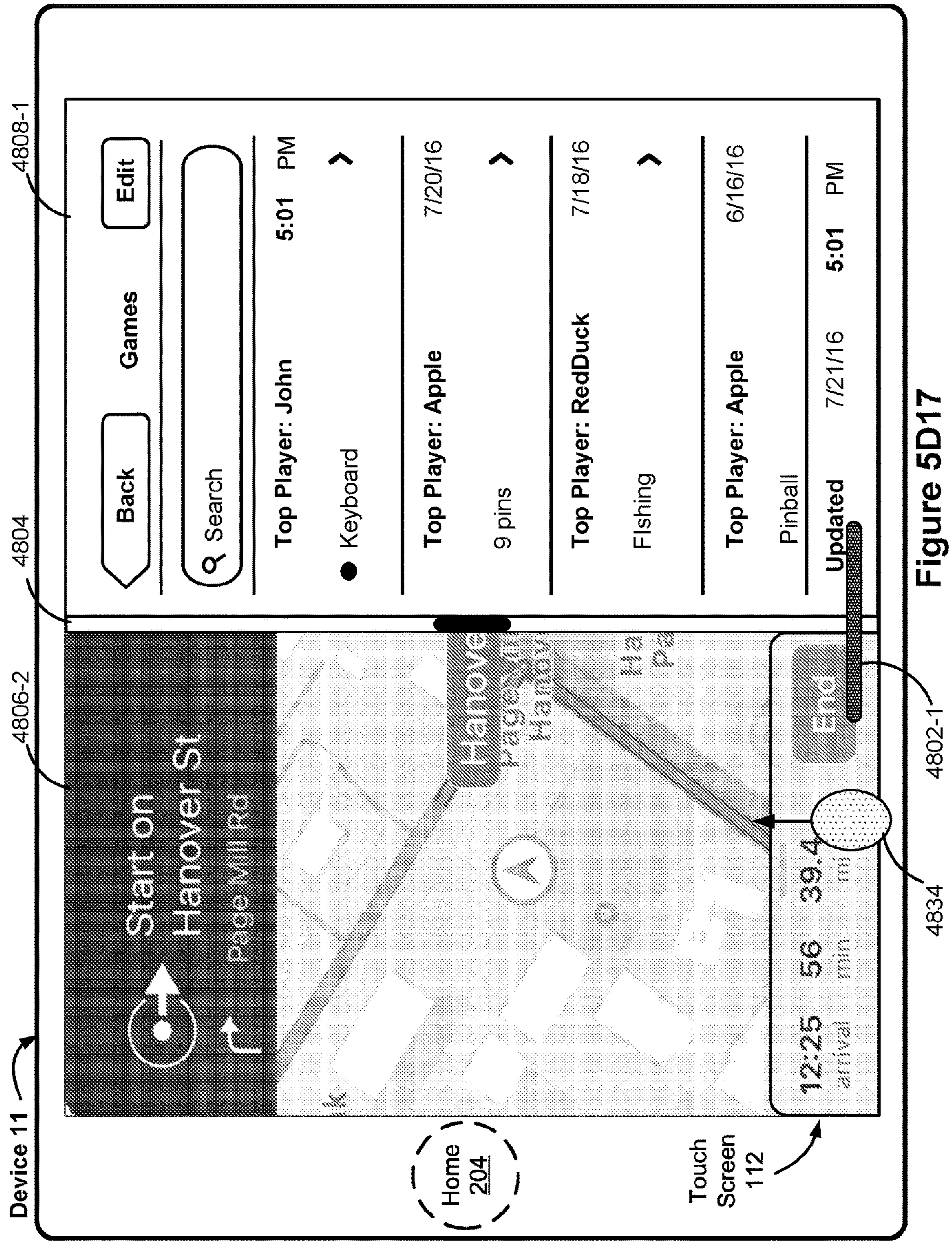
Figure 5D17

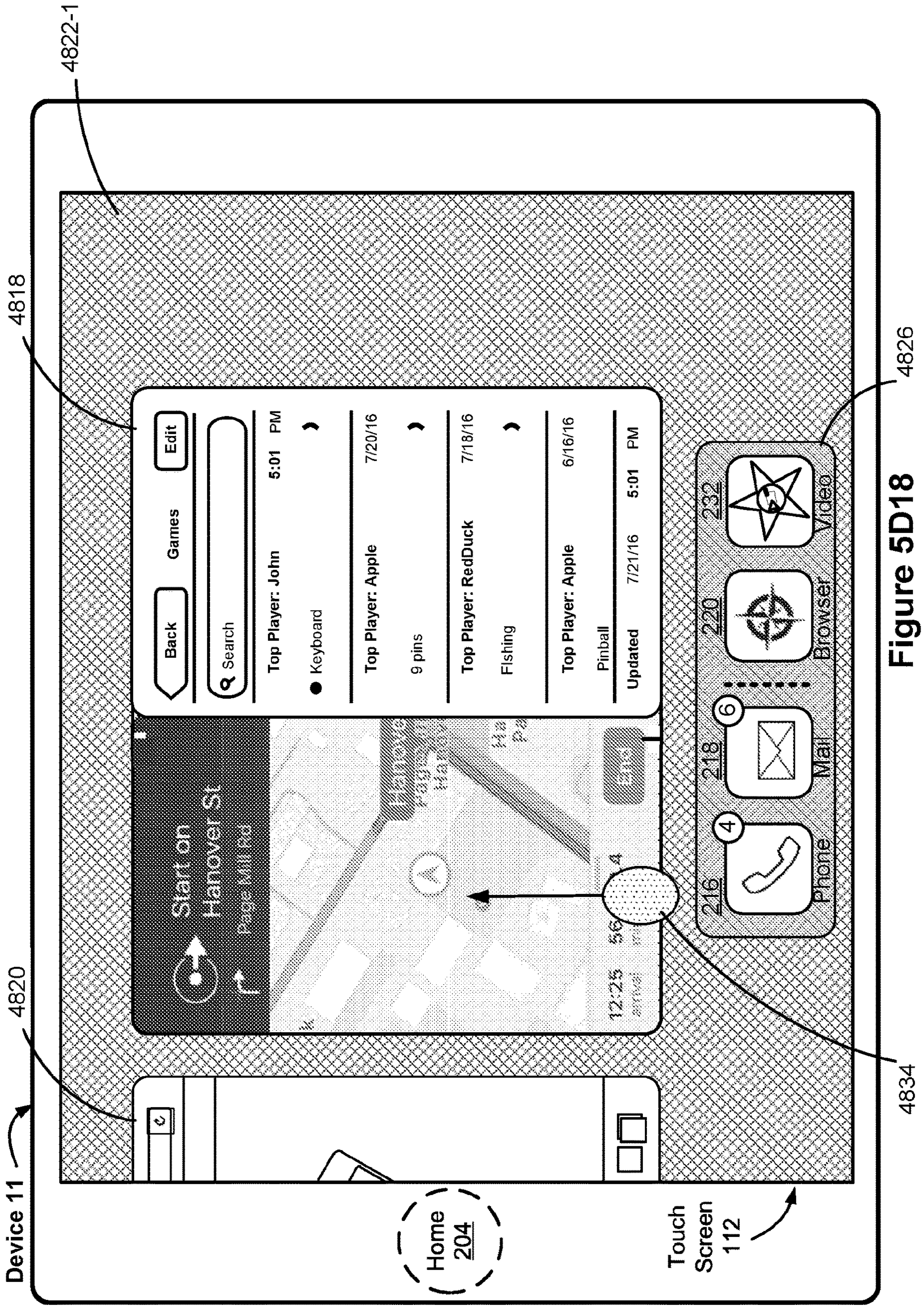
Figure 5D18

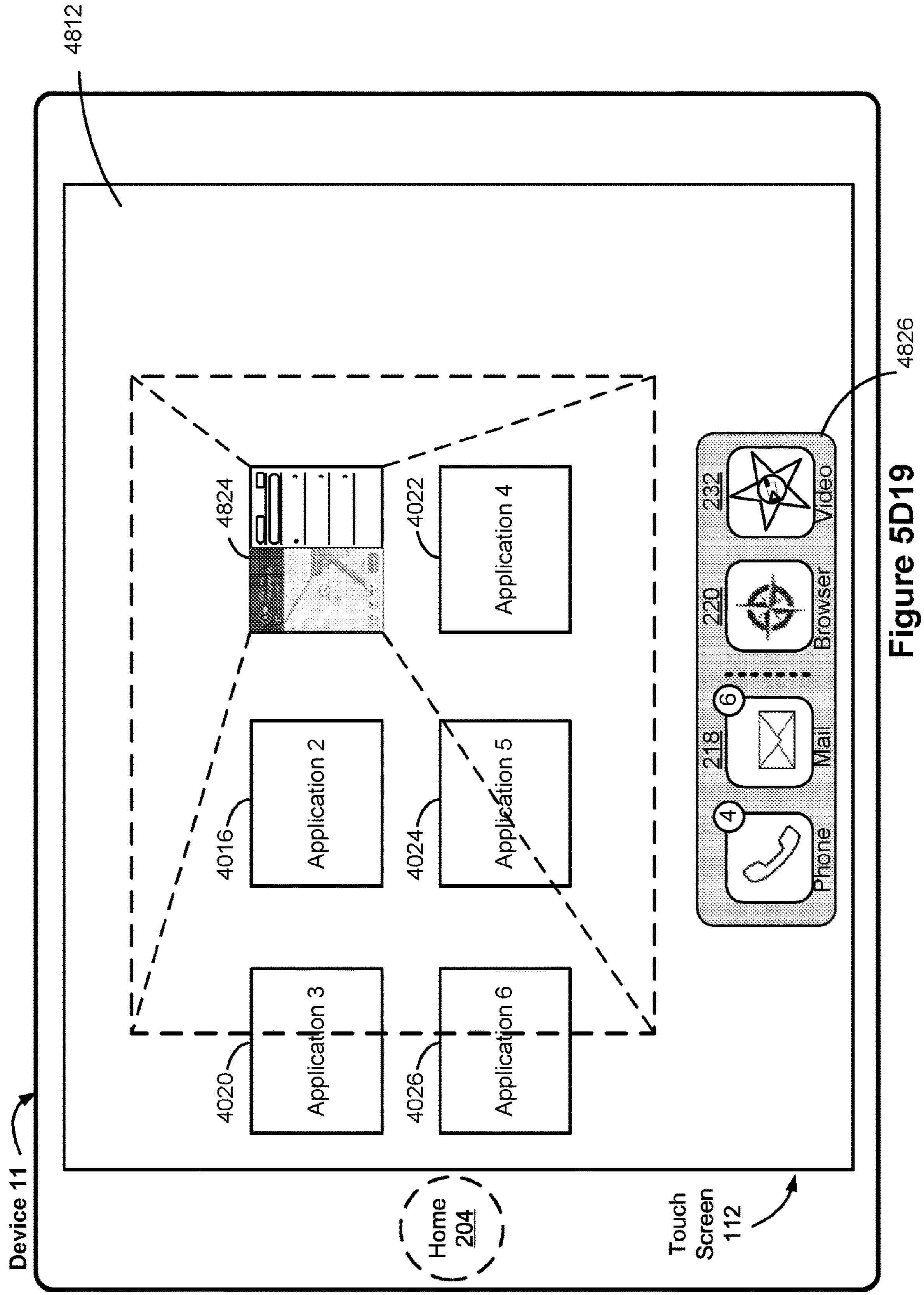
Figure 5D19

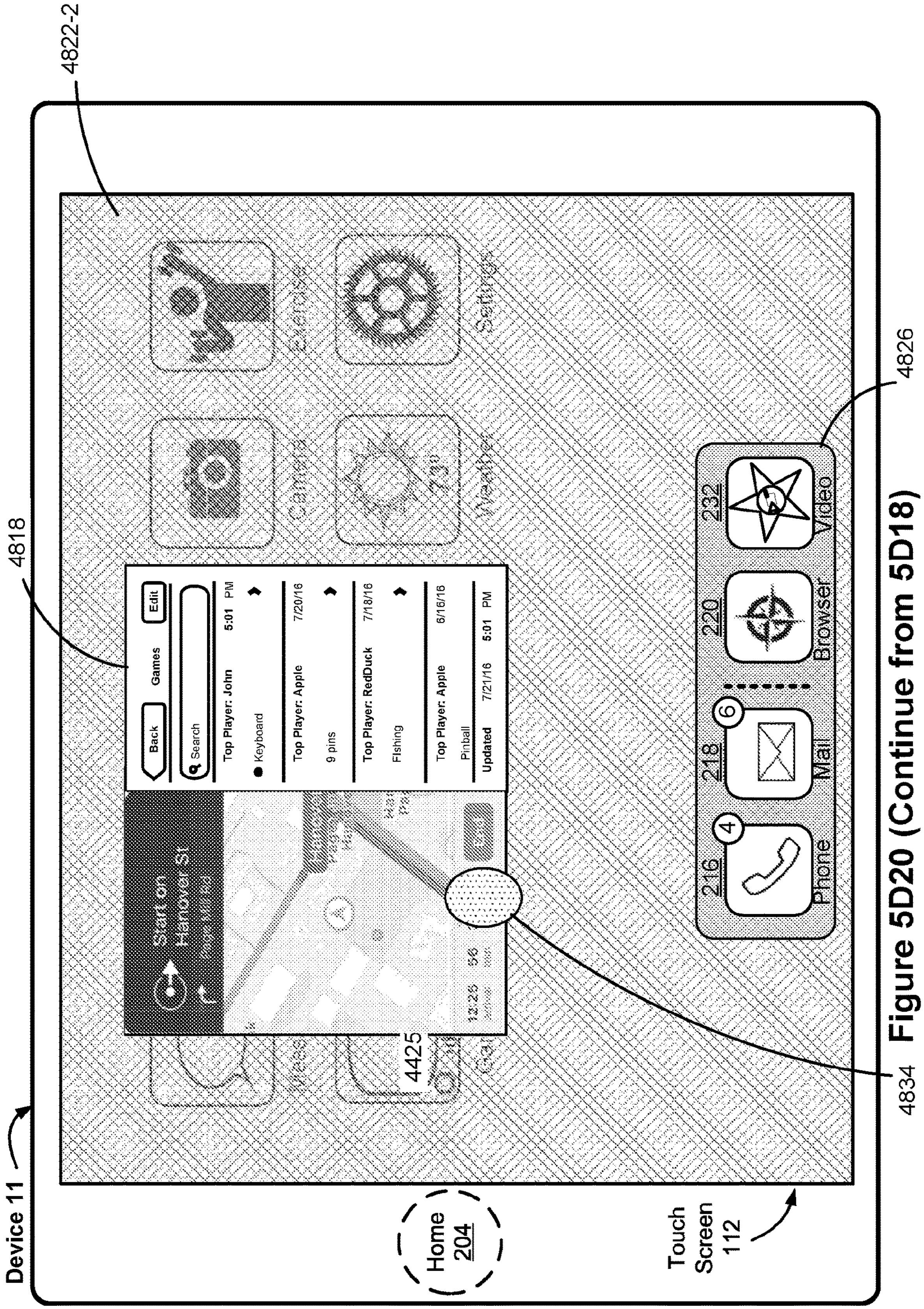
Figure 5D20 (Continue from 5D18)

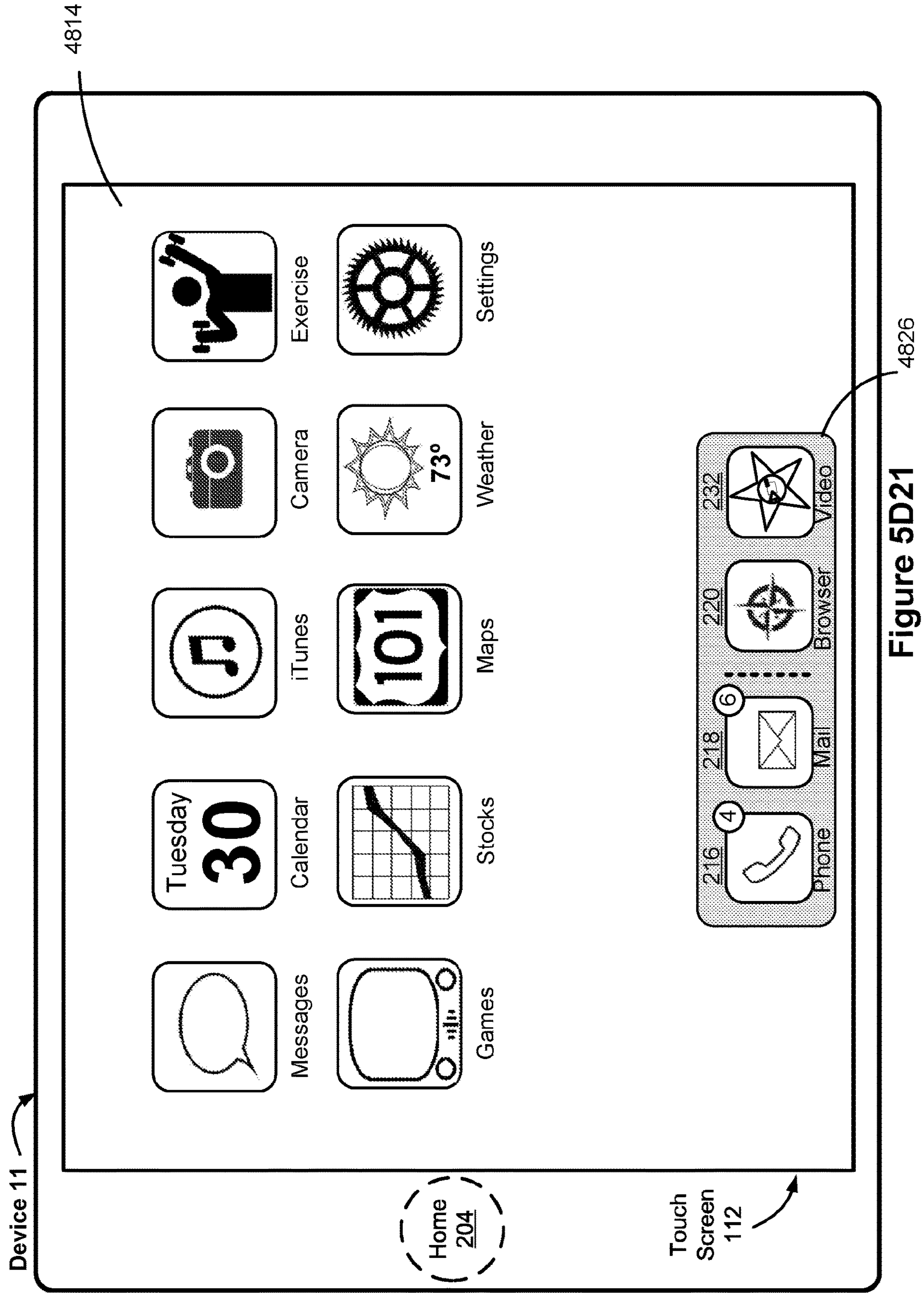
Figure 5D21

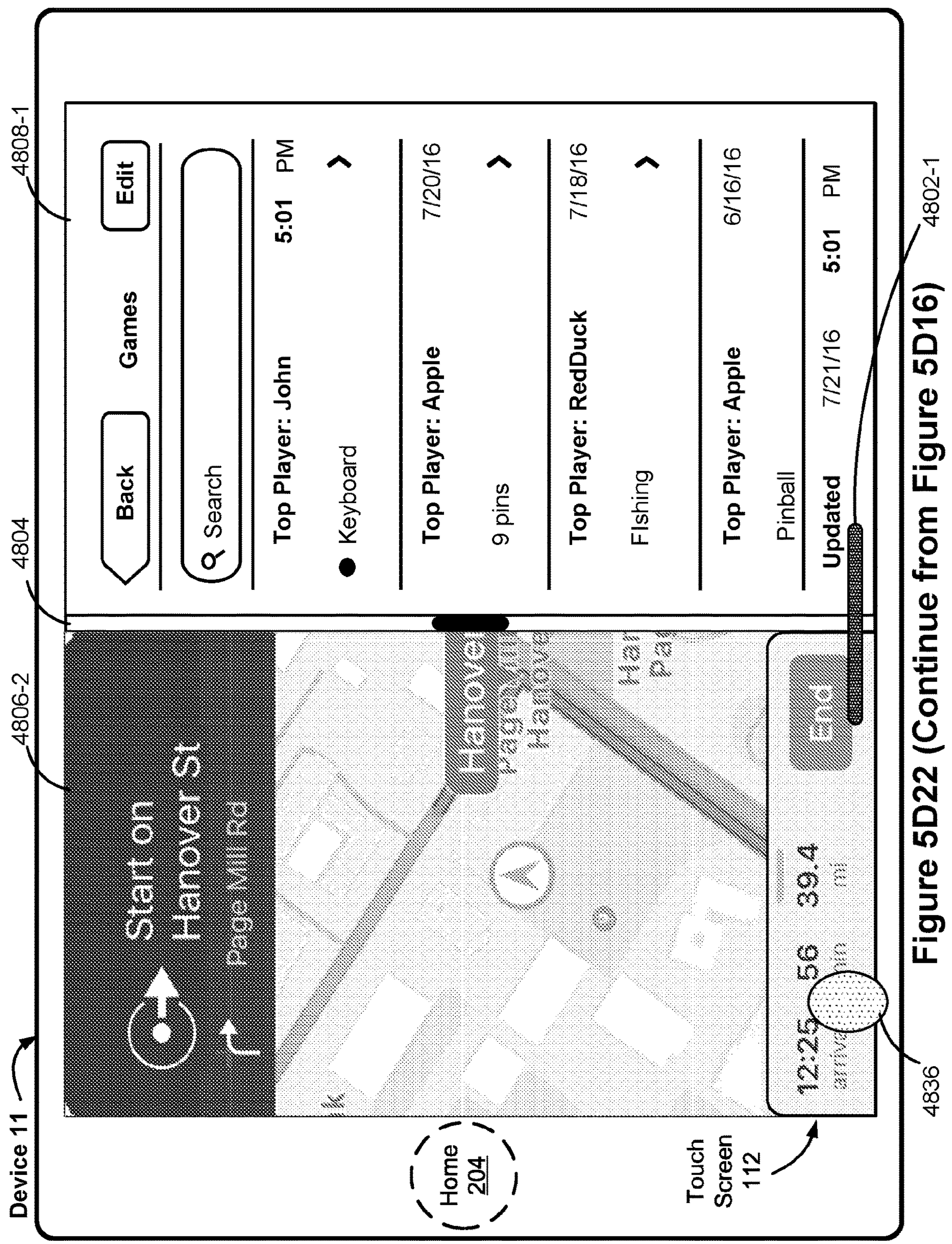
Figure 5D22 (Continue from Figure 5D16)

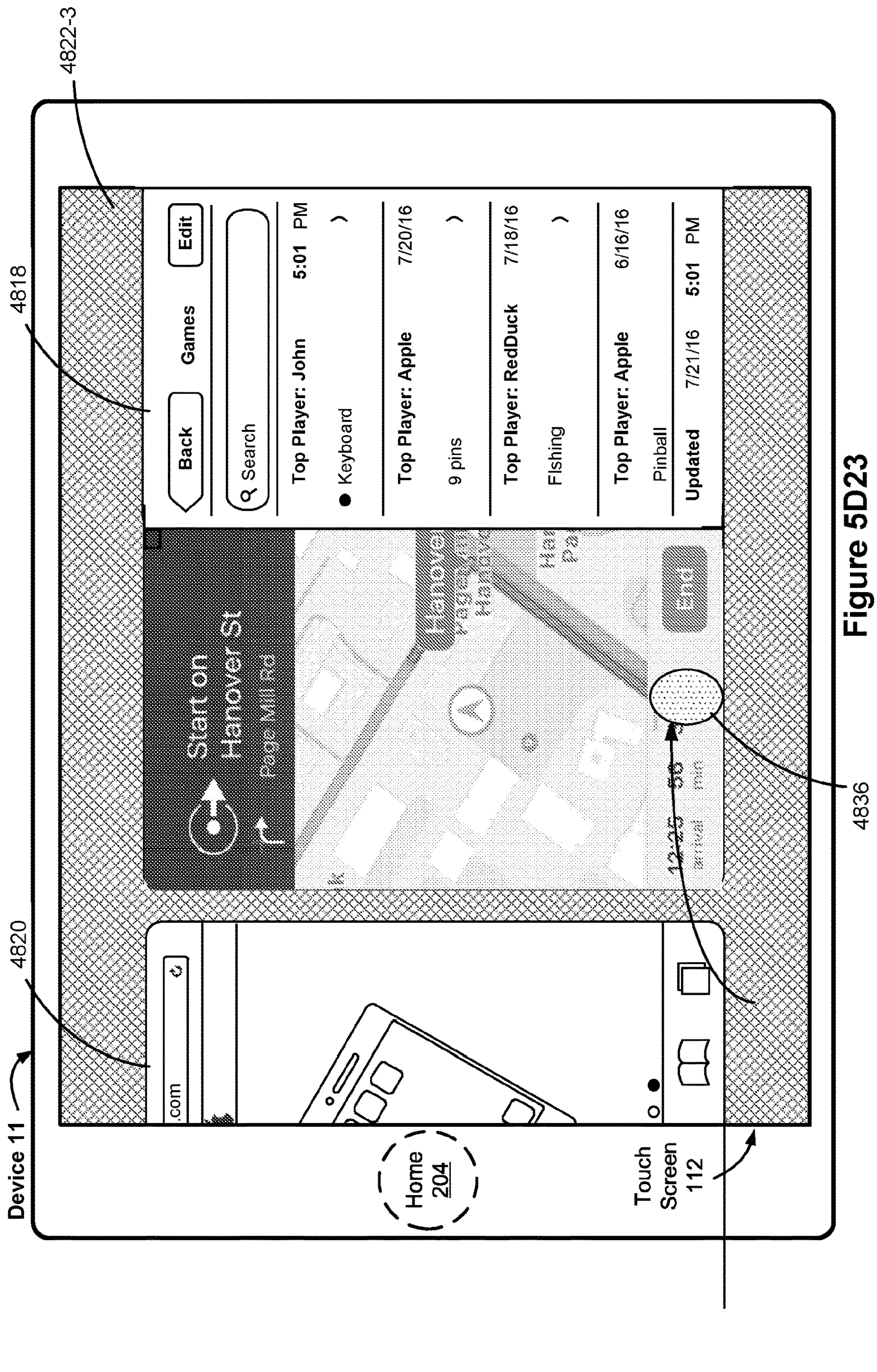
Figure 5D23

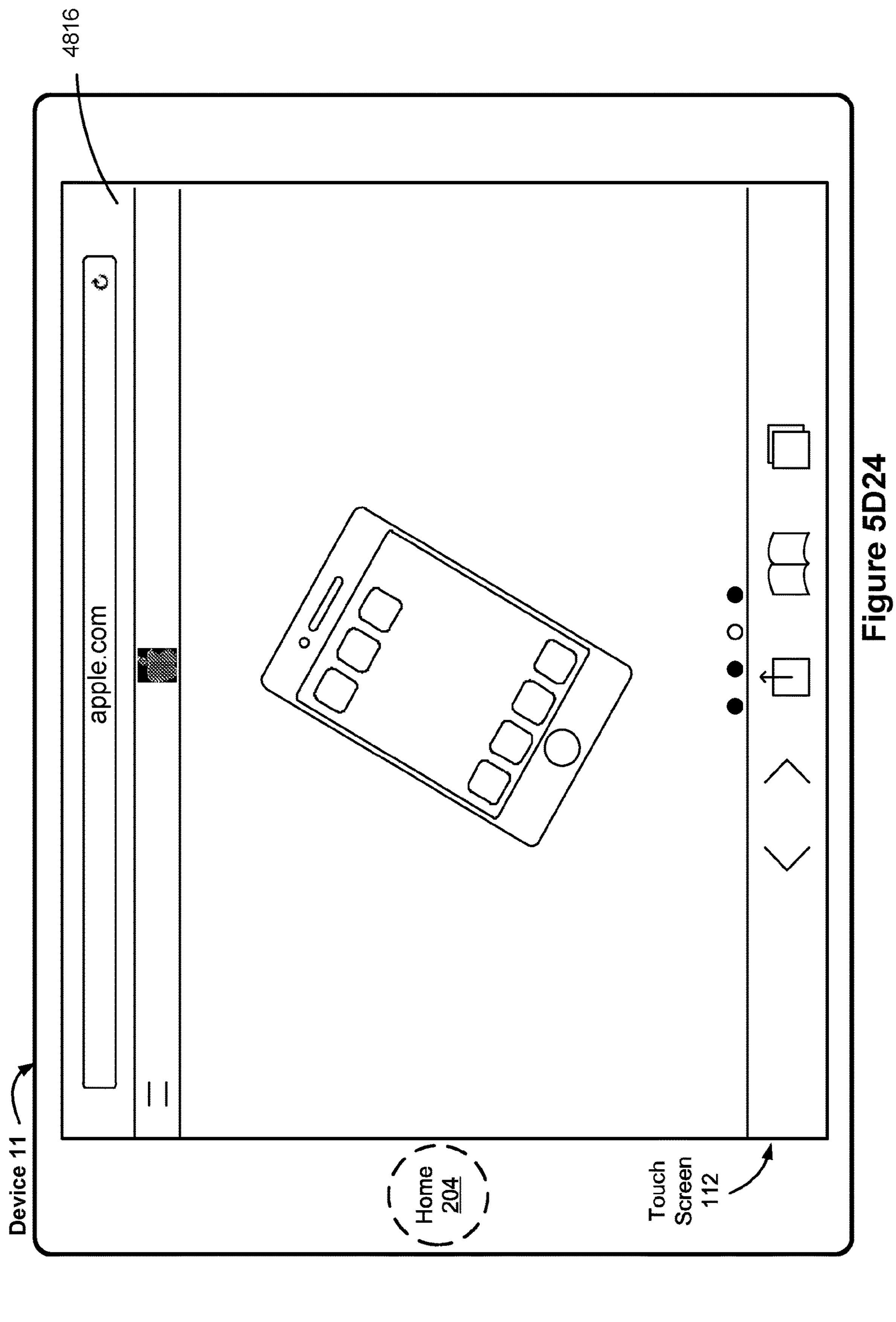
Figure 5D24

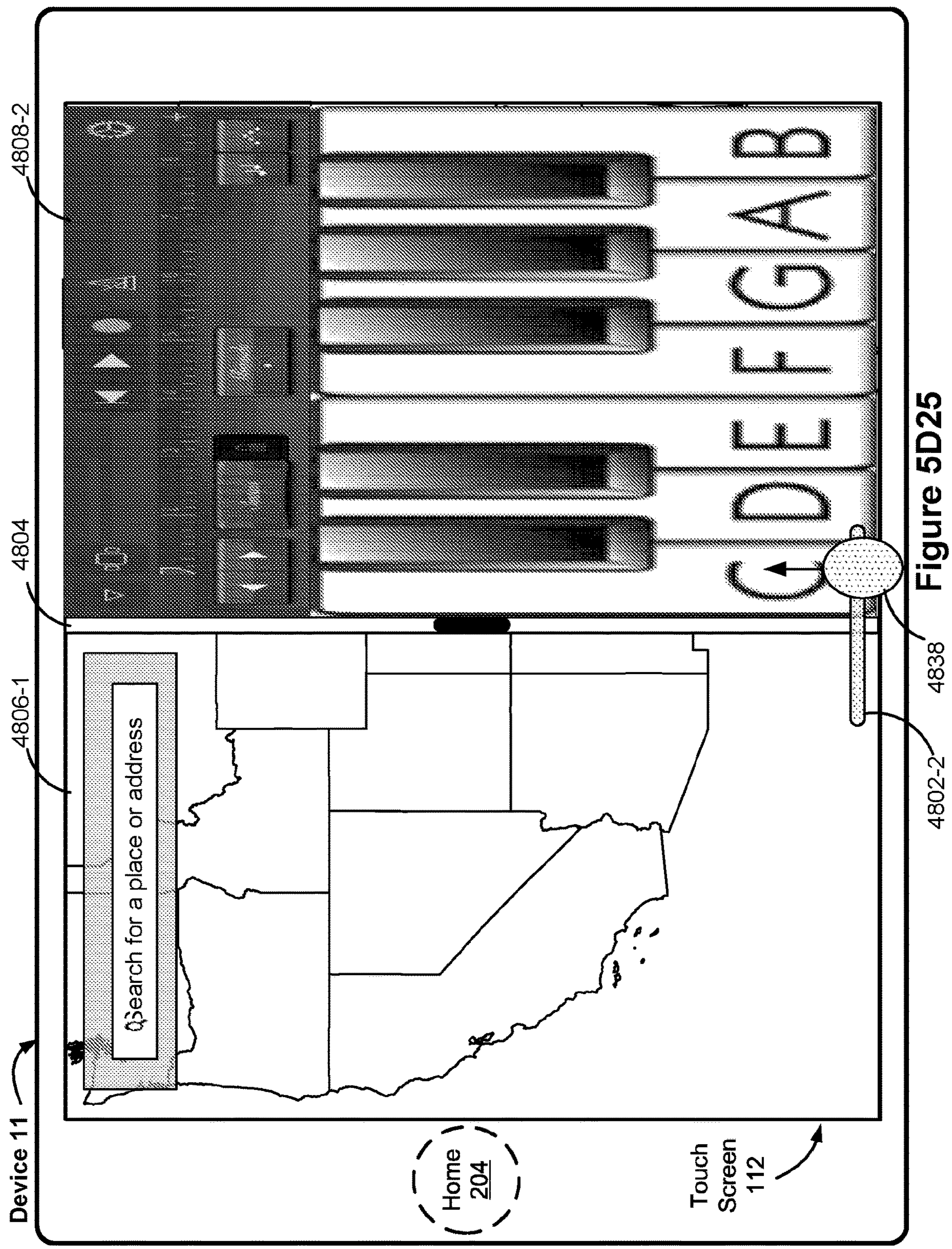
Figure 5D25

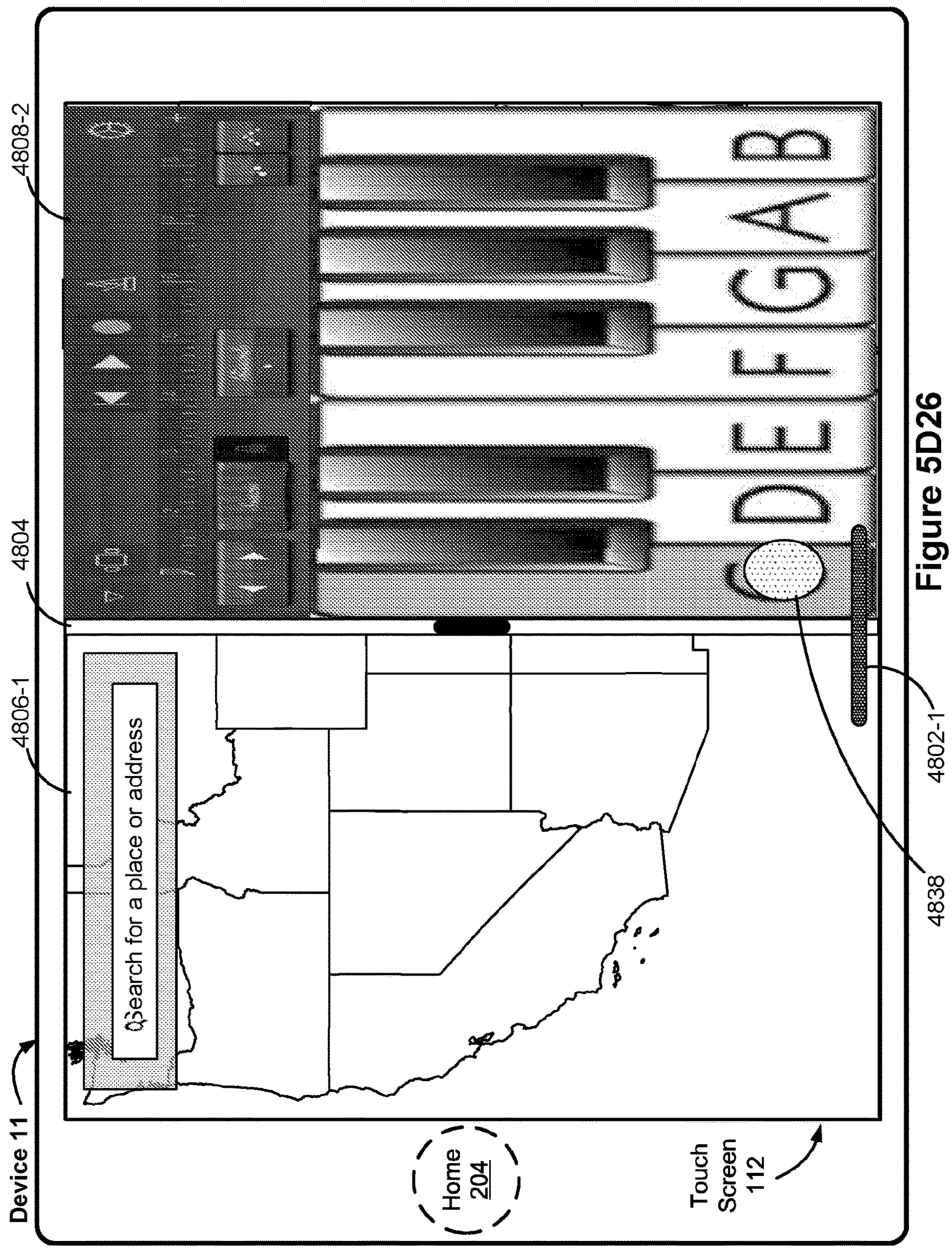
Figure 5D26

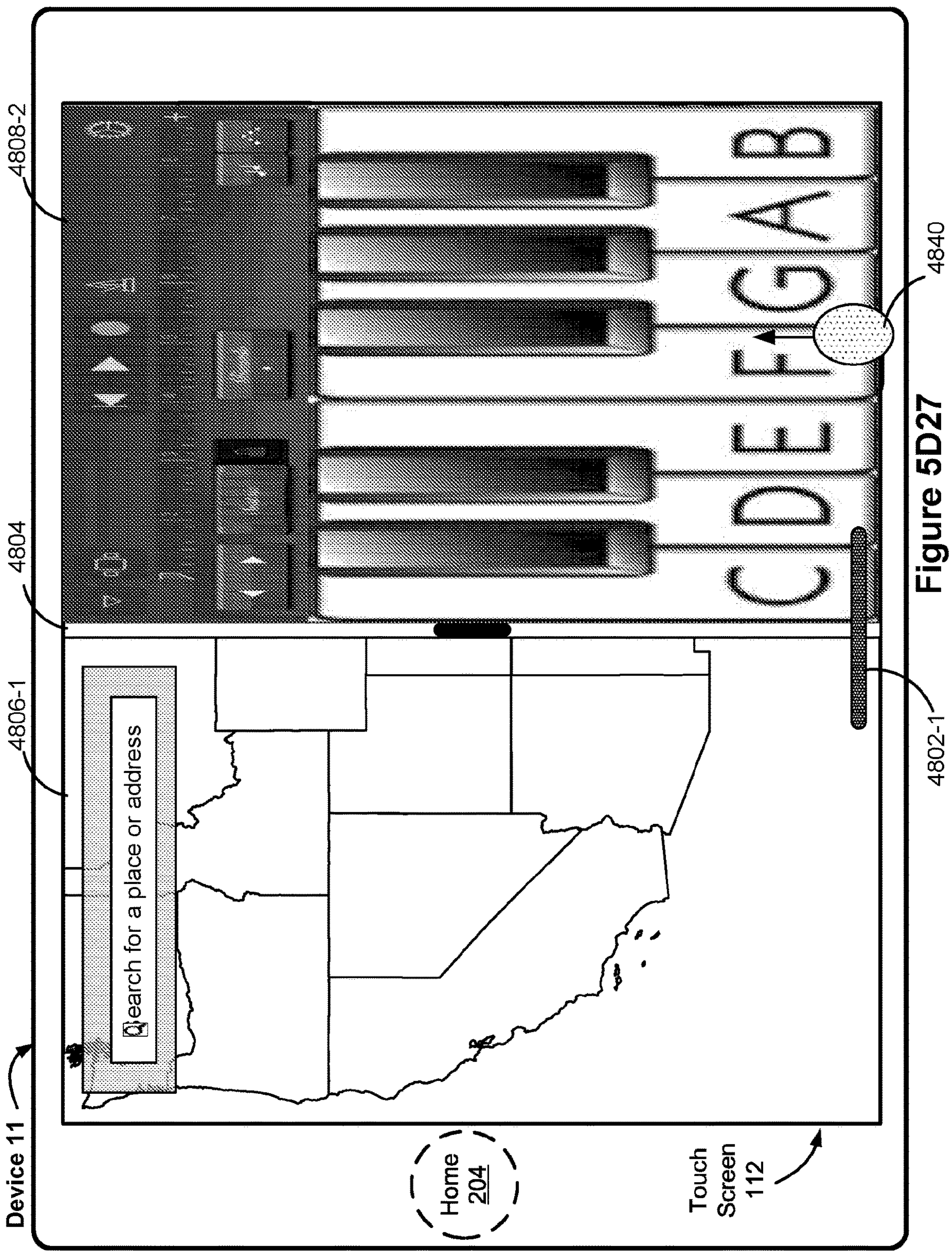
Figure 5D27

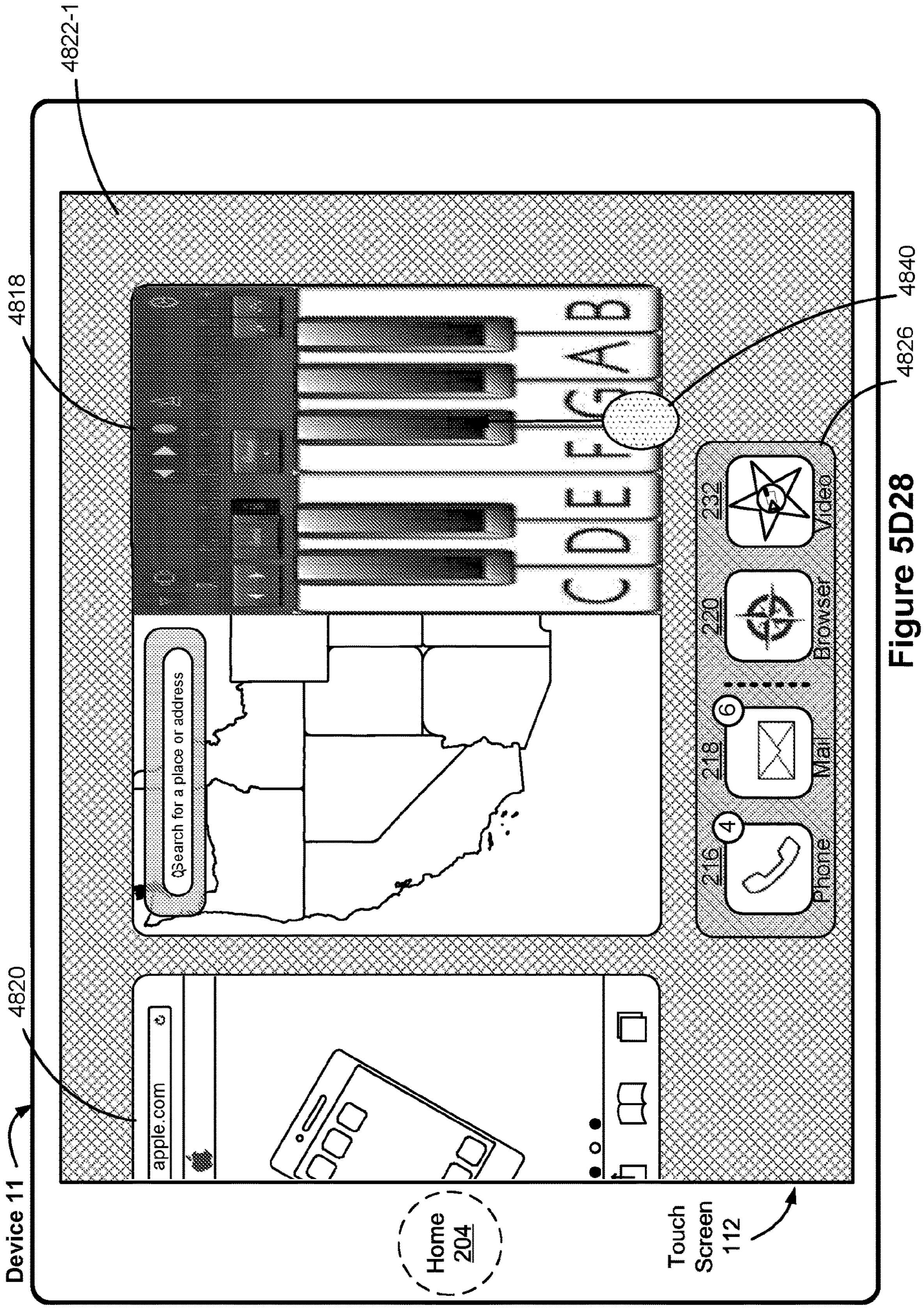
Figure 5D28

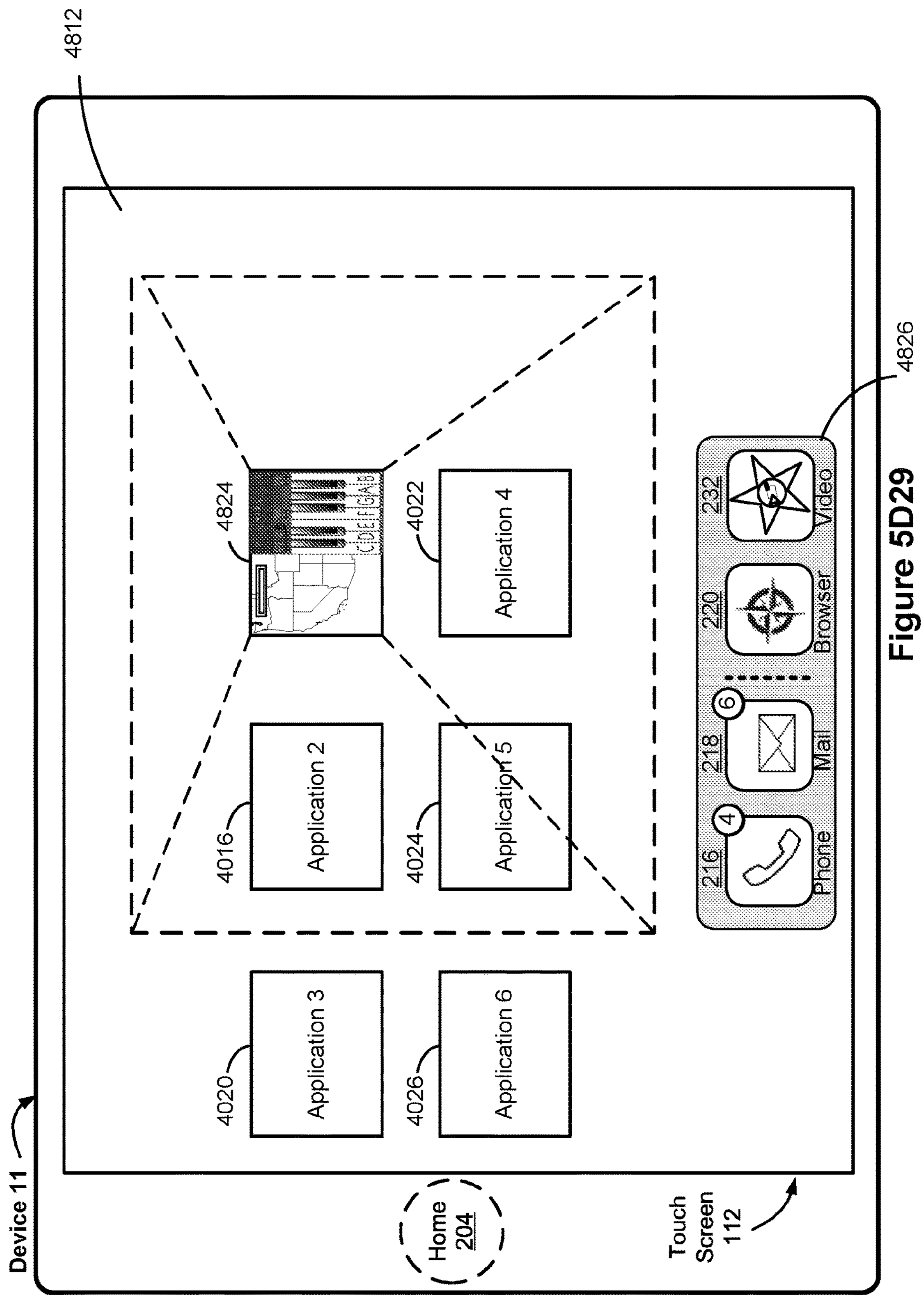
Figure 5D29

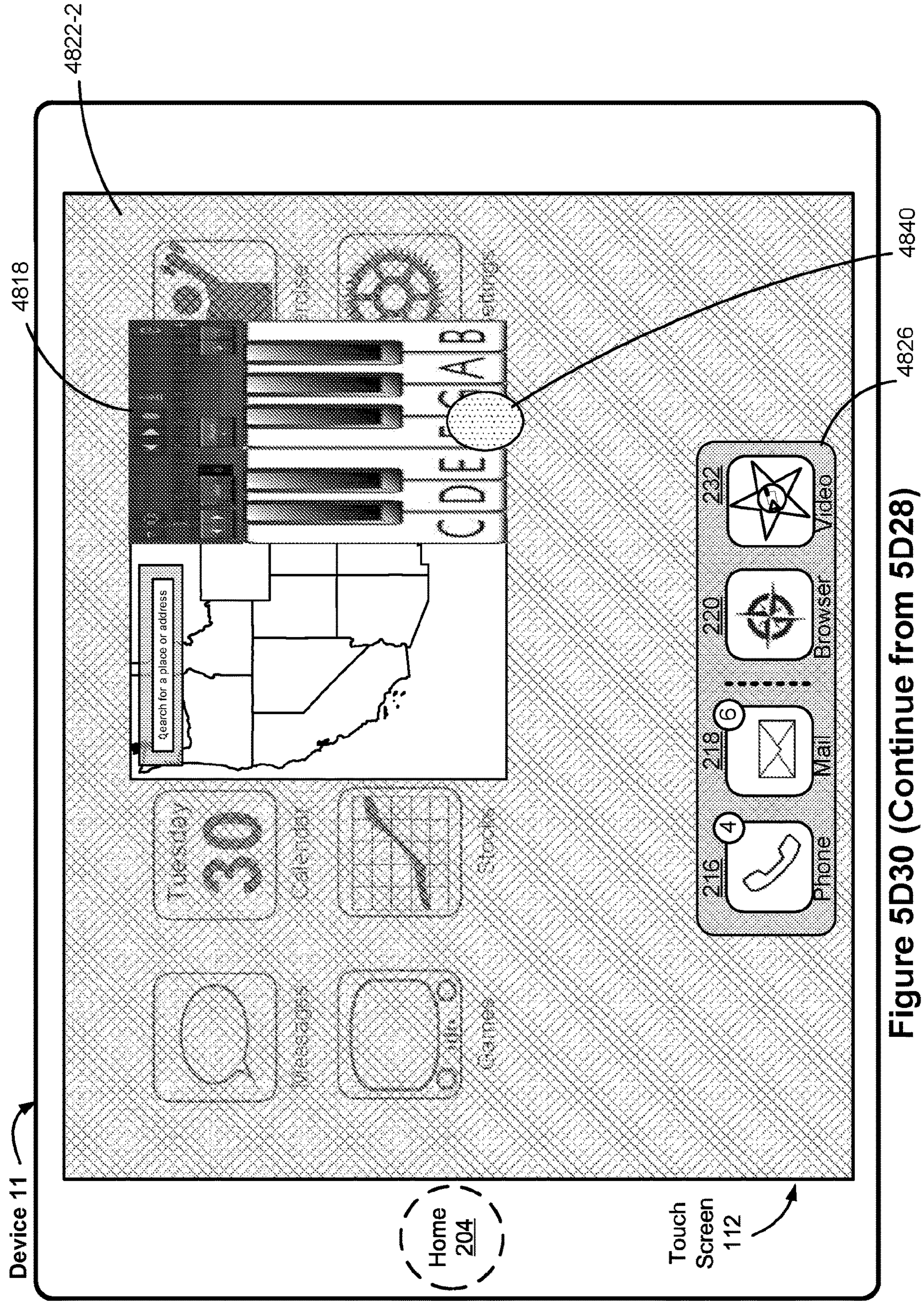
Figure 5D30 (Continue from 5D28)

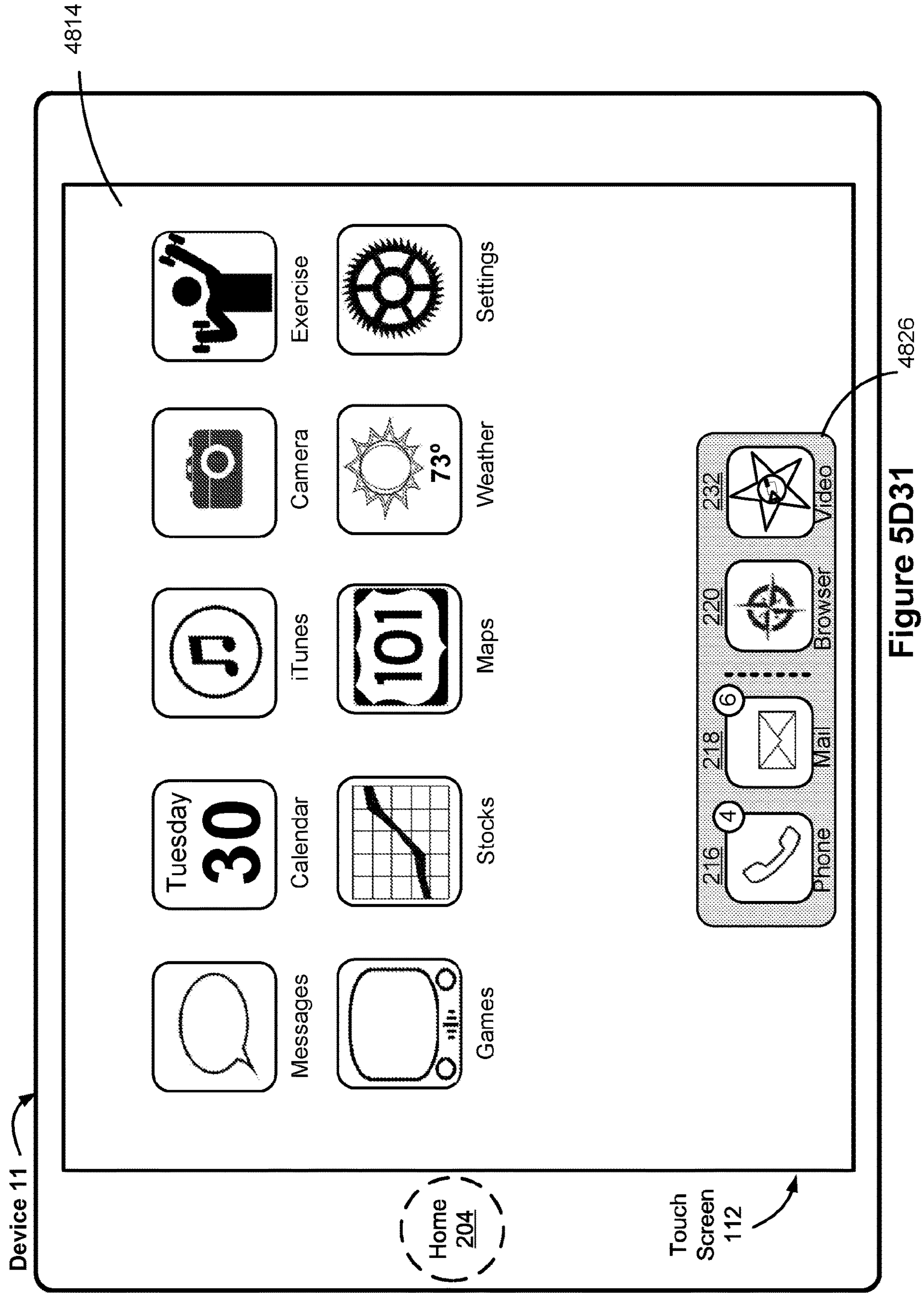
Figure 5D31

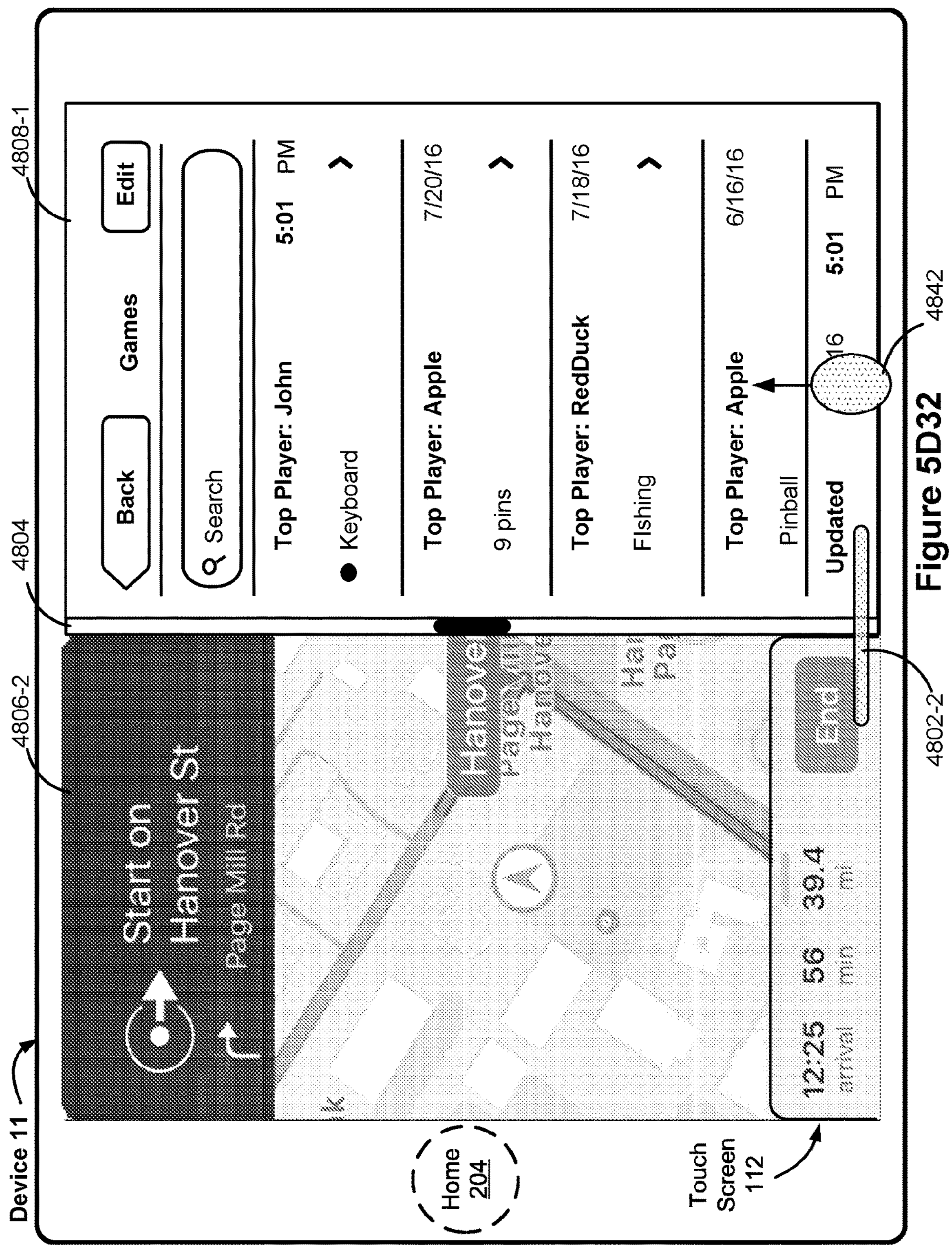
Figure 5D32

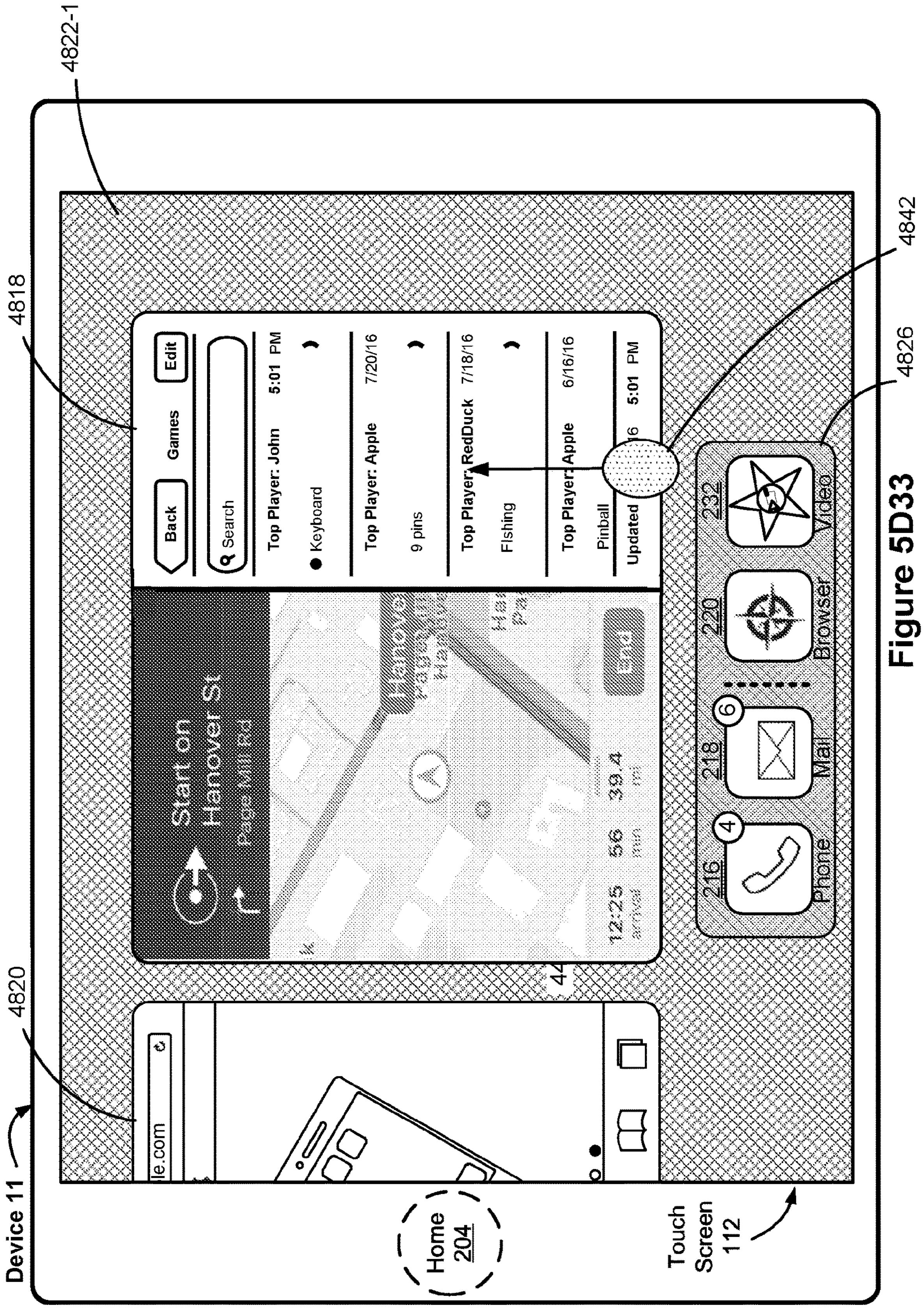
Figure 5D33

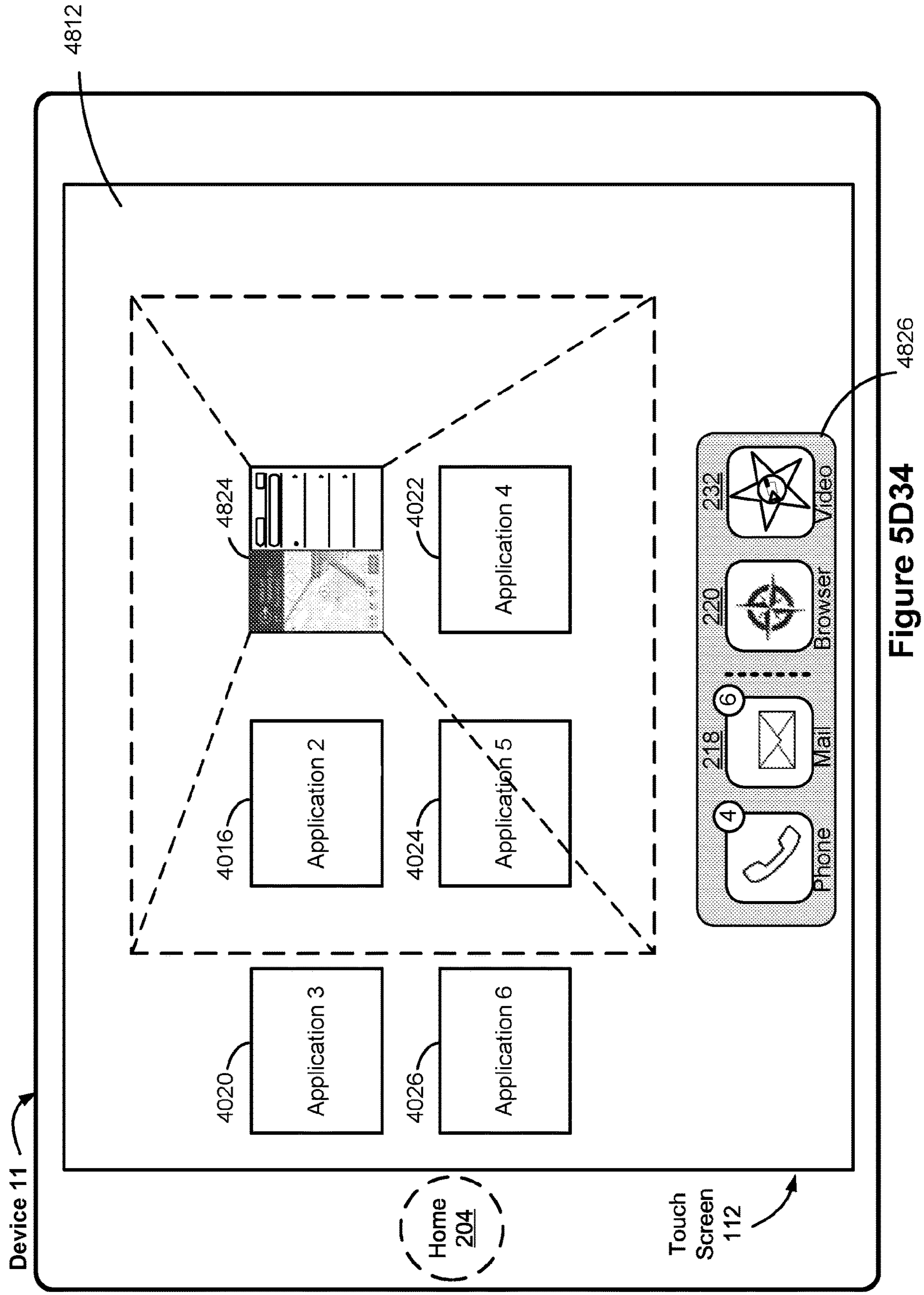
Figure 5D34

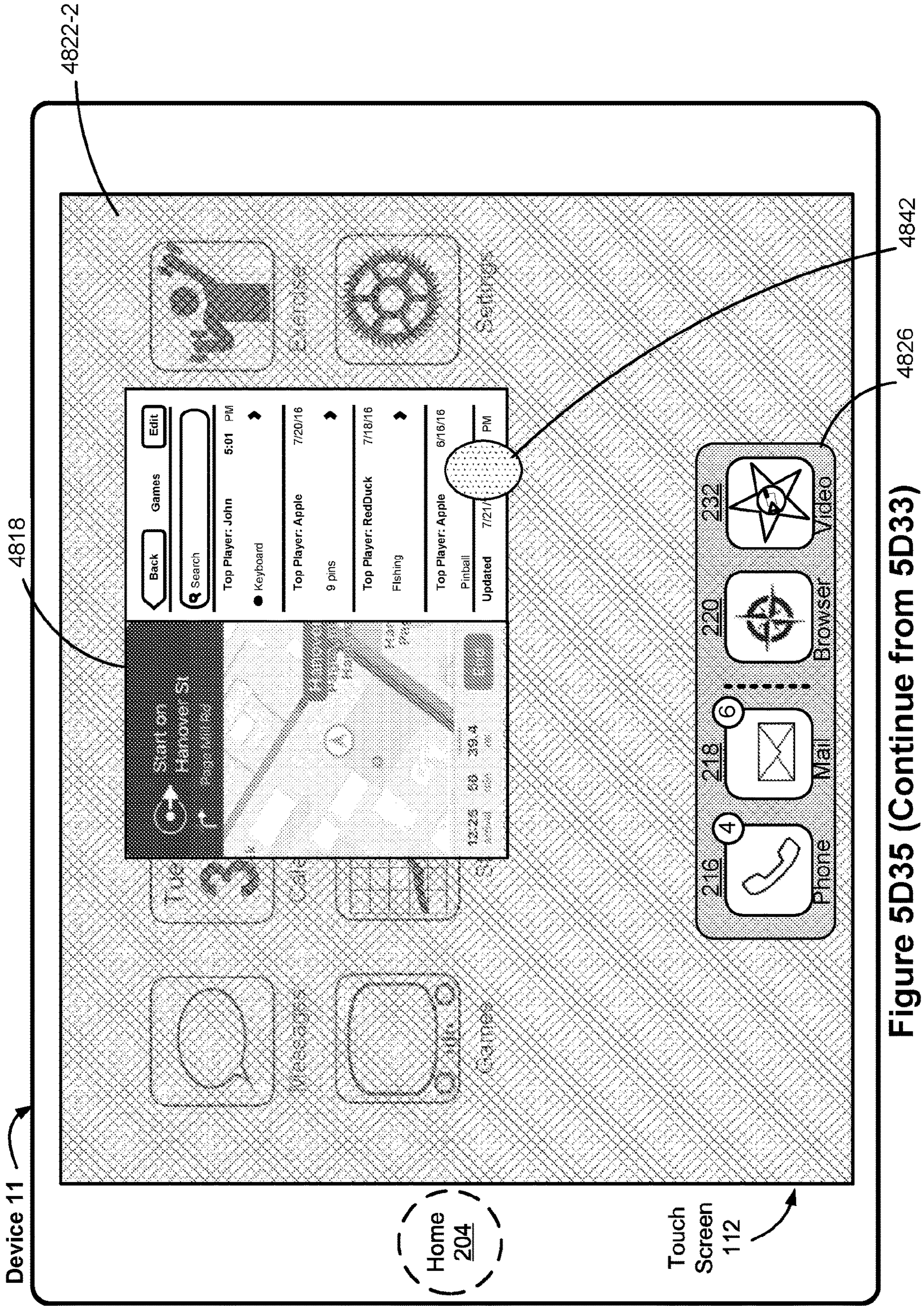
Figure 5D35 (Continue from 5D33)

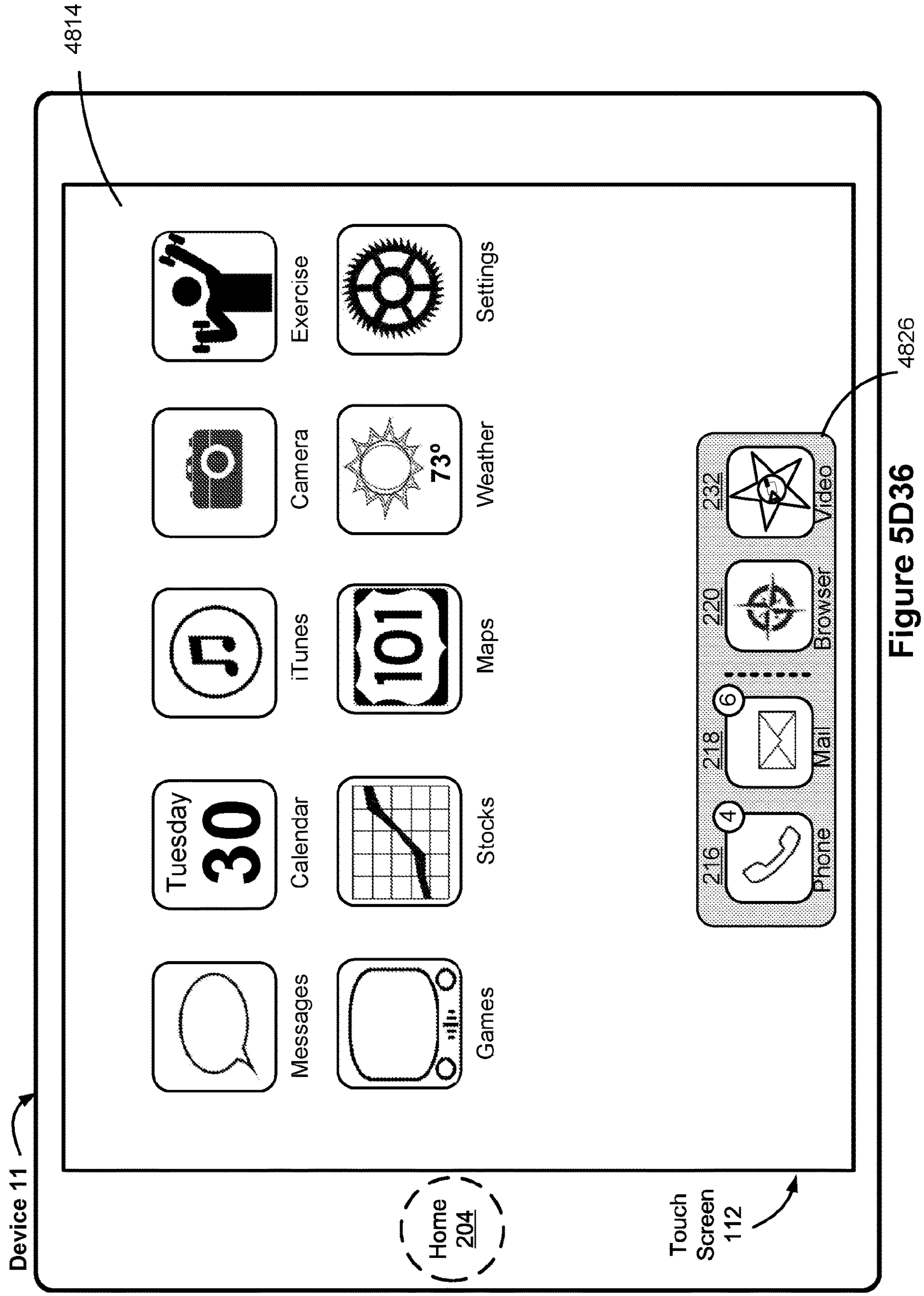
Figure 5D36

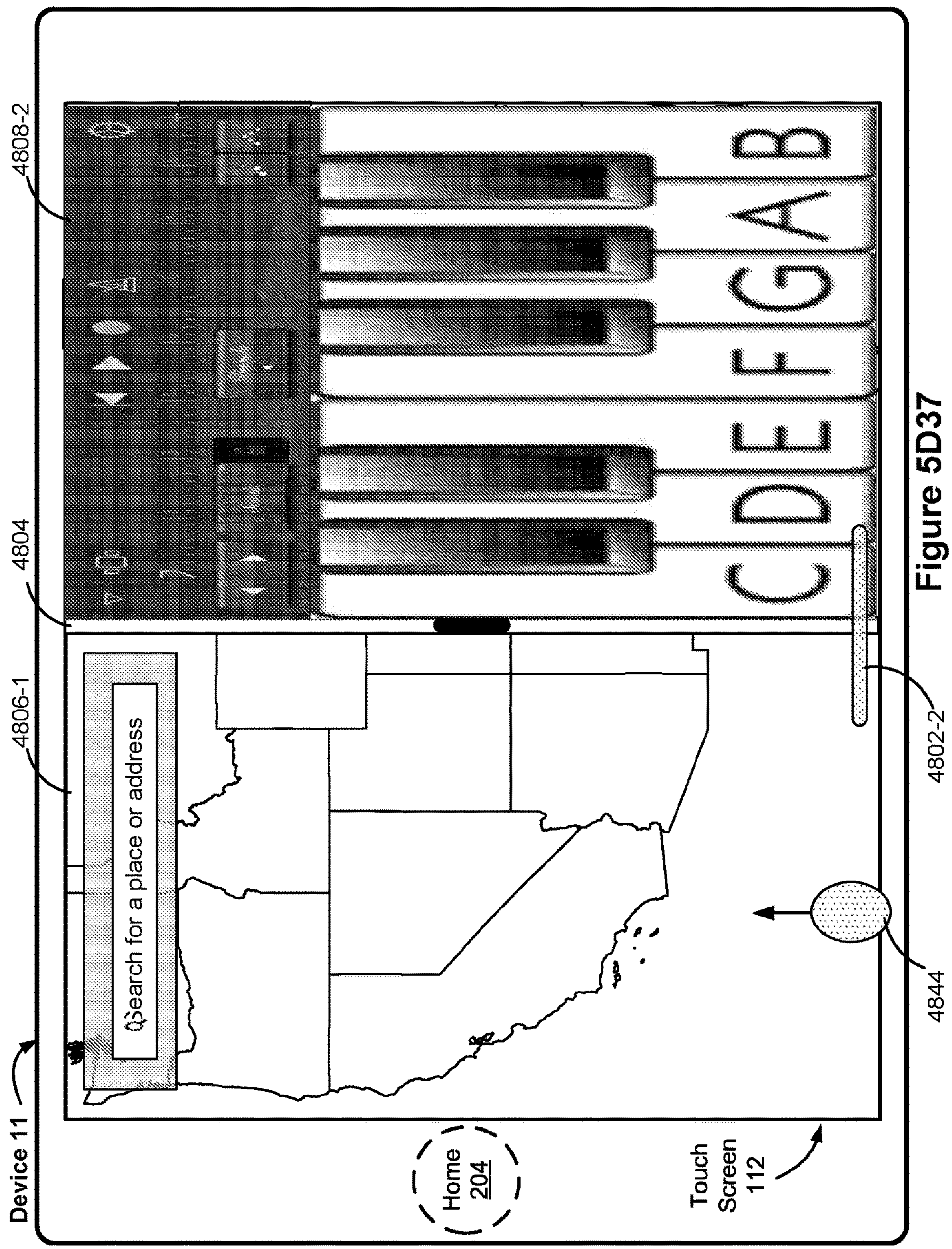
Figure 5D37

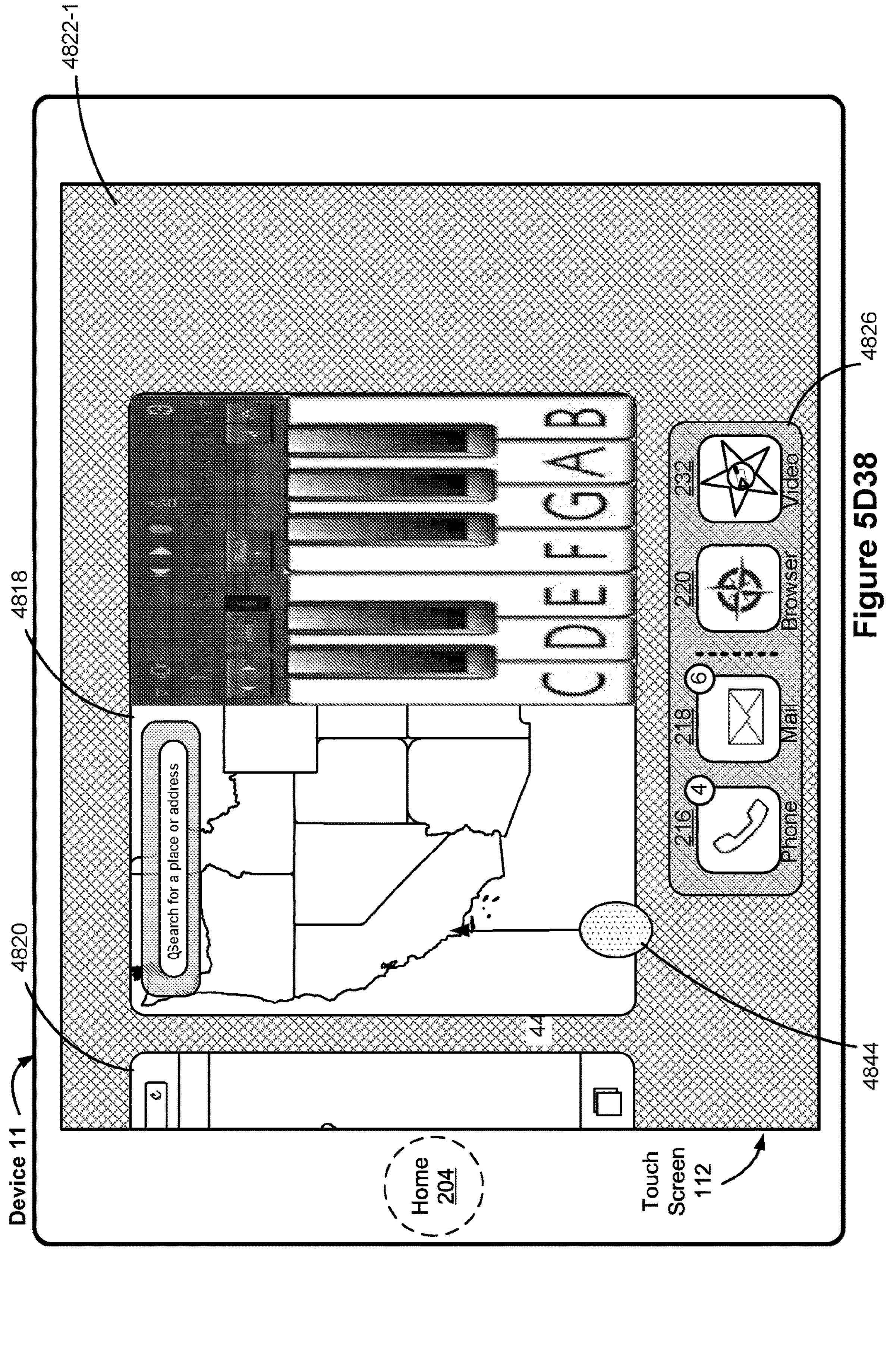
Figure 5D38

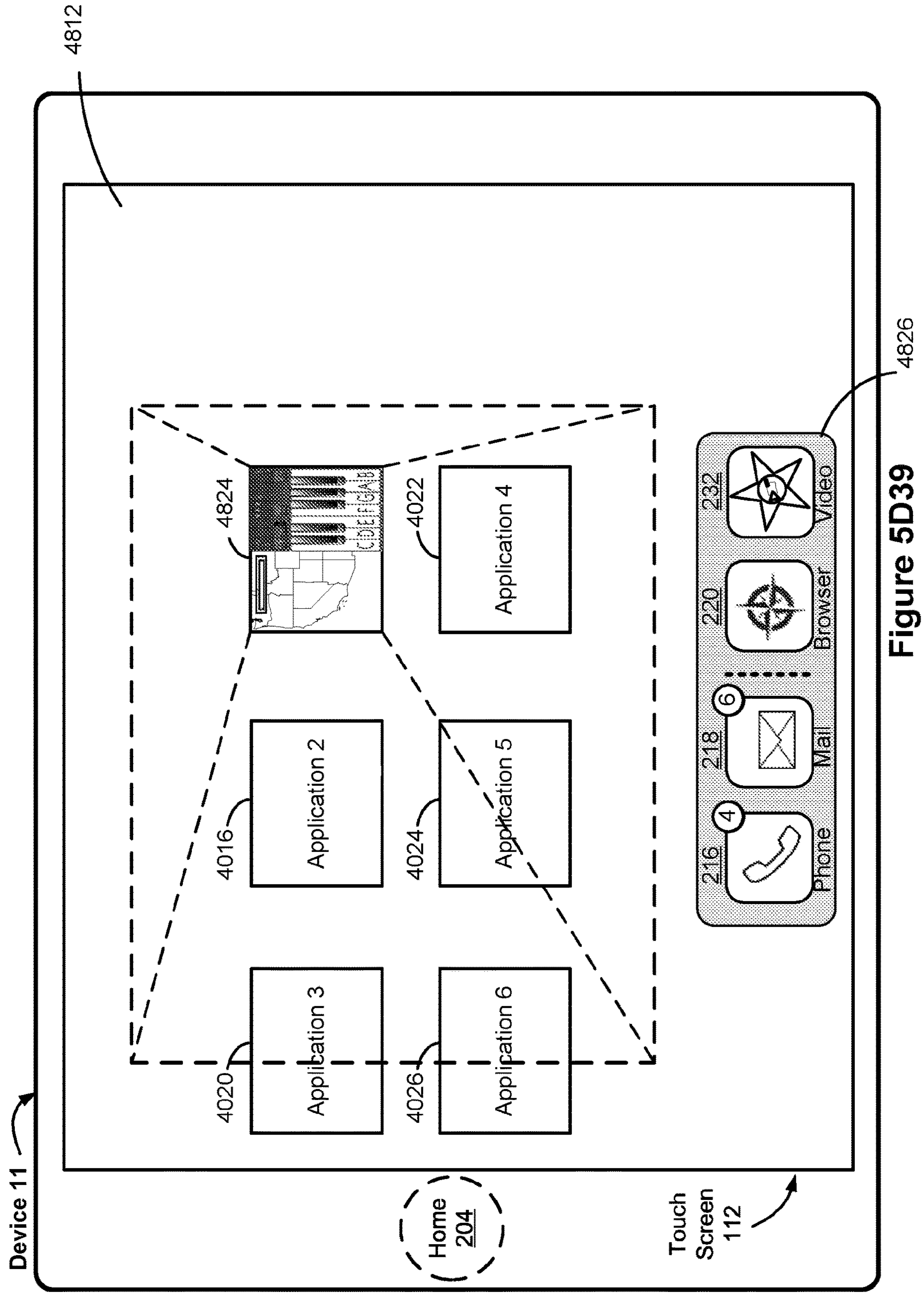
Figure 5D39

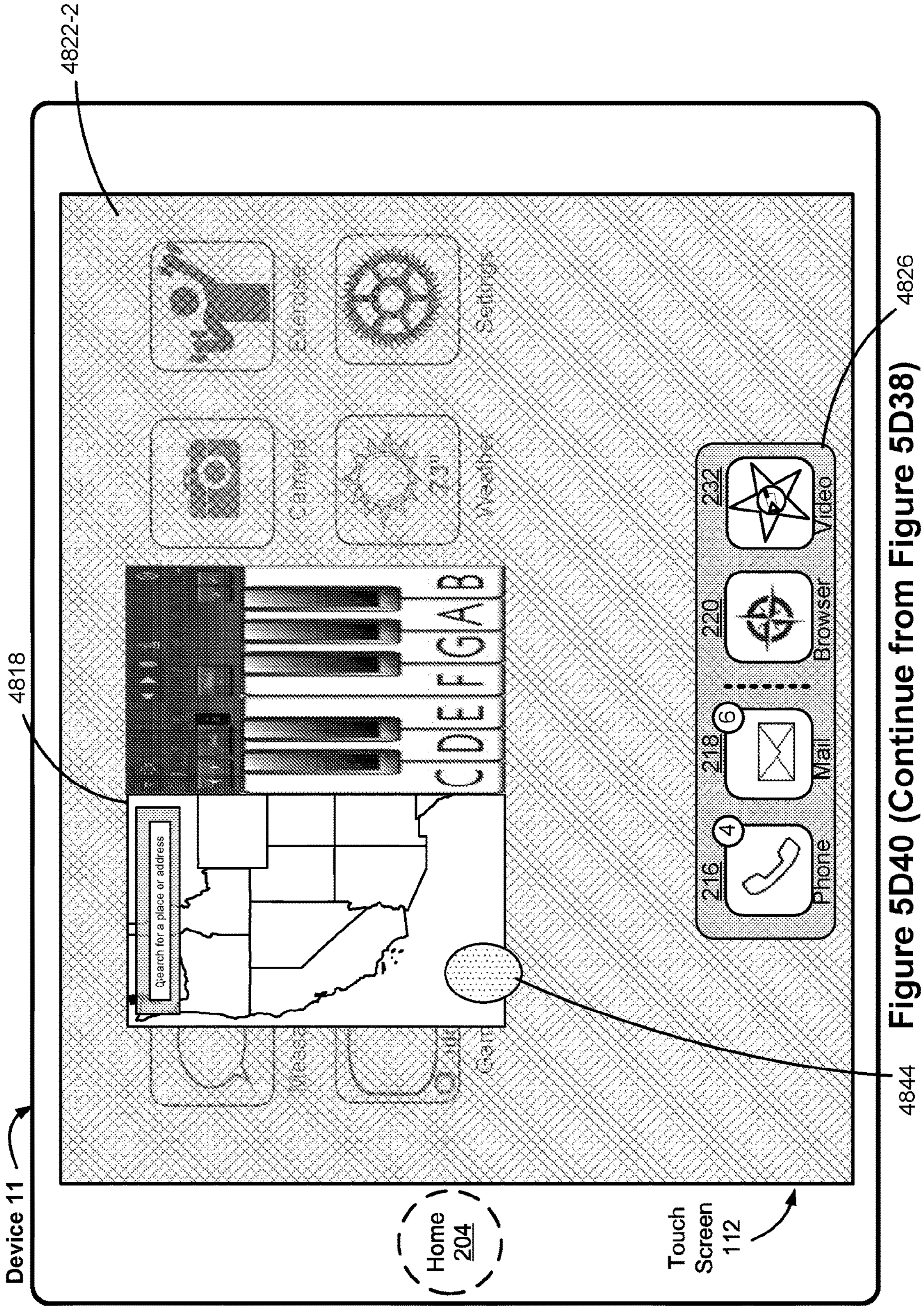
Figure 5D40 (Continue from Figure 5D38)

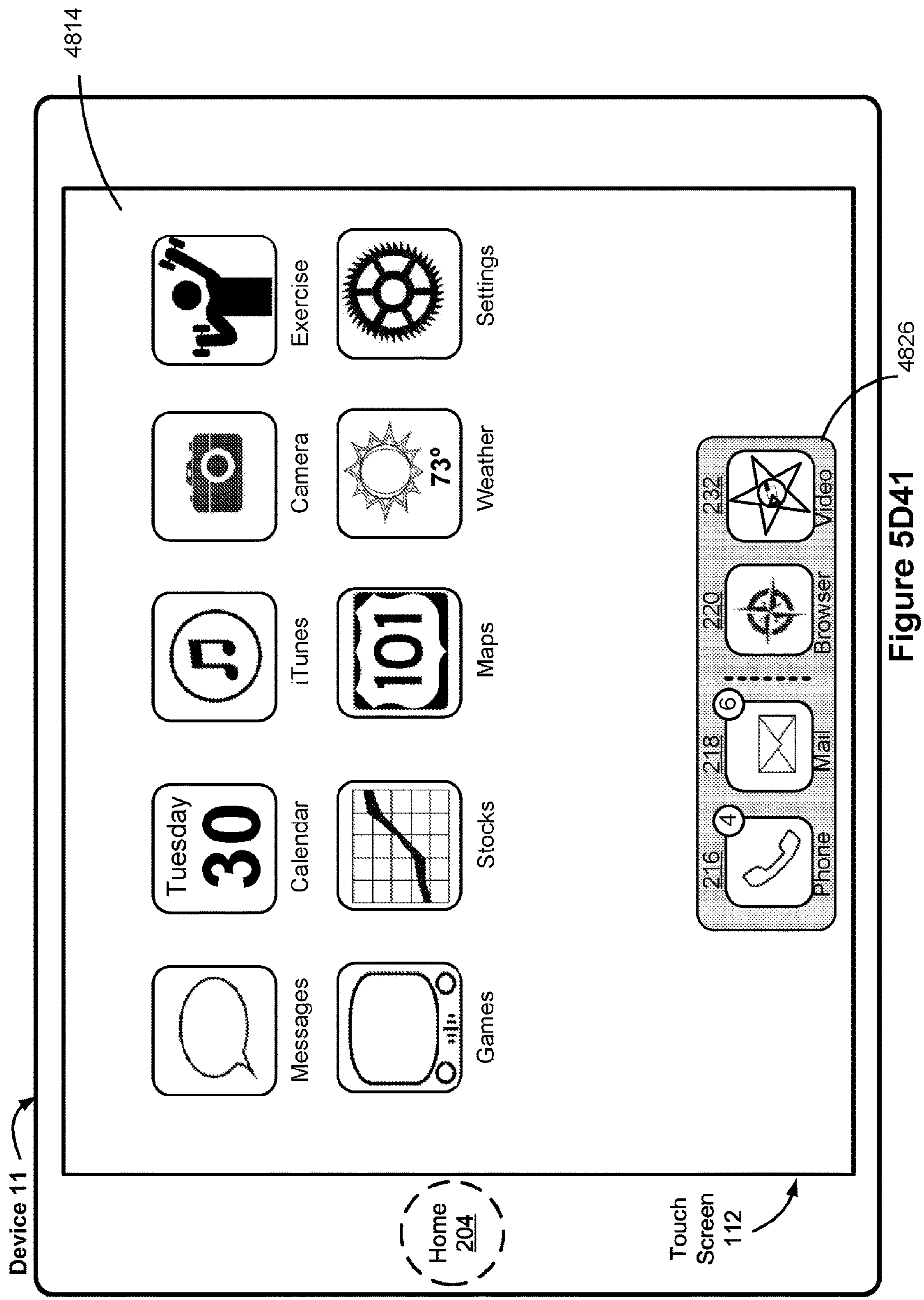
Figure 5D41

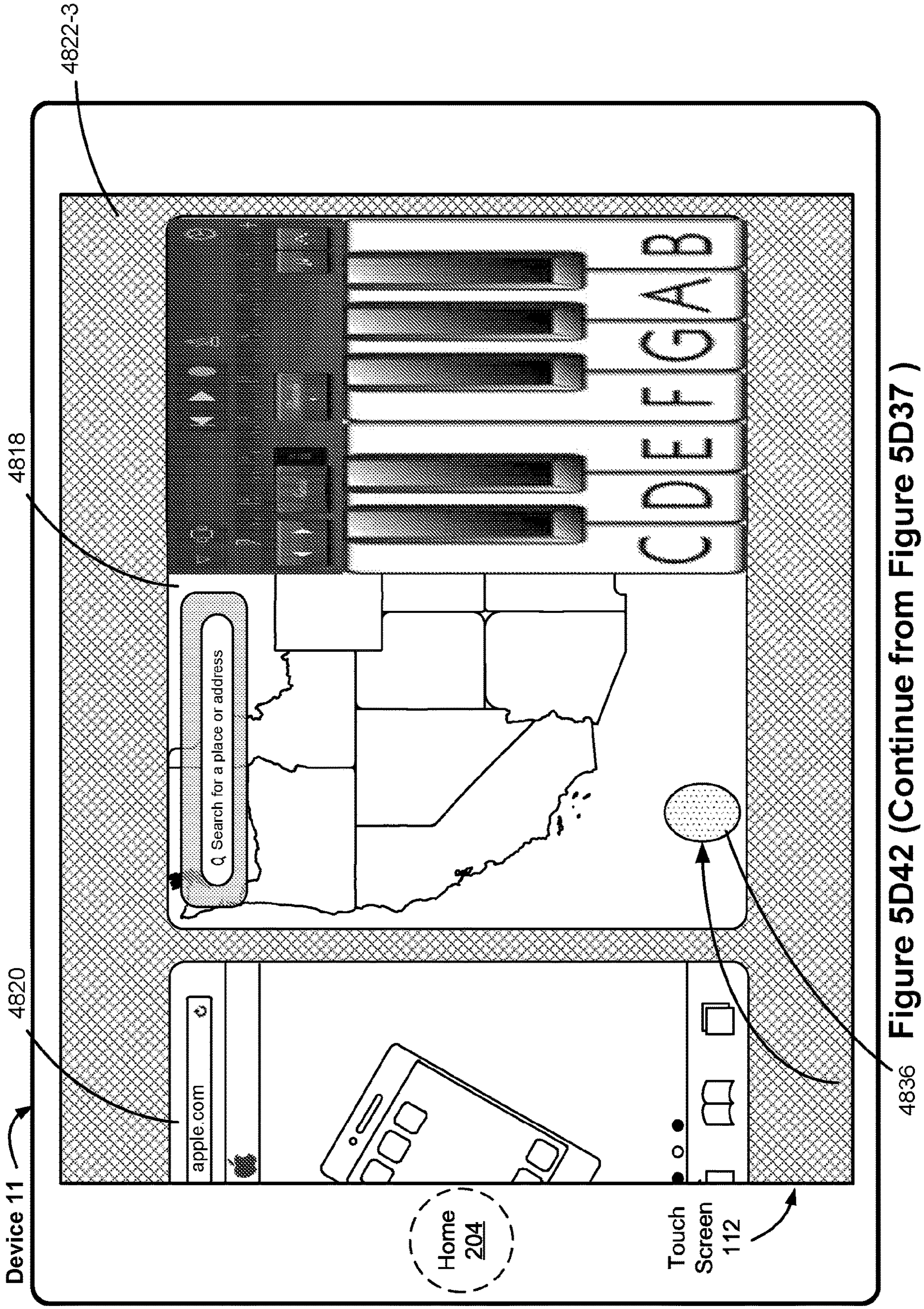
Figure 5D42 (Continue from Figure 5D37 )

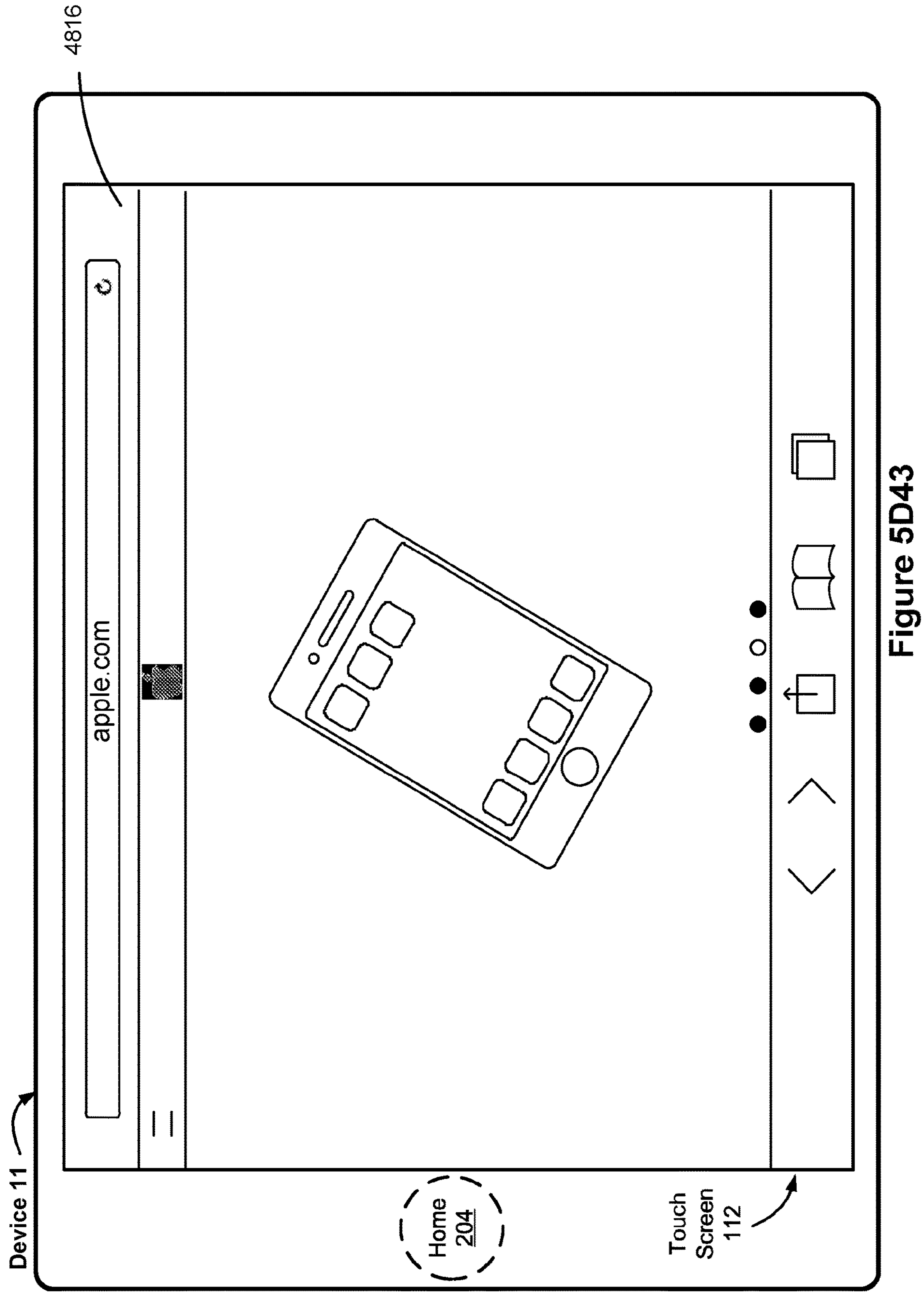
Figure 5D43

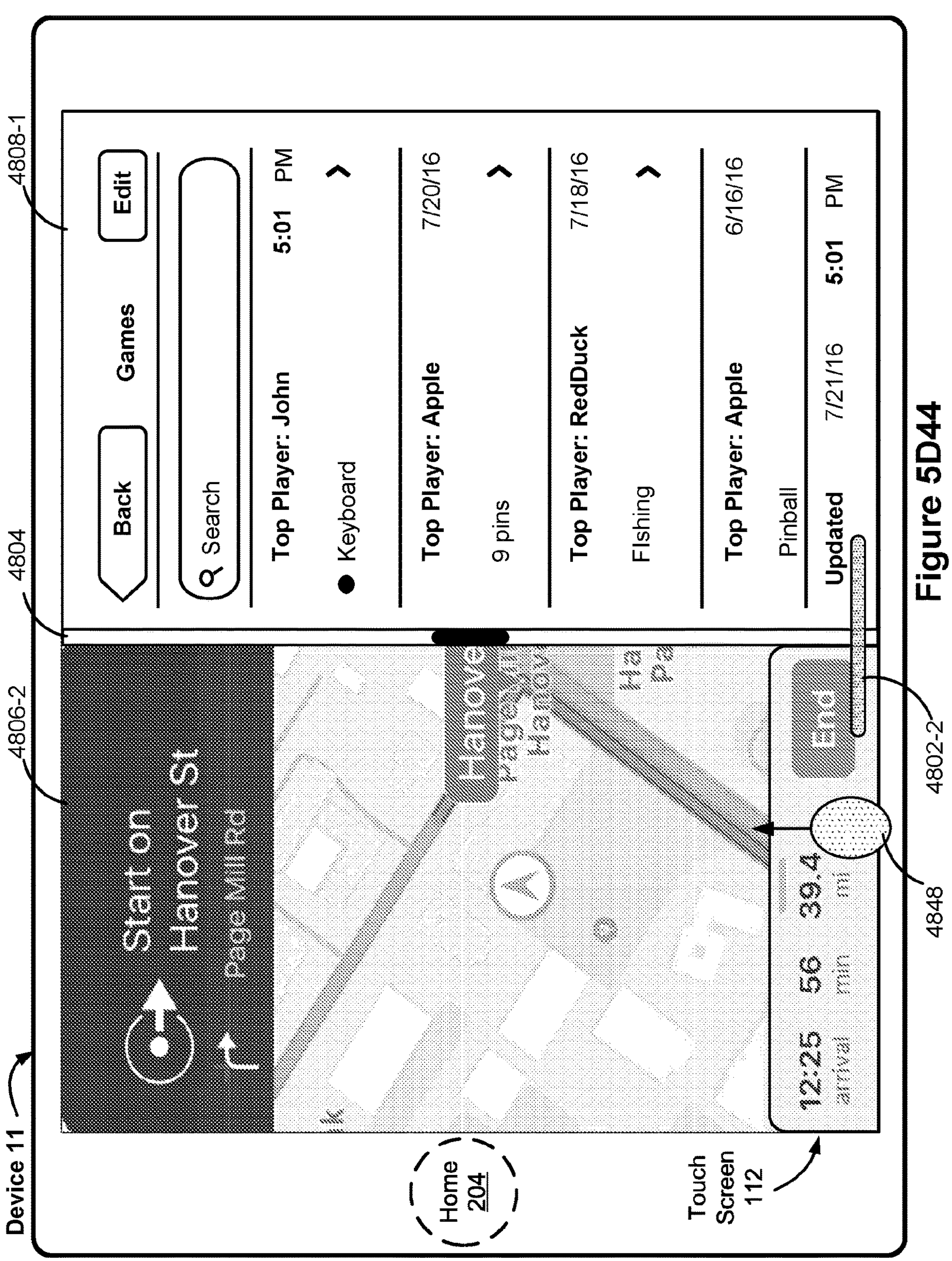
Figure 5D44

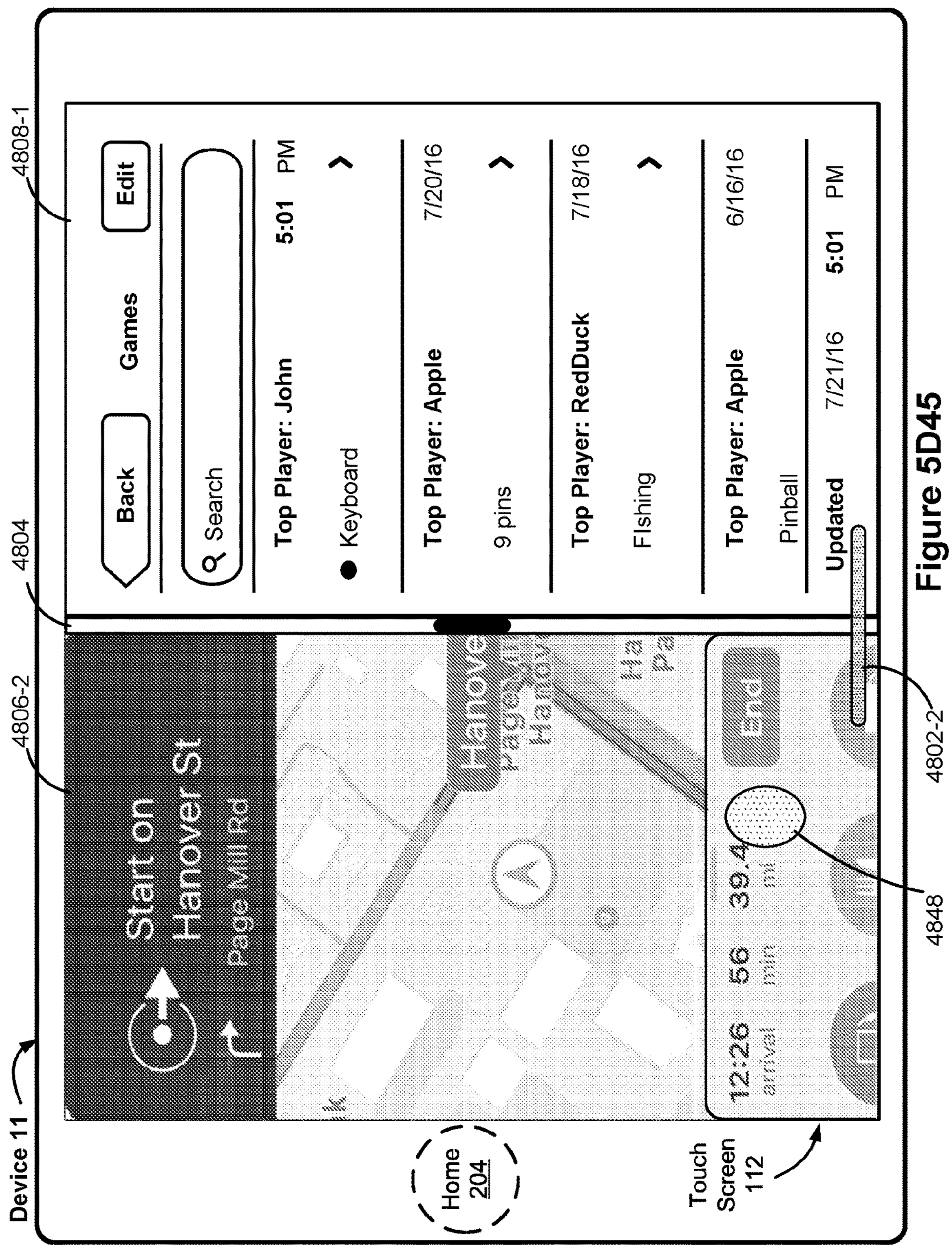
Figure 5D45

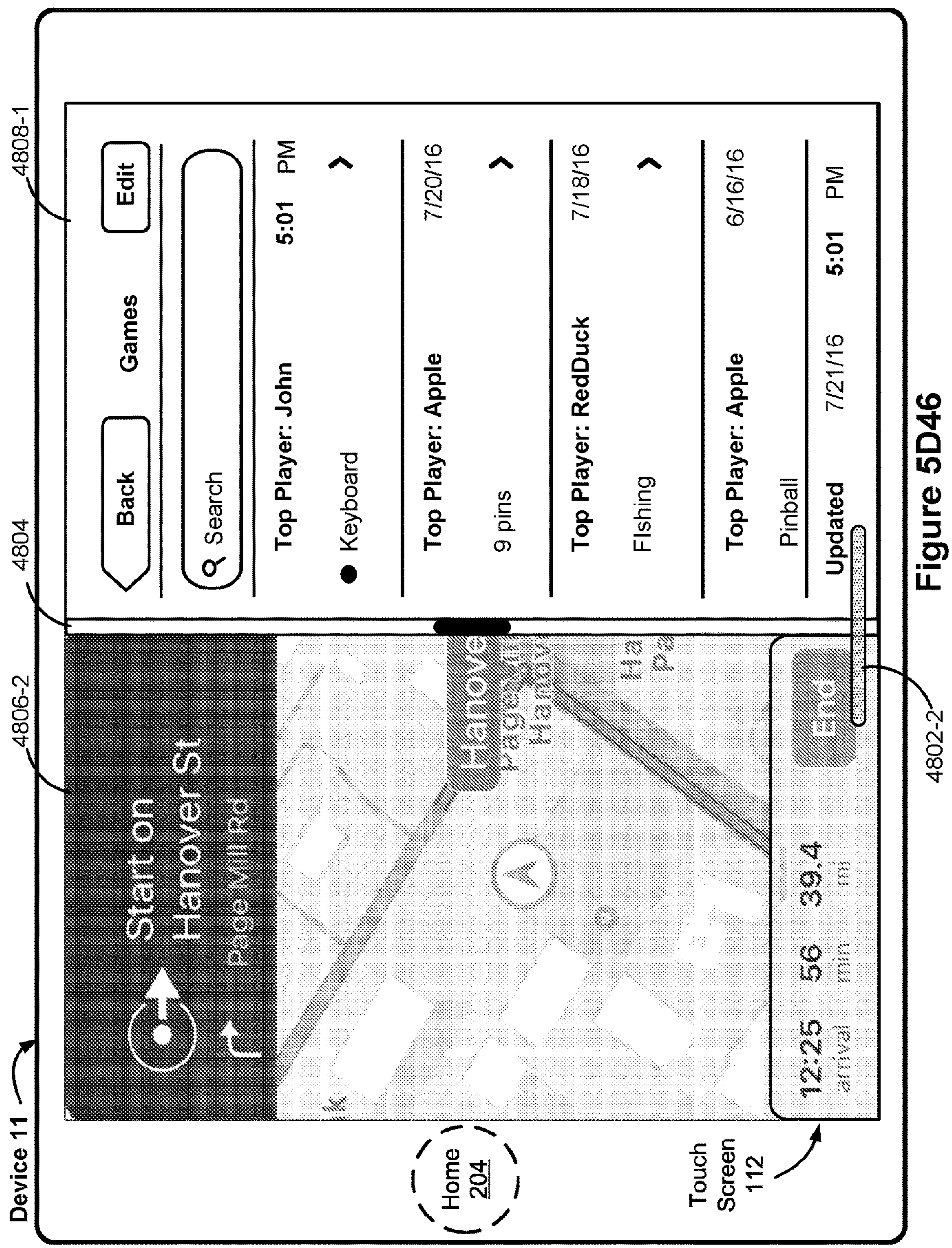
Figure 5D46

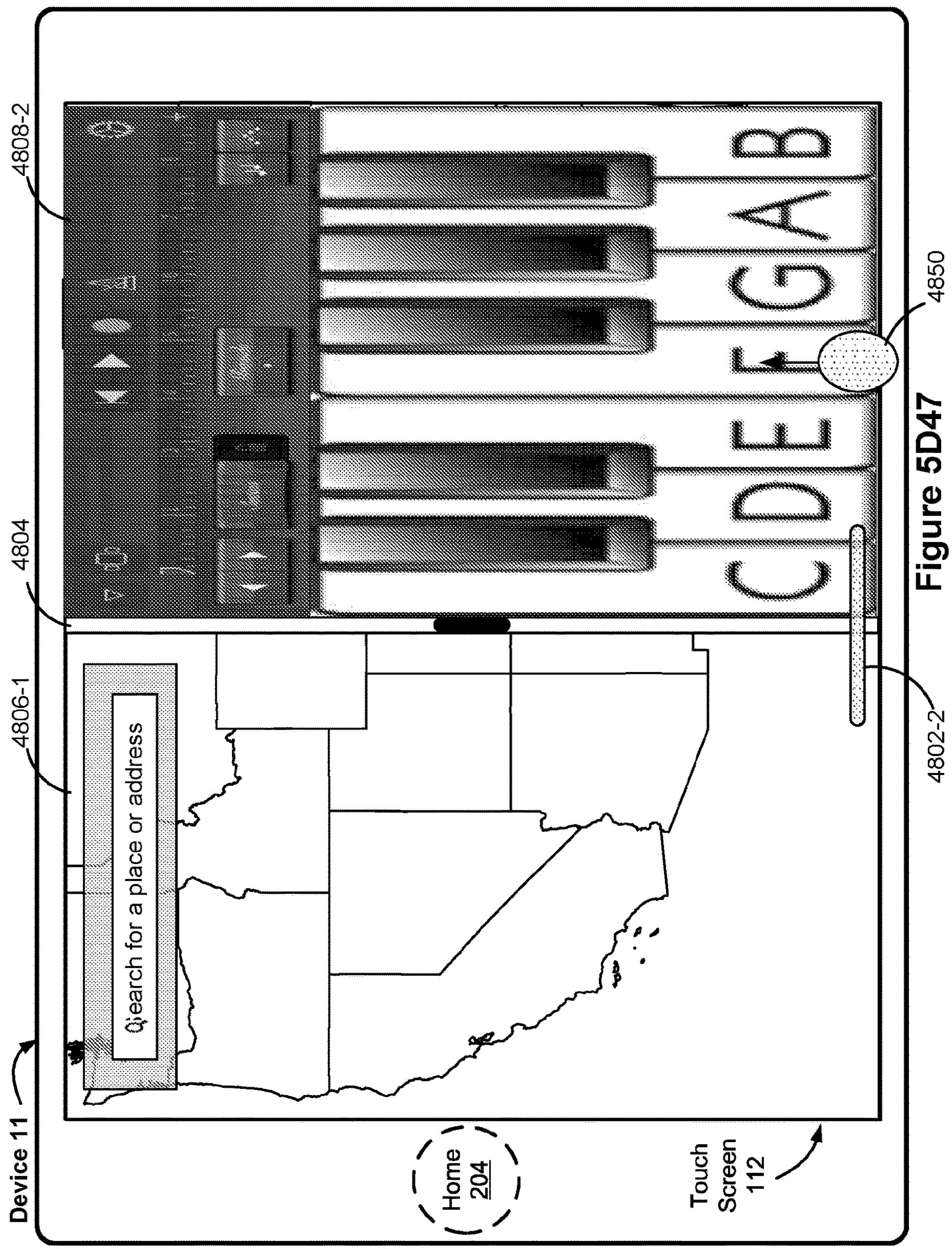
Figure 5D47

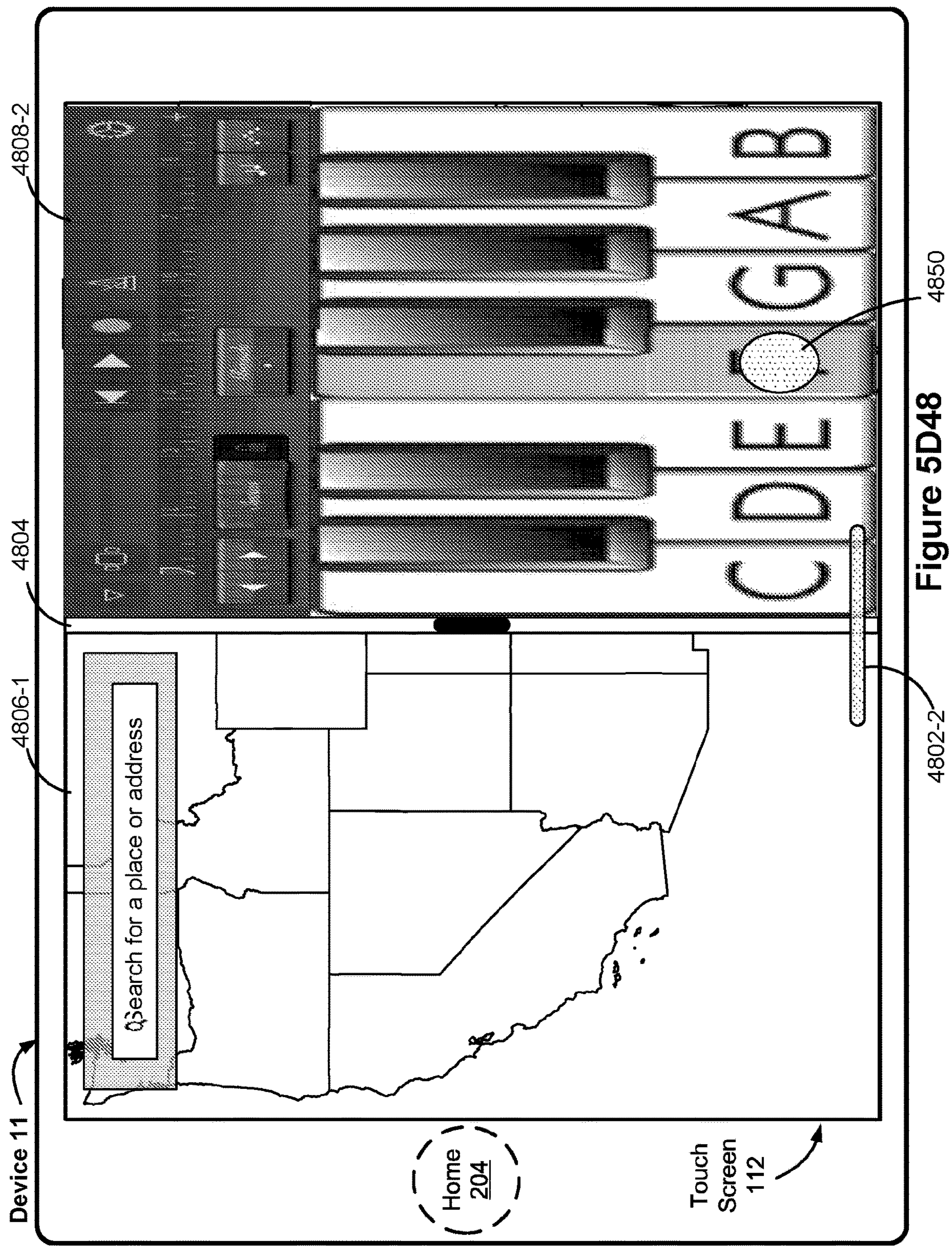
Figure 5D48

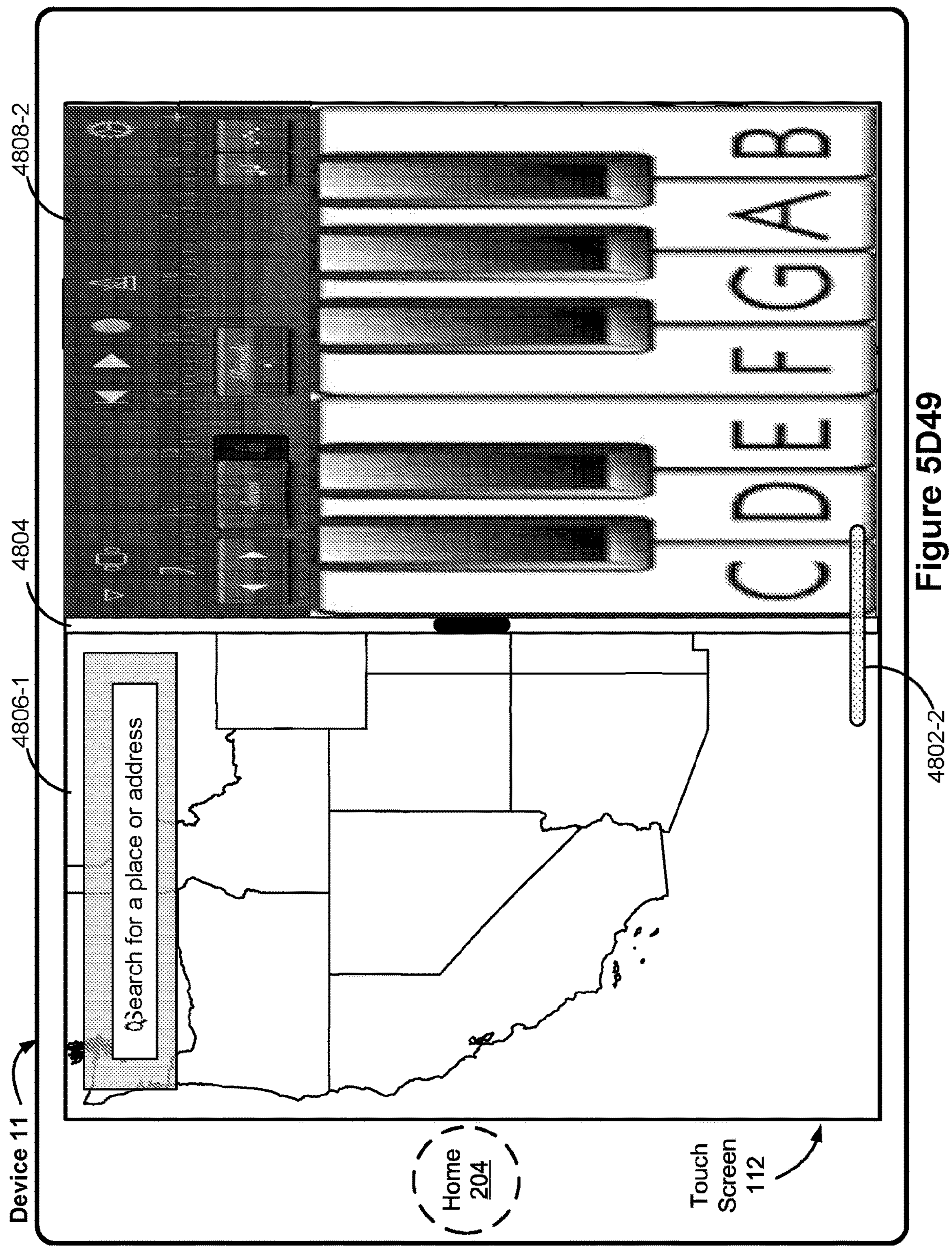
Figure 5D49

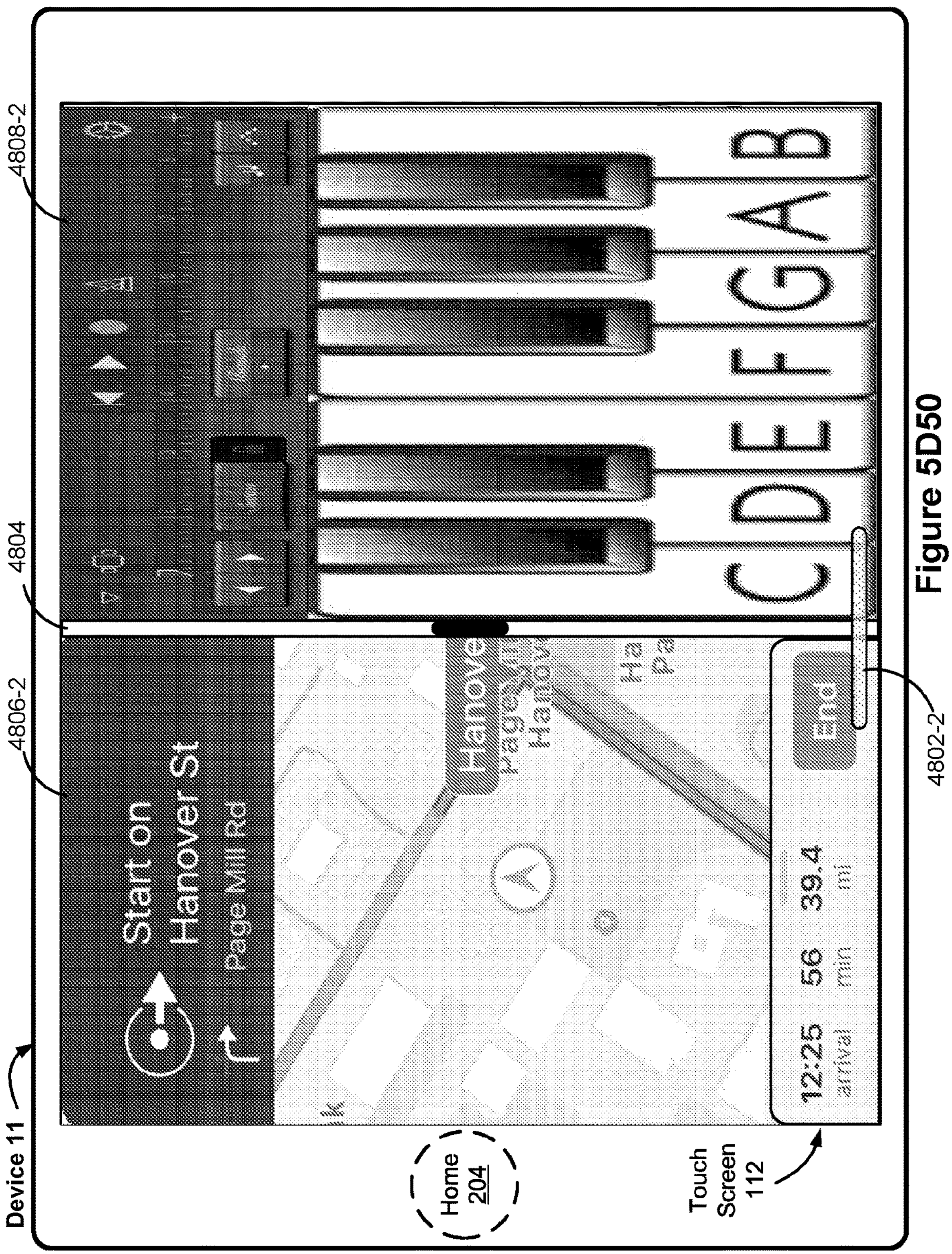
Figure 5D50

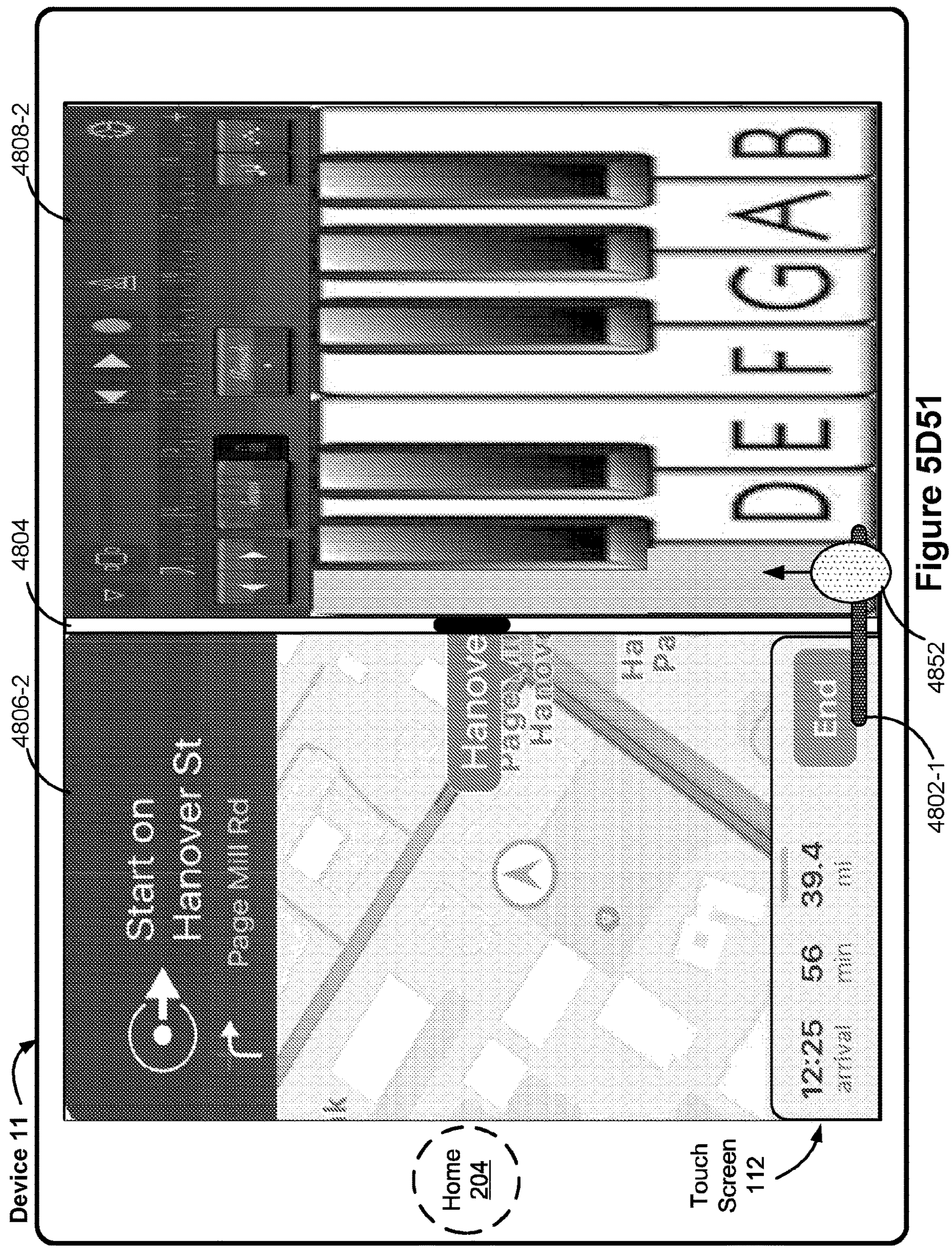
Figure 5D51

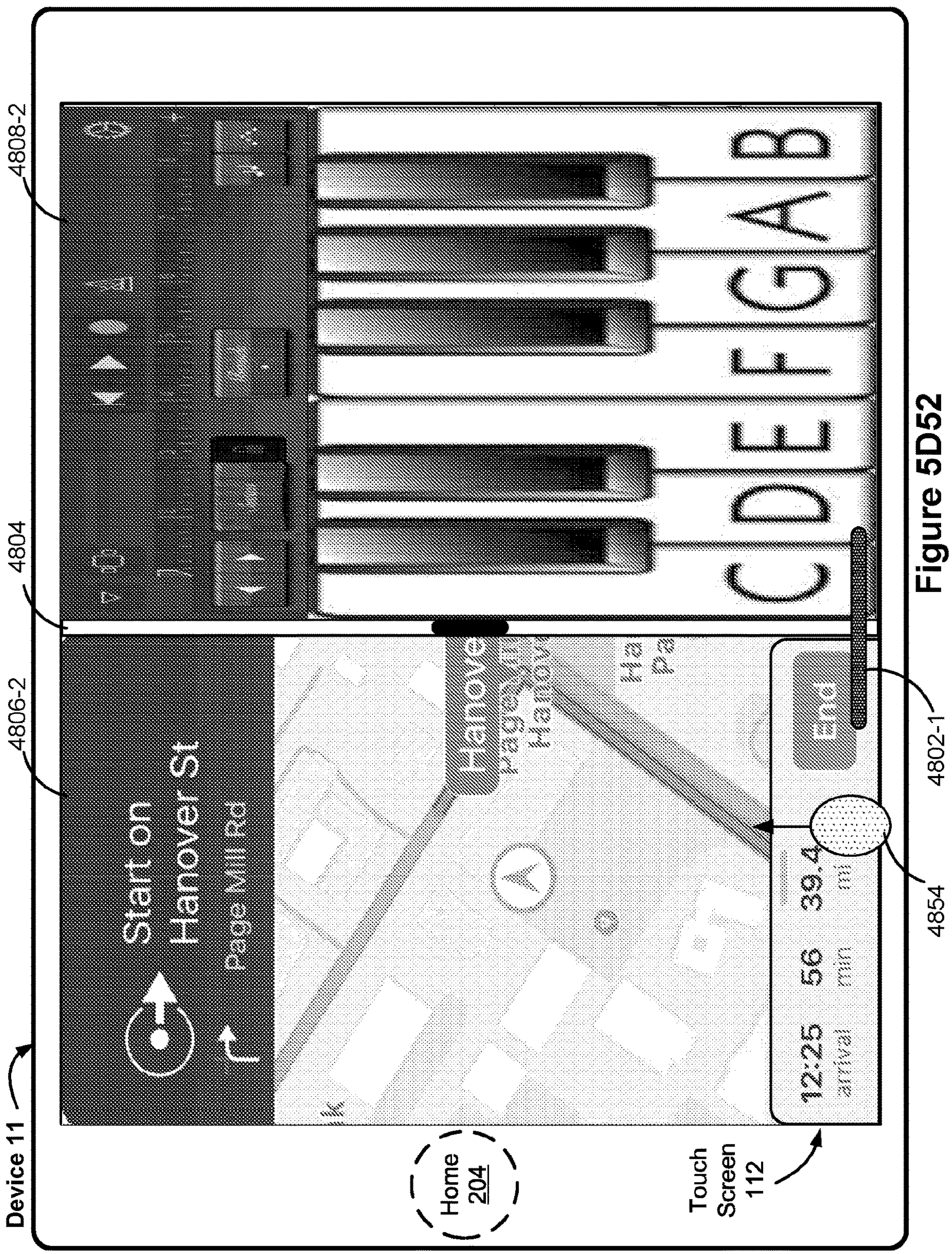
Figure 5D52

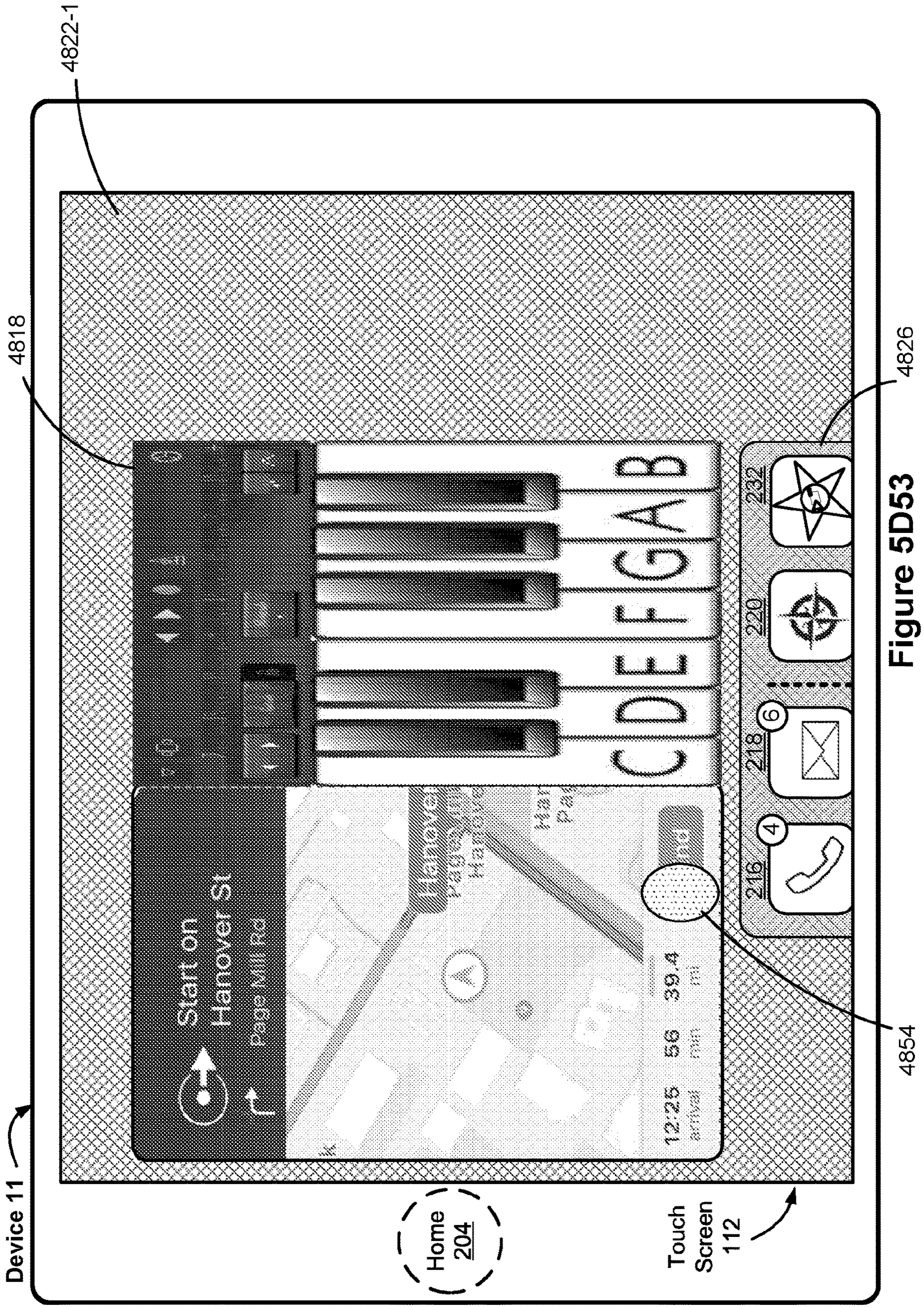
Figure 5D53

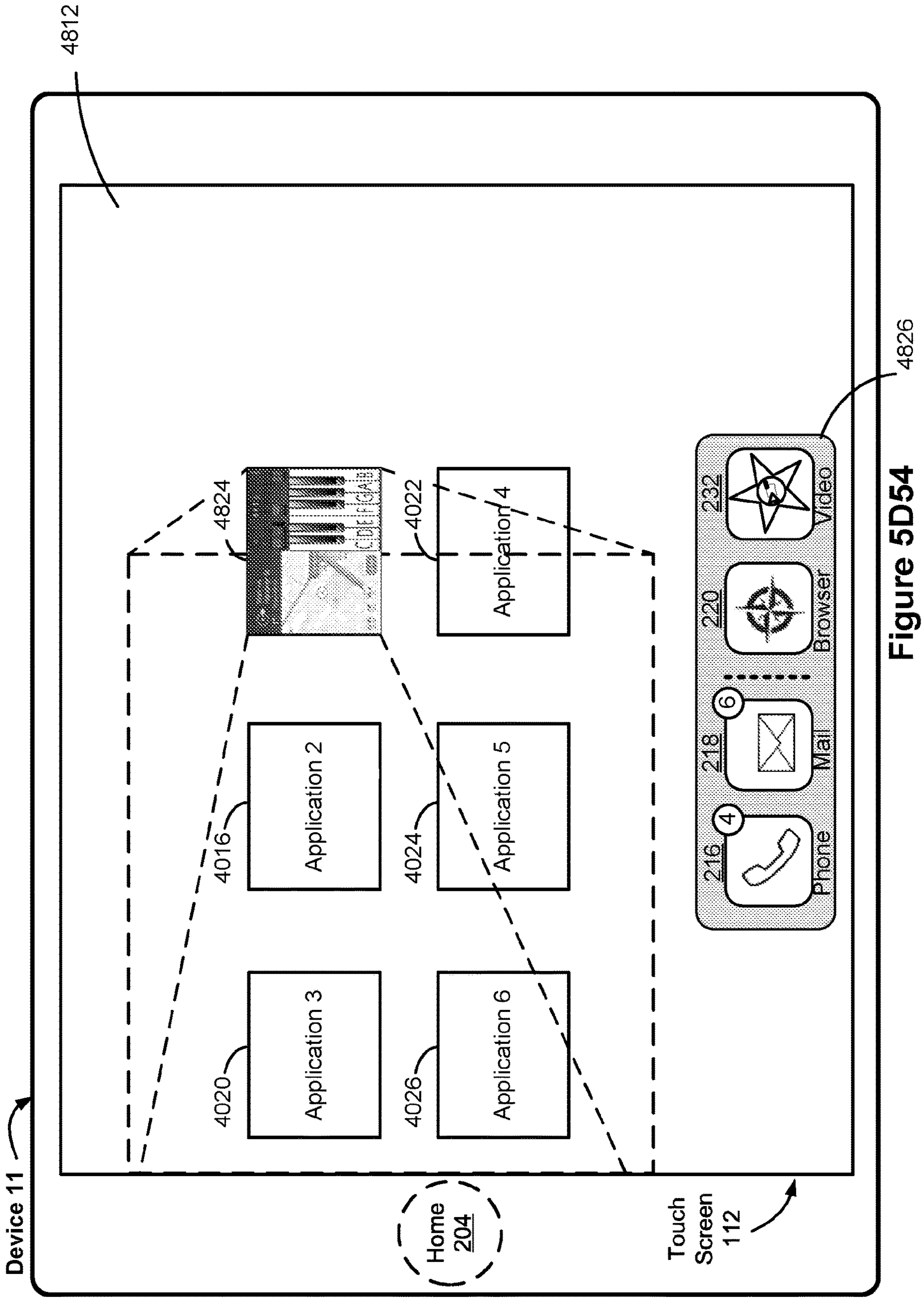
Figure 5D54

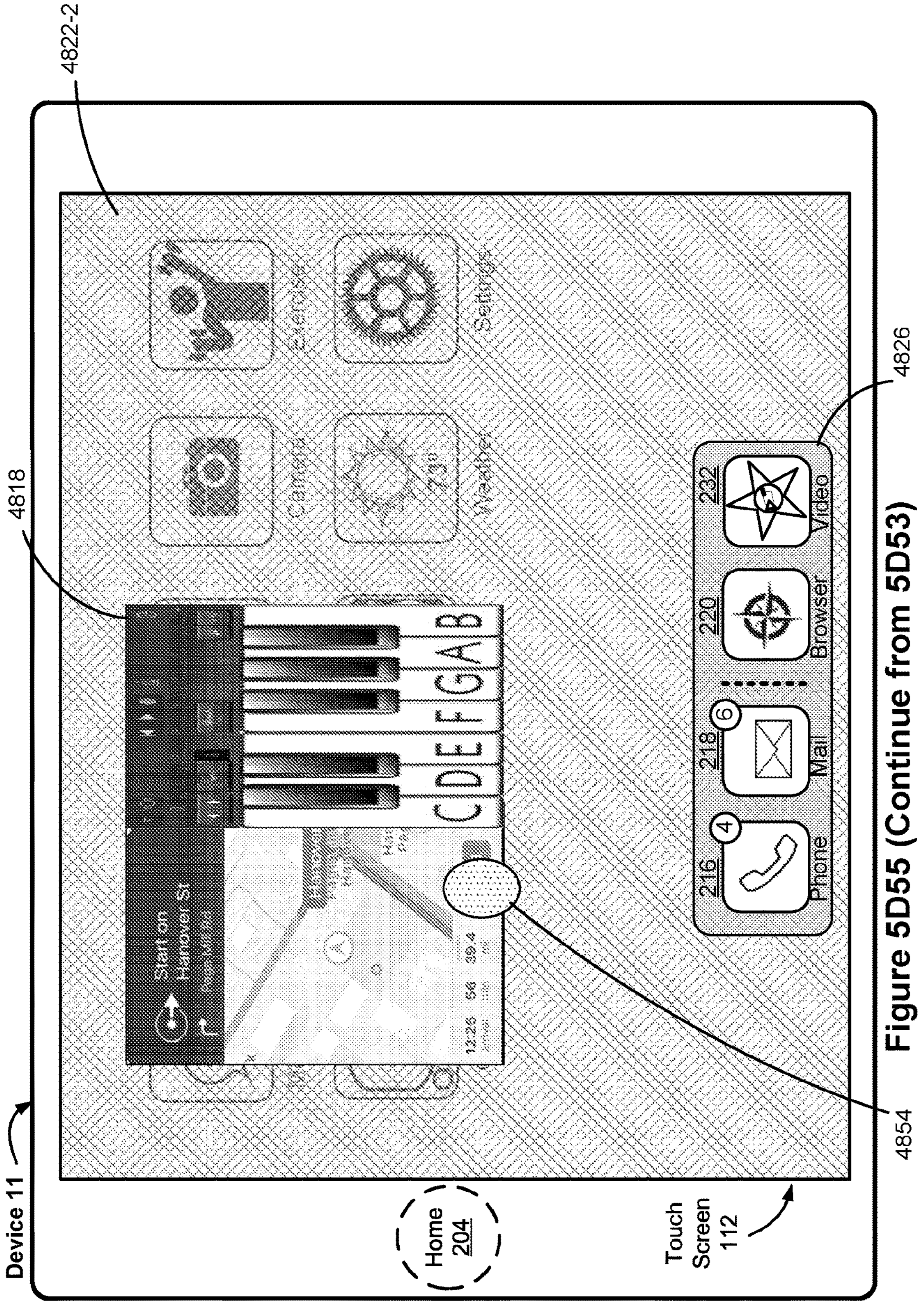
Figure 5D55 (Continue from 5D53)

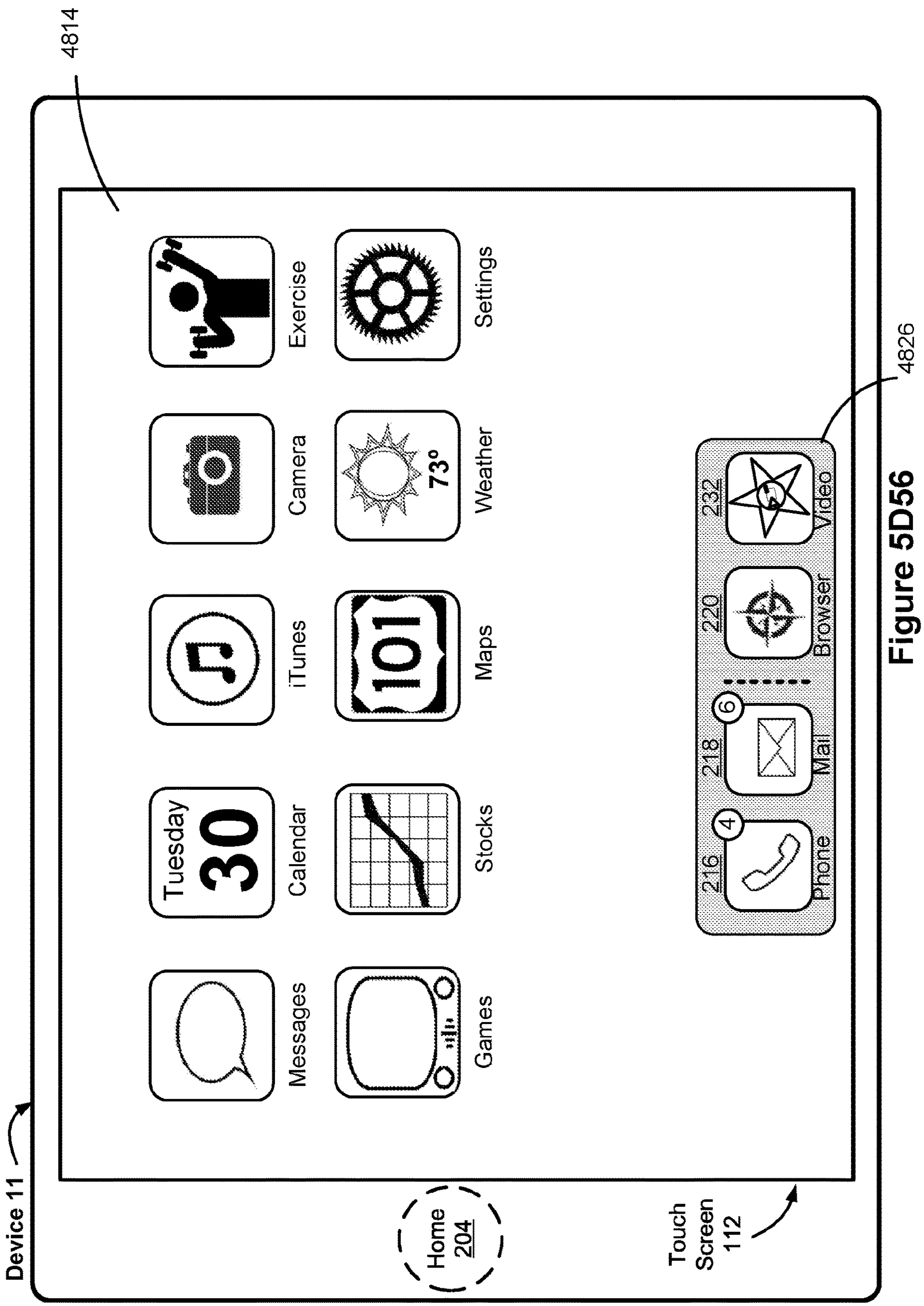
Figure 5D56

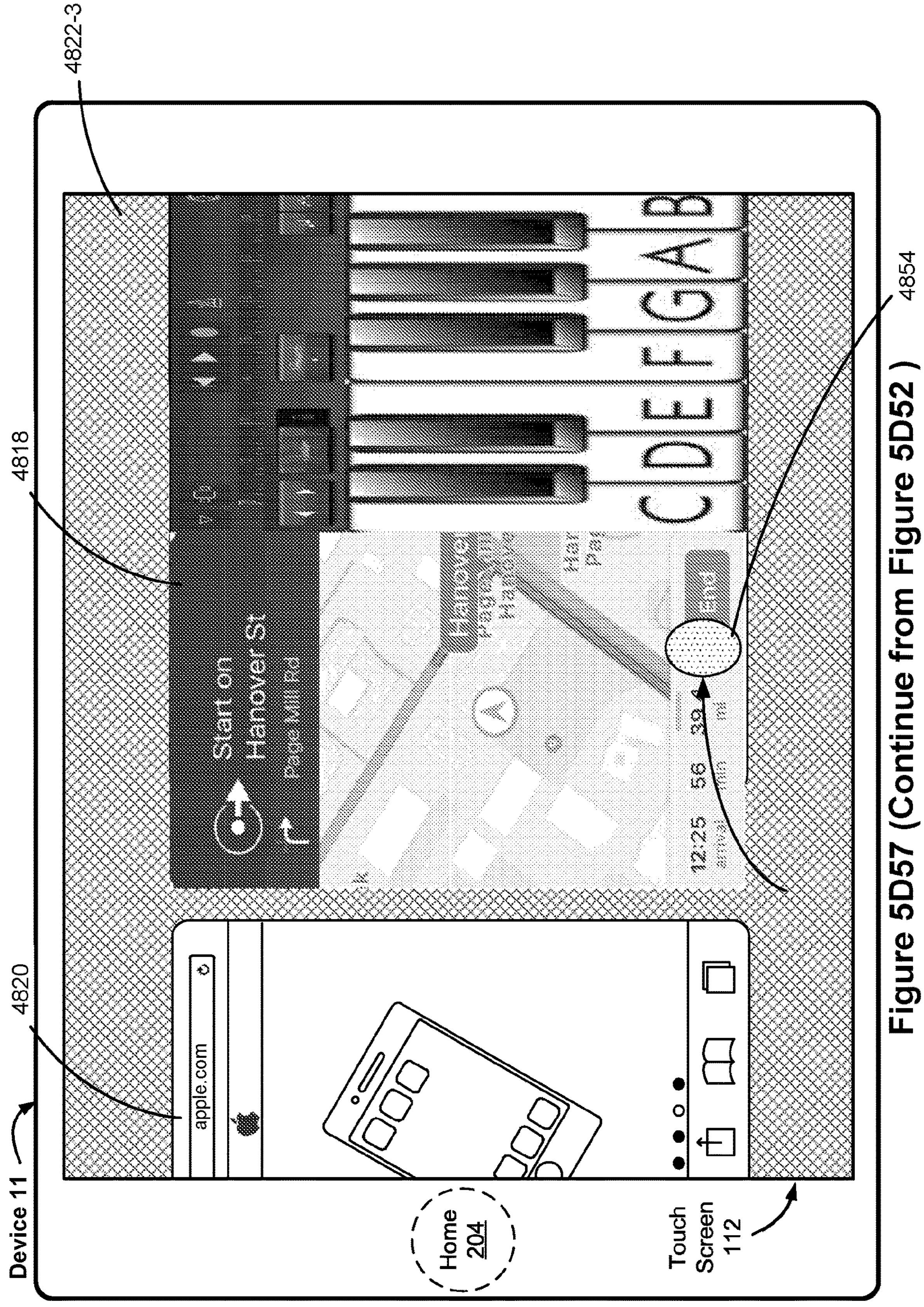
Figure 5D57 (Continue from Figure 5D52 )

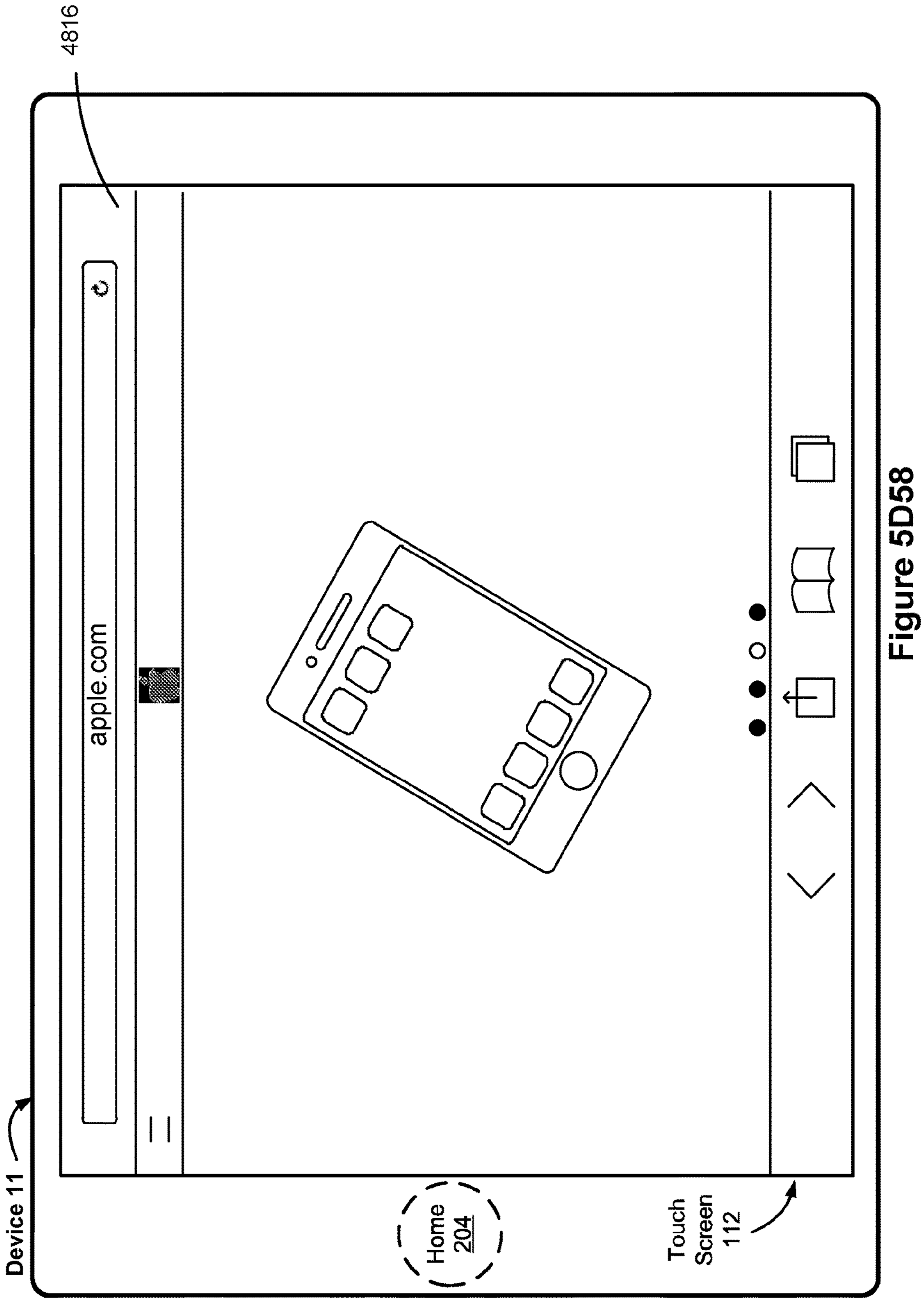
Figure 5D58

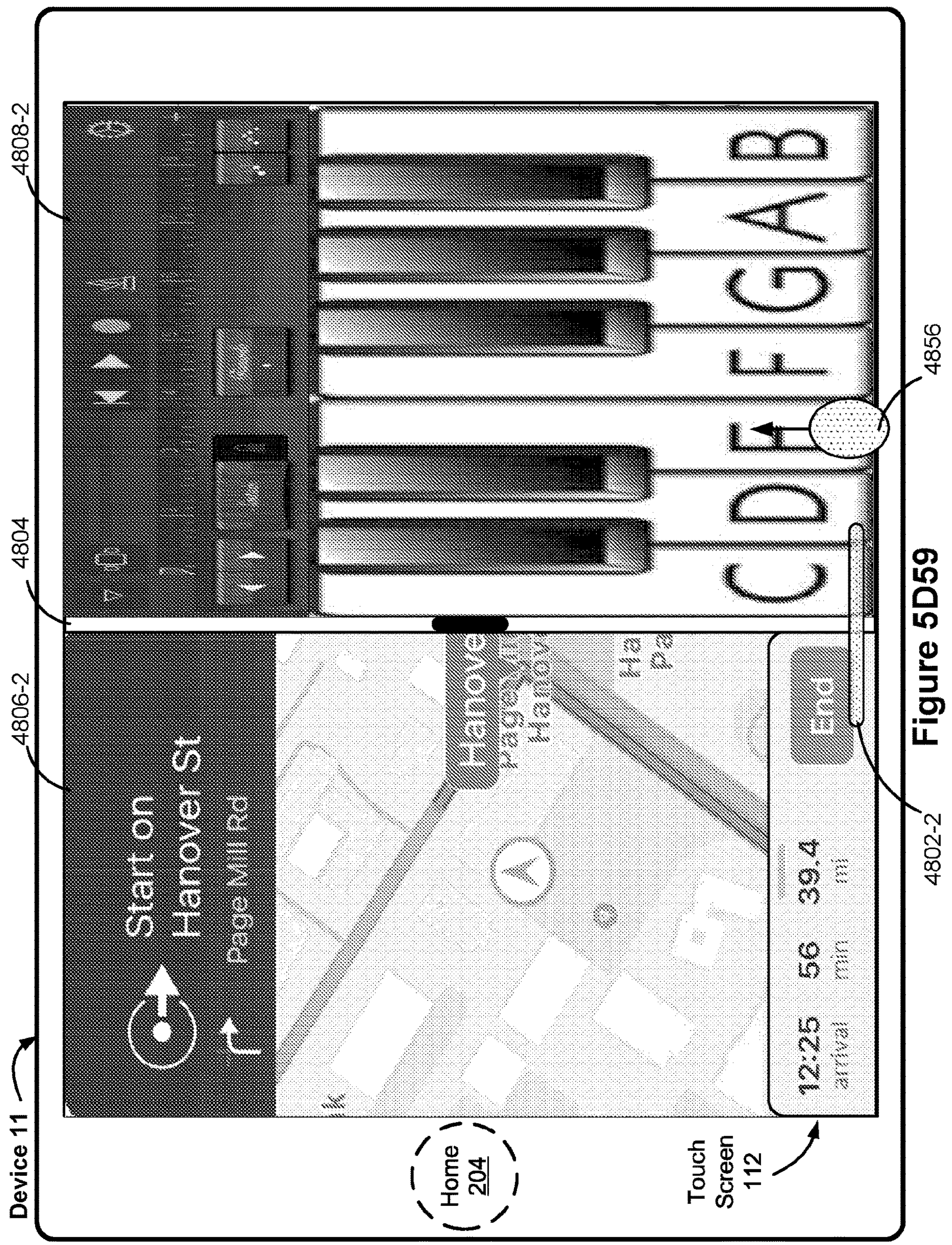
Figure 5D59

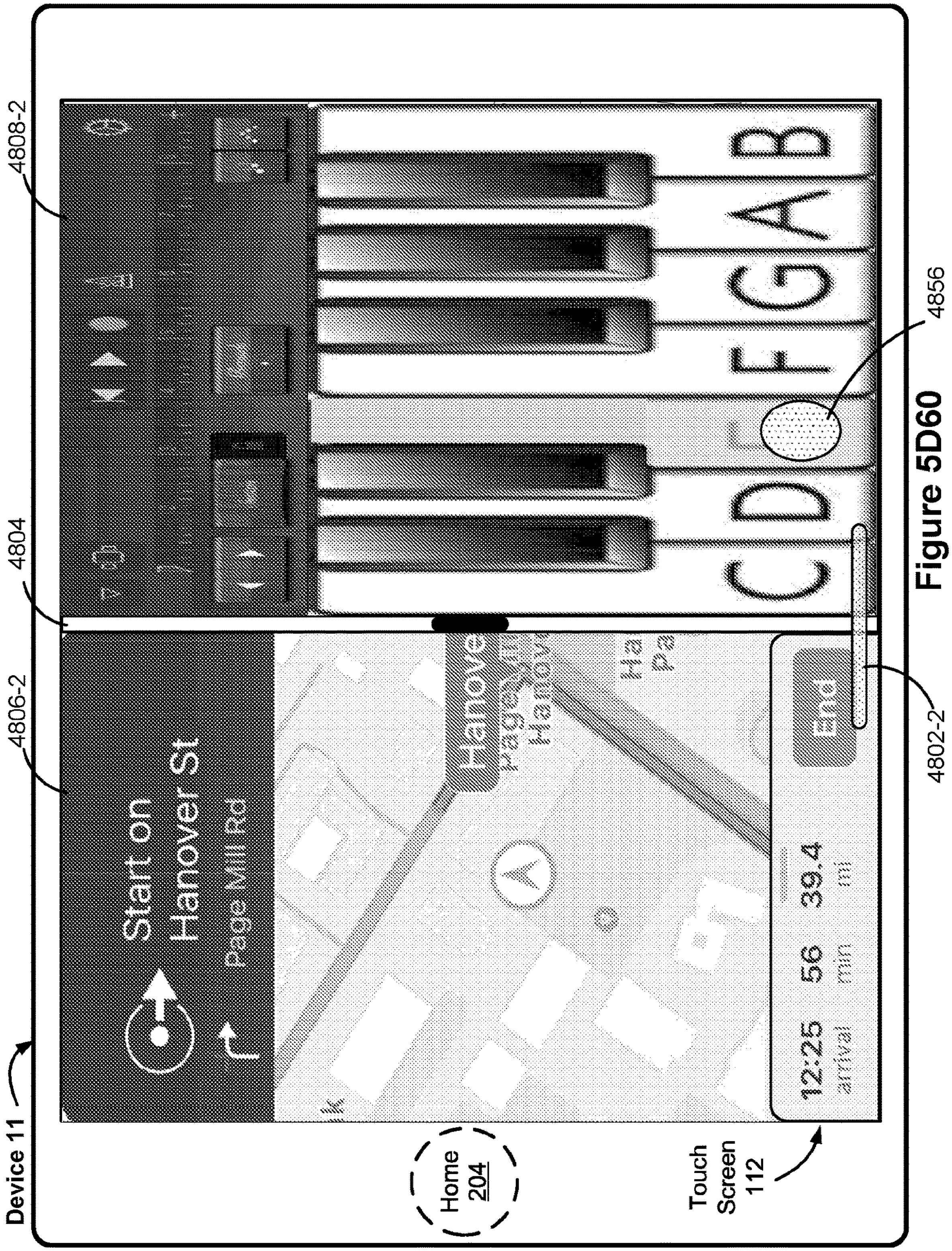
Figure 5D60

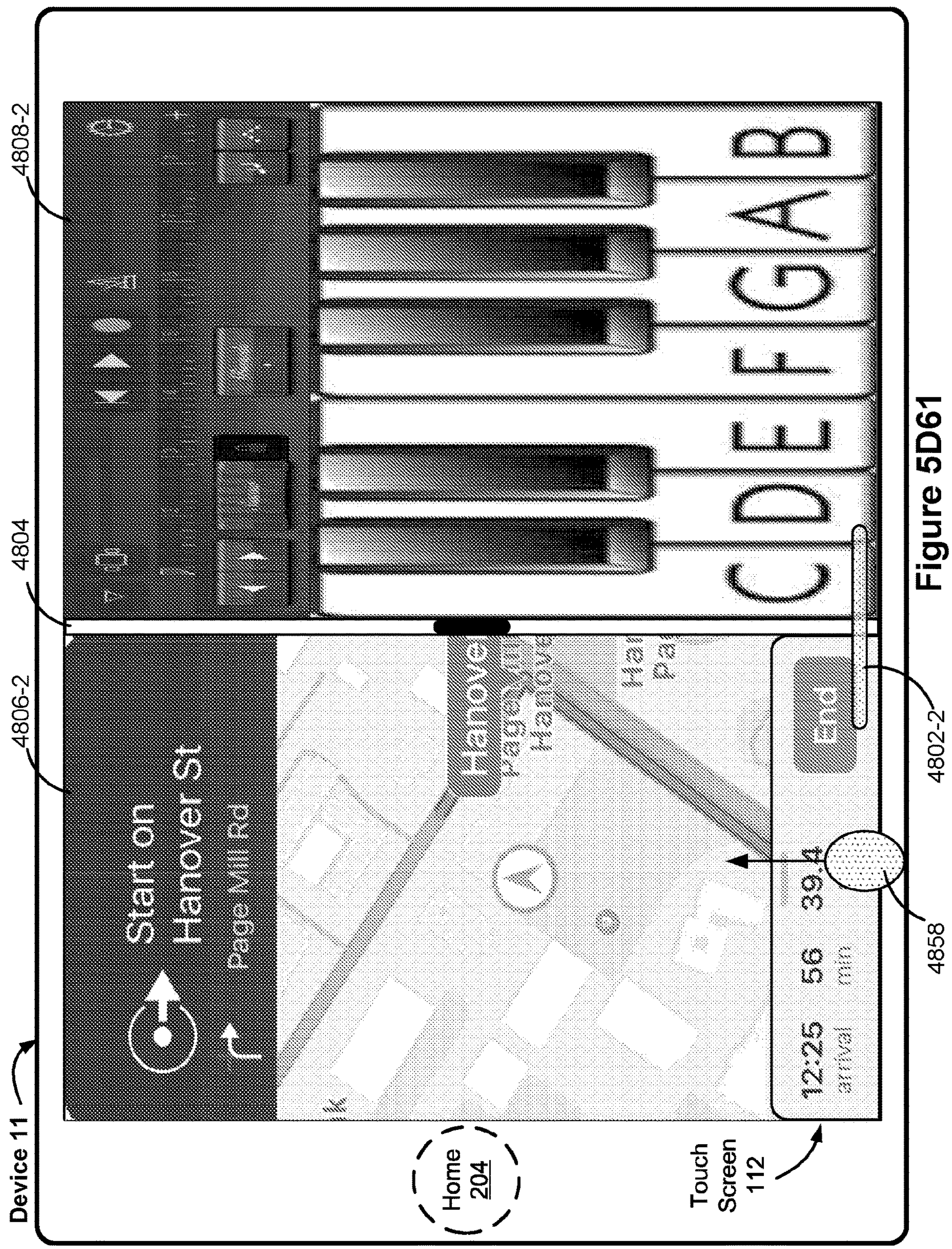
Figure 5D61

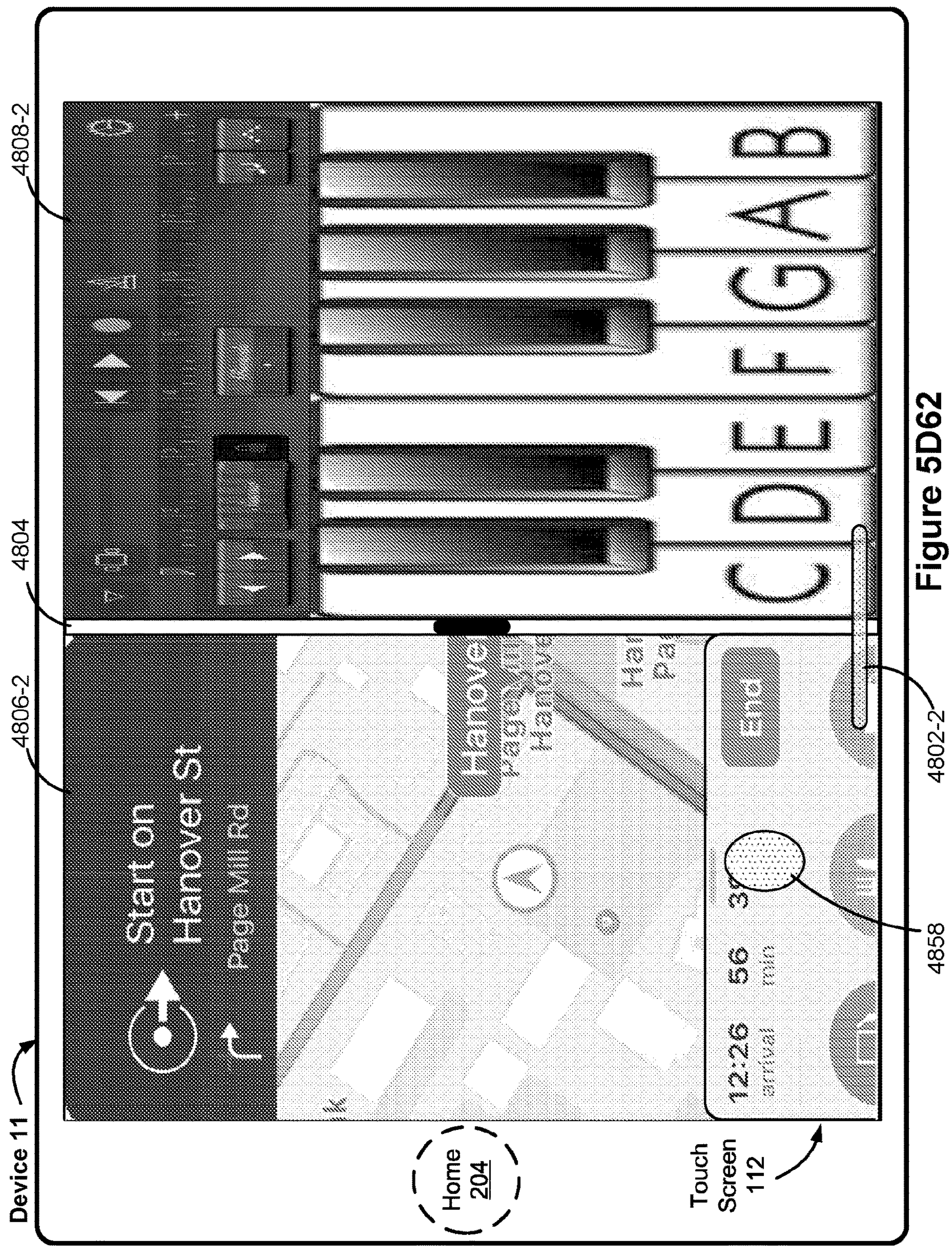
Figure 5D62

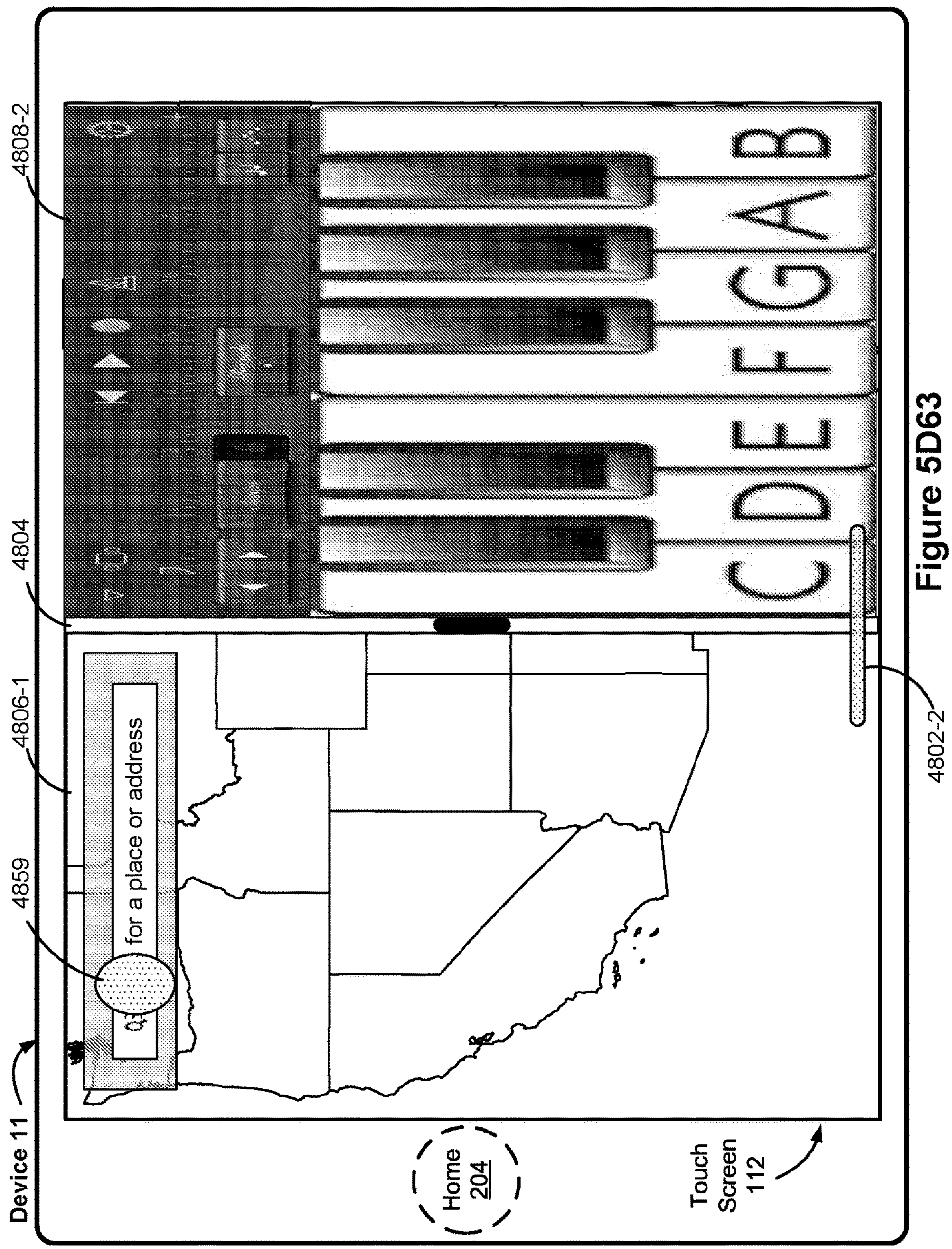
Figure 5D63

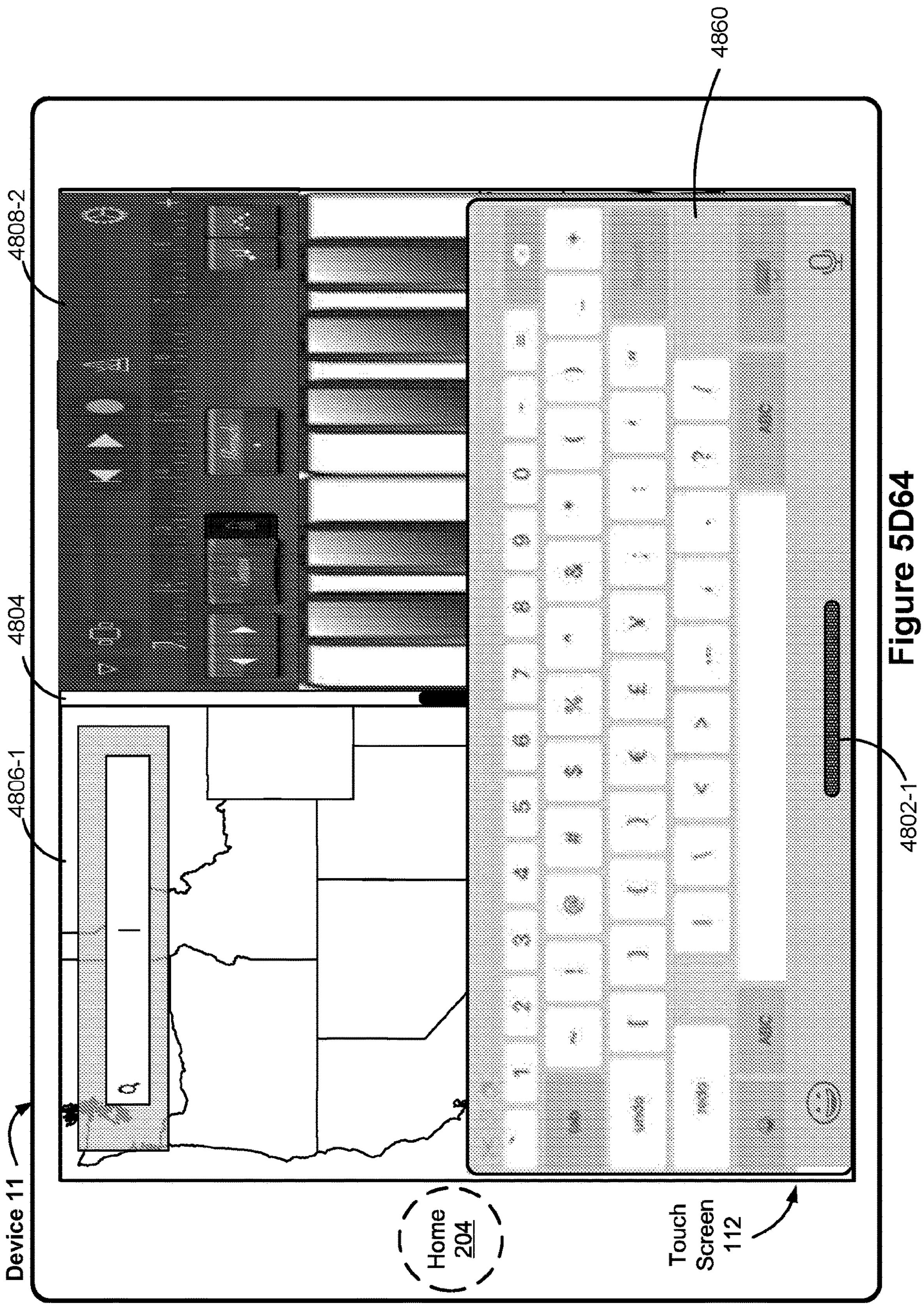
Figure 5D64

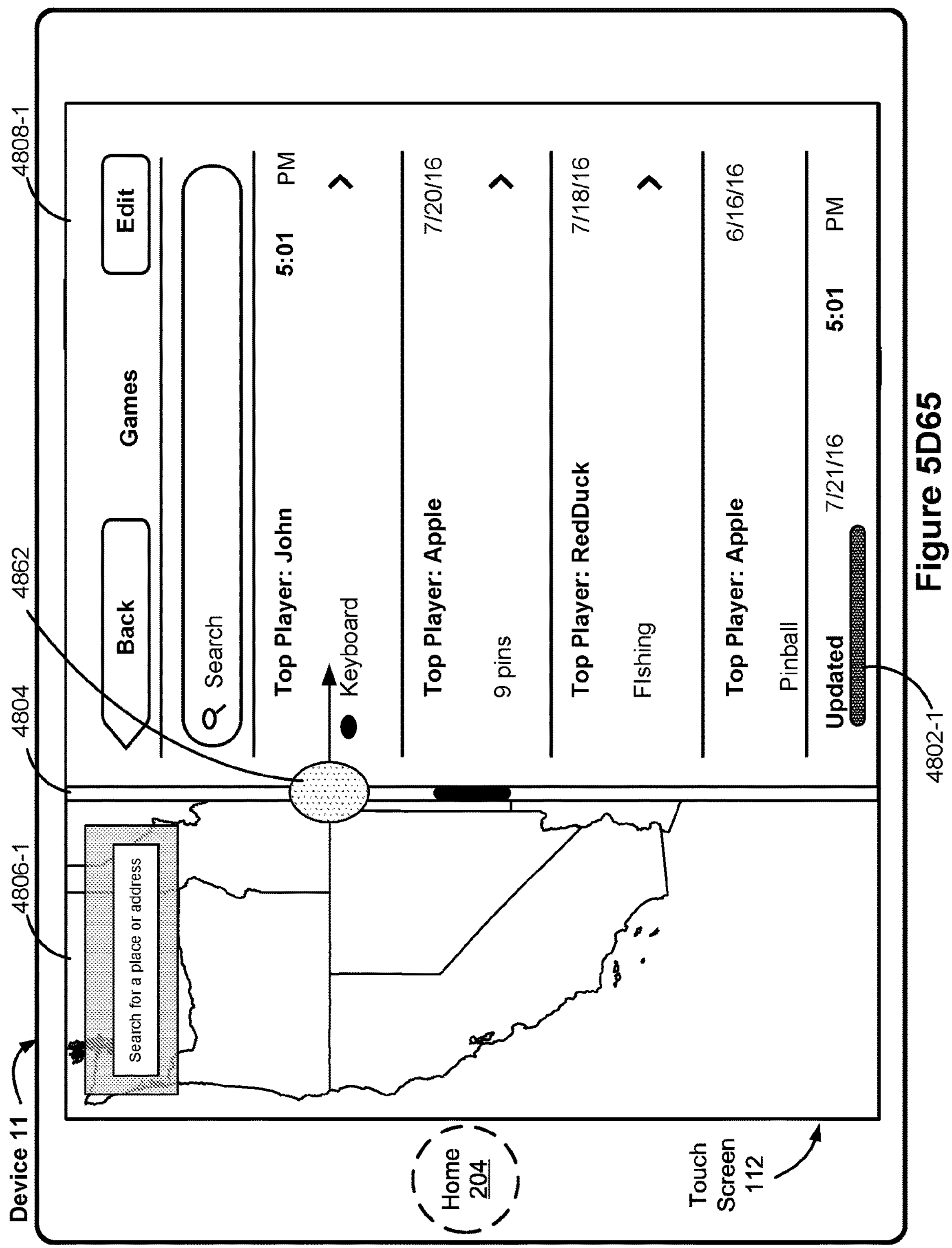
Figure 5D65

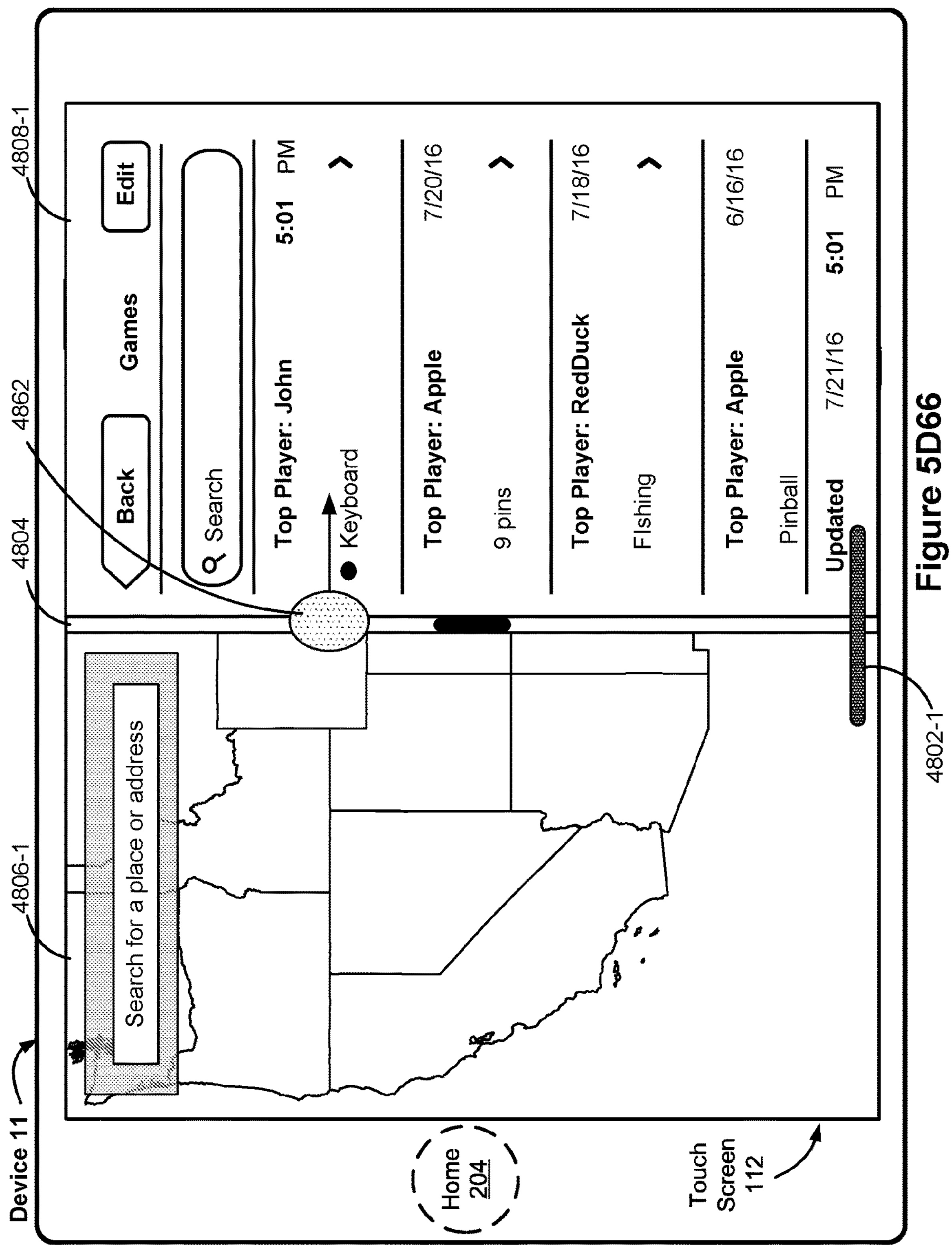
Figure 5D66

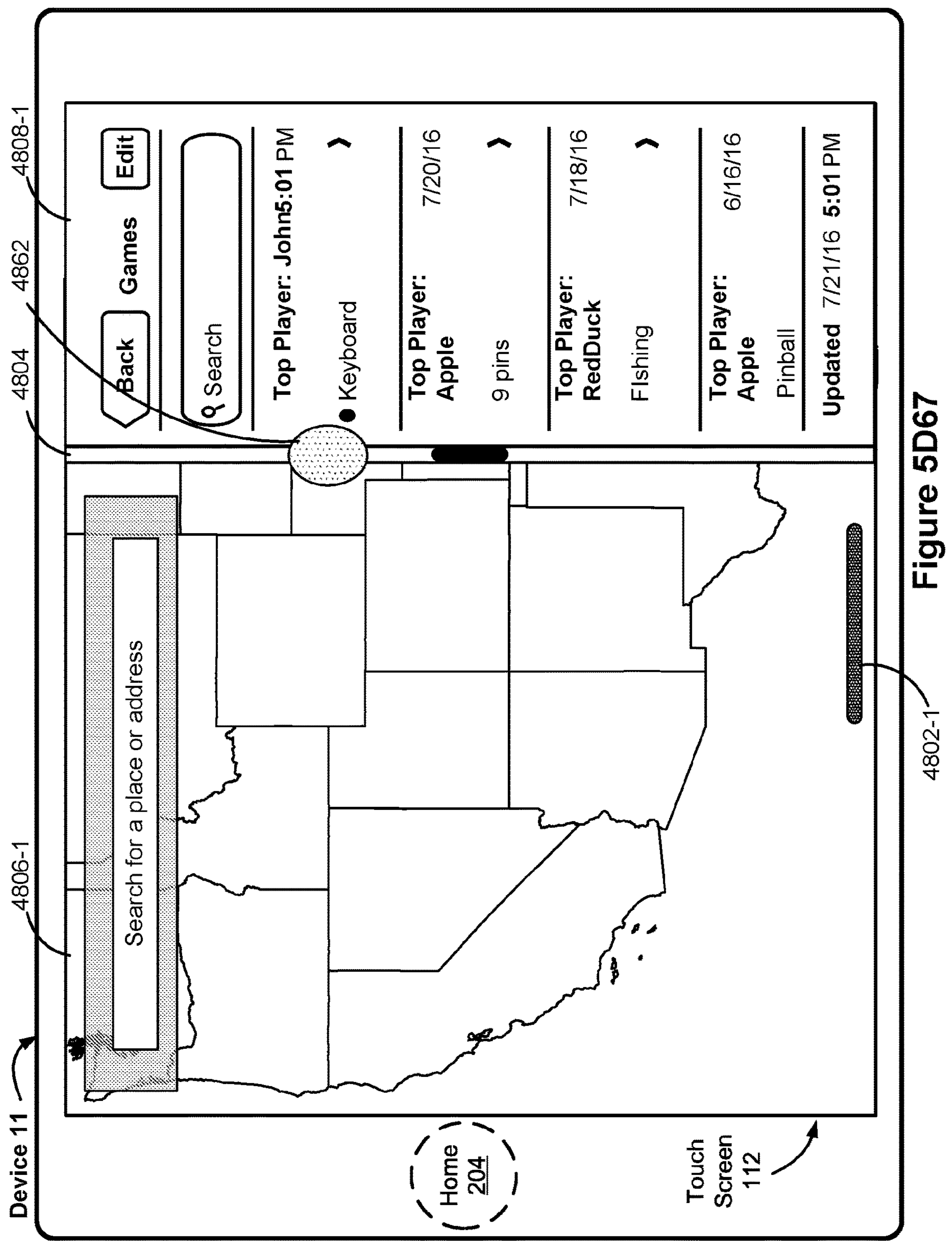
Figure 5D67

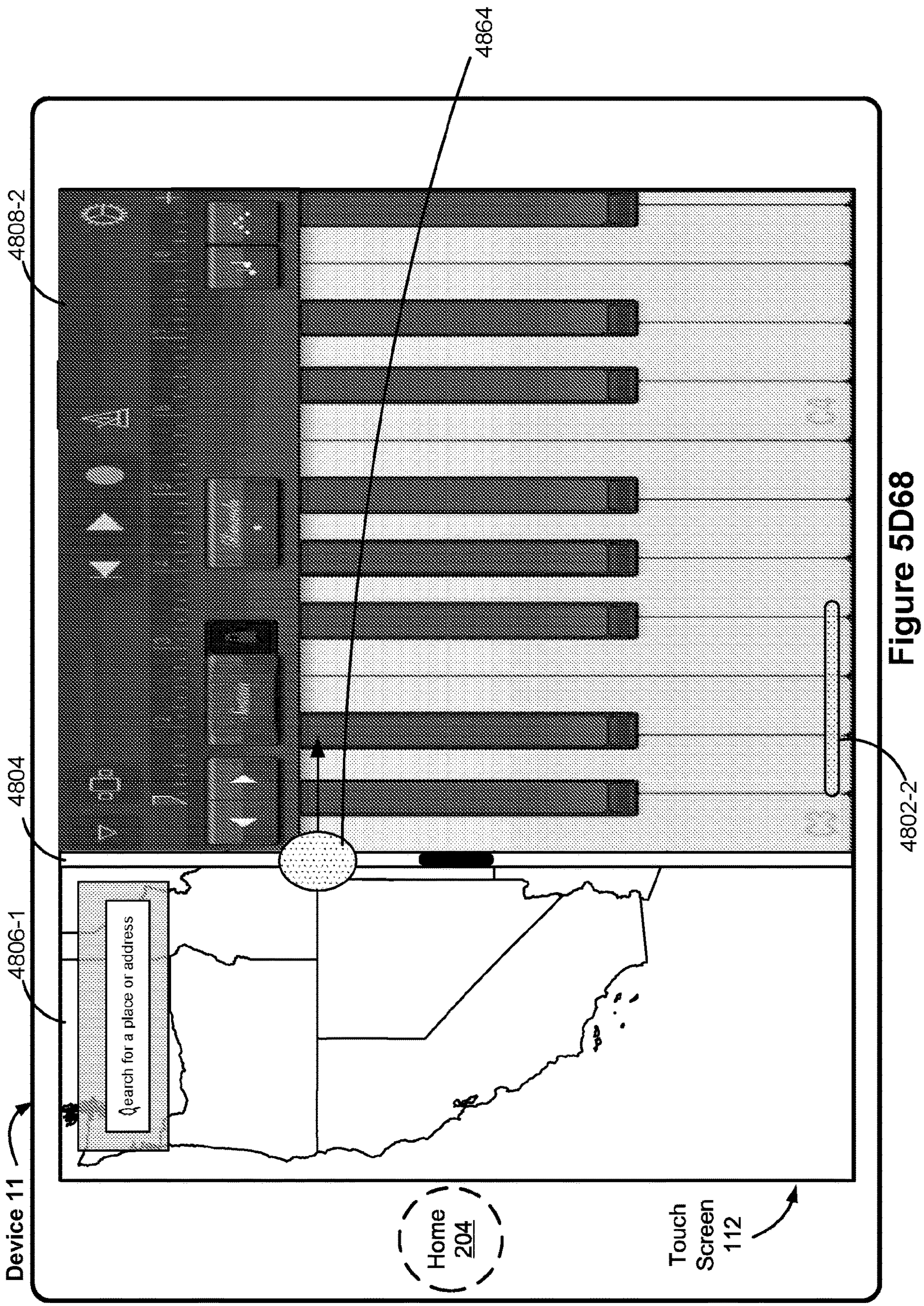
Figure 5D68

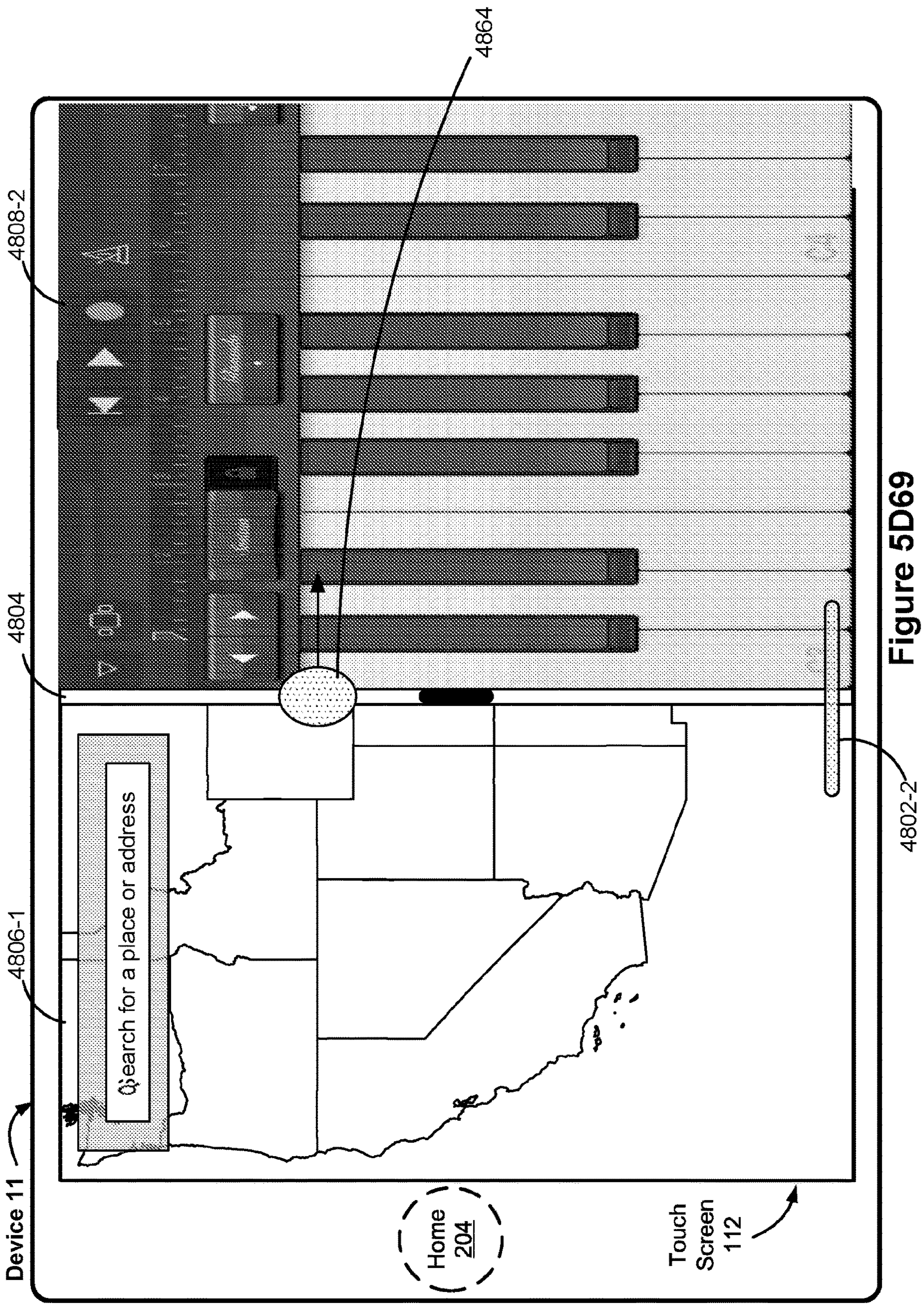
Figure 5D69

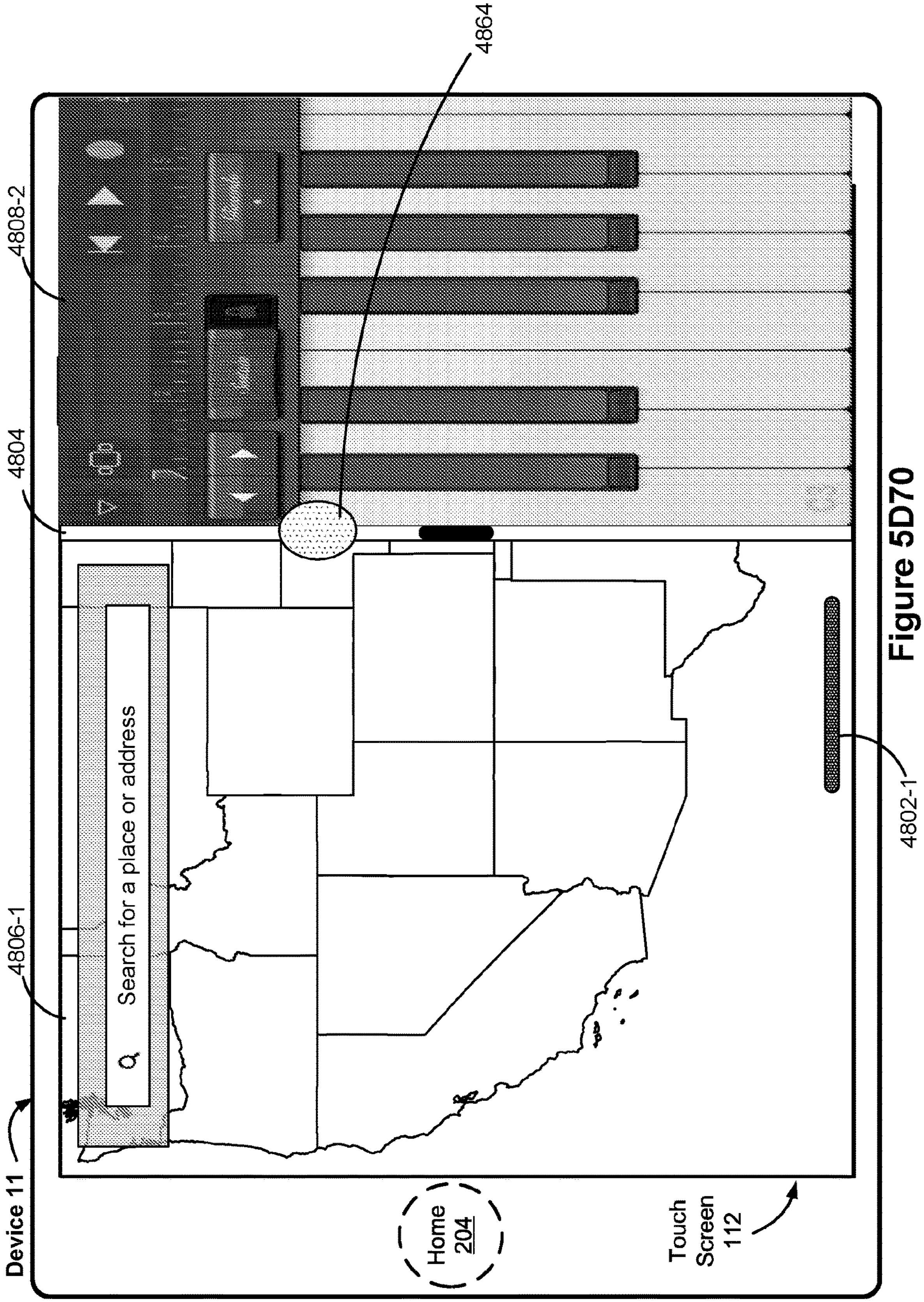
Figure 5D70

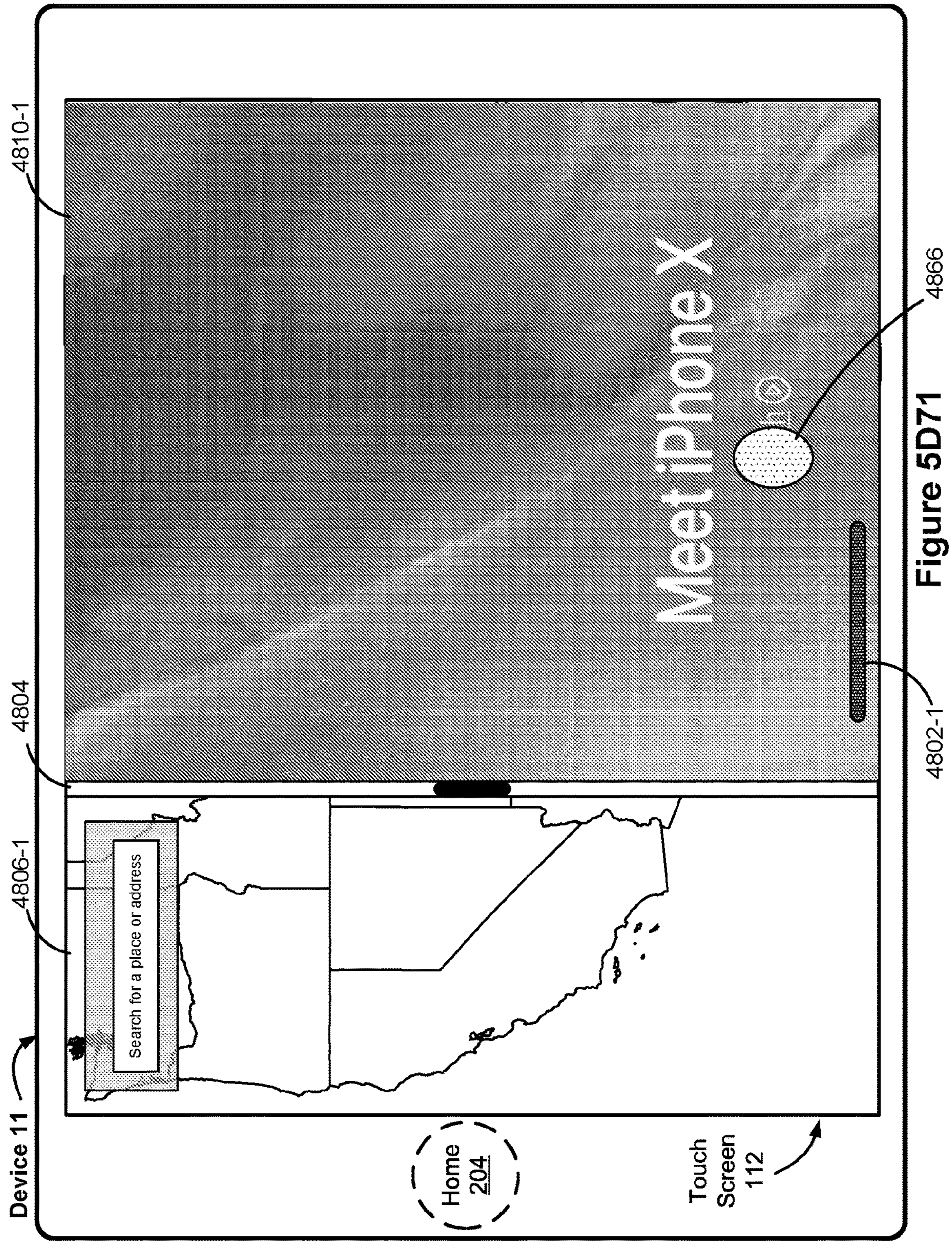
Figure 5D71

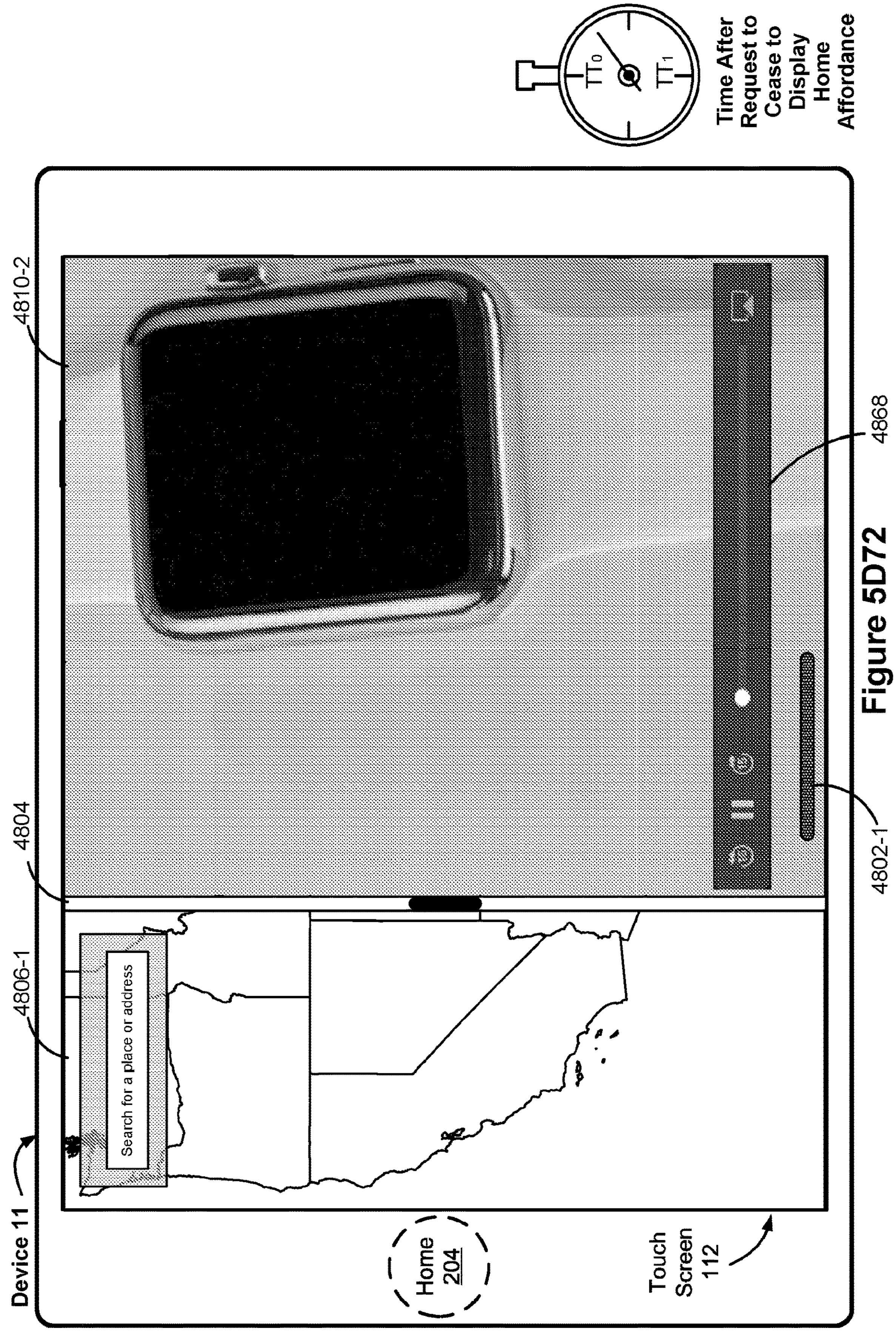
Figure 5D72

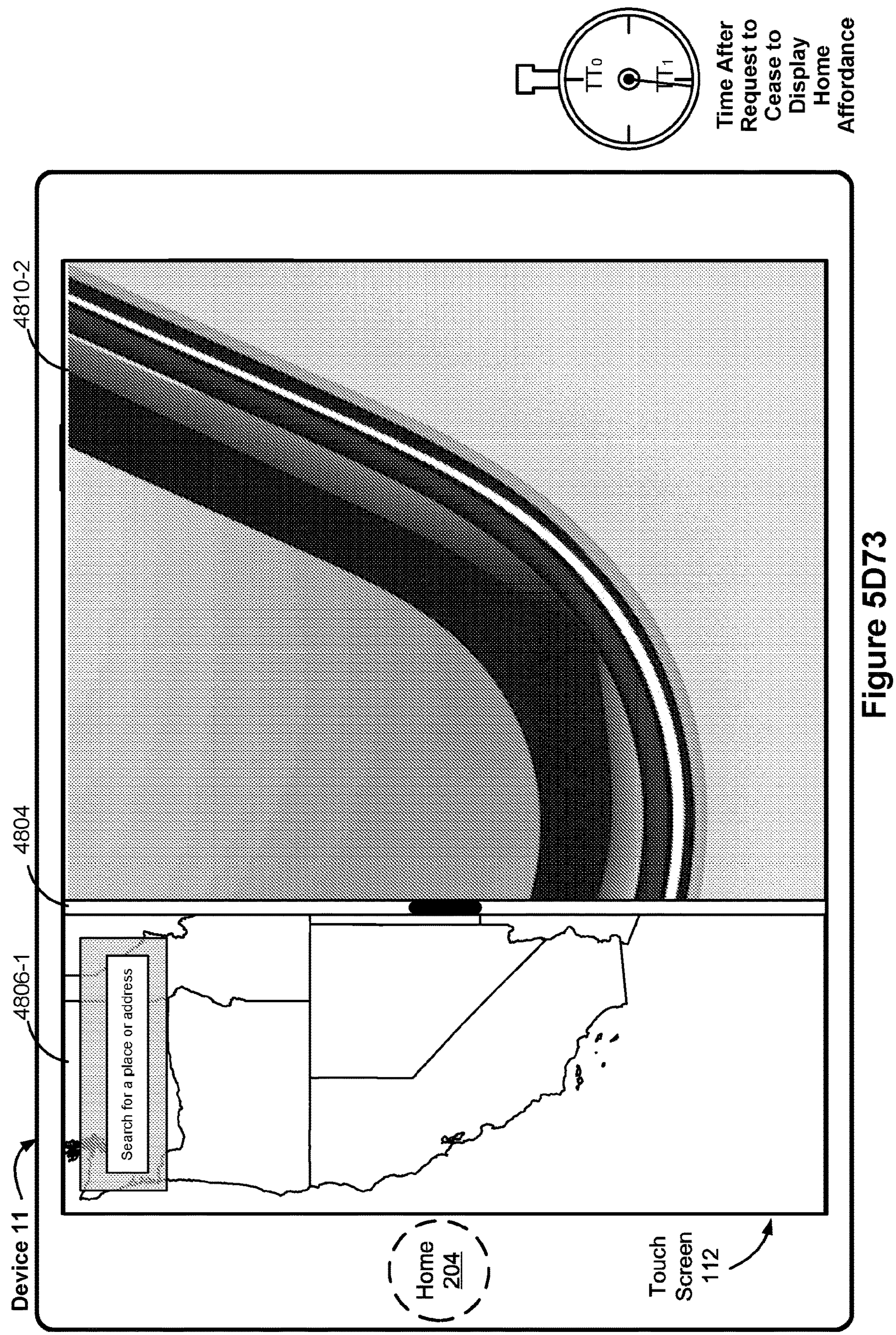
Figure 5D73

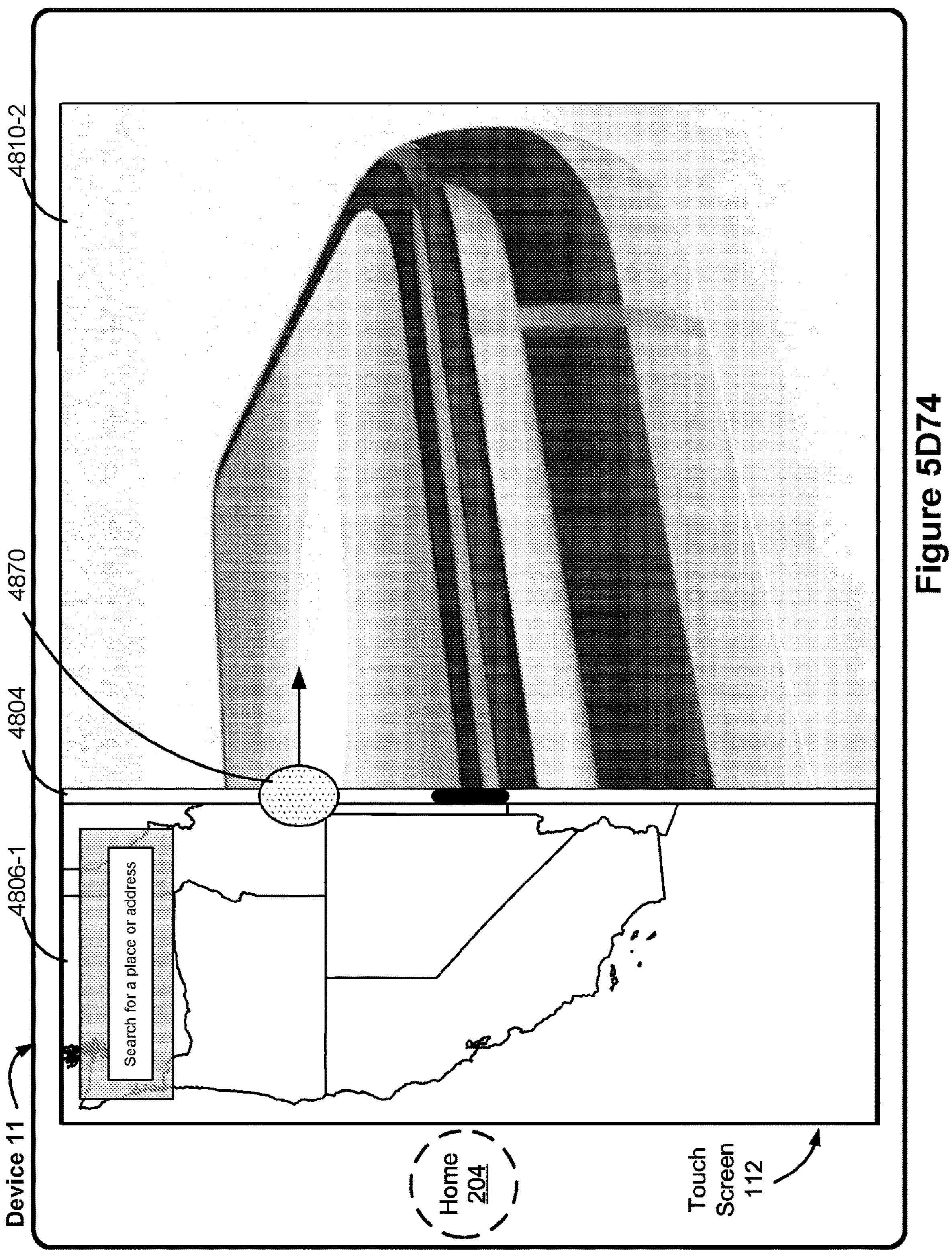
Figure 5D74

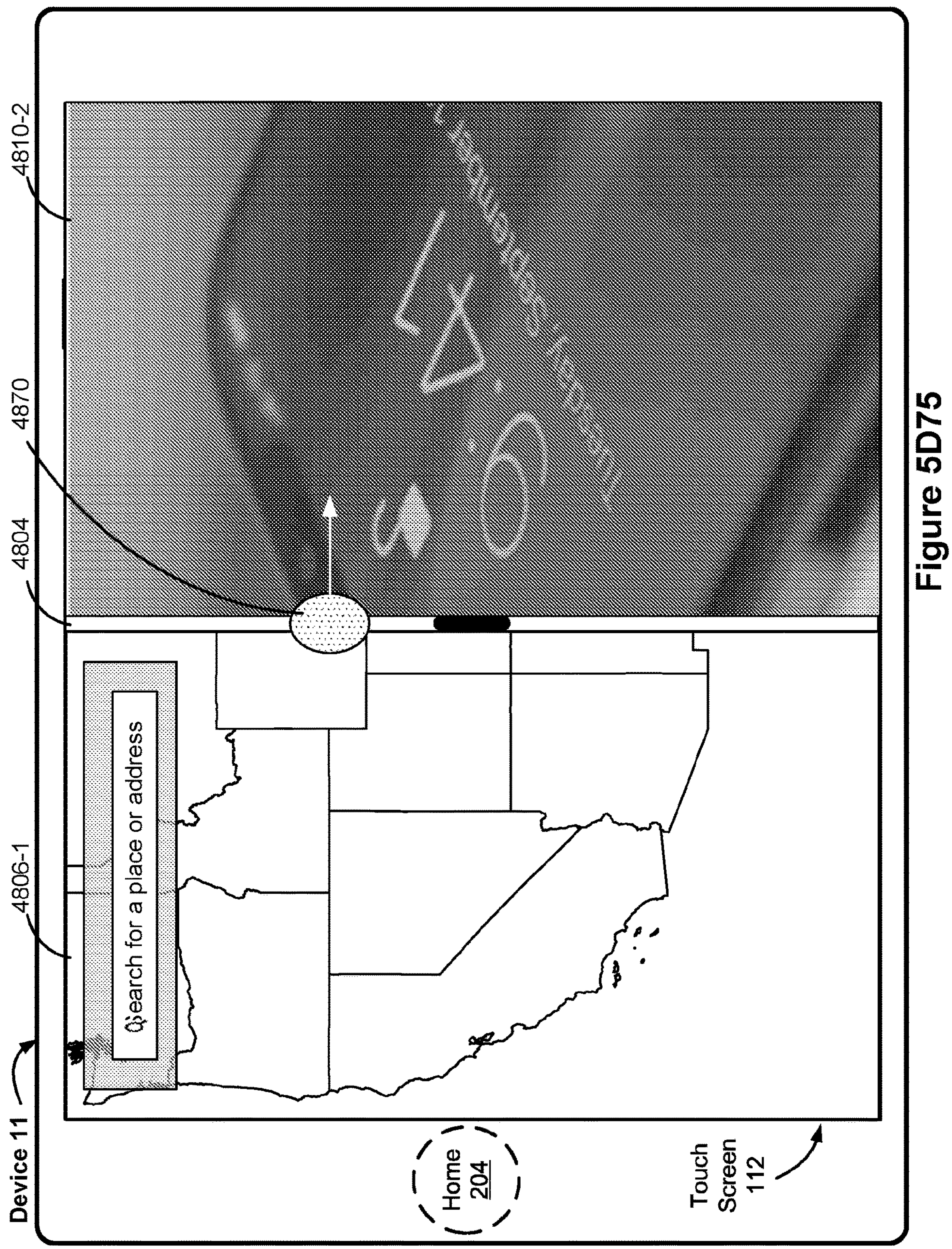
Figure 5D75

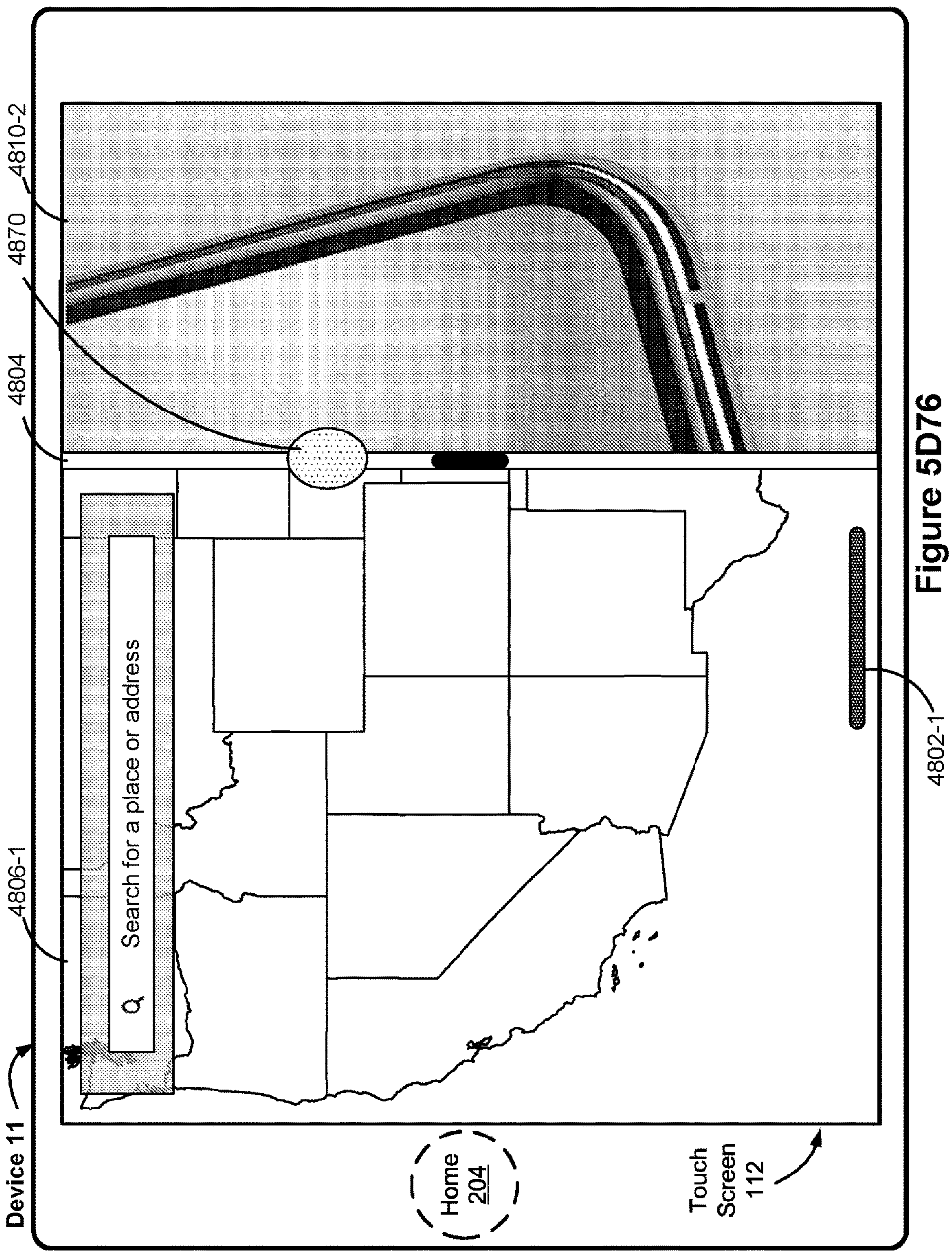
Figure 5D76

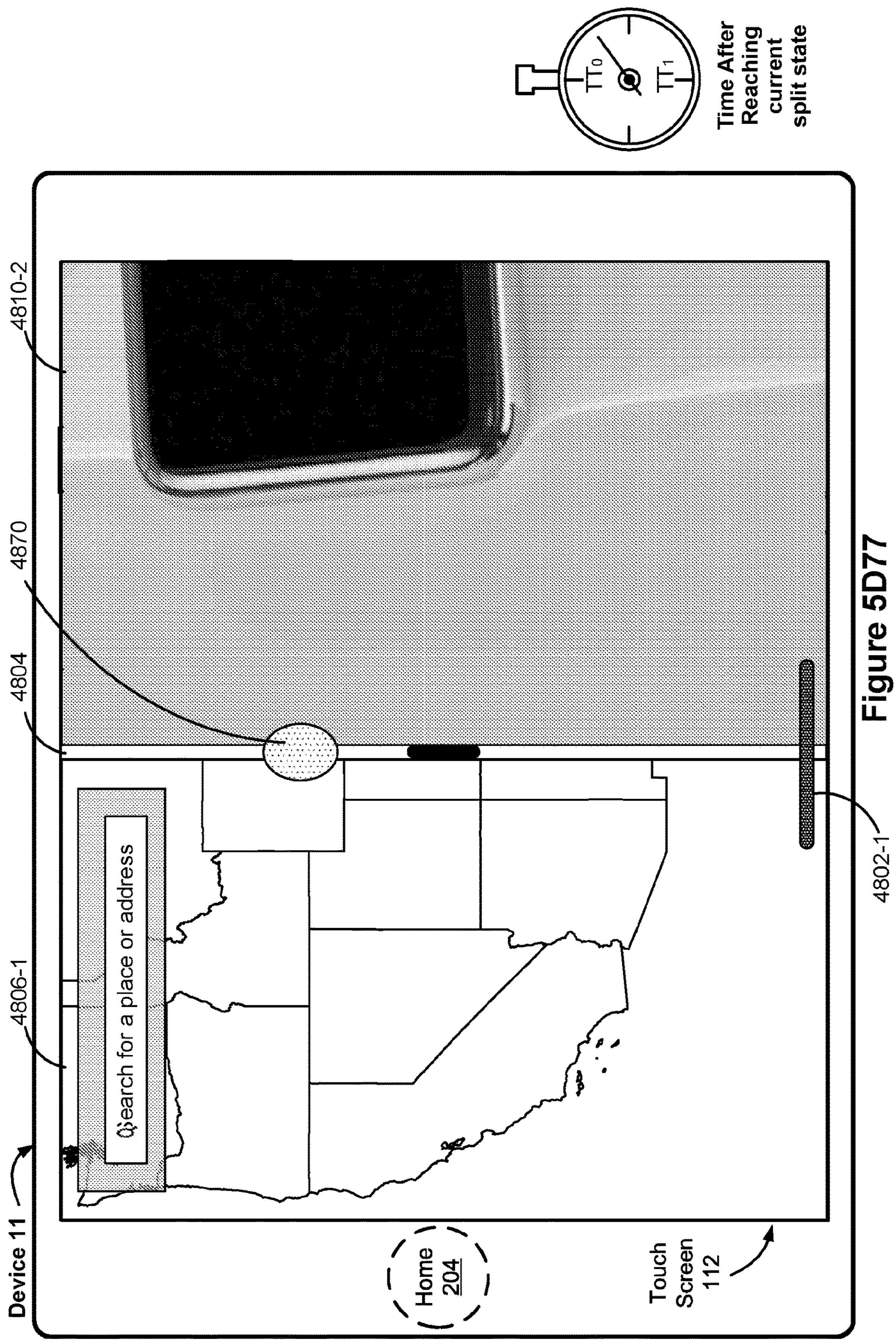
Figure 5D77

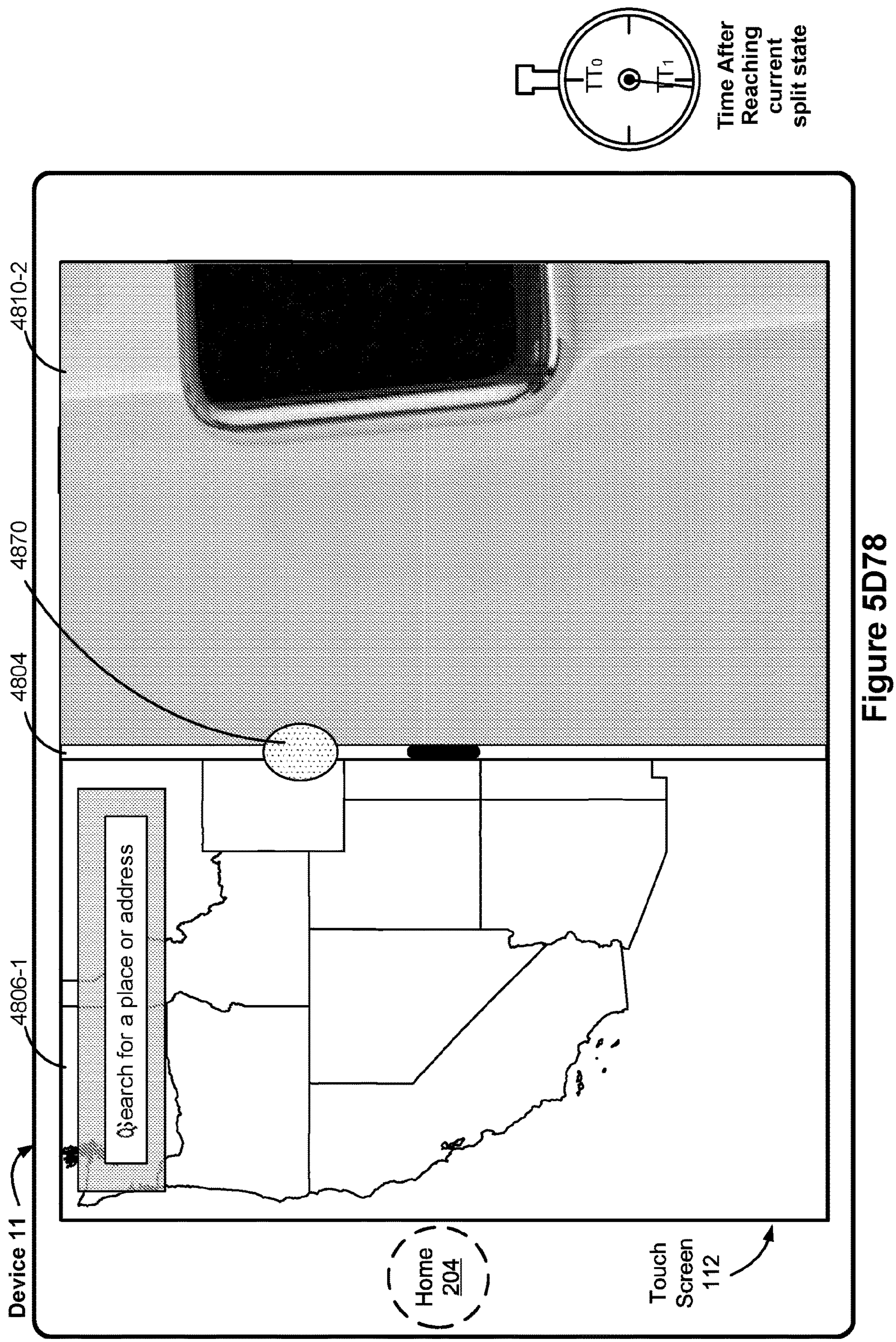
Figure 5D78

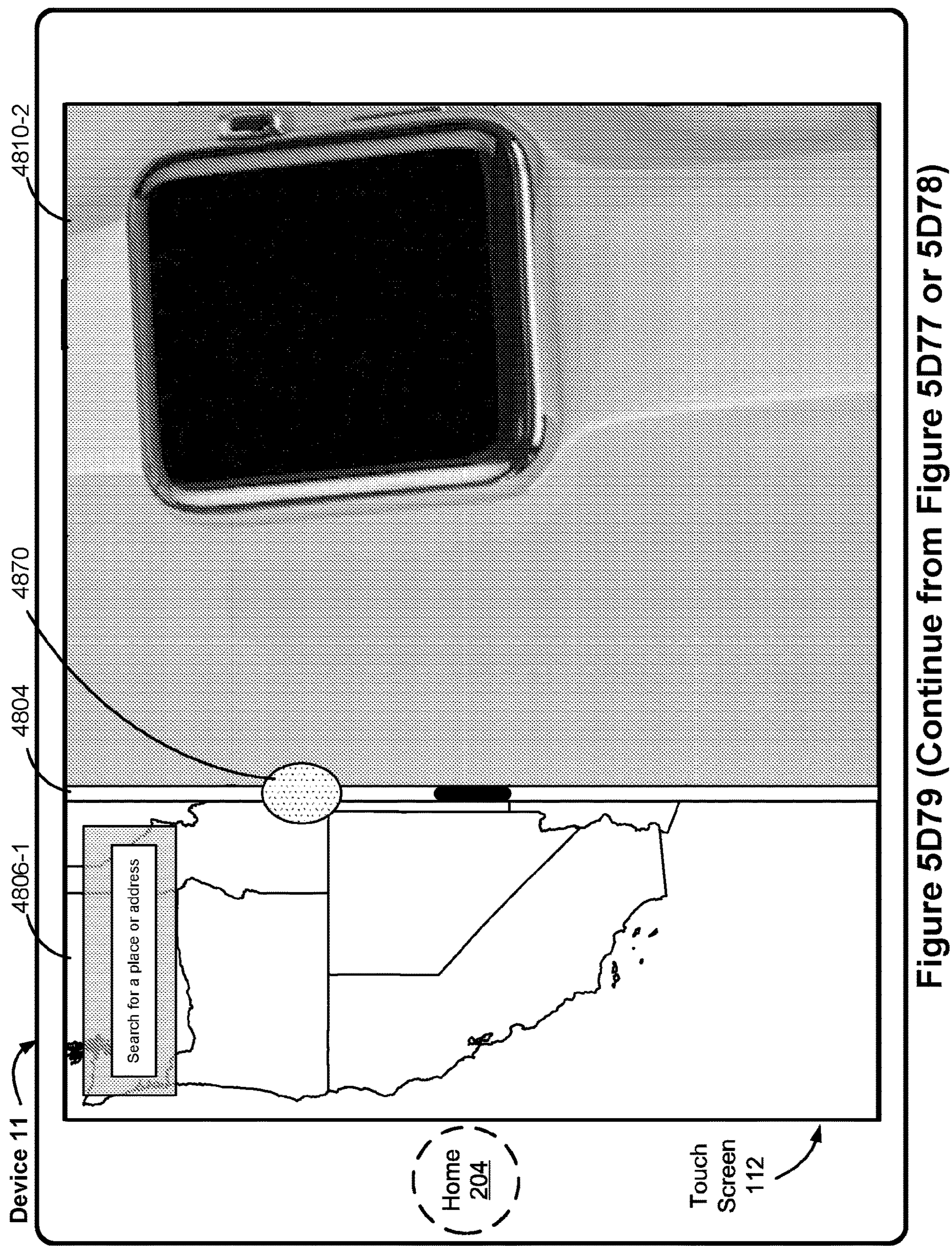
Figure 5D79 (Continue from Figure 5D77 or 5D78)

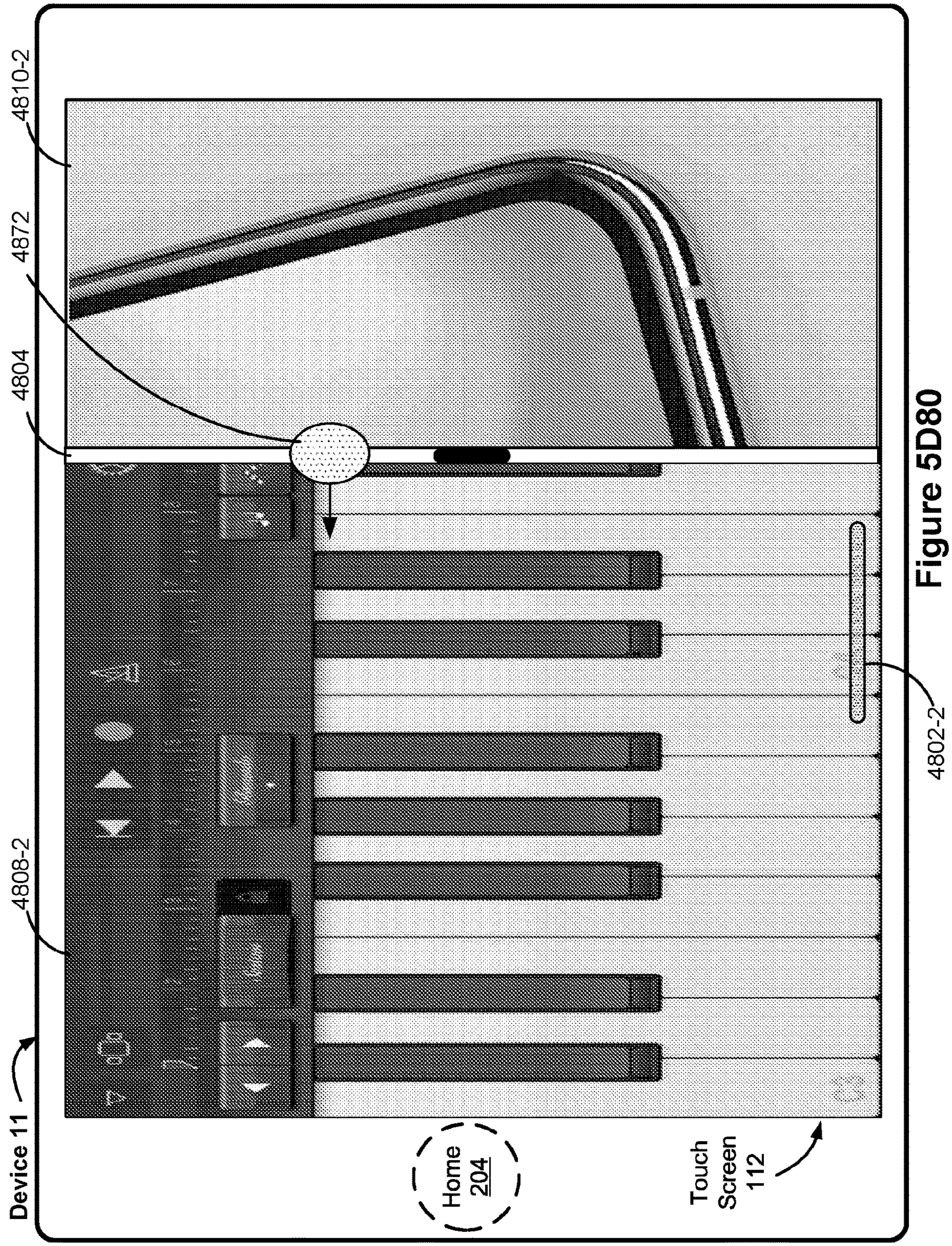
Figure 5D80

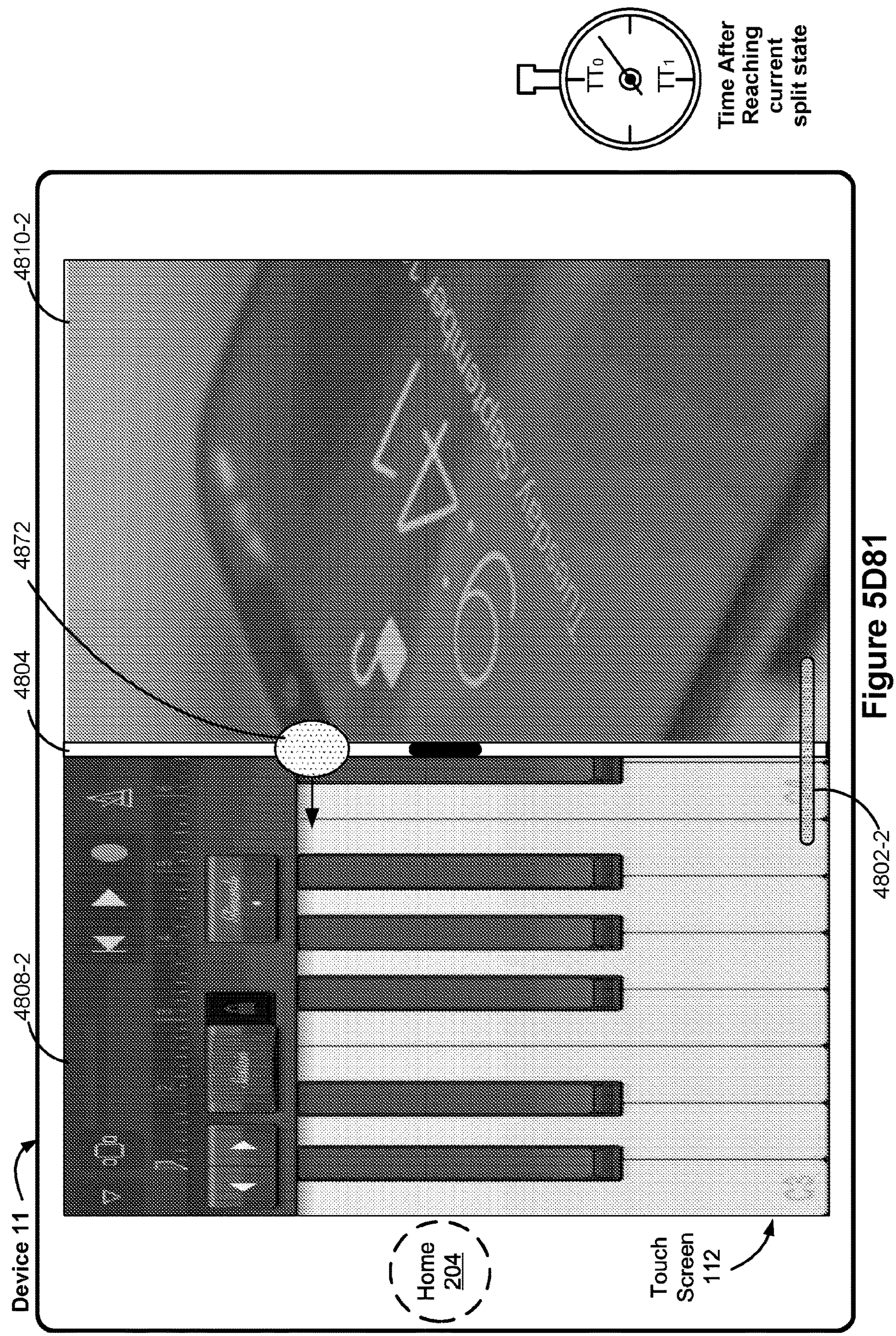
Figure 5D81

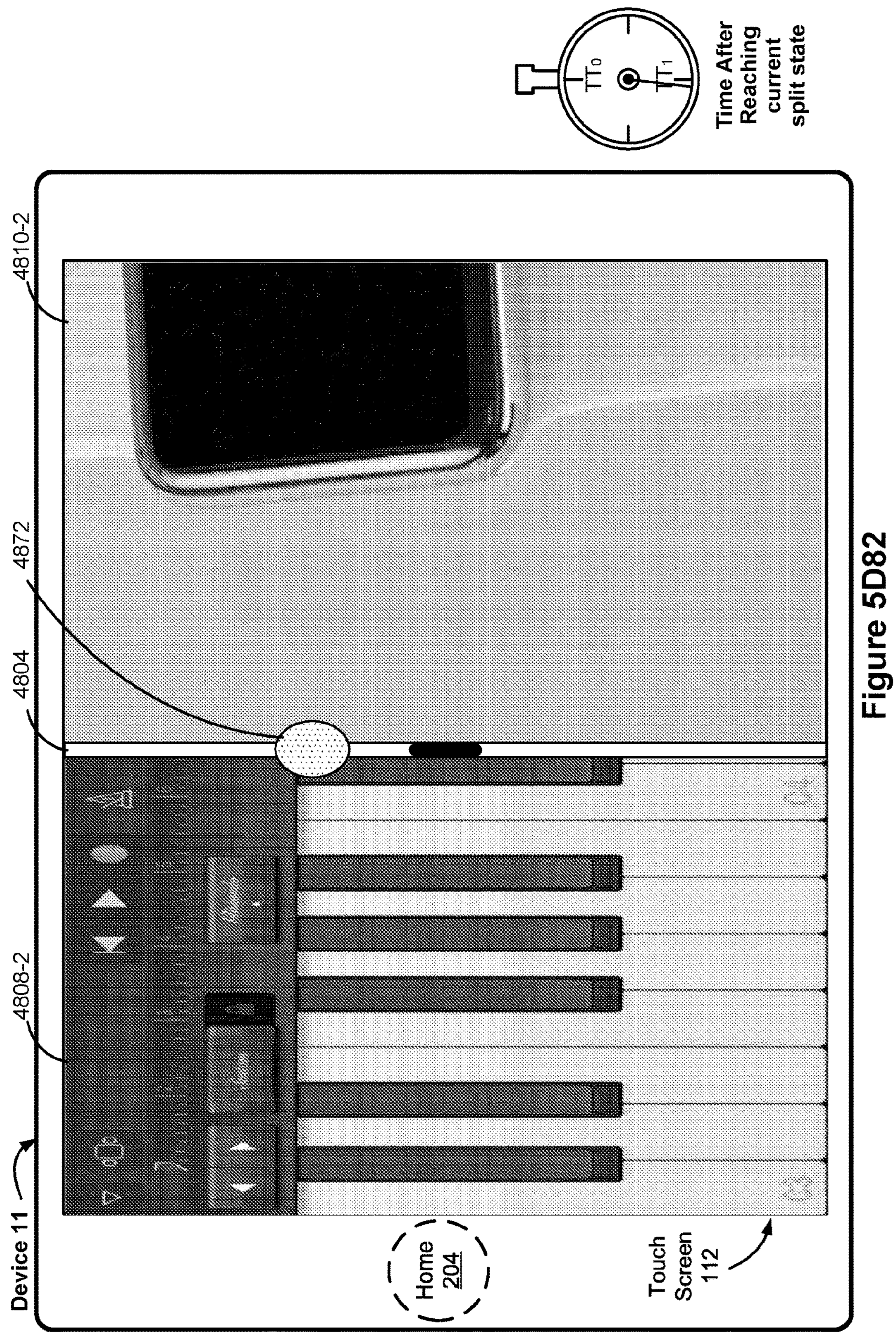
Figure 5D82

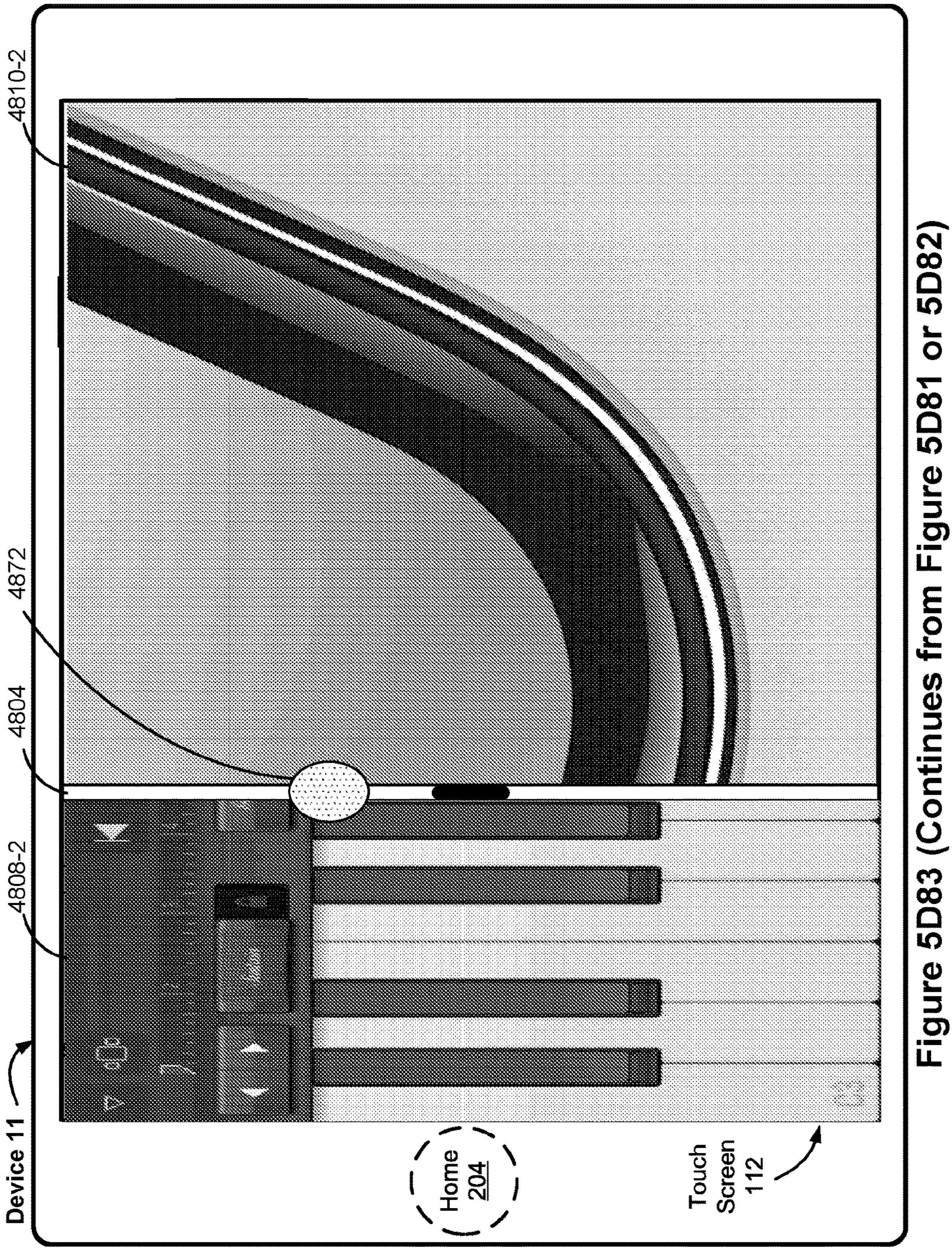
Figure 5D83 (Continues from Figure 5D81 or 5D82)

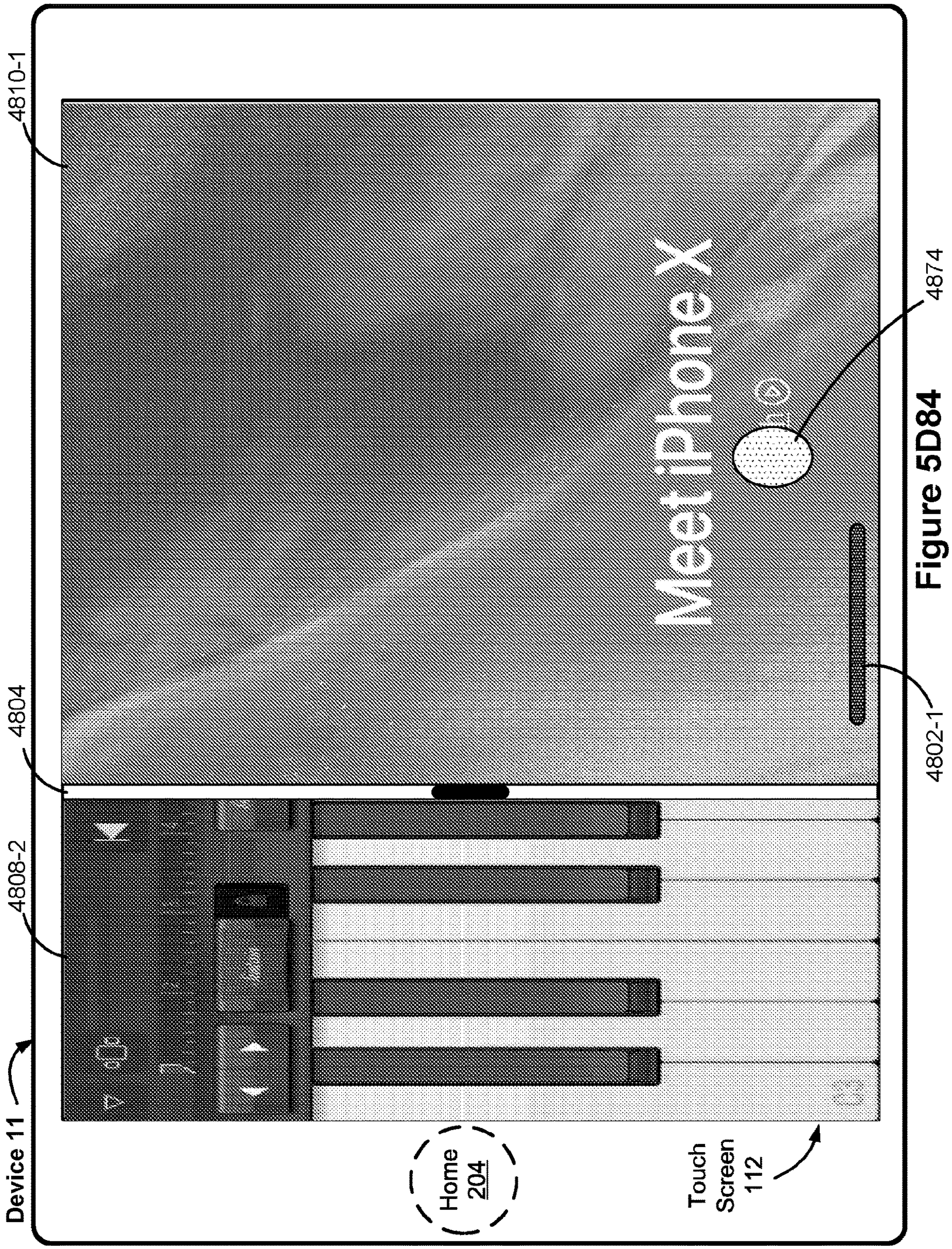
Figure 5D84

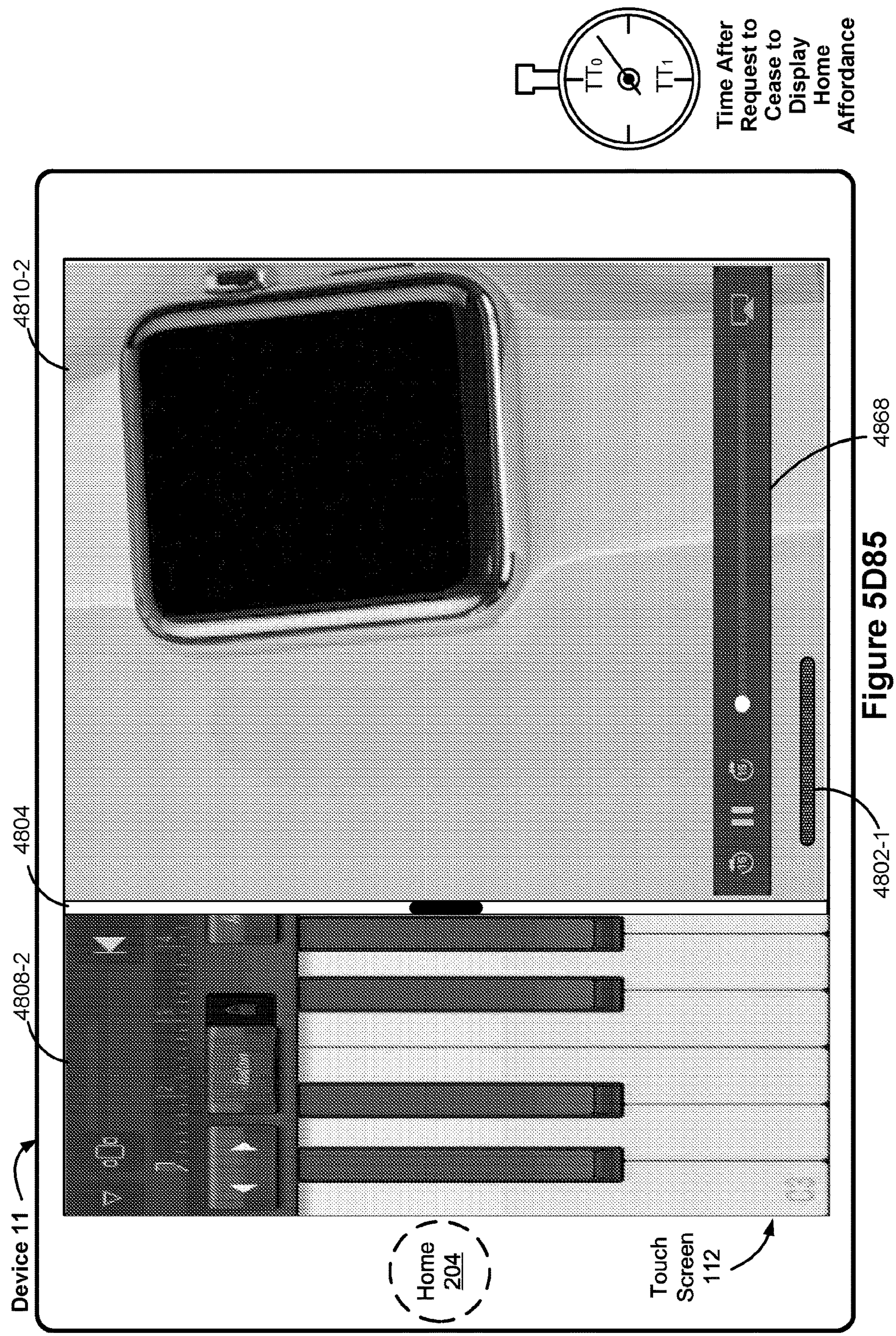
Figure 5D85

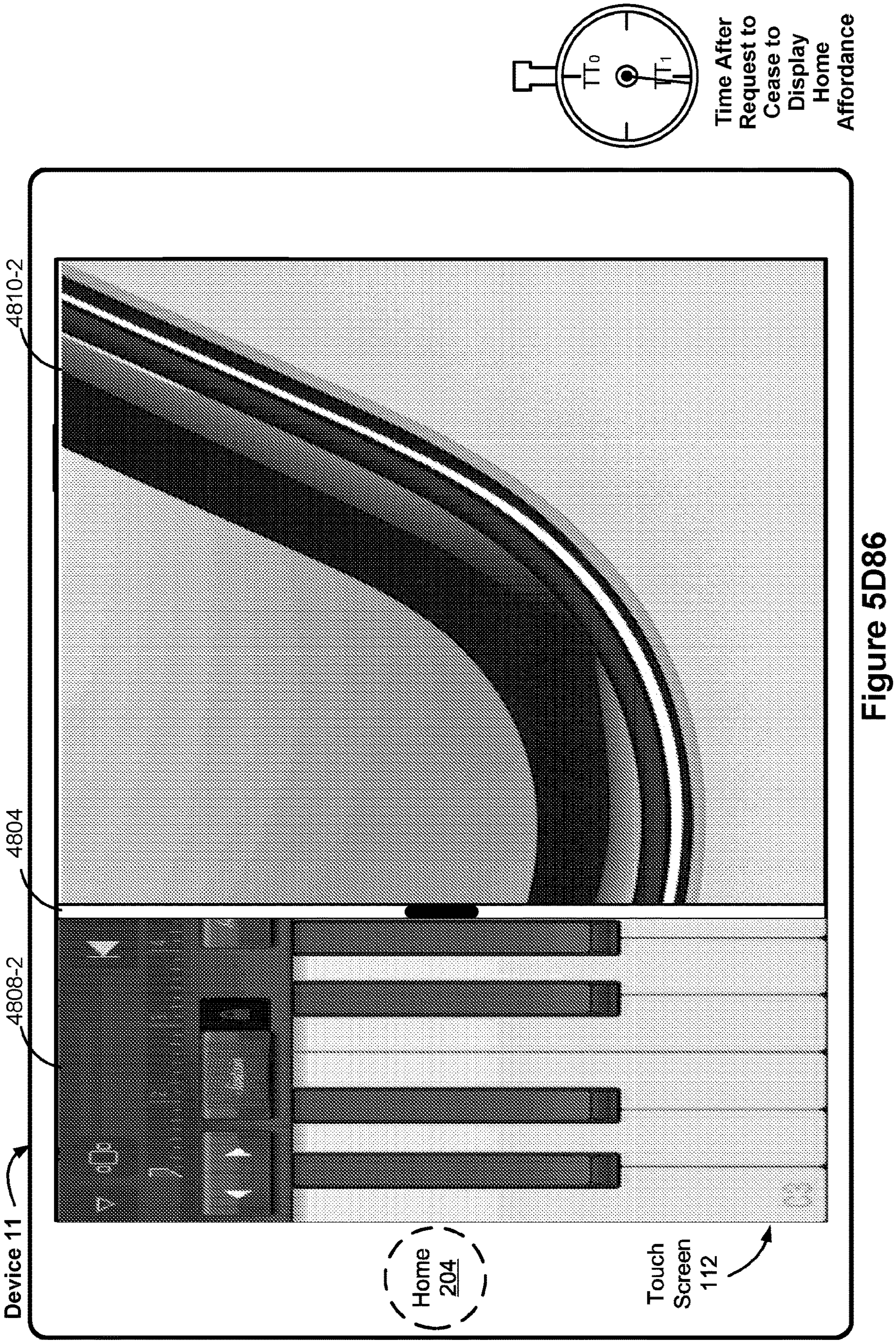
Figure 5D86

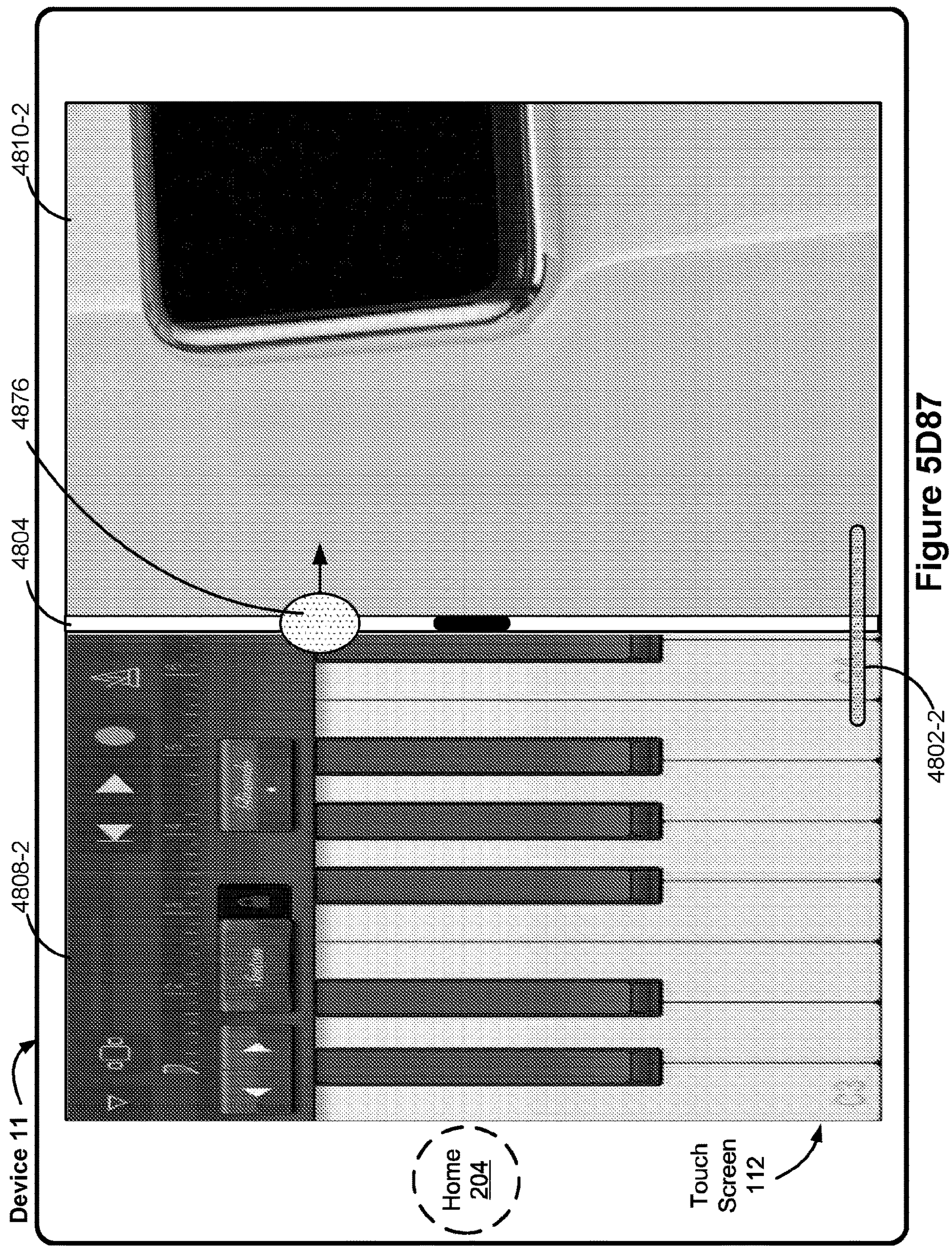
Figure 5D87

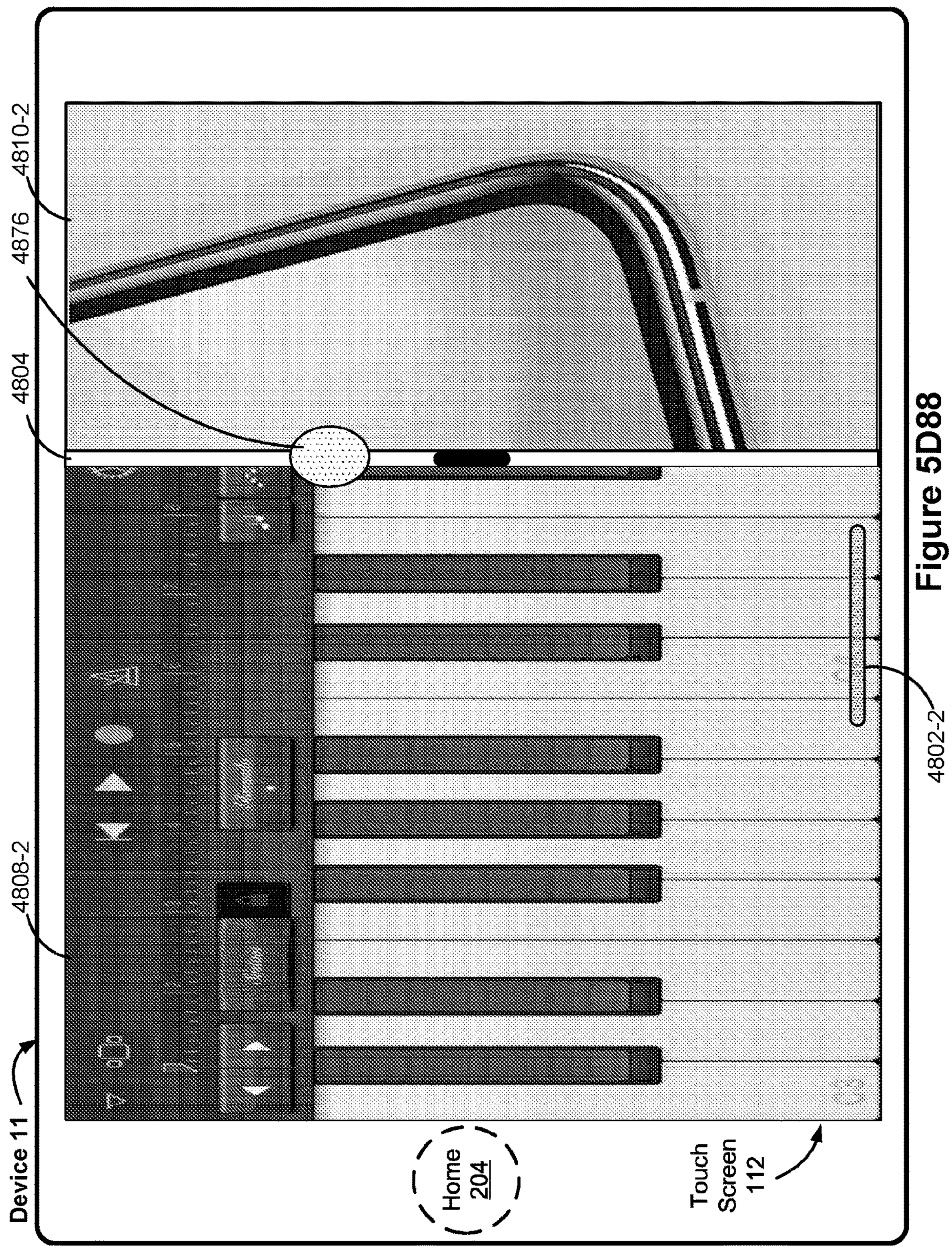
Figure 5D88

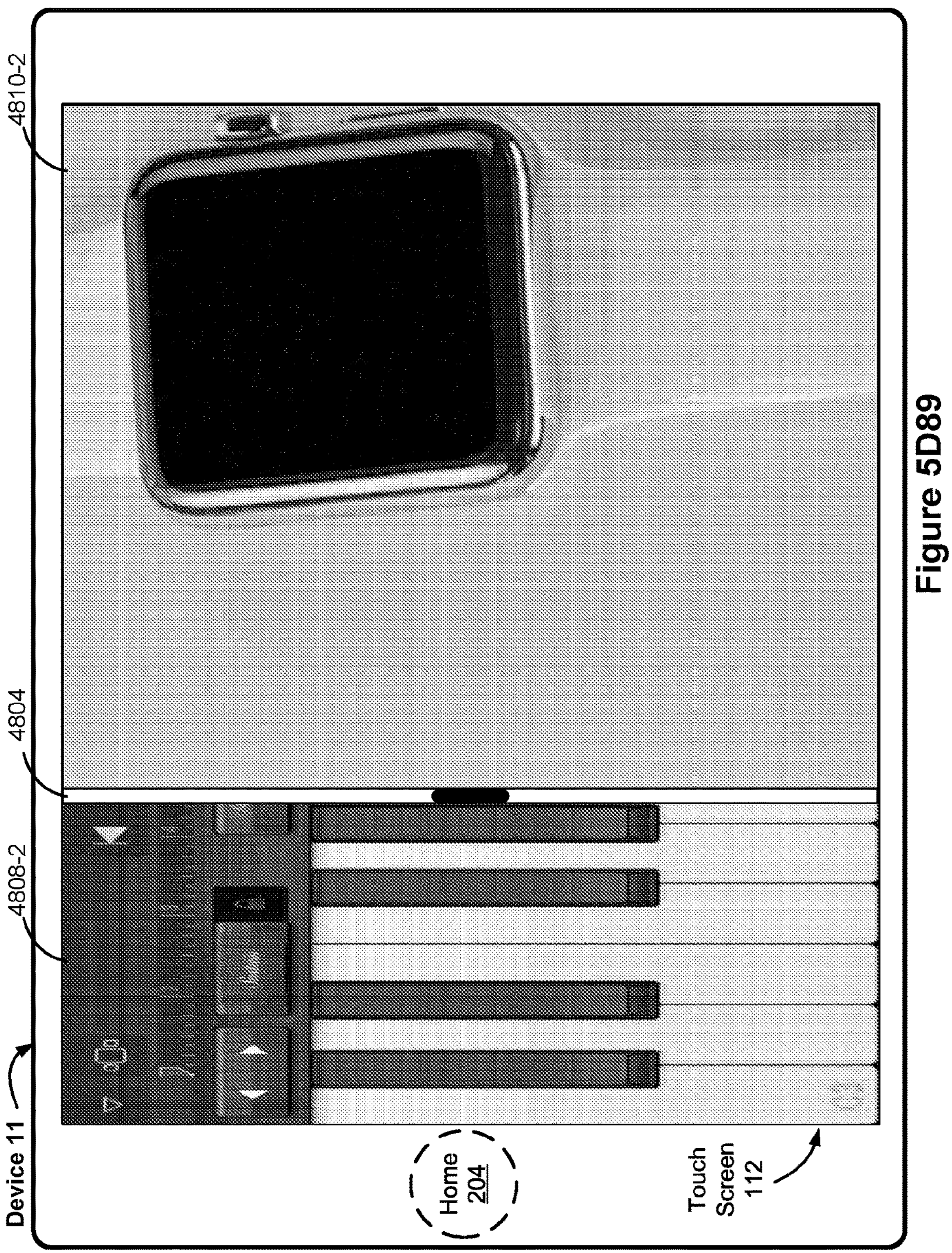
Figure 5D89

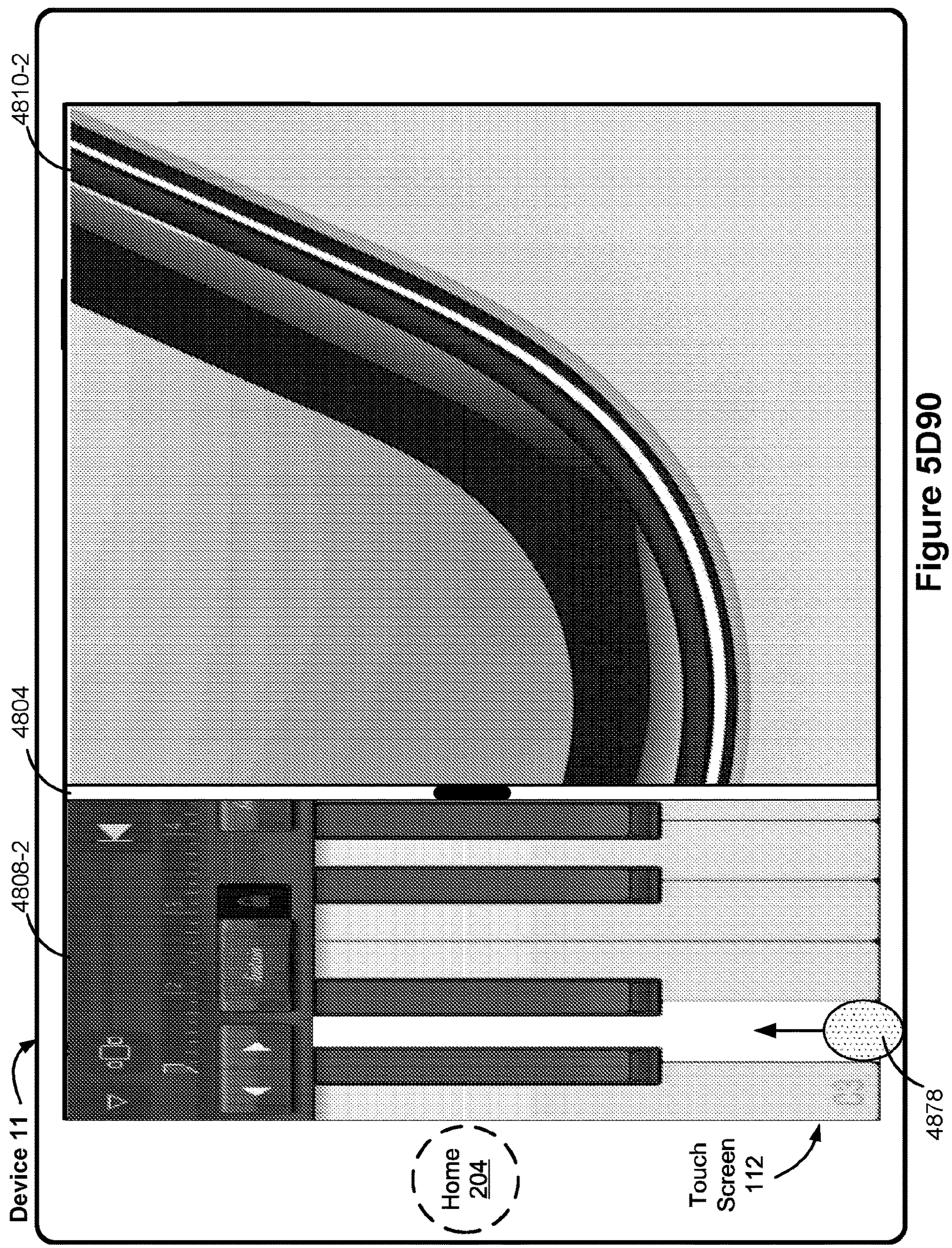
Figure 5D90

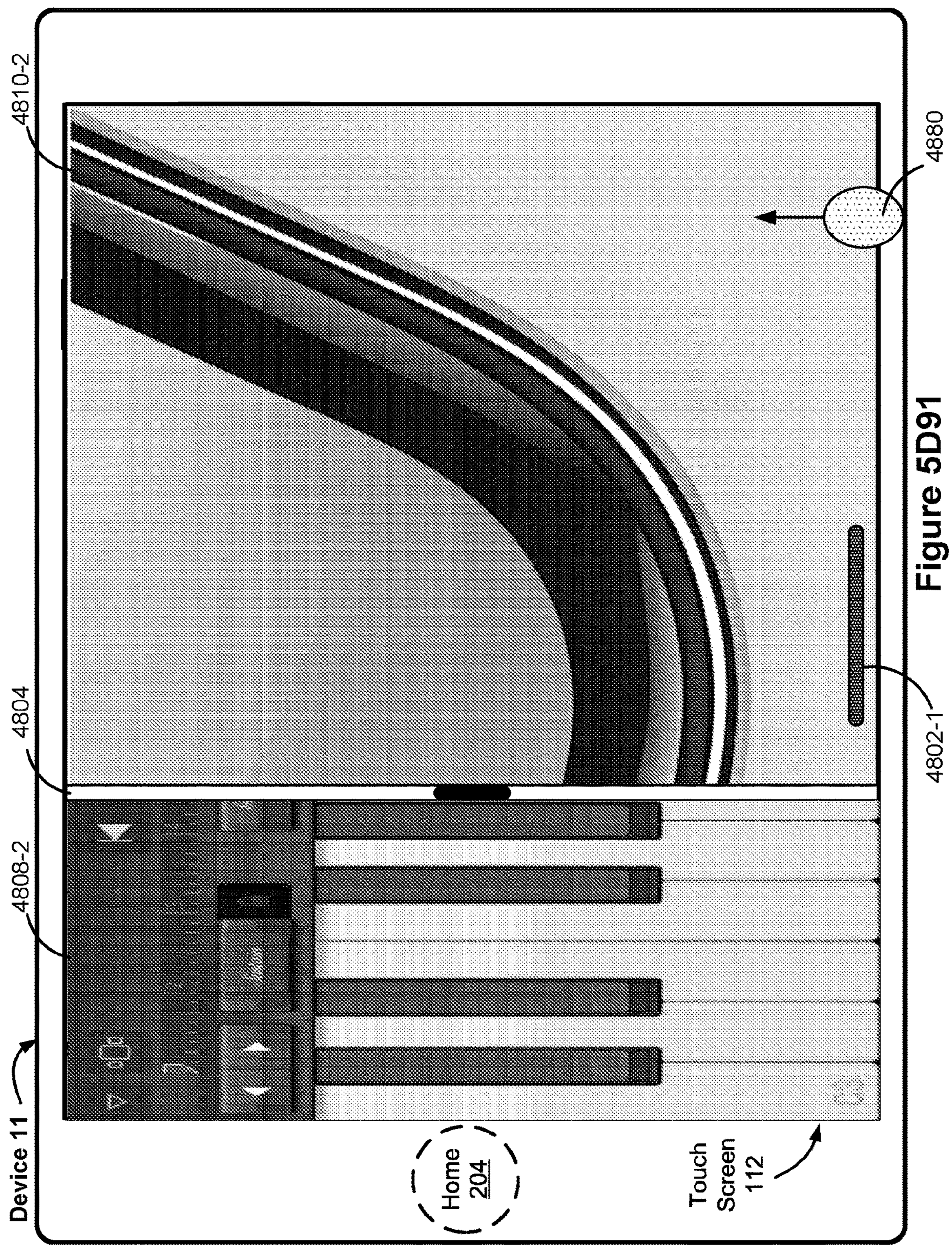
Figure 5D91

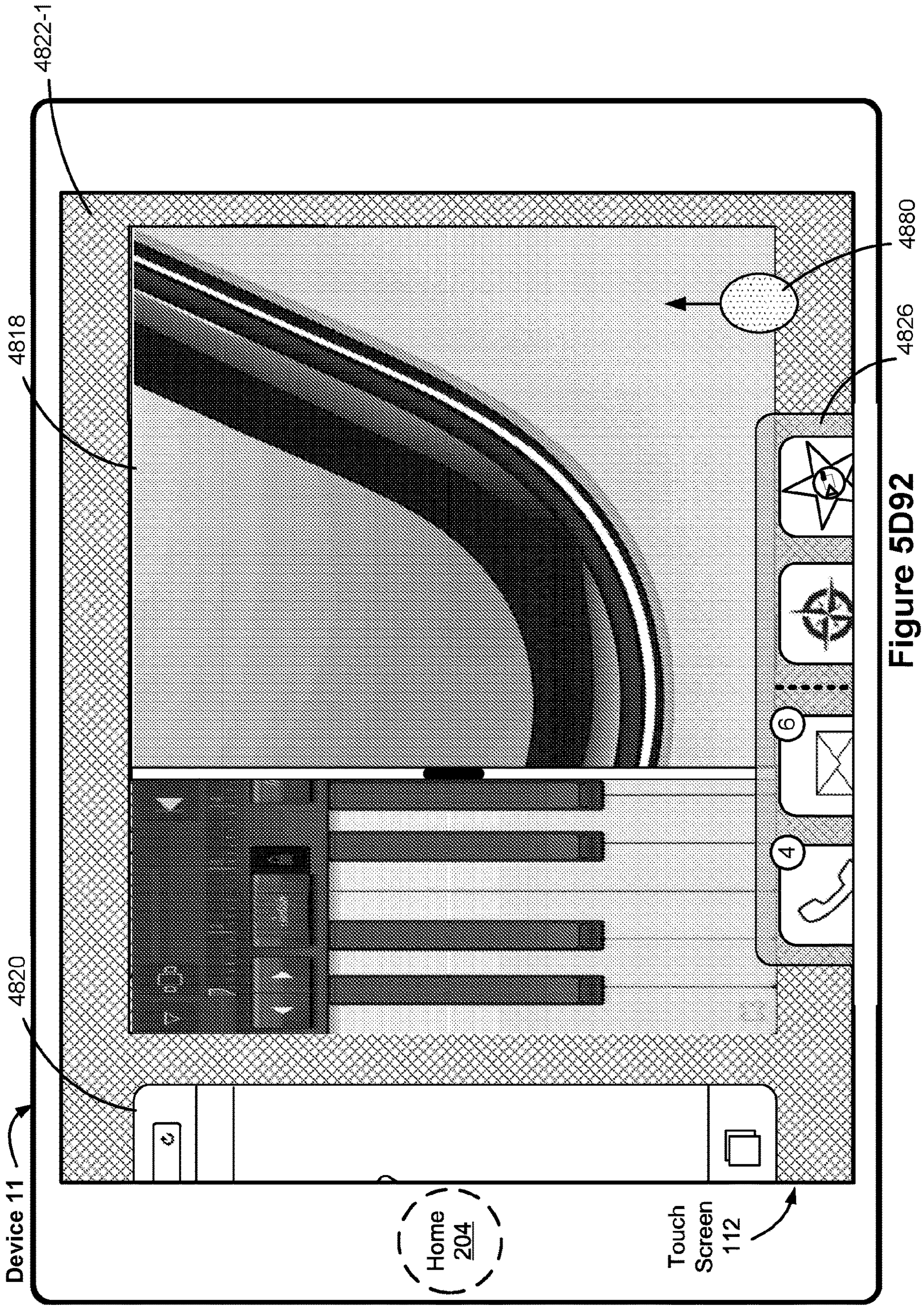
Figure 5D92

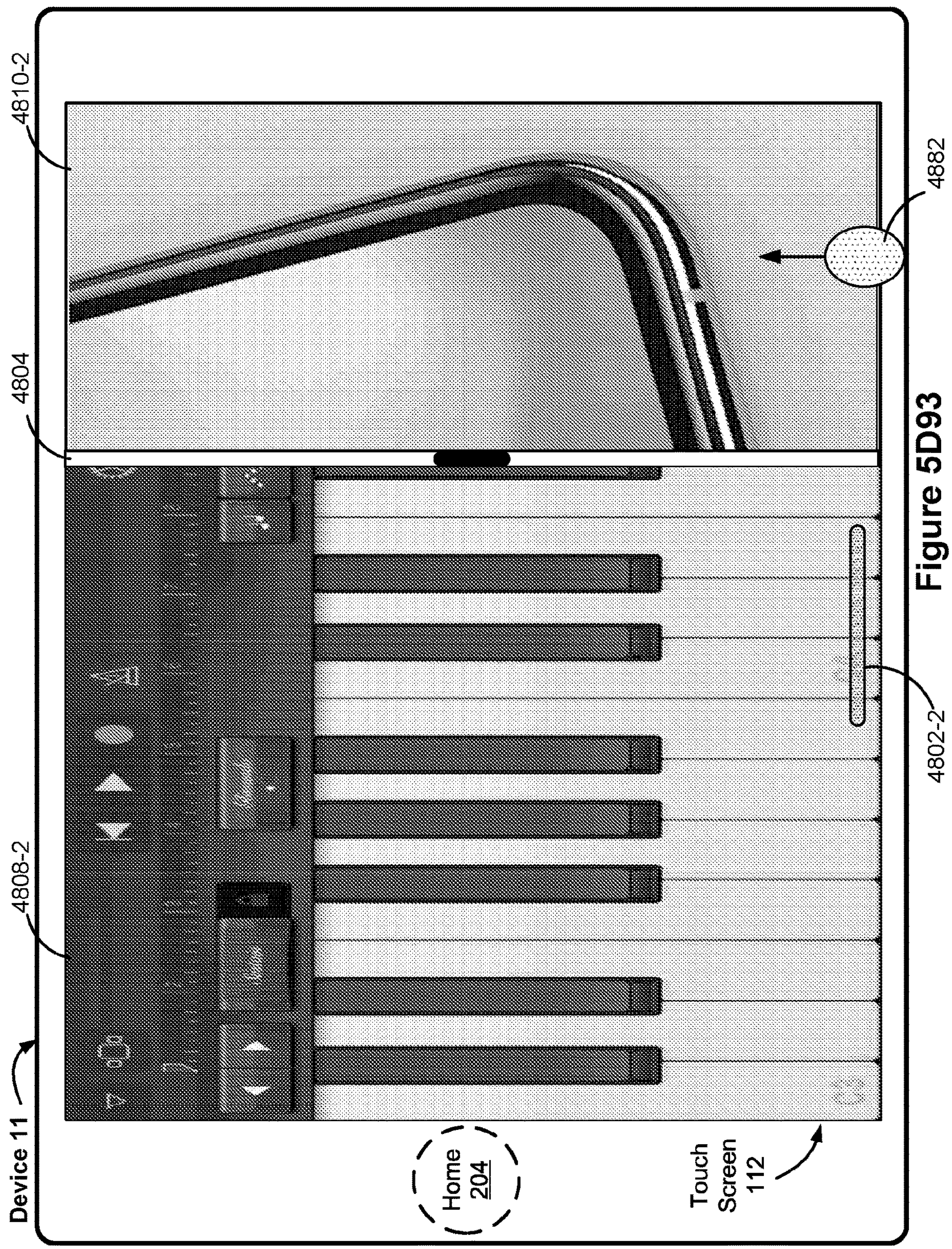
Figure 5D93

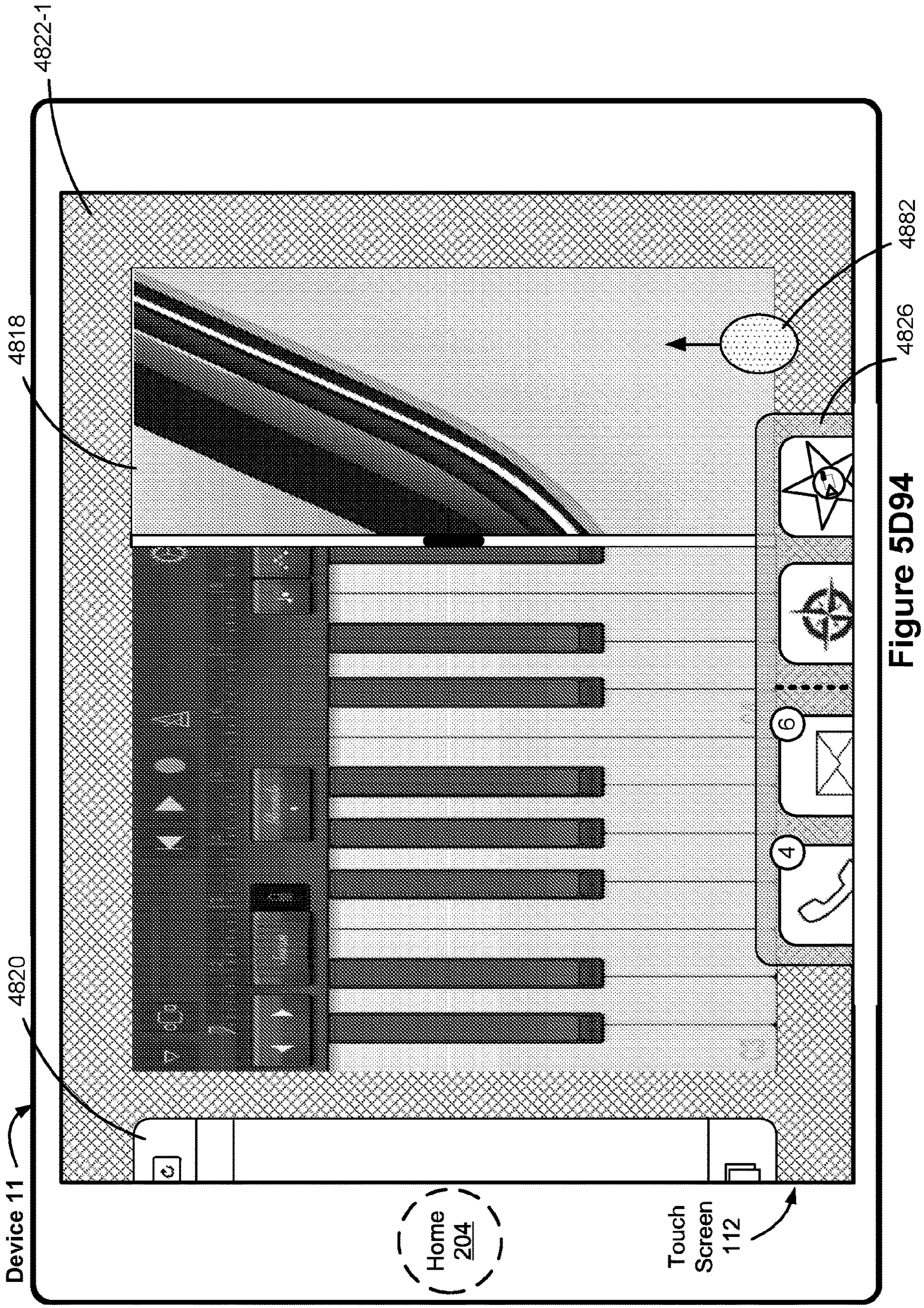
Figure 5D94

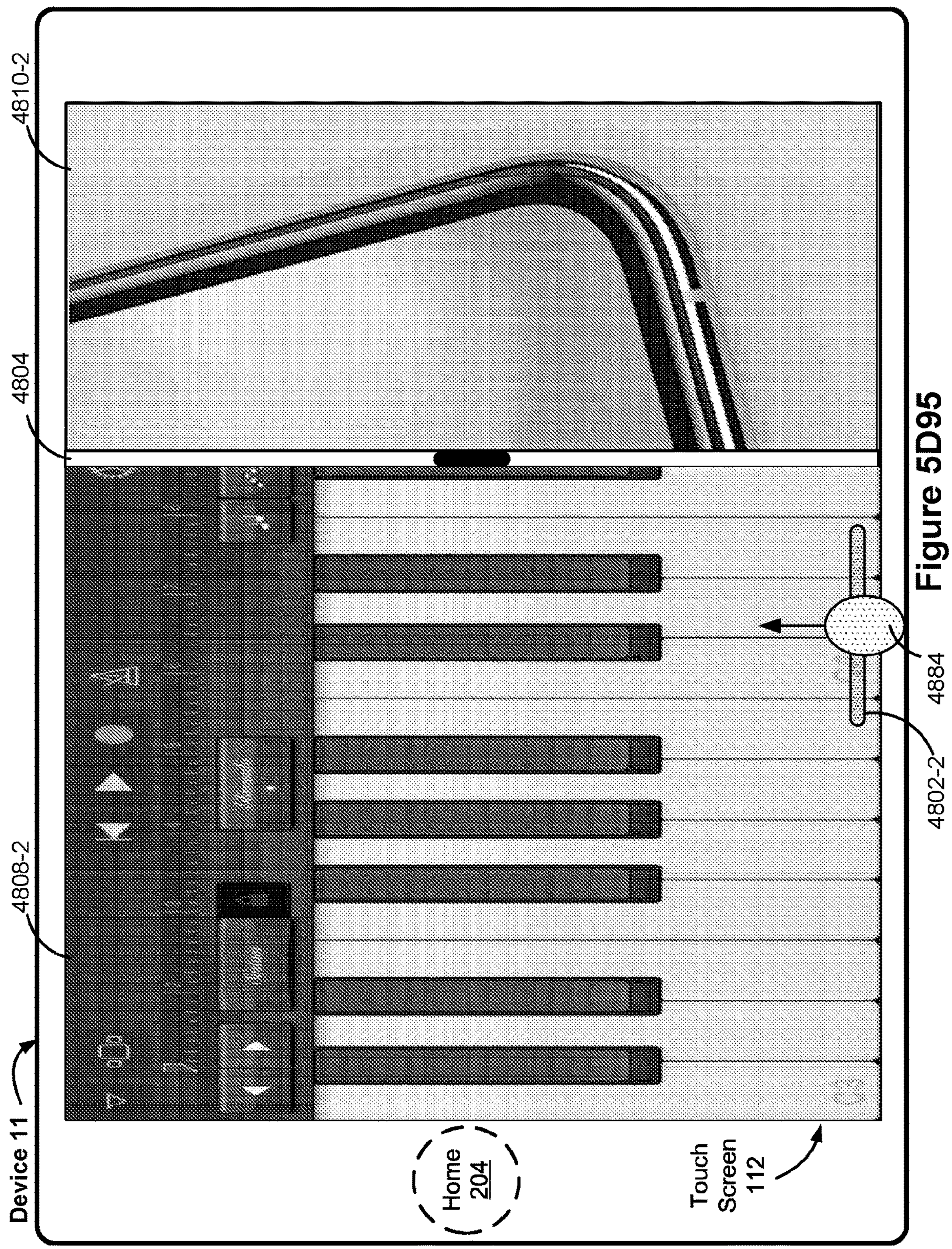
Figure 5D95

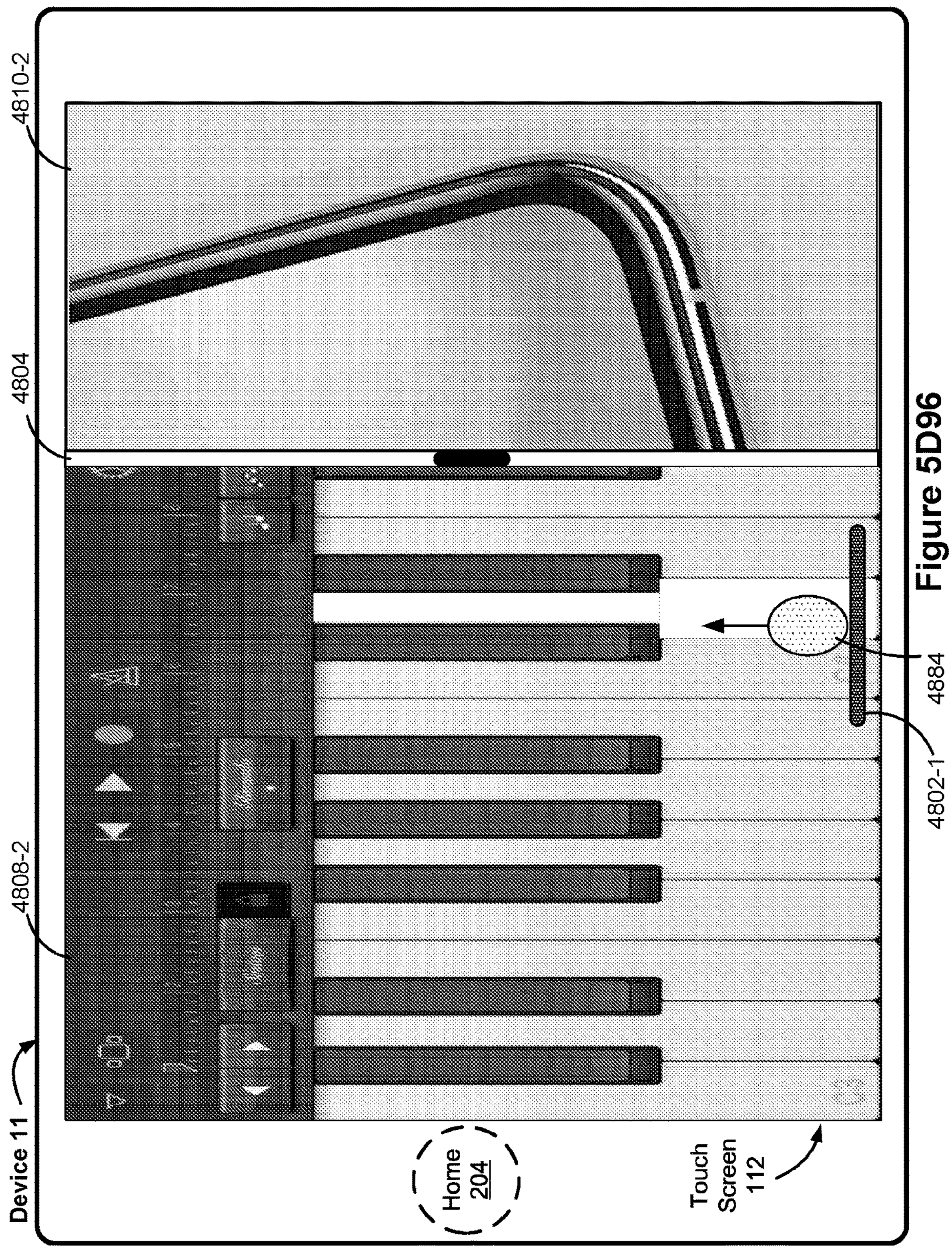
Figure 5D96

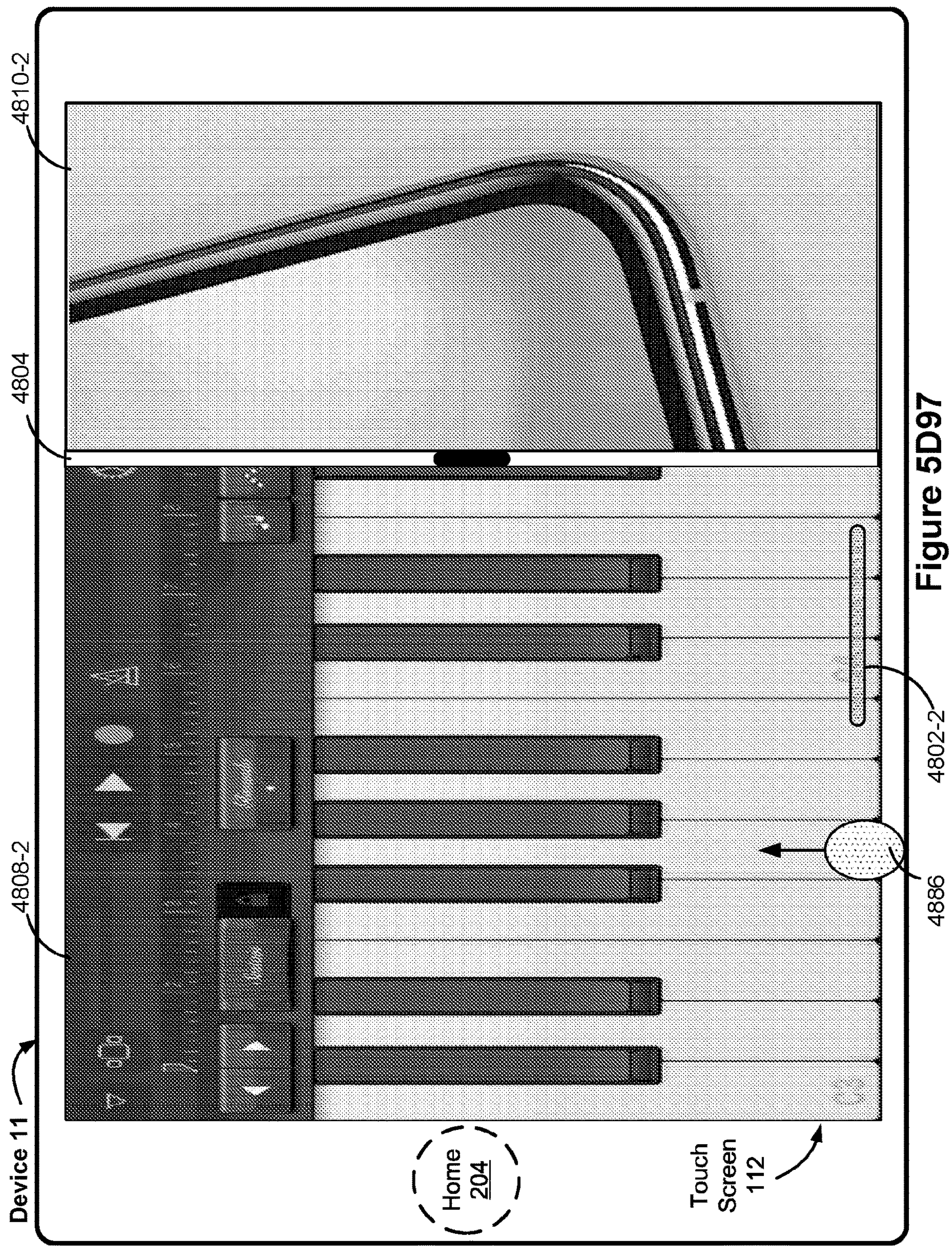
Figure 5D97

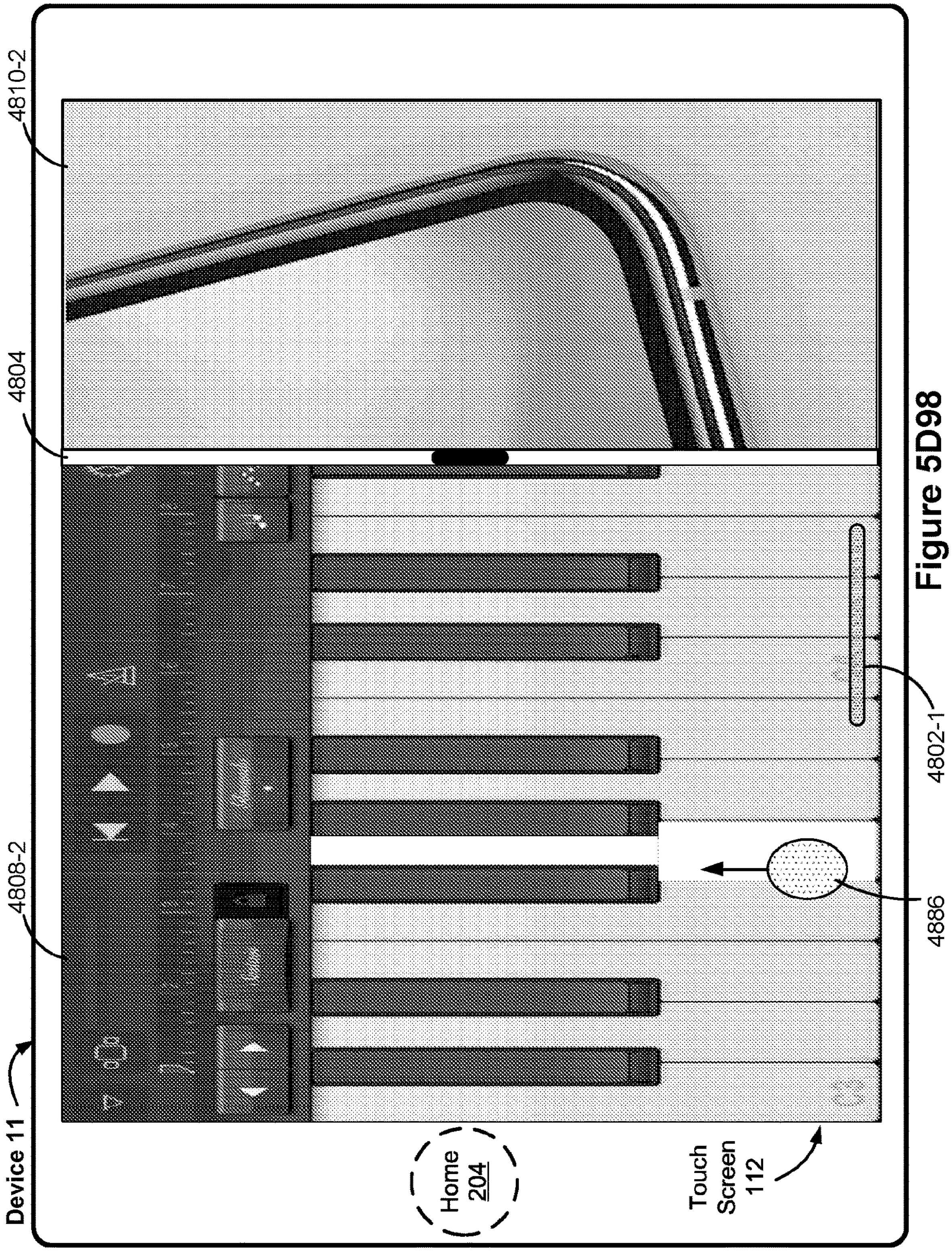
Figure 5D98

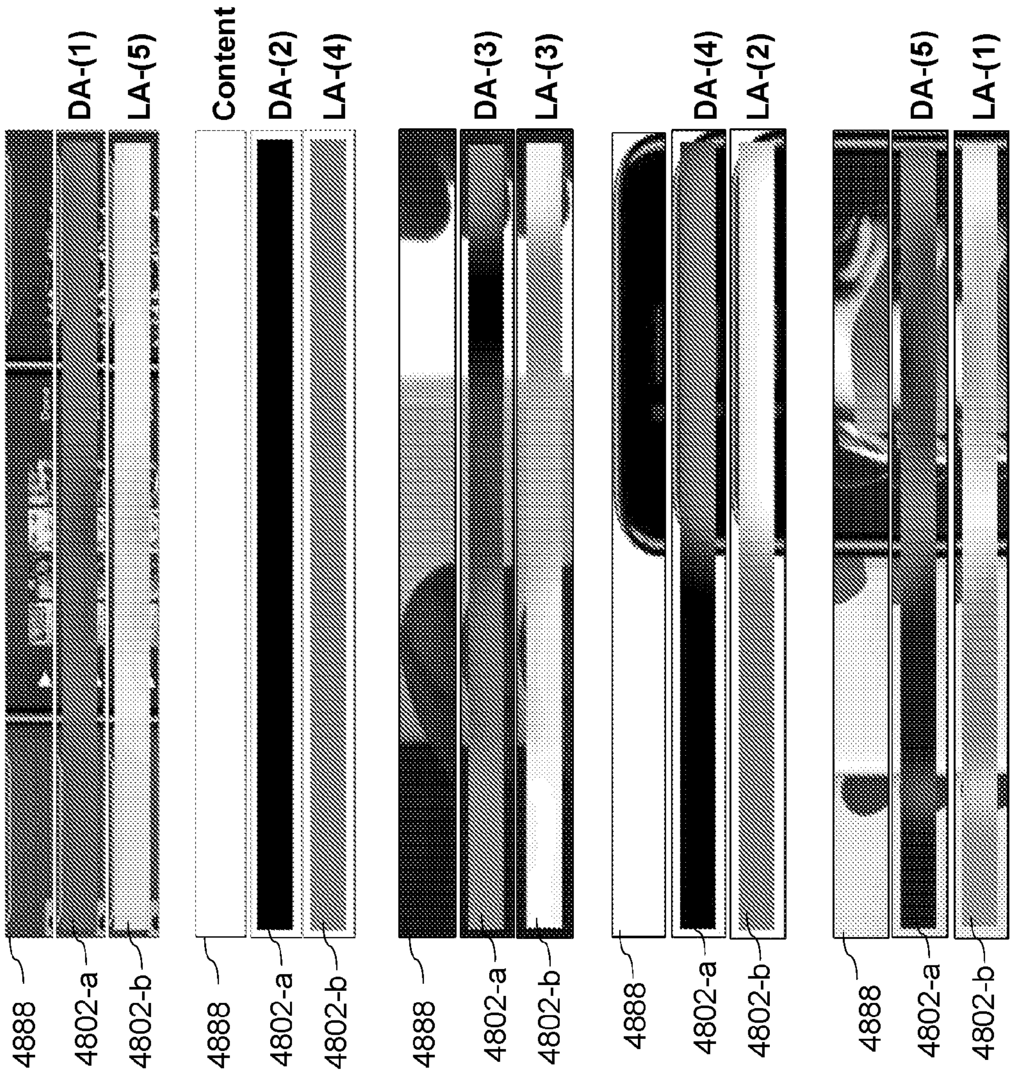
Figure 5D99

Figure 6A:
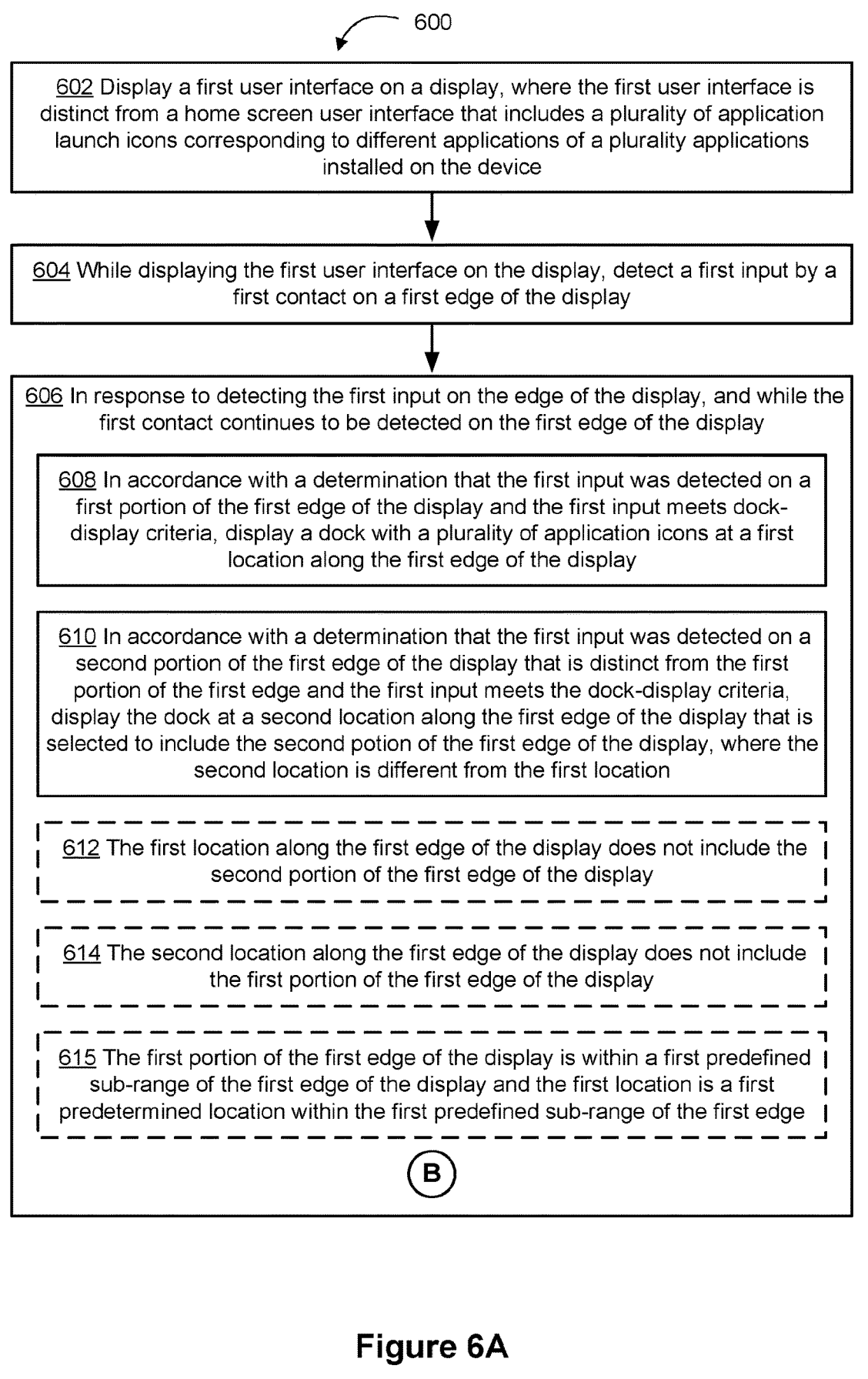

600

602 Display a first user interface on a display, where the first user interface is distinct from a home screen user interface that includes a plurality of application launch icons corresponding to different applications of a plurality applications installed on the device 604 While displaying the first user interface on the display, detect a first input by a first contact on a first edge of the display 606 In response to detecting the first input on the edge of the display, and while the first contact continues to be detected on the first edge of the display 608 In accordance with a determination that the first input was detected on a first portion of the first edge of the display and the first input meets dock-display criteria, display a dock with a plurality of application icons at a first location along the first edge of the display 610 In accordance with a determination that the first input was detected on a second portion of the first edge of the display that is distinct from the first portion of the first edge and the first input meets the dock-display criteria, display the dock at a second location along the first edge of the display that is selected to include the second potion of the first edge of the display, where the second location is different from the first location 612 The first location along the first edge of the display does not include the second portion of the first edge of the display 614 The second location along the first edge of the display does not include the first portion of the first edge of the display 615 The first portion of the first edge of the display is within a first predefined sub-range of the first edge of the display and the first location is a first predetermined location within the first predefined sub-range of the first edge

606 In response to detecting the first input on the edge of the display, and while the first contact continues to be detected on the first edge of the display (B)

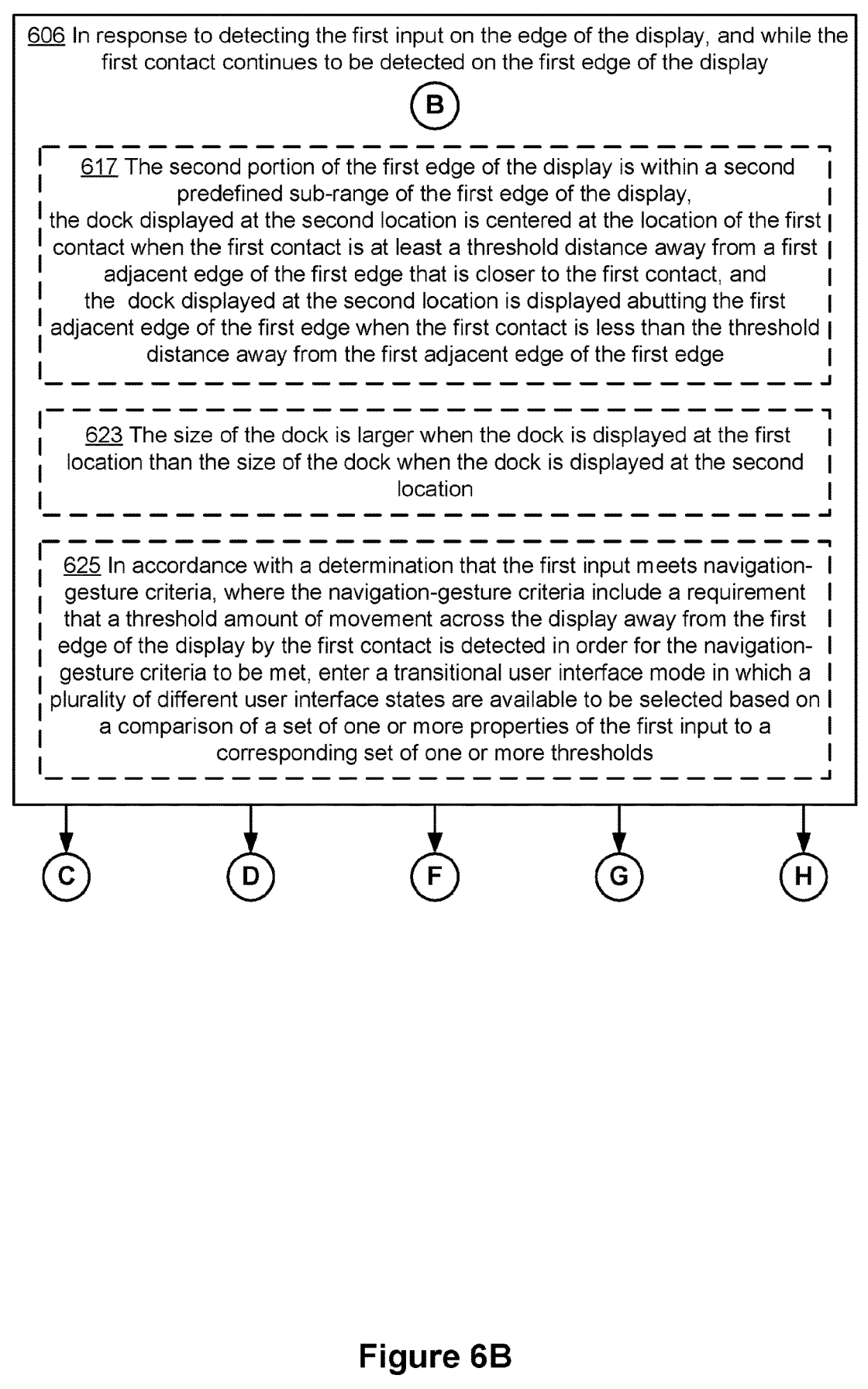

617 The second portion of the first edge of the display is within a second predefined sub-range of the first edge of the display,
the dock displayed at the second location is centered at the location of the first contact when the first contact is at least a threshold distance away from a first adjacent edge of the first edge that is closer to the first contact, and
the dock displayed at the second location is displayed abutting the first adjacent edge of the first edge when the first contact is less than the threshold distance away from the first adjacent edge of the first edge 623 The size of the dock is larger when the dock is displayed at the first location than the size of the dock when the dock is displayed at the second location 625 In accordance with a determination that the first input meets navigation-gesture criteria, where the navigation-gesture criteria include a requirement that a threshold amount of movement across the display away from the first edge of the display by the first contact is detected in order for the navigation-gesture criteria to be met, enter a transitional user interface mode in which a plurality of different user interface states are available to be selected based on a comparison of a set of one or more properties of the first input to a corresponding set of one or more thresholds (C) (D) (F) (G) (H)

Figure 6B

Figure 6D:
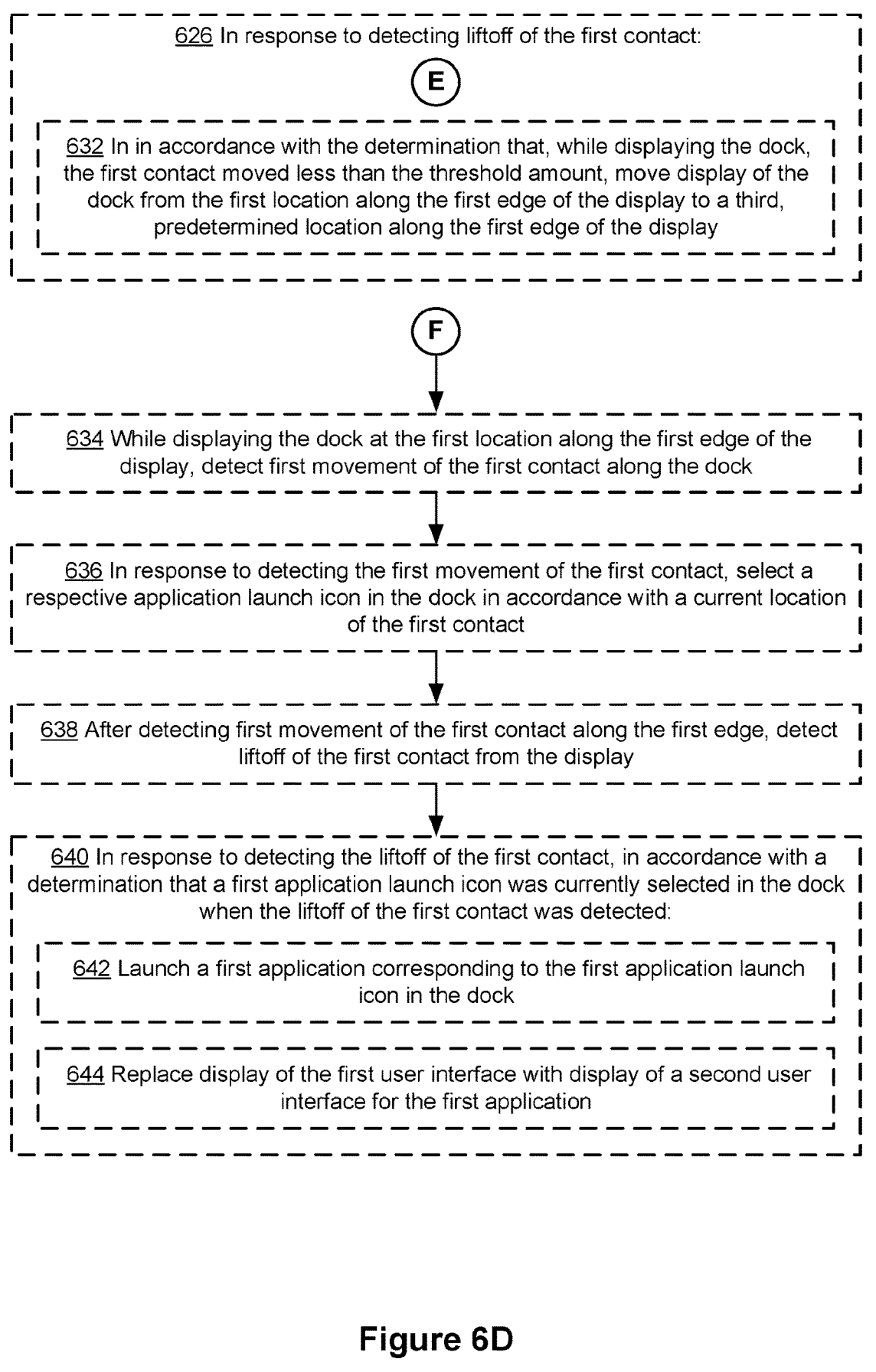

626 In response to detecting liftoff of the first contact:

(E)

632 In in accordance with the determination that, while displaying the dock, the first contact moved less than the threshold amount, move display of the dock from the first location along the first edge of the display to a third, predetermined location along the first edge of the display (F)

634 While displaying the dock at the first location along the first edge of the display, detect first movement of the first contact along the dock 636 In response to detecting the first movement of the first contact, select a respective application launch icon in the dock in accordance with a current location of the first contact 638 After detecting first movement of the first contact along the first edge, detect liftoff of the first contact from the display 640 In response to detecting the liftoff of the first contact, in accordance with a determination that a first application launch icon was currently selected in the dock when the liftoff of the first contact was detected:

642 Launch a first application corresponding to the first application launch icon in the dock 644 Replace display of the first user interface with display of a second user interface for the first application

Figure 6E:
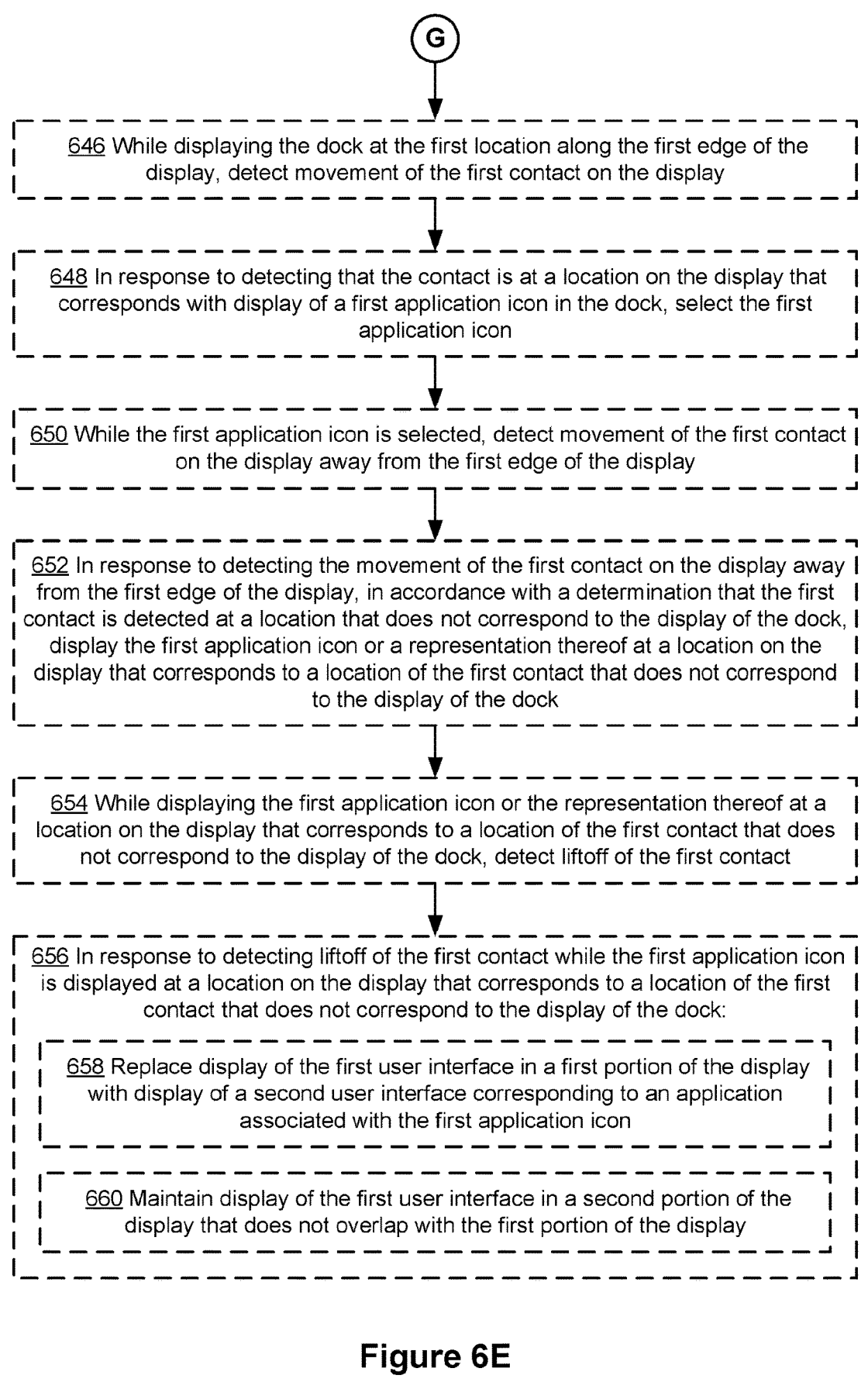

646 While displaying the dock at the first location along the first edge of the display, detect movement of the first contact on the display 648 In response to detecting that the contact is at a location on the display that corresponds with display of a first application icon in the dock, select the first application icon 650 While the first application icon is selected, detect movement of the first contact on the display away from the first edge of the display 652 In response to detecting the movement of the first contact on the display away from the first edge of the display, in accordance with a determination that the first contact is detected at a location that does not correspond to the display of the dock, display the first application icon or a representation thereof at a location on the display that corresponds to a location of the first contact that does not correspond to the display of the dock 654 While displaying the first application icon or the representation thereof at a location on the display that corresponds to a location of the first contact that does not correspond to the display of the dock, detect liftoff of the first contact 656 In response to detecting liftoff of the first contact while the first application icon is displayed at a location on the display that corresponds to a location of the first contact that does not correspond to the display of the dock:

658 Replace display of the first user interface in a first portion of the display with display of a second user interface corresponding to an application associated with the first application icon 660 Maintain display of the first user interface in a second portion of the display that does not overlap with the first portion of the display

Figure 7A:
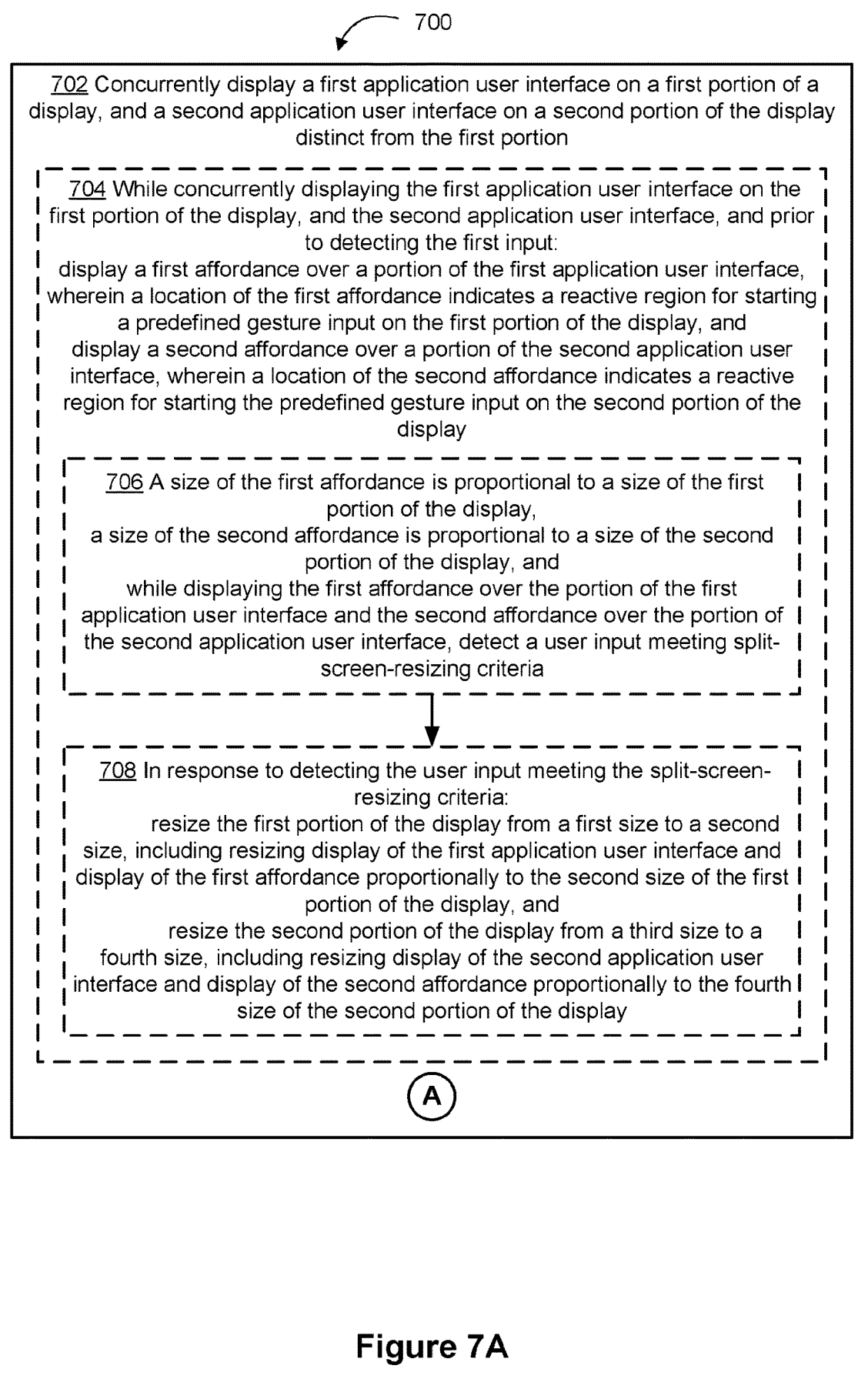

702 Concurrently display a first application user interface on a first portion of a display, and a second application user interface on a second portion of the display distinct from the first portion 704 While concurrently displaying the first application user interface on the first portion of the display, and the second application user interface, and prior to detecting the first input:
display a first affordance over a portion of the first application user interface, wherein a location of the first affordance indicates a reactive region for starting a predefined gesture input on the first portion of the display, and
display a second affordance over a portion of the second application user interface, wherein a location of the second affordance indicates a reactive region for starting the predefined gesture input on the second portion of the display 706 A size of the first affordance is proportional to a size of the first portion of the display,
a size of the second affordance is proportional to a size of the second portion of the display, and
while displaying the first affordance over the portion of the first application user interface and the second affordance over the portion of the second application user interface, detect a user input meeting split-screen-resizing criteria 708 In response to detecting the user input meeting the split-screen-resizing criteria:
resize the first portion of the display from a first size to a second size, including resizing display of the first application user interface and display of the first affordance proportionally to the second size of the first portion of the display, and
resize the second portion of the display from a third size to a fourth size, including resizing display of the second application user interface and display of the second affordance proportionally to the fourth size of the second portion of the display

C 716 in response to detecting the first input:

Figure 7C:
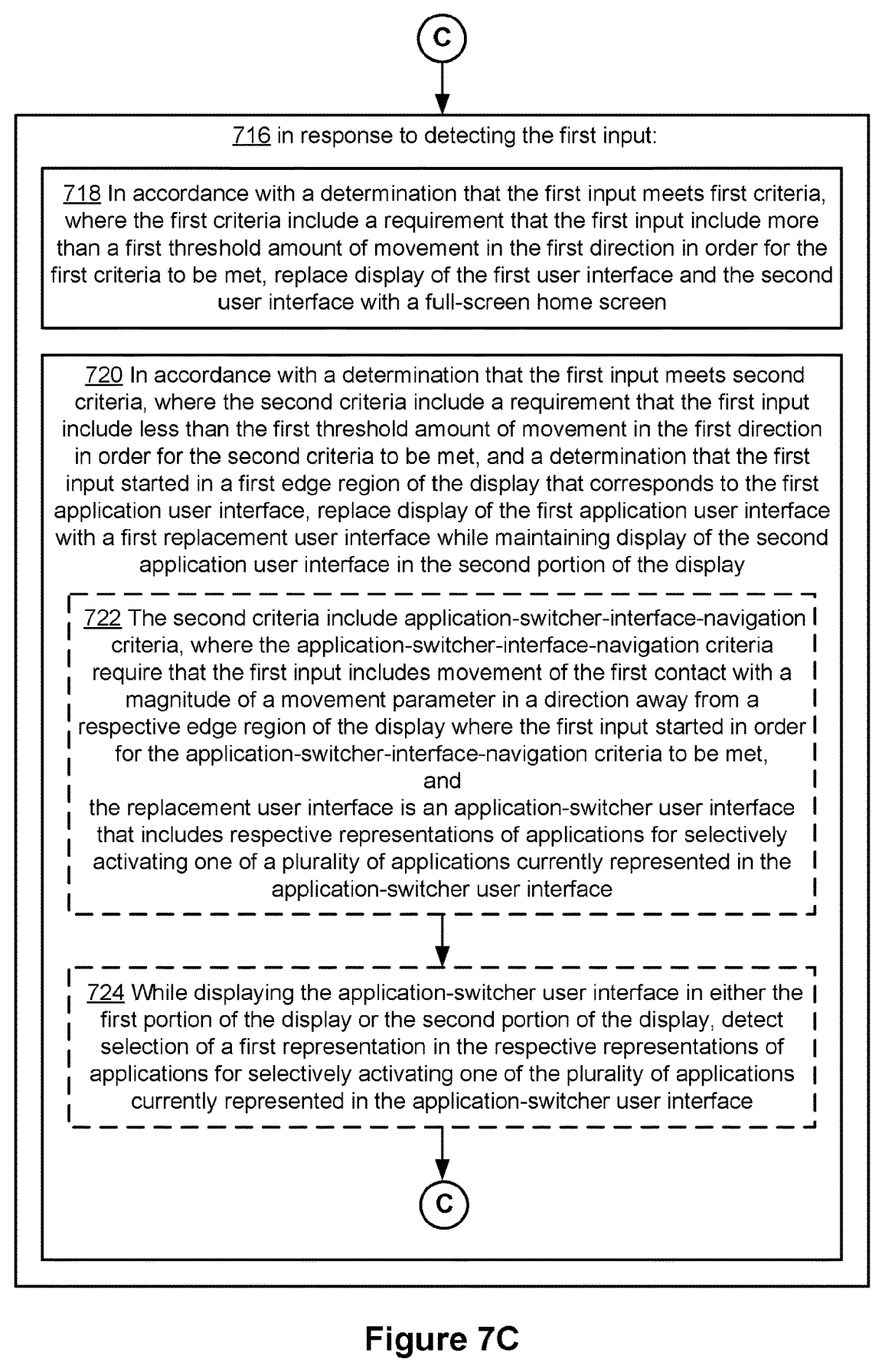

718 In accordance with a determination that the first input meets first criteria, where the first criteria include a requirement that the first input include more than a first threshold amount of movement in the first direction in order for the first criteria to be met, replace display of the first user interface and the second user interface with a full-screen home screen 720 In accordance with a determination that the first input meets second criteria, where the second criteria include a requirement that the first input include less than the first threshold amount of movement in the first direction in order for the second criteria to be met, and a determination that the first input started in a first edge region of the display that corresponds to the first application user interface, replace display of the first application user interface with a first replacement user interface while maintaining display of the second application user interface in the second portion of the display 722 The second criteria include application-switcher-interface-navigation criteria, where the application-switcher-interface-navigation criteria require that the first input includes movement of the first contact with a magnitude of a movement parameter in a direction away from a respective edge region of the display where the first input started in order for the application-switcher-interface-navigation criteria to be met, and the replacement user interface is an application-switcher user interface that includes respective representations of applications for selectively activating one of a plurality of applications currently represented in the application-switcher user interface 724 While displaying the application-switcher user interface in either the first portion of the display or the second portion of the display, detect selection of a first representation in the respective representations of applications for selectively activating one of the plurality of applications currently represented in the application-switcher user interface

C

Figure 7C 716 in response to detecting the first input:

Figure 7D:
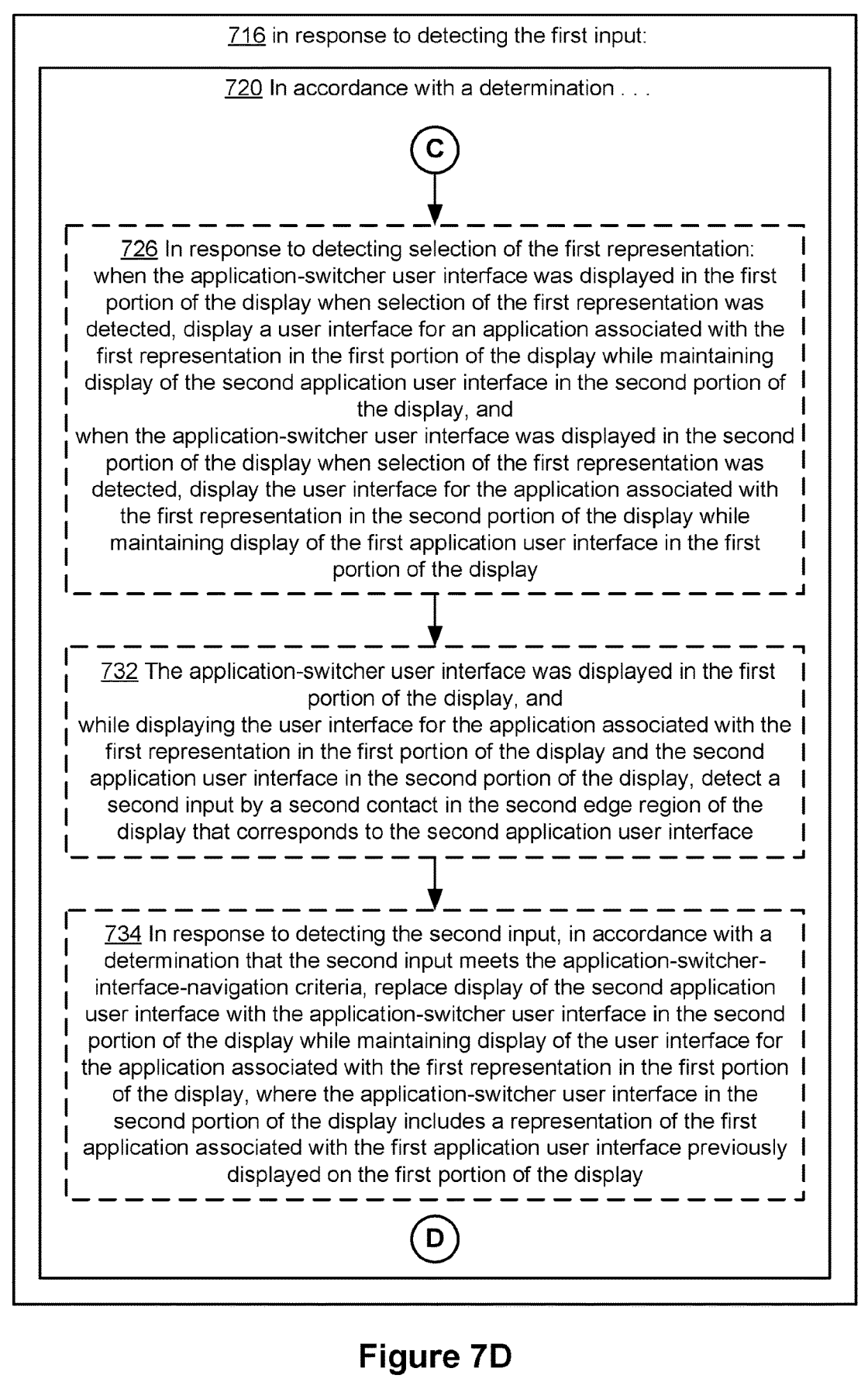

720 In accordance with a determination . . .

(C)

726 In response to detecting selection of the first representation: when the application-switcher user interface was displayed in the first portion of the display when selection of the first representation was detected, display a user interface for an application associated with the first representation in the first portion of the display while maintaining display of the second application user interface in the second portion of the display, and when the application-switcher user interface was displayed in the second portion of the display when selection of the first representation was detected, display the user interface for the application associated with the first representation in the second portion of the display while maintaining display of the first application user interface in the first portion of the display 732 The application-switcher user interface was displayed in the first portion of the display, and while displaying the user interface for the application associated with the first representation in the first portion of the display and the second application user interface in the second portion of the display, detect a second input by a second contact in the second edge region of the display that corresponds to the second application user interface 734 In response to detecting the second input, in accordance with a determination that the second input meets the application-switcher-interface-navigation criteria, replace display of the second application user interface with the application-switcher user interface in the second portion of the display while maintaining display of the user interface for the application associated with the first representation in the first portion of the display, where the application-switcher user interface in the second portion of the display includes a representation of the first application associated with the first application user interface previously displayed on the first portion of the display (D)

Figure 7D 716 in response to detecting the first input:

Figure 7E:
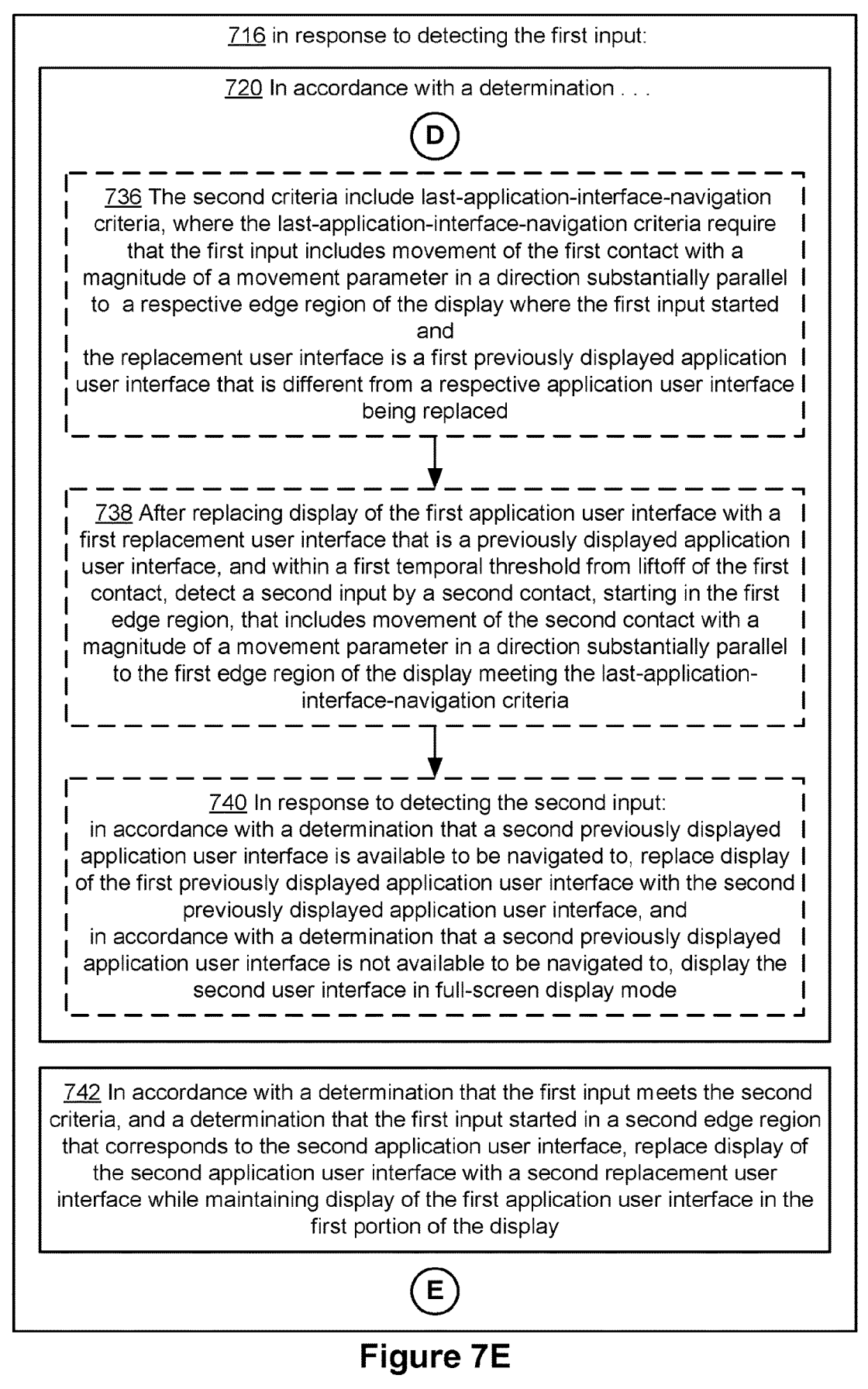

720 In accordance with a determination . . .

(D)

736 The second criteria include last-application-interface-navigation criteria, where the last-application-interface-navigation criteria require that the first input includes movement of the first contact with a magnitude of a movement parameter in a direction substantially parallel to a respective edge region of the display where the first input started and
the replacement user interface is a first previously displayed application user interface that is different from a respective application user interface being replaced

↓

738 After replacing display of the first application user interface with a first replacement user interface that is a previously displayed application user interface, and within a first temporal threshold from liftoff of the first contact, detect a second input by a second contact, starting in the first edge region, that includes movement of the second contact with a magnitude of a movement parameter in a direction substantially parallel to the first edge region of the display meeting the last-application-interface-navigation criteria

↓

740 In response to detecting the second input:
in accordance with a determination that a second previously displayed application user interface is available to be navigated to, replace display of the first previously displayed application user interface with the second previously displayed application user interface, and
in accordance with a determination that a second previously displayed application user interface is not available to be navigated to, display the second user interface in full-screen display mode 742 In accordance with a determination that the first input meets the second criteria, and a determination that the first input started in a second edge region that corresponds to the second application user interface, replace display of the second application user interface with a second replacement user interface while maintaining display of the first application user interface in the first portion of the display (E)

Figure 7E 716 in response to detecting the first input:

Figure 7F:
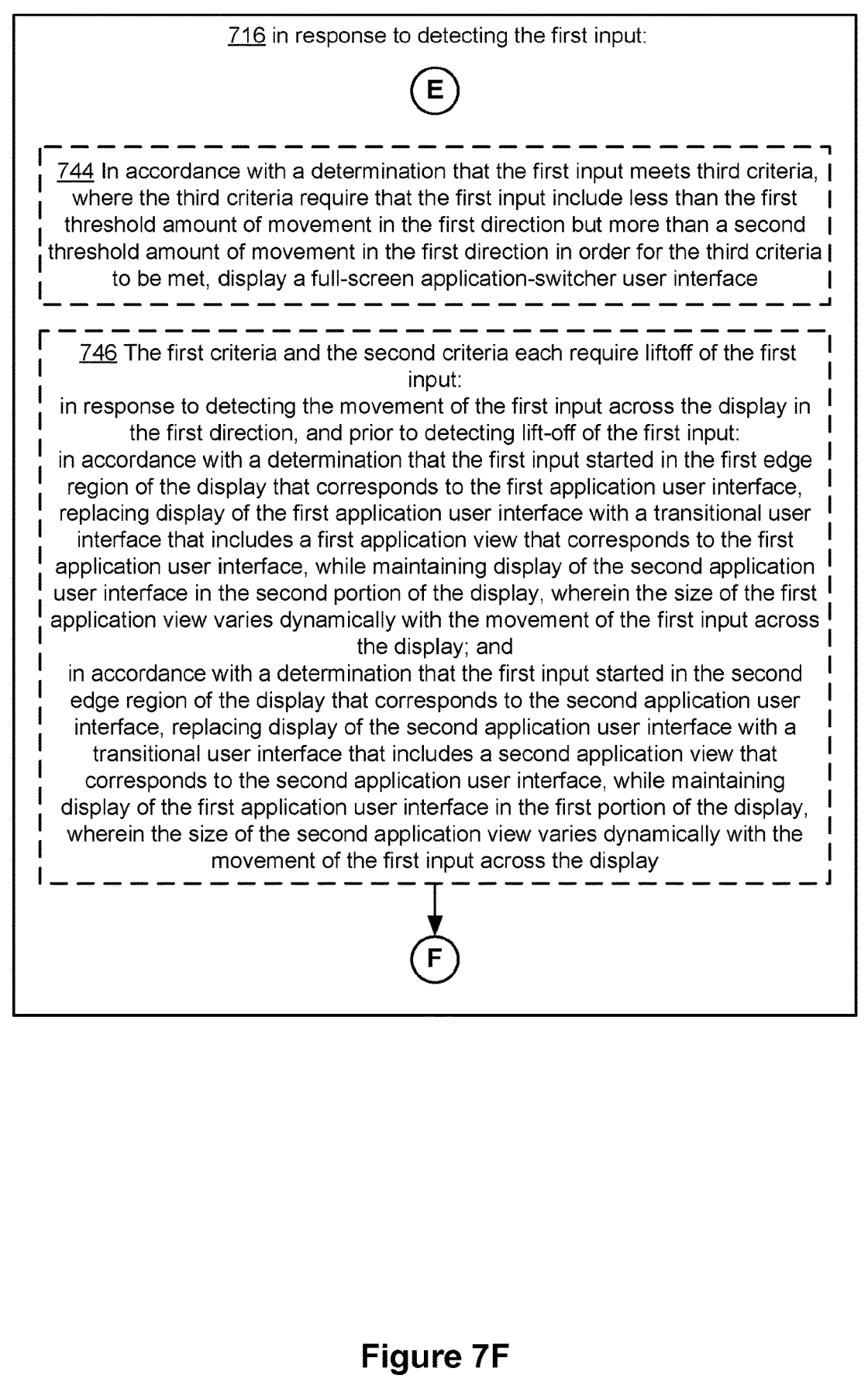

(E)

744 In accordance with a determination that the first input meets third criteria, where the third criteria require that the first input include less than the first threshold amount of movement in the first direction but more than a second threshold amount of movement in the first direction in order for the third criteria to be met, display a full-screen application-switcher user interface 746 The first criteria and the second criteria each require liftoff of the first input:
in response to detecting the movement of the first input across the display in the first direction, and prior to detecting lift-off of the first input:
in accordance with a determination that the first input started in the first edge region of the display that corresponds to the first application user interface, replacing display of the first application user interface with a transitional user interface that includes a first application view that corresponds to the first application user interface, while maintaining display of the second application user interface in the second portion of the display, wherein the size of the first application view varies dynamically with the movement of the first input across the display; and
in accordance with a determination that the first input started in the second edge region of the display that corresponds to the second application user interface, replacing display of the second application user interface with a transitional user interface that includes a second application view that corresponds to the second application user interface, while maintaining display of the first application user interface in the first portion of the display, wherein the size of the second application view varies dynamically with the movement of the first input across the display (F)

Figure 7F 716 in response to detecting the first input:

Figure 7I:
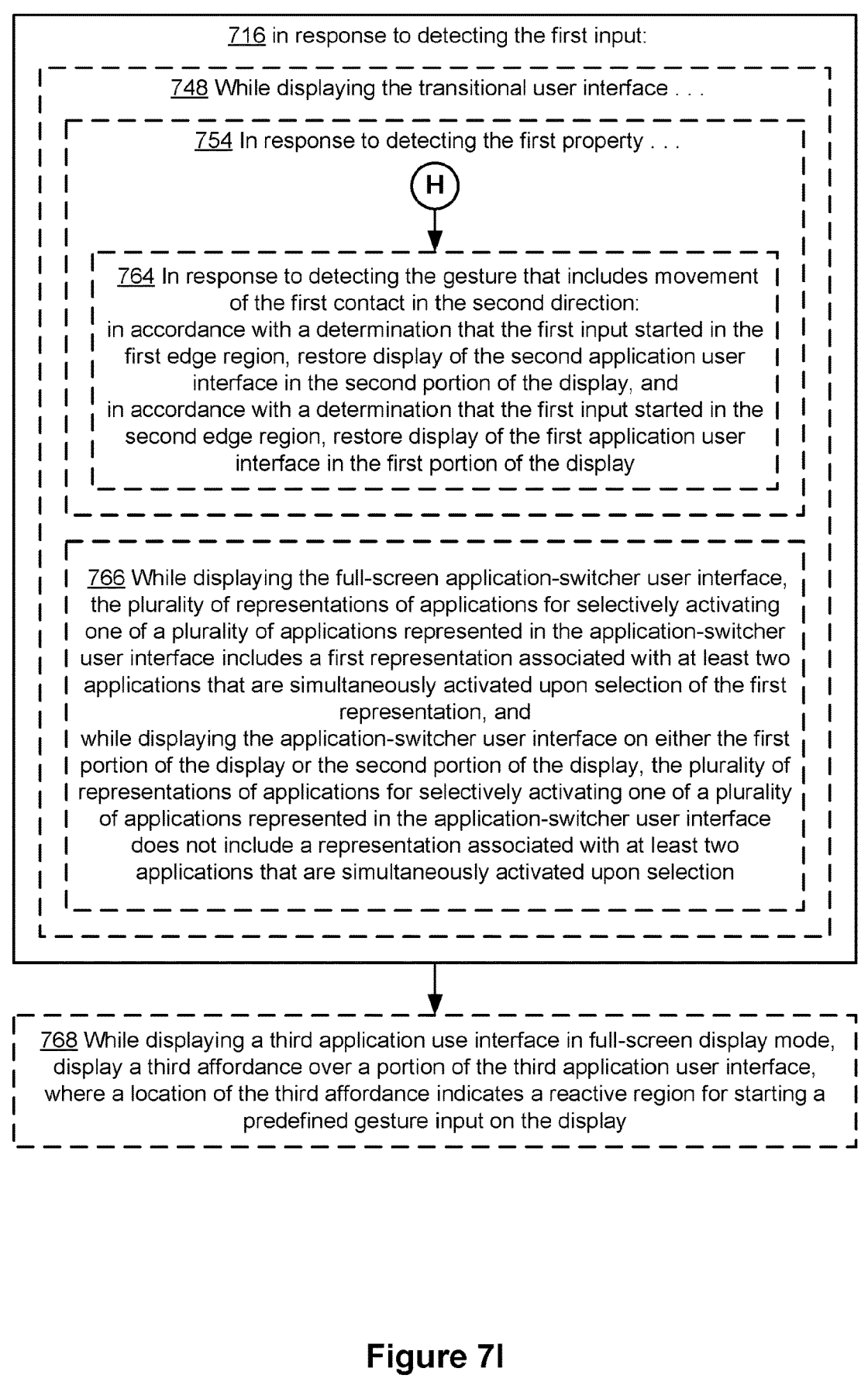

748 While displaying the transitional user interface . . .

754 In response to detecting the first property . . .

H

764 In response to detecting the gesture that includes movement of the first contact in the second direction:
in accordance with a determination that the first input started in the first edge region, restore display of the second application user interface in the second portion of the display, and
in accordance with a determination that the first input started in the second edge region, restore display of the first application user interface in the first portion of the display 766 While displaying the full-screen application-switcher user interface, the plurality of representations of applications for selectively activating one of a plurality of applications represented in the application-switcher user interface includes a first representation associated with at least two applications that are simultaneously activated upon selection of the first representation, and
while displaying the application-switcher user interface on either the first portion of the display or the second portion of the display, the plurality of representations of applications for selectively activating one of a plurality of applications represented in the application-switcher user interface does not include a representation associated with at least two applications that are simultaneously activated upon selection 768 While displaying a third application use interface in full-screen display mode, display a third affordance over a portion of the third application user interface, where a location of the third affordance indicates a reactive region for starting a predefined gesture input on the display

Figure 11B:
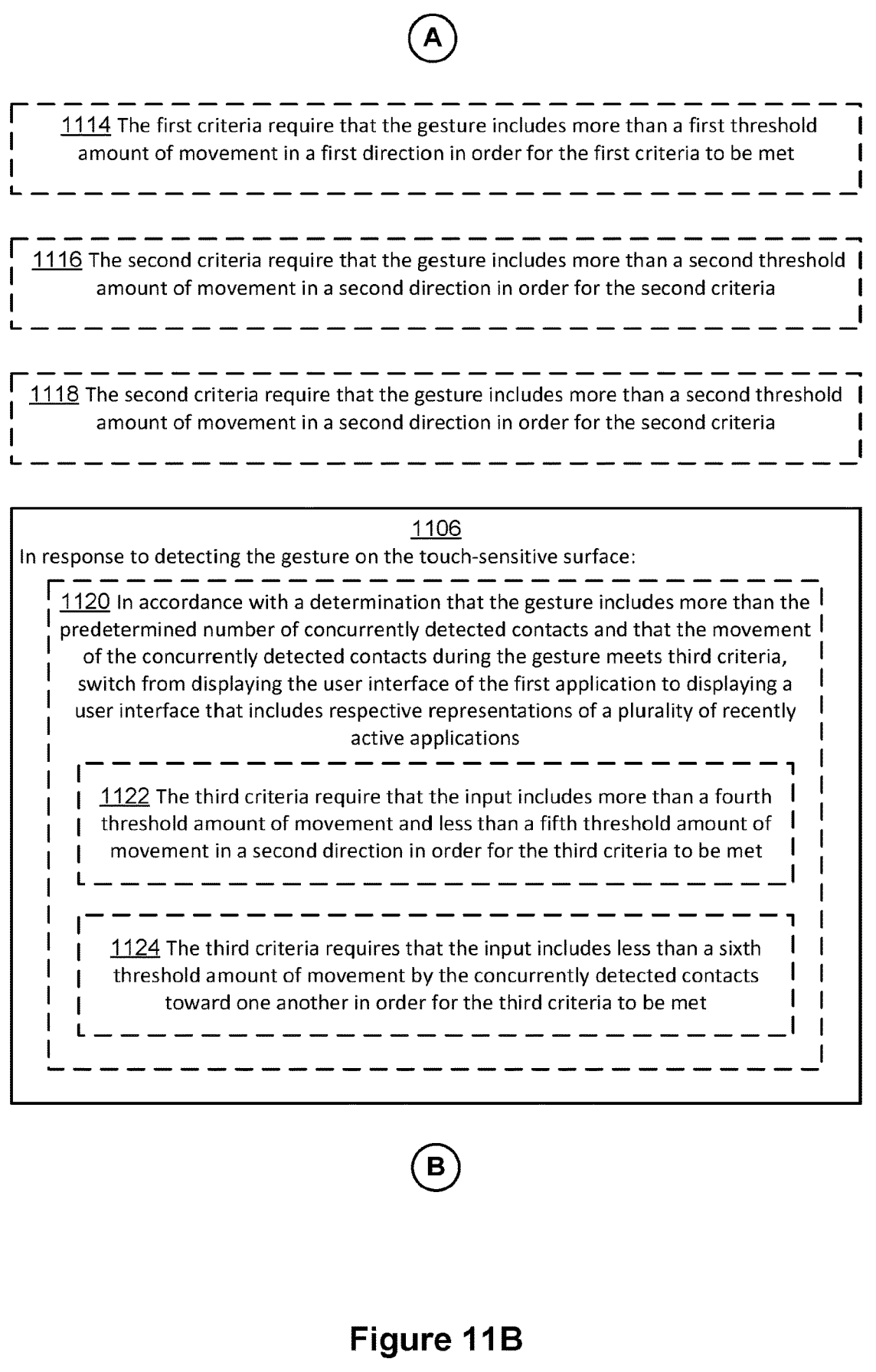

1114 The first criteria require that the gesture includes more than a first threshold amount of movement in a first direction in order for the first criteria to be met 1116 The second criteria require that the gesture includes more than a second threshold amount of movement in a second direction in order for the second criteria 1118 The second criteria require that the gesture includes more than a second threshold amount of movement in a second direction in order for the second criteria 1106
In response to detecting the gesture on the touch-sensitive surface:

1120 In accordance with a determination that the gesture includes more than the predetermined number of concurrently detected contacts and that the movement of the concurrently detected contacts during the gesture meets third criteria, switch from displaying the user interface of the first application to displaying a user interface that includes respective representations of a plurality of recently active applications 1122 The third criteria require that the input includes more than a fourth threshold amount of movement and less than a fifth threshold amount of movement in a second direction in order for the third criteria to be met 1124 The third criteria requires that the input includes less than a sixth threshold amount of movement by the concurrently detected contacts toward one another in order for the third criteria to be met

Figure 11C:
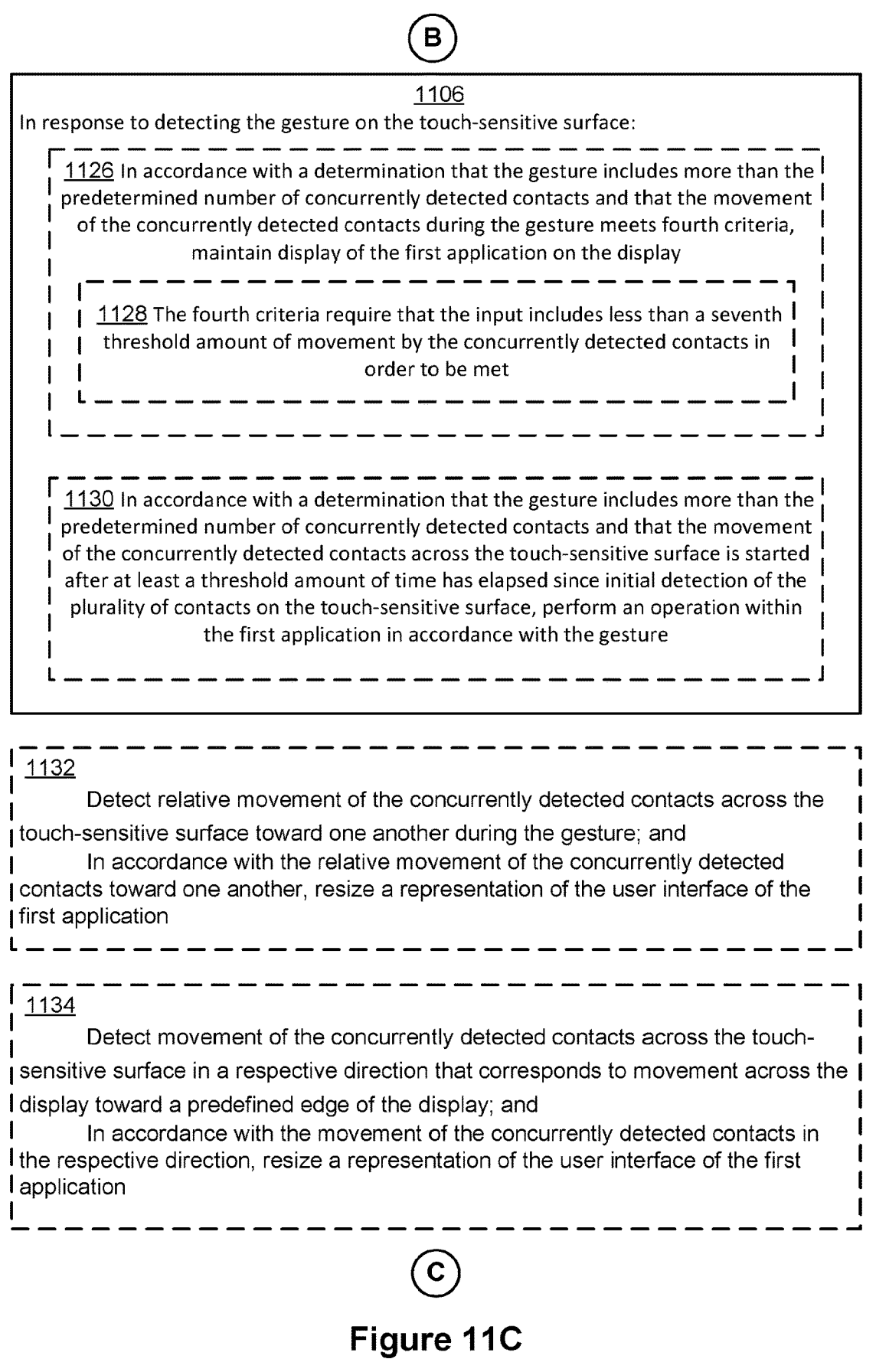

1106
In response to detecting the gesture on the touch-sensitive surface:

1126 In accordance with a determination that the gesture includes more than the predetermined number of concurrently detected contacts and that the movement of the concurrently detected contacts during the gesture meets fourth criteria, maintain display of the first application on the display 1128 The fourth criteria require that the input includes less than a seventh threshold amount of movement by the concurrently detected contacts in order to be met 1130 In accordance with a determination that the gesture includes more than the predetermined number of concurrently detected contacts and that the movement of the concurrently detected contacts across the touch-sensitive surface is started after at least a threshold amount of time has elapsed since initial detection of the plurality of contacts on the touch-sensitive surface, perform an operation within the first application in accordance with the gesture 1132
Detect relative movement of the concurrently detected contacts across the touch-sensitive surface toward one another during the gesture; and
In accordance with the relative movement of the concurrently detected contacts toward one another, resize a representation of the user interface of the first application 1134
Detect movement of the concurrently detected contacts across the touch-sensitive surface in a respective direction that corresponds to movement across the display toward a predefined edge of the display; and
In accordance with the movement of the concurrently detected contacts in the respective direction, resize a representation of the user interface of the first application

Figure 11D:
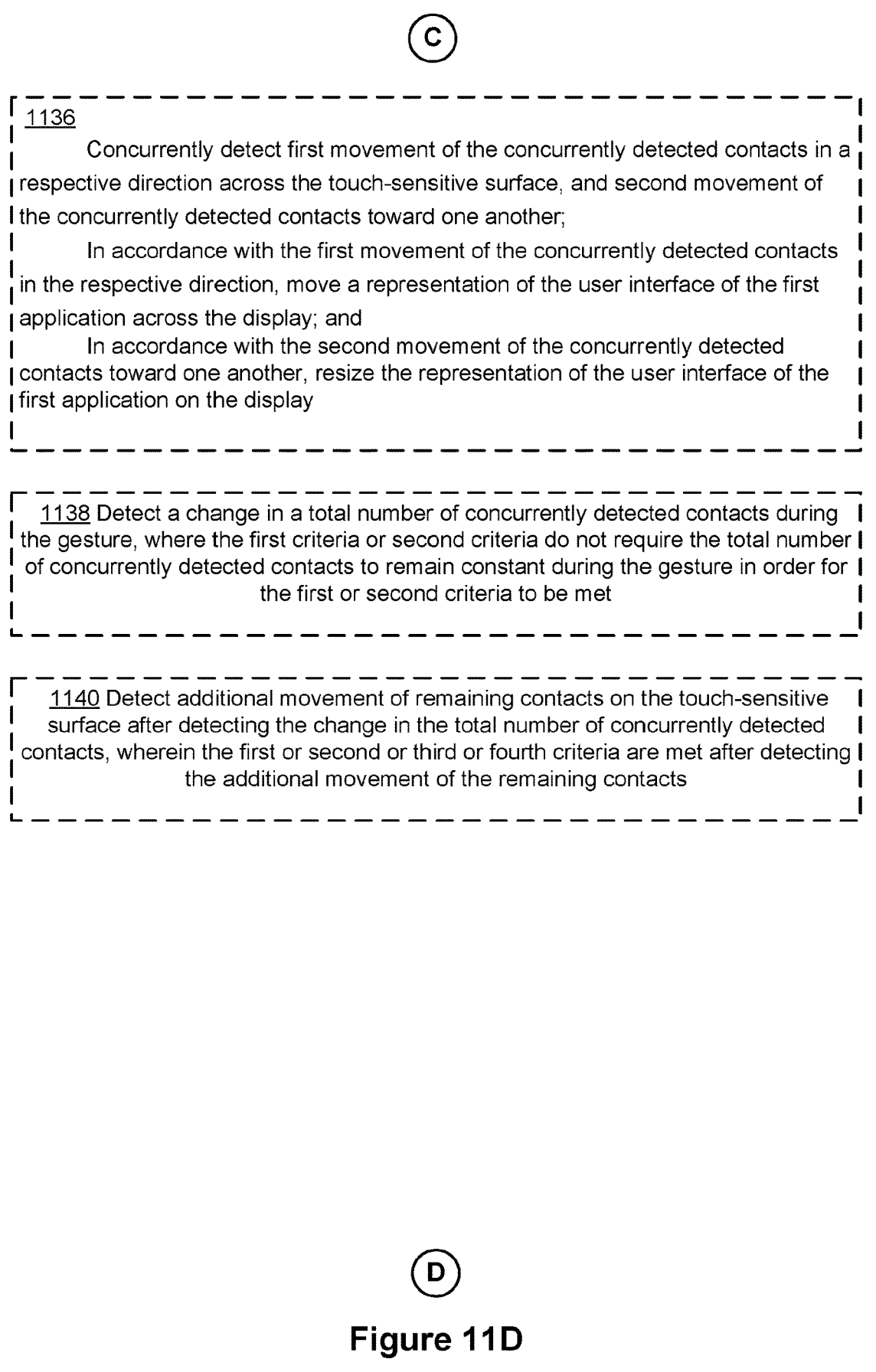

Concurrently detect first movement of the concurrently detected contacts in a respective direction across the touch-sensitive surface, and second movement of the concurrently detected contacts toward one another;

In accordance with the first movement of the concurrently detected contacts in the respective direction, move a representation of the user interface of the first application across the display; and In accordance with the second movement of the concurrently detected contacts toward one another, resize the representation of the user interface of the first application on the display 1138 Detect a change in a total number of concurrently detected contacts during the gesture, where the first criteria or second criteria do not require the total number of concurrently detected contacts to remain constant during the gesture in order for the first or second criteria to be met 1140 Detect additional movement of remaining contacts on the touch-sensitive surface after detecting the change in the total number of concurrently detected contacts, wherein the first or second or third or fourth criteria are met after detecting the additional movement of the remaining contacts

Figure 11E:
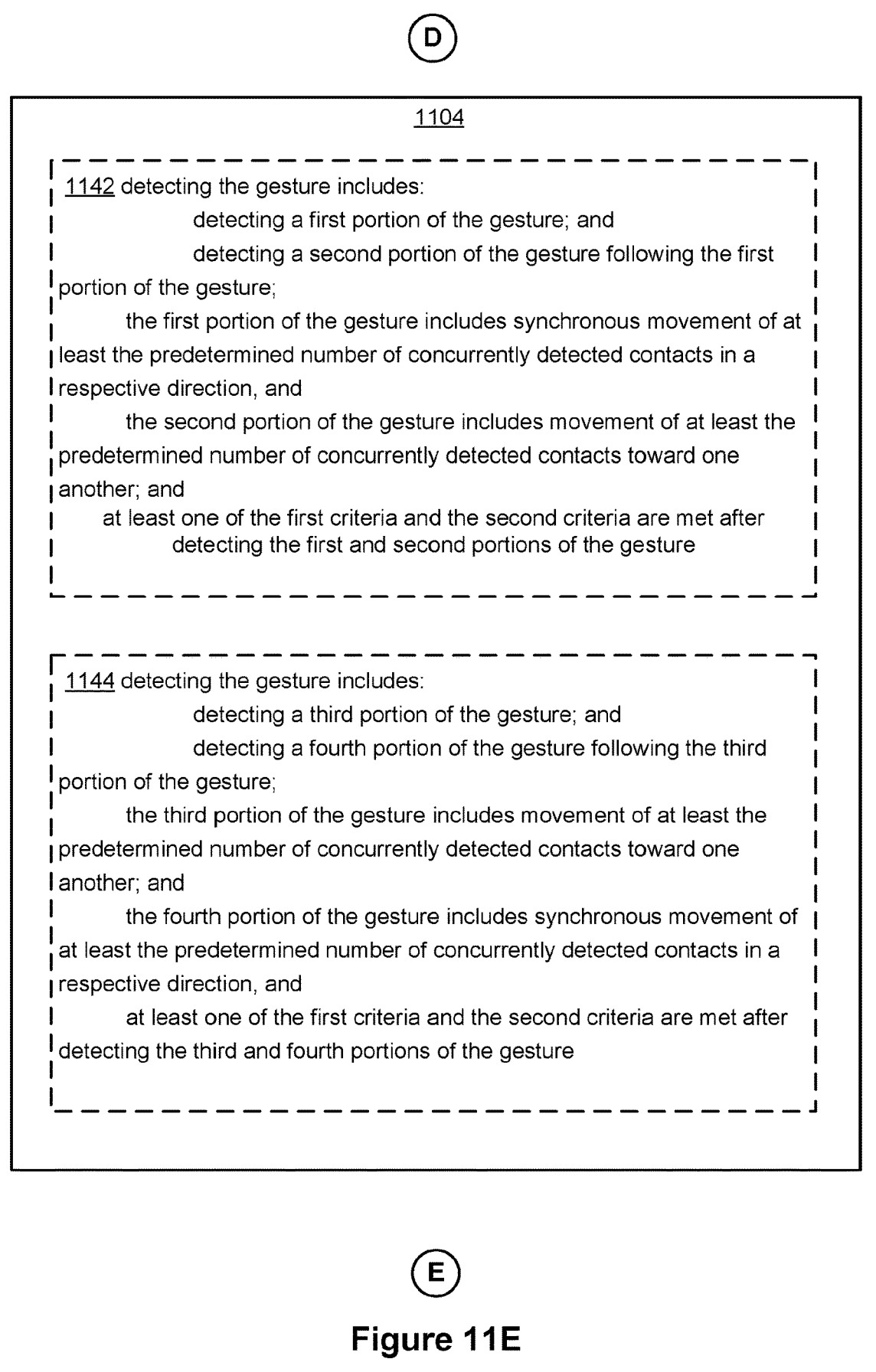

1142 detecting the gesture includes:
detecting a first portion of the gesture; and
detecting a second portion of the gesture following the first portion of the gesture;
the first portion of the gesture includes synchronous movement of at least the predetermined number of concurrently detected contacts in a respective direction, and
the second portion of the gesture includes movement of at least the predetermined number of concurrently detected contacts toward one another; and
at least one of the first criteria and the second criteria are met after detecting the first and second portions of the gesture 1144 detecting the gesture includes:
detecting a third portion of the gesture; and
detecting a fourth portion of the gesture following the third portion of the gesture;
the third portion of the gesture includes movement of at least the predetermined number of concurrently detected contacts toward one another; and
the fourth portion of the gesture includes synchronous movement of at least the predetermined number of concurrently detected contacts in a respective direction, and
at least one of the first criteria and the second criteria are met after detecting the third and fourth portions of the gesture (E)

Figure 11F:
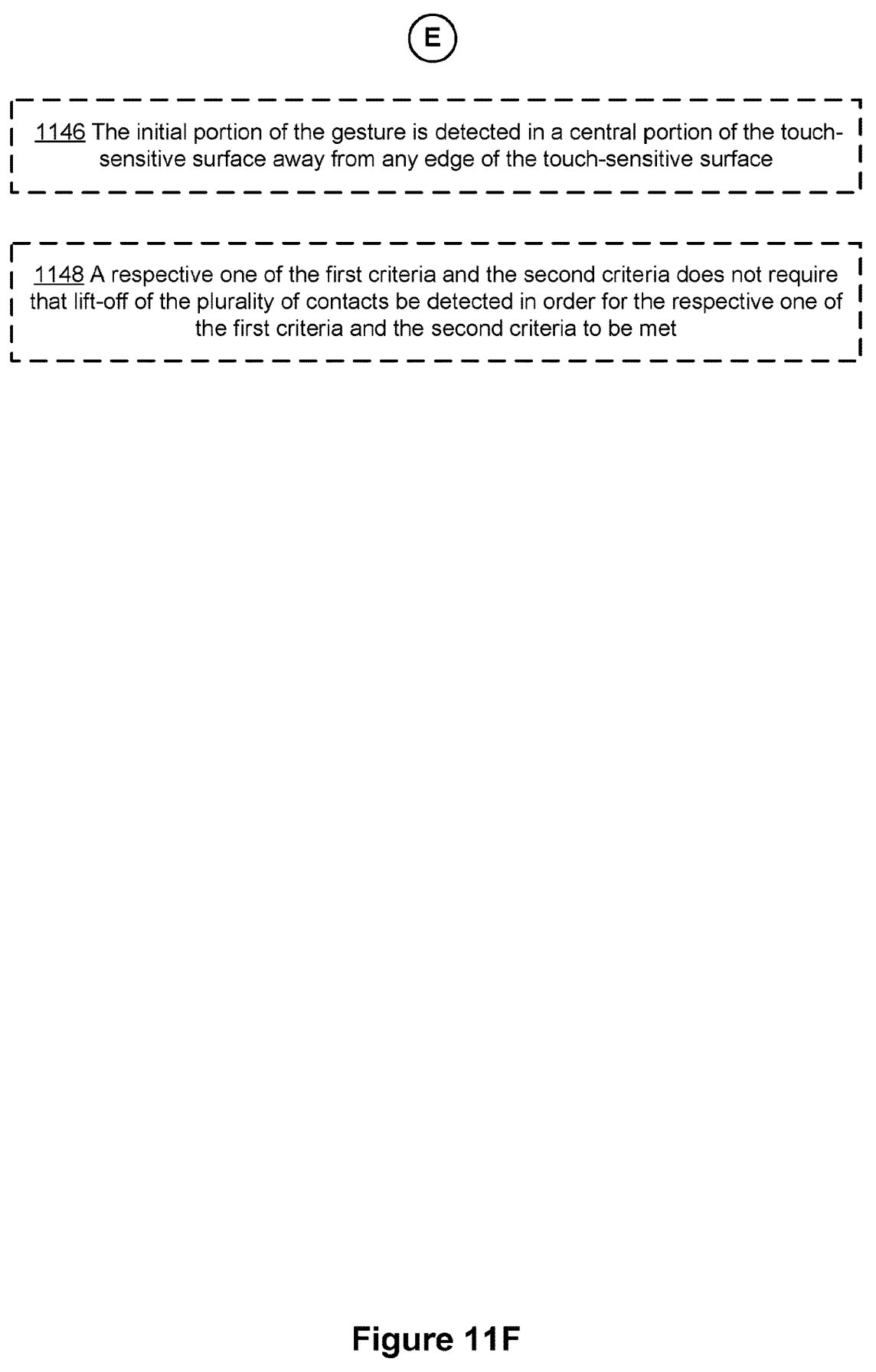

1146 The initial portion of the gesture is detected in a central portion of the touch-sensitive surface away from any edge of the touch-sensitive surface 1148 A respective one of the first criteria and the second criteria does not require that lift-off of the plurality of contacts be detected in order for the respective one of the first criteria and the second criteria to be met

Figure 12A:
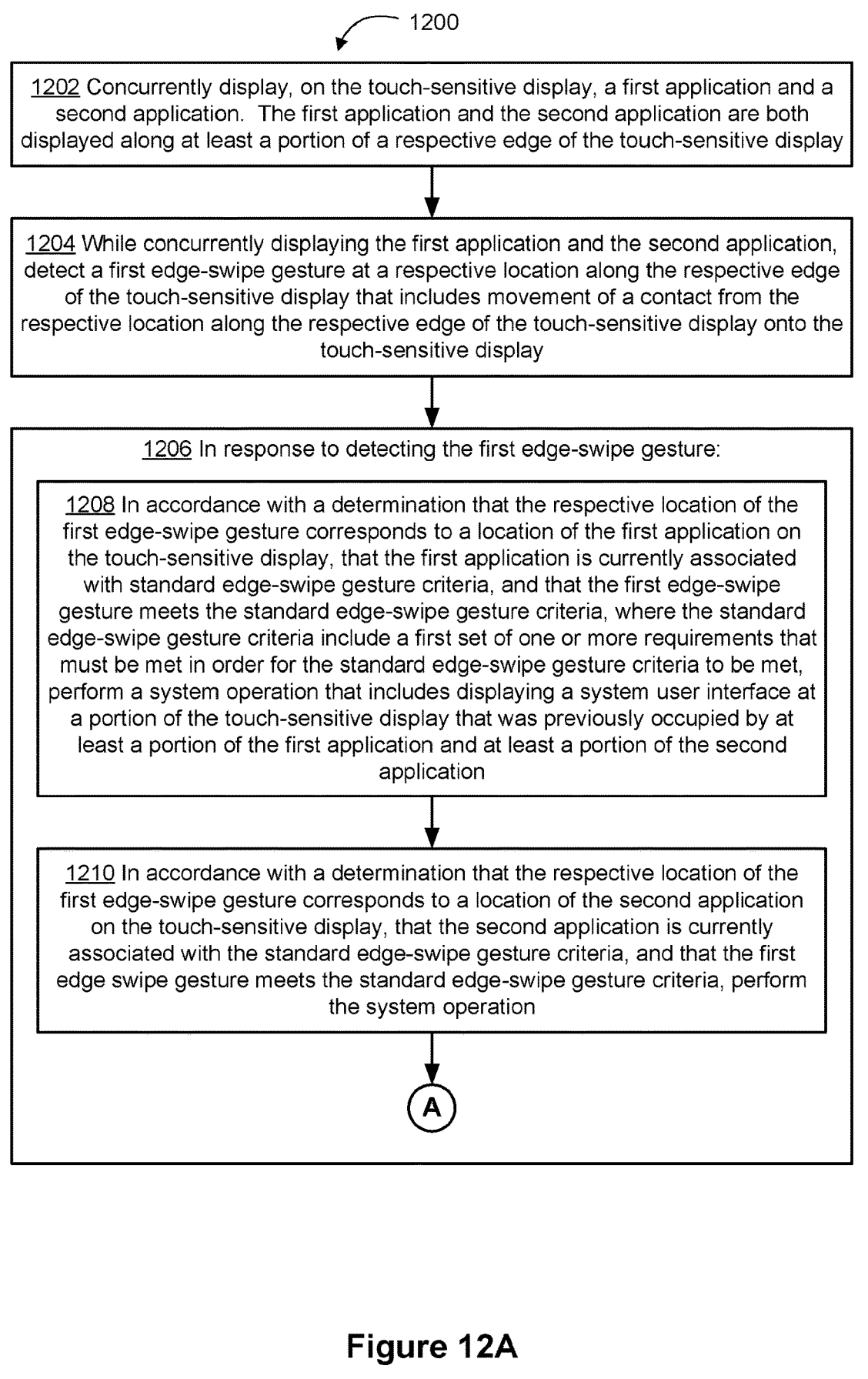

1202 Concurrently display, on the touch-sensitive display, a first application and a second application. The first application and the second application are both displayed along at least a portion of a respective edge of the touch-sensitive display 1204 While concurrently displaying the first application and the second application, detect a first edge-swipe gesture at a respective location along the respective edge of the touch-sensitive display that includes movement of a contact from the respective location along the respective edge of the touch-sensitive display onto the touch-sensitive display 1206 In response to detecting the first edge-swipe gesture:

1208 In accordance with a determination that the respective location of the first edge-swipe gesture corresponds to a location of the first application on the touch-sensitive display, that the first application is currently associated with standard edge-swipe gesture criteria, and that the first edge-swipe gesture meets the standard edge-swipe gesture criteria, where the standard edge-swipe gesture criteria include a first set of one or more requirements that must be met in order for the standard edge-swipe gesture criteria to be met, perform a system operation that includes displaying a system user interface at a portion of the touch-sensitive display that was previously occupied by at least a portion of the first application and at least a portion of the second application 1210 In accordance with a determination that the respective location of the first edge-swipe gesture corresponds to a location of the second application on the touch-sensitive display, that the second application is currently associated with the standard edge-swipe gesture criteria, and that the first edge swipe gesture meets the standard edge-swipe gesture criteria, perform the system operation

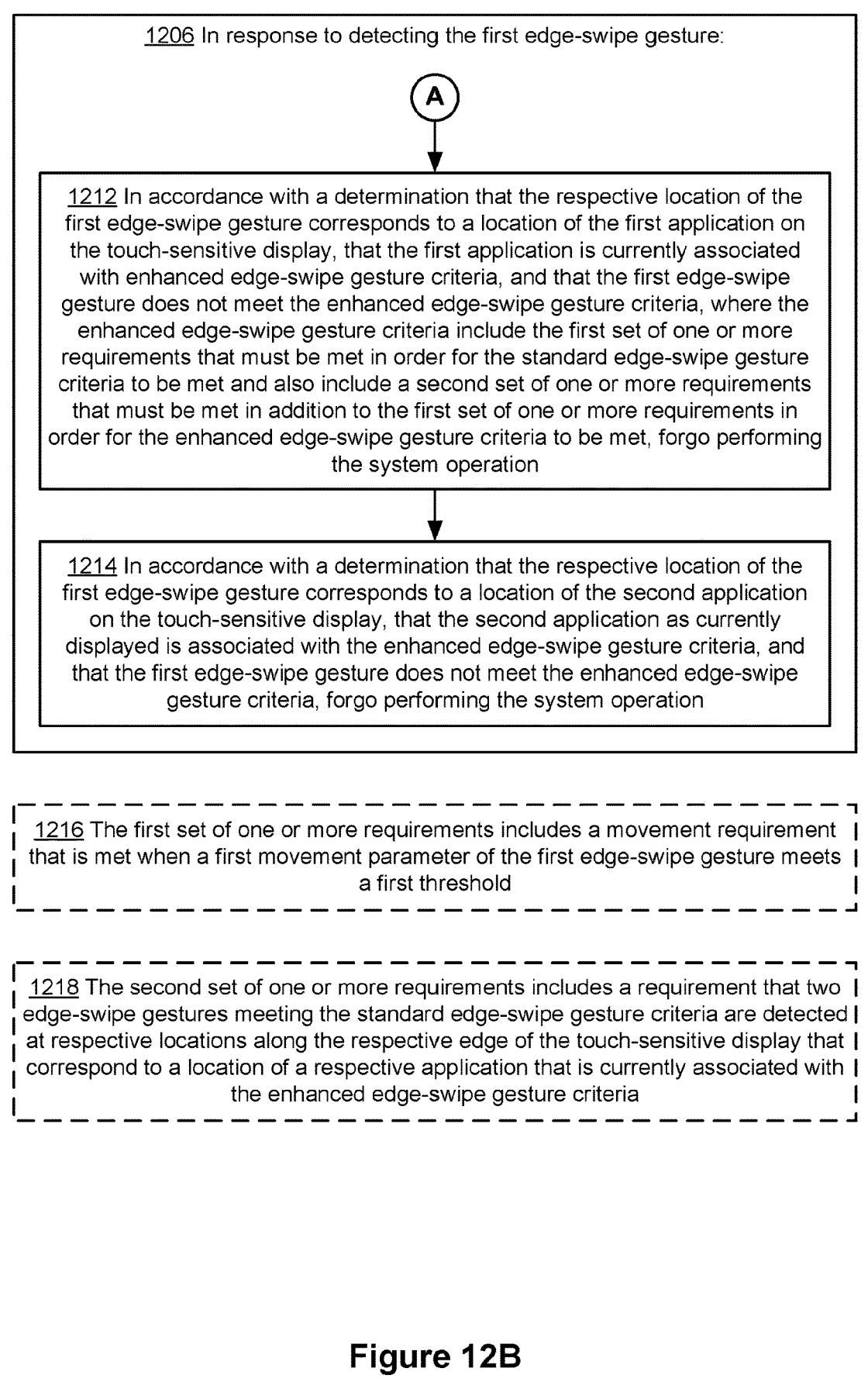

1206 In response to detecting the first edge-swipe gesture:

(A)

1212 In accordance with a determination that the respective location of the first edge-swipe gesture corresponds to a location of the first application on the touch-sensitive display, that the first application is currently associated with enhanced edge-swipe gesture criteria, and that the first edge-swipe gesture does not meet the enhanced edge-swipe gesture criteria, where the enhanced edge-swipe gesture criteria include the first set of one or more requirements that must be met in order for the standard edge-swipe gesture criteria to be met and also include a second set of one or more requirements that must be met in addition to the first set of one or more requirements in order for the enhanced edge-swipe gesture criteria to be met, forgo performing the system operation 1214 In accordance with a determination that the respective location of the first edge-swipe gesture corresponds to a location of the second application on the touch-sensitive display, that the second application as currently displayed is associated with the enhanced edge-swipe gesture criteria, and that the first edge-swipe gesture does not meet the enhanced edge-swipe gesture criteria, forgo performing the system operation 1216 The first set of one or more requirements includes a movement requirement that is met when a first movement parameter of the first edge-swipe gesture meets a first threshold 1218 The second set of one or more requirements includes a requirement that two edge-swipe gestures meeting the standard edge-swipe gesture criteria are detected at respective locations along the respective edge of the touch-sensitive display that correspond to a location of a respective application that is currently associated with the enhanced edge-swipe gesture criteria

Figure 12B

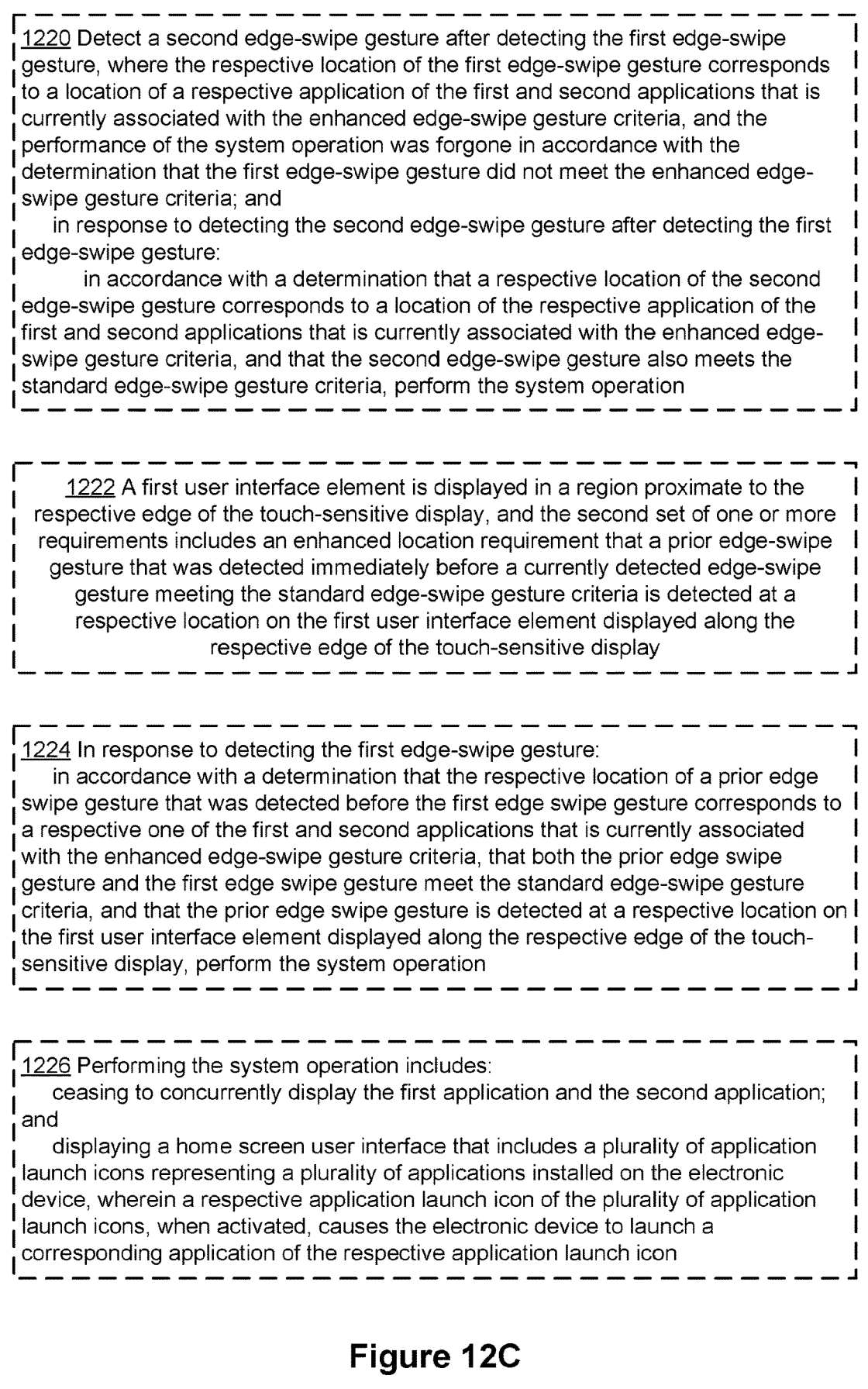

1220 Detect a second edge-swipe gesture after detecting the first edge-swipe gesture, where the respective location of the first edge-swipe gesture corresponds to a location of a respective application of the first and second applications that is currently associated with the enhanced edge-swipe gesture criteria, and the performance of the system operation was forgone in accordance with the determination that the first edge-swipe gesture did not meet the enhanced edge-swipe gesture criteria; and in response to detecting the second edge-swipe gesture after detecting the first edge-swipe gesture:

in accordance with a determination that a respective location of the second edge-swipe gesture corresponds to a location of the respective application of the first and second applications that is currently associated with the enhanced edge-swipe gesture criteria, and that the second edge-swipe gesture also meets the standard edge-swipe gesture criteria, perform the system operation 1222 A first user interface element is displayed in a region proximate to the respective edge of the touch-sensitive display, and the second set of one or more requirements includes an enhanced location requirement that a prior edge-swipe gesture that was detected immediately before a currently detected edge-swipe gesture meeting the standard edge-swipe gesture criteria is detected at a respective location on the first user interface element displayed along the respective edge of the touch-sensitive display 1224 In response to detecting the first edge-swipe gesture:

in accordance with a determination that the respective location of a prior edge swipe gesture that was detected before the first edge swipe gesture corresponds to a respective one of the first and second applications that is currently associated with the enhanced edge-swipe gesture criteria, that both the prior edge swipe gesture and the first edge swipe gesture meet the standard edge-swipe gesture criteria, and that the prior edge swipe gesture is detected at a respective location on the first user interface element displayed along the respective edge of the touch-sensitive display, perform the system operation 1226 Performing the system operation includes:

ceasing to concurrently display the first application and the second application; and displaying a home screen user interface that includes a plurality of application launch icons representing a plurality of applications installed on the electronic device, wherein a respective application launch icon of the plurality of application launch icons, when activated, causes the electronic device to launch a corresponding application of the respective application launch icon

Figure 12C

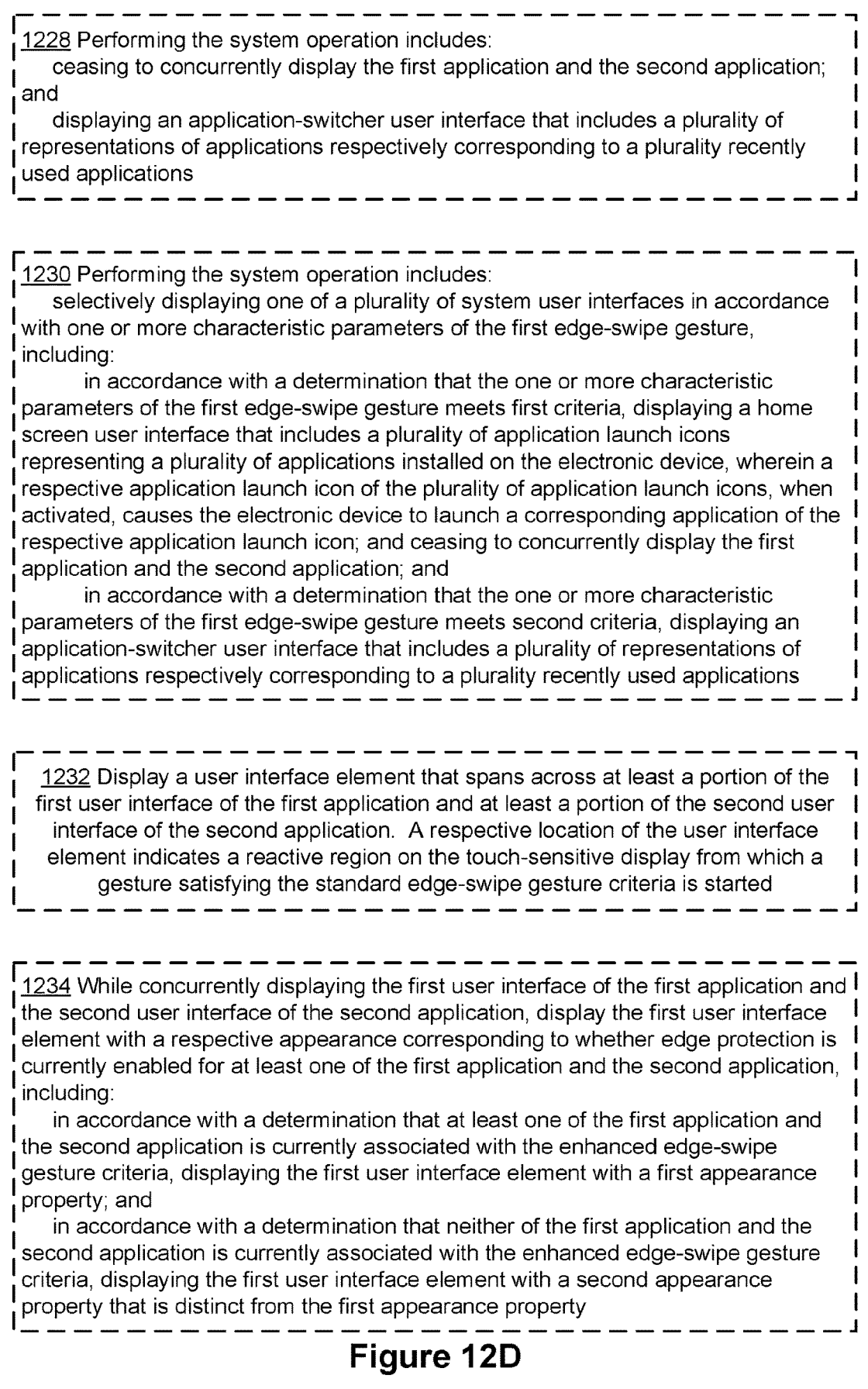

1228 Performing the system operation includes:
ceasing to concurrently display the first application and the second application; and
displaying an application-switcher user interface that includes a plurality of representations of applications respectively corresponding to a plurality recently used applications 1230 Performing the system operation includes:
selectively displaying one of a plurality of system user interfaces in accordance with one or more characteristic parameters of the first edge-swipe gesture, including:
in accordance with a determination that the one or more characteristic parameters of the first edge-swipe gesture meets first criteria, displaying a home screen user interface that includes a plurality of application launch icons representing a plurality of applications installed on the electronic device, wherein a respective application launch icon of the plurality of application launch icons, when activated, causes the electronic device to launch a corresponding application of the respective application launch icon; and ceasing to concurrently display the first application and the second application; and
in accordance with a determination that the one or more characteristic parameters of the first edge-swipe gesture meets second criteria, displaying an application-switcher user interface that includes a plurality of representations of applications respectively corresponding to a plurality recently used applications 1232 Display a user interface element that spans across at least a portion of the first user interface of the first application and at least a portion of the second user interface of the second application. A respective location of the user interface element indicates a reactive region on the touch-sensitive display from which a gesture satisfying the standard edge-swipe gesture criteria is started 1234 While concurrently displaying the first user interface of the first application and the second user interface of the second application, display the first user interface element with a respective appearance corresponding to whether edge protection is currently enabled for at least one of the first application and the second application, including:
in accordance with a determination that at least one of the first application and the second application is currently associated with the enhanced edge-swipe gesture criteria, displaying the first user interface element with a first appearance property; and
in accordance with a determination that neither of the first application and the second application is currently associated with the enhanced edge-swipe gesture criteria, displaying the first user interface element with a second appearance property that is distinct from the first appearance property

Figure 12D

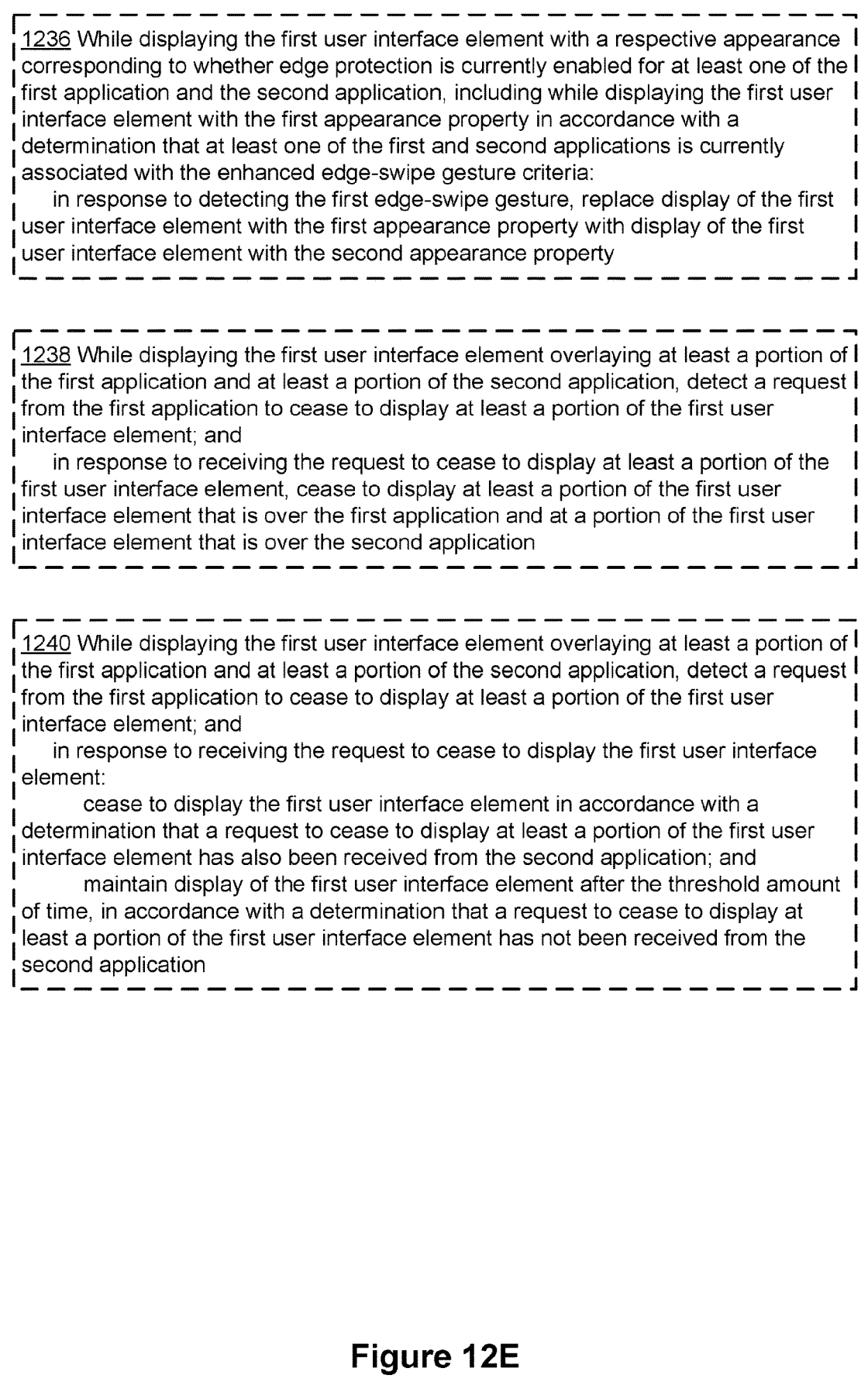

1236 While displaying the first user interface element with a respective appearance corresponding to whether edge protection is currently enabled for at least one of the first application and the second application, including while displaying the first user interface element with the first appearance property in accordance with a determination that at least one of the first and second applications is currently associated with the enhanced edge-swipe gesture criteria:

in response to detecting the first edge-swipe gesture, replace display of the first user interface element with the first appearance property with display of the first user interface element with the second appearance property 1238 While displaying the first user interface element overlaying at least a portion of the first application and at least a portion of the second application, detect a request from the first application to cease to display at least a portion of the first user interface element; and in response to receiving the request to cease to display at least a portion of the first user interface element, cease to display at least a portion of the first user interface element that is over the first application and at a portion of the first user interface element that is over the second application 1240 While displaying the first user interface element overlaying at least a portion of the first application and at least a portion of the second application, detect a request from the first application to cease to display at least a portion of the first user interface element; and in response to receiving the request to cease to display the first user interface element:

cease to display the first user interface element in accordance with a determination that a request to cease to display at least a portion of the first user interface element has also been received from the second application; and maintain display of the first user interface element after the threshold amount of time, in accordance with a determination that a request to cease to display at least a portion of the first user interface element has not been received from the second application

Figure 12E

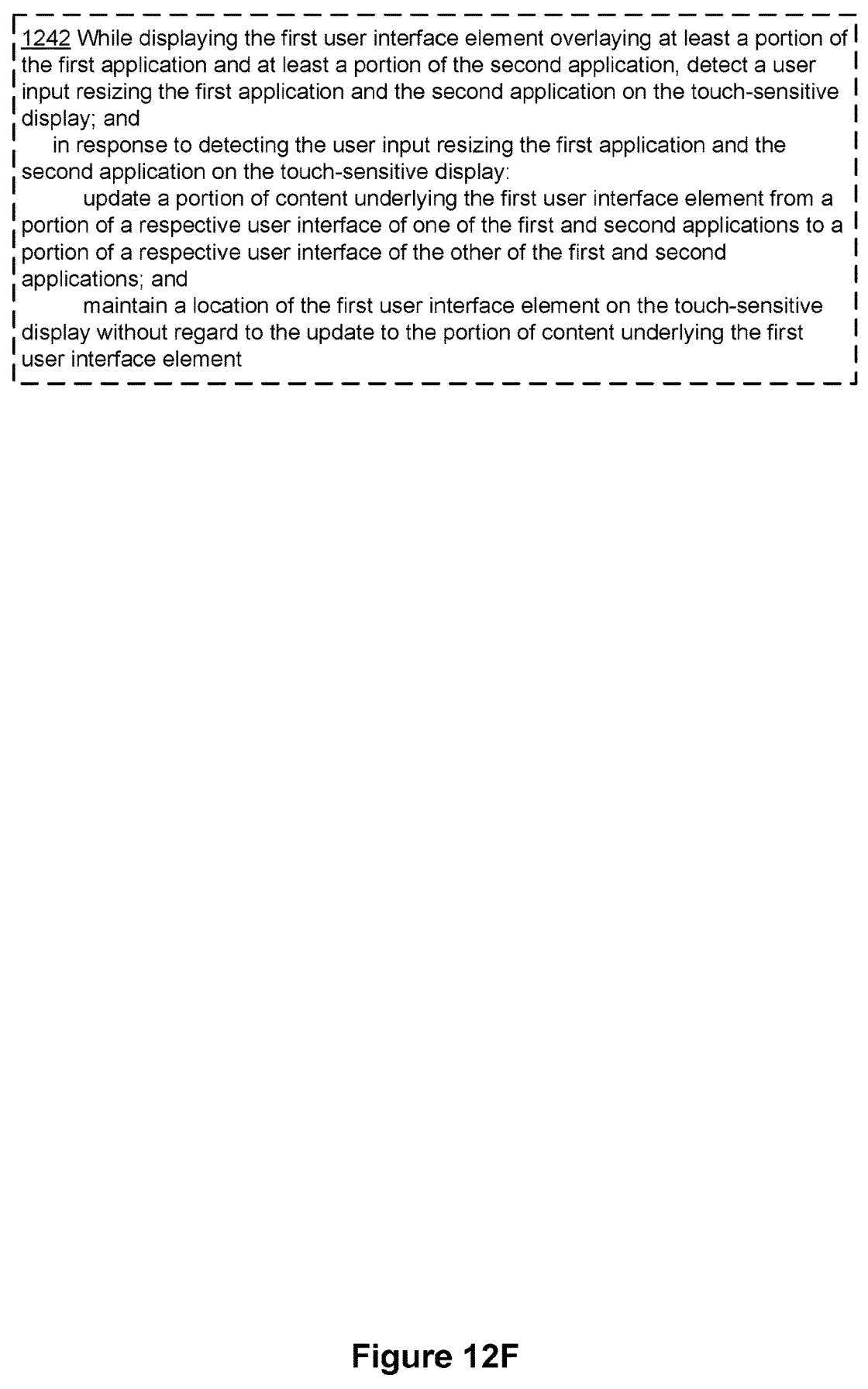

1242 While displaying the first user interface element overlaying at least a portion of the first application and at least a portion of the second application, detect a user input resizing the first application and the second application on the touch-sensitive display; and in response to detecting the user input resizing the first application and the second application on the touch-sensitive display:

update a portion of content underlying the first user interface element from a portion of a respective user interface of one of the first and second applications to a portion of a respective user interface of the other of the first and second applications; and maintain a location of the first user interface element on the touch-sensitive display without regard to the update to the portion of content underlying the first user interface element

Figure 12F

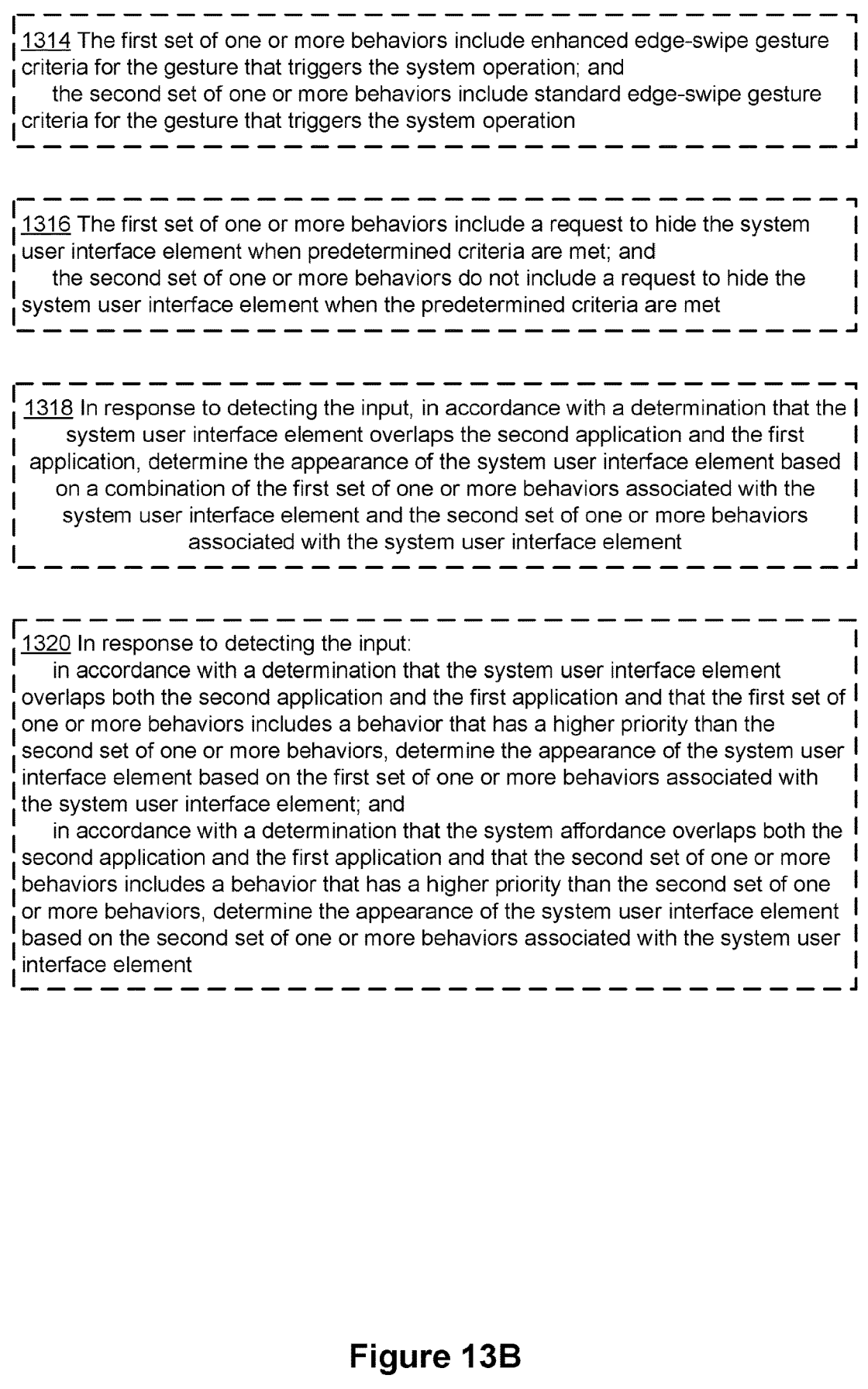

1314 The first set of one or more behaviors include enhanced edge-swipe gesture criteria for the gesture that triggers the system operation; and
the second set of one or more behaviors include standard edge-swipe gesture criteria for the gesture that triggers the system operation 1316 The first set of one or more behaviors include a request to hide the system user interface element when predetermined criteria are met; and
the second set of one or more behaviors do not include a request to hide the system user interface element when the predetermined criteria are met 1318 In response to detecting the input, in accordance with a determination that the system user interface element overlaps the second application and the first application, determine the appearance of the system user interface element based on a combination of the first set of one or more behaviors associated with the system user interface element and the second set of one or more behaviors associated with the system user interface element 1320 In response to detecting the input:
in accordance with a determination that the system user interface element overlaps both the second application and the first application and that the first set of one or more behaviors includes a behavior that has a higher priority than the second set of one or more behaviors, determine the appearance of the system user interface element based on the first set of one or more behaviors associated with the system user interface element; and
in accordance with a determination that the system affordance overlaps both the second application and the first application and that the second set of one or more behaviors includes a behavior that has a higher priority than the second set of one or more behaviors, determine the appearance of the system user interface element based on the second set of one or more behaviors associated with the system user interface element

Figure 13B

1322 The first set of behaviors require that enhanced edge-swipe gesture criteria bet met in order for an edge-swipe gesture detected at a location occupied by the first application to perform the system operation;

the second set of behaviors require that standard edge-swipe gesture criteria bet met in order for an edge-swipe gesture detected at a location occupied by the first application to perform the system operation; and the method includes, in response to detecting the input:

in accordance with a determination that the system user interface element overlaps the first application without overlapping the second application, displaying the system user interface element with a first appearance;

in accordance with a determination that the system user interface element overlaps both the first application and the second application, displaying the system user interface element with the first appearance; and in accordance with a determination that the system user interface element overlaps the second application without overlapping the first application, displaying the system user interface element with a second appearance 1324 The first set of behaviors require that enhanced edge-swipe gesture criteria bet met in order for an edge-swipe gesture detected at a location occupied by the first application to perform the system operation;

the second set of behaviors require that standard edge-swipe gesture criteria bet met in order for an edge-swipe gesture detected at a location occupied by the first application to perform the system operation; and the method includes, in response to detecting the input:

in accordance with a determination that the system user interface element overlaps the first application without overlapping the second application, displaying the system user interface element with a first appearance;

in accordance with a determination that the system user interface element overlaps both the first application and the second application, displaying the system user interface element with a second appearance; and in accordance with a determination that the system user interface element overlaps the second application without overlapping the first application, displaying the system user interface element with the second appearance

Figure 13C

1326 The first set of one or more behaviors include requesting reduction of the visual distinction of the system user interface element relative to the rest of the user interface displayed on the display when predetermined criteria are met;

the second set of one or more behaviors do not include requesting reduction of the visual distinction of the system user interface element relative to the rest of the user interface displayed on the display when the predetermined criteria are met; and the method includes, in response to a determination that the predetermined criteria are met for the first application:

in accordance with a determination that the system user interface element overlaps the first application without overlapping the second application, reducing the visual distinction of the system user interface element relative to the rest of the user interface displayed on the display;

in accordance with a determination that the system user interface element overlaps both the first application and the second application, reducing the visual distinction of the system user interface element relative to the rest of the user interface displayed on the display; and in accordance with a determination that the system user interface element overlaps the second application without overlapping the first application, forgoing reduction of the visual distinction of the system user interface element relative to the rest of the user interface displayed on the display 1328 The first set of one or more behaviors include requesting reduction of the visual distinction of the system user interface element relative to the rest of the user interface displayed on the display when predetermined criteria are met;

the second set of one or more behaviors do not include requesting reduction of the visual distinction of the system user interface element relative to the rest of the user interface displayed on the display when the predetermined criteria are met; and the method includes, in response to a determination that the predetermined criteria are met for the first application:

in accordance with a determination that the system user interface element overlaps the first application without overlapping the second application, reducing the visual distinction of the system user interface element relative to the rest of the user interface displayed on the display;

in accordance with a determination that the system user interface element overlaps both the first application and the second application, forgoing reduction of the visual distinction of the system user interface element relative to the rest of the user interface displayed on the display; and in accordance with a determination that the system user interface element overlaps the second application without overlapping the first application, forgoing reduction of the visual distinction of the system user interface element relative to the rest of the user interface displayed on the display

Figure 13D

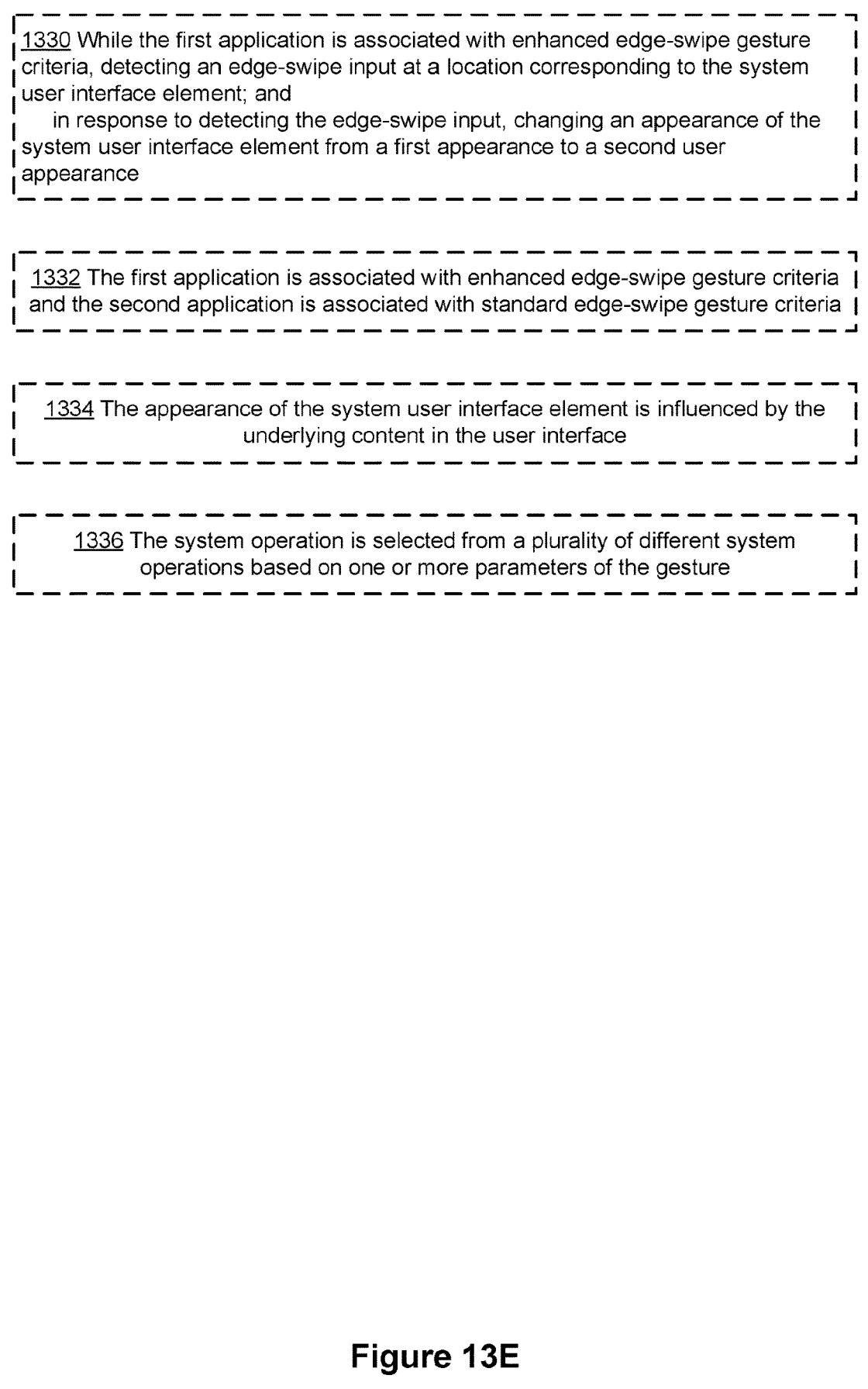

1330 While the first application is associated with enhanced edge-swipe gesture criteria, detecting an edge-swipe input at a location corresponding to the system user interface element; and in response to detecting the edge-swipe input, changing an appearance of the system user interface element from a first appearance to a second user appearance 1332 The first application is associated with enhanced edge-swipe gesture criteria and the second application is associated with standard edge-swipe gesture criteria 1334 The appearance of the system user interface element is influenced by the underlying content in the user interface 1336 The system operation is selected from a plurality of different system operations based on one or more parameters of the gesture

Figure 13E

DEVICES, METHODS, AND GRAPHICAL USER INTERFACES FOR NAVIGATING BETWEEN USER INTERFACES, DISPLAYING A DOCK, AND DISPLAYING SYSTEM USER INTERFACE ELEMENTS

CROSS REFERENCE TO RELATED APPLICATIONS

This application is a national phase application of PCT International Application No. PCT/US2019/030385, filed May 2, 2019, which is a continuation-in-part of U.S. application Ser. No. 16/145,081, filed Sep. 27, 2018, which claims priority to U.S. Provisional Application Ser. No. 62/679,959, filed Jun. 3, 2018, U.S. Provisional Application Ser. No. 62/668,177, filed May 7, 2018; the above-referenced PCT application also claims priority to U.S. Provisional Application Ser. No. 62/752,336, filed Oct. 29, 2018, Danish Patent Application No. PA 201870336, filed Jun. 11, 2018 and Chinese Patent Application No. 201811166251.1, filed Sep. 29, 2018. Each of these applications is incorporated by reference herein in its entirety.

TECHNICAL FIELD

This relates generally to electronic devices with touch-sensitive surfaces, including but not limited to electronic devices with touch-sensitive surfaces for navigating between user interfaces, displaying a dock, and displaying system user interface elements (e.g., a home affordance).

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Example manipulations include adjusting the position and/or size of one or more user interface objects, activating buttons or opening files/applications represented by user interface objects, associating metadata with one or more user interface objects, navigating between user interfaces, or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to close a first user interface, navigate through a multi-page home screen to identify a second user interface, and then select the second user interface for display is tedious and error prone. In addition, these methods take longer than necessary, thereby wasting energy. This latter consideration is particularly important in battery-operated devices.

SUMMARY

Accordingly, there is a need for electronic devices with faster, more efficient methods and interfaces for navigating between user interfaces, displaying a dock, and displaying system user interface elements (e.g., a home affordance). Such methods and interfaces optionally complement or replace conventional methods for navigating between user interfaces, displaying a dock, and displaying system user interface elements (e.g., a home affordance). Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a device with a touch-sensitive display. The method includes displaying a first user interface on the display, where the first user interface is distinct from a home screen user interface that includes a plurality of application icons corresponding to different applications of a plurality applications installed on the device. The method also includes, while displaying the first user interface on the display, detecting a first input by a first contact on a first edge of the display. The method further includes, in response to detecting the first input on the edge of the display, and while the first contact continues to be detected on the first edge of the display, in accordance with a determination that the first input was detected on a first portion of the first edge of the display and the first input meets dock-display criteria, displaying a dock with a plurality of application icons at a first location along the first edge of the display, and, in accordance with a determination that the first input was detected on a second portion of the first edge of the display that is distinct from the first portion of the first edge and the first input meets the dock-display criteria, displaying the dock at a second location along the first edge of the display that is selected to include the second portion of the first edge of the display, wherein the second location is different from the first location.

In accordance with some embodiments, a method is performed at a device with a touch-sensitive surface and a display. The method includes concurrently displaying a first application user interface on a first portion of the display, and a second application user interface on a second portion of the display distinct from the first portion. The method also includes, while concurrently displaying the first application user interface on the first portion of the display and the second application user interface on the second portion of the display, detecting a first input by a first contact that includes movement in a first direction. The method further includes, in response to detecting the first input, in accordance with a determination that the first input meets first criteria, where the first criteria include a requirement that the first input include more than a first threshold amount of movement in the first direction in order for the first criteria to be met, replacing display of the first user interface and the second user interface with a full-screen home screen, and, in accordance with a determination that the first input meets second criteria, where the second criteria include a requirement that the first input include less than the first threshold amount of movement in the first direction in order for the second criteria to be met, and a determination that the first input started in a first edge region of the display that corresponds to the first application user interface, replacing display of the first application user interface with a first replacement user interface while maintaining display of the second application user interface in the second portion of the display, and, in accordance with a determination that the first input meets the second criteria, and a determination that the first input started in a second edge region that corresponds to the second application user interface, replacing display of the second application user interface with a second replacement user interface while maintaining display of the first application user interface in the first portion of the display.

In accordance with some embodiments, a method is performed at a device with a touch-sensitive surface and a display. The method includes displaying, on the display, a user interface of a first application of a plurality of applications installed on the device. The method further includes detecting a gesture on the touch-sensitive surface, wherein detecting the gesture includes detecting an initial portion of the gesture while displaying the user interface of the first application on the display, and detecting the gesture includes concurrently detecting a plurality of contacts on the touch-sensitive surface and detecting movement of the plurality of contacts. The method further includes: in response to detecting the gesture on the touch-sensitive surface: in accordance with a determination that the gesture includes two concurrently detected contacts, performing an operation in the first application based on the movement of the two concurrently detected contacts during the gesture; in accordance with a determination that the gesture includes more than a predetermined number of concurrently detected contacts that is greater than two and that the movement of the concurrently detected contacts during the gesture meets first criteria, switching from displaying the user interface of the first application to displaying a user interface of a second application of the plurality of applications that is distinct from the first application; and in accordance with a determination that the gesture includes more than the predetermined number of concurrently detected contacts and that the movement of the concurrently detected contacts during the gesture meets second criteria that are distinct from the first criteria, switching from displaying the user interface of the first application to displaying a user interface that includes respective application icons for opening the plurality of applications installed on the device.

In accordance with some embodiments, a method is performed at a device with a touch-sensitive display. The method includes: concurrently displaying, on the touch-sensitive display, a first application and a second application, wherein the first application and the second application are both displayed along at least a portion of a respective edge of the touch-sensitive display; while concurrently displaying the first application and the second application, detecting a first edge-swipe gesture at a respective location along the respective edge of the touch-sensitive display that includes movement of a contact from the respective location along the respective edge of the touch-sensitive display onto the touch-sensitive display; and in response to detecting the first edge-swipe gesture: in accordance with a determination that the respective location of the first edge-swipe gesture corresponds to a location of the first application on the touch-sensitive display, that the first application is currently associated with standard edge-swipe gesture criteria, and that the first edge-swipe gesture meets the standard edge-swipe gesture criteria, wherein the standard edge-swipe gesture criteria include a first set of one or more requirements that must be met in order for the standard edge-swipe gesture criteria to be met, performing a system operation that includes displaying a system user interface at a portion of the touch-sensitive display that was previously occupied by at least a portion of the first application and at least a portion of the second application; in accordance with a determination that the respective location of the first edge-swipe gesture corresponds to a location of the second application on the touch-sensitive display, that the second application is currently associated with the standard edge-swipe gesture criteria, and that the first edge swipe gesture meets the standard edge-swipe gesture criteria, performing the system operation; in accordance with a determination that the respective location of the first edge-swipe gesture corresponds to a location of the first application on the touch-sensitive display, that the first application is currently associated with enhanced edge-swipe gesture criteria, and that the first edge-swipe gesture does not meet the enhanced edge-swipe gesture criteria, wherein the enhanced edge-swipe gesture criteria include the first set of one or more requirements that must be met in order for the standard edge-swipe gesture criteria to be met and also include a second set of one or more requirements that must be met in addition to the first set of one or more requirements in order for the enhanced edge-swipe gesture criteria to be met, forgoing performing the system operation; and in accordance with a determination that the respective location of the first edge-swipe gesture corresponds to a location of the second application on the touch-sensitive display, that the second application as currently displayed is associated with the enhanced edge-swipe gesture criteria, and that the first edge-swipe gesture does not meet the enhanced edge-swipe gesture criteria, forgoing performing the system operation.

In accordance with some embodiments, a method is performed at a device with a touch-sensitive display. The method includes: concurrently displaying, on the touch-sensitive display: a system user interface element that indicates a location for performing a gesture that triggers a system operation; a first application that currently has a first set of one or more behaviors associated with the system user interface element; and a second application that currently has a second set of one or more behaviors associated with the system user interface element that are different from the first set of one or more behaviors, wherein: the first application and the second application are both displayed along at least a portion of a respective edge of the touch-sensitive display; the system user interface element overlaps the first application without overlapping the second application; and an appearance of the system user interface element is determined based on the first set of one or more behaviors; while concurrently displaying the first application, the second application and the system user interface element, detecting an input corresponding to a request to resize the second application; and in response to detecting the input: resizing the second application in accordance with the input; and in accordance with a determination that the system affordance overlaps the second application without overlapping the first application, changing the appearance of the system user interface element to an appearance based on the second set of one or more behaviors associated with the system user interface element.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for navigating between user interfaces, displaying a dock, and displaying system user interface elements (e.g., a home affordance) thereby increasing the effectiveness, efficiency, and user satisfaction with such devices. Such methods and interfaces may complement or replace conventional methods for navigating between user interfaces, displaying a dock, and displaying system user interface elements (e.g., a home affordance).

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5A29 illustrate example user interfaces for displaying a dock with a plurality of application icons at a variable location along one or more edges of a touch-sensitive display, in accordance with some embodiments.

FIGS. 5B1-5B36 illustrate example user interfaces for navigating to different user interfaces from a user interface displayed in a split-screen display mode, in accordance with some embodiments.

FIGS. 5C1-5C59 illustrate example user interfaces for navigating between different user interfaces using multi-contact gestures, in accordance with some embodiments.

FIGS. 5D1-5D64 illustrate example user interfaces for navigating to different user interfaces outside of an application from an application user interface displayed in a split-screen display mode, in accordance with some embodiments.

FIGS. 5D65-5D98 illustrate example user interfaces displayed in a split-screen display mode, where a system user interface element changes its appearance state based on one or more behaviors of the application(s) underlying the system user interface element, in accordance with some embodiments.

FIG. 5D99 illustrates a system user interface element with an appearance generated in accordance with the appearance of a portion of content underlying the system user interface element, in accordance with some embodiments.

FIGS. 6A-6F are flow diagrams of a process for displaying a dock with a plurality of application icons at a variable location along one or more edges of a touch-sensitive display, in accordance with some embodiments.

FIGS. 7A-7I are flow diagrams of a process for navigating to different user interfaces from a user interface displayed in a split-screen display mode, in accordance with some embodiments.

FIGS. 11A-11F are flow diagrams of a process for navigating between user interfaces based on a multi-contact gesture, in accordance with some embodiments.

FIGS. 12A-12F are a flow diagram of a method of performing a system operation (e.g., navigating to different user interfaces outside of an application from an application user interface displayed in a split-screen display mode), in accordance with some embodiments.

FIGS. 13A-13E are flow diagram of a method of displaying a system user interface element (e.g., a home affordance) with different appearance states based on one or more behaviors of the application(s) underlying the system user interface element, in accordance with some embodiments.

DESCRIPTION OF EMBODIMENTS

Figure 1A:
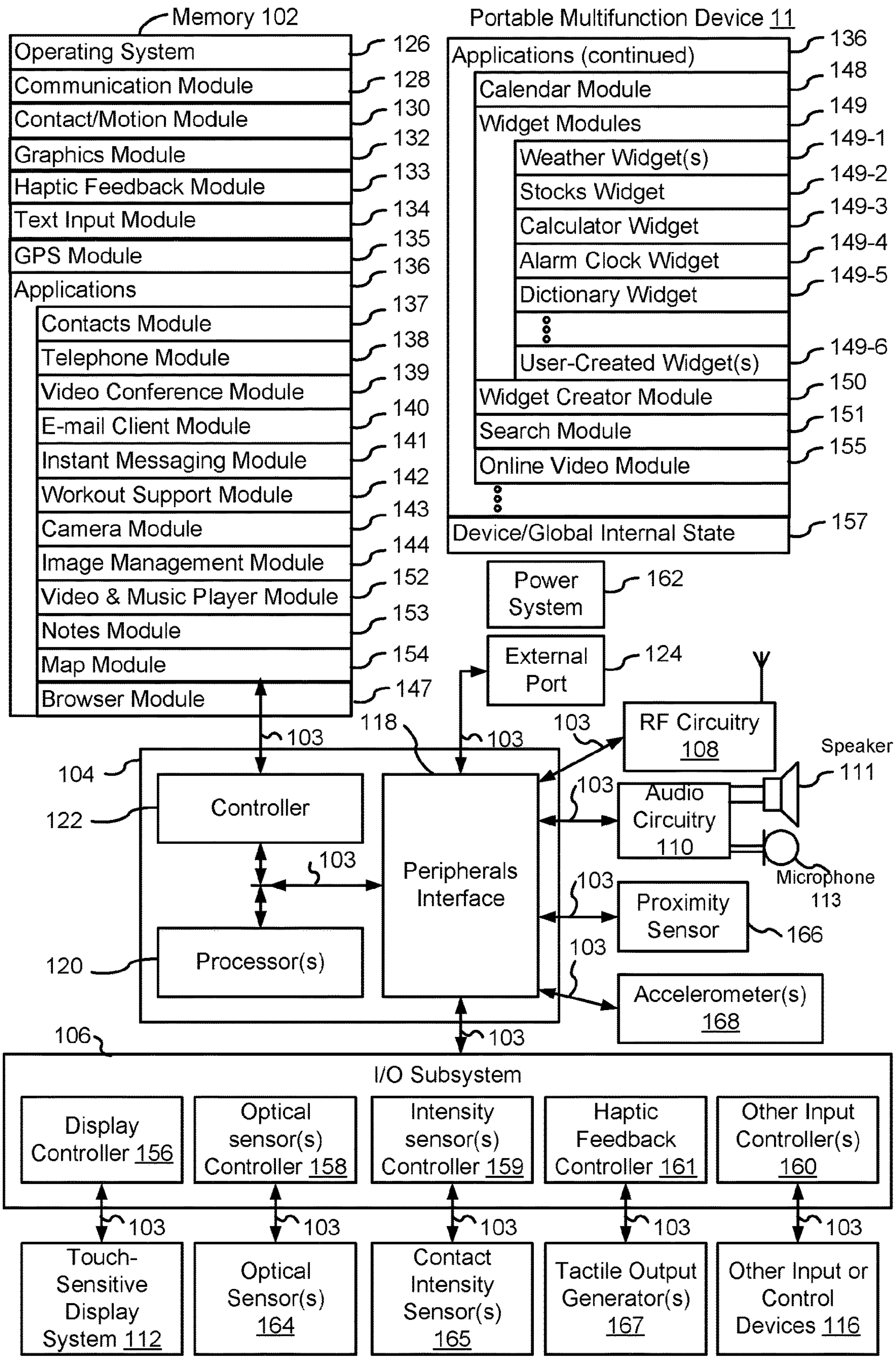
FIG. 1A is a block diagram illustrating a portable multifunction device with a touch-sensitive display in accordance with some embodiments.

Conventional methods of navigating between user interfaces, in particular, between application user interfaces and system user interfaces (e.g., a home screen user interface, or an application-switcher user interface) often require multiple separate inputs (e.g., gestures and button presses, etc.), and discrete user interface transitions that are irreversible. The embodiments below provide a single gesture that is dynamically adjustable and facilitates navigation into different user interfaces (e.g., a recently open application, a home screen user interface, and an application-switcher user interface), based on different criteria (e.g., different criteria based on the type of gesture performed by the contact(s), positions, timing, movement parameters, of the contact(s) and/or user interface objects that are displayed). In addition, the embodiments below provide real-time visual feedback to indicate which user interface the user is navigating towards, while executing the single gesture navigation input. This improves the accuracy of user navigation by allowing the user the opportunity to mitigate a mistake before the input is completed, e.g., by altering the properties of the input prior to liftoff. This, in turn avoids unwanted navigation events, saving time and battery life.

Further, when operating a larger device (e.g., a tablet computer), both of the user's hands are often engaged holding the device (e.g., supporting the device from either side), making it difficult to perform navigation gestures that must be initiated from a position on the device that is distant to the orientation of the user's hands. It is likewise difficult to operate larger devices with a single hand, because that hand must be engaged supporting the device. The embodiments below improve user interface navigation on larger devices by providing an input that allows display of an application dock (e.g., an affordance displaying multiple application icons for opening/navigating to a particular application) as a user-defined position along one or more edges on the device. This allows a user to access an application dock without having to reposition their hands on the device (e.g., at a position proximal to wherever their hands are located on the device). This saves time when operating the device (e.g., by bypassing the need for a user to reposition their hands before calling-up and/or interacting with an application dock) which, in turn, saves the battery life of the device.

Further, the embodiments below provide a gesture that facilitates navigation into different user interfaces (e.g., a recently open application, a home screen user interface, and an application-switcher user interface) within a sub-portion of a split-screen user interface or on an entire screen, based on different criteria (e.g., different criteria based on position, timing, movement parameters, of the contact and/or user interface objects that are displayed). This provides easy access to navigation functions of the device without cluttering the user interface with additional displayed controls and reduces amount of time and the number of inputs required to achieve an intended screen configuration, which, additionally, reduces power usage and improves the battery life of the device.

Further, the embodiments below facilitate navigation from an application user interface to another user interface outside of the application, such as to a different application or to a system user interface (e.g., a home screen), or performing an operation within the application, based on a gesture (e.g., a gesture performed with multiple concurrently detected contacts) that is initiated from the application user interface. In these embodiments, the outcome of the gesture is based on which of a plurality of different sets of criteria (e.g., criteria based on gesture type that are performed by the contacts, the total number of concurrently detected contacts, positions, timing, and/or movement parameters of the contacts, and/or user interface objects that are displayed) are met by the gesture (e.g., at the time that the gesture is terminated). When determining the destination state of the device (e.g., what operation to perform and/or what user interface to display), the input gesture is continuously evaluated against the different sets of criteria. Dynamic visual feedback is continuously displayed to indicate the likely destination state of the device based on the input that has been detected up to this point, so that the user is given opportunities to adjust his/her input to modify the actual destination state of the device that is reached after the termination of the input. Using different sets of criteria to determine the final destination state of the device (e.g., the operation that is performed and/or the user interface that is finally displayed) allows the user to use a fluid gesture can be changed mid-stream (e.g., either because the user decides to change the outcome they want to achieve or the user realized based on the device feedback that he/she is providing an incorrect input for an intended outcome) to achieve an intended outcome. This helps to avoid the need for the user to undo the effects of an unintended gesture and then start the gesture over again, which makes the user-device interface more efficient (e.g., by helping the user to provide required inputs to achieve an intended outcome and reducing user mistakes when operating/interacting with the device), which, additionally, reduces power usage and improves battery life of the device by enabling the user to use the device more quickly and efficiently.

Further, the embodiments below provide an intuitive way to permit edge protection against inadvertent triggering of a system operation that replaces a split-screen user interface displaying two applications with a system user interface, where edge protection is enabled on one or both of the applications independently. Permitting edge protection to be enabled independently for applications on either side of the split screen, while allowing a system operation that replaces the split-screen user interface as a whole to be replaced by a system user interface, enhances the operability of the device and makes the user-device interaction more efficient (e.g., by providing easy access to navigation functions of the device, by helping the user to achieve an intended outcome with fewer required inputs, and by providing additional control options without cluttering the user interface with additional displayed controls), and reduce user mistakes when operating the device (e.g., by selectively using enhanced gesture criteria to portions of the user interface to avoid inadvertent triggering of system operations), which, additionally, reduces power usage and improves the battery life of the device by enabling the user to use the device more quickly and efficiently.

Further, as described in the embodiments below, the system user interface element that is displayed on a split screen user interface and overlays two applications with distinct behaviors associated with the system user interface element takes on different appearances depending on the behaviors of the application underlying the system user interface element, as the applications are resized on the split screen user interface. The appearance of the system user interface element provides useful visual feedback to help the user provide the proper input to achieve a desired outcome and reduce user mistakes when operating with the device, thereby creating a more efficient human-machine interface. For battery-operated electronic devices, providing useful visual feedback and reducing user mistakes when navigating between user interfaces within and/or in and out of a split-screen display mode faster and more efficiently conserves power and increases the time between battery charges.

Figure 2:
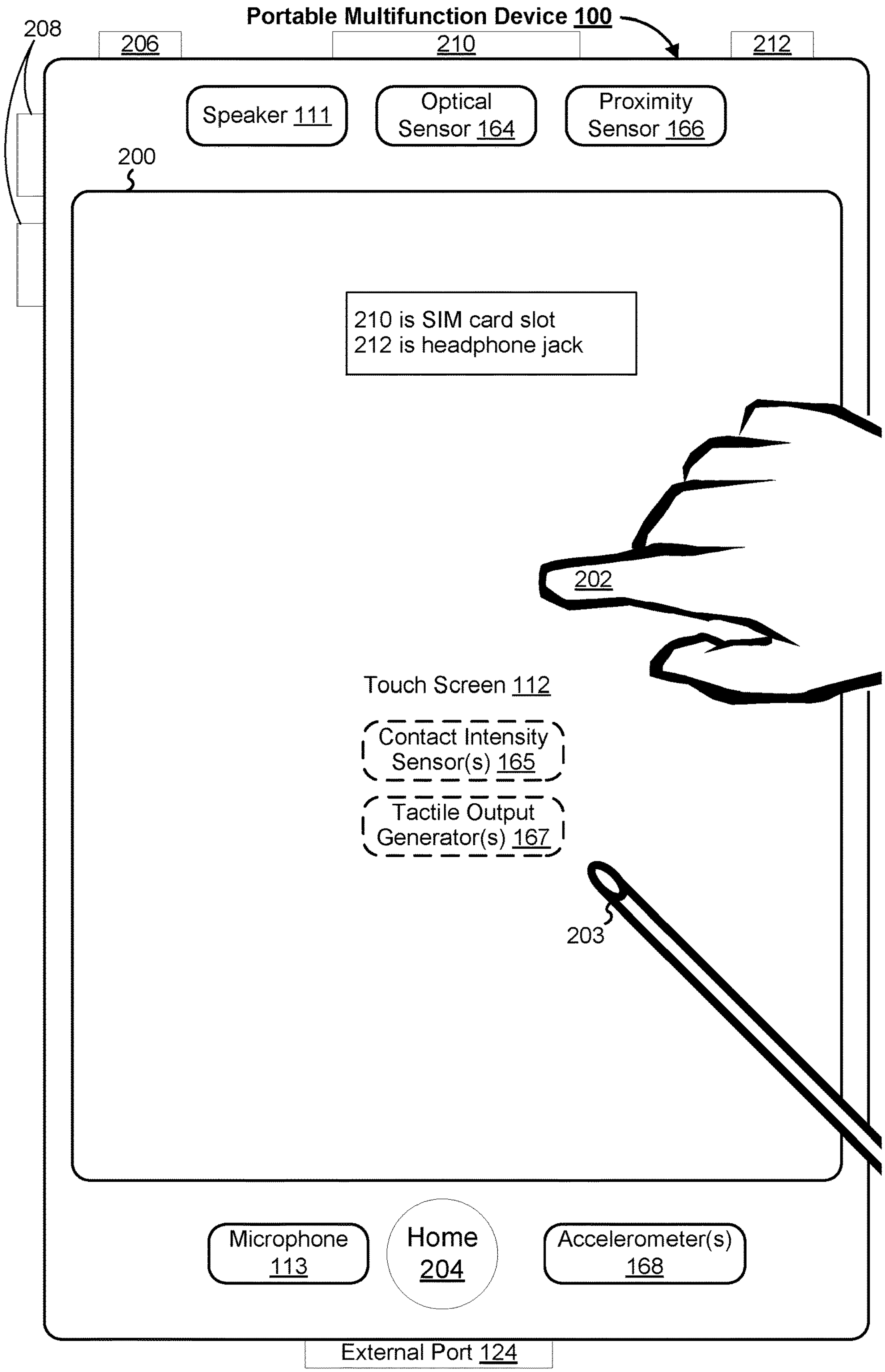
FIG. 2 illustrates a portable multifunction device having a touch screen in accordance with some embodiments.
Figure 3:
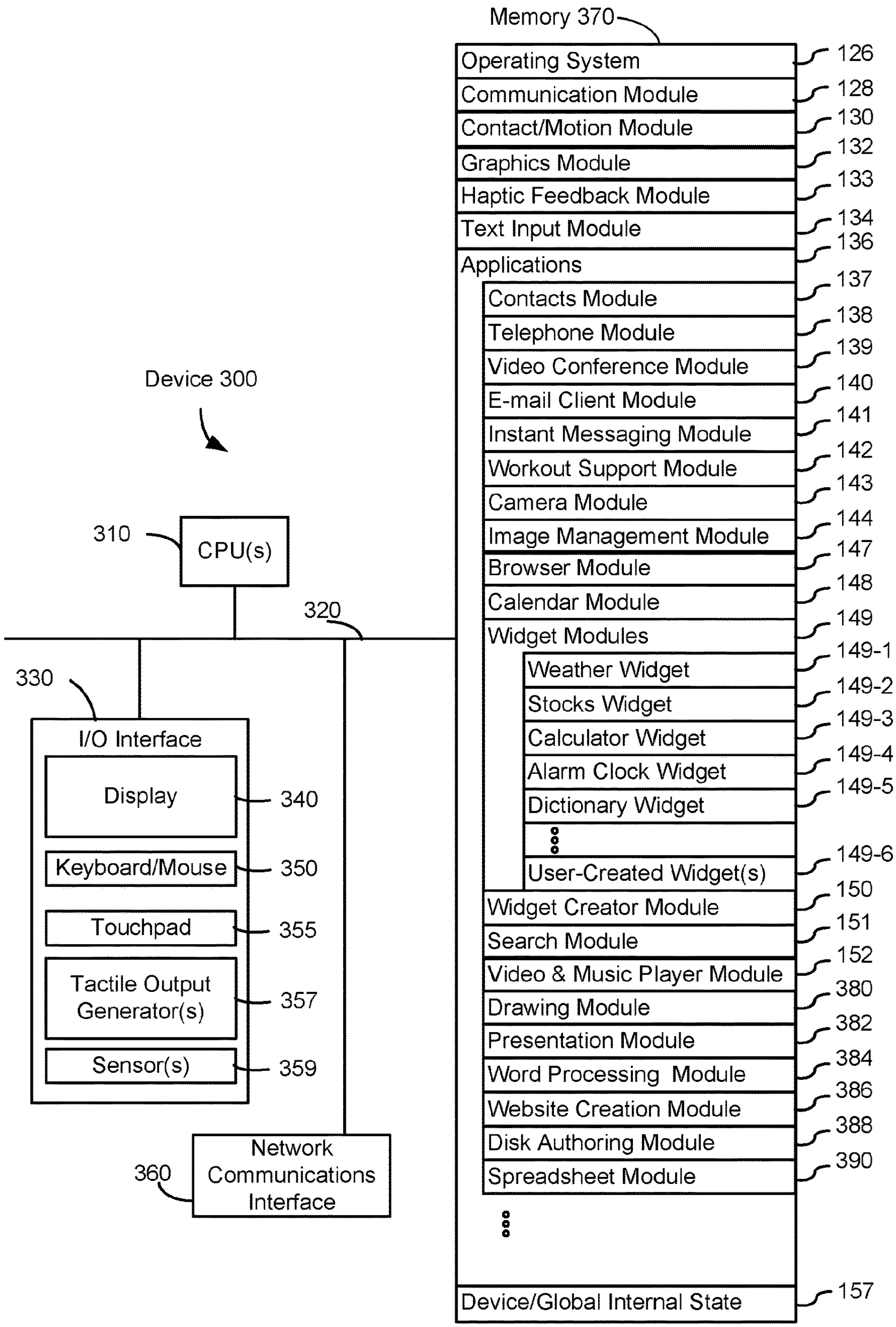
FIG. 3 is a block diagram of an example multifunction device with a display and a touch-sensitive surface in accordance with some embodiments.
Figure 8:
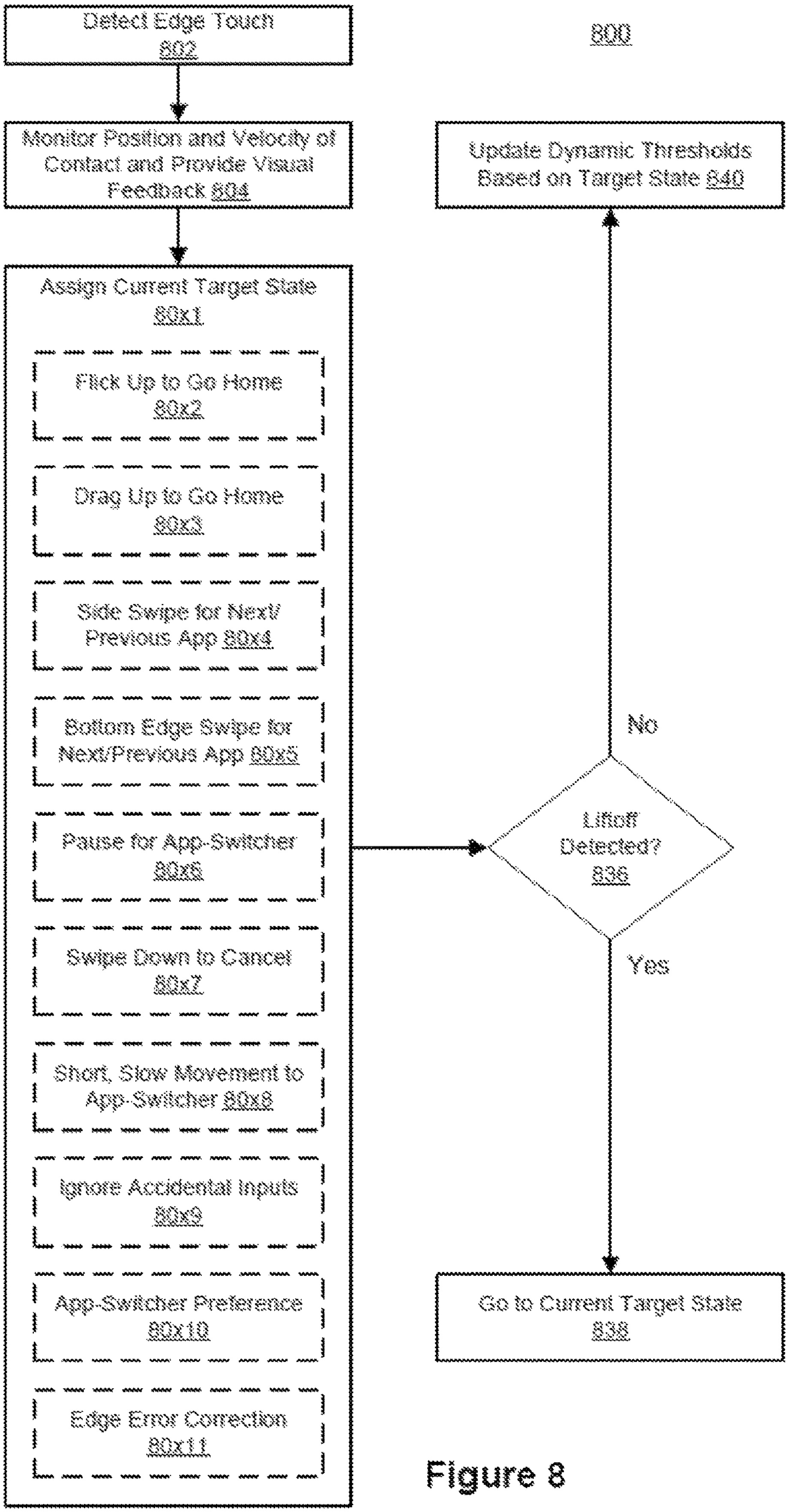
FIG. 8 is flow diagrams illustrating a method of navigating between application user interfaces, an application-switcher user interface, and a home screen user interface, in accordance with some embodiments.
Figure 9A:
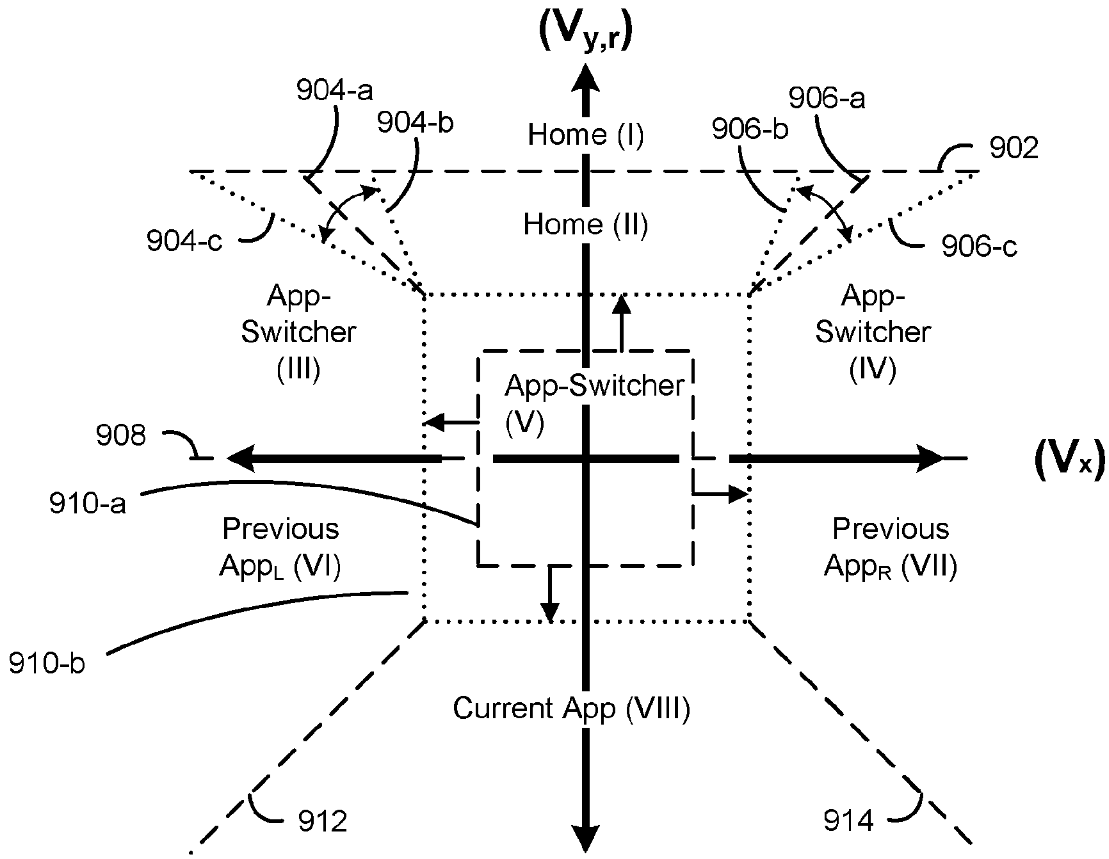
FIGS. 9A-9C illustrate example thresholds for navigating between different user interface, in accordance with some embodiments.
Figure 9B:
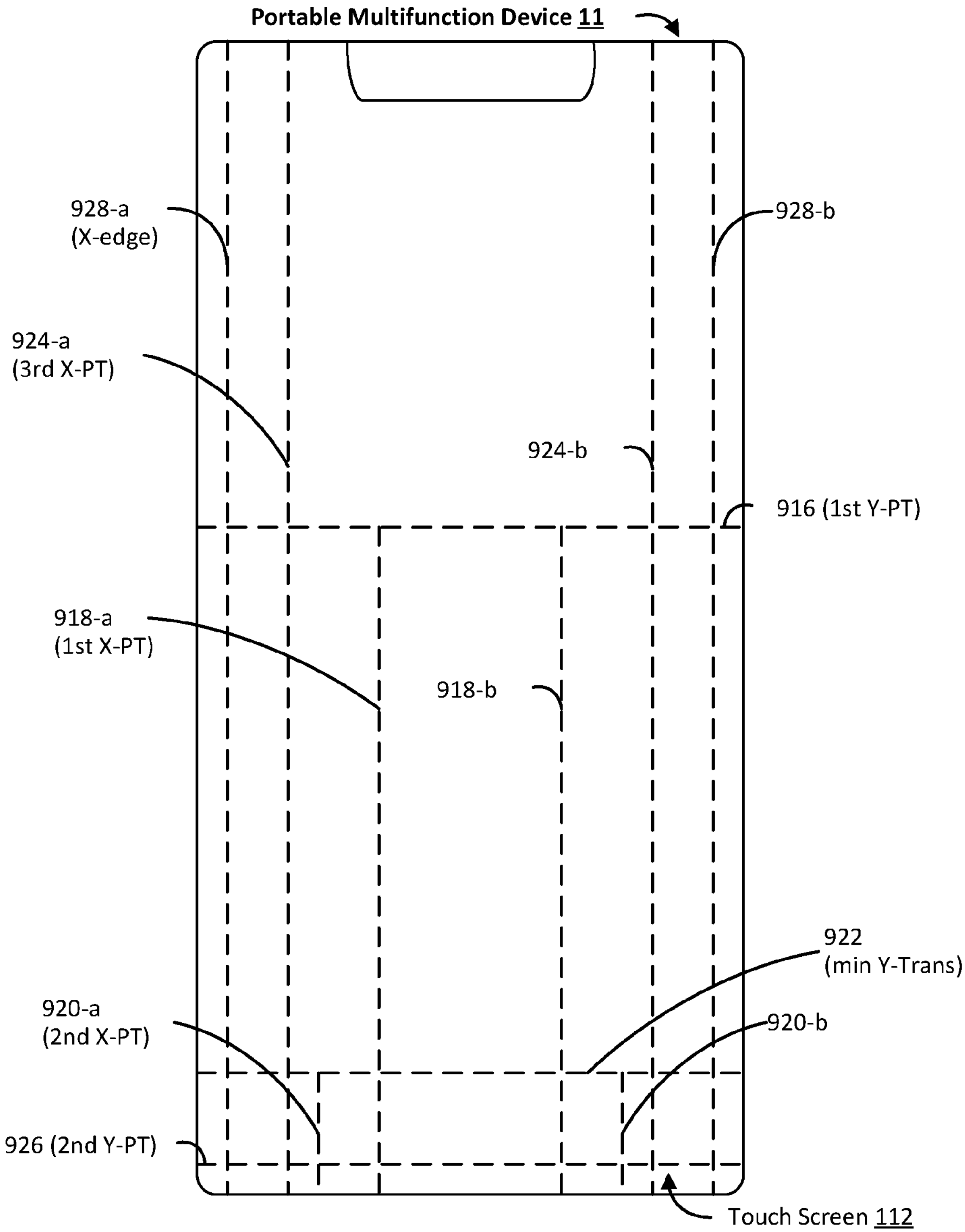
Figure 9C:
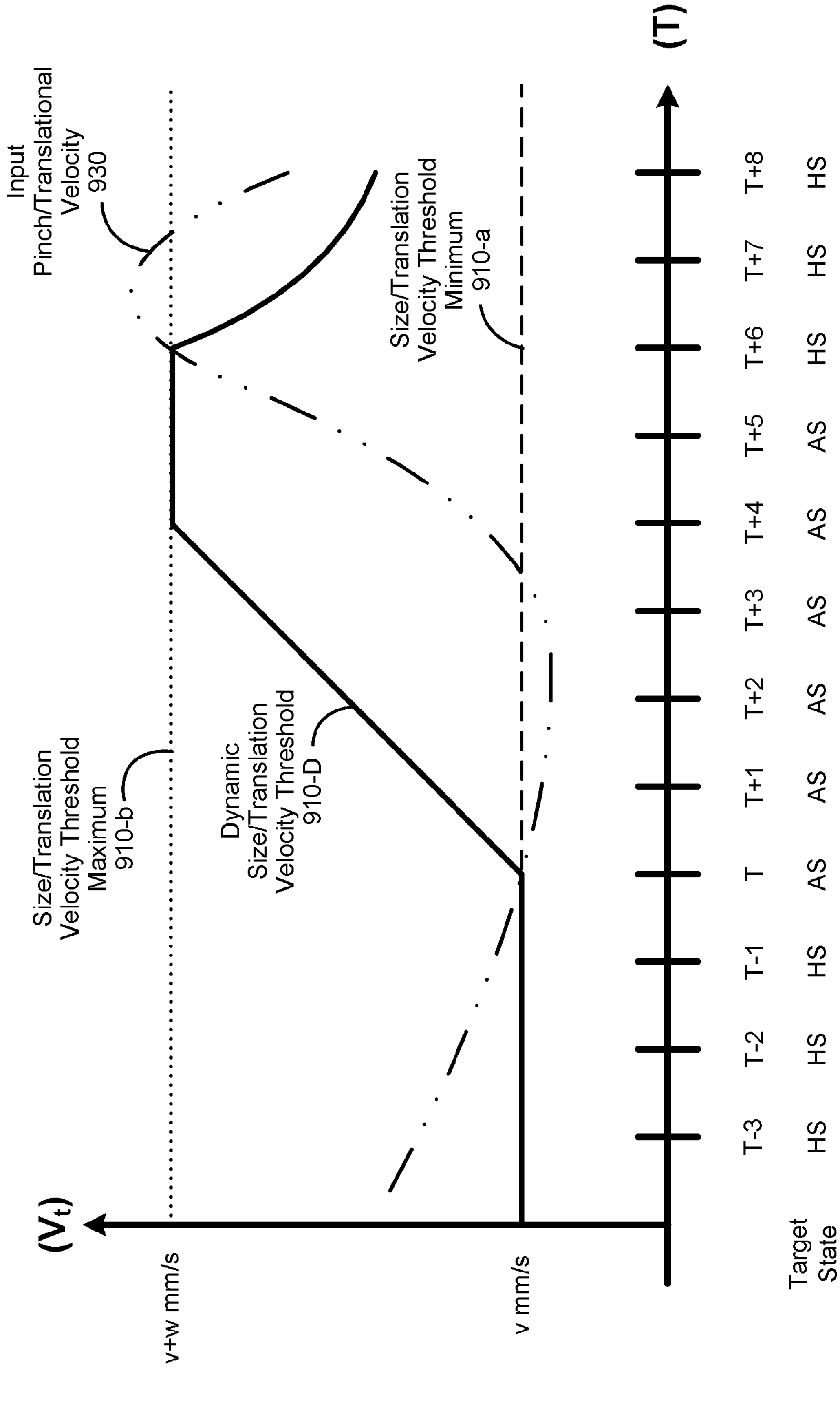

Below, FIGS. 1A-1B, 2, and 3 provide a description of example devices. FIGS. 4C-4E illustrate examples of dynamic intensity thresholds. FIGS. 4A-4B, 5A1-5A29, 5B1-5B36, 5C1-5C59, 5D1-5D99 illustrate example user interfaces for navigating between user interfaces, displaying a dock or performing an operation within an application, and displaying a system user interface element such as a home affordance. FIGS. 6A-6F illustrate a flow diagram of a method of displaying a dock with a plurality of application icons at a variable location along one or more edges of a touch-sensitive display. FIGS. 7A-7I illustrate a flow diagram of a method of navigating to different user interfaces from a user interface displayed in a split-screen display mode. FIGS. 11A-11F are flow diagrams of a process for navigating between user interfaces based on a multi-contact gesture. FIGS. 12A-12F are a flow diagram of a method of performing a system operation (e.g., navigating to different user interfaces outside of an application from an application user interface displayed in a split-screen display mode). FIGS. 13A-13E are flow diagram of a method of displaying a system user interface element (e.g., a home affordance) with different appearance states based on one or more behaviors of the application(s) underlying the system user interface element. The user interfaces in FIGS. 5A1-5A29, 5B1-5B36, 5C1-5C59, 5D1-5D99 are used to illustrate the processes in FIGS. 6A-6F, 7A-7I, 11A-11F, 12A-12F, and 13A-13E. FIG. 8 is a flow diagram illustrating various criteria used for navigating between user interfaces, in accordance with some embodiments. FIGS. 9A-9C illustrate example thresholds for navigating between different user interface. FIGS. 10A-10D are a flow diagram illustrating various criteria used for navigating between user interfaces, in accordance with some embodiments.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 (shown as device 11 in FIGS. 5D1-5D98) with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term “graphics” includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list); telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
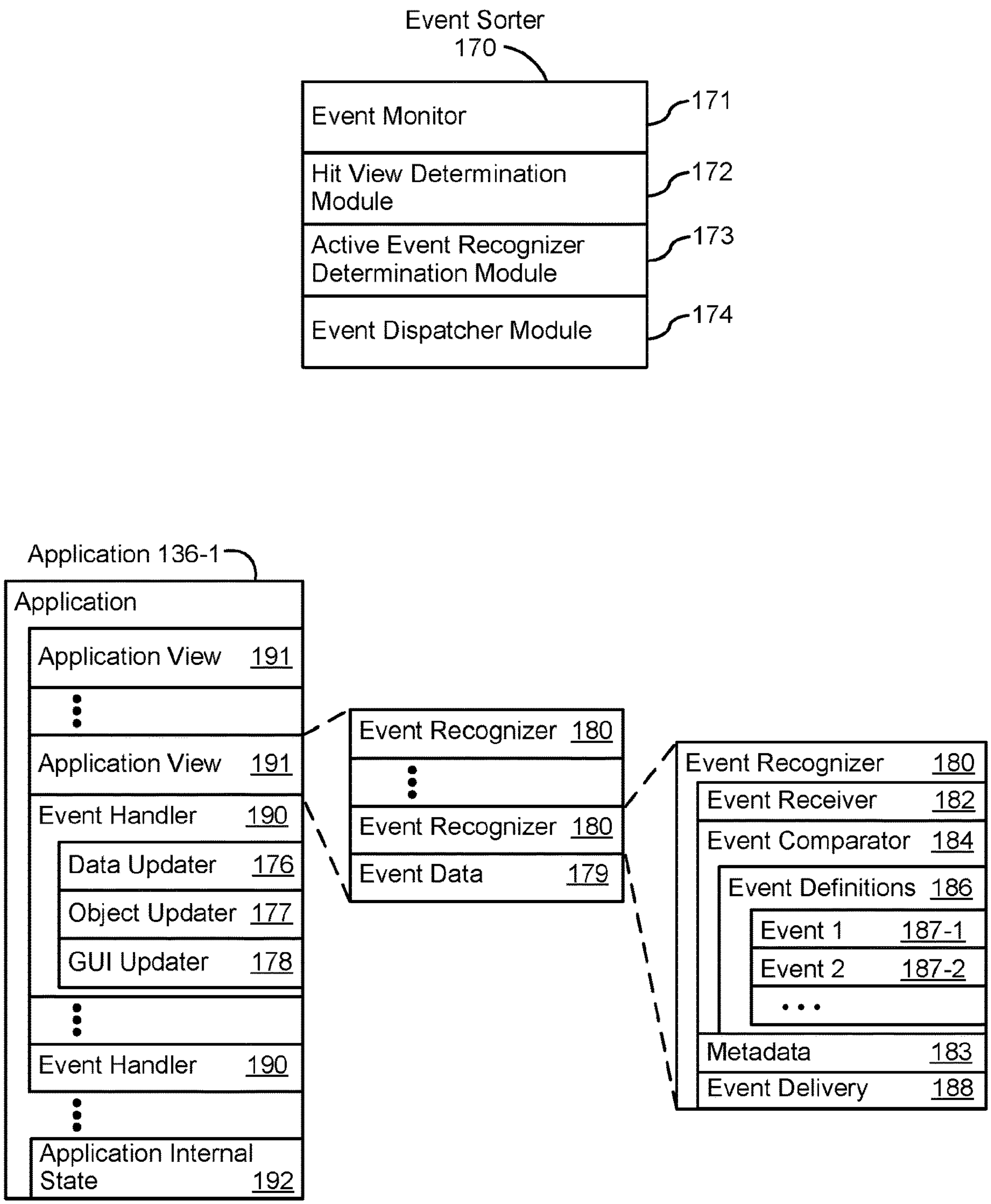
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
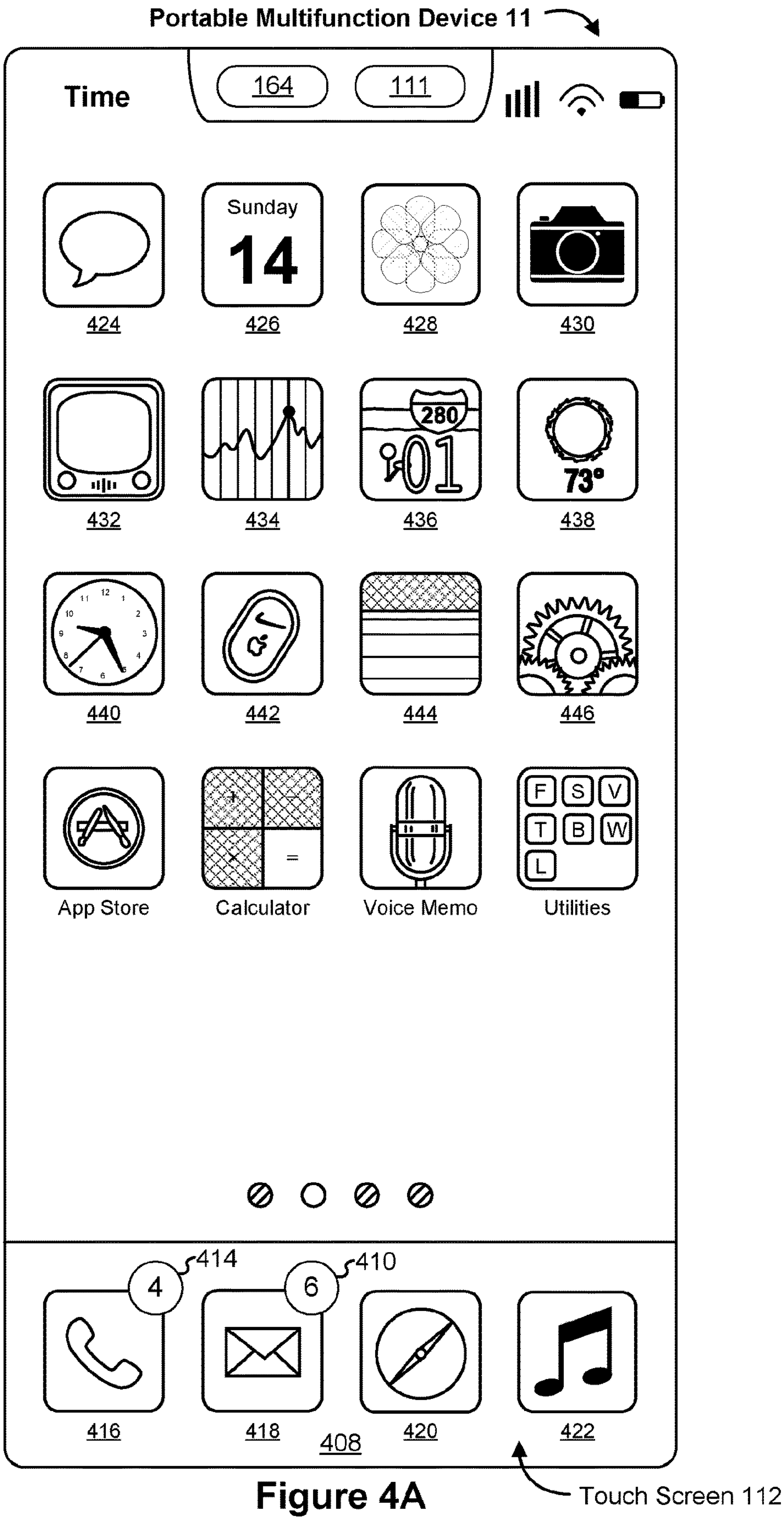
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, labeled "Music;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
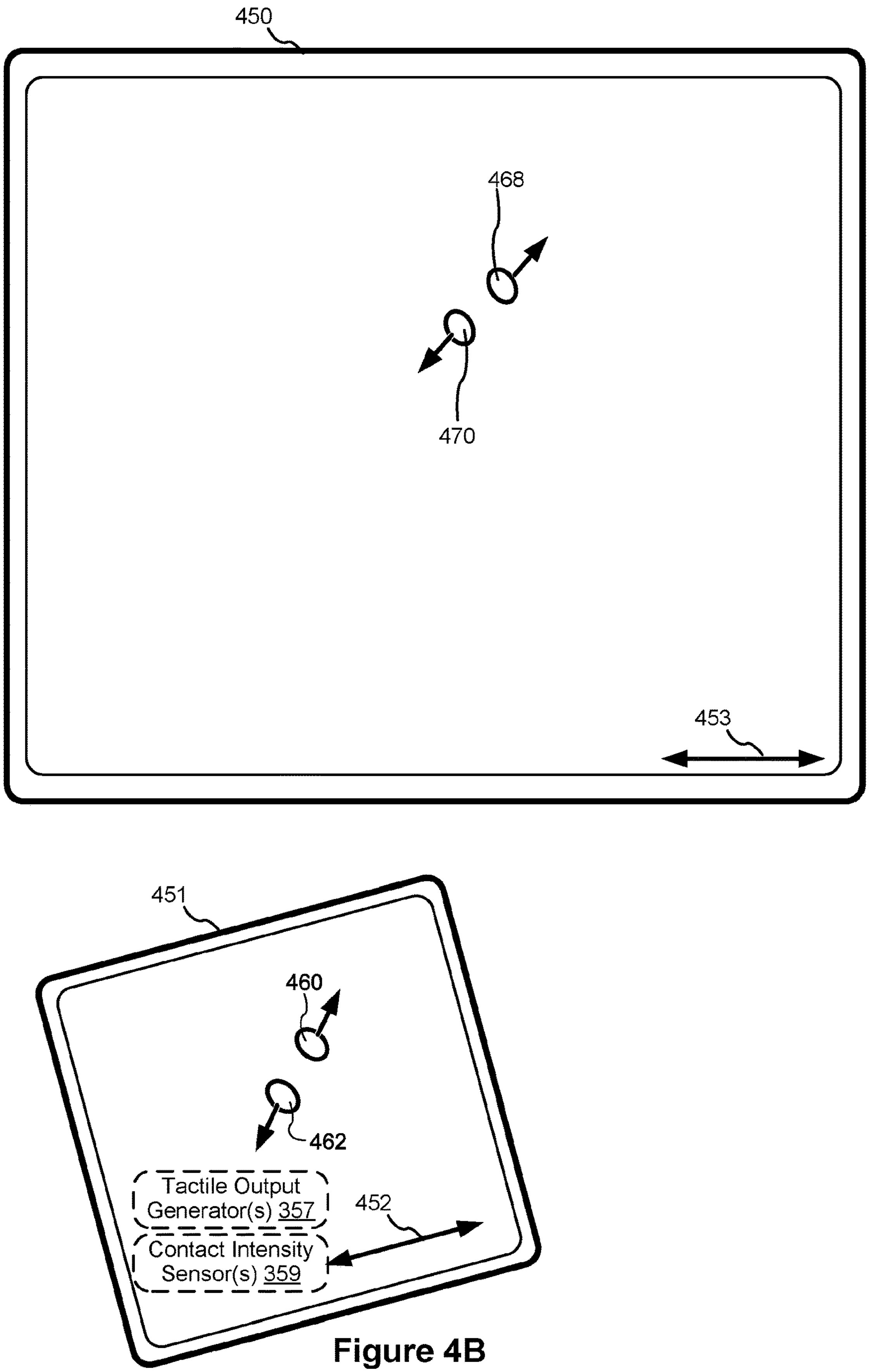
FIG. 4B illustrates an example user interface for a multifunction device with a touch-sensitive surface that is separate from the display in accordance with some embodiments.
Figure 4C:
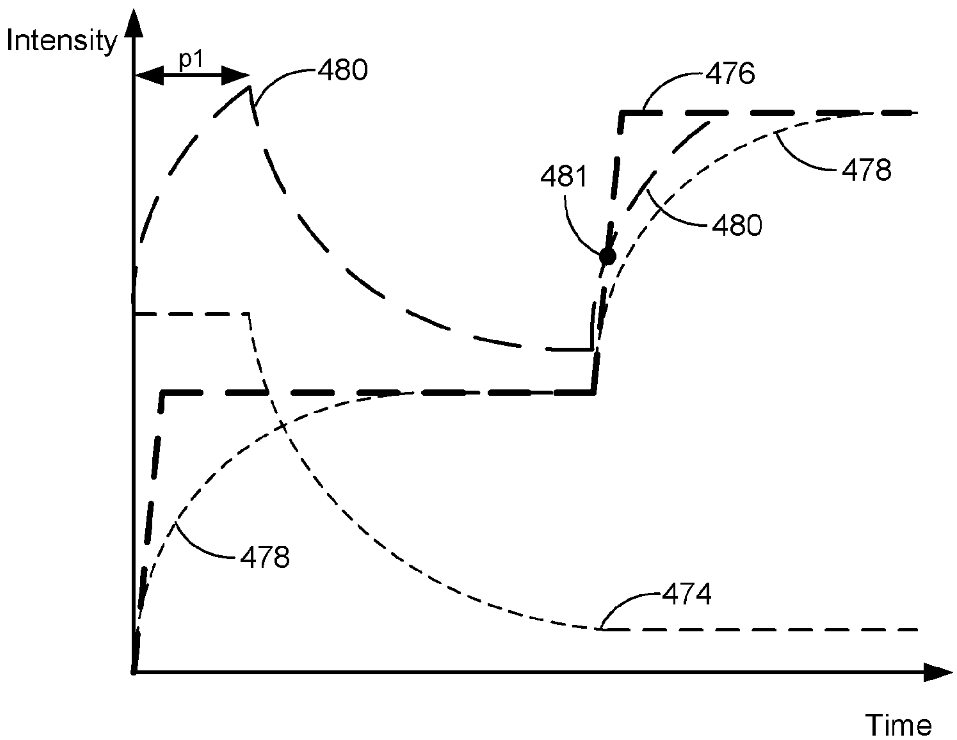
FIGS. 4C-4E illustrate examples of dynamic intensity thresholds in accordance with some embodiments.
Figure 4D:
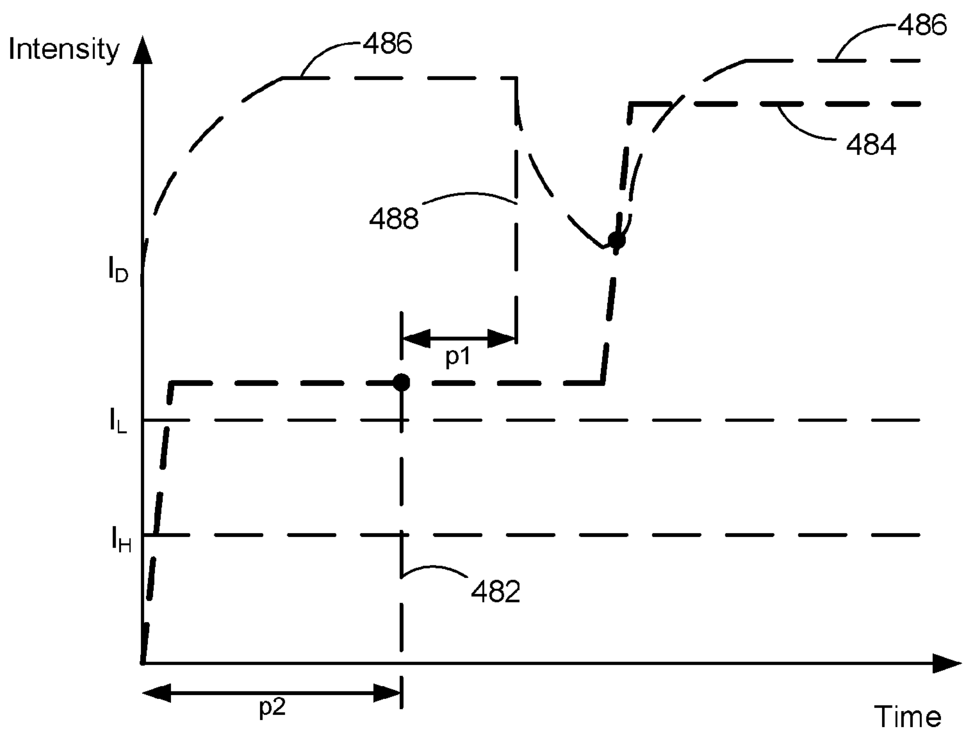
Figure 4E:
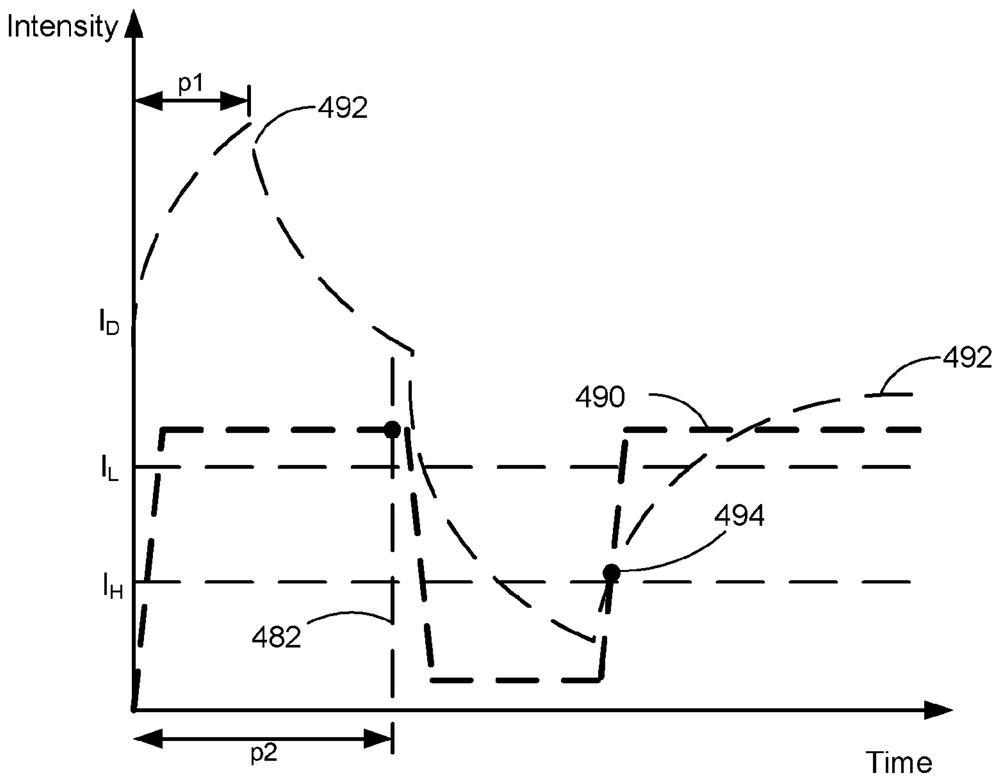
Figure 6C:
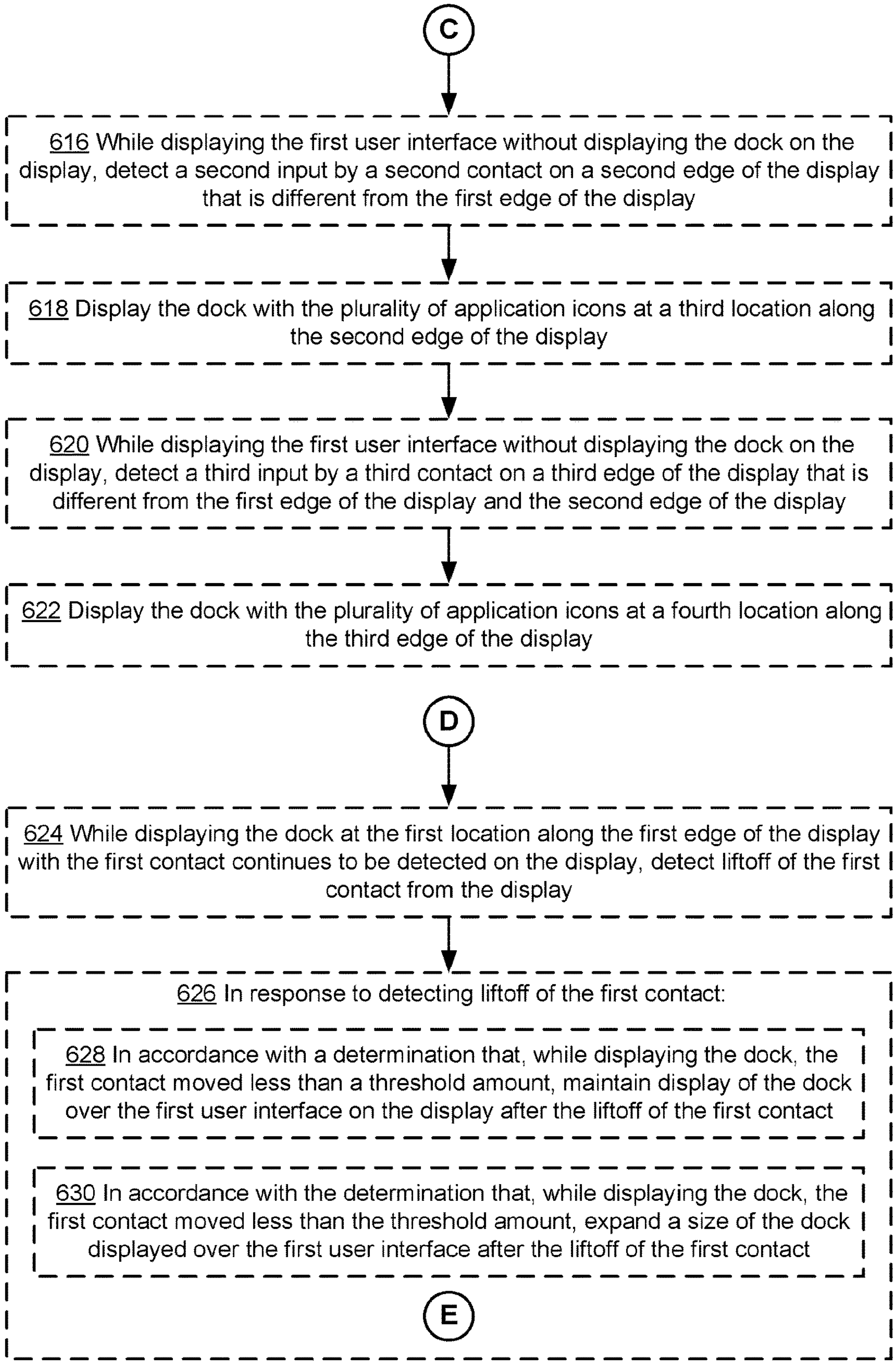
Figure 6F:
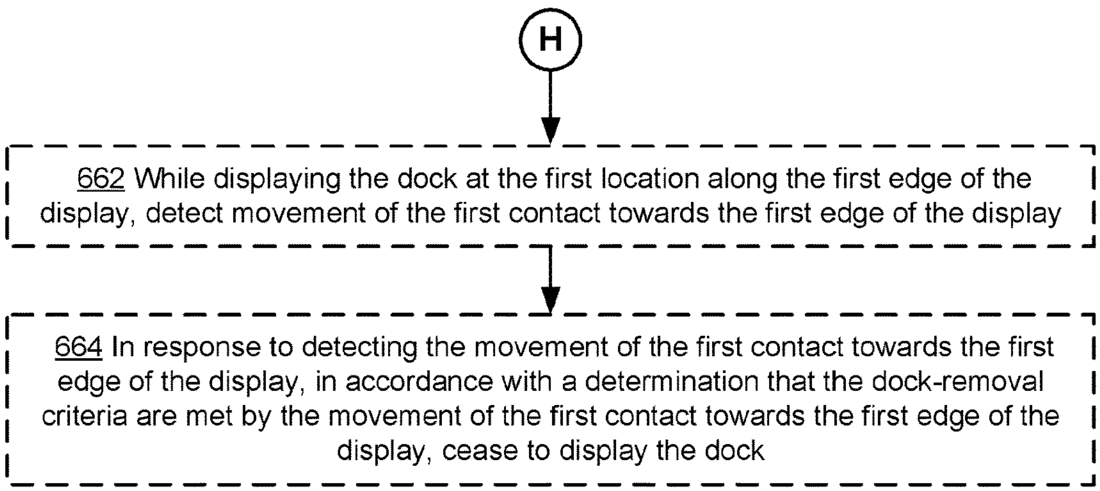
Figure 7B:
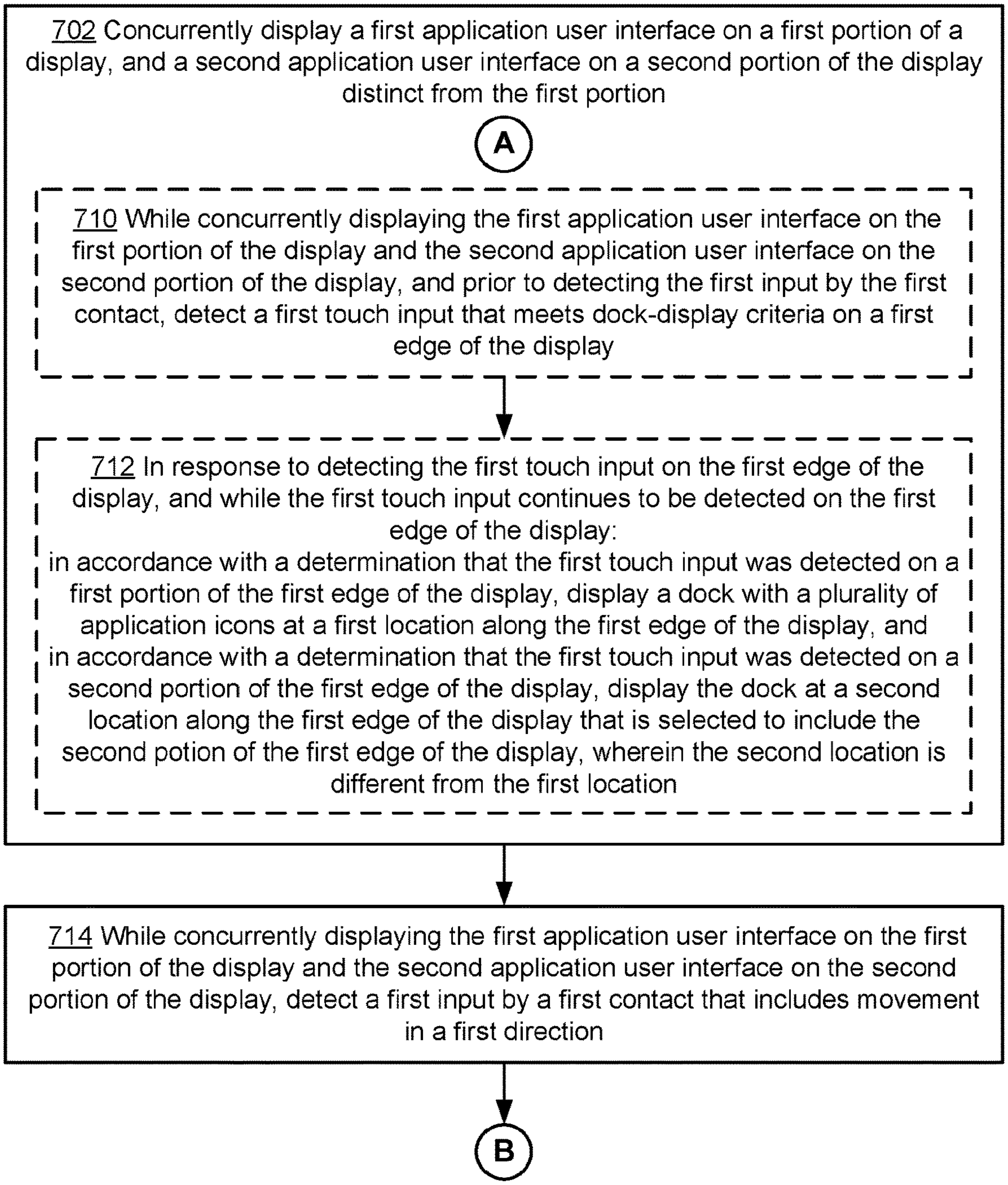
Figure 7G:
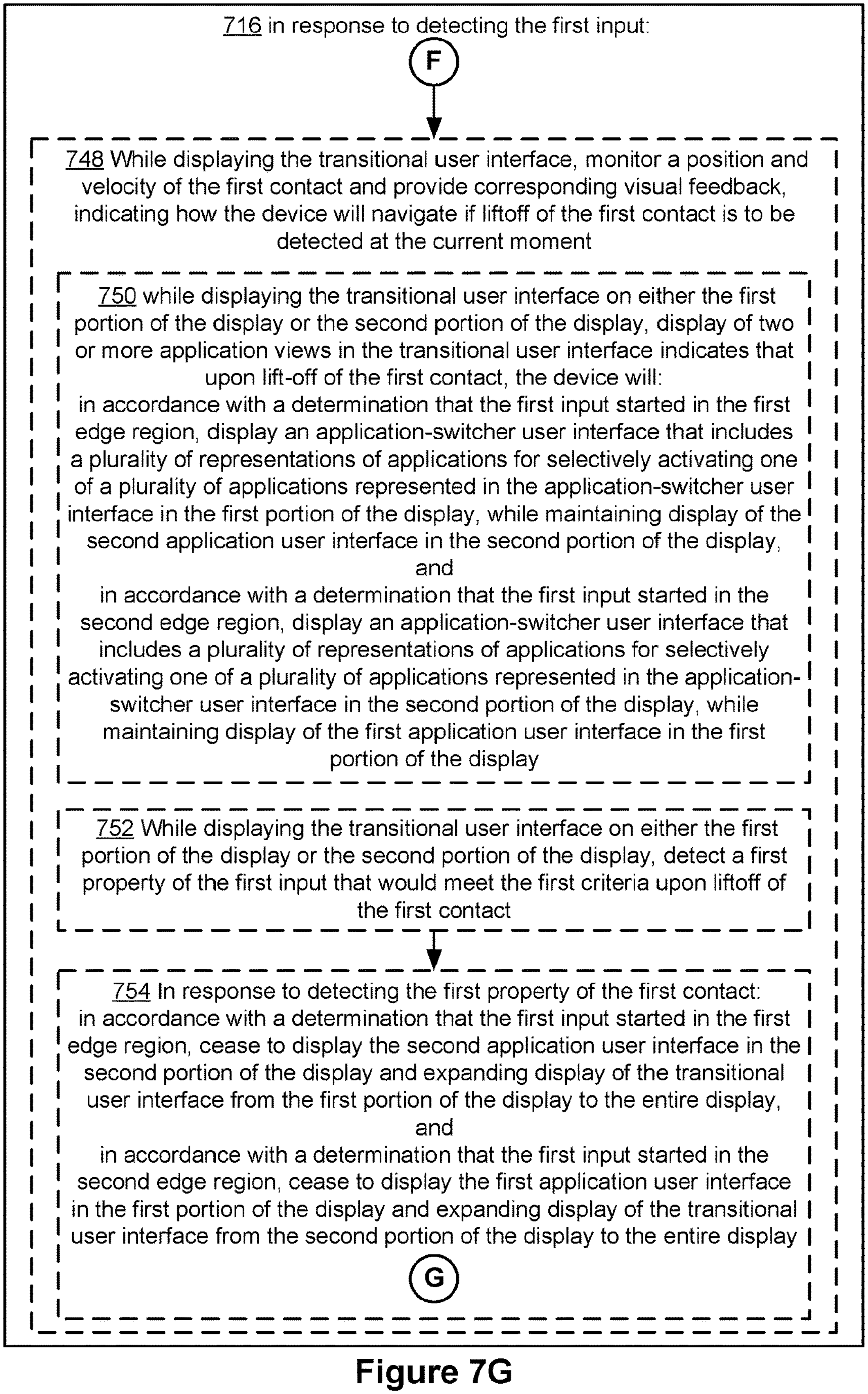
Figure 7H:
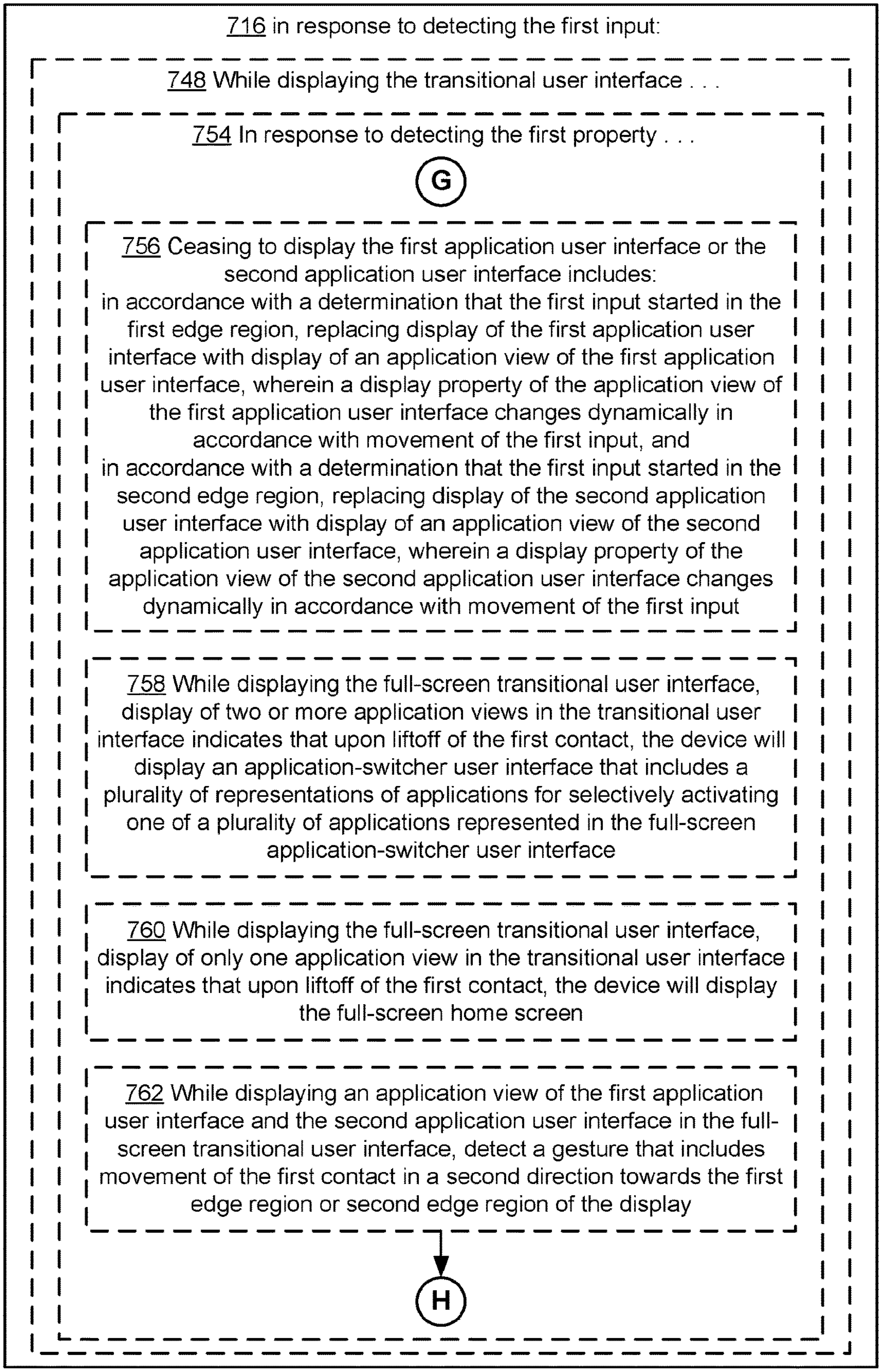

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A1-5A29 illustrate example user interfaces for displaying a dock with a plurality of application icons at a variable location along one or more edges of a touch-sensitive display, e.g., which allows the user to call-up and interact with a dock at a location proximal to their current hand position (e.g., without requiring significant shifting of the current hand position), in accordance with some embodiments. The user interfaces in these figures are used to illustrate the processes described below, including the processes in FIGS. 6A-6F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

For convenience of explanation, some of the embodiments will be discussed with reference to operations performed on a device without a home button, and a gesture meeting predefined criteria is used to cause dismissal of a currently displayed user interface and display of the home screen user interface. Although shown as optional in FIGS. 5A1-5A29, in some embodiments, a home button (e.g., a mechanical button, a solid state button, or a virtual button) is included on the device and is used to cause dismissal of a currently displayed user interface and display of the home screen user interface. (e.g., in response to a single press input) and/or display a multitasking user interface (e.g., in response to a double press input).

The home screen user interface includes a plurality of application icons corresponding to different applications installed on the device. Each application icon, when activated by a user (e.g., by a tap input), causes the device to a corresponding application and displays a user interface (e.g., a default initial user interface or a last displayed user interface) of the application on the display. A dock is a user interface object that includes a subset of application icons selected from the home screen user interface, to provide quick access to a small number of frequently used applications. The application icons included in the dock are optionally selected by the user (e.g., via a settings user interface), or automatically selected by the device based on various criteria (e.g., usage frequency or time since last use). In some embodiments, the dock is displayed as part of the home screen user interface (e.g., overlaying a bottom portion of the home screen user interface, as illustrated in FIG. 4A). In some embodiments, the dock is displayed over a portion of another user interface (e.g., an application user interface) independent of the home screen user interface, in response to a user request (e.g., a gesture that meets dock-display criteria). An application-switcher user interface displays representations of a plurality of recently open applications (e.g., arranged in an order based on the time that the applications were last displayed). The representation of a respective recently open application (e.g., a snapshot of a last displayed user interface of the respective recently open application), when selected (e.g., by a tap input), causes the device to redisplay the last-displayed user interface of the respective recently open application on the screen.

FIGS. 5A1-5A5 illustrate an example embodiment where the electronic device displays a dock at different positions along an edge of the device, dependent upon the position of the invoking input (e.g., an edge-long press). FIG. 5A1 illustrates an interactive map user interface, displayed in full-screen display mode. A long press gesture (e.g., contact 4202 is maintained at a fixed location (e.g., its touch-down location) with less than a threshold amount of movement for at least a threshold amount of time $TT_1$) detected at a location on the left-side of the bottom edge of the display (e.g., the bottom edge is defined relative to the current orientation of the interactive map user interface) causes display of dock 4204 at a corresponding location (e.g., centered under contact 4202) along the left-side of the bottom edge of the device, as illustrated in FIG. 5A1-FIG. 5A2. The dock remains displayed after liftoff of contact 4202, in FIG. 5A3, because the contact did not substantially move (e.g., remained substantially stationary) during the input. In contrast, a long-press gesture (e.g., by contact 4206) detected at a location on the right-side of the bottom edge of the display causes display of dock 4204 at a corresponding location (e.g., centered under contact 4206) along the right-side of the bottom edge of the device, as illustrated in FIGS. 5A4-5A5. The dock is displayed on the right-side of the bottom edge of the display in FIG. 5A5, as opposed to the left-side of the bottom edge as in FIG. 5A2, because the long-press input calling-up the dock is positioned on the right-hand side of the bottom edge, allowing the user to interact with the dock at a location that is easily and conveniently accessible to the user (e.g., without requiring the user to move their hand on the device to a preset position on the device). In some embodiments, instead of requiring a long-press gesture (e.g., requiring that a contact be maintained at a fixed location for at least a threshold amount of time $TT_1$, and optionally, with an intensity remaining below a first threshold intensity greater than the contact detection intensity threshold) in an edge region of the touch-screen to call up the dock, the device requires a light press gesture (e.g., requiring that an intensity of the contact to increase above the first threshold intensity greater than the contact detection intensity threshold, and optionally, without requiring the contact be maintained at a fixed location for at least the threshold amount of time $TT_1$) in an edge region of the touch-screen to call up the dock.

FIGS. 5A4-5A8 illustrate an example embodiment where a single input (e.g., a multi-portion input by a continuously maintained contact 4206) causes display of the dock and then navigation to an application user interface associated with an application icon displayed within the dock. FIG. 5A4 illustrates an interactive map user interface, displayed in full-screen display mode. A long-press gesture by contact 4206 at a location on the right-side of the bottom edge of the display causes display of dock 4204 at a corresponding location along the right-side of the bottom edge of the device (e.g., centered under contact 4206), as illustrated in FIGS. 5A4-5A5. Movement of the contact 4206 over email application icon 218 in dock 4204 selects the icon, which is displayed larger in FIG. 5A6 as a result of being selected. Liftoff of contact 4206 while the email application icon 218 is selected causes navigation to an email user interface, as illustrated in FIGS. 5A7-5A8. As shown in FIGS. 5A7-5A8, display of the email user interface is animated, appearing to grow out of the selected email application icon 218, covering the interactive map user interface. After navigation to the email user interface, the dock disappears, in FIGS. 5A7-5A8, because the input that called-up the dock moved and caused a navigation event. If Liftoff of contact 4206 were not detected when contact 4206 moved past email application icon 218, and movement of contact 4206 continued to a location corresponding to the telephone application icon 216 in the dock, the email application icon ceases to be selected and the telephone application icon becomes selected. If Liftoff of contact 4206 is detected when contact 4206 has moved off dock 4204, the device optionally ceases to display the dock while maintaining display of the interactive map user interface.

FIGS. 5A9-5A10 illustrate an example embodiment where a long-press input on a different edge of the device also causes display of the dock at a position near the input. FIG. 5A9 illustrates an email user interface. A long-press gesture (e.g., by contact 4208) detected at a location on the lower half of the left edge of the device causes display of dock 4204 at a corresponding location along the lower half of the left edge of the device (e.g., centered under contact 4206), as illustrated in FIGS. 5A9-5A10. As compared to FIGS. 5A2 and 5A5, the dock is displayed on a different edge of the device in FIG. 5A10 because the long-press input invoking display was located on the different edge. Also, the dock is displayed in a different orientation, as compared to FIGS. 5A2 and 5A5, because it is displayed along a vertical edge, rather than a horizontal edge, of the device.

FIGS. 5A9-5A12 illustrate an example embodiment where display of the dock is canceled by liftoff of the invoking contact 4208, despite that a navigation event did not occur as a result of the input. FIG. 5A9 illustrates an email user interface. A long-press gesture on the lower half of the left edge of the device, including contact 4208 over the MobileFinder email header in FIG. 5A9, causes display of dock 4204 along the bottom half of the left edge of the device, under contact 4206, in FIG. 5A10. The dock disappears after liftoff of the contact, in FIG. 5A12, because the contact moved away from the dock in FIGS. 5A10-5A11, e.g., the contact was not positioned over the dock when liftoff occurred.

FIGS. 5A13-5A14 illustrate an example embodiment where a gesture (e.g., a tap or a light-press) detected in an edge region of the touch-screen causes an operation within the displayed application user interface, rather than causing display of a dock, because the gesture did not meet the long-press criteria (e.g., lift-off of the contact was detected before the contact had been maintained for at least a threshold amount of time without substantial movement). FIG. 5A13 illustrates an email user interface. A tap gesture or light press gesture on the lower half of the left edge of the device, including contact 4209 over the MobileFinder email header in FIG. 5A13, causes selection/display of the MobileFinder email in FIG. 5A14, rather than display of the dock, as in FIG. 5A12, because the temporal threshold (e.g., $TT_1$) required to invoke the system-wide dock display operation (and preempt the corresponding email application-specific email selection/display operation) was not met prior to liftoff of the contact.

FIGS. 5A15-5A18 illustrate an example embodiment where swiping-down hides the dock. FIG. 5A15 illustrates an interactive map user interface, displayed in full-screen display mode. A long-press gesture on the right-side of the bottom edge of the display, including contact 4212 in FIG. 5A15, causes display of dock 4204 along the right-side of the bottom edge of the device, under contact 4212, in FIG. 5A13. Downward movement of the contact, in FIG. 5A17, causes the dock to slide off the bottom edge of the display. The dock disappears after liftoff of the contact, in FIG. 5A18, because the contact pushed the dock off the display in FIGS. 5A16-5A17. In FIG. 5A16, the dock is displayed at a location under contact 4212, but not centered under contact 4212, because the location of the contact is close to an adjacent vertical edge of the display (e.g., the right edge of the display). In this case, the dock is displayed abutting the adjacent vertical edge of the display.

FIGS. 5A19-5A21 illustrate an example embodiment where liftoff of the contact causes the dock to expand and move to a predefined position on the display. FIG. 5A19 illustrates an interactive map user interface, displayed in full-screen display mode. A long press gesture on the left-side of the bottom edge of the display, including contact 4216 in FIG. 5A19, causes display of dock 4204 along the left-side of the bottom edge of the device, under contact 4216, in FIG. 5A20. After liftoff of contact 4216, the dock moves from position 4204-*a*, in FIG. 5A20, to predefined position 4204-*b* in the middle of the bottom edge of the display, in FIG. 5A21. The dock also expands when displayed at the predefined position, as compared to display at a position defined by the invoking input.

FIGS. 5A22-5A23 illustrate an example embodiment where the dock is displayed at a default position when the long-press gesture is located too close to the end of the edge of the display. FIG. 5A22 illustrates an interactive map user interface, displayed in full-screen display mode. A long press gesture on the right-side of the bottom edge of the display, including contact 4218 in FIG. 5A22, causes display of dock 4204 at a default position near the right end of the bottom edge of the display, under but not centered on contact 4218, in FIG. 5A23, because not all of the dock would be shown on the display if it were centered on contact 4218 (e.g., the right-hand portion of the dock would be off of the display to the right).

FIGS. 5A22-5A27 illustrate an example embodiment where a single gesture initiated from an edge of the display causes display of an application in split-screen display mode. FIG. 5A22 illustrates an interactive map user interface, displayed in full-screen display mode. A long press gesture on the right-side of the bottom edge of the display, including contact 4218 in FIG. 5A22, causes display of dock 4204 at a default position near the right end of the bottom edge of the display, under but not centered on contact 4218, in FIG. 5A23. Movement of the contact over email application icon 218 selects the icon, which is displayed larger in FIG. 5A24 as a result of being selected. Movement of the contact away from the edge of the display in the upward direction, while the email application icon is selected, moves the icon out of the dock, in FIG. 5A25, where the icon is displayed larger as a result of being moved out of the dock and indicating that the corresponding application will be launched upon liftoff of contact 4218. Further movement of the contact past boundary 4223 (e.g., an invisible boundary, or a boundary that is temporarily displayed in response to detecting the upward and rightward movement of icon 218 outside of the dock), in FIG. 5A26, causes the icon to transition into a view of the email user interface, indicating that the email application will be launched in split-screen display mode (e.g., displayed side-by-side with the interactive map user interface) upon liftoff of the contact. Liftoff of contact 4218, in FIG. 5A27, causes the device to switch from full-screen display mode to split-screen display mode, displaying a user interface for the email application on the right portion of the display, and the interactive map user interface on the left portion of the display. The email application user interface is displayed in split-screen mode because the icon was dragged off the dock before liftoff of the contact, in contrast to FIG. 5A8, where the email user interface is displayed in full-screen display mode because liftoff of the contact occurred while the email icon was selected within the dock, in FIGS. 5A6-5A7.

FIGS. 5A28-5A29 illustrate an example embodiment where a gesture initiated at the edge of the display results in navigation to a transitional navigation state, rather than display of a dock, because the contact moved away from the edge of the display prior to meeting temporal requirements for a long-press gesture. FIG. 5A28 illustrates an interactive map user interface, displayed in full-screen display mode. A user interface selection process is activated by movement of contact 5222 upwards from the bottom edge of the display, in FIG. 5A29, because the contact moved a sufficient amount prior to satisfying the long-press criteria. In contrast, a dock was displayed in FIG. 5A23 because long-press criteria were met before contact 4218 began substantial movement. In FIG. 5A29, the interactive map user interface is replaced by (e.g., transitions into) card 4014 that represents the interactive map user interface. After the user interface selection process is activated, e.g., as shown in FIG. 5A29, the device chooses between multiple possible target user interfaces (e.g., a user interface of a previously displayed application, an application switcher user interface, or a home screen user interface) depending on which user interface state is the currently selected target user interface state at the time when lift-off of the contact is detected. The target user interface state is dynamically selected and facilitates navigation into different user interfaces (e.g., a recently open application, a home screen user interface, and an application-switcher user interface) based on different criteria (e.g., different criteria based on position, timing, movement parameters, of the contact and/or user interface objects that are displayed). In addition, real-time visual feedback is provided to indicate which user interface the user is navigating towards, while moving the contact on the touch-screen. The respective criteria for navigating to different user interfaces are described with respect to FIG. 8, for example.

In some embodiments, when the currently displayed user interface is displayed in a full-screen display mode (e.g., as shown in FIGS. 5A28-5A29), the device follows a first set of criteria for navigating to different user interfaces in the full-screen display mode; and when the currently displayed user interface is displayed in a split-screen display mode, the device follows a second set of criteria for navigating to different user interfaces in the split-screen display mode (e.g., navigating to a recently open application user interface, or an application-switcher user interface in a sub-portion of the split screen) or navigating to different user interfaces in the full-screen display mode (e.g., an application-switcher user interface that includes the split-screen user interface as a single selectable user interface, an application-switcher user interface that includes the application user interfaces in the split-screen user interface as separate selectable user interfaces, or a home screen user interface). More details regarding the navigation to different user interfaces (e.g., including different full-screen user interfaces and different user interface configurations in a split-screen user interface (e.g., different combinations of user interfaces in the split-screen user interface)) are provided below with respect to FIGS. 5B1-5B36 and flowchart FIGS. 7A-7I, for example.

FIGS. 5B1-5B36 illustrate example user interfaces for navigating to different user interfaces from a user interface displayed in a split-screen display mode, in accordance with some embodiments.

The user interfaces in these figures are used to illustrate the processes described below, including the processes in FIGS. 7A-7I. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

For convenience of explanation, some of the embodiments will be discussed with reference to operations performed on a device without a home button, and a gesture meeting predefined criteria is used to cause dismissal of a currently displayed user interface and display of the home screen user interface. Although shown as optional in FIGS. 5B1-5B36, in some embodiments, a home button (e.g., a mechanical button, a solid state button, or a virtual button) is included on the device and is used to cause dismissal of a currently displayed user interface and display of the home screen user interface. (e.g., in response to a single press input) and/or display a multitasking user interface (e.g., in response to a double press input).

The example user interfaces illustrated in FIGS. 5B1-5B36 relate to methods for efficiently navigating between multiple user interfaces, e.g., quickly switching between different applications and system user interfaces, in a split-screen display mode on an electronic device, in accordance with some embodiments. An example user interface for the user interface selection process includes an application-switcher user interface that includes representations of multiple user interfaces for applications (e.g., recently opened applications, a currently displayed application, and, optionally, a system control panel) associated with the electronic device displayed as a virtual stack of cards (e.g., the "stack"), where each card in the stack represents a user interface for a different application. The cards are also referred to herein as "application views," when corresponding to a user interface for a recently open application, or as a "control panel view," when corresponding to a user interface for a control panel). User inputs (e.g., contacts, swipe/drag gestures, flick gestures, etc.) detected on touch screen 112 (e.g., a touch-sensitive surface) are used to display the application dock overlaid on a currently displayed user interface and navigate between different user interfaces that can be selected for display on the screen. In some embodiments, the home screen user interface is optionally displayed as a "card" in the virtual stack of cards. In some embodiments, the home screen user interface is displayed in a display layer underlying the stack of cards.

While the device displays a user interface (e.g., a user interface for an application), a gesture beginning at the bottom of the screen (e.g., within a predefined region of the device that is proximate to the edge of the display (e.g., an edge region that includes a predefined portion (e.g., 20 pixels wide) of the display near the bottom edge of the device) invokes the user interface selection process (e.g., displays a transitional navigation user interface), and directs navigation between multiple user interfaces based on the speed and direction of the input, and, optionally, based on movement parameters and characteristics of user interface objects (e.g., the cards) that are currently displayed. The device replaces display of the current user interface with a card representing that user interface (e.g., in some embodiments, the user interface appears to shrink into a card in accordance with movement of the input). The user has the option to use different gestures to (i) navigate to a full-screen home screen, (ii) navigate to an application displayed on the screen (e.g., on either portion of the split-screen display) immediately prior to the user interface that was displayed when the user interface selection process was invoked, (iii) navigate to a split-screen application-switcher user interface that allows the user to select from applications previously displayed on the screen (e.g., for display on a portion of the display operating in split-screen mode, (iv) navigate to a full-screen application-switcher user interface that allows the user to select from application previously displayed on the screen (e.g., for display in either a full-screen display mode or a split screen display mode, or (v) navigate back to the user interface that was displayed when the user interface selection process was invoked (e.g., in a split-screen display mode), in accordance with some embodiments. During the input, the device provides dynamic visual feedback indicating what navigation choice will be made upon termination of the input, facilitating effective user navigation between multiple choices. In some embodiments, the visual feedback and user interface response is fluid and reversible. In some embodiments, the user also has the option to navigate to a control panel user interface using the gesture. In other embodiments, a different input (e.g., initiating from a different edge of the display) is required to navigate to a control panel user interface. In some embodiments, the user also has the option to display a dock with a plurality of application icons over a displayed user interface.

FIGS. 5B1-5B9 illustrate an example split-screen user interface where the user interface on one portion of the display can be changed through an application-switcher user interface displayed in split-screen display mode. FIG. 5B1 illustrates an interactive map user interface displayed in a left portion of a display operating in a split-screen display mode and an email user interface simultaneously displayed in a right portion of the display. Home affordances 4400 are displayed in both portions of the display, overlaid on the corresponding user interfaces, indicating that an input directing navigation can be initiated on either portion of the display (e.g., for navigation within just that portion of the display or for navigation to a full-screen user interface). After activation of a user interface selection process by movement of contact 4402 upwards from the left side of the bottom edge of the display, in FIG. 5B2, the interactive map user interface is replaced by (e.g., transitions into) card 4014 that represents the interactive map user interface. However, display of the email user interface is maintained in the right portion of the display because the transitional navigation state was only initiated in the left portion of the display. When contact 4402 moves upward past a threshold position on the screen, second card 406 that represents a web browser user interface is also partially displayed (e.g., slid in from the left edge of the display) in the left portion of the display, indicating that navigation would proceed to a split-screen application-switcher user interface if the contact was lifted-off at that point in time. The criteria for navigating to the split-screen application switcher user interface on the left portion of the display are optionally determined dynamically based on a movement parameter (e.g., position, speed, path, etc., or a combination thereof) and movement history of contact 4402. Upon liftoff of contact 4402, in FIG. 5B3, the device navigates to an application-switcher user interface in the left portion of the display, in FIG. 5B4. The device animates the transition by appearing to slide cards representing previously displayed user interfaces under each other, from the left side of the display, forming a stack of previously displayed user interfaces. A swipe gesture, beginning in FIG. 5B5, navigates through the stack of cards, revealing web browsing card 4406, in FIGS. 5B6 and 5B7 Selection of web browsing card 4406 using a tap gesture, in FIG. 5B8, results in display of a user interface for the web browsing application on the left side of the display, in FIG. 5B9. The email user interface remains displayed in the right portion of the display, in FIG. 5B9, because the navigation actions operated only on the user interfaces displayed in the left portion of the display.

FIGS. 5B1-5B12 illustrate an example split-screen user interface where navigation occurs within one portion of a split-screen display (e.g., instead of within another portion of the display or instead of within the full display), because the transitional navigation gesture started from the bottom edge of that portion of the display (e.g., instead of starting from the bottom edge of the other portion of the display). FIG. 5B1 illustrates an interactive map user interface displayed in a left portion of a display operating in a split-screen display mode and an email user interface simultaneously displayed in a right portion of the display. When an upward swipe gesture starts from the bottom edge of the left portion of the display, as illustrated in FIG. 5B1, a user interface selection process is activated on the left portion of the screen, as illustrated by the transitional navigation user interface displayed on the left portion of the display in FIG. 5B2. In contrast, when an upward swipe gesture starts from the bottom edge of the right portion of the display, as illustrated in FIG. 5B10, a user interface selection process is activated on the right portion of the screen, as illustrated by the transitional navigation user interface displayed on the right portion of the display in FIG. 5B11. In both instances, the user interface displayed on the opposite portion of the display is maintained while navigation occurs on the portion of the display in which the gesture was initiated (e.g., the email user interface remains displayed on the right portion of the display when navigation to an application-switcher user interface and then a web browsing user interface occurs on the left portion of the display in FIGS. 5B2-5B9; likewise, the web browsing user interface remains displayed on the left portion of the display when navigation to the application-switcher user interface occurs on the right portion of the display in FIGS. 5B10-5B12.

In the examples shown in FIGS. 5B1-5B12, the edge-swipe gestures started on either side of the split-screen met the criteria for navigating to a split-screen application-switcher user interface on a respective side of the split-screen, but did not meet the criteria for navigating to a full-screen application-switcher user interface.

FIGS. 5B13-5B17 illustrate an example process in which the device navigates from a user interface displayed in a split-screen display mode to a full-screen application-switcher user interface (e.g., instead of to a split-screen application-switcher user interface) because criteria for navigating to the full-screen application-switcher user interface are met by the input (e.g., because the transitional navigation gesture traveled further from the edge of the display). FIG. 5B13 illustrates an interactive map user interface displayed in a left portion of a display operating in a split-screen display mode and an email user interface simultaneously displayed in a right portion of the display. When an upward swipe gesture starts from the bottom edge of the left portion of the display, as illustrated in FIG. 5B13, a user interface selection process is activated on the left portion of the screen, as illustrated by the transitional navigation user interface displayed on the left portion of the display in FIG. 5B14. As the contact continues to move away from the bottom edge of the display, the email user interface displayed in the right portion of the display is replaced by (e.g., transitions into) card 4015 that represents the email user interface, in FIG. 5B15, indicating to the user that the device will switch to a full-screen display mode upon liftoff of the contact (e.g., unless the user modifies the gesture to direct navigation back to a split-screen display mode). Furthermore, if lift-off of the contact were detected at the point shown in FIG. 5B15, the application-switcher user interface displayed in the full-screen display mode would include cards 4014 and 4015 as user interfaces that are separately selectable in the application-switcher user interface; and when one of the cards displayed in the full-screen application-switcher user interface is selected by a user, the device displays the user interface corresponding to the selected card in the full-screen display mode. In other words, the device would transition out of the split screen mode as a result of the navigation gesture by contact 4424, if lift-off of contact 4424 were detected in the state shown in FIG. 5B15 (e.g., the visual feedback indicates that the criteria for navigating to the full-screen application-switcher user interface are met).

As shown in FIG. 5B16, as contact 4424 continues to move upward, the cards from the previously displayed interactive map user interface and email user interface are animated to merge into a single card 4017, representing a split-screen display state in which user interfaces for the interactive map application and email application are displayed simultaneously. The presence of second card 4406, representing a web browsing user interface, on the display indicates that the device will navigate to a full-screen application-switcher user interface in a different configuration upon liftoff of the contact. Display of a full-screen transitional user interface (e.g., containing a card that is associated with two applications), indicates that the application-switcher user interface will be displayed in a full-screen display mode. This is in contrast to the display of a split-screen transitional user interface (e.g., as illustrated in FIGS. 5B2 and 5B11, which only includes cards associated with a single application), which indicates that the application-switcher user interface will be displayed in split-screen mode (e.g., as illustrated in FIGS. 5B4 and 5B12) upon termination of the gesture. The device then displays a full-screen application-switcher user interface following lift-off of the contact, in FIG. 5B17. Selection of the card 4015 cause the device to redisplay the split screen user interface including the interactive map user interface and the email user interface.

FIGS. 5B18-5B21 illustrate an example process in which the device navigates from a user interface displayed in a split-screen display mode to a full-screen home screen (e.g., instead of to a split-screen application-switcher user interface or a full-screen application-switcher user interface) because criteria for navigating to the full-screen home screen user interface are met by the input (e.g., because the transitional navigation gesture traveled even further from the edge of the display than that shown in FIG. 5B16). FIG. 5B18 illustrates an interactive map user interface displayed in a left portion of a display operating in a split-screen display mode and an email user interface simultaneously displayed in a right portion of the display. When an upward swipe gesture starts from the bottom edge of the left portion of the display, as illustrated in FIG. 5B18, and travels sufficiently far from the bottom edge of the display, a full-screen user interface selection process is activated, as illustrated by the full-screen transitional navigation user interface displayed on the display in FIG. 5B19, which includes card 4017 associated with both the interactive map application and the email application. The presence of second card 4406, representing a web browsing user interface in FIG. 5B19, on the display indicates that the device will navigate to an application-switcher user interface upon liftoff of the contact. As the contact continues to move away from the bottom edge of the display, the web browsing card disappears, in FIG. 5B20, and a home screen user interface begins to come into focus behind the transitional navigation user interface, indicating that the device will navigate to a home screen upon liftoff of the contact (e.g., unless the user modifies the gesture to direct navigation to a different user interface. The device then displays a full-screen home screen following liftoff of the contact, in FIG. 5B21.

FIGS. 5B22-5B24 illustrate an example split-screen user interface where the device navigates to a previously displayed user interface on one portion of the display (e.g., rather than to an application-switcher user interface or home screen), while maintaining display of the user interface on the other portion of the display, because the criteria for navigating to a previously displayed user interface are met by the input (e.g., the input moves substantially horizontal to the bottom edge of the display (e.g., the input is an arc swipe that started from the bottom edge of one portion of the display)). FIG. 5B22 illustrates a web browser user interface displayed in a left portion of a display operating in a split-screen display mode and an email user interface simultaneously displayed in a right portion of the display. When a substantially sideways swipe gesture starts from the bottom edge of the left portion of the display, as illustrated in FIG. 5B22, a user interface selection process is activated on the left portion of the screen, as illustrated by the transitional navigation user interface displayed on the left portion of the display in FIG. 5B23. The arc swipe appears to drag the web browsing user interface (e.g., application view 406 of the web browsing user interface) off of the first portion of the display to the right, while simultaneously pulling an interactive map user interface (e.g., application view 4014 of the interactive map user interface) onto the display from the left, in FIG. 5B23. The cards appear to be moving over the home screen, which is blurred in the background. Display of the email user interface in the right portion of the display is unaffected by the gesture, because the gesture began within the left portion of the display and did not invoke a full-screen display mode (e.g., as in FIGS. 5B15 and 5B19). Upon liftoff of the contact, the interactive map user interface is displayed in the left portion of the split-screen display, in FIG. 5B24.

FIGS. 5B25-5B36 illustrate an example split-screen user interface where the device navigates through previously displayed user interfaces within the card stack, in one portion of the display, and then activates a full-screen display mode, in response to serial arc swipe gestures, because no other previously displayed user interfaces are available in the card stack. FIG. 5B25 illustrates an interactive map user interface displayed in a left portion of a display operating in a split-screen display mode and an email user interface simultaneously displayed in a right portion of the display. When a substantially sideways swipe gesture starts from the bottom edge of the right portion of the display, as illustrated in FIG. 5B25, a user interface selection process is activated on the right portion of the screen, as illustrated by the transitional navigation user interface displayed on the left portion of the display in FIG. 5B23 (e.g., as opposed to in the left portion of the display, as illustrated in FIG. 5B23 when the arc swipe initiated from the bottom edge of the left portion of the display). The arc swipe gesture pushes the email user interface off the display to the right, while dragging a web browsing user interface (e.g., application view 4406 of the web browsing user interface) onto the right portion of the display (e.g., seemingly from under the interactive map user interface displayed in the right portion of the display), as illustrated in FIG. 5B27. The web browsing user interface is the first previously displayed user interface navigated to on the right portion of the display because it was the last user interface that was navigated away from on the display. Despite that the web browsing user interface was previously displayed in the left portion of the display, it is still the first previously displayed user interface navigated to in the right portion of the display because the two portions of the display share a single stack of previously displayed cards, in accordance with some embodiments.

A first subsequent arc swipe in the right portion of the display, as illustrated in FIGS. 5B28-5B29, results in navigation back to the email user interface, in FIG. 5B30, because the previously displayed card stack was reset before the gesture began, e.g., as indicated by the redisplay of home affordance 4400-2 when the input began, as illustrated in FIG. 5B28. In contrast, a second subsequent arc swipe in the right portion of the display, as illustrated in FIGS. 5B31-5B33, navigates to an older previously displayed user interface for a messaging application, in FIG. 5B33, (e.g., as opposed to navigating back to the web browsing user interface that was displayed in the right portion of the display immediately prior to display of the email user interface) because the previously displayed card stack was not reset before the gesture began, as indicated by the lack of a home affordance displayed in FIG. 5B31. Finally, a third subsequent arc swipe in the right portion of the display, initiated before the previously displayed card stack reset, in FIGS. 5B34-5B35, results in navigation to a full-screen display of the interactive map user interface, as illustrated in FIG. 5B36, which was previously displayed in the left portion of the display, because there were no more previously displayed user interfaces available in the card stack. As compared to the split-screen display mode, where two home affordances 4400 are displayed (e.g., one displayed over each of the application user interface displayed in the right and left portions of the display, as in FIG. 5B25, indicating that separate navigation is possible within either portion of the display), there is only one home affordance displayed over the full-screen interactive map user interface, in FIG. 5B36.

FIGS. 5C1-5C59 illustrate example user interfaces for navigating between different user interfaces using a multi-contact gesture, e.g., that considers both translation of the contacts as a group and movement of the contacts relative to each other (e.g., 'pinching' and 'de-pinching' motions), and which provides dynamic feedback during the gesture to indicate which user interface will be navigated to upon completion of the gesture, which allows the user to change characteristic properties of the gesture to avoid unintended navigation and/or account for changes in the intended navigation during the gesture, in accordance with some embodiments.

The user interfaces in these figures are used to illustrate the processes described below, including the processes in FIGS. 11A-11F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

For convenience of explanation, some of the embodiments will be discussed with reference to operations performed on a device without a home button, and a gesture meeting predefined criteria is used to cause dismissal of a currently displayed user interface and display of the home screen user interface. Although shown as optional in FIGS. 5C1-5C59, in some embodiments, a home button (e.g., a mechanical button, a solid state button, or a virtual button) is included on the device and is used to cause dismissal of a currently displayed user interface and display of the home screen user interface. (e.g., in response to a single press input) and/or display a multitasking user interface (e.g., in response to a double press input).

The example user interfaces illustrated in FIGS. 5C1-5C59 relate to methods for efficiently navigating between multiple user interfaces, e.g., quickly switching between different applications and system user interfaces, in accordance with some embodiments. Example user interfaces shown in FIGS. 5C1-5C59 include a home screen user interface including a plurality of application launch icons, e.g., as described with relation to FIGS. 5A1-5A29, a full-screen application-switcher user interface that includes representations of multiple user interfaces for applications (e.g., recently opened applications, a currently displayed application, and, optionally, a system control panel) associated with the electronic device displayed as cards dealt on a virtual flat surface (e.g., as opposed to cards displayed in a virtual stack, as described with respect to FIGS. 5B1-5B36), where each card in the stack represents a user interface for a different application. The cards are also referred to herein as "application views," when corresponding to a user interface for a recently open application, or as a "control panel view," when corresponding to a user interface for a control panel). In some embodiments, the application views display a snapshot of a recent state, or a live view, of the application corresponding to the application view, in contrast to application launch icons displayed on a home user interface, which display a predetermined design independent of a recent or live state of the application.

While the device displays a user interface (e.g., a user interface for an application or a system user interface, such as an application-switcher user interface), a gesture that includes at least 3 contacts (e.g., 3, 4, 5, or more contacts) beginning anywhere on the screen, and including at least a threshold amount of movement within a predetermined period of time, invokes the user interface selection process (e.g., displays a transitional navigation user interface), and directs navigation between multiple user interfaces based on the speed and direction of the input, and, optionally, based on movement parameters and characteristics of user interface objects (e.g., the cards) that are currently displayed. The device replaces display of the current user interface with a card representing that user interface (e.g., in some embodiments, the user interface appears to shrink into a card in accordance with movement of the input). The user has the option to use translational and pinching/de-pinching gestures to (i) navigate to a full-screen home screen, (ii) navigate to an application displayed on the screen (e.g., on either portion of the split-screen display) immediately prior to the user interface that was displayed when the user interface selection process was invoked, (iii) navigate to a split-screen application-switcher user interface that allows the user to select from applications previously displayed on the screen (e.g., for display on a portion of the display operating in split-screen mode, (iv) navigate to a full-screen application-switcher user interface that allows the user to select from application previously displayed on the screen (e.g., for display in either a full-screen display mode or a split screen display mode, or (v) navigate back to the user interface that was displayed when the user interface selection process was invoked (e.g., in a split-screen display mode), in accordance with some embodiments. During the input, the device provides dynamic visual feedback indicating what navigation choice will be made upon termination of the input, facilitating effective user navigation between multiple choices. In some embodiments, the visual feedback and user interface response is fluid and reversible. In some embodiments, the user also has the option to navigate to a control panel user interface using the gesture. In other embodiments, a different input (e.g., initiating from a different edge of the display) is required to navigate to a control panel user interface. In some embodiments, the user also has the option to display a dock with a plurality of application launch icons over a displayed user interface.

FIGS. 5C1-5C3, 5C4-5C6, and 5C7-5C9 illustrate example embodiments where a gesture that includes two contacts (e.g., two finger touches) performs an application-specific operation, e.g., rather than a system-wide user interface selection (e.g., UI navigation) operation. FIGS. 5C1-5C3 and 5C4-5C6 illustrate swipe gestures that cause translation of the interactive map, while FIGS. 5C7-5C9 illustrate a pinch gesture that causes resizing of the interactive map.

FIG. 5C1 illustrates an interactive map user interface, displayed in full-screen display mode. A two-contact swipe gesture including movements 4504 and 4508 of contacts 4502 and 4506 to the right, from positions 4502-*a* and 4506-*a*, as illustrated in FIG. 5C1, to positions 4502-*b* and 4506-*b*, as illustrated in FIG. 5C2, respectively, results in horizontal translation of the interactive map to the right (e.g., revealing eastern Oregon) because the gesture met application-specific translational criteria (e.g., including translational movement of contacts in a gesture that includes less than three total contacts), rather than criteria invoking the user interface selection process (e.g., including translational movement of contacts in a gesture that includes at least three contacts). Upon lift-off of the contacts, the interactive map application user interface remains displayed, as illustrated in FIG. 5C3, because the gesture met application-specific criteria, rather than system-wide user interface navigation criteria.

FIG. 5C4 illustrates an interactive map user interface, displayed in full-screen display mode. A two-contact swipe gesture including movements 4664 and 4668 of contacts 4662 and 4666 upwards, from positions 4662-*a* and 4666-*a*, as illustrated in FIG. 5C4, to positions 4662-*b* and 4666-*b*, as illustrated in FIG. 5C5, respectively, results in vertical translation of the interactive map upwards (e.g., hiding southern Montana) because the gesture met application-specific translational criteria (e.g., including a translational movement of contacts in a gesture that includes less than three total contacts), rather than criteria invoking the user interface selection process (e.g., including translational movement of contacts in a gesture that includes at least three contacts). Upon lift-off of the contacts, the interactive map application user interface remains displayed, as illustrated in FIG. 5C6, because the gesture met application-specific criteria, rather than system-wide user interface navigation criteria.

FIG. 5C7 illustrates an interactive map user interface, displayed in full-screen display mode. A two-contact pinch gesture including movements 4596 and 4600 of contacts 4594 and 4598 towards each other, from positions 4594-*a* and 4598-*a*, as illustrated in FIG. 5C7, to positions 4594-*b* and 4598-*b*, as illustrated in FIG. 5C8, respectively, results in shrinking of the interactive map (e.g., revealing both eastern Oregon and Western Illinois) because the gesture met application-specific resizing criteria (e.g., including a pinching movement of contacts in a gesture that includes less than three total contacts), rather than criteria invoking the user interface selection process (e.g., including a pinching movement of contacts in a gesture that includes at least three contacts). Upon lift-off of the contacts, the interactive map application user interface remains displayed, as illustrated in FIG. 5C9, because the gesture met application-specific criteria, rather than system-wide user interface navigation criteria.

FIGS. 5C10-5C12, 5C13-5C16, 5C17-5C19, and 5C20-5C22 illustrate example embodiments where a swipe gesture that includes at least three contacts (e.g., three, four, or five finger touches) performs a system-wide user interface selection (e.g., UI navigation) operation, e.g., rather than an application-specific operation. The user interface navigated to in response to the gesture in each series of figures is dependent upon the properties of the gesture. The device provides dynamic, visual feedback during the gesture to indicate which user interface will be navigated to upon termination of the gesture (e.g., lift-off of all contacts).

FIGS. 5C10-5C12 illustrate a horizontal swipe gesture that includes four contacts, which results in navigation to a previously displayed application user interface. FIG. 5C10 illustrates an interactive map user interface, displayed in full-screen display mode. A four-contact swipe gesture including movements 4512, 4516, 4520, and 4524 of contacts 4510, 4514, 4518, and 4522 to the right, from positions 4510-*a*, 4514-*a*, 4518-*a*, and 4522-*a*, as illustrated in FIG. 5C10, to positions 4510-*b*, 4514-*b*, 4518-*b*, and 4522-*b*, as illustrated in FIG. 5C11, respectively, invokes the user interface selection process because the gesture met system-wide user interface navigation criteria (e.g., including translational movement of contacts in a gesture that includes at least three contacts, where at least a threshold amount of movement occurs within a threshold amount of time (e.g., $TT_1$) after the device first detects the contacts), rather than an application-specific translational criteria (e.g., including a translational movement of contacts in a gesture that includes less than three total contacts (e.g., as illustrated in FIGS. 5C1-5C3), or where a threshold amount of movement does not occur within a threshold amount of time (e.g., $TT_1$) after the device first detects the contacts). The device replaces display of the interactive map user interface with representation (e.g., card) 4526 of the interactive map user interface and begins sliding the card off the right side of the screen (e.g., in accordance with movement of the contacts to the right), while dragging representation (e.g., card) 4528 of a previously displayed email user interface onto the screen from the left, as illustrated in FIG. 5C11. Cards 4526 and 4528 remain large during the gesture, indicating that the device will navigate to a next/previously displayed application upon termination of the gesture (e.g., because the device assigns a next/previously displayed application as the current target state when the properties of the input/application view meet "side swipe for next/previous app" criteria (100×4) and/or "vertical swipe for next/previous app" criteria (100×5), as illustrated in FIGS. 10A-10B), as illustrated by display of the email user interface following liftoff of the contacts, in FIG. 5C12.

Figure 10A:
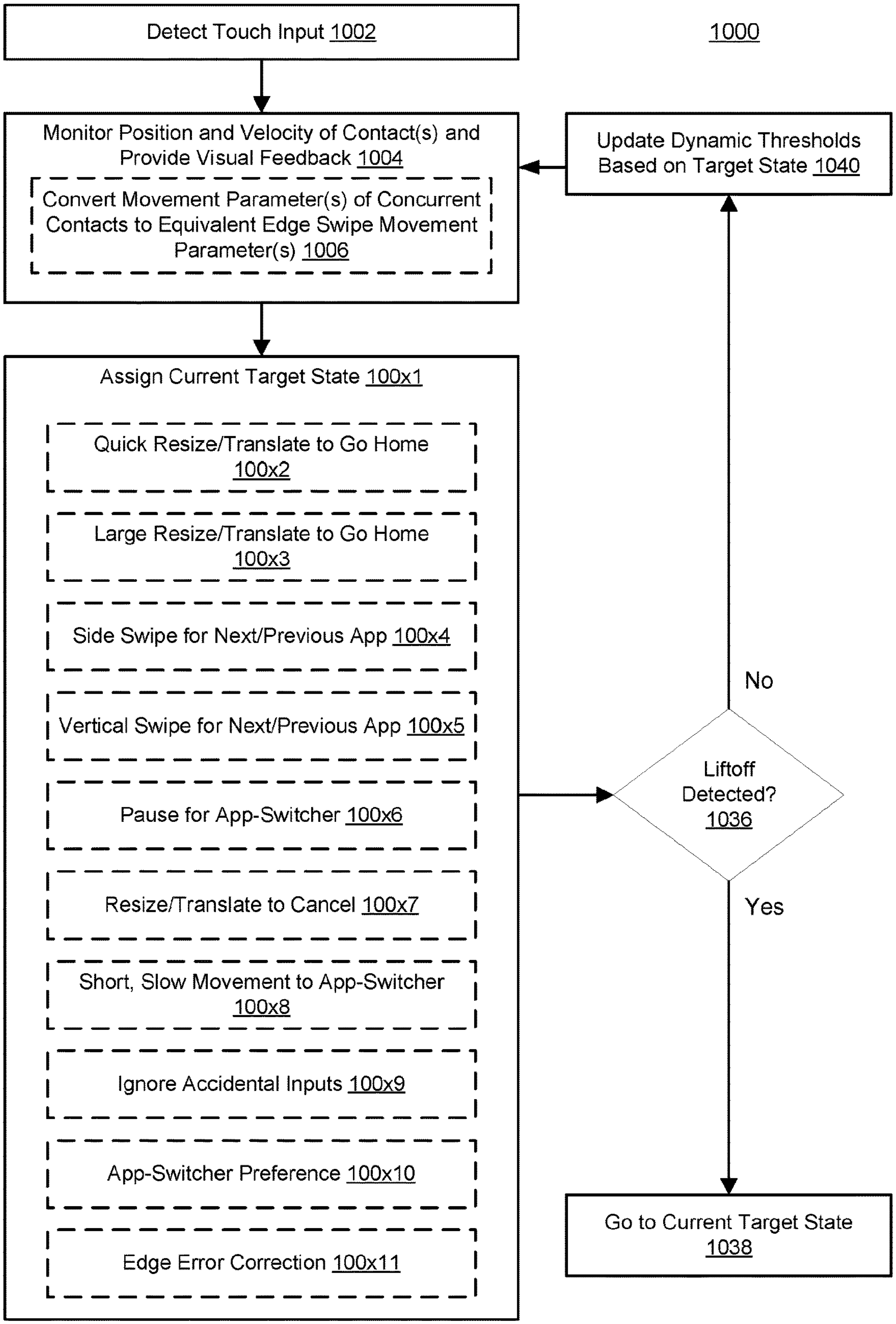
FIGS. 10A-10D are a flow diagram illustrating a method of navigating between user interfaces, in accordance with some embodiments.
Figure 10B:
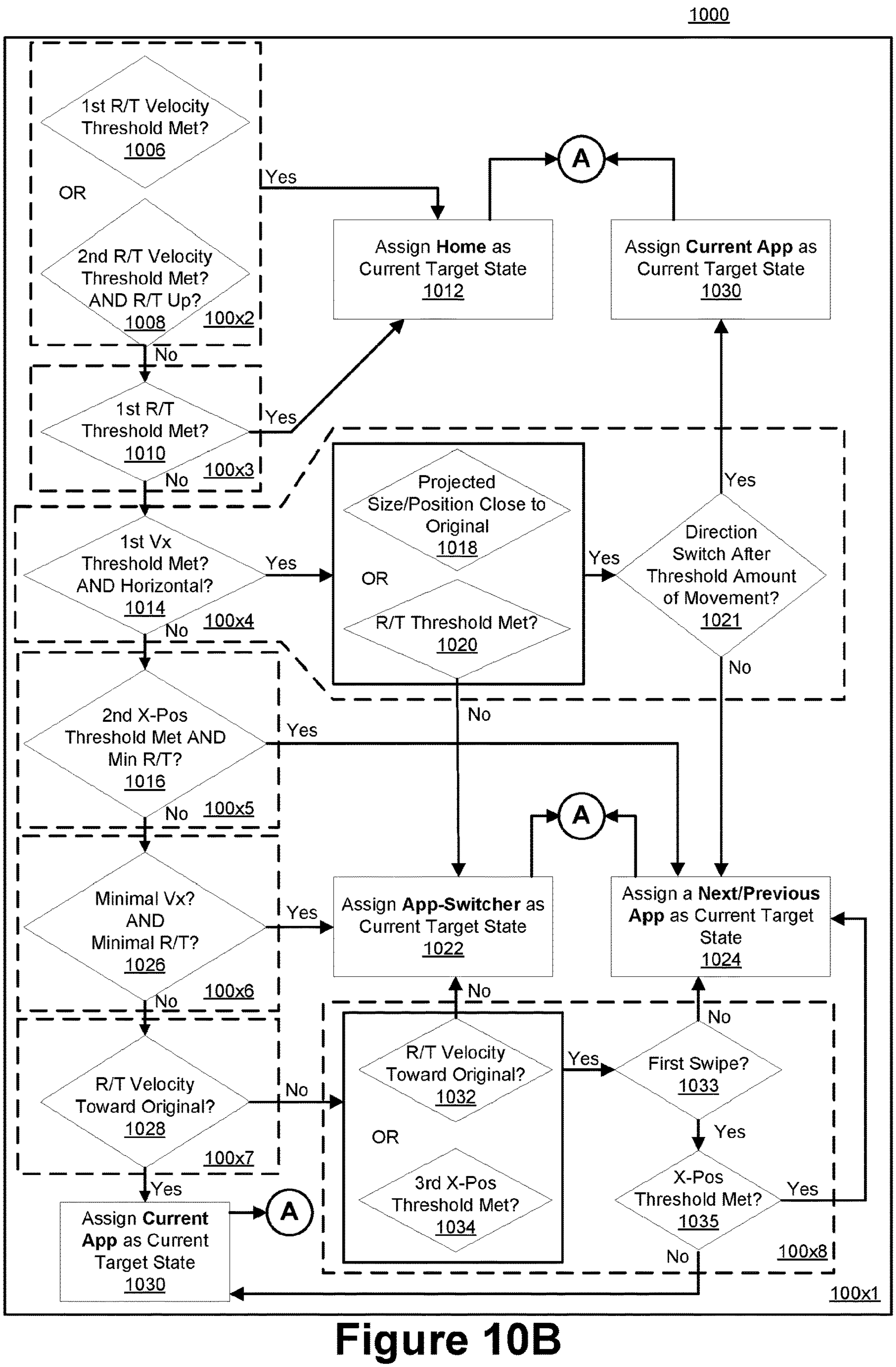

FIGS. 5C13-5C16 illustrate a vertical swipe gesture that includes four contacts, which results in navigation to a home screen user interface. FIG. 5C13 illustrates an email user interface, displayed in full-screen display mode. A four-contact swipe gesture including movements 4532, 4536, 4540, and 4544 of contacts 4530, 4534, 4538, and 4542 to the right, from positions 4530-*a*, 4534-*a*, 4538-*a*, and 4542-*a*, as illustrated in FIG. 5C13, to positions 4530-*b*, 4534-*b*, 4538-*b*, and 4542-*b*, as illustrated in FIG. 5C14, respectively, invokes the user interface selection process because the gesture met system-wide user interface navigation criteria (e.g., including translational movement of contacts in a gesture that includes at least three contacts, where at least a threshold amount of movement occurs within a threshold amount of time (e.g., $TT_1$) after the device first detects the contacts), rather than an application-specific translational criteria (e.g., including a translational movement of contacts in a gesture that includes less than three total contacts (e.g., as illustrated in FIGS. 5C4-5C6), or where a threshold amount of movement does not occur within a threshold amount of time (e.g., $TT_1$) after the device first detects the contacts). The device replaces display of the email user interface with representation (e.g., card) 4528 of the email user interface, and begins to both shrink and translate card 4528 upwards (e.g., in accordance with upward movement of the contacts). Representation (e.g., card) 4526 of the previously displayed interactive map user interface is also displayed at a similar size and vertical translation as email card 4528, indicating that the device will navigate to an application-switcher user interface upon termination of the gesture. As the contacts continue to move upwards, to positions 4530-*c*, 4534-*c*, 4538-*c*, and 4542-*c*, as illustrated in FIG. 5C15, email card 4528 continues to shrink and move upwards, interactive map card 4526 disappears, and a home screen user interface begins to come into focus behind email card 4528, indicating that the device will navigate to a home screen user interface upon termination of the gesture (e.g., because the device assigns a home screen as the current target state when the properties of the input/application view meet "quick resize/translate to go home" criteria (100×2) and/or "large resize/translate to go home" criteria (100×3), as illustrated in FIGS. 10A-10B), as illustrated by display of the home screen user interface following liftoff of the contacts, in FIG. 5C16.

FIGS. 5C17-5C19 illustrate a vertical swipe gesture that includes four contacts, which results in navigation to an application-switcher user interface. FIG. 5C17 illustrates an email user interface, displayed in full-screen display mode. A four-contact swipe gesture including movements 4548, 4552, 4556, and 4560 of contacts 4546, 4550, 4554, and 4558 upwards, from positions 4546-*a*, 4550-*a*, 4554-*a*, and 4558-*a*, as illustrated in FIG. 5C17, to positions 4546-*b*, 4550-*b*, 4554-*b*, and 4558-*b*, as illustrated in FIG. 5C18, respectively, invokes the user interface selection process because the gesture met system-wide user interface navigation criteria (e.g., including translational movement of contacts in a gesture that includes at least three contacts, where at least a threshold amount of movement occurs within a threshold amount of time (e.g., $TT_1$) after the device first detects the contacts), rather than an application-specific translational criteria (e.g., including a translational movement of contacts in a gesture that includes less than three total contacts, or where a threshold amount of movement does not occur within a threshold amount of time (e.g., $TT_1$) after the device first detects the contacts). The device replaces display of the email user interface with representation (e.g., card) 4528 of the email user interface, and begins to both shrink and translate card 4528 upwards (e.g., in accordance with upward movement of the contacts). Representation (e.g., card) 4526 of the previously displayed interactive map user interface is also displayed at a similar size and vertical translation as email card 4528, indicating that the device will navigate to an application-switcher user interface upon termination of the gesture (e.g., because the device assigns an application-switcher as the current target state when the properties of the input/application view meet "pause for app-switcher" criteria (100×6) and/or "short, slow movement to app-switcher" criteria (100×8), as illustrated in FIGS. 10A-10B), as illustrated by display of the application-switcher user interface following liftoff of the contacts, in FIG. 5C19. The device navigates to the application-switcher user interface, in FIG. 5C19, rather than a home screen user interface (e.g., as navigated to in FIGS. 5C13-5C16) because the gesture met application-switcher-navigation criteria, rather than home-screen-navigation criteria (e.g., the upwards movement of the contacts met a first vertical translation and/or first vertical velocity threshold corresponding with navigation to an application-switcher user interface, but not a second vertical translation and/or second vertical velocity threshold corresponding with navigation to a home screen user interface).

FIGS. 5C20-5C22 illustrate a horizontal swipe gesture that includes four contacts, which results in navigation back to the same application user interface. FIG. 5C20 illustrates an interactive map user interface, displayed in full-screen display mode. A four-contact swipe gesture including movements 4564, 4568, 4572, and 4576 of contacts 4562, 4566, 4570, and 4574 to the right, from positions 4562-*a*, 4566-*a*, 4570-*a*, and 4574-*a*, as illustrated in FIG. 5C20, to positions 4562-*b*, 4566-*b*, 4570-*b*, and 4574-*b*, as illustrated in FIG. 5C21, respectively, invokes the user interface selection process because the gesture met system-wide user interface navigation criteria (e.g., including translational movement of contacts in a gesture that includes at least three contacts, where at least a threshold amount of movement occurs within a threshold amount of time (e.g., $TT_1$) after the device first detects the contacts), rather than an application-specific translational criteria (e.g., including a translational movement of contacts in a gesture that includes less than three total contacts (e.g., as illustrated in FIGS. 5C1-5C3), or where a threshold amount of movement does not occur within a threshold amount of time (e.g., $TT_1$) after the device first detects the contacts). The device replaces display of the interactive map user interface with representation (e.g., card) 4526 of the interactive map user interface and begins sliding the card off the right side of the screen (e.g., in accordance with movement of the contacts to the right), while dragging representation (e.g., card) 4528 of a previously displayed email user interface onto the screen from the left, as illustrated in FIG. 5C21. Cards 4526 and 4528 remain large during the gesture, however, the cards do slide very far to the right, indicating that the device will navigate back to the interactive map use interface upon termination of the gesture (e.g., because the device assigns a current application as the current target state when the properties of the input/application view meet "resize/translate to cancel" criteria (100×7), as illustrated in FIGS. 10A-10B), as illustrated by display of the interactive map use interface following liftoff of the contacts, in FIG. 5C22.

FIGS. 5C23-5C26 illustrate an example embodiment where a swipe gesture that includes at least four contacts (e.g., four or five finger touches) performs an application-specific operation, rather than a system-wide user interface selection (e.g., UI navigation) operation when a threshold amount of movement does not occur within a threshold amount of time. FIG. 5C23 illustrates an interactive map user interface, displayed in full-screen display mode. A four-contact input including contacts 4578, 4582, 4586, and 4590 is detected, as illustrated in FIG. 5C24. However, movement of the contacts does not occur until after a threshold amount of time (e.g., $TT_1$) has passed following first detection of the contacts, as illustrated in FIG. 5C24. Movements 4580, 4584, 4588, and 4592 of contacts 4578, 4582, 4586, and 4590 to the right, from positions 4578-*a*, 4582-*a*, 4586-*a*, and 4590-*a*, as illustrated in FIG. 5C24, to positions 4578-*b*, 4582-*b*, 4586-*b*, and 4590-*b*, as illustrated in FIG. 5C25, respectively, results in horizontal translation of the interactive map to the right (e.g., revealing eastern Oregon), e.g., rather than invoking the user interface selection process (e.g., as illustrated in FIGS. 5C10-5C12), because the gesture met application-specific translational criteria (e.g., including less than a threshold amount of movement within a threshold amount of time (e.g., $TT_1$) after the device first detects the contacts), rather than criteria invoking the user interface selection process (e.g., including more than a threshold amount of movement within a threshold amount of time (e.g., $TT_1$) after the device first detects the contacts (e.g., as illustrated in FIGS. 5C10-5C12)). Upon lift-off of the contacts, the interactive map application user interface remains displayed, as illustrated in FIG. 5C26, because the gesture met application-specific criteria, rather than system-wide user interface navigation criteria.

FIGS. 5C27-5C29, 5C30-5C32, 5C33-5C36, and 5C37-5C42 illustrate example embodiments where a pinch gesture that includes at least three contacts (e.g., three, four, or five finger touches) performs a system-wide user interface selection (e.g., UI navigation) operation, e.g., rather than an application-specific operation. The user interface navigated to in response to the gesture in each series of figures is dependent upon the properties of the gesture, which include, in some embodiments, translational movements instead of, and/or in addition to, pinching/de-pinching movements. The device provides dynamic, visual feedback during the gesture to indicate which user interface will be navigated to upon termination of the gesture (e.g., lift-off of all contacts).

FIGS. 5C27-5C29 illustrate a pinch gesture that includes five contacts, which results in navigation to a home screen user interface. FIG. 5C27 illustrates an interactive map user interface, displayed in full-screen display mode. A five-contact pinch gesture including movements 4604, 4608, 4612, 4616, and 4620 of contacts 4602, 4606, 4610, 4614, and 4618 towards each other, from positions 4602-*a*, 4606-*a*, 4610-*a*, 4614-*a*, and 4618-*a*, as illustrated in FIG. 5C27, to positions 4602-*b*, 4606-*b*, 4610-*b*, 4614-*b*, and 4618-*b*, as illustrated in FIG. 5C28, respectively, invokes the user interface selection process because the gesture met system-wide user interface navigation criteria (e.g., including a pinching movement of contacts in a gesture that includes at least three contacts, where at least a threshold amount of movement occurs within a threshold amount of time (e.g., $TT_1$) after the device first detects the contacts), rather than an application-specific resizing criteria (e.g., including a pinching/de-pinching movement of contacts in a gesture that includes less than three total contacts (e.g., as illustrated in FIGS. 5C7-5C9), or where a threshold amount of movement does not occur within a threshold amount of time (e.g., $TT_1$) after the device first detects the contacts). The device replaces display of the interactive map user interface with representation (e.g., card) 4526 of the interactive map user interface, and begins to both shrink and translate card 4526 towards a position between each of the contacts (e.g., in accordance with pinching movement of the contacts). The smaller size of interactive map card 4526, and the appearance of a home screen user interface behind interactive map card 4526, indicates that the device will navigate to a home screen user interface upon termination of the gesture (e.g., because the device assigns a home screen as the current target state when the properties of the input/application view meet "quick resize/translate to go home" criteria (100×2) and/or "large resize/translate to go home" criteria (100×3), as illustrated in FIGS. 10A-10B), as illustrated by display of the home screen user interface following liftoff of the contacts, in FIG. 5C29.

FIGS. 5C30-5C32 illustrate a pinch gesture that includes five contacts, which results in navigation to an application-switcher user interface. FIG. 5C30 illustrates an interactive map user interface, displayed in full-screen display mode. A five-contact pinch gesture including movements 4644, 4648, 4652, 4656, and 4660 of contacts 4642, 4646, 4650, 4654, and 4658 towards each other, from positions 4642-*a*, 4646-*a*, 4650-*a*, 4654-*a*, and 4658-*a*, as illustrated in FIG. 5C30, to positions 4642-*b*, 4646-*b*, 4650-*b*, 4654-*b*, and 4658-*b*, as illustrated in FIG. 5C31, respectively, invokes the user interface selection process because the gesture met system-wide user interface navigation criteria (e.g., including a pinching movement of contacts in a gesture that includes at least three contacts, where at least a threshold amount of movement occurs within a threshold amount of time (e.g., $TT_1$) after the device first detects the contacts), rather than an application-specific resizing criteria (e.g., including a pinching/de-pinching movement of contacts in a gesture that includes less than three total contacts (e.g., as illustrated in FIGS. 5C7-5C9), or where a threshold amount of movement does not occur within a threshold amount of time (e.g., $TT_1$) after the device first detects the contacts). The device replaces display of the interactive map user interface with representation (e.g., card) 4526 of the interactive map user interface, and begins to both shrink and translate interactive map card 4526 towards a position between each of the contacts (e.g., in accordance with pinching movement of the contacts). Representation (e.g., card) 4528 of the previously displayed email user interface is also displayed at a similar size and vertical translation as interactive map card 4526, indicating that the device will navigate to an application-switcher user interface upon termination of the gesture (e.g., because the device assigns an application-switcher as the current target state when the properties of the input/application view meet "pause for app-switcher" criteria (100×6) and/or "short, slow movement to app-switcher" criteria (100×8), as illustrated in FIGS. 10A-10B), as illustrated by display of the application-switcher user interface following liftoff of the contacts, in FIG. 5C32. The device navigates to the application-switcher user interface, in FIG. 5C32, rather than a home screen user interface (e.g., as navigated to in FIGS. 5C27-5C29) because the gesture met application-switcher-navigation criteria, rather than home-screen-navigation criteria (e.g., the pinching upwards movement of the contacts met a first pinching translation and/or first vertical velocity threshold corresponding with navigation to an application-switcher user interface, but not a second pinching translation and/or second vertical velocity threshold corresponding with navigation to a home screen user interface).

FIGS. 5C33-5C36, 5C37-5C42, and 5C43-5C47 illustrate example embodiments where user interface navigation is controlled by a combination of translational and pinch movements in a gesture that includes at least three contacts (e.g., three, four, or five finger touches). The user interface navigated to in response to the gesture in each series of figures is dependent upon properties of the gesture prior to termination (e.g., a last set of measured properties of the gesture). The device provides dynamic, visual feedback during the gesture to indicate which user interface will be navigated to upon termination of the gesture (e.g., lift-off of all contacts).

FIGS. 5C33-5C36 illustrate an example embodiment where a pinching movement of a gesture that includes five contacts invokes the user interface selection process, and a translational movement of the gesture, just prior to termination of the gesture, results in navigation to a previously displayed application user interface. FIGS. 5C33-5C36 also illustrate an example embodiment where, after the user interface selection process is invoked, user interface navigation continues after liftoff of some, but not all, contacts. A five-contact pinching movement including movements 4624, 4628, 4632, 4636, and 4640 of contacts 4622, 4626, 4630, 4634, and 4638 towards each other, from positions 4622-*a*, 4626-*a*, 4630-*a*, 4634-*a*, and 4638-*a*, as illustrated in FIG. 5C33, to positions 4622-*b*, 4626-*b*, 4630-*b*, 4634-*b*, and 4638-*b*, as illustrated in FIG. 5C34, respectively, invokes the user interface selection process. The device replaces display of the interactive map user interface with representation (e.g., card) 4526 of the interactive map user interface, and begins to both shrink and translate interactive map card 4526 towards a position between each of the contacts (e.g., in accordance with pinching movement of the contacts). Representation (e.g., card) 4528 of the previously displayed email user interface is also displayed at a similar size and vertical translation as interactive map card 4526, indicating that the device would navigate to an application-switcher user interface upon termination of the gesture (e.g., because the device assigns an application-switcher as the current target state when the properties of the input/application view meet "pause for app-switcher" criteria (100×6) and/or "short, slow movement to app-switcher" criteria (100×8), as illustrated in FIGS. 10A-10B), e.g., as illustrated in FIGS. 5C30-5C32. The user interface selection process continues after contacts 4622 and 4626 are lifted-off, as illustrated in FIG. 5C35. Horizontal translation of remaining contacts 4630, 4634, and 4638, from positions 4630-*b*, 4634-*b*, and 4638-*b*, as illustrated in FIG. 5C34, to positions 4630-*c*, 4634-*c*, and 4638-*c*, as illustrated in FIG. 5C35, pushes interactive map card 4526 off the display to the right, while dragging email card 4528 further onto the display from the left, that indicating that the device will navigate to a next/previously displayed application upon termination of the gesture (e.g., because the device assigns a next/previously displayed application as the current target state when the properties of the input/application view meet "side swipe for next/previous app" criteria (100×4) and/or "vertical swipe for next/previous app" criteria (100×5), as illustrated in FIGS. 10A-10B), as illustrated by display of the email user interface following liftoff of the contacts, in FIG. 5C36.

FIGS. 5C37-5C42 illustrate an example embodiment where a navigation gesture that includes a pinching motion is reversed by a de-pinching motion. A five-contact pinching movement including movements 4672, 4676, 4680, 4684, and 4688 of contacts 4670, 4674, 4678, 4682, and 4686 towards each other, from positions 4670-*a*, 4674-*a*, 4678-*a*, 4682-*a*, and 4686-*a*, as illustrated in FIG. 5C37, to positions 4670-*b*, 4674-*b*, 4678-*b*, 4682-*b*, and 4686-*b*, as illustrated in FIG. 5C38, respectively, invokes the user interface selection process. The device replaces display of the interactive map user interface with representation (e.g., card) 4526 of the interactive map user interface, and begins to both shrink and translate interactive map card 4526 towards a position between each of the contacts (e.g., in accordance with pinching movement of the contacts). Representation (e.g., card) 4528 of the previously displayed email user interface is also displayed at a similar size and vertical translation as interactive map card 4526, indicating that the device would navigate to an application-switcher user interface upon termination of the gesture (e.g., because the device assigns an application-switcher as the current target state when the properties of the input/application view meet "pause for app-switcher" criteria (100×6) and/or "short, slow movement to app-switcher" criteria (100×8), as illustrated in FIGS. 10A-10B). As the contacts continue to pinch together, to positions 4670-*c*, 4674-*c*, 4678-*c*, 4682-*c*, and 4686-*c*, as illustrated in FIG. 5C39, interactive map card 4526 continues to shrink and move towards a virtual palm of the gestures, email card 4528 disappears, and a home screen user interface begins to come into focus behind interactive map card 4526, indicating that the device would navigate to a home screen user interface upon termination of the gesture (e.g., because the device assigns a home screen as the current target state when the properties of the input/application view meet "quick resize/translate to go home" criteria (100×2) and/or "large resize/translate to go home" criteria (100×3), as illustrated in FIGS. 10A-10B). Reversal of the pinching motion of the contacts (e.g., a de-pinching motion), to positions 4670-*d*, 4674-*d*, 4678-*d*, 4682-*d*, and 4686-*d*, as illustrated in FIG. 5C40, expands interactive map card 4526 and causes email card 4538 to re-appear, indicating that the device would navigate to an application-switcher user interface upon termination of the gesture (e.g., because the device assigns an application-switcher as the current target state when the properties of the input/application view meet "pause for app-switcher" criteria (100×6) and/or "short, slow movement to app-switcher" criteria (100×8), as illustrated in FIGS. 10A-10B). Horizontal translation of the contacts to the right, following the de-pinching motion, to positions 4670-*e*, 4674-*e*, 4678-*e*, 4682-*e*, and 4686-*e*, as illustrated in FIG. 5C41, pushes interactive map card 4526 off the display to the right, while dragging email card 4528 further onto the display from the left, that indicating that the device will navigate to a next/previously displayed application upon termination of the gesture (e.g., because the device assigns a next/previously displayed application as the current target state when the properties of the input/application view meet "side swipe for next/previous app" criteria (100×4) and/or "vertical swipe for next/previous app" criteria (100×5), as illustrated in FIGS. 10A-10B), as illustrated by display of the email user interface following liftoff of the contacts, in FIG. 5C42.

FIGS. 5C43-5C47 illustrate an example embodiment where an upwards swiping motion and a pinching motion both contribute to a gesture that results in navigation to a home screen user interface. FIG. 5C43 illustrates an interactive map user interface, displayed in full-screen display mode. A four-contact swipe gesture including movements 4692, 4696, 4700, and 4704 of contacts 4690, 4694, 4698, and 4702 to the right, from positions 4690-*a*, 4694-*a*, 4698-*a*, and 4702-*a*, as illustrated in FIG. 5C43, to positions 4690-*b*, 4694-*b*, 4698-*b*, and 4702-*b*, as illustrated in FIG. 5C44, respectively, invokes the user interface selection process. The device replaces display of the interactive map user interface with representation (e.g., card) 4526 of the interactive map user interface and begins sliding the card off the right side of the screen (e.g., in accordance with movement of the contacts to the right), while dragging representation (e.g., card) 4528 of a previously displayed email user interface onto the screen from the left, as illustrated in FIG. 5C43. Cards 4526 and 4528 remain large, in FIG. 5C44, indicating that the device would navigate to a next/previously displayed application upon termination of the gesture (e.g., because the device assigns a next/previously displayed application as the current target state when the properties of the input/application view meet "side swipe for next/previous app" criteria (100×4) and/or "vertical swipe for next/previous app" criteria (100×5), as illustrated in FIGS. 10A-10B). Upward movement of the contacts, to positions 4690-*c*, 4694-*c*, 4698-*c*, and 4702-*c*, as illustrated in FIG. 5C45, causes the cards to shrink and move upwards (e.g., in accordance with upward movement of the contacts), indicating that the device would navigate to an application-switcher user interface upon termination of the gesture (e.g., because the device assigns an application-switcher as the current target state when the properties of the input/application view meet "pause for app-switcher" criteria (100×6) and/or "short, slow movement to app-switcher" criteria (100×8), as illustrated in FIGS. 10A-10B). As the contacts begin to pinch together, to positions 4690-*d*, 4694-*d*, 4698-*d*, and 4702-*d*, as illustrated in FIG. 5C46, interactive map card 4526 continues to shrink and begins moving downward towards a virtual palm of the gestures, email card 4528 disappears, and a home screen user interface begins to come into focus behind interactive map card 4526, indicating that the device would navigate to a home screen user interface upon termination of the gesture (e.g., because the device assigns a home screen as the current target state when the properties of the input/application view meet "quick resize/translate to go home" criteria (100×2) and/or "large resize/translate to go home" criteria (100×3), as illustrated in FIGS. 10A-10B), as illustrated by display of the home screen user interface following liftoff of the contacts, in FIG. 5C47. Despite that the card moves downward in response to the pinching motion in FIG. 5C46 (e.g., as opposed to upwards movement in response to the upward swipe in FIGS. 5C13-5C16), the predicted navigation state is a home screen user interface because both upward movement and pinching of the contacts are associated with such navigation (e.g., both upward swiping and pinching contribute to an increasing 'simulated Y-position' and/or shrinking of the card, either or both of which correspond to navigation to an app-switcher or home screen user interface).

FIGS. 5C48-5C50 illustrate an example embodiment where an upward swipe gesture that includes at least three contacts (e.g., three, four, or five finger touches) on a home screen user interface that is not a default home screen user interface (e.g., a second or subsequent page of application launch icons) causes navigation to the default home screen user interface. FIG. 5C48 illustrates a secondary home screen user interface that includes application launch icons for a plurality of applications (e.g., clock, app store, voice memos, calculator, and notes). A four-contact swipe gesture including movements 4712, 4716, 4720, and 4724 of contacts 4710, 4714, 4718, and 4722 upwards, from positions 4710-*a*, 4714-*a*, 4718-*a*, and 4722-*a*, as illustrated in FIG. 5C48, to positions 4710-*b*, 4714-*b*, 4718-*b*, and 4722-*b*, as illustrated in FIG. 5C49, respectively, causes the device to navigate to a primary (e.g., a default) home screen user interface, as illustrated in FIG. 5C50. In some embodiments, an animation is displayed showing the primary home screen user interface slides in (e.g., from the left side of the display) and pushes the secondary home screen user interface off the display (e.g., to the right). In some embodiments, a four-contact pinch gesture including movements of contacts 4710, 4714, 4718, and 4722 toward one another causes the device to navigate to a primary (e.g., a default) home screen user interface.

FIGS. 5C51-5C54 illustrate an example embodiment where an upward swipe gesture that includes at least three contacts (e.g., three, four, or five finger touches) on an application-switcher user interface causes navigation to a home screen user interface. A four-contact swipe gesture including movements 4728, 4732, 4736, and 4740 of contacts 4726, 4730, 4734, and 4738 upwards, from positions 4726-*a*, 4730-*a*, 4734-*a*, and 4738-*a*, as illustrated in FIG. 5C51, to positions 4726-*b*, 4730-*b*, 4734-*b*, and 4738-*b*, as illustrated in FIG. 5C52, respectively, causes the device to navigate to a home screen user interface, as illustrated in FIG. 5C54. In some embodiments, an animation is displayed to slide the application-switcher user interface upward with the movements of the contacts, revealing the home screen user interface underneath the application-switcher user interface. In some embodiments, representation of the recently used applications are displayed side-by-side in response to an initial portion of the upward swipe gesture by the multiple contacts (e.g., as shown in FIG. 5C52), and when the criteria for navigating to the home screen are met (e.g., same as the criteria for navigating from an application user interface to the home screen user interface, as described in FIGS. 9A-9C and 10A-10D), the device displays only the representation of the most recently used application on the display as visual feedback to indicate the current target state of user interface navigation (e.g., as shown in FIG. 5C23) before lift-off of the contacts, and displays the home screen user interface after termination of the gesture (e.g., as shown in FIG. 5C54).

FIGS. 5C55-5C59 illustrate an example embodiment where the user interface for the user interface selection process is dynamic and reversible. A five-contact pinching movement including movements 4744, 4748, 4752, 4756, and 4760 of contacts 4742, 4746, 4750, 4754, and 4758 towards each other, from positions 4742-*a*, 4746-*a*, 4750-*a*, 4754-*a*, and 4758-*a*, as illustrated in FIG. 5C55, to positions 4742-*b*, 4746-*b*, 4750-*b*, 4754-*b*, and 4758-*b*, as illustrated in FIG. 5C56, respectively, invokes the user interface selection process. The device replaces display of the interactive map user interface with representation (e.g., card) 4526 of the interactive map user interface, and begins to both shrink and translate interactive map card 4526 towards a position between each of the contacts (e.g., in accordance with pinching movement of the contacts). Representation (e.g., card) 4528 of the previously displayed email user interface is also displayed at a similar size and vertical translation as interactive map card 4526, indicating that the device would navigate to an application-switcher user interface upon termination of the gesture (e.g., because the device assigns an application-switcher as the current target state when the properties of the input/application view meet "pause for app-switcher" criteria (100x6) and/or "short, slow movement to app-switcher" criteria (100x8), as illustrated in FIGS. 10A-10B). Translational movement of the contacts in a diagonal direction upwards and to the right (e.g., movement including horizontal and vertical components), to positions 4742-*c*, 4746-*c*, 4750-*c*, 4754-*c*, and 4758-*c*, as illustrated in FIG. 5C57, causes the cards to shrink and move upwards (e.g., in accordance with the vertical component of the contact movements), as well as move to the right (e.g., in accordance with the horizontal component of the contact movements). Downward movement of the contacts, to positions 4742-*d*, 4746-*d*, 4750-*d*, 4754-*d*, and 4758-*d*, as illustrated in FIG. 5C58, causes interactive map card 4526 to increase in size, pushing email card 4528 off of the display to the left, indicating that the device will navigate back to the interactive map user interface upon termination of the gesture (e.g., because the device assigns a current application as the current target state when the properties of the input/application view meet "resize/translate to cancel" criteria (100x7), as illustrated in FIGS. 10A-10B), as illustrated by display of the interactive map user interface following liftoff of the contacts, in FIG. 5C59.

FIGS. 5D1-5D64 illustrate example user interfaces for navigating to different user interfaces outside of an application from an application user interface displayed in a split-screen display mode, in accordance with some embodiments.

In FIGS. 5D1-5D14, two applications (e.g., a map application and a games application) are displayed side-by-side on touch-screen 112 in a split screen display mode. Neither of the two applications requires edge protection (e.g., implemented with enhanced edge-swipe gesture criteria) in their current states. In some embodiments, edge protection is implemented with a gesture-repeat requirement (e.g., two consecutive standard edge-swipe gestures required) and/or an enhanced location requirement (e.g., one or both edge swipe(s) start on the home affordance), in addition to standard edge-swipe gesture criteria (e.g., gesture starts from anywhere along bottom edge). When an application does not require edge protection, it is associated with standard edge-swipe gesture criteria, and an upward edge swipe gesture meeting the standard edge-swipe gesture criteria causes performance of a system operation, including, for example, navigation from the application user interfaces displayed in the split screen mode to a user interface outside of the application(s), such as a system user interface (e.g., a home screen user interface or an application switcher user interface) or a user interface of another application (e.g., contact moves up and sideways, or starts on the edge and moves sideways without moving up first)).

As shown in FIG. 5D1 (and also in FIGS. 5D9), on touch-screen 112, user interface 4806-1 of the maps application is displayed side by side with user interface 4808-1 of the game application. User interface 4801-1 and user interface 4808-1 are separated by divider 4804 which can be dragged in the direction along the bottom edge of touch-screen 112 to resize the user interfaces of the two concurrently displayed applications (e.g., by adjusting a width ratio of the two side-by-side applications). In some embodiments, the relative sizes of the side-by-side applications takes on one of a set of predetermined discrete values (e.g., 1:2, 1:1, 2:1).

In FIG. 5D1 (and also in FIG. 5D9), neither of user interfaces 4806-1 and 4808-1 are in an edge protected state (e.g., enhanced edge-swipe gesture criteria are not active for the applications either side of the split screen). A system user interface element (e.g., home affordance 4802-1) is displayed with a first appearance state (e.g., opaque, or standard visibility) to indicate that the application(s) underlying the system user interface element is currently associated with standard edge-swipe gesture criteria, as opposed to enhanced edge-swipe gesture criteria. In some embodiments, the appearance of home affordance 4802-1 is generated in accordance with the portion of content underlying home affordance 4802-1 (e.g., with the display properties illustrated in FIG. 5D99) using a first set of rules.

In FIGS. 5D1-5D8, since user interface 4806-1 of the maps application is not in an edge protected state (e.g., enhanced edge-swipe gesture criteria are not active), and when an upward swipe gesture by contact 4828 is detected on the side of the screen displaying the map application (e.g., with a starting location below or on the bottom edge of the screen 112, and optionally outside of the area occupied by home affordance 4801-1), and the upward swipe gesture by contact 4828 meets standard edge-swipe gesture criteria, a system navigation process is started and a transitional user interface 4822-1 replaces the split-screen user interface displayed on the screen at the start of the gesture. As shown in FIG. 5D2, in a beginning portion of the system navigation process, dock 4826 is gradually dragged onto the screen in accordance with the upward movement of contact 4828, and the split screen user interface (e.g., including user interfaces 4806-1 and 4808-1) is transformed into card 4818 (e.g., a snapshot representation of the split screen user interface at the time when contact 4828 was detected) in the transitional user interface 4822-1. Dock 4826 includes a subset of application icons (e.g., icons for frequently used, user selected, or recommended apps) selected from the application icons shown on the home screen user interface 4814. The dock 4826 overlays a portion (less than all) of a currently displayed user interface, and may be displayed in multiple contexts (e.g., overlaid on the home screen user interface, an application user interface, a transitional user interface, or an application-switcher user interface).

In FIGS. 5D1-5D8, as contact 4828 moves upward on touch-screen 112, card 4818 is displayed next to another card 4820 representing a previously used application in a set of recently used applications, as shown in FIGS. 5D2 and 5D3. The representations of user interfaces 4818 and 4820 are dragged and resized continuously and dynamically in accordance with the movement of contact 4828 on the touch-screen (e.g., as illustrated in FIGS. 5D2-5D3). As contact 4828 continues to move upward, card 4820 moves off the display, leaving card 4818 as the single card in the transitional user interface 4822-2, as shown in FIG. 5D5. If contact 4828 moves to the side after moving upward initially (e.g., in an arc swipe gesture (e.g., side swipe for next/previous app 100×4 in FIG. 10A)), cards 4818 and 4820 are dragged to the side with contact 4828, as shown in FIG. 5D7. When lift-off of contact 4828 is detected, in accordance with various navigation criteria, the final navigation state of the user interface is determined based on one or more characteristic parameters of the gesture by contact 4828. For example, if lift-off of contact 4828 is detected while the transitional user interface 4822-1 is in the state shown in FIG. 5D3, application-switcher user interface 4812 is displayed (e.g., with representation 4824 of the split screen user interface shown in a grid or stack of presentations of recently used applications (e.g., arranged based on recency of the application's last use)), as shown in FIG. 5D4. If lift-off of contact 4828 is detected while the transitional user interface 4822-2 is in the state shown in FIG. 5D5, home screen user interface 4814 is displayed (e.g., with application icons representing applications installed on the device shown in a prearranged grid irrespective of when the applications were last used), as shown in FIG. 5D6. If lift-off of contact 4828 is detected after an arc swipe (e.g., with the transitional user interface 4822-3 in a state as shown in FIG. 5D7), the user interface of a previously used application (e.g., application represented by card 4820) is displayed, as shown in FIG. 5D8. In some embodiments, the criteria for navigating to the different user interfaces are described with respect to the processes shown in FIGS. 9A-9C and 10A-10D.

In some embodiments, if a gesture by a contact does not meet the criteria for navigating between user interfaces (e.g., the gesture is started outside of the reactive region indicated by home affordance 4802-1), the gesture is passed to the underlying application and used as input for an operation within the application. For example, a tap input by a contact in an area within user interface 4806-1 (e.g., a touch input that does not meet edge-swipe gesture criteria e.g., because it does not include more than a threshold amount of movement) causes selection of a location in the map that corresponds to the location of the contact. A swipe input by a contact in an area within user interface 4806-1 (e.g., a swipe that does not meet edge-swipe gesture criteria, e.g., because it does not start from a predefined edge of the device such as an edge at which the home affordance is displayed) scrolls the map shown in the user interface of the maps application.

In FIGS. 5D1-5D8, the standard edge-swipe gesture criteria do not require that the contact starts on or below the home affordance, and a standard edge-swipe gesture with a contact (e.g., contact 4828) detected anywhere along the bottom edge of the screen (e.g., on or off the home affordance 4802-1) on the side of the maps application can cause system-level navigation to user interfaces outside of the currently displayed application (e.g., the maps application displayed in the split screen mode). In addition, the navigation applies to the entire split screen user interface, including users interfaces of both concurrently displayed applications.

FIGS. 5D9-5D14 illustrate that, while both applications (e.g., the maps application and the game application) displayed side-by-side on the split screen user interface are associated with standard edge-swipe gesture criteria (e.g., in a non-edge-protected state), home affordance 4802-1 overlaying user interfaces (e.g., 4806-1 and 4808-1) of both applications is displayed in the first appearance state (e.g., opaque, standard visibility). An edge swipe gesture by contact 4830 detected on the side of the game application on the screen 112 meets the standard edge-swipe gesture criteria (e.g., detected outside home affordance 4802-1) causes navigation from the currently displayed split screen user interface to the application-switcher user interface 4812 (e.g., as shown in FIGS. 5D9-5D12), or to the home screen user interface 4814 (e.g., as shown in FIGS. 5D9-5D10, and 5D13-5D14), in accordance with the criteria for navigating to the different user interfaces are described with respect to the processes shown in FIGS. 9A-9C and 10A-10D. The navigation processes illustrated in 5D9-5D14 are analogous to those in FIGS. 5D1-5D6, and are not repeated herein in the interest of brevity.

In FIGS. 5D15-5D49, two applications (e.g., a map application and a games application) are displayed side-by-side on touch-screen 112 in a split screen display mode. In contrast to the scenarios shown in FIGS. 5D1-5D14 (e.g., neither of the two applications requires edge protection), one of the two applications shown in FIGS. 5D15-5D49 is currently associated with enhanced edge-swipe gesture criteria and is in an edge-protected state. According to some embodiments, home affordance 4802-2 overlaying at least a portion of both applications on the split screen is displayed in a second appearance state (e.g., translucent or with reduced visibility as shown in FIGS. 5D15, 25, 5D32, 5D37, 5D44, and 5D47), as compared to the affordance in the first appearance state (e.g., shown in FIGS. 5D1 and 5D9)) to indicate that at least one of the two applications underlying the home affordance is currently associated with enhanced edge-swipe gesture criteria.

In the example scenario shown in FIGS. 5D15-5D24, the application (e.g., the games application) displayed on the right-side of the split screen is currently associated with standard edge-swipe gesture criteria, and the application (e.g., the maps application) displayed on the left side of the split screen is currently associated with enhanced edge-swipe gesture criteria. In the example scenario shown in FIGS. 5D25-5D31, the application (e.g., the maps application) displayed on the left-side of the split screen is currently associated with standard edge-swipe gesture criteria, and the application (e.g., the games application) displayed on the right side of the split screen is currently associated with enhanced edge-swipe gesture criteria. In these examples, the enhanced edge swipe gesture criteria require that two edge-swipe gestures be detected in order to trigger the system operation of navigating to another user interface outside of the currently displayed application(s). In addition, the enhanced edge swipe gesture criteria require that at least the first edge-swipe gesture of the two consecutive edge-swipe gestures must meet the enhanced location requirement (e.g., must start on or below the home affordance 4802-2) in order to temporarily disable the edge protection and allowing the second edge swipe gesture meeting the standard edge-swipe gesture criteria to trigger a system level navigation operation (e.g., navigating to the home screen, the application-switcher user interface, or another application that is not currently displayed on the split screen).

In the example scenario shown in FIGS. 5D15-5D24, as shown in FIG. 5D15, the maps application is in guided navigation mode which requires edge protection. In the guided navigation mode, user interactions with the maps user interface 4806-2 is given priority over system-level navigation, because accidental triggering of system-level navigation during usage of the guided navigation mode (e.g., during driving) is disadvantageous. Contact 4832 is detected at a location on home affordance 4802-2 on the side of the maps application (e.g., on the user interface 4806-2). The home affordance 4802-2 is displayed in the second appearance state (e.g., translucent, with reduced visibility). Upward movement of contact 4832 (e.g., meeting the standard edge-swipe gesture criteria, and the enhanced location requirement (e.g., applicable to the first swipe of two consecutive edge swipes) of the enhanced edge-swipe gesture criteria, but not meeting the gesture-repeat requirement of the enhanced edge-swipe gesture criteria) causes the edge protection to be temporarily disabled, as indicated by the change in the appearance state of the home affordance 4802 from the second appearance state (e.g., as shown in FIG. 5D15) to the first appearance state (e.g., as shown in FIG. 5D16). In some embodiments, the upward movement of contact 4832 is optionally provided as input to the maps application, as it did not meet the enhanced edge-swipe gesture criteria associated with the maps application. In this example, the upward movement of contact 4832 causes a menu displayed at the starting location of contact 4832 to be dragged upward in user interface 4806-2. No system-level operation is performed to replace or change the split-screen user interface as a whole. No transitional user interface is displayed as a result of the standard edge-swipe gesture by contact 4832.

In FIGS. 5D17-5D24, a second upward edge swipe gesture by contact 4832 is detected (e.g., at a starting location outside of the home affordance 4802-1 in the first appearance state). The second upward edge swipe gesture by contact 4834 meets the standard edge-swipe gesture criteria by itself, and meets the enhanced edge-swipe gesture criteria in combination with the first edge-swipe gesture by contact 4832 (e.g., gesture by contact 4834 is detected within a threshold amount of time after the gesture by contact 4836). The upward edge swipe gesture by contact 4832 causes performance of a system operation, including, for example, navigation from the application user interfaces (e.g., user interface 4806-2 and 4808-1) displayed in the split screen mode (e.g., as shown in FIG. 5D17) to a user interface outside of the application(s), such as a system user interface (e.g., initially to a transitional user interface 4822-1 (e.g., in FIG. 5D18) or 4822-2 (e.g., in FIG. 5D20), 4822-3 (e.g., in FIG. 5D23), and ultimately to a home screen user interface (e.g., in FIG. 5D21) or an application switcher user interface (e.g., in FIG. 5D19),) or a user interface of another application (e.g., in FIG. 5D24), in accordance with various navigation criteria (e.g., criteria described with respect to the processes shown in FIGS. 9A-9C and 10A-10D). The navigation processes illustrated in 5D15-5D24 are analogous to those in FIGS. 5D1-5D8, and are not repeated herein in the interest of brevity.

In the example shown in FIGS. 5D25-5D31, the application (e.g., the maps application) displayed on the left-side of the split screen is currently associated with standard edge-swipe gesture criteria, and the application (e.g., the games application) displayed on the right side of the split screen is currently associated with enhanced edge-swipe gesture criteria. In FIGS. 5D25, the games application is in a game playing mode (e.g., a piano keyboard playing mode) which requires edge protection. In the game playing mode, user interactions with the games user interface 4808-2 is given priority over system-level navigation, because accidental triggering of system-level navigation during usage of the game playing mode (e.g., during active gaming) is disadvantageous. Contact 4838 is detected at a location on home affordance 4802-2 on the side of the games application (e.g., on the user interface 4808-2). The home affordance 4802-2 is displayed in the second appearance state (e.g., translucent, with reduced visibility). Upward movement of contact 4838 (e.g., meeting the standard edge-swipe gesture criteria, and the enhanced location requirement (e.g., applicable to the first swipe of two consecutive edge swipes) of the enhanced edge-swipe gesture criteria, but not meeting the gesture-repeat requirement of the enhanced edge-swipe gesture criteria) causes the edge protection to be temporarily disabled, as indicated by the change in the appearance state of the home affordance 4802 from the second appearance state (e.g., as shown in FIG. 5D25) to the first appearance state (e.g., as shown in FIG. 5D26). In some embodiments, the upward movement of contact 4838 is optionally provided as input to the games application, as it did not meet the enhanced edge-swipe gesture criteria associated with the games application. In this example, the upward movement of contact 4838 causes a piano key (key "C") displayed at the starting location of contact 4838 to be pressed in user interface 4808-2. No system-level operation is performed to replace or change the split-screen user interface as a whole. No transitional user interface is displayed as a result of the standard edge-swipe gesture by contact 4838.

In FIGS. 5D27-5D31, a second upward edge swipe gesture by contact 4840 is detected (e.g., at a starting location outside of the home affordance 4802-1 in the first appearance state). The second upward edge swipe gesture by contact 4840 meets the standard edge-swipe gesture criteria by itself, and meets the enhanced edge-swipe gesture criteria in combination with the first edge-swipe gesture by contact 4838 (e.g., gesture by contact 4840 is detected within a threshold amount of time after the gesture by contact 4838). The upward edge swipe gesture by contact 4840 causes performance of a system operation, including, for example, navigation from the application user interfaces (e.g., user interface 4806-1 and 4808-2) displayed in the split screen mode (e.g., as shown in FIG. 5D27) to a user interface outside of the application(s), such as a system user interface (e.g., initially to a transitional user interface 4822-1 (e.g., in FIG. 5D28) or 4822-2 (e.g., in FIG. 5D30), and ultimately to a home screen user interface (e.g., in FIG. 5D31) or an application switcher user interface (e.g., in FIG. 5D29)), in accordance with various navigation criteria (e.g., criteria described with respect to the processes shown in FIGS. 9A-9C and 10A-10D). The navigation processes illustrated in 5D27-5D31 are analogous to those in FIGS. 5D1-5D6, and are not repeated herein in the interest of brevity.

As illustrated in the two example scenarios in FIGS. 5D15-5D24 and FIGS. 5D25-5D31, when one of the two concurrently displayed applications are associated with enhanced edge-swipe gesture criteria, a gesture detected on the side of the edge-protected application must meet the enhanced edge-swipe gesture criteria in order to cause the performance of the system operation (e.g., navigation to a user interface outside of the currently displayed application(s)). A gesture detected on the side of the edge-protected application (e.g., as combined with an earlier gesture that meets the enhanced location requirement) that meets the enhanced edge-swipe gesture criteria causes the gesture to be intercepted and prevents the gesture from being passed to the underlying application. In contrast, a gesture detected on the side of the edge-protected application that does not meet the enhanced edge-swipe gesture criteria is optionally passed to the application as input, and does not cause performance of a system operation (e.g., navigation to a user interface outside of the currently displayed application(s)).

In contrast to the example scenarios shown in FIGS. 5D15-5D24 and FIGS. 5D25-5D31, FIGS. 5D32-5D36 and FIGS. 5D37-5D43 illustrate two example scenario where an upward edge swipe gesture meeting the standard edge-swipe gesture criteria is detected on the side of the split screen that displays an application associated with the standard edge-swipe gesture criteria. In these example scenarios, the upward edge swipe gesture meeting the standard edge-swipe gesture criteria (e.g., no enhanced location requirement or gesture-repeat requirement needs to be met) causes the performed of a system operation (e.g., navigating to a user interface outside of the currently displayed application(s)), irrespective of the fact that the other side of the split screen displays an application associated with the enhanced edge-swipe gesture criteria.

As shown in FIGS. 5D32, the maps application (e.g., with user interface 4806-2) on the left-side of the split screen is edge-protected (e.g., in a guided navigation mode) and the games application (e.g., with user interface 4808-1) on the right side of the split screen is not edge-protected. Home affordance 4802-2 is displayed in the second appearance state (e.g., translucent, with reduced visibility) to indicate that at least one of the applications underlying the home affordance is currently associated with enhanced edge-swipe gesture criteria. A contact 4842 is detected at a location proximity to the bottom edge of the screen on the side of the games application, as shown in FIG. 5D32. An upward swipe gesture by contact 4842 meets the standard edge-swipe gesture criteria associated with the games application, and causes the performance of the system operation, including, for example, navigation from the application user interfaces (e.g., user interface 4806-2 and 4808-1) displayed in the split screen mode (e.g., as shown in FIG. 5D32) to a user interface outside of the application(s), such as a system user interface (e.g., initially to a transitional user interface 4822-1 (e.g., in FIG. 5D33) or 4822-2 (e.g., in FIG. 5D35), and ultimately to a home screen user interface (e.g., in FIG. 5D36) or an application switcher user interface (e.g., in FIG. 5D34),), in accordance with various navigation criteria (e.g., criteria described with respect to the processes shown in FIGS. 9A-9C and 10A-10D). The navigation processes illustrated in 5D32-5D36 are analogous to those in FIGS. 5D1-5D6, and are not repeated herein in the interest of brevity.

As shown in FIGS. 5D37, the maps application (e.g., with user interface 4806-1) on the left-side of the split screen is not edge-protected and the games application (e.g., with user interface 4808-2) on the right side of the split screen is edge-protected (e.g., in a game playing mode). Home affordance 4802-2 is displayed in the second appearance state (e.g., translucent, with reduced visibility) to indicate that at least one of the applications underlying the home affordance is currently associated with enhanced edge-swipe gesture criteria. A contact 4844 is detected at a location proximity to the bottom edge of the screen on the side of the maps application, as shown in FIG. 5D37. An upward swipe gesture by contact 4844 meets the standard edge-swipe gesture criteria associated with the maps application, and causes the performance of the system operation, including, for example, navigation from the application user interfaces (e.g., user interface 4806-1 and 4808-2) displayed in the split screen mode (e.g., as shown in FIG. 5D37) to a user interface outside of the application(s), such as a system user interface (e.g., initially to a transitional user interface 4822-1 (e.g., in FIG. 5D38), 4822-2 (e.g., in FIG. 5D40), or 4822-3 (e.g., in FIG. 5D42), and ultimately to a home screen user interface (e.g., in FIG. 5D41), an application switcher user interface (e.g., in FIG. 5D39),), or a user interface of another application (e.g., in FIG. 5D43), in accordance with various navigation criteria (e.g., criteria described with respect to the processes shown in FIGS. 9A-9C and 10A-10D). The navigation processes illustrated in 5D37-5D43 are analogous to those in FIGS. 5D1-5D8, and are not repeated herein in the interest of brevity.

In contrast to the example scenarios shown in FIGS. 5D15-5D24 and FIGS. 5D25-5D31 and the example scenarios shown in FIGS. 5D32-5D36 and FIGS. 5D37-5D43, FIGS. 5D44-5D49 illustrate two example scenario where an upward edge swipe gesture meeting the standard edge-swipe gesture criteria is detected on the side of the split screen that displays an application associated with the enhanced edge-swipe gesture criteria. In these example scenarios, the upward edge swipe gesture meeting the standard edge-swipe gesture criteria (e.g., no enhanced location requirement or gesture-repeat requirement needs to be met) does not temporarily disable the edge protection for the underlying application (e.g., because the enhanced location requirement applicable to an initial swipe is not met) and does not causes the performed of a system operation (e.g., because the enhanced location requirement and the gesture-repeat criteria of the enhanced edge-swipe gesture criteria associated with the underlying application are not met). Instead of navigating to a user interface outside of the currently displayed application(s)), the gesture is passed to the underlying application as input, and optionally causes an operation to be performed within the application.

As shown in FIGS. 5D44, the maps application (e.g., with user interface 4806-2) on the left-side of the split screen is edge-protected (e.g., in a guided navigation mode) and the games application (e.g., with user interface 4808-1) on the right side of the split screen is not edge-protected. Home affordance 4802-2 is displayed in the second appearance state (e.g., translucent, with reduced visibility) to indicate that at least one of the applications underlying the home affordance is currently associated with enhanced edge-swipe gesture criteria. A contact 4848 is detected at a location proximity to the bottom edge of the screen on the side of the maps application, as shown in FIG. 5D44. An upward swipe gesture by contact 4848 meets the standard edge-swipe gesture criteria associated with the maps application, and but not the enhanced edge-swipe gesture criteria. The upward swipe gesture also does not meet the enhanced location requirement to temporarily disable the edge protection against a subsequent edge swipe, as a result, the home affordance continues to be displayed in the second appearance state (e.g., translucent, with reduced visibility), and no system operation is performed, for example, no navigation from the application user interfaces (e.g., user interface 4806-2 and 4808-1) displayed in the split screen mode (e.g., as shown in FIG. 5D44) to a user interface outside of the application(s) is performed. Instead, the gesture input by contact 4848 is provide to the underlying application (e.g., the maps application), and an operation within the application is performed in accordance with the gesture input (e.g., a menu underlying the contact 4848 is dragged onto the screen in accordance with the movement of contact 4848, as shown in FIG. 5D45. When contact 4848 ceases to be detected, user interface 4806-2 of the maps application is restored, e.g., the menu retracts and is removed from the display, as shown in FIG. 5D46.

As shown in FIGS. 5D47, the maps application (e.g., with user interface 4806-1) on the left-side of the split screen is not edge-protected and the games application (e.g., with user interface 4808-2) on the right side of the split screen is edge-protected (e.g., in the game playing mode). Home affordance 4802-2 is displayed in the second appearance state (e.g., translucent, with reduced visibility) to indicate that at least one of the applications underlying the home affordance is currently associated with enhanced edge-swipe gesture criteria. A contact 4850 is detected at a location proximity to the bottom edge of the screen on the side of the games application, as shown in FIG. 5D47. An upward swipe gesture by contact 4850 meets the standard edge-swipe gesture criteria associated with the games application, and but not the enhanced edge-swipe gesture criteria. The upward swipe gesture also does not meet the enhanced location requirement to temporarily disable the edge protection against a subsequent edge swipe, as a result, the home affordance continues to be displayed in the second appearance state (e.g., translucent, with reduced visibility), and no system operation is performed, for example, no navigation from the application user interfaces (e.g., user interface 4806-2 and 4808-1) displayed in the split screen mode (e.g., as shown in FIG. 5D48) to a user interface outside of the application(s) is performed. Instead, the gesture input by contact 4848 is provide to the underlying application (e.g., the games application), and an operation within the application is performed in accordance with the gesture input (e.g., a piano key underlying the contact 4850 is pressed in accordance with the movement of contact 4850, as shown in FIG. 5D48. When contact 4850 ceases to be detected, user interface 4808-2 of the games application is restored, e.g., the pressed piano key is restored, as shown in FIG. 5D50.

In the example scenario shown in FIGS. 5D50-5D56, the applications on both sides of the split screen are edge-protected. In order to trigger the navigation to a user interface outside of the application using an edge swipe gesture, enhanced edge-swipe criteria needs to be met. First, an edge swipe gesture meeting the standard edge-swipe gesture criteria and an enhanced location requirement application to a first swipe of two consecutive edge-swipes is detected, which causes the edge protection to be disabled temporarily for both applications. Subsequently, a second edge swipe gesture meeting the standard edge-swipe gesture criteria (detected anywhere along the bottom edge, on either side of the split screen) is detected, causing the performance of the system operation.

As shown in FIG. 5D50, the maps application (e.g., with user interface 4806-2) and the games application (e.g., with user interface 4808-2) are displayed side by side on the touch-screen, with home affordance 4802-2 displayed in the second appearance state (e.g., translucent, with reduced visibility), overlaying both applications. A first edge-swipe gesture by contact 4852 is detected on the home affordance 4802, causing the home affordance to change its appearance state from the second appearance state (e.g., translucent, with reduced visibility) to the first appearance state (e.g., opaque, with standard visibility), as shown in FIG. 5D51, indicating that edge protection is temporarily disabled for both applications. In FIGS. 5D52-5D56, a second edge-swipe gesture by contact 4854 is detected, while edge protection is temporarily disabled for both applications (e.g., as indicated by the first appearance state of the home affordance 4802-1 in FIG. 5D52). The second edge-swipe gesture meets standard edge swipe criteria (e.g., various types of navigation criteria described with respective to FIGS. 9A-9C and 10A-10D) by itself, and is not required to meet the enhanced location requirement imposed on the first swipe of the two consecutive edge swipes needed to meet the enhanced location requirement, in some embodiments. The second edge-swipe gesture by contact 4854, in combination with the prior gesture by contact 4852), meets the enhanced edge-swipe gesture criteria associated with the two underlying applications, and causes the performance of the system operation, including, for example, navigation from the application user interfaces (e.g., user interfaces 4806-2 and 4808-2) displayed in the split screen mode (e.g., as shown in FIG. 5D52) to a user interface outside of the application(s), such as a system user interface (e.g., initially to a transitional user interface 4822-1 (e.g., in FIG. 5D53), 4822-2 (e.g., in FIG. 5D55), or 4822-3 (e.g., in FIG. 5D57), and ultimately to a home screen user interface (e.g., in FIG. 5D56), an application switcher user interface (e.g., in FIG. 5D54),), or a user interface of another application (e.g., in FIG. 5D58), in accordance with various navigation criteria (e.g., criteria described with respect to the processes shown in FIGS. 9A-9C and 10A-10D). The navigation processes illustrated in 5D52-5D58 are analogous to those in FIGS. 5D1-5D8, and are not repeated herein in the interest of brevity.

FIGS. 5D59-5D60 and FIGS. 5D60-5D61 illustrate two example scenarios in which both sides of the split screen are occupied by applications that are associated with enhanced edge-swipe gesture criteria and are edge protected. In contrast to the example scenarios shown in FIGS. 5D50-5D58, FIGS. 5D59-5D60 and FIGS. 5D60-61 illustrate two example scenario where an upward edge swipe gesture meeting the standard edge-swipe gesture criteria is detected on a side of the split screen, and not on the home affordance. Therefore, the edge-swipe gesture does not meet the enhanced location requirement or gesture-repeat requirement of the enhanced edge-swipe gesture criteria associated with both applications. As a result, the edge-swipe gesture (e.g., by contact 4856 or contact 4858) does not temporarily disable the edge protection for the underlying applications (e.g., because the enhanced location requirement applicable to an initial swipe is not met) and does not causes the performed of a system operation (e.g., because the enhanced location requirement and the gesture-repeat criteria of the enhanced edge-swipe gesture criteria associated with the underlying applications are not met). Instead of navigating to a user interface outside of the currently displayed application(s)), the gesture is passed to the underlying application of the gesture as input, and optionally causes an operation to be performed within the application.

As shown in FIGS. 5D59-5D60, an upward swipe gesture by contact 4856 is detected near the bottom edge of the touch-screen, on the side of the games application. The swipe gesture meets the standard edge-swipe gesture criteria, but does not disable edge protection, or cause navigation to a different user interface outside of the application. In some embodiments, the gesture is passed to the underlying games application, and causes the piano key in the user interface 4804-2 to be pressed in accordance with the gesture by contact 4856. Similarly, as shown in FIGS. 5D61-5D62, an upward swipe gesture by contact 4858 is detected near the bottom edge of the touch-screen, on the side of the maps application. The swipe gesture meets the standard edge-swipe gesture criteria, but does not disable edge protection, or cause navigation to a different user interface outside of the application. In some embodiments, the gesture is passed to the underlying maps application, and causes a menu in the user interface 4806-2 to be dragged onto the screen in accordance with the gesture by contact 4858.

FIGS. 5D63-5D64 illustrates that, when at least one or both sides of the split screen are occupied by edge protected applications (e.g., as shown in FIG. 5D63 with home affordance in the second appearance state), if a virtual keyboard (e.g., virtual keyboard 4860) is invoked (e.g., in response to a tap gesture by contact 4859 in a text input field of user interface 4806-1) and overlaid on the touch-screen (e.g., spanning both the first application and the second application on the split screen), edge protection is temporarily disabled for both applications underlying the virtual keyboard. As shown in FIG. 5D64, home affordance 4802-1 is displayed in the first appearance state (e.g., opaque, with standard visibility), indicating that an edge-swipe gesture meeting the standard edge-swipe gesture criteria, if detected, would cause performance of a system operation, including, for example, navigation from the application user interfaces (e.g., user interfaces 4806-2 and 4808-2) displayed in the split screen mode (e.g., as shown in FIG. 5D64) to a user interface outside of the application(s), such as a system user interface (e.g., initially to a transitional user interface 4822-1, 4822-2, or 4822-3, and ultimately to a home screen user interface, an application switcher user interface, or a user interface of another application, in accordance with various navigation criteria (e.g., criteria described with respect to the processes shown in FIGS. 9A-9C and 10A-10D). The navigation processes are analogous to those in FIGS. 5D1-5D8, and are not repeated herein in the interest of brevity.

FIGS. 5D65-5D98 illustrate example user interfaces displayed in a split-screen display mode, where a system user interface element changes its appearance state based on one or more behaviors of the application(s) underlying the system user interface element, in accordance with some embodiments.

In an example scenario shown in FIGS. 5D65-5D67, the applications displayed on both sides of the split screen (e.g., with the maps application displayed on the left and the games application displayed on the right) are associated with standard edge-swipe gesture criteria (as opposed to enhanced edge-swipe gesture criteria) and are not edge protected. Neither of the two applications displayed on the split screen has requested to auto-hide the home affordance 4802-1. As a request to resize the applications (e.g., expanding the application on the left and shrinking the application on the right) is received (e.g., a drag input by contact 4862 on the divider 4804 is detected), the maps application on the left side of the split screen is expanded from one third of the screen width (e.g., as shown in FIG. 5D65) to one half of the screen width (e.g., as shown in FIG. 5D66), and then to two thirds of the screen width (e.g., as shown in FIG. 5D67). The home affordance 4802-1 is entirely displayed over the games application on the right side of the split screen, when the games application occupies two thirds of the screen width, as shown in FIG. 5D65. The home affordance is displayed in the first appearance state (e.g., opaque, with standard visibility), to indicate that the underlying application (e.g., the games application) is associated with standard edge-swipe gesture criteria), as shown in FIG. 5D65. When the maps application occupies one half of the split screen and the games application occupies one half of the split screen, the home affordance 4802-1 is overlapping with a portion of the maps application and a portion of the games application, as shown in FIG. 5D66. The home affordance remains displayed in the first appearance state, to indicate that both of the underlying applications are associated with standard edge-swipe gesture criteria (e.g., no edge protection enabled on either application), as shown in FIG. 5D66. When the maps application occupies two thirds of the screen width, the home affordance is entirely displayed over the maps application, as shown in FIG. 5D67. The home affordance remains displayed in the first appearance state, to indicate that the underlying maps application is associated with standard edge-swipe gesture criteria. When the split screen is shown in the configurations in FIGS. 5D65-5D67, an edge-swipe gesture meeting the standard edge-swipe gesture criteria will cause performance of the system operation, e.g., including navigating to a user interface outside of the currently displayed applications, irrespective of which side of the split screen that the edge-swipe gesture is detected or whether the edge-swipe gesture is detected on the home affordance 4802-1. In these examples, the appearance state of the home affordance is determined based on the behaviors of either or both of the applications, because both applications have the same behaviors (e.g., neither is edge-protected, and neither requested to auto-hide the home affordance).

In an example scenario shown in FIGS. 5D68-5D70, the applications displayed on the two sides of the split screen are associated with different behaviors that will affect the appearance state of the home affordance 4802. For example, as shown in FIG. 5D68, the maps application displayed on the left side of the split screen, and is associated with standard edge-swipe gesture criteria. The games application is displayed on the right side of the split screen, and is associated with enhanced edge-swipe gesture criteria. Neither of the two applications displayed on the split screen has requested to auto-hide the home affordance 4802. As a request to resize the applications (e.g., expanding the application on the left and shrinking the application on the right) is received (e.g., a drag input by contact 4864 on the divider 4804 is detected), the maps application on the left side of the split screen is expanded from one third of the screen width (e.g., as shown in FIG. 5D68) to one half of the screen width (e.g., as shown in FIG. 5D69), and then to two thirds of the screen width (e.g., as shown in FIG. 5D70). The home affordance 4802-2 is entirely displayed over the games application on the right side of the split screen, when the games application occupies two thirds of the screen width, as shown in FIG. 5D68. The home affordance is displayed in the second appearance state (e.g., translucent, with reduced visibility), to indicate that the underlying application (e.g., the games application) is associated with enhanced edge-swipe gesture criteria), as shown in FIG. 5D68. When the maps application occupies one half of the split screen and the games application occupies one half of the split screen, the home affordance 4802-2 is overlapping with a portion of the maps application and a portion of the games application, as shown in FIG. 5D69. The home affordance remains displayed in the second appearance state (e.g., translucent, with reduced visibility), to indicate that at least one of the two underlying applications is associated with enhanced edge-swipe gesture criteria (e.g., edge protection enabled on the games application), as shown in FIG. 5D69. When the maps application occupies two thirds of the screen width, the home affordance is entirely displayed over the maps application, as shown in FIG. 5D70. The home affordance switches from being displayed in the second appearance state (e.g., translucent, with reduced visibility) to the first appearance state (e.g., opaque, with standard visibility), to indicate that the underlying maps application is associated with standard edge-swipe gesture criteria. In this example, the visual feedback provided on the home affordance through the appearance state of the home affordance favors the edge protected application, and at long as one of the two applications underlying the home affordance is edge protected, the home affordance is displayed in the second appearance state, so that the user becomes aware additional care may be required when providing an edge-swipe input (e.g., to meet the enhanced edge-swipe gesture criteria) to navigate to a user interface outside of the currently displayed applications. In some embodiments, the appearance state of the home affordance remains in the first appearance state, if only one of the underlying applications is associated with enhanced edge-swipe gesture criteria; and the home affordance switches to the second appearance state only when both underlying applications are associated with enhanced edge-swipe gesture criteria.

When the split screen is shown in the configurations in FIGS. 5D68 and 5D69, a standard edge-swipe input detected on the left-side of the split screen (e.g., the side that is not edge-protected) will cause performance of the system operation, including navigating to a user interface outside of the currently displayed application(s). The process for providing the required gesture to perform the system operation is analogous to those illustrated in FIGS. 5D37-5D43, and the description is not repeated herein in the interest of brevity. If an edge-swipe gesture is detected on the right side of the split screen (e.g., the side that is edge protected), the edge-swipe gesture has to meet the enhanced edge-swipe gesture criteria in order to trigger the performance of the system operation. The process for providing the required gesture(s) to perform the system operation is analogous to those illustrated in FIGS. 5D25-5D31, and the description is not repeated here in the interest of brevity.

When the split screen is shown in the configuration in FIG. 5D70, a standard edge-swipe input detected on the left-side of the split screen (e.g., the side that is not edge-protected) will cause performance of the system operation, including navigating to a user interface outside of the currently displayed application(s). The process for providing the required gesture to perform the system operation is analogous to those illustrated in FIGS. 5D37-5D43, and the description is not repeated herein in the interest of brevity. If an edge-swipe gesture is detected on the right side of the split screen (e.g., the side that is edge protected), the edge-swipe gesture cannot meet the enhanced location requirement (e.g., swiping on the home affordance) of the enhanced edge-swipe gesture criteria, and as a result, the edge-swipe gesture does not trigger the performance of the system operation. In some embodiments, the edge-swipe gesture is provided to the underlying games application as input. In some embodiments, the edge-swipe gesture is ignored and causes no operation within the application.

In FIGS. 5D68-5D70, an edge-swipe gesture meeting the standard edge-swipe gesture criteria will cause performance of the system operation, e.g., including navigating to a user interface outside of the currently displayed applications, if it is detected on the side of the split screen that displays the non-edge-protected application. Enhanced edge-swipe gesture criteria have to be met to trigger the system operation, when the swipe input is detected on the edge-protected side that overlaps with the home affordance. If the swipe input is detected on the edge-protected side, and the home affordance does not overlap with that side, the edge-swipe input cannot trigger a system operation for navigating to a user interface outside of the currently displayed applications.

If another resize input is detected to change the relative sizes of the applications in a reverse process of that shown in FIGS. 5D68-5D70, the home affordance will switch from the first appearance state (e.g., when the home affordance overlays only the non-edge-protected application) (e.g., as shown in FIG. 5D70), to the second appearance state (e.g., when the home affordance overlays both the edge-protected application and the non-edge-protected application) (e.g., as shown in FIG. 5D69), and remains in the second appearance state (e.g., when the home affordance overlays only the edge-protected application) (e.g., as shown in FIG. 5D68).

In an example scenario shown in FIGS. 5D71-5D76, the two applications on the split screen includes an application that has not requested to auto-hide the home affordance, and another application that has requested to auto-hide the home affordance. An application sends a request to auto-hide the home affordance, and optionally other user interface elements, to provide a more immersive experience to the user without distracting from user interface elements that are not the primary content viewed by the user.

In FIG. 5D71, a maps application is displayed on the left-side of the split screen, and a video application (e.g., with user interface 4810-1) is displayed on the right-side of the split screen. The maps application is not associated with enhanced edge-swipe gesture criteria, and the has not requested to auto-hide the home affordance. The video application is not associated with enhanced edge-swipe gesture criteria, and has not requested to auto-hide the home affordance, at the present time. In FIG. 5D71, the map application occupies one third of the screen width, and the video application occupies two thirds of the screen width. The home affordance is displayed entirely on the video application, and is in the first appearance state (e.g., opaque, with standard visibility) to indicate that the video application is associated with standard edge-swipe gesture criteria (e.g., not edge-protected).

In FIGS. 5D71 and 5D72, in response to a user input (e.g., a tap input by contact 4866) requesting playback of a video in the video application, video playback is started, and the video application sends a request to auto-hide the home affordance and optionally the playback control bar 4868 that is displayed on user interface 4810-2 of the video application. In FIG. 5D71, before the request to auto-hide the home affordance is received, the home affordance 4802-1 is displayed in the first appearance state (e.g., opaque, with standard visibility) indefinitely. In FIG. 5D72, after the video playback is started, and the request to auto-hide the home affordance is received from the video application, the home affordance 4802-1 remains in the first appearance state (e.g., opaque, with standard visibility), before a timeout period started by the request of the auto-hide expires. In FIG. 5D73, when the timeout period started by the request of the auto-hide expires, the home affordance displayed on the video application transitions to a third appearance state (e.g., hidden, or further reduced visibility) from the first appearance state (e.g., opaque, with standard visibility).

After the home affordance has become hidden on the right side of the split screen, as shown in FIG. 5D73, a request to resize the applications is received (e.g., a drag input by contact 4870 is detected on divider 4804). In response to the request to resize the applications, the relative widths of the applications are changed from 1:2 (e.g., as shown in FIG. 5D74), to 1:1 (e.g., as shown in FIG. 5D75), to 2:1 (e.g., as shown in FIG. 5D76). As a result, the appearance state of the home affordance is determined based on the behaviors of the application(s) underlying the home affordance. In this example, the application with auto-hide behavior is given priority over the application that does not have the auto-hide behavior and is not edge-protected. When the home affordance's position is entirely over the application that has requested to auto-hide the home affordance, the home affordance is displayed in the third appearance state (e.g., hidden, or with further reduced visibility), as shown in FIG. 5D74. When the home affordance's position is on both the application (e.g., the video application) that requested to auto-hide the home affordance, and the application that has not requested to auto-hide the home affordance and that is not edge-protected, the home affordance remains in the third appearance state (e.g., hidden, or with further reduced visibility), as shown in FIG. 5D75. When the home affordance's position is entirely on the application that has not requested to auto-hide the home affordance and is not edge-protected, the home affordance switches from the third appearance state (e.g., hidden, or with further reduced visibility) (e.g., as shown in FIG. 5D75) to the first appearance state (e.g., opaque, with standard visibility) (e.g., as shown in FIG. 5D76).

In FIGS. 5D76-5D79, a request to resize the applications is received that reverses the size changes shown in FIGS. 5D74-5D76. In the reverse resize process, the home affordance is initially displayed entirely over the application that is not edge-protected and has not requested to auto-hide the home affordance, and the home affordance is in the first appearance state, as shown in FIG. 5D76. When the screen is split evenly between the maps application and the video application, the home affordance overlays both the maps application and the video application, as shown in FIG. 5D77. The video application sends request to auto-hide the home affordance, and the home affordance remains displayed in the first appearance state, before the timeout period started by the request expires, as shown in FIG. 5D77. When the timeout period started by the request expires, the home affordance transitions from the first appearance state (e.g., opaque, with standard visibility) (e.g., as shown in FIG. 5D77) to the third appearance state (e.g., hidden, or further reduced visibility) (e.g., as shown in FIG. 5D78). When the home affordance's position is entirely on the video application, as shown in FIG. 5D79, the home affordance is in the third appearance state (e.g., hidden, with further reduced visibility).

In FIGS. 5D71-5D79, both applications are associated with standard edge-swipe gesture criteria, and an edge-swipe gesture meeting the standard edge-swipe gesture criteria will cause performance of the system operation, irrespective of whether the home affordance is visible on the split screen or on the side of the screen that received the edge-swipe gesture. In FIGS. 5D71-5D79, auto-hide behavior is given priority over non-edge-protection behavior, and if the home affordance overlays at least one application that has requested to auto-hide the home affordance, the home affordance will be displayed in the third appearance state, irrespective of whether the other application has requested to auto-hide the affordance or not.

In FIGS. 5D80-5D98, the applications on the two-sides of the split screen have different behaviors, e.g., the application on the left-side of the split screen is associated with enhanced edge-swipe gesture criteria and has not requested to auto-hide the home affordance, while the application on the right side of the split screen is associated with standard edge-swipe gesture criteria and has requested to auto-hide the home affordance. In this example, the application on the left side of the split screen is the games application, and the application on the right side of the split screen is the video application, for illustrative purposes. In various embodiments, the application on the left-side of the split screen can be the maps application (or another application that is associated with the enhanced edge-swipe gesture criteria and has not requested to auto-hide the home affordance), and the application on the right-side of the split screen can be the video application (or other application that is associated with the standard edge-swipe gesture criteria and has requested to auto-hide the home affordance).

When the applications on the two sides of the split screen have conflicting behaviors with regard to the appearance of the home affordance, e.g., one side wants to hide the home affordance and the other side wants to show the affordance with the second appearance state, the operating system decides which behavior is given priority in determining the appearance state of the home affordance based on the relative location of the home affordance and the two applications. In some embodiments, auto-hide behavior is given priority over edge-protection behavior. In some embodiments, edge-protection is given priority over auto-hide behavior.

In FIGS. 5D80, in accordance with some embodiments, the screen is split between the games app that is associated with enhanced edge-swipe gesture criteria (e.g., is edge-protected), and the video application that has requested to auto-hide the home affordance. The home affordance is displayed in the second appearance state (e.g., translucent) when it is entirely displayed on the side of the games application, irrespective of the fact that the video app has the auto-hide behavior. The navigation process for the screen configuration shown in FIG. 5D80 is analogous to that shown in FIGS. 5D15-5D21, if an edge-swipe input is detected anywhere on the left-side of the split screen (e.g., the edge-protected side) and any standard edge-swipe input on the right-side of the split screen will also trigger the system operation to navigate to a user interface outside of the currently displayed applications.

In FIGS. 5D80-5D81, when the home affordance transitions from overlapping with only the edge-protected application to overlapping with both the edge-protected application and the application that has requested to auto-hide the home affordance, the home affordance remains in the second appearance state (e.g., translucent, with reduced visibility) initially (e.g., before the expiration of the timeout period started by the request to auto-hide sent by the video application) (e.g., as shown in FIG. 5D81), and eventually transitions to the third appearance state (e.g., hidden, or with further reduced visibility). In FIG. 5D83, when the position of the home affordance is entirely on the application that requests to auto-hide the home affordance, the home affordance is displayed with the third appearance state (e.g., hidden, with further reduced visibility). In some embodiments, the timeout period is started when the home affordance enters the region occupied by an application that has the auto-hide behavior. In some embodiments, the timeout period is started when no contact is detected on the touch-screen (e.g., after the lift-off of the contact 4872 is detected, and the configuration of the split screen is settled into one of several preset configurations (e.g., 1:2, 1:1, 2:1 width ratios)).

In the configurations shown in FIGS. 5D81 and 5D82, a gesture detected on the left-side of the split screen needs to meet enhanced swipe-gesture criteria in order for the gesture to trigger performance of the system operation; while a gesture detected on the right-side of the split screen only needs to meet standard edge-swipe gesture criteria to trigger performance of the system operation.

In the configuration shown in FIG. 5D83, a gesture detected on the right side of the split screen (e.g., auto-hide side) only needs to meet the standard edge-swipe gesture criteria to trigger performance of the system operation, while a gesture detected on the left-side of the split screen (e.g., edge-protected side) cannot trigger the system operation and will be ignored or passed to the application directly.

In FIGS. 5D84-5D88, the left side of the split screen is occupied by the games application in edge-protected mode, and the right side of the split screen is occupied by the video application that requests to auto-hide the home affordance with video-playback is started. As shown in FIG. 5D84, initially, the home affordance is displayed entirely on the right side of the split screen overlaying the video application (e.g., with user interface 4810-1). The home affordance is displayed in the first appearance state (e.g., opaque, with standard visibility) over the video application, as shown in FIG. 5D84. A request to start playback of the video is received (e.g., a tap input by contact 4874), and playback of a video is started on the right side of the split screen and the video application sends a request to auto-hide the home affordance, as shown in FIG. 5D84. As shown in FIGS. 5D84-5D85, after the request to auto-hide the home affordance is generated by the video application, a timeout period is started, and the home affordance transitions from the first appearance state (e.g., opaque, with standard visibility) to the third appearance state (e.g., hidden, with further reduced visibility) when the timeout expires (e.g., as shown in FIG. 5D86).

In FIGS. 5D86-5D88, when the applications on the two sides of the split screen are resized (e.g., by a drag input by contact 4876), the appearance state of the home affordance is adjusted based on the behaviors of the applications underlying the home affordance. In FIG. 5D86, the home affordance is located entirely on the application that has requested to auto-hide the home affordance, and the home affordance is displayed in the third appearance state (e.g., hidden, with further reduced visibility). When the home affordance overlays both the application that has requested to auto-hide the home affordance and the application that is associated with enhanced edge-swipe gesture criteria, the home affordance transitions from the third appearance state (e.g., hidden, or with further reduced visibility) to the second appearance state (e.g., translucent, with reduced visibility). In this example, edge protection behavior is given a higher priority than the auto-hide behavior of the underlying applications. In some embodiments, if auto-hide behavior is given a higher priority than the edge protection behavior of the underlying applications, the home affordance will remain in the third appearance state (e.g., hidden, or with further reduced visibility) when in the split screen configuration shown in FIG. 5D49. In FIG. 5D88, when the home affordance is displayed entirely over the application that is associated with the enhanced edge-swipe gesture criteria, the home affordance is displayed in the second appearance state, irrespective of the fact that the other side of the screen has requested to auto-hide the home affordance.

FIGS. 5D89-5D90 illustrate that, when a first application on one side of the split screen (e.g., the games application on the left-side of the split screen) is associated enhanced edge-swipe criteria, and a second application on the other side of the split screen (e.g., the video application on the right-side of the split screen) has requested to auto-hide the home affordance, and when the home affordance is entirely over the second application (e.g., the auto-hide side), the home affordance is displayed in the third appearance state (e.g., hidden, or with further reduced visibility), as shown in FIG. 5D89. An edge-swipe input by contact 4878 is detected on the left-side of the split screen that displays the edge-protected application (e.g., the games application in game playing mode). The edge-swipe input cannot meet the enhanced edge-swipe gesture criteria with an enhanced location requirement (e.g., because the home affordance is not displayed on the left side of the split screen), and the edge-swipe input is provided to the games application which optionally causes an operation within the application to be performed (e.g., piano key under the contact 4878 is pressed), as shown in FIG. 5D90.

FIGS. 5D91-5D92 illustrate that, when a contact 4880 is detected on the side of the split screen that displays the application that has requested to auto-hide the home affordance, the home affordance is redisplayed (e.g., transitions from the third appearance state to the first appearance state) upon detection of the contact 4880 (e.g., as shown in FIG. 5D91). An edge swipe gesture by contact 4880 that meets the standard edge swipe gesture criteria cause the performance of the system operation, including navigating to a user interface outside of the currently displayed applications (e.g., navigating to the transitional user interface 4822-1 or other system user interfaces (e.g., home screen user interface or application switcher user interface) based on various navigation criteria).

FIGS. 5D93-5D94 illustrate that, when a first application on one side of the split screen (e.g., the games application on the left-side of the split screen) is associated enhanced edge-swipe criteria, and a second application on the other side of the split screen (e.g., the video application on the right-side of the split screen) has requested to auto-hide the home affordance, and when the home affordance is entirely over the first application (e.g., the edge-protected side), the home affordance is displayed in the second appearance state (e.g., translucent, or with reduced visibility), as shown in FIG. 5D93. An edge-swipe input by contact 4882 is detected on the right-side of the split screen that displays the application that has requested to auto-hide the home affordance (e.g., the video application in playback mode). The edge-swipe input only needs to meet standard edge-swipe gesture criteria into order to trigger the performance of the system operation, including navigating to a user interface outside of the currently displayed applications (e.g., navigating to the transitional user interface 4822-1 or other system user interfaces (e.g., home screen user interface or application switcher user interface) based on various navigation criteria).

FIGS. 5D95-5D96 illustrate that, when a contact 4880 is detected on the side of the split screen that displays the application that is associated with enhanced edge-swipe gesture criteria, and the home affordance is entirely on the edge-protected application, the home affordance is displayed in the second appearance state (e.g., translucent, with reduced visibility), as shown in FIG. 5D95. An edge swipe gesture by contact 4884 that meets the standard edge swipe gesture criteria and the enhanced location requirement for temporarily disabling the edge protection of the games application, causes the home affordance to transition from the second appearance state (e.g., home affordance 4802-1 in FIG. 5D95) to the first appearance state (e.g., home affordance 4802-1 as shown in FIG. 5D96). A second edge-swipe gesture meeting the standard edge-swipe gesture criteria that is detected while the edge protection is temporarily disabled, causes the performance of the system operation, e.g., including navigating to a user interface outside of the currently displayed applications (e.g., navigating to the transitional user interfaces 4822-1, 4822-2, or 4822-3, other system user interfaces (e.g., home screen user interface or application switcher user interface), or user interface of another application, based on various navigation criteria).

FIGS. 5D97 and 5D98 illustrate that, in contrast to the scenarios shown in FIGS. 5D95-5D96, when an edge swipe gesture by contact 4888 that meets the standard edge swipe gesture criteria but not the enhanced location requirement for temporarily disabling the edge protection of the games application is detected, the input is passed to the underlying application (e.g., the games application) which optionally causes an operation within the application to be performed (e.g., piano key under the contact 4886 is pressed), as shown in FIG. 5D98. The edge-protection remains enabled on the side of the games application, and no system operation is performed to navigate to a user interface outside of the currently displayed applications.

FIG. 5D99 illustrates a system user interface element with an appearance generated in accordance with the appearance of a portion of content underlying the system user interface element, in accordance with some embodiments. The home affordances 4802 shown in the examples in FIGS. 5D1-5D98 are optionally generated in accordance with the visual properties of the portion of the content underlying the affordances, to reflect the changes in the appearance of the portion of the content underlying the affordances (e.g., due to navigation within the user interfaces of the underlying application, due to scrolling within the user interface of the underlying application, due to dynamic changes in the underlying content itself, or due to resizing of the applications, etc.). In addition to the changes derived from the changes in the underlying content, further changes to the appearance state of the affordance is implemented by changing the set of rules used to generate the appearance of the affordance based on the appearance of the underlying content.

In some embodiments, a number of image processing filters are applied (e.g., sequentially, or without restriction on the ordering of the filters) to the background content underlying the affordance to determine the appearance of the affordance. For example, an original full-colored image of the content is desaturated to obtain a luminance map of the content. The luminance of the content is inverted (e.g., in accordance with predefined inversion relationship between the luminance value of the background and the luminance value of the affordance to obtain the luminance value of the affordance at each pixel of the affordance. The inversion relationship between the luminance of the affordance and the luminance of the underlying content is used as an example of a correspondence between the values of a chosen display property of the affordance and the underlying content. Other types of display properties, such as a gray value or a variant of the luminance may also be used in various embodiments.

In some embodiments, the inversion creates a contrast in appearance between the affordance and the underlying content. When a portion of the underlying content is brighter (e.g., with higher luminance values), the corresponding portion of the affordance is darker (e.g., with lower luminance values). For example, the inversion performed on different portions of the desaturated background content with different luminance values results in corresponding portions of the affordance with different luminance values. In some embodiments, after the inversion of performed, a thresholding procedure is performed on the luminance values to reduce the dynamic range of the luminance values. For example, the luminance value of each pixel of the affordance is capped at 50% of a maximum luminance of the affordance to produce a more subdued look with lower internal visual contrast (e.g., comparing the affordance after the inversion and the affordance after the thresholding). In some embodiments, to further reduce the internal variations and contrast within the affordance, a blur filter is applied averaging over the variations in luminance across multiple nearby pixels in the content, and consequently the variations in luminance across multiple nearby pixels in the affordance. In the end, the resulting affordance has broad stroke variations in luminance that correspond to variations of luminance in the underlying content.

In addition, depending on the expected luminance level of the underlying content, the affordance's luminance range value is constrained to a "dark" affordance value range, or a "light" affordance value range, producing either a "dark" affordance or a "light" affordance. In some embodiments, the affordance appearance type (e.g., "dark" vs. "light") do not change after the affordance is initially displayed, even if the appearance of the underlying content changes from very dark to very light, or vice versa. In some embodiments, the affordance appearance type (e.g., "dark" vs. "light") do not change in response to instantaneous changes in content (e.g., temporary inversion of content luminance level on a short timescale), but does eventually change in response to more sustained changes in content (e.g., inversion of content luminance level that is maintained over a longer time scale). In some embodiments, the affordance appearance type (e.g., "light" or "dark" or the specific appearance value range of the affordance) is selected in accordance with an initial luminance level of the underlying content at the time when the affordance is first displayed, and the affordance maintains that affordance appearance type until a context-switching event occurs (e.g., switching between applications, switching between an application or a system user interface, or switching between two system user interface, etc.), and the affordance appearance type is redetermined based on the underlying content in the new context.

FIG. 5D99 illustrates the differences in the appearance of the affordance 4802 for the two types of affordance appearance types (e.g., LA and DA), given the same changes in the background (e.g., content 4888), in accordance with some embodiments.

FIG. 5D99 lists the appearances of affordance 5802 for each of several background states. The states of the affordance are grouped into five groups, each corresponding to a respective state of content 5888. As shown in FIG. 5D99, for each group corresponding to a respective content state, the affordance (e.g., comparing the DA version and the LA version of affordance 5802 below the same content strip) has an overall darker appearance (e.g., lower overall luminance) for the dark affordance appearance type than for the light affordance appearance type.

FIGS. 6A-6F are flow diagrams illustrating method 600 of displaying a dock with a plurality of application icons at a variable location along one or more edges of a touch-sensitive display in accordance with some embodiments. Method 600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an intuitive way to display a dock with a plurality of application icons at a variable location along one or more edges of a touch-sensitive display. The method reduces the number, extent, and/or nature of the inputs from a user when displaying a dock with a plurality of application icons at a variable location along one or more edges of a touch-sensitive display, thereby creating a more efficient human-machine interface. For battery-operated electronic devices, enabling a user to display a dock with a plurality of application icons at a variable location along one or more edges of a touch-sensitive display faster and more efficiently conserves power and increases the time between battery charges, and enhances the operability of the device (e.g., by helping the user to provide proper inputs and reducing user mistakes when operating/interacting with the device).

Method 600 relates to displaying a dock with a plurality of application icons at a variable location along the edge of a touch-sensitive display (e.g., along any one of multiple edges of the display, such as the bottom, right-side, or left-side edges of the display relative to a current display orientation of the device) in response to an input (e.g., a long-press gesture initiated within a predetermined distance from the edge of the display) based on the location of the input (e.g., the edge of the device on which the dock is displayed is based upon the edge at which the input is detected and/or the location of the dock along an edge is dependent upon a proximity of the input). For example, in some embodiments, the device displays a dock along a particular edge of the display in response to a long-press input along that edge of the display. In some embodiments, the device displays a dock at a location along an edge of the display in response to a long-press input near (e.g., overlapping, centered, or next to) the location of the long-press gesture. In some embodiments, the device displays a dock at a predetermined location (e.g., in the middle of an edge of the display, or at an end portion of the edge of the display) when the long-press input is detected at a first region of the edge of the display (e.g., the dock is displayed in the center of the edge when the input is detected anywhere within a center portion of the display and/or the dock is displayed at the end of the edge when the input is detected within a predetermined proximity to the end of the edge) and the device displays the dock at a user-specified position (e.g., overlapping, centered, or next to the input) when the long-press input is detected at a second region of the edge of the display (e.g., not in the center region and/or not within a predetermined proximity to the end of the edge). Allowing the user to display a dock at a selected location, rather than only at a predetermined position, enhances the operability of the device and makes the user-device interaction more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

The device displays (602) a first user interface (e.g., an application user interface) on the display, wherein the first user interface is distinct from a home screen user interface that includes a plurality of application icons corresponding to different applications of a plurality applications installed on the device (e.g., the interactive map user interface in FIGS. 5A1, 5A4, 5A15, 5A19, 5A22, and 5A28, and the email user interface in FIGS. 5A9 and 5A13). In some embodiments, the dock is also displayed on the home screen user interface by default (e.g., as illustrated in FIG. 5B21).

While displaying the first user interface on the display, the device detects (604) a first input by a first contact on a first edge of the display (e.g., contacts 4202, 4206, 4208, 4209, 4212, 4216, 4218, and 4222, illustrated in FIGS. 5A1, 5A4, 5A9, 5A13, 5A15, 5A19, 5A22, and 5A28, respectively).

In response (606) to detecting the first input on the edge of the display (e.g., a long-press), and while the first contact continues to be detected on the first edge of the display (e.g., while the first contact is kept substantially stationary (e.g., with less than a threshold amount of movement) at the initial touch location of the touch input)), the device, in accordance with a determination that the first input was detected on a first portion of the first edge of the display (e.g., the first contact was kept substantially stationary at a respective location on the first portion of the first edge for at least a threshold amount of time with less than a threshold amount of movement) and the first input meets dock-display criteria (e.g., the first input is a long press input or a deep press input without movement of the first contact), displays (608) a dock with a plurality of application icons at a first location along the first edge of the display. For example, in response to continually detecting contact 4202 at a position on the left-side of the bottom edge of the display for a time period meeting long-press input criteria (e.g., meeting a time threshold $TT_1$), the device displays dock 4204 along the left side of the bottom edge of the display, under contact 4202, in FIG. 5A2. In some embodiment, the first location is selected to include the first portion of the first edge of the display (e.g., the dock is centered on the location of the first touch, such as dock 4204 which is centered under contact 4202 in FIG. 5A2). In some embodiments, the first location is a predetermined location (e.g., when the first touch is detected in a middle portion of the first edge, the dock is displayed in a default position centered on the display, regardless of whether the contact is in the center of the display).

In response (606) to detecting the first input on the edge of the display (e.g., a long-press), and while the first contact continues to be detected on the first edge of the display (e.g., while the first contact is kept substantially stationary (e.g., with less than a threshold amount of movement) at the initial touch location of the touch input)), the device, in accordance with a determination that the first input was detected on a second portion of the first edge of the display that is distinct from the first portion of the first edge (e.g., the first contact was kept substantially stationary at a respective location on the second portion of the first edge for at least a threshold amount of time with less than a threshold amount of movement)) and the first input meets the dock-display criteria (e.g., the first input is a long press input or a deep press input without movement of the first contact), displays (610) the dock at a second location along the first edge of the display that is selected to include the second portion of the first edge of the display (e.g., the dock is centered on the location of the first touch), wherein the second location is different from the first location. For example, in response to continually detecting contact 4206 at a position on the right-side of the bottom edge of the display for a time period meeting long-press input criteria (e.g., meeting a time threshold $TT_1$), the device displays dock 4204 along the right side of the bottom edge of the display, under contact 4206, in FIG. 5A5, which is at a different position than dock 4204 is displayed at in FIG. 5A2.

Displaying a dock at a first location when a first criteria is met (e.g., a first positional criteria) and displaying a dock at a second location when a second criteria is met (e.g., a second positional criteria) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, the first location along the first edge of the display does not include (612) the second portion of the first edge of the display (e.g., when the dock is displayed centered at the first portion (e.g., a respective touch location close to the left edge) of the first edge (e.g., the bottom edge), and the width of the dock does not span the entire length of the first edge, the location of the dock does not include the second portion the first edge (e.g., a respective touch location close to the right edge)). For example, the location at which dock 4204 is displayed in FIG. 5A2 (e.g., on the left-side of the bottom edge of the display) does not overlap with the portion of the bottom edge in which contact 4212 is detected in FIG. 5A15 (e.g., the right-side portion of the bottom edge of the display). Displaying a dock at a first position that does not overlap with a second portion of the first edge that is associated with display of the dock at a second location (e.g., a second location that overlaps the second portion of the edge) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, the second location along the first edge of the display does not include (614) the first portion of the first edge of the display. For example, when the dock is displayed centered at the second portion (e.g., a respective touch location close to the right edge) of the first edge (e.g., the bottom edge), and the width of the dock does not span the entire length of the first edge, the location of the dock does not include the first portion the first edge (e.g., a respective touch location close to the left edge)). For example, the location at which dock 4204 is displayed in FIG. 5A16 (e.g., on the right-side of the bottom edge of the display) does not overlap with the portion of the bottom edge in which contact 4202 is detected in FIG. 5A1 (e.g., the left-side portion of the bottom edge of the display). Displaying a dock at a second position that does not overlap with a first portion of the first edge that is associated with display of the dock at a first location (e.g., a first location that overlaps the first portion of the edge) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, while displaying the first user interface without displaying the dock on the display (e.g., after the first input by the first contact is no longer detected after lift-off of the first contact from the first edge, the dock ceases to be displayed), the device detects (616) a second input by a second contact (e.g., a long press input) on a second edge (e.g., a left side edge or top edge) of the display that is different from the first edge of the display (e.g., the bottom edge). In response to detecting the second input on the second edge of the display (e.g., a long-press), and while the second contact continues to be detected on the second edge of the display (e.g., while the second contact is kept substantially stationary (e.g., with less than a threshold amount of movement) at the initial touch location of the touch input)), in accordance with a determination that the second input meets dock-display criteria (e.g., the second input is a long press input or a deep press input without movement of the second contact), the device displays (618) the dock with the plurality of application icons at a third location along the second edge of the display (e.g., the third location is selected in accordance with the location of the second contact in accordance with the manner by which the location of the dock is selected based on location of the first contact on the first edge) (e.g., the dock is displayed centered at the touch location of the third contact on the second edge). For example, contact 4208 is detected on the left edge of the display, in FIG. 5A9, rather than on the bottom edge of the display, as was contact 4202 in FIG. 5A1. In response to the input including contact 4208 meeting dock-display criteria (e.g., substantially maintaining its position for at least a time $TT_1$), dock 4204 is displayed along the left edge of the display, in FIG. 5A10, rather than along the bottom edge, as is dock 4204 in FIG. 5A2. In some embodiments, the terms "top edge", "left edge", "right edge" "side edge", "top edge" are defined by the top, left, right, side, and top positions of the first user interface when the first user interface is in an upright orientation. Displaying a dock along a first edge of the display (e.g., the bottom edge relative to the display orientation of the device) when an input is detected on the first edge of the display and displaying the dock along a second edge of the display (e.g., a side edge relative to the display orientation of the device) when an input is detected on the second edge of the display) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, while displaying the first user interface without displaying the dock on the display (e.g., after the first input by the first contact and the second input by the second contact are no longer detected after lift-off of the first contact from the first edge and after lift-off of the second contact from the second edge, the dock ceases to be displayed near the first edge and the dock ceases to be displayed near the second edge), the device detects (620) a third input by a third contact on a third edge of the display (e.g., the right edge) that is different from the first edge of the display and the second edge of the display. In response to detecting the third input on the second edge of the display (e.g., a long-press), and while the third contact continues to be detected on the third edge of the display (e.g., while the third contact is kept substantially stationary (e.g., with less than a threshold amount of movement) at the initial touch location of the touch input)), in accordance with a determination that the third input meets dock-display criteria (e.g., the third input is a long press input or a deep press input without movement of the third contact), the device displays (622) the dock with the plurality of application icons at a fourth location along the third edge of the display. (e.g., the fourth location is selected in accordance with the location of the third contact in accordance with the manner by which the location of the dock is selected based on location of the first contact on the first edge) (e.g., the dock is displayed centered at the touch location of the fourth contact on the third edge). For example, a long press input on the right edge of the display in FIG. 5A1 would cause display of the dock along the right edge of the display, as compared to the display of dock 4204 along the bottom edge of the display in FIG. 5A2 and along the left edge of the display in FIG. 5A109. In some embodiments, the dock is displayed at the center of the second edge and third edge without regard to the exact location of the third and fourth contacts (e.g., the dock is centered on the short side edges regardless of exact location of finger contact and shifted based on touch location of finger contact along the longer bottom edge; or the dock is centered on the short bottom edge without regard of exact location of finger contact and shifted based on touch location along the longer side edges). Displaying a dock along a first edge of the display (e.g., the bottom edge relative to the display orientation of the device) when an input is detected on the first edge of the display, displaying the dock along a second edge of the display (e.g., a first side edge relative to the display orientation of the device) when an input is detected on the second edge of the display), and displaying the dock along a third edge of the display (e.g., a second side edge, opposite the first side edge, relative to the display orientation of the device) when an input is detected on the third edge of the display) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, while displaying the dock at the first location along the first edge of the display with the first contact continues to be detected on the display (e.g., at the first portion of the first edge of the display or on a different portion of the first edge of the display after some movement of the first contact along the first edge while the dock is displayed), the device detects (624) liftoff of the first contact from the display and, in response to detecting liftoff of the first contact (626), in accordance with a determination that, while displaying the dock, the first contact moved less than a threshold amount, the device maintains display (628) of the dock over the first user interface on the display after the liftoff of the first contact. For example, after liftoff of contact 4202, illustrated in FIG. 5A2, the device maintains display of dock 4204, in FIG. 5A3, because contact 4202 did not substantially move on the display. Displaying a dock along a first edge of the display (e.g., the bottom edge relative to the display orientation of the device) when an input is detected on the first edge of the display and then maintaining display of the dock upon liftoff of the input, if the input moved less than a threshold amount, enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, in response to detecting liftoff of the first contact (626), in accordance with the determination that, while displaying the dock, the first contact moved less than the threshold amount, the device expands (630) a size of the dock displayed over the first user interface after the liftoff of the first contact (e.g., the initially displayed dock is of a smaller size than the size of the dock in its final display state). For example, after liftoff of contact 4216, illustrated in FIG. 5A20, the device expands the size of dock 4204, in FIG. 5A21, because contact 4216 did not substantially move on the display. Displaying a dock along a first edge of the display (e.g., the bottom edge relative to the display orientation of the device) when an input is detected on the first edge of the display and then expanding the size of the dock upon liftoff of the input, if the input moved less than a threshold amount, enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, in response to detecting liftoff of the first contact (626), in accordance with the determination that, while displaying the dock, the first contact moved less than the threshold amount, the device moves (632) display of the dock from the first location along the first edge of the display to a third, predetermined location (e.g., the center of the first edge) along the first edge of the display. For example, after liftoff of contact 4216, illustrated in FIG. 5A20, the device moves the display of dock 4204 from the left-side of the bottom edge of the display, as illustrated in FIG. 5A20, to the center of the bottom edge of the display, as illustrated in FIG. 5A21, because contact 4216 did not substantially move on the display. In some embodiments, the predetermined location that the dock migrates to after liftoff of the contact is along a predetermined edge of the device (e.g., a 'bottom edge' of the display, relative to the current display orientation of the device), irrespective of the edge on which the dock was initially displayed (e.g., a side edge). In some embodiments, the predetermined location that the dock migrates to after liftoff of the contact is along the same edge as the first contact (e.g., each edge of the device is associated with a respective predetermined dock location). Displaying a dock at a first location along a first edge of the display (e.g., the bottom edge relative to the display orientation of the device) when an input is detected on the first edge of the display and then moving the dock from the first location along the first edge of the display to a third, predetermined location along the first edge of the display, if the input moved less than a threshold amount, enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, the dock ceases to be displayed upon lift-off of the first contact in accordance with a determination that the first contact has moved to a location outside of immediate vicinity of the dock. For example, after liftoff of contact 4208, illustrated in FIG. 5A11, the device ceases to display dock 4204, in FIG. 5A12, because contact 4208 moved from position 4208-*a* over dock 4204, in FIG. 5A10, to position 4208-*b*, outside of dock 4204, in FIG. 5A11, prior to liftoff. In some embodiments, in response to detecting liftoff of the first contact, in accordance with a determination that the first contact has moved for more than a threshold amount, the device selects a respective application icon on the dock in accordance with a current location of the first contact after the first contact has moved along the first edge (e.g., movement of contact 4218 from position 4218-*a*, in FIG. 5A23, to position 4218-*b* over email application icon 218, in FIG. 5A24, selects (e.g., and expands) the email application icon) and drags the respective application icon from the dock in accordance with a current location of the first contact after the first contact has moved along the first edge to select the respective application icon and then moved in a direction away from the dock (e.g., upward from the dock) (e.g., movement of contact 4218 away from the edge of the display, from position 4218-*b*, in FIG. 5A24, to position 4218-*c*, in FIG. 5A25, after selection of email application icon 218, drags the email application icon 218 out of the dock (e.g., and expands display of email application icon 218), in FIG. 5A25). In some embodiments, if lift-off of the first contact is detected while the respective application is selected, the device launches a first application corresponding to the respective application icon that is currently selected, and replaces the first user interface with a respective application user interface of the first application. For example, after liftoff of contact 4206 while email application icon 218 is selected within dock 4204, in FIG. 5A6, the device launches the associated email application, displaying an email application user interface, in FIGS. 5A7-5A8 (e.g., animating the transition as if the email application user interface is springing forth from the email application icon 218).

In some embodiments, while displaying the dock at the first location along the first edge of the display, the device detects (634) first movement of the first contact along the dock (e.g., along the first edge). For example, movement 4208 of contact 4206 from position 4206-*a*, in FIG. 5A5, to position 4206-*b*, in FIG. 5A6. In response to detecting the first movement of the first contact, the device selects (636) a respective application icon in the dock in accordance with a current location of the first contact (e.g., selection of the respective application icon is visually indicated by enlarging, highlighting, and/or animating the respective application icon relative to other application icons in the dock). For example, following movement 4208 of contact 4206 to position 4206-*b*, the device selects (e.g., and expands display of) email application icon 218, in FIG. 5A6, because contact 4206 is positioned over email application icon 218. After detecting first movement of the first contact along the first edge, the device detects (638) liftoff of the first contact from the display (e.g., liftoff of contact 4206 in FIG. 5A6). In response (640) to detecting the liftoff of the first contact, in accordance with a determination that a first application icon was currently selected in the dock when the liftoff of the first contact was detected, the device launches (642) a first application corresponding to the first application icon in the dock, and replaces display (644) of the first user interface with display of a second user interface for the first application. For example, after liftoff of contact 5A5, in FIG. 5A6, the device animates display of an email application user interface, in FIG. 5A7-5A8. In some embodiments, different application icons are selected as the first contact moves along the first edge below the dock, and in response to detecting the liftoff of the first contact, in accordance with a determination that a second application icon was currently selected on the dock when the liftoff of the first contact was detected: the device launches a second application corresponding to the second application icon in the dock, and replaces the first user interface with a third user interface for the second application. Displaying a dock along a first edge of the display (e.g., the bottom edge relative to the display orientation of the device) when an input is detected on the first edge of the display and then opening an application upon liftoff of the input, if an application icon in the dock was selected when liftoff of the contact occurred, enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, while displaying the dock at the first location along the first edge of the display, the device detects (646) movement of the first contact on the display (e.g., in a direction substantially parallel with the first edge of the display). For example, movement 4208 of contact 4206 from position 4206-*a*, in FIG. 5A5, to position 4206-*b*, in FIG. 5A6. In response to detecting that the contact is at a location on the display that corresponds with display of a first application icon in the dock (e.g., in accordance with a determination that the x-coordinate of the first contact corresponds to the x-coordinate of the first application icon, and the y-coordinate of the first contact is at or below the top edge of dock), the device selects (648) the first application icon (e.g., and changing a display property (e.g., size, color, highlighting, animation) of the application icon to indicate its selected state). For example, following movement 4208 of contact 4206 to position 4206-*b*, the device selects, and expands display of, email application icon 218, in FIG. 5A6, because contact 4206 is positioned over email application icon 218. In some embodiments, a tactile output is generated each time a new application icon in the dock becomes selected in accordance with the current location of the first contact during movement of the contact. In some embodiments, if liftoff of the first contact is detected while the first application icon is selected, the device launches the first application. In some embodiments, the currently selected application icon ceases to be selected when the first contact moves away from the dock from the sides or bottom of the dock. In some embodiments, the currently selected application icon ceases to be selected and no other application icon is selected when the x-coordinate of first contact is at a location between two application icons in the dock. In some embodiments, if no application icon is currently selected when liftoff of the first contact is detected, no application is launched; and the dock optionally remains on the display (e.g., if lift-off is detected when the contact is stationary and within the immediate vicinity of the dock) or ceases to be displayed (e.g., if lift-off is detected with a prior movement of the contact immediately before the liftoff of the first contact). Displaying a dock along a first edge of the display (e.g., the bottom edge relative to the display orientation of the device) when an input is detected on the first edge of the display and then selecting an application icon when the contact is detected at a location on the display corresponding to the application icon enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, while the first application icon is selected, the device detects (650) movement of the first contact on the display away from the first edge of the display (e.g., in a direction perpendicular to the first edge). In response to detecting the movement of the first contact on the display away from the first edge of the display, in accordance with a determination that the first contact is detected at a location that does not correspond to the display of the dock (e.g., the y-coordinate of the first contact is above the top edge of the dock), the device displays (652) the first application icon or a representation thereof at a location on the display that corresponds to a location of the first contact that does not correspond to the display of the dock (e.g., the first application icon is lifted out of the dock by the vertical movement of the first contact away from the first edge). For example, movement 4222 of contact 4218 away from the edge of the display, from position 4218-*b*, in FIG. 5A24, to position 4218-*c*, in FIG. 5A25, after selection of email application icon 218, drags the email application icon 218 out of the dock (e.g., and expands display of email application icon 218), in FIG. 5A25. In some embodiments, movement of the first application icon corresponds to the movement of the first contact. In some embodiments, the first application icon changes its appearance or moves from below the first contact to above the first contact on the display when the first application icon is dragged out of the dock completely or pass a predefined threshold y-coordinate on the display outside of the dock. For example, email application icon 218 expands when dragged out of dock 4204, in FIG. 5A25. In some embodiments, the change in appearance of the first application icon is accompanied by display of a split screen divider indicator on the display which prompts the user to drop the first application icon into the other side of the split screen divider indicator to split the screen between the first user interface and an application user interface corresponding to an application of the first application icon. Moving display of an application icon from a dock to a location on the screen that does not correspond to the location of the dock, in response to detecting movement of the contact away from the edge of the display (e.g., away from the dock) while the application icon is selected (e.g., while the contact is over the application icon displayed in the dock) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, while displaying the first application icon or the representation thereof at a location on the display that corresponds to a location of the first contact that does not correspond to the display of the dock (e.g., after the first application icon is dragged away from the dock by the upward movement of the first contact), the device detects (654) liftoff of the first contact and, in response (656) to detecting liftoff of the first contact while the first application icon is displayed at a location on the display that corresponds to a location of the first contact that does not correspond to the display of the dock, the device replaces (658) display of the first user interface in a first portion of the display with display of a second user interface corresponding to an application associated with the first application icon (e.g., opening the second application in split screen mode), and maintains display (660) of the first user interface in a second portion of the display that does not overlap with the first portion of the display. For example, in response to detecting liftoff of contact 4218, while displaying email application icon 218 over an interactive map user interface and outside of dock 4204, in FIG. 5A26, the device displays an email user interface in a right portion of the display, while maintaining display of the interactive map user interface in a left portion of the display, in FIG. 5A27. In some embodiments, the first user interface is resized to fill the second portion of the display (e.g., objects displayed within the UI shrink in proportion to shrinkage of the display area). In some embodiments, the first user interface is cropped to fill the second portion of the display (e.g., objects displayed within the UI maintain the same size, but the size of the display area shrinks). In some embodiments, the dock ceases to be displayed on the split screen. In some embodiments, the dock is displayed at its original location on the split screen. Replacing display of a first user interface in a first portion of the display with display of a second user interface corresponding to an application associated with an application icon, while maintaining display of the first user interface in a second portion of the display (e.g., opening the application in a split-screen mode), in response to detecting liftoff of a contact when the contact was at a location of the display corresponding to display of the application icon outside of a dock (e.g., after the application icon was dragged off of the dock) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, while displaying the dock at the first location along the first edge of the display, the device detects (662) movement of the first contact towards the first edge of the display and, in response to detecting the movement of the first contact towards the first edge of the display, in accordance with a determination that the dock-removal criteria are met by the movement of the first contact towards the first edge of the display (contact moves off the display completely or past a threshold position), the device ceases to display (664) the dock (e.g., hiding the dock by sliding it off of the first edge of the display in accordance with the movement of the first contact toward the outer edge of the device). For example, in response to movement 4214 of contact 4212 towards the edge of the display, from position 4212-*a*, in FIG. 5A16, to position 4212-*b*, in FIG. 5A17, dock 4204 begins sliding off the bottom of the display. In response to liftoff of contact 4212, in FIG. 5A17, the device ceases to display dock 4204, in FIG. 5A18. Displaying a dock along a first edge of the display (e.g., the bottom edge relative to the display orientation of the device) when an input is detected on the first edge of the display and then ceasing display of the dock in response to detecting movement of the contact towards the first edge of the display meeting dock-removal criteria (e.g., hiding the dock as the contact approaches the edge of the display) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, the first portion of the first edge of the display is within a first predefined sub-range (e.g., the central one-third portion) of the first edge of the display (615) and the first location is a first predetermined location within the first predefined sub-range of the first edge (e.g., when the touch contact is located in a middle portion of the edge, the dock is centered on the display) (e.g., a second predefined sub-range of the first edge is outside of the first predefined sub-range and the second location is distinct from the first predetermined location and is dynamically selected in accordance with the location of the first contact outside of the first predefined sub-range of the first edge). Displaying a dock at a first predetermined location (e.g., the center of the edge) within a first predefined sub-range along a first edge of the display (e.g., the central one-third portion) in response to detecting an input within the first predefined sub-range of the first edge of the display enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, the second portion of the first edge of the display is within a second predefined sub-range (e.g., the left or right one-third of the first edge) of the first edge of the display (617), and the dock displayed at the second location is centered at the location of the first contact (e.g., at the instant display of the dock was triggered) when the first contact is at least a threshold distance away from a first adjacent edge of the first edge that is closer to the first contact (e.g., the first contact is on the left or right ⅓ portion of the first edge and is far enough away such that the entire dock can be displayed when centered on the touch), and the dock displayed at the second location is displayed abutting the first adjacent edge of the first edge (e.g., is offset from the center of the first edge and is at a fixed x number of pixels (e.g., 5 pixels) away from the first adjacent edge of the first edge that is closer to the first contact) (e.g., justified relative to the left or right end of the first edge of the display) when the first contact is less than the threshold distance away from the first adjacent edge of the first edge. For example, dock 4204 is displayed centered on contact 4206, in FIG. 5A5, because contact 4206 is at least a threshold distance away from the right edge of the display. In contrast, dock 4204 is displayed at a default position abutting the right edge of the display, and not centered on contact 4212, in FIG. 5A16, because contact 4212 is not at least a threshold distance away from the right edge of the display. Displaying a dock at a second location centered at the location of the first contact, when the contact is within a second predefined sub-range of the first edge (e.g., the left or right one-third of the first edge) of the display and is more than a threshold distance away from the closest adjacent edge of the display, and displaying the dock at a second location that abuts the nearest adjacent edge of the display, when the contact is within the second predefined sub-range of the first edge of the display and is less than a threshold distance away from the closest adjacent edge of the display (e.g., when the contact is too close to the nearest end of the edge of the display to show the entire dock centered on the contact, the dock is displayed at a predefined position that essentially minimizes the distance between the center of the dock and the contact, while still displaying the entire dock), enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, the size of the dock is larger when the dock is displayed at the first location (e.g., when displayed at a default position, such as centered on the display) (e.g., when the first portion of the first edge of the display is within a predefined central range (e.g., the central one-third portion) of the first edge of the display and the first location is a first predetermined location (e.g., as described above with respect to displaying the dock in a predetermined position when the contact is within the first sub-range of the first edge of the display)) than the size of the dock when the dock is displayed at the second location (e.g., centered over the first contact or butting the side edge (e.g., as described above with respect to displaying the dock when the contact is within the second sub-range of the first edge of the display)) (623). For example, dock 4204 is displayed larger when positioned at a default position in the center of the bottom edge of the display, in FIG. 5A21, than when positioned along the left-side of the bottom edge of the display, in FIG. 5A20. Displaying a dock larger when it is displayed in a first position (e.g., a predefined or default position) than when the dock is displayed at a second location (e.g., a location dependent upon the position of a contact within a sub-range of the edge of the display) along a first edge of the display enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

In some embodiments, in response to detecting the first input on the edge of the display (e.g., an upward edge swipe) and while the first contact continues to be detected on the first edge of the display, the device, in accordance with a determination that the first input meets navigation-gesture criteria, wherein the navigation-gesture criteria include a requirement that a threshold amount of movement across the display away from the first edge of the display by the first contact is detected in order for the navigation-gesture criteria to be met (e.g., without requiring the first input to meet the dock-display criteria), enters (625) a transitional user interface mode in which a plurality of different user interface states are available to be selected based on a comparison of a set of one or more properties of the first input to a corresponding set of one or more thresholds (and optionally forgoing display of the dock along the first edge of the display if the dock-display criteria are not met by the first input). For example, in response to movement 4224 of contact 4222 away from the bottom edge of the display, from position 4222-*a*, in FIG. 5A28, to position 4222-*b*, in FIG. 5A29, prior to satisfying long-press gesture criteria (e.g., requiring limited movement for a period of $TT_1$ time), the device enters a transitional navigation state, replacing display of the interactive map user interface, in FIG. 5A28, with application view 4014 that corresponds to the interactive map user interface, in FIG. 5A29. Entering a transitional user interface mode that allows the user to navigate to different user interfaces (e.g., one or more of (a) a home screen, (ii) to the application displayed on the screen immediately prior to a user interface that was displayed when the swipe gesture began, (iii) to a control panel user interface, (iv) to an application switching user interface, or (v) back to the user interface that was displayed when the swipe gesture began) depending on whether certain preset movement conditions are met enhances the operability of the device and makes the user-device interaction more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

It should be understood that the particular order in which the operations in FIGS. 6A-6F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, and 1100) are also applicable in an analogous manner to method 600 described above with respect to FIGS. 6A-6F. For example, the contacts, gestures, user interface objects, tactile outputs, intensity thresholds, focus selectors, and animations described above with reference to method 600 optionally have one or more of the characteristics of the contacts, gestures, user interface objects, tactile outputs, intensity thresholds, focus selectors, animations described herein with reference to other methods described herein (e.g., methods 700, 800, 900, 1000, 1100). For brevity, these details are not repeated here.

The operations described above with reference to FIGS. 6A-6F are, optionally, implemented by components depicted in FIGS. 1A-1B. For example, displaying operations 602, 608, 610, 618, 622, and 652, detecting operations 604, 616, 620, 624, 634, 638, 646, 650, 654, and 662, entering operation 625, expanding operation 630, moving operation 632, selecting operations 636 and 648, opening operation 642, and ceasing display operation 664 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7A-7I are flow diagrams illustrating method 700 of navigating to different user interfaces from a user interface displayed in a split-screen display mode in accordance with some embodiments. Method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides an intuitive way to navigate to different user interfaces from a user interface displayed in a split-screen display mode. The method reduces the number, extent, and/or nature of the inputs from a user when navigating between user interfaces within and/or in and out of a split-screen display mode, thereby creating a more efficient human-machine interface. For battery-operated electronic devices, enabling a user to navigate between user interfaces within and/or in and out of a split-screen display mode faster and more efficiently conserves power and increases the time between battery charges.

The device concurrently displays (702) a first application user interface (e.g., a first application user interface) on a first portion of the display (e.g., a left portion of the display) (e.g., an interactive map user interface is displayed in a left portion of the display in FIGS. 5B1 and 5B18 and a web browsing user interface is displayed in a left portion of the display in FIG. 5B10), and a second application user interface (e.g., an application user interface that is distinct from the first application user interface) on a second portion of the display distinct from the first portion (e.g., right portion of the display) (e.g., an email user interface is displayed in a right portion of the display in FIGS. 5B1, 5B10, and 5B18). In some embodiments, the first and second application user interfaces are two separate user interfaces of the same application, or distinct user interfaces from different applications, or a system user interface and an application user interface, etc. The first user interface and the second user interface are both responsive and receptive to user's touch inputs when they are concurrently displayed on the display. The user interfaces allow objects to be dragged and dropped between the two user interfaces.

While concurrently displaying the first application user interface on the first portion of the display and the second application user interface on the second portion of the display, the device detects (714) a first input by a first contact (e.g., that begins in a first edge region of the display (e.g., within a predetermined distance from the bottom edge of the display, as defined by a current display orientation on the display)) that includes movement (e.g., movement of the first contact across the display) in a first direction (e.g., upward or sideways). For example, upward movement 4404 of contact 4402, upward movement 4420 of contact 4418, and upward movement 4427 of contact 4425, in FIGS. 5B1, 5B10, and 5B18, respectively.

In response (716) to detecting the first input, the device, in accordance with a determination that the first input meets first criteria, where the first criteria include a requirement that the first input include more than a first threshold amount of movement (e.g., movement of the first contact across the display) in the first direction (e.g., more than a threshold distance and/or speed) in order for the first criteria to be met, replaces display (718) of the first user interface and the second user interface with a full-screen home screen. For example, movement 4427 of contact 4425 from position 4425-*a*, in FIG. 5B18, to position 4425-*c*, in FIG. 5B20, included at least a threshold amount of movement away from the bottom edge of the display such that after liftoff of contact 4425 in FIG. 5B20, the device replaced display of the web browsing user interface and email user interface (displayed in split-screen mode in FIG. 5B18) with display of a full-screen home screen in FIG. 5B21. In some embodiments, after the first contact is first detected, and prior to determining that the first input meets the first criteria, replacing display of the first user interface with a replacement user interface on the portion of the display on which the input was first detected (e.g., a transitional user interface that allows the user to navigate to a plurality of different user interfaces on that portion of the display, for example, an application switcher user interface or a previous/next application user interface, or on the entire display, for example, a full-screen application switcher user interface or a home screen, in accordance an evaluation of the first input against different navigation criteria corresponding to the different user interfaces, e.g., a comparison of a set of one or more properties of the first input to a corresponding set of thresholds corresponding to the different user interfaces). For example, after activation of a user interface selection process by movement of contact 4425 upwards from the bottom edge of the display, in FIG. 5B18, the device enters a transitional navigation state, replacing the interactive map user interface and email user interface with card 4017 that represents the two user interfaces.

In response (716) to detecting the first input, the device, in accordance with a determination that the first input meets second criteria, where the second criteria include a requirement that the first input include less than the first threshold amount of movement (e.g., movement of the first contact across the display) in the first direction (e.g., less than a threshold distance and/or speed) in order for the second criteria to be met, and a determination that the first input started in a first edge region of the display that corresponds to the first application user interface, replaces display (720) of the first application user interface with a first replacement user interface while maintaining display of the second application user interface in the second portion of the display. For example, movement 4404 of contact 4402 from position 4402-*a*, in FIG. 5B1, to position 4402-*b*, in FIG. 5B2, met second movement criteria, but not first movement criteria because it included less than the threshold amount of movement away from the bottom edge of the display, such that after liftoff of contact 4402 in FIG. 5B2, the device replaced (e.g., transitioned) display of the interactive map user interface, in the left portion of the display, with display of an application-switcher user interface, in FIGS. 5B3-5B4.

In response (716) to detecting the first input, the device, in accordance with a determination that the first input meets the second criteria, and a determination that the first input started in a second edge region that corresponds to the second application user interface, replaces display (742) of the second application user interface with a second replacement user interface while maintaining display of the first application user interface in the first portion of the display. For example, movement 4420 of contact 4418 from position 4420-*a*, in FIG. 5B10, to position 4420-*b*, in FIG. 5B11, met second movement criteria, but not first movement criteria because it included less than the threshold amount of movement away from the bottom edge of the display, such that after liftoff of contact 4418 in FIG. 5B11, the device replaced (e.g., transitioned) display of the email user interface, in the right portion of the display, with display of an application-switcher user interface, in FIG. 5B12.

Displaying a home screen in full-screen display mode when a first criteria is met (e.g., a first distance and/or velocity threshold), and displaying a replacement application user interface in a first portion of a display, while maintaining display of an application user interface on a second portion of a display (e.g., or vice-versa) depending on the position from which an invoking input started, when a second criteria is met (e.g., a second distance and/or velocity threshold) enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, the second criteria include (722) application-switcher-interface-navigation criteria, where the application-switcher-interface-navigation criteria require that the first input includes movement of the first contact (e.g., movement of the first contact across the display) with a magnitude of a movement parameter (e.g., distance and/or speed) in a direction away from a respective edge region (e.g., the first or second edge region) of the display where the first input started in order for the application-switcher-interface-navigation criteria to be met. In some embodiments, application-switcher-interface-navigation criteria requires that liftoff of the contact is detected when the assigned current target state of a transitional user interface is an application-switcher user interface, e.g., as determined with reference to FIG. 8. For example, in some embodiments, application-switcher-interface-navigation criteria include that the input meets a first X-velocity threshold, is substantially horizontal, and does not meet a Y-position threshold, e.g., meeting criteria 80×4 in FIG. 8, when criteria 80×2 and 80×3 were not met, immediately prior to detecting liftoff of the contact. Similarly, in some embodiments, application-switcher-interface-navigation criteria include that the input has no more than a minimal X-velocity and Y-velocity, e.g., meeting criteria 80×6 in FIG. 8, when none of criteria 80×2 through 80×5 were met, immediately prior to detecting liftoff of the contact. Similarly, in some embodiments, application-switcher-interface-navigation criteria include that the input does not have a downward velocity or meet a third X-position threshold, e.g., meeting criteria 80×8 in FIG. 8, when none of criteria 80×2 through 80×7 were met, immediately prior to detecting liftoff of the contact. The replacement user interface (e.g., the first replacement user interface that replaces display of the first application user interface when the first input started in the first edge region of the display or the second replacement user interface that replaces display of the second application user interface when the first input started in the second edge region of the display) is an application-switcher user interface that includes respective representations of applications for selectively activating one of a plurality of applications (e.g., recently active applications with retained user interface states (e.g., the last active user interface)) currently represented in the application-switcher user interface. In some embodiments, after the first contact is first detected, and prior to determining that the first input meets the second criteria, replacing display of the first user interface with a replacement user interface on the portion of the display on which the input was first detected (e.g., a transitional user interface that allows the user to navigate to a plurality of different user interfaces on that portion of the display, for example, an application switcher user interface or a previous/next application user interface, or on the entire display, for example, a full-screen application switcher user interface or a home screen). Displaying an application-switcher user interface in a first portion of the display (e.g., while the device is in split-screen display mode) in response to an upward swipe that starts from the edge region of the first portion of the display, while maintaining display of an application user interface in a second portion of the display (or vice-versa), enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying the application-switcher user interface in either the first portion of the display or the second portion of the display, the device detects (724) selection of a first representation (e.g., the thumbnail image of a last active user interface of a respective application) in the respective representations of applications for selectively activating one of the plurality of applications currently represented in the application-switcher user interface (e.g., selection of representation 4406 by contact 4416 in FIG. 5B8). In response to detecting selection of the first representation, the device, when (e.g., in accordance with a determination that) the application-switcher user interface was displayed in the first portion of the display when selection of the first representation was detected, displays (726) a user interface for an application associated with the first representation (e.g., the last active user interface of the respective application) in the first portion of the display (e.g., replacing the application-switcher user interface in the first portion of the display) while maintaining display of the second application user interface in the second portion of the display (e.g., after selecting representation 4406 with contact 4416 in FIG. 5B8, the device displays a web browsing user interface in the left portion of the display, while maintaining display of the email user interface in the right portion of the display, in FIG. 5B8). In response to detecting selection of the first representation, the device, when (e.g., in accordance with a determination that) the application-switcher user interface was displayed in the second portion of the display when selection of the first representation was detected, displays (726) the user interface for the application associated with the first representation in the second portion of the display (e.g., replacing the application-switcher user interface in the second portion of the display) while maintaining display of the first application user interface in the first portion of the display (e.g., selection of representation 4414, in FIG. 5B12, would have resulted in the device displaying the associated interactive map user interface in the right portion of the display, while maintaining display of the web browsing user interface in the left portion of the display). Displaying an application user interface in a first portion of a display following selection of a corresponding representation in an application-switcher user interface that was displayed in the first portion of the display (e.g., on one side of a display operating in split-screen mode), while maintaining display of an application user interface in a second portion of the display that was simultaneously displayed with the application-switcher user interface (e.g., on an opposite side of a display operating in split-screen mode), enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying the user interface for the application associated with the first representation in the first portion of the display and the second application user interface in the second portion of the display (e.g., after the selection of the first representation in the application-switcher user interface displayed in the first portion of the display), the device detects (732) a second input by a second contact in the second edge region of the display that corresponds to the second application user interface (e.g., within a predetermined distance from the bottom edge of the display, as defined by a current display orientation on the display) (e.g., after navigation to the web browsing user interface on the left side of the display, in FIGS. 5B1-5B9, contact 4420 is detected on the bottom edge of the right portion of the bottom edge of the display, in FIG. 510). In response to detecting the second input, the device, in accordance with a determination that the second input meets the application-switcher-interface-navigation criteria, replaces display (734) of the second application user interface with the application-switcher user interface (e.g., displaying the application-switcher user interface on the second portion of the display, rather than the first portion of the display) in the second portion of the display while maintaining display of the user interface for the application associated with the first representation in the first portion of the display (e.g., in response to the swipe gesture including upward movement 4420 of contact 4418 in FIGS. 5B10-5B11, the device displays an application-switcher user interface on the right side of the display, in FIG. 5B12). The application-switcher user interface in the second portion of the display includes a representation of the first application associated with the first application user interface previously displayed on the first portion of the display (e.g., the representation of applications in the application-switcher user interface represent user interfaces that were previously displayed in either of the first portion or second portion of the display (e.g., the first and second portions of the display share a common set of previously displayed application user interfaces) (e.g., representation 4414, in FIG. 5B12, is associated with the interactive map user interface that was previously displayed on the right side of the display, in FIG. 5B1). In some embodiments, each portion of a split-screen display mode has its own, separate set of previously displayed application user interfaces, such that when an application user interface is navigated away from the display in one portion of the display, a representation of that user interface is made available within an application-switcher user interface when the application-switcher user interface opened in the same portion of the display but not when opened in other portions of the display). Displaying an application-switcher user interface in a second portion of the display (e.g., while the device is in split-screen display mode) that includes a representation of an application user interface that was previously displayed in a first portion of the display, in response to an upward swipe that starts from the edge region of the second portion of the display enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, the second criteria include (736) last-application-interface-navigation criteria, wherein the last-application-interface-navigation criteria require that the first input includes movement of the first contact with a magnitude of a movement parameter (e.g., distance and/or speed) in a direction substantially parallel to a respective edge region (e.g., the first or second edge region) of the display where the first input started (e.g., an arc swipe including movements 4430, 4434, 4438, 4442, and 4446 of contacts 4428, 4432, 4436, 4440, and 4444 in FIGS. 5B22, 5B25, 5B28, 5B31, and 5B34, respectively). In some embodiments, next/previous-application-interface-navigation criteria require that liftoff of the contact is detected when the assigned current target state of a transitional user interface is a next/previous application user interface, e.g., as determined with reference to FIG. 8. For example, in some embodiments, next/previous-application-interface-navigation criteria include that the input meets a first X-velocity threshold, has a projected downward position or meet a first Y-position threshold, and not include a direction shift after a threshold amount of movement, e.g., meeting criteria of 80×4 in FIG. 8, when criteria 80×2 and 80×3 were not met, immediately prior to detecting liftoff of the contact. Similarly, in some embodiments, next/previous-application-interface-navigation criteria include that the input meets a second X-positional threshold with less than a minimal amount of Y-translation, e.g., meeting criteria of 80×5 in FIG. 8, when none of criteria 80×2 through 80×4 were met, immediately prior to detecting liftoff of the contact. Similarly, in some embodiments, next/previous-application-interface-navigation criteria include that the input has either a downward Y-velocity or meets a third X-position threshold, but is not a first swipe in a compound gesture, e.g., criteria of 80×8 in FIG. 8, when none of criteria 80×2 through 80×7 were met, immediately prior to detecting liftoff of the contact. Similarly, in some embodiments, next/previous-application-interface-navigation criteria include that the input has either a downward Y-velocity or meets a third X-position threshold, is a first swipe, and meets an X-positional threshold, e.g., meeting criteria of 80×8 in FIG. 8, when none of criteria 80×2 through 80×7 were met, immediately prior to detecting liftoff of the contact. The replacement user interface (e.g., the first replacement user interface that replaces display of the first application user interface when the first input started in the first edge region of the display or the second replacement user interface that replaces display of the second application user interface when the first input started in the second edge region of the display) is a first previously displayed application user interface that is different from a respective application user interface being replaced (e.g., the first or second user interface). Displaying a previously displayed user interface in a first portion of the display (e.g., while the device is in split-screen display mode) in response to a sideways swipe that starts from the edge region of the first portion of the display, while maintaining display of an application user interface in a second portion of the display (or vice-versa), enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, after replacing display of the first application user interface with a first replacement user interface that is a previously displayed application user interface, and within a first temporal threshold (e.g., a temporal threshold for detecting consecutive horizontal swipes) from liftoff of the first contact, the device detects (738) a second input by a second contact, starting in the first edge region, that includes movement of the second contact with a magnitude of a movement parameter (e.g., distance and/or speed) in a direction substantially parallel to the first edge region of the display meeting the last-application-interface-navigation criteria (e.g., an arc swipe including movement 4442 or 4446 of contact 4440 or 4444 in FIG. 5B31 or 5B34). In response to detecting the second input, in accordance with a determination that a second previously displayed application user interface is available to be navigated to, the device replaces display (740) of the first previously displayed application user interface with the second previously displayed application user interface (e.g., the device displays a messages user interface, in FIG. 5B33, because a representation of the messages user interface was available in the card stack when the device detected the arc swipe including movement 4442 of contact 4440, in FIGS. 5B31-5B32). In response to detecting the second input, the device, in accordance with a determination that a second previously displayed application user interface is not available to be navigated to (e.g., the first previously displayed application user interface is the last application user interface in a stack of recently opened applications that have retained user interface states), displays (740) the second user interface in full-screen display mode (e.g., terminating a split-screen display mode by expanding display of the second user interface from the second portion of the display to the first and second portions of the display) (e.g., the device expands display of the interactive map user interface, from split-screen to whole-screen, in FIG. 5B36, because no more user interface representations were available in the card stack when the device detected the arc swipe including movement 4446 of contact 4444, in FIGS. 5B34-5B35). Displaying a second previously displayed user interface in a first portion of the display, while the device is in split-screen display mode, in response to a sideways swipe that starts from the edge region of the first portion of the display, while maintaining display of an application user interface in a second portion of the display (or vice-versa), or displaying the application user interface that was displayed in the second portion of the display in a full screen display mode, depending on whether a second previously displayed user interface is available, enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, in response to detecting the first input, in accordance with a determination that the first input meets third criteria, where the third criteria require that the first input include less than the first threshold amount of movement in the first direction but more than a second threshold amount of movement in the first direction (e.g., more than a threshold distance and/or speed) in order for the third criteria to be met, the device displays (744) a full-screen application-switcher user interface (e.g., with the split screen view displayed prior to the first input as a selectable option among a set of selectable applications) (e.g., replacing display of the first user interface and the second user interface with a full-screen application-switcher user interface). For example, movement 4426 of contact 4424 from position 4424-*a*, in FIG. 5B13, to position 4425-*d*, in FIG. 5B16, met third movement criteria, but not first movement criteria, because it included less than the first threshold amount of movement away from the bottom edge of the display and more than a second threshold amount of movement away from the bottom edge of the display (e.g., as associated with navigation to a split-screen application-switcher user interface, as illustrated in FIGS. 5B1-5B4 and 5B10-5B12), such that after liftoff of contact 4424 in FIG. 5B16, the device replaced (e.g., transitioned) display of the interactive map user interface, on the left portion of the display, and the email user interface on the right portion of the display, with display of a full-screen application-switcher user interface, in FIG. 5B17. In some embodiments, the third criteria also include a requirement for a predetermined pause in movement of the input (e.g., immediately prior to liftoff of the contact). In some embodiments, after the first contact is first detected, and prior to determining that the first input meets the third criteria, the device replaces display of the first user interface with a replacement user interface on the portion of the display on which the input was first detected (e.g., a transitional user interface that allows the user to navigate to a plurality of different user interfaces on that portion of the display, for example, an application switcher user interface or a previous/next application user interface, or on the entire display, for example, a full-screen application switcher user interface or a home screen). Displaying a home screen in full-screen display mode when a first criteria is met (e.g., a first distance and/or velocity threshold), displaying a replacement application user interface in a first portion of a display, while maintaining display of an application user interface on a second portion of a display (e.g., or vice-versa) depending on the position from which an invoking input started, when a second criteria is met (e.g., a second distance and/or velocity threshold), and displaying a full-screen application-switcher user interface when a third criteria is met (e.g., a third distance and/or velocity threshold, e.g., that is intermediate of the first threshold and the second threshold) enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while concurrently displaying the first application user interface (e.g., a first application user interface) on the first portion of the display (e.g., a left portion of the display), and the second application user interface on the second portion of the display, and prior to detecting the first input, the device displays (704) a first affordance over a portion of the first application user interface, wherein a location of the first affordance indicates a reactive region (e.g., a bottom edge region of the display within the first portion of display) for starting a predefined gesture input (e.g., an edge swipe gesture to enter a transitional user interface mode or display the application-switcher user interface) on the first portion of the display (e.g., home affordance 4400-1 in the left portion of the display, in FIG. 5B1), and the device displays (740) a second affordance over a portion of the second application user interface, wherein a location of the second affordance indicates a reactive region (e.g., a bottom edge region of the display within the second portion of display) (e.g., home affordance 4400-2 in the right portion of the display, in FIG. 5B1) for starting the predefined gesture input (e.g., an edge swipe gesture to enter a transitional user interface mode or display the application-switcher user interface) on the second portion of the display. Displaying first and second affordances over portions of a first user interface and a second user interface, respectively, while operating in a split-screen display mode, to indicate reactive regions for starting a navigation gesture input on each portion of the split-screen display enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, a size of the first affordance is proportional to a size of the first portion of the display (e.g., one third of the bottom width of the first portion of the display), a size of the second affordance is proportional to a size of the second portion of the display (e.g., one third of the bottom width of the second portion of the display), and the device, while displaying the first affordance over the portion of the first application user interface and the second affordance over the portion of the second application user interface, detects (706) a user input meeting split-screen-resizing criteria (e.g., a gesture selecting and dragging a resizing handle on the screen divider between the first portion and the second portion of the display). In response to detecting the user input meeting the split-screen-resizing criteria, the device resizes (708) the first portion of the display from a first size to a second size, including resizing display of the first application user interface and display of the first affordance proportionally to the second size of the first portion of the display, and the device resizes (708) the second portion of the display from a third size to a fourth size, including resizing display of the second application user interface and display of the second affordance proportionally to the fourth size of the second portion of the display. Resizing display of affordances indicating reactive regions for starting a navigation gesture input (e.g., a first affordance displayed in a first portion of a split-screen display and a second affordance displayed in a second portion of the split-screen display) when resizing portions of the display (e.g., the first and second portions) used in a split-screen display mode enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying a third application use interface in full-screen display mode (e.g., across the entire display, rather than in split-screen display mode), the device displays (768) a third affordance over a portion of the third application user interface (e.g., a bottom edge region of the display), wherein a location of the third affordance indicates a reactive region for starting a predefined gesture input on the display (e.g., an edge swipe gesture to enter a whole-screen transitional user interface mode or display the whole-screen application-switcher user interface) (e.g., home affordance 4400-3 over the full-screen display of the interactive map user interface, in FIG. 5B36). Displaying a single affordance over a portion of a user interface displayed in full-screen display mode, to indicate a reactive region for starting a navigation gesture input on the full-screen display, enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, the first criteria and the second criteria each require liftoff of the first input (e.g., detecting liftoff of the first contact). In response to detecting the movement of the first input (e.g., movement of the first contact) across the display in the first direction, and prior to detecting lift-off of the first input, in accordance with a determination that the first input started in the first edge region of the display that corresponds to the first application user interface, the device replaces (746) display of the first application user interface with a transitional user interface (e.g., a transitional user interface that allows the user to navigate to a plurality of different user interfaces on that portion of the display, for example, an application switcher user interface or a previous/next application user interface, or on the entire display, for example, a full-screen application switcher user interface or a home screen, in accordance an evaluation of the first input against different navigation criteria corresponding to the different user interfaces, e.g., a comparison of a set of one or more properties of the first input to a corresponding set of thresholds corresponding to the different user interfaces) that includes a first application view that corresponds to the first application user interface (e.g., a reduced scale image of the first application user interface), while maintaining display of the second application user interface in the second portion of the display, where the size of the first application view varies dynamically with the movement of the first input across the display. For example, after activation of a user interface selection process by movement of contact 4402 upwards from the bottom edge of the display, in FIG. 5B1, the device enters a transitional navigation state in the left portion of the display, replacing the interactive map user interface with application view 4014 that represents the interactive map user interface, in FIG. 5B2, while maintaining display of the email user interface on the right portion of the display. In accordance with a determination that the first input started in the second edge region of the display that corresponds to the second application user interface, the device replaces (746) display of the second application user interface with a transitional user interface that includes a second application view that corresponds to the second application user interface (e.g., a reduced scale image of the second application user interface), while maintaining display of the first application user interface in the first portion of the display, wherein the size of the second application view varies dynamically with the movement of the first input across the display. For example, after activation of a user interface selection process by movement of contact 4418 upwards from the bottom edge of the display, in FIG. 5B10, the device enters a transitional navigation state in the right portion of the display, replacing the email user interface with application view 4022 that represents the email user interface, in FIG. 5B11, while maintaining display of the interactive map user interface on the left portion of the display. Displaying a transitional user interface (e.g., that allows the user to navigate to different user interfaces (e.g., one or more of (a) a home screen, (ii) to the application displayed on the screen immediately prior to a user interface that was displayed when the swipe gesture began, (iii) to a control panel user interface, (iv) to an application switching user interface, or (v) back to the user interface that was displayed when the swipe gesture began)) in a first portion of a display operating in split-screen display mode, while maintaining display of an application user interface on a second portion of a display (e.g., or vice-versa), depending on the position from which an invoking input started, prior to meeting a navigation criteria requiring liftoff of a contact, enhances the operability of the device and makes the user-device interaction more efficient (e.g., by providing easy access to navigation functions of the device, by reducing user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying the transitional user interface, the device monitors (748) a position and velocity of the first contact and provides (748) corresponding visual feedback, (e.g., by moving, shrinking, or enlarging the application view that replaced the user interface when the input began) indicating how the device will navigate (e.g., what user interface will be displayed and active) if liftoff of the first contact is to be detected at the current moment. For example, after activation of a user interface selection process by movement 4426 of contact 4424 upwards from the bottom edge of the display, from position 4424-*a* in FIG. 5B13 to position 4424-*b* in FIG. 5B14, the device enters a transitional navigation state in the left portion of the display, replacing the interactive map user interface with application view 4014 that represents the interactive map user interface and partially displaying application view 4406 that represents a web browser user interface on the left side of the display, in FIG. 5B2, indicating that based on the current characteristics of the gesture, the device would navigate to a split-screen application-switcher user interface upon liftoff of the contact. In response to continued movement 4426 of contact 4424 upwards, from position 4424-*b* in FIG. 5B14 to position 4424-*c* in FIG. 5B15, the device replaces display of the email user interface on the right portion of the display with application view 4015 that represents the email user interface, while maintaining display of application views 4406 and 4014 in a full-screen transitional navigation user interface, indicating that based on the current characteristics of the gestures, the device would navigate to a full-screen application-switcher user interface upon liftoff of the contact. Providing visual feedback indicating how the device will navigate upon liftoff (e.g., what user interface will be displayed after the navigation-invoking gesture is terminated) enhances the operability of the device and makes the user-device interaction more efficient (e.g., by providing easy access to navigation functions of the device, by reducing/mitigating user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying the transitional user interface on either the first portion of the display or the second portion of the display, display of two or more application views in the transitional user interface indicates (750) that upon lift-off of the first contact, the device will, in accordance with a determination that the first input started in the first edge region, display an application-switcher user interface that includes a plurality of representations of applications for selectively activating one of a plurality of applications represented in the application-switcher user interface in the first portion of the display, while maintaining display of the second application user interface in the second portion of the display, and in accordance with a determination that the first input started in the second edge region, display an application-switcher user interface that includes a plurality of representations of applications for selectively activating one of a plurality of applications represented in the application-switcher user interface in the second portion of the display, while maintaining display of the first application user interface in the first portion of the display (e.g., display of multiple application views 4406 and 4014 on the left portion of the display, in FIG. 5B2, indicates that, based on the current characteristics of the gesture, the device would navigate to a split-screen application-switcher user interface on the left portion of the display upon liftoff of contact 4402, as illustrated in FIGS. 5B3-5B4). Displaying two or more application views in a transitional user interface displayed in one portion of a display operating in split-screen display mode, to indicate that the device will navigate to an application-switcher user interface in the portion of the display upon liftoff of the contact (e.g., in some embodiments, when operating in split-screen display mode, the two or more application views are displayed in the portion of the display in which the gesture was initiated, and the two or more application views indicate that the application-switcher user interface will be displayed in the portion of the display in which the two or more application view are displayed) enhances the operability of the device and makes the user-device interaction more efficient (e.g., by providing easy access to navigation functions of the device, by reducing/mitigating user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying the transitional user interface on either the first portion of the display or the second portion of the display, the device detects (752) a first property of the first input (e.g., a velocity and/or position of the first contact) that would meet the first criteria upon liftoff of the first contact and, in response to detecting the first property of the first contact, in accordance with a determination that the first input started in the first edge region, ceases to display (754) the second application user interface in the second portion of the display and expands (754) display of the transitional user interface from the first portion of the display to the entire display (e.g., switching from a split-screen display mode in which the transitional user interface was displayed on only the first portion of the split-screen to a full-screen display mode in which the transitional user interface is displayed across the entire display, for example, as illustrated in FIG. 5B19), and in accordance with a determination that the first input started in the second edge region, ceases to display (754) the first application user interface in the first portion of the display and expands (754) display of the transitional user interface from the second portion of the display to the entire display (e.g., switching from a split-screen display mode in which the transitional user interface was displayed on only the second portion of the split-screen to a full-screen display mode in which the transitional user interface is displayed across the entire display). In some embodiments, when the first input started in the first edge region, the second application user interface is replaced by an application view of the second user interface, e.g., which merges with an application view of the first application user interface that previously replaced the first application user interface that was displayed on the first portion of the display prior to displaying the transitional user interface. In some embodiments, when the first input began in the second edge region, the first application user interface is replaced by an application view of the first user interface, e.g., which merges with an application view of the second application user interface that previously replaced the second application user interface that was displayed on the second portion of the display prior to displaying the transitional user interface. Expanding display of a transitional user interface from one portion of a display operating in split-screen display mode to the entire display operating in full-screen display mode, in response to detecting a property of a contact that would meet first criteria (e.g., full-screen home-screen-display-criteria) upon liftoff of the contact, to indicate that the device will navigate to a full-screen home screen upon liftoff of the contact enhances the operability of the device and makes the user-device interaction more efficient (e.g., by providing easy access to navigation functions of the device, by reducing/mitigating user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, ceasing to display the first application user interface or the second application user interface includes (756), in accordance with a determination that the first input started in the first edge region, replacing display of the first application user interface with display of an application view of the first application user interface, wherein a display property of the application view of the first application user interface changes dynamically in accordance with movement of the first input, and in accordance with a determination that the first input started in the second edge region, replacing display of the second application user interface with display of an application view of the second application user interface, where a display property of the application view of the second application user interface changes dynamically in accordance with movement of the first input. For example, after activation of a user interface selection process by movement 4426 of contact 4424 upwards from the bottom edge of the display, from position 4424-*a* in FIG. 5B13 to position 4424-*b* in FIG. 5B14, the device enters a transitional navigation state in the left portion of the display, replacing the interactive map user interface with application view 4014, having a first size, that represents the interactive map user interface, in FIG. 5B14. Continued movement 4426 of contact 4424 upwards, from position 4424-*b* in FIG. 5B14 to position 4424-*c* in FIG. 5B15, causes application view 4014 to shrink from the first size, in FIG. 5B14, to a second, smaller size, in FIG. 5B15. Replacing display of an application user interface with an application view of the application user interface, in response to detecting a property of a contact that would meet first criteria (e.g., full-screen home-screen-display-criteria) upon liftoff of the contact, to indicate that the device will navigate to a full-screen home screen upon liftoff of the contact enhances the operability of the device and makes the user-device interaction more efficient (e.g., by providing easy access to navigation functions of the device, by reducing/mitigating user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying the full-screen transitional user interface (e.g., the transitional user interface that is expanded from either the first portion or the second portion of the display to the entire display), display of two or more application views in the transitional user interface indicates (758) that upon liftoff of the first contact, the device will display an application-switcher user interface that includes a plurality of representations of applications for selectively activating one of a plurality of applications represented in the full-screen application-switcher user interface. For example, display of application views 4406 and 4017, in the transitional navigation user interface illustrated in FIG. 5B16, indicates that based on the current characteristics of the gesture, the device will navigate to a full-screen application-switcher user interface upon liftoff of contact 4424, as illustrated in FIG. 5B17. Displaying two or more application views in a transitional user interface displayed in full-screen display mode, to indicate that the device will navigate to a full-screen application-switcher user interface upon liftoff of the contact enhances the operability of the device and makes the user-device interaction more efficient (e.g., by providing easy access to navigation functions of the device, by reducing/mitigating user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying the full-screen transitional user interface, display of only one application view in the transitional user interface indicates (760) that upon liftoff of the first contact, the device will display the full-screen home screen. For example, display of single application view 4017, in the transitional navigation user interface illustrated in FIG. 5B20, indicates that based on the current characteristics of the gesture, the device will navigate to a home screen upon liftoff of contact 4425, as illustrated in FIG. 5B21 Displaying only one application view in a transitional user interface displayed in full-screen display mode, to indicate that the device will navigate to a full-screen home screen upon liftoff of the contact (e.g., as opposed to displaying two or more application views, to indicate that the device will navigate to a full-screen application-switcher user interface upon liftoff of the contact), enhances the operability of the device and makes the user-device interaction more efficient (e.g., by providing easy access to navigation functions of the device, by reducing/mitigating user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying an application view of the first application user interface and the second application user interface (e.g., separate application views for the first application user interface and second application user interface or a single application view representing both the first application user interface and the second application user interface) in the full-screen transitional user interface, the device detects (762) a gesture that includes movement of the first contact in a second direction towards the first edge region or second edge region of the display (e.g., more than a threshold amount of movement in the second direction). In response to detecting the gesture that includes movement of the first contact in the second direction, the device, in accordance with a determination that the first input started in the first edge region, restores display (764) of the second application user interface in the second portion of the display and, in accordance with a determination that the first input started in the second edge region, restores display (764) of the first application user interface in the first portion of the display. For example, if contact 4424 were to move downward, from position 4424-*d* in FIG. 5B15, towards the bottom edge of the display, the device would restore display of the email user interface on the right portion of the display, as previously displayed in FIG. 5B14. Restoring display of an application user interface previously displayed in one portion of a display operating in split-screen display mode, in response to detecting downward movement of the contact when displaying a full-screen transitional user interface (e.g., restoring split-screen display mode), enhances the operability of the device and makes the user-device interaction more efficient (e.g., by providing easy access to navigation functions of the device, by reducing/mitigating user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while displaying the full-screen application-switcher user interface (e.g., in full-screen display mode), the plurality of representations of applications for selectively activating one of a plurality of applications represented in the application-switcher user interface includes (766) a first representation associated with at least two applications (e.g., showing a representation of a split-screen mode of the display) that are simultaneously activated (e.g., a representation associated with the first application that was previously displayed on the first portion of the display and the second application that was previously displayed on the second portion of the display) upon selection of the first representation (e.g., selection of representation 4015 in the full-screen application-switcher user interface illustrated in FIG. 5B17 would cause the device to navigate to a split-screen display mode with an interactive map user interface displayed on the left portion of the display and an email user interface displayed on the right portion of the display, as previously displayed in FIG. 5B13). While displaying the application-switcher user interface on either the first portion of the display or the second portion of the display (e.g., in split-screen display mode), the plurality of representations of applications for selectively activating one of a plurality of applications represented in the application-switcher user interface does not include a representation associated with at least two applications that are simultaneously activated upon selection. Displaying a representation associated with at least two applications when displaying a full-screen application-switcher user interface, and displaying only representations associated with a single application when displaying an application-switcher user interface in one portion of a display operating in split-screen display mode, enhances the operability of the device and makes the user-device interaction more efficient (e.g., by providing easy access to navigation functions of the device, by reducing/mitigating user mistakes when operating/interacting with the device, by helping the user to achieve an intended outcome with fewer required inputs, and by providing additional control options without cluttering the user interface with additional displayed controls), which, additionally, reduces power usage and improves the battery life of the device (e.g., by helping the user to use the device more quickly and efficiently).

In some embodiments, while concurrently displaying the first application user interface on the first portion of the display and the second application user interface on the second portion of the display, and prior to detecting the first input by the first contact, the device detects (710) a first touch input (e.g., a long-press) that meets dock-display criteria (e.g., long-press criteria) on a first edge of the display. In response to detecting the first touch input on the first edge of the display, and while the first touch input continues to be detected on the first edge of the display, the device, in accordance with a determination that the first touch input was detected on a first portion of the first edge of the display, displays (712) a dock with a plurality of application icons at a first location along the first edge of the display and, in accordance with a determination that the first touch input was detected on a second portion of the first edge of the display, displays (712) the dock at a second location along the first edge of the display that is selected to include the second portion of the first edge of the display (e.g., the dock is centered on the location of the first touch), wherein the second location is different from the first location. For example, in response to continually detecting contact 4202 at a position on the left-side of the bottom edge of the display for a time period meeting long-press input criteria (e.g., meeting a time threshold $TT_1$), the device displays dock 4204 along the left side of the bottom edge of the display, under contact 4202, in FIG. 5A2. In contrast, in response to continually detecting contact 4206 at a position on the right-side of the bottom edge of the display for a time period meeting long-press input criteria (e.g., meeting a time threshold $TT_1$), the device displays dock 4204 along the right side of the bottom edge of the display, under contact 4206, in FIG. 5A5, which is at a different position than dock 4204 is displayed at in FIG. 5A2. In some embodiment, the first location that is selected to include the first portion of the first edge of the display (e.g., the dock is centered on the location of the first touch). In some embodiments, the first location is a predetermined location (e.g., when the first touch is detected in a middle portion of the first edge, the dock is displayed in a default position centered on the display, regardless of whether the contact is in the center of the display). Displaying a dock at a first location when a first criteria is met (e.g., a first positional criteria) and displaying a dock at a second location when a second criteria is met (e.g., a second positional criteria) enhances the operability of the device and makes the user-device interface more efficient (e.g., by providing easy access to navigation functions of the device, by allowing the user to execute navigation functions regardless of the position of the user's hand relative to the display, by helping the user to achieve an intended outcome with fewer required inputs, and by providing additional control options without cluttering the user interface with additional displayed controls), which, additionally, reduces power usage and improves the battery life of the device by enabling the user to use the device more quickly and efficiently.

It should be understood that the particular order in which the operations in FIGS. 7A-7I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, 1000, 1100, 1200, and 1300) are also applicable in an analogous manner to method 700 described above with respect to FIGS. 7A-7I. For example, the contacts, gestures, user interface objects, tactile outputs, intensity thresholds, focus selectors, animations described above with reference to method 700 optionally have one or more of the characteristics of the contacts, gestures, user interface objects, tactile outputs, intensity thresholds, focus selectors, animations described herein with reference to other methods described herein (e.g., methods 600, 800, 900, 1000, 1100, 1200, 1300). For brevity, these details are not repeated here.

The operations described above with reference to FIGS. 7A-7I are, optionally, implemented by components depicted in FIGS. 1A-1B. For example, display operations 702, 704, 712, 718, 720, 726, 734, 740, 742, 744, 746, 764, and 768, detecting operations 706, 710, 714, 724, 732, 738, 752, and 762, resizing operation 708, monitoring operation 748, and display expanding operation 754 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 8 is a flow diagram illustrating a method 800 of navigating between user interfaces, in accordance with some embodiments. The method 800 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

Method 800 relates to navigating between user interfaces in response to a swipe gesture that meets different movement conditions. Allowing the user to navigate (i) to the home screen, (ii) to the application displayed on the screen prior (e.g., immediately prior) to a user interface that was displayed when the swipe gesture began (e.g., a "next or previous application"), (iii) to an application switching user interface (sometimes referred elsewhere as a "multitasking" user interface), or (iv) back to the user interface that was displayed when the swipe gesture began (the "current application"), depending on whether certain preset movement conditions (e.g., velocity and position threshold criteria) are met enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently). In some embodiments, a dock is displayed on the currently displayed user interface in response to an initial portion of the input that meets a movement condition corresponding to dock-display.

Method 800 is performed at a device having a display and a touch-sensitive surface (in some embodiments, the display is a touch-sensitive display), displaying a user interface (e.g., an application user interface or a home screen user interface) (e.g., on the touch-screen display). The device detects (802) a contact at the bottom edge of the touch-screen display (e.g., contacts 4222, 4402, 4418, 4424, 4425, 4428, 4432, 4436, 4440, and 4444, in FIGS. 5A28, 5B1, 5B10, 5B13, 5B18, 5B22, 5B25, 5B28, 5B31, and 5B34, respectively) and enters a transitional user interface allowing the user to navigate to different user interfaces (e.g., back to the current application, to a different (e.g., next/previous) application user interface, to a home screen user interface, or to an application-switcher user interface). In some embodiment, the device replaces the user interface for the application with a corresponding application view (e.g., application views 4014, 4022, 4017, 4406, and 4408, in FIGS. 5A29, 5B2, 5B11, 5B14, 5B19, 5B23, 5B26, 5B29, 5B32, and 5B35) in the transitional user interface.

The device monitors (804) the position and velocity of the contact and provides visual feedback, (e.g., by moving, shrinking, or enlarging the application view that replaced the user interface when the input began) indicating to the user how the device will navigate (e.g., what user interface will be displayed and active) upon lift-off of the contact. In some embodiments, the position and velocity of the contact correspond to the display of the application view providing feedback to the user. For example, as illustrated in FIG. 5B20, device 100 monitors the position and velocity of application view 4017. Because the instantaneous velocity of application view 4017 meets home-display criteria, the device displays application view 4017 without displaying an application view for any other recently open application, indicating that the device will navigate to the home screen user interface upon immediate liftoff of the contact. In contrast, as illustrated in FIG. 5B16, because application view 4017 has paused at a position that meets application-switcher-display criteria, rather than home-display criteria, the device additionally displays a portion of application view 4406, corresponding to a recently open application, indicating that the device will navigate to an application-switcher user interface upon immediate lift-off of the contact. In some embodiments, the control panel user interface is not accessible from the transitional user interface and, thus, when the device provides visual feedback indicating that the target state of the device is the application-switcher user interface it does not include display of a representation of a control panel user interface.

The device then assigns (80×1) a current target state (e.g., a user interface that would be navigated to if the input were to be lifted-off at that time) based on the current properties of the input (e.g., predicting what user interface the user will navigate to upon lift-off of the input). As illustrated in FIG. 8, the device selects a target state by proceeding through one or more (e.g., a series of) decisions (80×2-80×11) based on the current characteristics of the input and the value of one or more thresholds (e.g., by comparing the input characteristics to various velocity and position thresholds). In some embodiments, additional target states are created to correspond to additional navigation states available in a split screen display mode. For example, a split screen application-switcher user interface corresponds to a different target state and a different set of criteria than the full-screen application switcher user interface, in some embodiments. The respective criteria for transitioning to the full-screen application switcher user interface and the home-screen are different depending on whether the input was initiated from a user interface displayed in a split-screen mode or a full-screen mode, in accordance with some embodiments. Similarly, a full-screen application-switcher user interface are optionally displayed in two configurations (e.g., with all applications as individually selectable cards, or with at least two of the applications combined in a split-screen card), depending on different sets of criteria being met by the navigation gesture, in accordance with some embodiments.

Examples of criteria for each of these decisions is described in more detail in U.S. application Ser. No. 15/879,111, filed on Jan. 24, 2018, the contents of which are expressly incorporated by reference herein. One or more of the decisions are, optionally excluded or rearranged within assignment operation 80×1. In some embodiments, additional decisions are, optionally, added to the set of decisions within assignment operation 80×1. Additionally, decisions resulting in the display of other user interfaces (e.g., a control panel user interface or a notifications user interface) are, optionally, added to the set of decisions within assignment operation 80×1.

The device then determines (836) whether liftoff of the contact was detected. If lift-off was detected, the device navigates to (838) (e.g., displays the user interface for) the currently assigned target state (e.g., the target state assigned by assignment operation 80×1). For example, because contact 4424 was paused at position 4424-*d*, in FIG. 5B16, before liftoff was detected, the device would have assigned application-switcher as the target state (e.g., according to decision 80×6 "pause for app-switcher") such that the device navigates to the application-switcher user interface in FIG. 5B17 because it is the currently assigned target state when liftoff is detected in FIG. 5B16.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, 1000, and 1100) are also applicable in an analogous manner to method 800 described above with respect to FIG. 8. For example, the contacts, gestures, user interface objects, tactile outputs, intensity thresholds, focus selectors, animations described above with reference to method 800 optionally have one or more of the characteristics of the contacts, gestures, user interface objects, tactile outputs, intensity thresholds, focus selectors, animations described herein with reference to other methods described herein (e.g., methods 600, 700, 900, 1000, 1100, 1200, and 1300). For brevity, these details are not repeated here.

FIGS. 10A-10D are a flow diagram illustrating a method 1000 of navigating between user interfaces, in accordance with some embodiments. The method 1000 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

Method 1000 relates to navigating between user interfaces in response to a multi-contact (e.g., including three, four, five, or more contacts) gesture, e.g., that considers both translation of the contacts as a group and movement of the contacts relative to each other (e.g., 'pinching' and 'de-pinching' motions), capable of meeting different movement conditions. Allowing the user to navigate (i) to the home screen, (ii) to the application displayed on the screen prior (e.g., immediately prior) to a user interface that was displayed when the swipe gesture began (e.g., a "next or previous application"), (iii) to an application switching user interface (sometimes referred elsewhere as a "multitasking" user interface), or (iv) back to the user interface that was displayed when the swipe gesture began (the "current application"), depending on whether certain movement conditions (e.g., translational and/or pinching velocity and position/simulated position threshold criteria) are met enhances the operability of the device and makes the user-device interaction more efficient (e.g., by reducing the number of steps that are needed to achieve an intended outcome when operating the device), which, additionally, reduces power usage and improves the battery life of the device (e.g., by helping the user to use the device more quickly and efficiently). Method 1000 relates to improving the accuracy of navigating between user interfaces, by dynamically adjusting threshold values based on predicted final user interface states. Additionally, method 1000 relates to improving the accuracy of navigating between user interfaces by reducing the impact of unintended inputs and artifacts associated with the lack of motion sensors outside of the display region.

Method 1000 is performed at a device having a display and a touch-sensitive surface (in some embodiments, the display is a touch-sensitive display), displaying a user interface (e.g., an application user interface or a home screen user interface) (e.g., on the touch-screen display). The device detects (1002) multiple contacts on the touch-screen display (e.g., the groups of contacts illustrated in FIGS. 5C10, 5C13, 5C17, 5C21, 5C27, 5C30, 5C33, 5C37, and 5C43) and enters a transitional user interface allowing navigation to different user interfaces (e.g., back to the current application user interface, to a different (e.g., next/previous) application user interface, to a home screen user interface, or to an application-switcher user interface). In some embodiment, the device replaces the user interface for the application with a corresponding application view (e.g., the interactive map user interface is replaced by application view 4526 and the email user interface is replaced by application view 4528, as illustrated in FIGS. 5C11, 5C14, 5C18, 5C22, 5C28, 5C31, 5C34, 5C38, and 5C44) in the transitional user interface.

The device monitors (1004) the position and velocity of the contacts and provides visual feedback, (e.g., by moving, shrinking, or enlarging the application view that replaced the user interface when the input began) indicating to the user how the device will navigate (e.g., what user interface will be displayed and active) upon lift-off of the contact. In some embodiments, the device tracks the position and velocity of the displayed application view, which is manipulated by the movements of the contacts, and determines a target state (e.g., an application user interface that would be navigated to at that instance, if the gesture was terminated) based upon the characteristics (e.g., size, position, and/or velocity) of the application view, providing feedback to the user. For example, as illustrated in FIGS. 5C13-5C15, device 100 monitors the position and velocity of email application view 4528, which is controlled by movement of contacts 4532, 4536, 4540, and 4544. In FIG. 5C14, the instantaneous properties of email application view 4528 meet application-switcher-navigation criteria, and the device display email application view 4528 and interactive map application view 4526 co-planar, as well as dock 4006 in the background, indicating that the device would navigate to an application-switcher user interface upon immediate lift-off of the contacts. In contrast, as illustrated in FIG. 5C15, when the instantaneous properties of email application view 4528 meet home-screen-navigation criteria, display of interactive map application view 4526 ceases, and email application view 4528 is displayed over a home screen user interface which begins to come into focus in the background.

The device then assigns (100×1) a current target state (e.g., a user interface that would be navigated to if the input were to be lifted-off at that time) based on the current properties of the input (e.g., predicting what user interface the user will navigate to upon lift-off of the input). As illustrated in FIG. 10A, the device selects a target state by proceeding through one or more (e.g., a series of) decisions (100×2-100×11) based on the current characteristics of the input (e.g., changes in the properties of the contacts in a multi-contact gesture) and the value of one or more thresholds (e.g., by comparing the input characteristics to various metrics (e.g., a first metric (e.g., a y-magnitude metric) determined based on a magnitude of y-translation and/or scrunching of the contacts, a second metric (e.g., an x-magnitude metric) determined based on a magnitude of x-translation of the contacts, and/or a third metric (e.g., a rate of change metric) determined based on a rate of change of translation of the contacts and/or a rate of scrunching of the contacts, which is optionally a rate of change of the first and/or second metric over time).

Each of these decisions is shown in more detail in corresponding FIGS. 10B-10D and described below in greater detail. One or more of the decisions are, optionally excluded or rearranged within assignment operation 100×1. In some embodiments, additional decisions are, optionally, added to the set of decisions within assignment operation 100×1. Additionally, decisions resulting in the display of other user interfaces (e.g., a control panel user interface or a notifications user interface) are, optionally, added to the set of decisions within assignment operation 100×1.

In some embodiments, the current target state (e.g., the user interface that would be navigated to upon immediate termination of the navigation gesture) is determined based on a first metric (e.g., a vertical magnitude metric), a second metric (e.g., a horizontal magnitude metric), and/or a third metric (e.g., a rate of change metric) of the application view that replaces the user interface when the user interface selection process is invoked, e.g., which is manipulated based on the translational and pinching movements of the multiple contacts. In some embodiments, the first metric, the second metric, and/or the third metric of the application view is different than the actual display properties of the application view, e.g., a simulated y-translation of the application view, corresponding to the first metric, may include a centroid that is located at a first y-position, e.g., within a virtual display, while the application view displayed on the device has a centroid that is located at a second y-position on the actual display, that is different from the first position on the virtual display.

In some embodiments, the first metric, the second metric, and/or the third metric is based on a combination of observable inputs from the contacts. For example, in some embodiments, a first metric (e.g., a y-magnitude metric) of the application view increases with an increase in a first observable property (e.g., y-position of contacts of a navigation gesture on the display) and increases with an increase in a second observable property (e.g., a pinching motion of contacts of a navigation gesture). For example, the first metric of email application view 4528 in FIGS. 5C13-5C15 increases with the upwards movement of contacts 4532, 4536, 4540, and 4544, while the displayed y-position of email application view 4528 also increases on the display. Likewise, the first metric of interactive map application view 4528 in FIGS. 5C37-5C39 also increases with increasing scrunching (e.g., pinching) of contacts 4670, 4674, 4678, 4582, and 4686, while the displayed y-position of interactive map application view 4528 does not increase on the display (e.g., interactive map application view 4526 appears to shrink into a virtual palm of the gesture, rather than travel upwards on the display).

In some embodiments, a first metric (e.g., a y-magnitude metric) of the application view is based on a combination of y-translational motion of contacts in a multi-contact navigation gesture (e.g., from a swiping motion of the contacts) and scrunching motion of the contacts (e.g., a pinching movement of the contacts towards one another). For example, in FIGS. 5C44-5C46, the first metric of interactive map application view 4526 increases with both the vertical movement of contacts 4690, 4694, 4698, and 4702, from FIG. 5C44 to FIG. 5C45, and from the scrunching motion of contacts 4690, 4694, 4698, 4702, and 4706, from FIG. 5C45 to FIG. 5C46, despite that interactive map application view 4526 actually moves downward in FIG. 5C46. The increase in the first metric is represented on the display through the shrinking of interactive map application view 4526 in FIGS. 5C45 and 5C46, as well as by other visual cues (e.g., the disappearance of email application view 4528 in FIG. 5C46 and appearance of a home screen user interface in the background in FIG. 5C46).

In some embodiments, a first metric (e.g., a y-magnitude metric) of an application view is determined based on a sum of a characteristic y-component of movement of the contacts in a multi-contact navigation gesture (e.g., a y-component of movement of a centroid of the contacts) and a characteristic component of scrunching motion of the contacts in the multi-contact gesture (e.g., based on a change in a simulated height of a virtual window that shrinks in accordance with the scrunching motion of the contacts). In some embodiments, the first metric is determined based on adding the y-component of movement of a centroid of contacts during a multi-contact gesture to one-half of the change in the height of a virtual window due to a scrunching motion (e.g., multi-finger pinching) and/or a y-component of movement of the virtual window.

In some embodiments, a component of a scrunching motion (e.g., a multi-contact pinch gesture) is determined by calculating the position of a virtual window in which the application view is displayed, which is resized according to properties of the multi-contact pinch gesture, e.g., the window shrinks or expands in accordance with pinching or de-pinching movements of the contacts. In some embodiments, scaling of the virtual window is calculated based on a measured translation (e.g., a measured y-translation) of the centroid of the contacts in a multi-contact gesture over successive measurements. In some embodiments, a y-translational scale of the virtual window is based on a percentage of the y-translation of the characteristic position of the contacts (e.g., a centroid) as compared to a characteristic measure of the size display (e.g., one-half of the screen height, plus or minus an offset), and optionally limited by a minimum size (e.g., representing an asymptote in a non-linear function of resizing of the application view).

In some embodiments, the scaling of the virtual window is further proportional to a characteristic measurement of the amount of scrunching (e.g., the scale of the virtual window is a product of the translation of the centroid of the contacts and the characteristic measure of scrunching). In some embodiments, the characteristic measure of the amount of scrunching is based on percentage change in the length of the perimeter between the contacts between successive measurements (e.g., the perimeter of a closed shape that encompasses the contacts such as a circle or oval that encompasses or passes through some or all of the contacts or a polygon or a convex polygon that uses the contacts as vertices). Using the incremental change in perimeter between successive measurements enables the device to account for fingers being added to, or removed from, the gesture (e.g., if a contact is added to 4 existing contacts, as illustrated in FIGS. 5C44-5C45, the prior change in size of the window is based on the change in perimeter between the 4 contacts and the next change in size of the window is based on the change in perimeter between the 5 contacts).

In some embodiments, during a scrunching motion, the display of the application view is maintained at a characteristic position within the virtual display window (e.g., centered at a centroid of the contacts, e.g., within a virtual palm of the contacts), while the dimensions of the window are resized in accordance with properties of the scrunching movement. However, in some embodiments, where the scrunching motion is performed near an edge of the display (e.g., the bottom edge of the display), an exception is applied that slow or stops movement of the application view as it approaches the edge of the screen.

In some embodiments, a second metric (e.g., an x-magnitude metric) of an application view is determined based on a characteristic x-component of movement of the contacts in a multi-contact navigation gesture (e.g., an x-component of movement of the centroid of the contacts). In some embodiments, the second metric of an application view is independent of any characteristic measure of scrunching motion of the contacts (e.g., independent of any shrinking or expansion of a virtual window caused by a multi-contact pinching or de-pinching motion). Accordingly, in some embodiments, e.g., where the resizing of the virtual window is performed around a characteristic position relative to the contacts of a multi-contact gesture (e.g., a centroid of the contacts), display of the application view is shifted towards the characteristic position of the contacts (e.g., the centroid), however, the second metric is not affected by the characteristic position of the contacts (e.g., the centroid). For example, a scrunching motion performed near the right edge of the display will cause the application view to move towards the right edge of the display, however, the device will not select a previous application user interface as the current target state because the second metric of the application view is unaffected.

In some embodiments, a third metric (e.g., a rate of change metric) of an application view is determined based on a rate of change of translation of the contacts and/or a rate of scrunching of the contacts, which is optionally a rate of change of the first and/or second metric over time.

The device then determines (1036) whether liftoff of the contact was detected. If lift-off was detected, the device navigates to (1038) (e.g., displays the user interface for) the currently assigned target state (e.g., the target state assigned by assignment operation 100×1). For example, liftoff of contact 4510, 4514, 4518, and 4522 results in navigation to a previous application user interface, as illustrated in FIGS. 5C10-5C12, when previous/next-application-navigation criteria are met, (e.g., Vertical Swipe for Next/Previous App criteria 100×5); liftoff of contacts 4530, 4534, 4538, and 4542 results in navigation to a home screen user interface, as illustrated in FIGS. 5C13-5C16, when home-screen-navigation criteria are met (e.g., Resize/Translate to Go Home criteria 100×2); and liftoff of contacts 4548, 4552, 4556, and 4560 results in navigation to an application-switcher user interface, as illustrated in FIGS. 5C17-5C19, when application-switcher-navigation criteria are met (e.g., Short, Slow Movement to App-Switcher criteria 100×8.

Figure 10C:
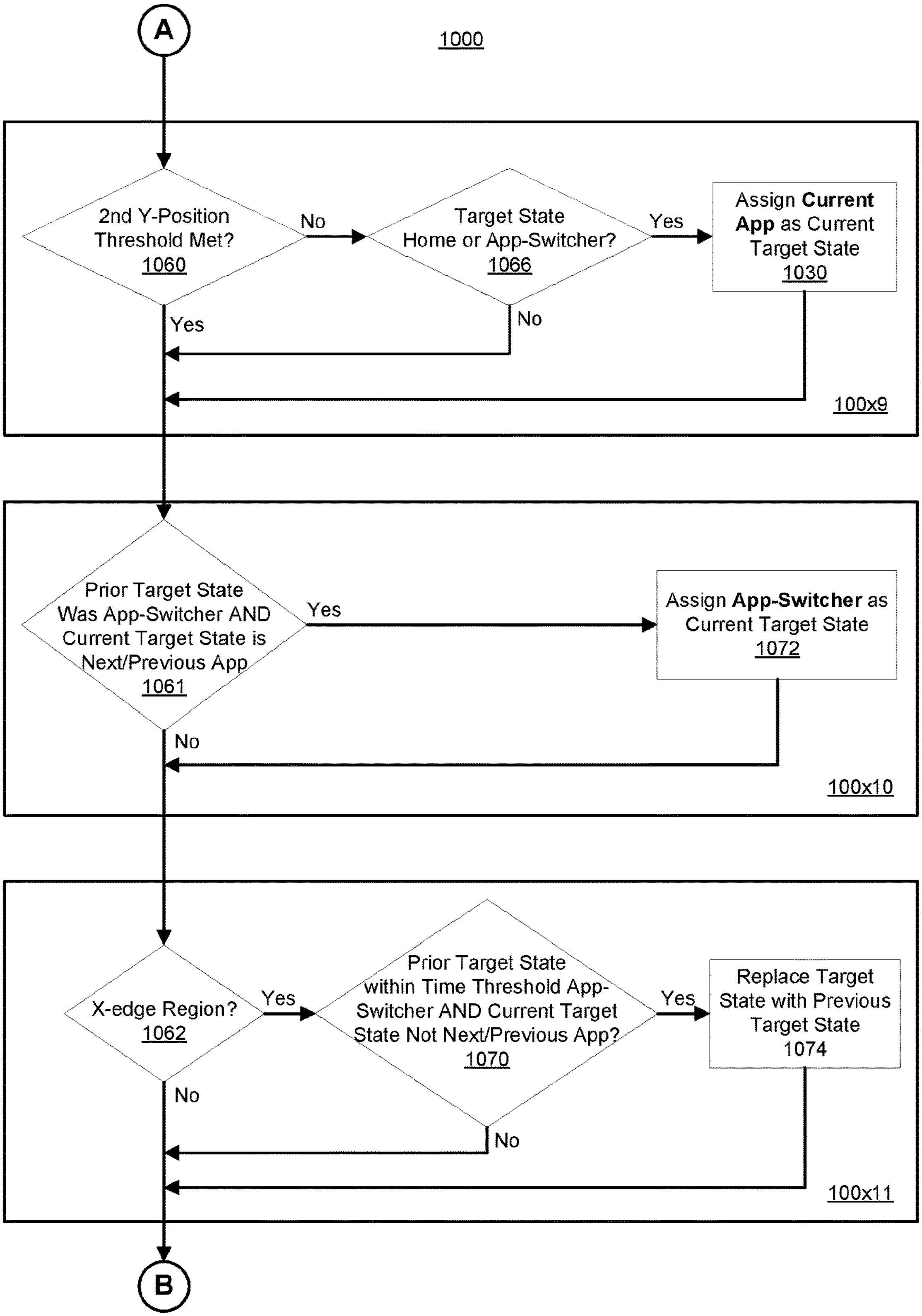
Figure 10D:
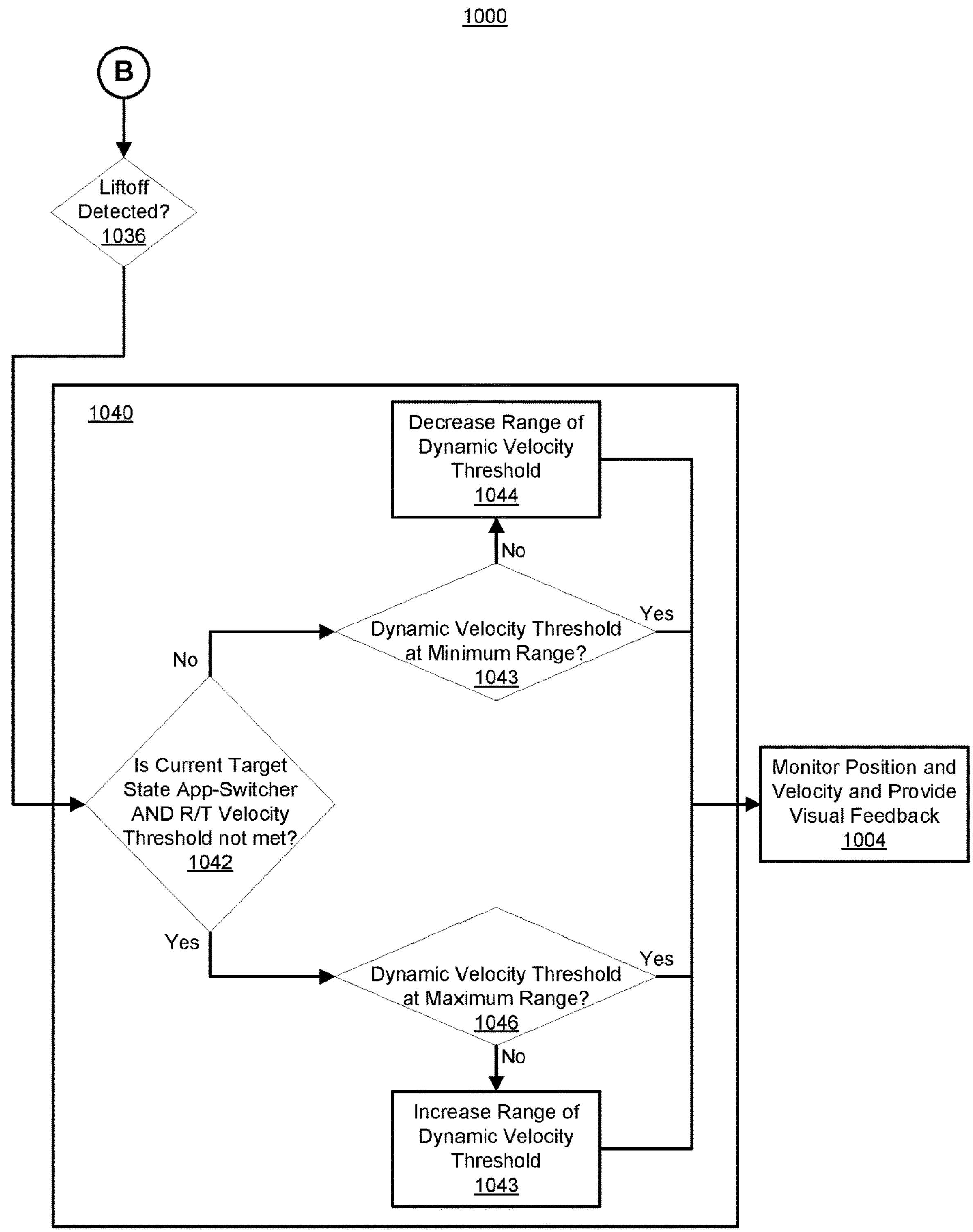
Figure 11A:
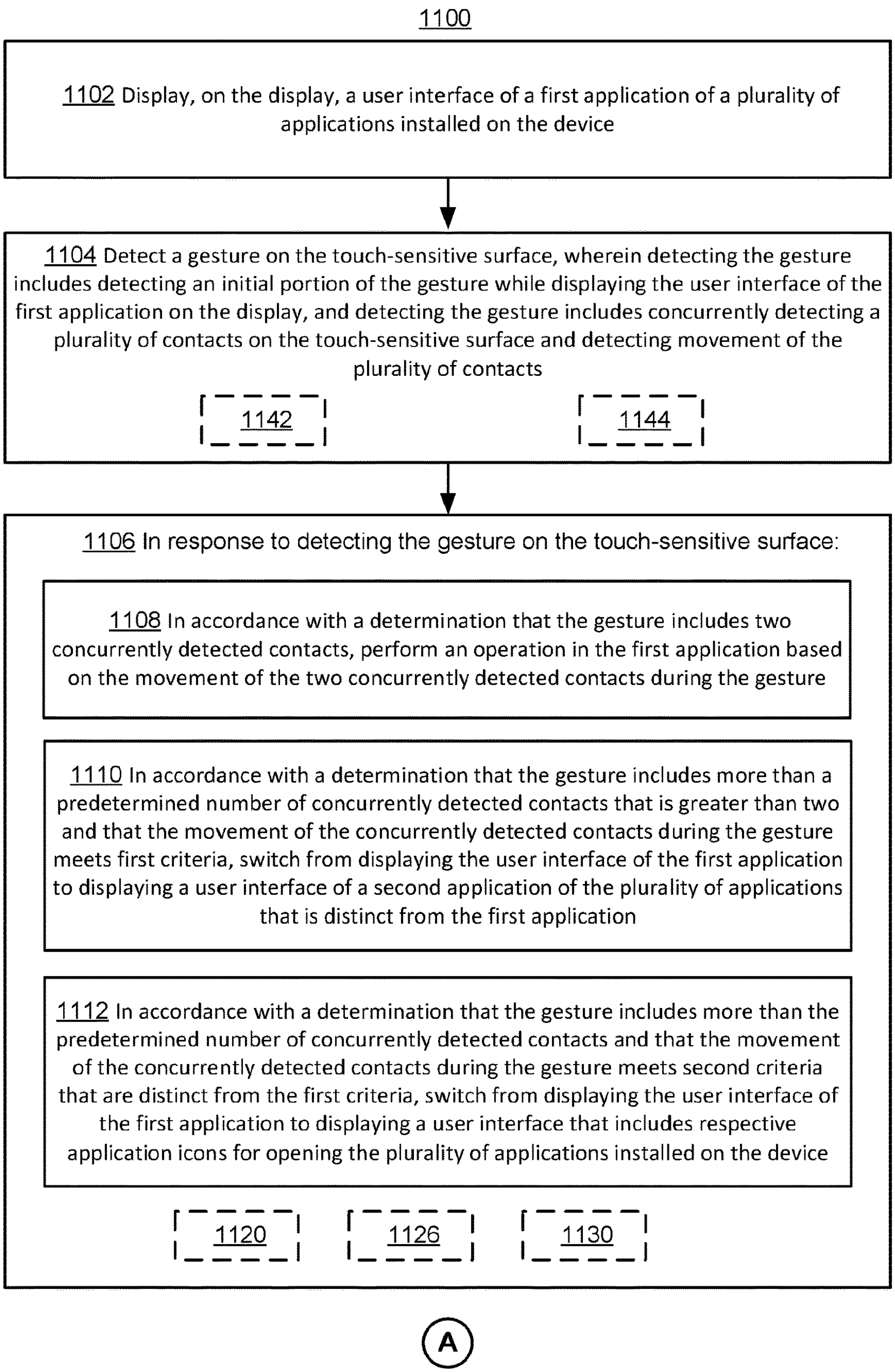
Figure 13A:
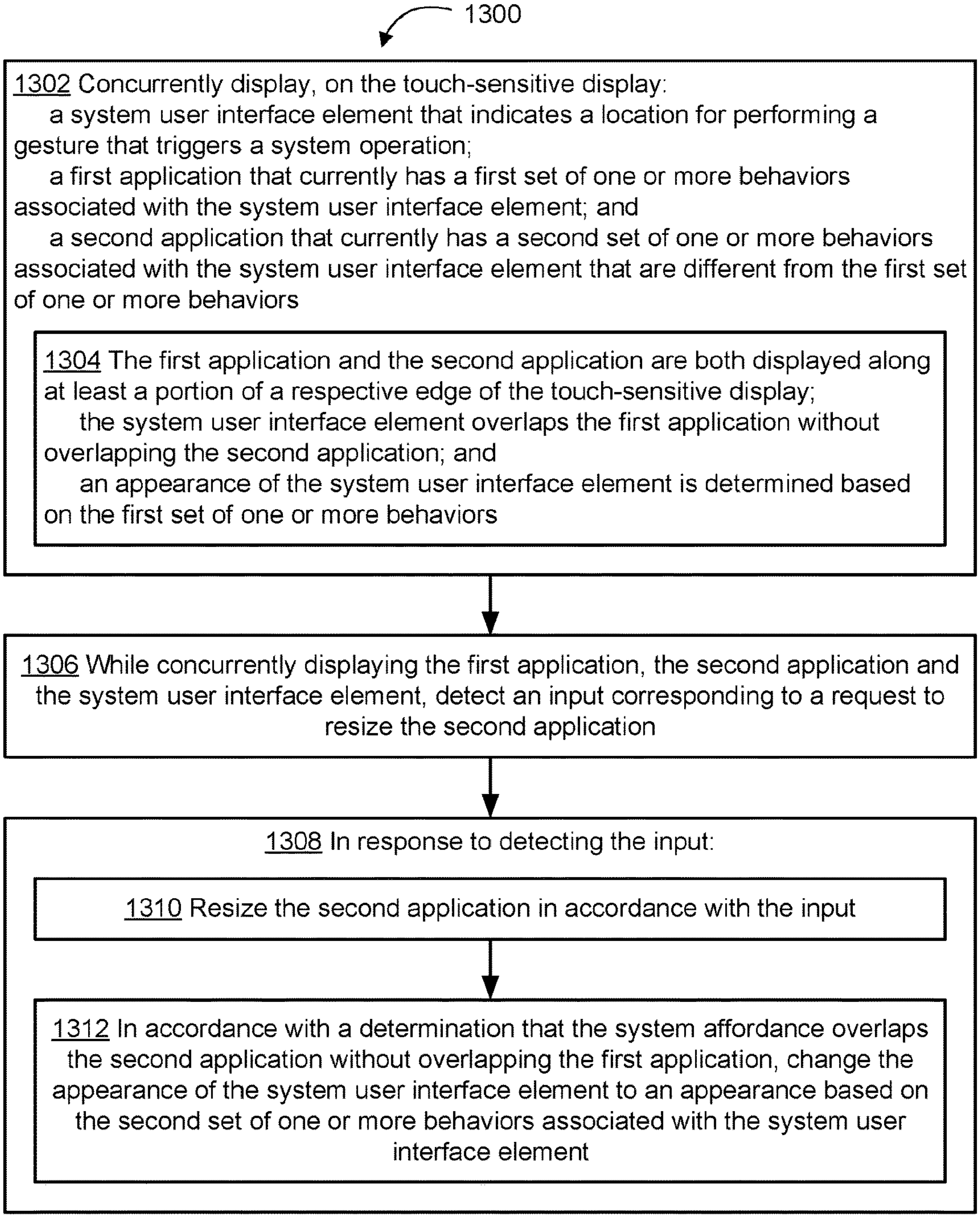

If liftoff has not been detected, the device optionally updates (1040) a dynamic threshold affecting the selection of one or more current target user interfaces, e.g., according to the sub-method illustrated in FIG. 10D. In some embodiments, dynamic thresholds are adjusted to favor a currently predicted final user interface target state to prevent unintended changes in the properties of the input during lift-off of the contact to affect the final determination. For example, to prevent the device from navigating home if the user incidentally moves their fingers up quickly while lifting-off, the device will increase a dynamic velocity threshold (e.g., velocity threshold range 910 in FIG. 9A) while the contacts are paused, in anticipation of a liftoff event navigating the device to the application-switcher user interface.

If liftoff was not detected, the device continues to monitor (1004) the properties of the input and provide visual feedback, update (e.g., assign) (100×1) the current target state, and optionally update (1040) dynamic threshold values until liftoff is detected (1036).

In some embodiments, when assigning (100×1) a current target state, the device first determines (100×2) whether the input appears to be a "quick resize/translate to go home gesture" (e.g., an input causing an application view to have a magnitude of a third metric (e.g., a rate of change metric)) that is substantially great, or great enough and substantially vertical (e.g., more vertical than horizontal), indicating an intent of the user (as determined by the device) to navigate to the home screen user interface. In some embodiments, the device determines whether the third metric of the application view (e.g., as controlled by the motion of the contacts) meets (1006) a first R/T velocity threshold (e.g., vertical and resizing velocity ($V_{y,r}$) threshold 902, defining sector I in FIG. 9A) or meets (1008) a second R/T velocity threshold (e.g., a lower vertical and resizing velocity ($V_{y,r}$) threshold such as velocity threshold 910 in the y-direction (e.g., distinguishing sector II from sector V) in FIG. 9A) and is substantially upwards (e.g., within slope thresholds 904 and 906 (distinguishing sector II, where the velocity is more vertical, from sectors III and IV, where the velocity of the contact is more horizontal) in FIG. 9A). If the properties of the contact meet either of these criteria, the device assigns (1012) the home screen user interface as the current target state. In some embodiments, a "flick up to go home" gesture (e.g., an input that is substantially fast in the vertical direction or fast enough and substantially vertical (e.g., more vertical than horizontal)) and/or a "quick shrink to go home" gesture (e.g., an input that is a substantially fast scrunching motion) (e.g., a gesture that is substantially only a multi-contact swipe gesture or a multi-contact scrunch gesture), satisfies (100×2) a threshold for assigning the current target state to a home screen user interface, e.g., either because it causes an application view to have a magnitude of a third metric that is sufficient or because a separate threshold for a quick swipe upwards or a quick scrunching motion is used.

In some embodiments, the device then checks for one or more exceptions (e.g., via decisions 100×9, 100×10, and 100×11, described in more detail below) that, in some circumstances, reassign the current target state. The device then determines (1036) whether liftoff has been detected and, if so, navigates to (e.g., displays) (1038) the home screen user interface if the current target state was not reassigned according to an exception. For example, assuming that a characteristic movement of contacts 4532, 4536, 4540, and 4544 in FIG. 5C14 caused translation of application view 4528 that was either faster than velocity threshold 902, or fell within sector III in FIG. 9A (e.g., satisfying "flick up to go home" criteria (1006) or (1008)), the device assigns the home screen user interface as the current target state, such that upon liftoff of the contacts in FIG. 5C15, the device navigates (e.g., displays) the home screen user interface because it was the current target state at the time of liftoff. Likewise, assuming that a characteristic measure of scrunching of contacts 4602, 4606, 4610, 4614, and 4618 in FIG. 5C28 caused shrinking of application view 4526 that was either faster than velocity threshold 902, or fell within sector III in FIG. 9A (e.g., satisfying "quick shrink to go home" criteria (1006 or 1008), the device assigns the home screen user interface as the current target state, such that upon liftoff of the contacts in FIG. 5C29, the device navigates (e.g., displays) the home screen user interface because it was the current target state at the time of liftoff.

In some embodiments, if the device determines that the input does not satisfy "quick resize/translate to go home" criteria (100×2), the device then determines (100×3) whether the input appears to be a "large resize/translate to go home" gesture (e.g., an input causing an application view to have a magnitude of a first metric (e.g., a y-magnitude metric that considers both a vertical translation component and a shrinking component of the movement of the application view) that is substantially great enough), indicating an intent of the user (as determined by the device) to navigate to the home screen user interface. In some embodiments, the device determines (1010) whether the first metric of the application view (e.g., a y-magnitude metric that considers a combination of the y-translation of the application view and an amount that the application view has shrunk) meets a first vertical position and resizing threshold ($T_{y,r}$) (e.g., first simulated y-position threshold 98 in FIG. 9B). If the properties of the input (e.g., which control movement of the application view) meet this criteria, the device assigns (1012) the home screen user interface as the current target state. In some embodiments, a "drag up to go home" gesture (e.g., an input that travels sufficiently far in the vertical direction, regardless of how fast) and/or a "shrink to go home" gesture (e.g., an input that scrunches sufficiently far) (e.g., a gesture that is substantially only a multi-contact swipe gesture or a multi-contact scrunch gesture), satisfies (100×3) a threshold for assigning the current target state to a home screen user interface, e.g., either because it causes an application view to have a magnitude of a first metric that is sufficient or because a separate threshold for a quick swipe upwards or a quick scrunching motion is used.

In some embodiments, the device then checks for exceptions (e.g., via decisions 100×9, 100×10, and 100×11, described in more detail below) that, in some circumstances, reassign the current target state. The device then determines (1036) whether liftoff has been detected and, if so, navigates to (e.g., displays) (1038) the home screen user interface if the current target state was not reassigned according to an exception. For example, assuming that a characteristic movement of contacts 4532, 4536, 4540, and 4544 in FIG. 5C14 caused translation of application view 4528 sufficiently far away from the bottom of the display (e.g., beyond vertical position and resizing threshold 916, as depicted in FIG. 9B) (e.g., satisfying "large resize/translate to go home" criteria (1010), the device assigns the home screen user interface as the current target state, such that upon liftoff of the contacts in FIG. 5C15, the device navigates (e.g., displays) the home screen user interface because it was the current target state at the time of liftoff. Likewise, assuming that a characteristic measure of scrunching of contacts 4602, 4606, 4610, 4614, and 4618 in FIG. 5C28 caused shrinking of application view 4526 to a sufficiently small size (e.g., satisfying "large resize/translate to go home" criteria (1010), the device assigns the home screen user interface as the current target state, such that upon liftoff of the contacts in FIG. 5C29, the device navigates (e.g., displays) the home screen user interface because it was the current target state at the time of liftoff.

In some embodiments, if the device determines that the input does not satisfy "large resize/translate to go home" criteria (100×3), the device then determines (100×4) whether the input appears to be a "side swipe for next/previous app" gesture (e.g., a multi-contact swipe to the right or left with sufficient horizontal velocity, that is moving horizontally or substantially horizontally (e.g., more horizontally than vertically) and downward, and that is not indicative of returning from a peak of a next/previous application), indicating an intent of the user (as determined by the device), to navigate to a previously displayed application user interface (e.g., a different application in the application stack). In some embodiments, device first determines (1014) whether the x-velocity of the input meets a first x-velocity threshold in a horizontal direction (e.g., when traveling leftwards, a velocity threshold defined by the left boundary of the range of velocity threshold 910 in conjunction with slope thresholds 904 and 912, defining the union of sectors III and VI in FIG. 9A or, when traveling rightwards, a velocity threshold defined by the right boundary of the range of the velocity threshold 910 in conjunction with slope thresholds 906 and 914, defining the union of sectors IV and VII in FIG. 9A. In some embodiments, the device determines whether an x-component of the velocity of the application view (e.g., rather than the contacts themselves, but which movement is caused by the x-translation component of the movement of the contacts) meets the x-velocity threshold in a horizontal direction.

In some embodiments, if the contacts/application view meet this criteria, the device then determines whether the projected magnitude of the first metric of the input/application view corresponding to the user interface displayed when the input was first detected is close (1018) to the original magnitude of the first metric of the input/application view (e.g., the y-position and/or size of the application view immediately after the device activated the user interface selection process (e.g., first displayed the transitional navigation user interface)) or if the magnitude of the first metric is below (1020) a first threshold (e.g., requiring at least a threshold amount of pinching and/or upward movement of the contacts, corresponding to a probability that the input was not an inadvertent input). If the input does not meet either of these criteria, the device assigns (1022) the application-switcher user interface as the current target state.

In some embodiments, if the input meets either of the projected size/position (1018) or y-position (1020) criteria, the device determines (1021) whether the input/application view is traveling in a direction opposite of a previous direction traveled after a threshold amount of movement. If the input/application view does not meet this criteria, the device assigns (1024) a next/previous application user interface as the current target state. For example, in FIG. 5C11, contacts 4510, 4514, 4518, and 4522 are traveling to the right (e.g., or application view 4526 is moving to the right) and did not previously travel to the left, so the device assigns a previous application user interface (e.g., corresponding to representation 4528) as the current target state. In some embodiments, the decision as to whether to select a next application or a previous application as a current target state depends on a direction of movement (e.g., a direction of change in position of the input or a direction of velocity of the input) of the input/application view that is used to make the determination to set the next/previous application user interface as the current target state. In some embodiments, the direction of change in position of the input/application view is used to determine whether to select a next application or a previous application as the current target state if the direction of change in position is the determining characteristic of the inputs/application view. In some embodiments, the direction of velocity of the input/application view is used to determine whether to select a next application or a previous application as the current target state if the direction of velocity is the determining characteristic of the input/application view. For example, if the input/application view move to the left and next/previous application is selected as the current target state, then previous application is selected as the current target state and if the input/application view moves to the right and next/previous application is selected as the current target state, then next application (or current application, if there is no next application) is selected as the current target state, or vice versa.

In some embodiments, if the input/application view are traveling in a direction opposite of a previous direction traveled after a threshold amount of movement (e.g., satisfying criteria (1021)), the device assigns (1030) the current application user interface as the current target state. This assignment avoids unintended navigations, for example, when a user starts a swipe gesture right to peek at a previous application user interface, without intent to actually navigate to the previous application user interface, and then changes the direction of the input to return to the "current application." Without this rule, assignment logic 100×1 would assign a next application user interface (e.g., an application to the right of the "current" application), rather than the current application.

Having assigned the application-switcher user interface (1022), next/previous application user interface (1024), or current application user interface (1030) as the current target state, in some embodiments, the device then checks for exceptions (e.g., via decisions 100×9, 100×10, and 100×11, described in more detail below) that, in some circumstances, reassign the current target state. The device then determines (1036) whether liftoff has been detected and, if so, navigates to (e.g., displays) (1038) the currently assigned target state user interface. For example, assuming that the velocity of contacts 4510, 4514, 4518, and 4522, and/or application view 4526, FIG. 5C11 is sufficiently fast enough to the right, and that the y-position and size of application view 4526 is sufficiently close to the original y-position and size of the application view, e.g., satisfying "side swipe for next/previous app" criteria (100×4), the device assigns the previously displayed email user interface corresponding to application view 4528 in FIG. 5C11 as the current target state, such that upon liftoff in FIG. 5C12, the device navigates (e.g., displays) the email user interface because it was the current target state at the time of liftoff.

In some embodiments, if the device determines that the input does not satisfy "side swipe for next/previous app" criteria (100×4), the device then determines (100×5) whether the input appears to be a "bottom edge swipe for next/previous app" gesture (e.g., an input traveling left or right along the bottom edge of the display), indicating an intent of the user (as determined by the device) to navigate to a previously displayed application user interface. In some embodiments, the device determines (1016) whether the magnitude of the second metric for the input/application view (e.g., either a current x-position of the contacts/application view or a predicted x-position of the contacts/application view) meets a second x-position threshold (e.g., second x-position threshold 920 depicted in FIG. 9B) in a right or left direction with a minimal magnitude of the first metric (e.g., a minimal y-translation and shrinkage of the application view (e.g., below minimum simulated y-translation threshold 922 depicted in FIG. 9B). If the properties of the input/application view meet this criteria, the device assigns (1024) a next/previous application user interface as the current target state.

In some embodiments, the device then checks for exceptions (e.g., via decisions 100×9, 100×10, and 100×11, described in more detail below) that, in some circumstances, reassign the current target state. The device then determines (1036) whether liftoff has been detected and, if so, navigates to (e.g., displays) (1038) a next/previous user interface if the current target state was not reassigned according to an exception. For example, assuming that the position of contacts 4510, 4514, 4518, and 4522, and/or application view 4526, FIG. 5C11 is sufficiently fast enough to the right (e.g., past x-position threshold 920-*b* depicted in FIG. 9B) and close enough to the bottom edge of the display (e.g., below minimum y-translation threshold 922 depicted in FIG. 9B), e.g., satisfying "side swipe for next/previous app" criteria (100×5), the device assigns the previously displayed email user interface corresponding to application view 4528 in FIG. 5C11 as the current target state, such that upon liftoff in FIG. 5C12, the device navigates (e.g., displays) the email user interface because it was the current target state at the time of liftoff.

In some embodiments, if the device determines that the input does not satisfy "bottom edge swipe for next/previous app" criteria (100×5), the device then determines (100×6) whether the input appears to be a "pause for app-switcher" gesture (e.g., a pause or near pause in the velocity of an input/application view), indicating an intent of the user (as determined by the device) to navigate to an application-switcher user interface. The device determines (1026) whether the x-velocity and a third metric of the contacts/application view (e.g., a rate of change metric that considers the rate of y-translation and the rate of resizing of the application view) have minimal velocities ($V_x$) and ($V_{y,r}$) (e.g., the contacts/application view have a velocity corresponding to a point near the origin, in sector V bound by dynamic velocity size/translation threshold 910, of the velocity threshold scheme depicted in FIG. 9A). If the properties of the contacts/application view meet this criteria, the device assigns (1022) an application-switcher user interface as the current target state.

In some embodiments, the device then checks for exceptions (e.g., via decisions 100×9, 100×10, and 100×11, described in more detail below) that, in some circumstances, reassign the current target state. The device then determines (1036) whether liftoff has been detected and, if so, navigates to (e.g., displays) (1038) an application-switcher user interface if the current target state was not reassigned according to an exception. For example, assuming that the x-velocity and third metric (e.g., including the rate of resizing) of application view 4526 were minimal in FIG. 5C28 (e.g., near the origin of the velocity threshold scheme depicted in FIG. 9A), e.g., satisfying "pause for app-switcher" criteria (100×6), the device assigns the application switcher user interface as the current target state, such that upon liftoff in FIG. 5C29, the device navigates (e.g., displays) the application-switcher user interface because it was the current target state at the time of liftoff.

In some embodiments, if the device determines that the input does not satisfy "pause for app-switcher" criteria (100×6), the device then determines (100×7) whether the input appears to be a "resize/translate to cancel" gesture (e.g., movement of the input/application view back towards the bottom of the screen with a sufficiently vertical direction and sufficient y-velocity and/or expansion (e.g., via de-scrunching) of the input/application view towards the original size of the input/application view (e.g., as of the time the user interface selection process was invoked), indicating an intent of by the user (as determined by the device) to navigate back to the current application user interface (e.g., the user interface displayed when the input was first detected). In some embodiments, the device determines (1028) whether the velocity of the input is in a substantially downward direction (e.g., within slope thresholds 912 and 914 (distinguishing sector VIII, where the velocity is more vertical, from sectors VI and VII, where the velocity of the contact is more horizontal) in FIG. 9A). This set of criteria require that the velocity fall within sector VIII of the velocity threshold scheme depicted in FIG. 7A, which requires a minimum y-velocity threshold satisfying the value equal to the bottom boundary of the range of velocity threshold 910 in FIG. 9A (e.g., separating sector V from sector VIII). However, because the device already determined that the velocity of the contact did fall within sector V (e.g., the input is not a "pause for app-switcher" 100×6 gesture), the device does not need to check for a minimum y-velocity at this step. In some embodiments, where "swipe down to cancel" decision 100×7 is made before "pause for app-switcher" decision 100×6, or "pause for app-switcher" decision 100×6 is not included, the application will determine whether the y-velocity of the contact meets a minimum y-velocity threshold, such as the lower boundary of the range of velocity threshold 910 depicted in FIG. 9A. If the properties of the contact meet this criteria, the device assigns (1030) the current application user interface as the current target state.

In some embodiments, the device then checks for exceptions (e.g., via decisions 100×9, 100×10, and 100×11, described in more detail below) that, in some circumstances, reassign the current target state. The device then determines (1036) whether liftoff has been detected and, if so, navigates to (e.g., displays) (1038) the current application user interface if the current target state was not reassigned according to an exception. For example, assuming that the velocity of contact 5070 in FIG. 5A55 was substantially downward (e.g., falling within sector VIII depicted in FIG. 9A), e.g., satisfying "swipe down to cancel" criteria (1028), the device assigns the messaging user interface corresponding to representation 5014 (e.g., the user interface displayed when the device first detected contact 5070 in FIG. 5A52) as the current target state, such that upon liftoff in FIG. 5A56, the device navigates (e.g., displays) the messaging application user interface because it was the current target state at the time of liftoff. In some embodiments, in addition to returning to the current application user interface, the device also removes the application dock that was displayed in response to the initial portion of the input. In some embodiments, the device does not remove the application dock that was displayed in response to the initial portion of the input, and the dock remains displayed on the current application user interface after the device exits the transitional user interface.

In some embodiments, if the device determines that the input does not satisfy "resize/translate to cancel" criteria (100×7), the device then determines (100×8) whether the input appears to be a "short, slow movement to app-switcher" gesture (e.g., an input causing an application view to have a magnitude of a third metric (e.g., a rate of change metric that accounts for the y-translation component of a translation of the application view and resizing of the application view, e.g., such as a swipe with slow upwards y-velocity and/or a scrunch with a slow, inward pinching motion, that has not translated significantly to the right or left), indicating an intent of the user (as determined by the device) to navigate to an application-switcher user interface. In some embodiments, the device determines whether the magnitude of the third metric of the input/application view is negative (1032) (e.g., below the x-axis of the velocity threshold scheme depicted in FIG. 9A) or the magnitude of the second metric of the input/application view (e.g., either a current x-position of the contacts/application view or a predicted x-position of the application view) meets (1034) a third x-position threshold (e.g., 3rd x-position threshold 924 in the right or left direction in FIG. 9B). If the properties of the input/application view do not meet either of these criteria, the device assigns (1022) an application-switcher user interface as the current target state. For example, assuming that the velocity of the scrunching motion of contacts 4670, 4674, 4678, 4682, and 4686, and the rate at which application view 4526 is shrinking, in FIG. 5C38, is sufficiently slow, and that application view 4526 has not translated sufficiently in the x-direction, the device assigns the application switcher user interface as the current target state, as indicated by concurrent display of previously displayed application view 4528 and dock in the background.

In some embodiments, if the magnitude of the third metric is negative (1032) or the magnitude of the second metric (e.g., either a current x-position of the contact/application view or a predicted x-position of the application view) meets (1034) the third x-position threshold, the device determines whether the input is a first swipe gesture (e.g., as opposed to a second swipe gesture in a series of application user interface navigating swipe gestures where the stack of cards has not yet been reshuffled). For example, the swipe gesture illustrated in FIGS. 5C10-5C11 is a first swipe gesture because there we no previous right or left swipe gestures in the series. In some embodiments, if the input is not a first swipe gesture, the device assigns (1024) the next/previous application user interface as the current target state, because there is an increased probability the user intends to keep navigating between previously displayed user interfaces, since they just executed such a swipe gesture.

In some embodiments, if the input is a first swipe gesture (1033), the device determines (1035) whether an x-position threshold (e.g., corresponding to a magnitude of a second metric) is met (e.g., to distinguish between a purposeful navigation to a previously displayed application user interface and an incidental contact). If the x-position threshold is met, the device assigns (1024) the next/previous application user interface as the current target state. If the x-position threshold is not met, the device assigns (1024) the current application user interface as the target state, not finding a substantial similarity between the contacts and a dedicated navigation gesture.

In some embodiments, having assigned the application-switcher user interface (1022), next/previous application user interface (1024), or current application user interface (1030) as the current target state, in some embodiments, the device then checks for exceptions (e.g., via decisions 100×9, 100×10, and 100×11, described in more detail below) that, in some circumstances, reassign the current target state. The device then determines (1036) whether liftoff has been detected and, if so, navigates to (e.g., displays) (1038) the currently assigned target state user interface.

In some embodiments, after each assignment of a current application state, the device checks to see if the properties of the contact meet an exception, each designed to avoid a different unintended navigation, as illustrated in FIG. 10C. In some embodiments, the order and identity of the exceptions varies (e.g., the order of execution of the exceptions change, exceptions are, removed or modified, or additional exceptions are added). First, the device replaces (100×9) the currently assigned target state with the current application if it determines that the input was accidental (e.g., it did not travel far enough away from an initial location on the display (1060) and the home screen or application-switcher was assigned as the target state (1066)).

In some embodiments, after one or more of the determinations above, the device replaces (100×10) assignment of the next or previous application user interface with assignment of the application-switcher as the target state if the previous target state was application-switcher (1061). For example, when the input causes the device to display the application user interface, right and left movement is interpreted as swiping through the stack of cards, rather than moving to a next or previous application user interface).

In some embodiments, if one or more of the contacts have entered the right or left edge region of the display, the device replaces (100×11) assignment of anything other than a next or previous application user interface with an assignment of an application-switcher user interface if the application-switcher user interface was the target state assigned prior to the contact entering the edge region. This compensates for an inadequate number of contact sensors at the edge region. For example, as a contact moves off the side of the display, there are no sensors to detect continuing lateral movement. However, as long as some part of the contact is over the display, the device is still registering vertical movement. Thus, the device optionally interprets a diagonal movement as a purely vertical movement.

In some embodiments, the device checks to see whether "ignore accidental inputs" criteria (100×9) (e.g., where the user touches the device without intent to navigate to a different user interface) have been met. The device determines (1060) whether the y-position of the input (e.g., either current y-position of the contact/user interface representation or a predicted y-position of the user interface representation) meets a second y-position threshold (e.g., 2nd y-position threshold 926, close to the bottom edge of the display, in FIG. 9B). If the input meets the second y-position threshold (e.g., the contact has traveled sufficiently far from the initial location on the display to rule out an accidental navigation touch), the device moves onto the next exception without updating the current target state (e.g., determining that the input was not an accidental navigation touch).

If the input does not meet the second y-position threshold, the device determines (1066) whether the current target state is a home screen user interface or an application-switcher user interface. If so, the device assigns (1068) the current application user interface as the current target state (e.g., updates the current target state to ignore what is likely an inadvertent edge touch), and proceeds to the next exception. If the current target state is not a home screen user interface or an application-switcher user interface, the device moves onto the next exception without updating the current target state (e.g., determining that the input was not an accidental edge touch). For example, a contact that move significantly right or left without traveling away from the bottom edge of the display would indicate a clear intention to navigate to a previously displayed application user interface (e.g., satisfying "side swipe for next/previous app" criteria (100×4)) as, thus, should not be determined to be an accidental input).

In some embodiments, after determining whether to "ignore accidental inputs" (100×9) (e.g., by updating the current target state to the current application user interface), the device checks to see whether "application-switcher preference" criteria (100×10) (e.g., where the target state changed from an application-switcher user interface to a next/previous application user interface) have been met. The device determines (1061) whether the current target state is next/previous application and the target state prior (e.g., immediately prior) was application-switcher (e.g., whether the device changed assignment of an application-switcher as the current target state to an assignment of a next/previous application as the current target state). If this is the case, the device assigns (1072) an application-switcher user interface as the current target state, and proceeds to the next exception. If this was not the case, the device proceeds to the next exception without updating the current target state.

In some embodiments, after determining whether to give "application-switcher preference" (100×10) (e.g., by updating the current target state from a next/previous application user interface to an application-switcher user interface), the device checks to see whether "edge error correction" criteria (100×11) (e.g., where the contact is sufficiently close to the right or left edge of the display, a recent target state was application-switcher, and the current target state is not next/previous application) have been met. The device determines (1062) whether the contact is within an x-edge region of the display (e.g., satisfying x-edge position threshold 928 to the right or left in FIG. 9B, for example, within about 1 mm, 2 mm, 3 mm, 4 mm, or 5 mm from a right or left edge of the display) and, if not, proceeds to determine (1036) whether liftoff has been detected (or to an additional or reordered exception), without updating the current target state.

In some embodiments, if the contact is within an x-edge region of the display, the device determines (1070) whether a previous target state (e.g., a target state assigned within a time threshold of entering the x-region, for example, within the previous 1, 2, 3, 4, 5, 6, 7, 8, 9, 10, 11, 12, 13, 14, 15, 16, 17, 18, 19, or 20 frame refreshes or target state determinations) was an application-switcher user interface and the current target state is not a next/previous application user interface. If these criteria are met, the device replaces (1072) the current target state with the previous target state (e.g., application-switcher), and then proceeds to determine (1036) whether liftoff has been detected (or to an additional or reordered exception). If these criteria are not met, the device proceeds to determine (1036) whether liftoff has been detected (or to an additional or reordered exception), without updating the current target state.

In some embodiments, after determining (1036) that lift off of the contacts were not detected, the device determines (1040) whether a dynamic velocity threshold (e.g., dynamic size/translation velocity threshold 910, as illustrated in FIGS. 9A and 9C) should be adjusted (e.g., where the current target application is an application-switcher user interface, and the contact has nearly stalled on the screen, the device increases the dynamic velocity threshold needed the transition from sector V in FIG. 9A to sector II, associated with assignment of a home screen user interface, preventing inadvertent increases in contact velocity as the user lifts the contact off the screen from being interpreted as a change in the user's intent to navigate home, rather than to the application-switcher user interface). This dynamic correction improves the prediction and accuracy of navigating to a particular target state user interface (e.g., an application-switcher user interface).

In some embodiments, the device determines (1042) whether the current target state is an application-switcher user interface and whether a magnitude of a third metric ($V_{y,r}$) (e.g., a rate of change metric that accounts for a y-velocity of the application view and a resizing velocity of the application view) of the contacts/application view and an x-velocity of the contacts/application view do not meet a minimal velocity threshold (e.g., the range of velocity threshold 910 in FIG. 9A, or a range of velocity thresholds defining a smaller area in sector V of FIG. 9A (e.g., a smaller region around the origin of the velocity threshold scheme depicted in FIG. 9A).

In some embodiments, if these criteria are met (e.g., the contacts have stalled or nearly stalled at a time where the current target state is an application user interface), the device determines (1046) whether a dynamic velocity threshold is at a maximum range (e.g., whether dynamic size/translation velocity threshold range 910 is at is maximum range 910-*b*, as illustrated in FIGS. 9A and 9B) and, if so, continues to monitor (1004) the position and velocity of the input/application view and provide visual feedback without updating the dynamic threshold. If the dynamic threshold is not at a maximum range (e.g., dynamic size/translation velocity threshold range 910 is smaller than maximum range 910-*b*), the device increases (1048) the range of the dynamic velocity threshold (e.g., expands the threshold 910 "box" out towards maximum threshold range 910-*b*), before continuing to monitor (1004) the position and velocity of the input/application view and provide visual feedback.

In some embodiments, if these criteria are not met (e.g., the contact has not stalled or nearly at a time where the current target state is an application user interface), the device determines (1042) whether a dynamic velocity threshold is at a minimum range (e.g., whether dynamic size/translation velocity threshold range 910 is at is minimum range 910-*a*) and, if so, continues to monitor (1004) the position and velocity of the input/application view and provide visual feedback without updating the dynamic threshold. If the dynamic threshold is not at a minimum range (e.g., dynamic size/translation velocity threshold range 910 is larger than minimum range 910-*a*), the device decreases (1044) the range of the dynamic velocity threshold (e.g., contracts the threshold 910 "box" out towards minimum threshold range 910-*a*), before continuing to monitor (1004) the position and velocity of the input/application view and provide visual feedback. It should be understood that the process described in the flow diagrams optionally applies to any of the methods described herein for determining whether to enter an application switching user interface, a home screen, and/or a previous/next application are used for navigating between the user interfaces described herein with respect to the user interfaces shown in FIGS. 5C1-5C59.

FIGS. 9A-9C illustrate example thresholds for navigating between different user interface, e.g., an application user interface, a previous application user interface, a home screen user interface, and an application-switcher user interface. The thresholds illustrated in FIGS. 9A-9C are example of thresholds used in conjunction with methods 600, 700, 1000, 1100, 1200, and 1300, for navigating between user interfaces.

FIG. 9A illustrates a series of example velocity thresholds for metrics of the input/application view that account for the rate of translation and rate of resizing/scrunching motions of the input/application view (e.g., rate of change metrics), which are used in the navigation criteria described above, e.g., with relation to FIGS. 10A-10D. The example velocity thresholds illustrated in FIG. 9A include horizontal translation velocity ($V_x$; e.g., a velocity component corresponding to the abscissa in the Cartesian coordinate system illustrated in FIG. 9A, that accounts for the rate of horizontal translation of the input/application view) and vertical translation/resizing velocity ($V_{y,r}$; e.g., a velocity component corresponding to the ordinate in the Cartesian coordinate system illustrated in FIG. 9A, that accounts for the rate of vertical translation and resizing of the input/application view, e.g., accounting for the third metric as described above with relation to FIGS. 10A-10D) components on the display. The intersection of the boundaries defines eight sectors (e.g., sectors I-VIII), each associated with a target state for a particular user interface. That is, while in a transitional user interface enabling a user to navigate to any of a plurality of user interfaces (e.g., an application user interface, a next/previous application user interface, a home screen user interface, or an application-switcher user interface), the device assigns a target state user interface based on at least the velocity (e.g., $V_x$ and $V_{y,r}$) of the input and/or application view. When the velocity of the input and/or application view falls within a particular sector, as defined in FIG. 9A, the device assigns the user interface associated with the sector as the target state, as long as the input satisfies all other criteria (e.g., positional criteria) required for selection of that target state. In some embodiments, the thresholds are used in conjunction with methods 600, 700, 1000, and 1100 for navigating between user interfaces.

For example, when the magnitude of a third metric of an input and/or application view is greater than threshold 902, the input is in sector I which is associated with selection of a home screen user interface as the target state. Similarly, inputs with velocities within sector II are associated with selection of a home screen user interface target state. Inputs with velocities within sectors III, IV, and V are associated with selection of an application-switcher user interface target state. Inputs with velocities within sectors VI and VII are associated with selection of a next or previous application user interface target state. Finally, inputs with velocities within sectors VIII are associated with selection of the current application user interface (e.g., the application user interface displayed before the device entered the transitional user interface) target state.

FIG. 9A also illustrates that threshold velocities are, optionally, dynamic. For example, the range of velocity threshold 910, defining sector V associated with an application-switcher user interface target state, expands from a minimal range of threshold values 910-*a* to a maximal range of threshold values 910-*b* when a contact lingers with minimal velocity in sector V. Similarly, velocity thresholds 904 and 906, providing boundaries between selecting a next/previous application user interface and a home state user interface as the target state optionally dynamically varies, e.g., from boundary 904-*c* to 904-*b*, to allow a less vertically moving input be associated with selection of a home screen user interface as the target state, or to allow a more vertically moving input to be associated with selection of a next/previous application user interface as the target state. Depending upon the designs of a particular system, any threshold is, optionally dynamic, for example by applying a method (e.g., similar to method 1040) of dynamically adjusting threshold values.

FIG. 9B illustrates a series of example positional thresholds, relating to a first metric (e.g., a y-magnitude metric accounting for a y-translation component of the translation of an input/application view and a resizing component of the input/application view) and a second metric (e.g., an x-magnitude metric that accounts for an x-translation component of the translation of an input/application view), e.g., on a simulated display corresponding to a device (e.g., in some embodiments, the device determines a simulated y-translation for the input/application view, based on the magnitude of a value for the first metric and a simulated x-translation for the input/application view, based on the magnitude of a value for the second metric, and maps the simulated (x,y) translation to a position corresponding to a position on the display of the device). In some embodiments, the thresholds are used in conjunction with methods 600, 700, 1000, 1100, 1200, and 1300, for navigating between user interfaces. In some embodiments, position thresholds as illustrated in FIG. 9B work in conjunction with velocity thresholds as illustrated in FIG. 9A. In some embodiments, satisfaction of a particular position threshold optionally overrides satisfaction of a corresponding velocity threshold. For example, satisfaction of 1st y-position threshold 98 in FIG. 9B overrides a corresponding velocity threshold in FIG. 9A, and associates the input with selection of a home screen user interface target state.

FIG. 9C illustrates an example implementation of a dynamic size/translation velocity threshold (e.g., velocity threshold 910, as also illustrated in FIG. 9A, which corresponds to a magnitude of a third metric (e.g., a rate of change metric) of the input/application view, in accordance with some embodiments. At time T−3, the magnitude of the third metric of the contact/application view (e.g., which accounts for a combination of the input/application view translational velocity and input/application resizing velocity) 930 is greater than dynamic velocity threshold 910-D (which divides selection of a home screen user interface and an application-switcher user interface in FIG. 9A) and the input is therefore associated with selection of a home screen (HS) user interface target state. As the magnitude of the third metric 930 decreases around time T, the magnitude of the third metric drops below dynamic velocity threshold 910-D, satisfying the criteria for selecting an application-switcher (AS) user interface target state. In order to favor selection of the application-switcher user interface as the final user interface, dynamic velocity threshold 910-D increases over time as the magnitude of the third metric 930 continues to be below the threshold. Thus, for example, even though the magnitude of the third metric of the input/application view 930 at time T+5 is greater than the magnitude of the third metric of the input/application view at time T−3, because dynamic velocity threshold 910-D has increased, the input still satisfies selection of application-switcher criteria. However, when dynamic velocity threshold 910-D reaches threshold maximum 910-*b*, the device stops increasing the threshold value, despite that the magnitude of the third metric of the input/application view 930 is still less than the threshold. Once the magnitude of the third metric of the input/application view 930 exceeds dynamic velocity threshold 930-D at time T+6, the device begins reducing dynamic velocity threshold 910-D, no longer favoring selection of the application-switcher user interface as the final target state. While the variable thresholds discussed above are velocity thresholds, a similar principle is, optionally, applied in other types of thresholds such as position thresholds, pressure thresholds, distance thresholds. Similarly, while the variable thresholds are discussed above with reference to determining whether to select a home screen or application switcher user interface, variable thresholds that operate in the manner described above could be applied to a wide variety of user interface interactions (e.g., determining whether to navigate back to a prior user interface or stay on the current user interface in response to an edge swipe gesture, determining whether to delete an item or not in response to a swipe gesture, determining whether or not to display an expanded preview of a content item based on whether an input has an intensity above a predetermined intensity threshold, whether or not to display a control panel user interface in response to an edge swipe gesture, etc.).

FIGS. 11A-11F are flow diagrams illustrating a method 1100 of navigating between user interfaces based on a multi-contact gesture or perform an operation within an application, in accordance with some embodiments. Method 1100 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

Method 1100 facilitates navigation from an application user interface to another user interface outside of the application, such as to a different application or to a system user interface (e.g., a home screen), or performing an operation within the application, based on a gesture (e.g., a gesture performed with multiple concurrently detected contacts) that is initiated from the application user interface. The outcome of the gesture is based on which of a plurality of different sets of criteria (e.g., criteria based on gesture type that are performed by the contacts, the total number of concurrently detected contacts, positions, timing, and/or movement parameters of the contacts, and/or user interface objects that are displayed) are met by the gesture (e.g., at the time that the gesture is terminated). When determining the destination state of the device (e.g., what operation to perform and/or what user interface to display), the input gesture is continuously evaluated against the different sets of criteria. Dynamic visual feedback is continuously displayed to indicate the likely destination state of the device based on the input that has been detected up to this point, so that the user is given opportunities to adjust his/her input to modify the actual destination state of the device that is reached after the termination of the input. Using different sets of criteria to determine the final destination state of the device (e.g., the operation that is performed and/or the user interface that is finally displayed) allows the user to use a fluid gesture can be changed mid-stream (e.g., either because the user decides to change the outcome they want to achieve or the user realized based on the device feedback that he/she is providing an incorrect input for an intended outcome) to achieve an intended outcome. This helps to avoid the need for the user to undo the effects of an unintended gesture (e.g., via another set of inputs) and then start the gesture over again, which makes the user-device interface more efficient (e.g., by helping the user to provide required inputs to achieve an intended outcome and reducing user mistakes when operating/interacting with the device), which, additionally, reduces power usage and improves battery life of the device by enabling the user to use the device more quickly and efficiently. In this method, the heuristic that is used to determine whether to navigate outside of the application user interface or performing an operation within the application is based on the number of contacts that are included in the gesture (e.g., a two-finger gesture is used for operation within the application, while a four- or five finger gesture is used for initiating a system level operation outside of the application, such as navigating to a different application or the home screen). After it is determined that the gesture includes more than a threshold number contacts, different criteria are used in a secondary heuristic to determine whether to navigate to a different application or a system level user interface (e.g., the home screen). Using the number of contacts to differentiate an application-level input and a system-level input enhances the operability of the device and makes the user-device interface more efficient (e.g., by helping the user to provide required inputs to achieve an intended outcome and reducing user mistakes when operating/interacting with the device), which, additionally, reduces power usage and improves battery life of the device by enabling the user to use the device more quickly and efficiently. In addition, allowing the user to choose between navigating to another application or to a system user interface, in addition to choosing to perform an in-app operation, based on different criteria also enhances the operability of the device and makes the user-device interface more efficient (e.g., by reducing the number of inputs needed to perfoiin an operation), which, additionally, reduces power usage and improves battery life of the device by enabling the user to use the device more quickly and efficiently.

In method 1100, the device displays (1102), on the display, a user interface of a first application (e.g., user interface of the maps application in FIGS. 5C1, 5C4, 5C7, 5C10, 5C20, 5C23, 5C27, 5C30, 5C33, 5C37, 5C43, 5C48, 5C55, or the user interface of the email application in FIGS. 5C13, 5C17) of a plurality of applications installed on the device. The device detects (1104) a gesture on the touch-sensitive surface, wherein detecting the gesture includes detecting an initial portion of the gesture while displaying the user interface of the first application on the display, and detecting the gesture includes concurrently detecting a plurality of contacts on the touch-sensitive surface (e.g., as shown by detection of the contacts shown in FIGS. 5C1, 5C4, 5C7, 5C10, 5C13, 5C17, 5C20, 5C23, 5C27, 5C30, 5C33, 5C37, 5C43, 5C48, or 5C55) and detecting movement of the plurality of contacts (e.g., including movement of at least one of the plurality of contacts across the touch-sensitive surface toward (or away) from least one of the plurality of contacts that is kept substantially stationary on the touch-sensitive surface (e.g., as in a pinch or de-pinch gesture), concurrent and synchronized movement of all of the plurality of contacts in substantially the same direction (e.g., as in a multi-finger swipe gesture), concurrent movement of multiple of the plurality of contacts across the touch-sensitive surface toward (or away) from substantially the same location (e.g., as in a pinch or de-pinch gesture), and/or a combination of the swipe and pinch/de-pinch movements by the plurality of contacts). In some embodiments, detecting the gesture includes and detecting lift-off of the plurality of contacts after detecting the movement of the contacts.

In response to detecting the gesture on the touch-sensitive surface (1106), in accordance with a determination that the gesture includes (e.g., exactly includes) two concurrently detected contacts (e.g., as in a two-finger gesture), the device performs (1108) an operation in the first application (e.g., the gesture inputs are handed off to the first application and the first application determines which application-specific operation is to be performed in accordance with the gesture inputs) based on the movement of the two concurrently detected contacts (e.g., concurrent movement of the contacts and/or movement of one contact relative to the other contact across the touch-sensitive surface) during the gesture. This is illustrated in FIGS. 5C1-5C9, where the device rescales or scrolls the map within the user interface of the map application.

In response to detecting the gesture on the touch-sensitive surface (1106), in accordance with a determination that the gesture includes more than a predetermined number of concurrently detected contacts that is greater than two (e.g., the predetermined number is three) (e.g., as in a four- or five-finger swipe gesture, or a four- or five-finger pinch gesture, or a combination of four- or five-finger swipe and pinch gesture) and that the movement of the concurrently detected contacts during the gesture meets first criteria (e.g., prior-application criteria, where the prior application criteria require that the gesture include synchronous movement of the predetermined number of concurrently detected contacts in a first direction (e.g., horizontally leftward or rightward) across the touch-sensitive surface to meet criteria for recognizing a multi-finger swipe input in the first direction, in order for the prior-application criteria to be met), the device switches (1108) from displaying the user interface of the first application to displaying a user interface of a second application of the plurality of applications that is distinct from the first application (e.g., the second application is the last displayed application prior to the display of the first application in accordance with an application stack that lists applications based on the relative recency with which they were last used (e.g., displayed) on the device). This is illustrated in FIGS. 5C10-5C12, FIGS. 5C33-5C36, and FIGS. 5C37-5C42, where the device switches from displaying the user interface of the map application to the user interface of the email application, in accordance with a determination that the gesture by the multiple contacts (e.g., more than two) have met the prior-application criteria (e.g., the criteria for side swipe to go to previous/next app 100×4, as described with respect to FIGS. 9A-9C and 10A-10D).

In response to detecting the gesture on the touch-sensitive surface (1106), in accordance with a determination that the gesture includes more than the predetermined number of concurrently detected contacts (e.g., the predetermined number is greater than two, such as three) (e.g., as in a four- or five-finger swipe gesture, or a four- or five-finger pinch gesture, or a combination of four- or five-finger swipe and pinch gesture) and that the movement of the concurrently detected contacts during the gesture meets second criteria (e.g., home-navigation criteria, where the home-navigation criteria require that the gesture includes synchronous movement of the predetermined number of concurrently detected contacts in a second direction (e.g., vertically upward or downward) across the touch-sensitive surface to meet criteria for recognizing a multi-finger swipe input in the second direction, or that the gesture includes concurrent movement of the predetermined number of concurrently detected contacts toward a common locus (e.g., stationary or moving) across the touch-sensitive surface to meet criteria for recognizing a multi-finger pinch gesture), in order for the home-navigation criteria to be met) that are distinct from the first criteria (e.g., the prior-application criteria), the device switches (1112) from displaying the user interface of the first application to displaying a user interface (e.g., a system user interface, such as a home screen user interface or app launcher user interface) that includes respective application icons for opening the plurality of applications installed on the device (e.g., on the home screen user interface or app selecting user interface, applications are displayed in a predetermined arrangement without regard to the recency with which they were used on the device). This is illustrated in FIGS. 5C12-5C16, FIGS. 5C27-5C29, and FIGS. 5C43-5C47, in which the device switches from displaying the user interface of the map application to the home screen user interface, in accordance with a determination that the gesture by the multiple contacts (e.g., more than two) have met the home-navigation criteria (e.g., the criteria for navigating to the home screen 100×2, 100×3, as described with respect to FIGS. 9A-9C and 10A-10D).

In some embodiments, the first criteria (e.g., the prior-application criteria, e.g. the criteria for navigating to the previous or next application 100×4 in FIGS. 9A-9C and 10A-10D) require (1114) that the gesture includes more than a first threshold amount of movement (e.g., a movement parameter (e.g., speed, and/or distance, etc.) of the movement by the concurrently detected contacts exceeds a first threshold set for that movement parameter, e.g., as described in FIGS. 9A-9C and 10A-10D) in a first direction (e.g., a direction across the touch-sensitive surface that corresponds to a direction toward a right edge of the display) in order for the first criteria to be met (e.g., a horizontal four-finger or five-finger swipe across the touch-screen or touch-sensitive surface by more than a threshold distance or with more than a threshold speed meets the first criteria). This is illustrated in FIG. 5C10-5C12, 5C33-5C36, 5C37-5C42, for example. Requiring that the gesture includes more than a threshold amount of movement in a respective direction in order to meet the first criteria (e.g., the criteria for navigating to another application) enhances the operability of the device and makes the user-device interface more efficient (e.g., by performing an operation when a set of conditions have been met without requiring further user inputs, reducing the number inputs needed to perform an operation, and providing a function without cluttering the user interface with additional controls), which, additionally, reduces power usage and improves battery life of the device by enabling the user to use the device more quickly and efficiently.

In some embodiments, the second criteria (e.g., the home-navigation criteria based on swipe, e.g., the criteria for navigating to the home screen 100×2 or 100×3 in FIGS. 9A-9C and 10A-10D) require (1116) that the gesture includes more than a second threshold amount of movement (e.g., a movement parameter (e.g., speed, and/or distance, etc.) of the movement by the concurrently detected contacts exceeds a second threshold set for that movement parameter, e.g., as described in FIGS. 9A-9C and 10A-10D) in a second direction (e.g., the second direction is perpendicular to the first direction) (e.g., a direction across the touch-sensitive surface that corresponds to a direction toward a top edge of the display) in order for the second criteria (e.g., the home-navigation criteria based on swipe) to be met (e.g., a vertical (e.g., upward) four-finger or five-finger swipe across the touch-screen or touch-sensitive surface by more than a preset threshold distance (e.g., greater threshold than that used for the multitasking-navigation criteria based on swipe) or with more than a preset threshold speed (e.g., greater threshold than that used for the multitasking-navigation criteria based on swipe) meets the first version of the second criteria (e.g., the home-navigation criteria based on swipe)). This is illustrated in FIG. 5C13-5C16 and 5C43-5C47, for example. Requiring that the gesture includes more than a threshold amount of movement in a respective direction (e.g., different from the direction for navigating to another application) in order to meet the second criteria (e.g., the criteria for navigating to the home screen) enhances the operability of the device and makes the user-device interface more efficient (e.g., by performing an operation when a set of conditions have been met without requiring further user inputs, reducing the number inputs needed to perform an operation, and providing a function without cluttering the user interface with additional controls), which, additionally, reduces power usage and improves battery life of the device by enabling the user to use the device more quickly and efficiently.

In some embodiments, the second criteria (e.g., the home-navigation criteria based on pinch (e.g., used alternative to or in addition to the home-navigation criteria based on swipe), e.g., the criteria for navigating to the home screen 100×2 or 100×3 in FIGS. 9A-9C and 10A-10D) require (1118) that the gesture includes more than a third threshold amount of movement by the concurrently detected contacts toward one another (e.g., a movement parameter (e.g., speed, and/or distance, etc.) of the movement by the concurrently detected contacts toward one another (e.g., represented by a common stationary or moving locus) exceeds a third threshold set for that movement parameter, e.g., as described in FIGS. 9A-9C and 10A-10D) in order for the second criteria (e.g., the home-navigation criteria based on pinch) to be met. (e.g., a four-finger or five-finger pinch movement by more than a preset threshold distance (e.g., greater threshold than that used for the multitasking-navigation criteria based on pinch) or with more than a preset threshold speed (e.g., greater threshold than that used for the multitasking-navigation criteria based on pinch) meets the second version of the second criteria (e.g., the home-navigation criteria based on pinch)). This is illustrated in FIG. 5C27-5C29 and 5C43-5C47, for example. Requiring that the gesture includes more than a threshold amount of movement by contacts toward a common locus (e.g., as an alternative or in addition to the home-navigation criteria based on swipe) in order to meet the second criteria (e.g., the criteria for navigating to the home screen) enhances the operability of the device and makes the user-device interface more efficient (e.g., by performing an operation when a set of conditions have been met without requiring further user inputs, reducing the number inputs needed to perform an operation, and providing a function without cluttering the user interface with additional controls), which, additionally, reduces power usage and improves battery life of the device by enabling the user to use the device more quickly and efficiently.

In some embodiments, in method 1100, in response to detecting the gesture on the touch-sensitive surface (1106), in accordance with a determination that the gesture includes more than the predetermined number of concurrently detected contacts (e.g., the predetermined number is greater than two, such as three) (e.g., as in a four- or five-finger swipe gesture, or a four- or five-finger pinch gesture, or a combination of four- or five-finger swipe and pinch gesture) and that the movement of the concurrently detected contacts during the gesture meets third criteria (e.g., multitasking-navigation criteria, where the multitasking-navigation criteria are met with substantially the same gesture types (e.g., multi-finger upward swipe gesture or multi-finger pinch gesture) as the home-navigation criteria, but with different thresholds for a characteristic parameter of the movement of the contacts) (e.g., the third criteria are distinct from the first criteria (e.g., the previous-application criteria) and the second criteria (e.g., the home-navigation criteria) (e.g., the criteria to navigate to the app-switcher 100×6 or 100×8 in FIGS. 9A-9C and 10A-10D)), the device switches (1120) from displaying the user interface of the first application to displaying a user interface that includes respective representations of a plurality of recently active applications (e.g., a multitasking user interface in which representations of applications are displayed based on the recency with which those applications were actively used (e.g., displayed in the foreground) on the device, the representations, when selected, causes the device to display the application). This is illustrated in FIG. 5C17-5C19 and 5C30-5C32, for example. Using the number of contacts to differentiate an application-level input and a system-level input enhances the operability of the device and makes the user-device interface more efficient (e.g., by helping the user to provide required inputs to achieve an intended outcome and reducing user mistakes when operating/interacting with the device), which, additionally, reduces power usage and improves battery life of the device by enabling the user to use the device more quickly and efficiently. In addition, allowing the user to choose between navigating to another application, to a home screen user interface, or a multitasking user interface, in addition to choosing to perform an in-app operation, based on different criteria also enhances the operability of the device and makes the user-device interface more efficient (e.g., by reducing the number of inputs needed to perform an operation), which, additionally, reduces power usage and improves battery life of the device by enabling the user to use the device more quickly and efficiently.

In some embodiments, the third criteria (e.g., the multitasking-navigation criteria based on swipe, e.g., the criteria for navigating to the app-switcher user interface 100×6 or 100×8 in FIGS. 9A-9C and 10A-10D) require (1122) that the input includes more than a fourth threshold amount of movement (e.g., a threshold for activating the user interface navigation process) and less than a fifth threshold amount of movement (e.g., the threshold used in the home-navigation criteria based on swipe) in a second direction (e.g., a direction across the touch-sensitive surface that corresponds to a direction toward a top edge of the display) (e.g., the same movement direction as that is required in the first version of the home-navigation criteria (e.g., home-navigation criteria based on swipe) for navigating to the home screen user interface) (e.g., the criteria and thresholds as described in FIGS. 9A-9C and 10A-10D) in order for the third criteria (e.g., the multitasking-navigation criteria based on a multi-finger swipe) to be met. In some embodiments, the fourth and fifth threshold amounts of movement are based on a movement parameter (e.g., speed, and/or distance, etc.) of the movement by the concurrently detected contacts, and define a predefined threshold range set for that movement parameter for the multitasking-navigation criteria based on swipe (e.g., as described in FIGS. 9A-9C and 10A-10D). This is illustrated in FIGS. 5C13-5C16 (for going to the home screen) and FIGS. 5C17-5C19 (for going to the app-switcher), where the vertical movement of the contacts required for going to the app-switcher is smaller than the vertical movement of the contacts required for going to the home screen, for example. Requiring that the gesture includes movement that is confined within a threshold range (e.g., more than a fourth threshold amount of movement and less than a fifth threshold amount of movement) in a respective direction (e.g., different from the direction for navigating to another application and same as the direction for navigating to the home screen) in order to meet the third criteria (e.g., the criteria for navigating to the application-switcher user interface) enhances the operability of the device and makes the user-device interface more efficient (e.g., by performing an operation when a set of conditions have been met without requiring further user inputs, reducing the number inputs needed to perform an operation, and providing a function without cluttering the user interface with additional controls), which, additionally, reduces power usage and improves battery life of the device by enabling the user to use the device more quickly and efficiently.

In some embodiments, the third criteria (e.g., the multitasking-navigation criteria based on pinch (e.g., used alternative to or in additional to the multitasking-navigation criteria based on swipe), e.g., the criteria for navigating to the app-switcher user interface 100×6 or 100×8 in FIGS. 9A-9C and 10A-10D) requires (1124) that the input includes less than a sixth threshold amount of movement (e.g., a threshold that is the same as the threshold amount of movement required by the home-navigation criteria based on pinch) (e.g., the criteria and thresholds as described in FIGS. 9A-9C and 10A-10D) by the concurrently detected contacts toward one another in order for the third criteria (e.g., multitasking-navigation criteria based on pinch) to be met. In some embodiments, the sixth threshold amount of movement is based on a movement parameter (e.g., speed, and/or distance, etc.) of the movement by the concurrently detected contacts toward one another (e.g., represented by a common stationary or moving locus), and is the same as the respective threshold set for that movement parameter in the home-navigation criteria based on pinch. For example, if the multi-finger pinch exceeds this threshold amount of pinching movement, the device displays the home screen user interface; and if the multi-finger pinch does not exceed this threshold amount of pinching movement (but exceeded a threshold amount of movement set for activating the user interface navigation process), the device displays the multitasking user interface. This is illustrated in FIGS. 5C27-5C29 (for going to the home screen) and FIGS. 5C30-5C32 (for going to the app-switcher), where the movement of the contacts toward one another as required for going to the app-switcher is smaller than the movement of the contacts toward one another as required for going to the home screen, for example. Requiring that the gesture includes movement of contacts toward one another that is less than a threshold amount of movement (e.g., as opposed to requiring more than the threshold amount of movement to go to the home screen) in order to meet the third criteria (e.g., the criteria for navigating to the application-switcher user interface) enhances the operability of the device and makes the user-device interface more efficient (e.g., by performing an operation when a set of conditions have been met without requiring further user inputs, reducing the number inputs needed to perform an operation, and providing a function without cluttering the user interface with additional controls), which, additionally, reduces power usage and improves battery life of the device by enabling the user to use the device more quickly and efficiently.

In some embodiments, in response to detecting the gesture on the touch-sensitive surface (1106), in accordance with a determination that the gesture includes more than the predetermined number of concurrently detected contacts (e.g., the predetermined number is greater than two, such as three) (e.g., as in a four- or five-finger swipe gesture, or a four- or five-finger pinch gesture, or a combination of four- or five-finger swipe and pinch gesture) and that the movement of the concurrently detected contacts during the gesture meets fourth criteria (e.g., current app display criteria (e.g., criteria for ignoring accidental inputs or criteria for swiping down or de-pinch to cancel)) (e.g., detecting liftoff of the contacts while the representation of the application is near its starting size and/or when the representation of the application is getting larger and is moving toward the bottom of the display) (e.g., the criteria for maintaining display of the current application and ignoring accidental inputs 100×7 or 100×9 in FIGS. 9A-9C and 10A-10D), the device maintains (1126) display of the first application on the display. For example, the device displays some visual feedback (e.g., the currently displayed user interface shrinks slightly) that allows the user to get an indication that continuation of the gesture would trigger a user interface navigation process, but if the gesture does not continue further, the device restores the currently displayed user interface. This is illustrated in FIGS. 5C20-5C22 where the map user interface is maintained after termination of a small side-swipe gesture by four concurrent contacts, for example. Allowing the device to cancel the effect of a navigation gesture based on the gesture meeting the fourth criteria (e.g., the criteria for ignoring accidental inputs or canceling an input) and restore the currently displayed application user interface enhances the operability of the device and makes the user-device interface more efficient (e.g., by performing an operation when a set of conditions have been met without requiring further user inputs, reducing the number inputs needed to perform an operation, and providing a function without cluttering the user interface with additional controls), which, additionally, reduces power usage and improves battery life of the device by enabling the user to use the device more quickly and efficiently.

In some embodiments, the fourth criteria (e.g., current app display criteria (e.g., criteria for ignoring accidental inputs or criteria for swiping down or de-pinch to cancel)) (e.g., detecting liftoff of the contacts while the representation of the application is near its starting size and/or when the representation of the application is getting larger and is moving toward the bottom of the display) require (1128) that the input includes less than a seventh threshold amount of movement (e.g., a small amount of net movement with beginning and end of the movement very close to each other) (e.g., the seventh threshold amount of movement is the same as the threshold amount of movement required to trigger navigation to the multitasking user interface (e.g., the same as the threshold used as the lower bound of the range set for the multitasking-navigation criteria based on swipe or pinch)) (e.g., criteria and thresholds described with respect to 100×7 or 100×9 in FIGS. 9A-9C and 10A-10D) by the concurrently detected contacts (e.g., movement toward one another within a threshold amount of time when the contacts were initially detected, and/or synchronized movement in the first direction (e.g., toward the top edge of the display)) in order to be met. For example, when the gesture includes less than a threshold amount of pinch movement by the multiple contacts, and the gesture includes less than a threshold amount of swipe movement in the first direction, the fourth criteria are met by the gesture upon termination of the gesture, and the device does not navigate to another user interface from the currently displayed user interface after the termination of the gesture. Allowing the device to cancel the effect of a navigation gesture when the input includes less than a threshold amount of movement and restore the currently displayed application user interface enhances the operability of the device and makes the user-device interface more efficient (e.g., by performing an operation when a set of conditions have been met without requiring further user inputs, reducing the number inputs needed to perform an operation, and providing a function without cluttering the user interface with additional controls), which, additionally, reduces power usage and improves battery life of the device by enabling the user to use the device more quickly and efficiently.

In some embodiments, in response to detecting the gesture on the touch-sensitive surface (1106), in accordance with a determination that the gesture includes more than the predetermined number of concurrently detected contacts and that the movement of the concurrently detected contacts across the touch-sensitive surface is started after at least a threshold amount of time has elapsed since initial detection of the plurality of contacts on the touch-sensitive surface, the device performs (1130) an operation within the first application in accordance with the gesture (e.g., instead of navigating to another user interface on the system-level (e.g., outside of the first application), the device performs an application-specific operation within the application (e.g., pan or zoom the user interface of the application, delete an item in a list, etc.)). This is illustrated in FIGS. 5C23-5C26, where the multi-finger swipe gesture caused the scrolling of the map in the user interface of the map application, when the movement of the contacts started after the time threshold $TT_1$, for example. Using a time threshold to allow a gesture with more than the predetermined number of contacts to be passed to the first application and used to perform an operation within the application (e.g., as opposed to trigger navigation to a user interface outside of the application) enhances the operability of the device and makes the user-device interface more efficient (e.g., by performing an operation when a set of conditions have been met without requiring further user inputs), which, additionally, reduces power usage and improves battery life of the device by enabling the user to use the device more quickly and efficiently.

In some embodiments, in method 1100, the device detects (1132) relative movement of the concurrently detected contacts across the touch-sensitive surface toward one another (e.g., as in a multi-finger pinch gesture) during the gesture; and in accordance with the relative movement of the concurrently detected contacts toward one another (e.g., as in a multi-finger pinch gesture), the device resizes (e.g., reducing the size of) a representation of the user interface of the first application (e.g., dynamically resizing a screenshot of the user interface of the first application in accordance with the relative movement of the concurrently detected contacts toward one another). This is illustrated in FIGS. 5C27-5C28, 5C30-5C31, 5C33-5C34, 5C37-5C40, 5C55-5C56, for example. The criteria for providing dynamic visual feedback, e.g., as reflected in the size of the representation of the user interface of the first application are described with respect to FIGS. 9A-9C and 10A-10D, for example. Providing visual feedback (e.g., resizing a representation of the user interface of the first application) in accordance with relative movement of the concurrently detected contacts toward one another enhances the operability of the device and makes the user-device interface more efficient (e.g., by conveying the internal state of the device, helping the user provide required inputs to achieve an intended outcome, and reducing user mistakes when operating/interacting with the device), which, additionally, reduces power usage and improves battery life of the device by enabling the user to use the device more quickly and efficiently.

In some embodiments, in method 1100, the device detects (1134) movement (e.g., concurrent and synchronized movement in substantially the same direction with substantially the same speed) of the concurrently detected contacts across the touch-sensitive surface in a respective direction that corresponds to movement across the display toward a predefined edge (e.g., the top edge) of the display (e.g., as in a multi-finger upward swipe gesture); and in accordance with the movement of the concurrently detected contacts in the respective direction (e.g., as in a multi-finger upward swipe gesture), the device resizes (e.g., reducing the size of) a representation of the user interface of the first application (e.g., dynamically resizing a screenshot of the user interface of the first application in accordance with the movement of the concurrently detected contacts toward the top edge of the display). In some embodiments, the representation of the user interface of the first application is resized based on both movement of the concurrently detected contacts in the respective direction (e.g., upwards) and the movement of the contacts toward each other. This is illustrated in FIGS. 5C13-5C15, 5C17-5C18, 5C39-5C40, 5C44-5C45, 5C56-5C57, for example. The criteria for providing dynamic visual feedback, e.g., as reflected in the size of the representation of the user interface of the first application are described with respect to FIGS. 9A-9C and 10A-10D, for example. Providing visual feedback (e.g., resizing a representation of the user interface of the first application) in accordance with movement of the concurrently detected contacts in a respective direction toward a respective edge of the display enhances the operability of the device and makes the user-device interface more efficient (e.g., by conveying the internal state of the device, helping the user provide required inputs to achieve an intended outcome, and reducing user mistakes when operating/interacting with the device), which, additionally, reduces power usage and improves battery life of the device by enabling the user to use the device more quickly and efficiently.

In some embodiments, in method 1100, the device concurrently detects (1136) first movement of the concurrently detected contacts in a respective direction across the touch-sensitive surface, and second movement of the concurrently detected contacts toward one another; in accordance with the first movement of the concurrently detected contacts in the respective direction (e.g., the swipe component of the gesture), the device moves a representation of the user interface of the first application across the display; and in accordance with the second movement of the concurrently detected contacts toward one another (e.g., the pinch component of the gesture), the device resizes (e.g., shrinking) the representation of the user interface of the first application on the display. This is illustrated in FIGS. 5C33-5C35, and 5C37-5C41, for example. The criteria for providing dynamic visual feedback, e.g., as reflected in the size and position of the representation of the user interface of the first application are described with respect to FIGS. 9A-9C and 10A-10D, for example. Providing visual feedback in accordance with movement of the concurrently detected contacts (e.g., moving a representation of the user interface of the first application in accordance with movement of the contacts in a respective direction, and resizing the representation of the user interface of the first application in accordance with movement of the contacts toward one another) enhances the operability of the device and makes the user-device interface more efficient (e.g., by conveying the internal state of the device, helping the user provide required inputs to achieve an intended outcome, and reducing user mistakes when operating/interacting with the device), which, additionally, reduces power usage and improves battery life of the device by enabling the user to use the device more quickly and efficiently.

In some embodiments, in method 1100, the device detects (1138) a change (e.g., an increase or a decrease) in a total number of concurrently detected contacts (e.g., as a result of lift-off of one or more of the currently detected contacts, and/or a result of a touch-down of one or more additional contacts on the touch-sensitive surface) during the gesture, where the first criteria or second criteria do not require the total number of concurrently detected contacts to remain constant during the gesture in order for the first or second criteria to be met. This is illustrated in FIGS. 5C33-5C36, where a contact is lift off during the gesture, and the device navigated to a different application in response to the gesture, for example. Allowing the user to change the total number of contacts maintained on the touch-sensitive surface during a navigation gesture enhances the operability of the device and makes the user-device interface more efficient (e.g., by making it easier for the user provide required inputs to achieve an intended outcome, and reducing user mistakes when operating/interacting with the device), which, additionally, reduces power usage and improves battery life of the device by enabling the user to use the device more quickly and efficiently.

In some embodiments, in method 1100, the device detects (1140) additional movement of remaining contacts on the touch-sensitive surface after detecting the change in the total number of concurrently detected contacts, wherein the first or second (or third or fourth) criteria are met after detecting the additional movement of the remaining contacts. This is illustrated in FIGS. 5C33-5C36, where additional movement of three contacts are detected after two contact were lift off during the gesture, and the device navigated to a different application in response to the gesture, for example. Allowing the user to continue the navigation gesture after lift-off of one or more contacts and still meet the respective criteria for navigation outside of the application enhances the operability of the device and makes the user-device interface more efficient (e.g., by making it easier for the user provide required inputs to achieve an intended outcome, and reducing user mistakes when operating/interacting with the device), which, additionally, reduces power usage and improves battery life of the device by enabling the user to use the device more quickly and efficiently.

In some embodiments, detecting the gesture includes (1142): detecting a first portion of the gesture and detecting a second portion of the gesture following the first portion of the gesture, where the first portion of the gesture includes synchronous movement of at least the predetermined number of concurrently detected contacts in a respective direction (e.g., as in a multi-finger swipe input), the second portion of the gesture includes movement of at least the predetermined number of concurrently detected contacts toward one another (e.g., as in a multi-finger pinch gesture), and at least one of the first criteria and the second criteria are met after detecting the first and second portions of the gesture. This is illustrated in FIGS. 5C43-5C47, where a multi-finger swipe input is detected before a multi-finger pinch input, and the criteria for displaying the home screen are met, for example. Allowing the user to initiate a navigation gesture in a first manner (e.g., with movement of concurrently detected contacts in a respective direction) and continue the navigation gesture in a different manner (e.g., with movement of the concurrently detected contacts toward one another) and still meet the respective criteria for navigation outside of the application (e.g., the first criteria or the second criteria) enhances the operability of the device and makes the user-device interface more efficient (e.g., by making it easier for the user provide required inputs to achieve an intended outcome, and reducing user mistakes when operating/interacting with the device), which, additionally, reduces power usage and improves battery life of the device by enabling the user to use the device more quickly and efficiently.

In some embodiments, detecting the gesture includes (1144) detecting a third portion of the gesture and detecting a fourth portion of the gesture following the third portion of the gesture, where the third portion of the gesture includes movement of at least the predetermined number of concurrently detected contacts toward one another (e.g., as in a multi-finger pinch gesture), the fourth portion of the gesture includes synchronous movement of at least the predetermined number of concurrently detected contacts in a respective direction (e.g., as in a multi-finger swipe input), and at least one of the first criteria and the second criteria are met after detecting the third and fourth portions of the gesture. This is illustrated in FIGS. 5C33-5C36, 5C37-5C42 where a multi-finger pinch input is detected before a multi-finger swipe input, and the criteria for displaying a previous application are met, for example. Allowing the user to initiate a navigation gesture in a first manner (e.g., with movement of the concurrently detected contacts toward one another) and continue the navigation gesture in a different manner (e.g., with movement of the concurrently detected contacts in a respective direction) and still meet the respective criteria for navigation outside of the application enhances the operability of the device and makes the user-device interface more efficient (e.g., by making it easier for the user provide required inputs to achieve an intended outcome, and reducing user mistakes when operating/interacting with the device), which, additionally, reduces power usage and improves battery life of the device by enabling the user to use the device more quickly and efficiently.

In some embodiments, the initial portion of the gesture is detected (1146) in a central portion of the touch-sensitive surface away from any edge of the touch-sensitive surface. For example, the gesture is not an edge swipe gesture. In some embodiments, an edge swipe gesture by a single contact from the bottom edge brings up a dock, and continuation of the single-contact swipe gesture can trigger a user interface navigation process that leads to the multitasking user interface or a previously displayed application, or the home screen user interface based on different sets of criteria used for the multi-finger gesture described herein. This is illustrated in FIGS. 5C1, 5C4, 5C7, 5C10, 5C13, 5C17, 5C20, 5C23, 5C25, 5C27, 5C30, 5C33, 5C37, 5C43, 5C48, 5C51, and 5C55, for example. Allowing the user to initiate a gesture (e.g., a multi-finger navigation gesture) in a central portion of the touch-sensitive surface away from any edge of the touch-sensitive surface enhances the operability of the device and makes the user-device interface more efficient (e.g., by making it easier for the user provide required inputs to achieve an intended outcome, and reducing user mistakes when operating/interacting with the device), which, additionally, reduces power usage and improves battery life of the device by enabling the user to use the device more quickly and efficiently.

In some embodiments, a respective one of the first criteria and the second criteria does not require (1148) that lift-off of the plurality of contacts be detected in order for the respective one of the first criteria and the second criteria to be met (e.g., the gesture is recognized before the lift-off of the contacts are detected). For example, in some embodiments, a pause of the gesture in the middle of the screen causes the device to display the multitasking user interface before the lift-off of the contacts are detected. In some embodiments, the UI feedback displayed during the gesture indicates the final state of the user interface if the lift-off of the contacts is detected at the current time. Not requiring that lift-off of the contacts be detected in order to meet the criteria for navigating outside of an application enhances the operability of the device and makes the user-device interface more efficient (e.g., by making it easier for the user provide required inputs to achieve an intended outcome, and reducing the time needed to achieve an intended outcome), which, additionally, reduces power usage and improves battery life of the device by enabling the user to use the device more quickly and efficiently.

It should be understood that the particular order in which the operations in FIGS. 11A-11F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods, 600, 700, 800, 900, 1000, 1200, and 1300) are also applicable in an analogous manner to method 1100 described above with respect to FIGS. 11A-11F. For example, the contacts, gestures, user interface objects, tactile outputs, intensity thresholds, focus selectors, and animations described above with reference to method 1100 optionally have one or more of the characteristics of the contacts, gestures, user interface objects, tactile outputs, intensity thresholds, focus selectors, animations described herein with reference to other methods described herein (e.g., methods 600, 700, 800, 900, 1000, 1200, and 1300). For brevity, these details are not repeated here.

The operations described above with reference to FIGS. 11A-11F are, optionally, implemented by components depicted in FIGS. 1A-1B. For example, displaying operation 1102, detecting operations 1104, 1132, 1134, 1136 and 1138, performing operations 1108 and 1130, switching operations 1110, 1112, and 1120, and maintaining operation 1126 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

A method of navigating between user interfaces in accordance with some embodiments. Method 1200 is performed at an electronic device (e.g., device 300, FIG. 3, or portable multifunction device 100, FIG. 1A, device 11, FIGS. 5D1-5D98) with a touch-sensitive display (e.g., touch-screen 112). Some operations in method 1200 are, optionally, combined and/or the order of some operations is, optionally, changed.

As described below, method 1200 provides an intuitive way to permit edge protection against inadvertent triggering of a system operation that replaces a split-screen user interface displaying two applications with a system user interface, where edge protection is enabled on one or both of the applications independently. Permitting edge protection to be enabled independently for applications on either side of the split screen, while allowing a system operation that replaces the split-screen user interface as a whole to be replaced by a system user interface, enhances the operability of the device and makes the user-device interaction more efficient (e.g., by providing easy access to navigation functions of the device, by helping the user to achieve an intended outcome with fewer required inputs, and by providing additional control options without cluttering the user interface with additional displayed controls), and reduce user mistakes when operating the device (e.g., by selectively using enhanced gesture criteria to portions of the user interface to avoid inadvertent triggering of system operations), which, additionally, reduces power usage and improves the battery life of the device by enabling the user to use the device more quickly and efficiently.

The device concurrently display (1202), on the touch-sensitive display, a first application and a second application (e.g., the first application and the second application are displayed side by side (e.g., with a 1:2, 1:1, or 2:1 width ratio) on the display in response to a user request to switch from a single screen display mode to a split-screen display mode), wherein the first application and the second application are both displayed along at least a portion of a respective edge of the touch-sensitive display (e.g., a first user interface of the first application and a second user interface of the second application are displayed side by side on the display (e.g., without overlap between the first user interface and the second user interface, and/or with a moveable divider between the first user interface and the second user interface), with respective bottom portions of the first user interface and the second user interface displayed adjacent to a bottom edge of the touch-sensitive display). For example, the first application (e.g., the maps application) and the second applications (e.g., the games application) are displayed side by side in FIGS. 5D1, 5D9, 5D15, 5D25, 5D50, etc., in a split-screen display mode.

While concurrently displaying the first application and the second application, the device detects (1204) a first edge-swipe gesture at a respective location along the respective edge of the touch-sensitive display that includes movement of a contact (e.g., contact 4828, 4830, 4832, 4834, 4836, 4838, 4840, 4842, 4844, 4846, 4848, 4850, 4852, 4854, 4856, 4858, etc.) from the respective location along the respective edge of the touch-sensitive display onto the touch-sensitive display (e.g., while displaying the first application and the second application side-by-side in the split-screen display mode, detecting an upward swipe from a starting location on or below the bottom edge of the touch-screen display onto the touch-screen display).

In response to detecting the first edge-swipe gesture (1206): in accordance with a determination that the respective location of the first edge-swipe gesture corresponds to a location of the first application on the touch-sensitive display (e.g., the starting location of the upward edge swipe is on or below the portion of the display that displays the first user interface), that the first application is currently associated with standard edge-swipe gesture criteria (e.g., the first user interface of the first application is not currently provided with edge protection that is configured to prevent accidental triggering of a system operation by a gesture that accidentally met the standard edge gesture detection criteria), and that the first edge-swipe gesture meets the standard edge-swipe gesture criteria, wherein the standard edge-swipe gesture criteria include a first set of one or more requirements that must be met in order for the standard edge-swipe gesture criteria to be met (e.g., in this scenario, the first edge-swipe gesture meets the standard criteria for triggering a system operation and the first application does not currently have edge protection enabled (e.g., the first user interface has not requested that edge swipes to perform a system gesture be restricted to reduce accidental system operations, this is sometimes referred to as an immersive mode of operation where inputs that would normally be interpreted as a request to perform a system operation are, instead, transmitted to the application, and is frequently used for games and other applications that expect frequent or repeated inputs that may unintentionally meet trigger criteria for the system operation)), the device performs (1208) a system operation that includes displaying a system user interface at a portion of the touch-sensitive display that was previously occupied by at least a portion of the first application and at least a portion of the second application (e.g., without regard to whether or not the second application is currently associated with enhanced edge-swipe gesture criteria (e.g., in some cases, the second application is currently associated with the enhanced edge-swipe gesture criteria; and in some cases, the second application is not current associated with the enhanced edge-swipe gesture criteria)). For example, if the standard edge swipe gesture is detected on the first application and the first application does not have edge protection enabled, the device displays a home screen or application-switcher user interface in the single-screen mode that replaces the split-screen user interfaces of both the first and the second applications. This is done irrespective of whether or not the second user interface of the second application has edge protection enabled at the time (e.g., in some cases, the second application has edge protection enabled at the time; and in some cases, the second application does not have edge protection enabled at the time). This is illustrated in FIGS. 5D1-5D8, 5D37-5D43, where system operation is performed when a standard edge swipe gesture is detected on the side of the screen that displays the non-edge-protected application (e.g., the maps application displayed on the left-side of the split screen). In some embodiments, the first application does not show any user interface response to the first edge swipe gesture within the application user interface for the first application, even though the edge swipe gesture occurs at a location of the first application (e.g., because when the system operation is performed, the device forgoes sending input corresponding to the first edge swipe gesture to the first application).

In response to detecting the first edge-swipe gesture (1206): in accordance with a determination that the respective location of the first edge-swipe gesture corresponds to a location of the second application on the touch-sensitive display (e.g., the starting location of the upward edge swipe is on or below the portion of the display that displays the second user interface), that the second application is currently associated with the standard edge-swipe gesture criteria (e.g., the second user interface of the second application is not currently provided with edge protection that is configured to prevent accidental triggering of the system operation by a gesture that accidentally met the standard edge gesture detection criteria), and that the first edge swipe gesture meets the standard edge-swipe gesture criteria (e.g., in this scenario, the first edge-swipe gesture meets standard criteria for triggering a system operation and the second application does not currently have edge protection enabled (e.g., the second user interface has not requested that edge swipes to perform a system gesture be restricted to reduce accidental system operations, this is sometimes referred to as an immersive mode of operation where inputs that would normally be interpreted as a request to perform a system operation are, instead, transmitted to the application, and is frequently used for games and other applications that expect frequent or repeated inputs that may unintentionally meet trigger criteria for the system operation), the device performs (1210) the system operation (e.g., without regard to whether or not the first application is currently associated with the enhanced edge-swipe gesture criteria (e.g., in some cases, the first application is currently associated with the enhanced edge-swipe gesture criteria; and in some cases, the first application is not current associated with the enhanced edge-swipe gesture criteria))). For example, if the standard edge swipe gesture is detected on the second application and the second application does not have edge protection enabled, the device displays the home screen or application-switcher user interface in the single-screen mode that replaces the split-screen user interfaces of both the first and the second applications. This is done irrespective of whether or not the first user interface of the first application has edge protection enabled at the time (e.g., in some cases, the first application has edge protection enabled at the time; and in some cases, the first application does not have edge protection enabled at the time))). This is illustrated in FIGS. 5D9-5D14, 5D32-5D36, where system operation is performed when a standard edge swipe gesture is detected on the side of the screen that displays the non-edge-protected application (e.g., the games application displayed on the right-side of the split screen). In some embodiments, the second application does not show any user interface response to the first edge swipe gesture within the application user interface for the second application, even though the edge swipe gesture occurs at a location of the second application (e.g., because when the system operation is performed, the device forgoes sending input corresponding to the first edge swipe gesture to the second application).

In response to detecting the first edge-swipe gesture (1206): in accordance with a determination that the respective location of the first edge-swipe gesture corresponds to a location of the first application on the touch-sensitive display, that the first application is currently associated with enhanced edge-swipe gesture criteria (e.g., the first user interface of the first application is currently provided with edge protection that is configured to prevent accidental triggering of a system operation by a gesture that accidentally met the standard edge gesture detection criteria), and that the first edge-swipe gesture does not meet the enhanced edge-swipe gesture criteria (e.g., the first edge-swipe gesture only meets the standard edge-swipe gesture criteria), wherein the enhanced edge-swipe gesture criteria include the first set of one or more requirements that must be met in order for the standard edge-swipe gesture criteria to be met and also include a second set of one or more requirements that must be met in addition to the first set of one or more requirements in order for the enhanced edge-swipe gesture criteria to be met (e.g., in this scenario, the first edge-swipe gesture does not meet the enhanced criteria for triggering a system operation and the first application currently have edge protection enabled (e.g., the first user interface is a video, game, or presentation displayed in a full-screen (e.g., completely occupying a side of the split-screen), immersive mode)), the device forgoes (1212) performing the system operation (e.g., without regard to whether or not the second application is associated with the enhanced edge-swipe gesture criteria (e.g., in some cases, the second application is currently associated with the enhanced edge-swipe gesture criteria; and in some cases, the second application is not current associated with the enhanced edge-swipe gesture criteria))). For example, if the first application has edge protection enabled, but the gesture does not meet the enhanced criteria associated with the edge protection mode for the first application, the device forgoes displaying the home screen or application-switcher user interface in the single-screen mode, even if the gesture satisfies the standard criteria for triggering such system operation. This is done irrespective of whether or not the second user interface of the second application has edge protection enabled at the time (e.g., in some cases, the second application has edge protection enabled at the time; and in some cases, the second application does not have edge protection enabled at the time)). This is illustrated in FIGS. 5D15-5D16, and FIGS. 5D44-5D45, where system operation is not performed when a standard edge swipe gesture (that does not meet the enhanced edge-swipe gesture criteria) is detected on the side of the screen that displays the edge-protected application (e.g., the maps application displayed on the left-side of the split screen). In some embodiments, in addition to forgoing performing the system operation, the first application responds (e.g., by invoking a menu, activating a user interface element of the application user interface, controlling a video game character, drawing a mark, or the like, depending on the application), within the first application user interface, to the first edge swipe gesture (e.g., because an input corresponding to the first edge swipe gesture is delivered to the first application and is used by the first application to perform an operation within the first application).

In response to detecting the first edge-swipe gesture (1206): in accordance with a determination that the respective location of the first edge-swipe gesture corresponds to a location of the second application on the touch-sensitive display, that the second application as currently displayed is associated with the enhanced edge-swipe gesture criteria (e.g., the second user interface of the second application is currently provided with edge protection that is configured to prevent accidental triggering of a system operation by a gesture that accidentally met the standard edge gesture detection criteria), and that the first edge-swipe gesture does not meet the enhanced edge-swipe gesture criteria (e.g., the first edge-swipe gesture only meets the standard edge-swipe gesture criteria), (e.g., in this scenario, the first edge-swipe gesture does not meet the enhanced criteria for triggering a system operation and the second application currently has edge protection enabled) the device forgoes (1214) performing the system operation (e.g., without regard to whether or not the first application is associated with the enhanced edge-swipe gesture criteria (e.g., in some cases, the first application is currently associated with the enhanced edge-swipe gesture criteria; and in some cases, the first application is not current associated with the enhanced edge-swipe gesture criteria)), and even if the first edge-swipe gesture meets the standard edge-swipe gesture criteria). For example, if the second application has edge protection enabled, but the gesture does not meet the enhanced criteria associated with the edge protection mode for the second application, the device forgoes displaying the home screen or application-switcher user interface, even if the gesture satisfies the standard criteria for triggering such system operation. This is done irrespective of whether or not the first user interface of the first application has edge protection enabled at the time (e.g., in some cases, the first application has edge protection enabled at the time; and in some cases, the first application does not have edge protection enabled at the time)). This is illustrated in FIGS. 5D25-5D26 and FIGS. 5D47-5D49, FIGS. 5D50-5D51, and FIGS. 5D59-5D60, where system operation is not performed when a standard edge swipe gesture (that does not meet the enhanced edge-swipe gesture criteria) is detected on the side of the screen that displays the edge-protected application (e.g., the games application displayed on the right-side of the split screen). In the method described above, when one side of the split screen has edge protection enabled, only that side of the split screen exhibits the edge protection behavior (e.g., is subject to the enhanced edge swipe gesture criteria). The user can still trigger the system operation (e.g., go to the home screen or the application switcher user interface) by providing a standard edge swipe on the other side of the split screen. In some embodiments, in addition to forgoing performing the system operation, the second application responds (e.g., by invoking a menu, activating a user interface element of the application user interface, controlling a video game character, drawing a mark, or the like, depending on the application), within the second application user interface, to the first edge swipe gesture (e.g., because an input corresponding to the first edge swipe gesture is delivered to the second application and is used by the second application to perform an operation within the second application).

In some embodiments, in response to detecting the first edge-swipe gesture: in accordance with a determination that the respective location of the first edge-swipe gesture corresponds to a location of the first application on the touch-sensitive display, that the first application is currently associated with enhanced edge-swipe gesture criteria, and that the first edge-swipe gesture meets the enhanced edge swipe gesture criteria, the system operation is performed; and in accordance with a determination that the respective location of the first edge-swipe gesture corresponds to a location of the second application on the touch-sensitive display, that the second application is currently associated with enhanced edge-swipe gesture criteria, and that the first edge-swipe gesture meets the enhanced edge-swipe gesture criteria, the system operation is performed. In some embodiments, in response to detecting the first edge-swipe gesture: in accordance with a determination that the respective location of the first edge-swipe gesture corresponds to a location of the first application on the touch-sensitive display, that the first application as currently displayed is associated with the enhanced edge-swipe gesture criteria, and that the first edge-swipe gesture meets the enhanced edge-swipe gesture criteria, performing the system operation (e.g., replacing the split screen user interface with a home screen user interface or application-switcher user interface, or replacing the first application with a third application on a first side of the split-screen user interface occupied by the first application (e.g., leaving the second side occupied by the second application unchanged)); and in accordance with a determination that the respective location of the first edge-swipe gesture corresponds to a location of the second application on the touch-sensitive display, that the second application as currently displayed is associated with the enhanced edge-swipe gesture criteria, and that the first edge-swipe gesture meets the enhanced edge-swipe gesture criteria, performing the system operation (e.g., replacing the split screen user interface with a home screen user interface or application-switcher user interface, or replacing the second application with a third application on the second side of the split-screen user interface occupied by the second application (e.g., leaving the first side occupied by the first application unchanged)). In some embodiments, a system operation refers to an operation that is performed outside of a single application (e.g., replacing an application user interface with a system user interface such as a home screen user interface or a multitasking user interface or replacing one application with another application). In some embodiments, the system operation replaces one or more currently displayed applications with a system-level user interface (e.g., a transitional user interface that is displayed prior to displaying the home screen, application switcher user interface, or the last displayed user interface of a recently used application), the home screen user interface, or the application switcher user interface. In some embodiments, the system operation includes more than merely revealing or displaying a system-level user interface object that partially overlay the currently displayed first and second applications (e.g., merely displaying the dock), because the system operation includes replacing the split screen user interface with the transitional user interface, the home screen (distinct from a system-level user interface element such as a dock or another system-level user interface such as the application-switcher user interface), or the application switcher user interface (distinct from the system-level user interface element such as the dock or the home screen). In some embodiments, the term "system operation" is not used to refer operations that is performed on the operating system level to facilitate an operation within an application, instead, the term "system operation" is an operation that is performed outside of the application that causes changes on the display that replaces the display of the application. The system operation is, optionally, performed by intercepting a gesture on the touch-screen at a location that corresponds to a user interface of an application, determining whether the gesture meets the criteria for activating one or more system user interfaces, and if so, forgoing passing the gesture input to the application and activating a respective one of the system user interfaces to replace the currently displayed application.

In some embodiments, the first set of one or more requirements includes (1216) a movement requirement that is met when a first movement parameter (e.g., a distance, direction, and/or velocity of the first movement) of the first edge-swipe gesture meets a first threshold (e.g., in addition to a starting location requirement that is met when the starting location of the gesture is within a predefined reactive region (e.g., as indicated by the home affordance) proximate to the respective edge of the touch-sensitive display). For example, in some embodiments, the first movement parameter is a movement distance in a first direction (e.g., a direction perpendicular to the respective edge of the touch-sensitive display), and the first threshold is a first threshold distance. In some embodiments, the first movement parameter is a movement speed in a first direction (e.g., a direction perpendicular to the respective edge of the touch-sensitive display), and the first threshold is a first threshold speed. In some embodiments, the first movement parameter is a composite movement parameter that takes into account movement distance and movement speed in multiple directions, and the first threshold is a maximum or minimum threshold for the composite movement parameter. In some embodiments, the determination of whether the standard edge-swipe gesture criteria are met is made after the lift-off of the contact is detected. In some embodiments, a gesture started from the respective edge region of the touch-sensitive display (e.g., a starting location requirement of the first set of one or more requirements of the standard edge-swipe gesture criteria is met by the gesture) is continuously evaluated against the first set of one or more requirements to determine whether the gesture meets the standard edge swipe criteria if lift-off is to be detected at the current moment.

In some embodiments, the second set of one or more requirements includes (1218) a requirement (e.g., a gesture-repeat requirement) that, two edge-swipe gestures (e.g., including the first edge-swipe gesture and a prior edge-swipe gesture that was detected right before the first edge-swipe gesture) meeting the standard edge-swipe gesture criteria are detected at respective locations along the respective edge of the touch-sensitive display that correspond to a location of a respective application that is currently associated with the enhanced edge-swipe gesture criteria. This is illustrated in FIGS. 5D15-5D24, 5D25-5D31, for example, where a first standard edge swipe on the home affordance temporarily disables edge protection, and a second standard edge swipe causes the performance of the system operation. In some embodiments, the second set of one or more requirements includes a requirement that the two edge swipe gestures be detected within a predetermined time threshold (e.g., 0.05, 0.1, 0.25, 0.5, 0.75, 1, 2, 5 seconds) of each other.

In some embodiments, the device detects (1220) a second edge-swipe gesture after detecting the first edge-swipe gesture (e.g., the first and second edge-swipe gestures are consecutive edge swipe gestures), wherein the respective location of the first edge-swipe gesture corresponds to a location of a respective application of the first and second applications that is currently associated with the enhanced edge-swipe gesture criteria, and the performance of the system operation was forgone in accordance with the determination that the first edge-swipe gesture did not meet the enhanced edge-swipe gesture criteria. In response to detecting the second edge-swipe gesture after the detecting first edge-swipe gesture: in accordance with a determination that a respective location of the second edge-swipe gesture corresponds to a location of the respective application of the first and second applications that is currently associated with the enhanced edge-swipe gesture criteria (e.g., that the second edge swipe gesture is detected on the same edge protected application as the first edge swipe gesture), and that the second edge-swipe gesture also meets the standard edge-swipe gesture criteria (e.g., the second edge-swipe gesture is a repeat of the first edge-swipe gesture detected earlier (e.g., the first and second edge-swipe gestures are on the same side of the split screen (e.g., with both gestures on the home affordance, with one on the home affordance and the other outside of the home affordance, and/or with both outside of the home affordance)) and, optionally meets timing criteria such as a requirement that the two edge swipe gestures be detected within a predetermined time threshold (e.g., 0.05, 0.1, 0.25, 0.5, 0.75, 1, 2, 5 seconds) of each other), the device performs the system operation. For example, the system operation is performed in response to detecting the second edge-swipe gesture, because the second edge-swipe gesture fulfills the edge-repeat requirement in combination with the earlier detected first edge-swipe gesture, and the enhanced edge-swipe gesture criteria are met by the second edge-swipe gesture, given that the first swipe gesture meeting the standard edge-swipe gesture criteria has already been detected. This is illustrated in FIGS. 5D15-5D24, 5D25-5D31, for example, where a first standard edge swipe on the home affordance temporarily disables edge protection, and a second standard edge swipe causes the performance of the system operation.

In some embodiments, a first user interface element (e.g., a single home affordance that spans at least a portion of the first application and at least a portion of the second application in at least some screen split configurations (e.g., when the screen is evenly split between the first and second applications) and optionally spans only one of the first and second applications in some split configurations (e.g., when the screen split ratio is within certain ranges or at certain values (e.g., when screen is split with a 1:2 or 2:1 width ratios)), or a respective one of two concurrently displayed home affordances that overlays the edge protected application that is currently associated with the enhanced edge-swipe gesture criteria) is displayed (1224) in a region proximate to the respective edge of the touch-sensitive display, and wherein the second set of one or more requirements includes an enhanced location requirement that a prior edge-swipe gesture that was detected immediately before a currently detected edge-swipe gesture (e.g., the first edge-swipe gesture) (and optionally, the currently detected edge-swipe gesture (e.g., the first edge-swipe gesture)) meeting the standard edge-swipe gesture criteria is detected at a respective location on the first user interface element displayed along the respective edge of the touch-sensitive display (e.g., the enhanced edge swipe gesture criteria are met by an upward swipe gesture that touches and/or crosses the home affordance followed by another upward swipe gesture detected anywhere in the edge region of the touch-sensitive display (e.g., on or outside of the home affordance)). This is illustrated in FIGS. 5D15-5D24, 5D25-5D31, for example, where a first standard edge swipe on the home affordance temporarily disables edge protection, and a second standard edge swipe causes the performance of the system operation. In some embodiments, a single upward edge swipe gesture that touches and/or crosses the home affordance meets the enhanced edge-swipe gesture; and a single upward edge swipe gesture that does not touch or cross the home affordance meets the standard edge-swipe gesture but does not meet the enhanced edge-swipe gesture. In some embodiments, two consecutive edge-swipe gestures that touch and/or cross the home affordance at locations corresponding to a location of an edge protected application are required to meet the enhanced edge-swipe gesture criteria for the edge protected application on the split screen. In some embodiments, at least the earlier edge-swipe gesture of two consecutive edge-swipe gestures (e.g., both detected at locations corresponding to an edge protected application on the split screen) is required to touch and/or cross the home affordance in order for the enhanced edge-swipe gesture criteria for the edge protected application on the split screen to be met by the combination of the two consecutive edge-swipe gestures (e.g., when the latter edge-swipe gesture is detected)/

In some embodiments, in response to detecting the first edge-swipe gesture (1224): in accordance with a determination that the respective location of a prior edge swipe gesture that was detected before the first edge swipe gesture corresponds to a respective one of the first and second applications that is currently associated with the enhanced edge-swipe gesture criteria, that both the prior edge swipe gesture and the first edge swipe gesture meet the standard edge-swipe gesture criteria, and that the prior edge swipe gesture is detected at a respective location on the first user interface element displayed along the respective edge of the touch-sensitive display (e.g., the enhanced edge swipe gesture criteria are met by an upward swipe gesture that is detected on an edge protected application on the split screen and that touches and/or crosses the home affordance, followed by another upward swipe gesture (e.g., the first edge swipe gesture) that is detected with a starting location anywhere along the protected edge of the touch-screen), the device performs the system operation. In some embodiments, the enhanced location requirement only applies to the earlier edge swipe gesture, and not the latter edge swipe gesture of two edge-swipe gestures. In some embodiments, the first edge-swipe gesture is the only upward edge swipe gesture that is required to meet the enhanced edge-swipe gesture criteria for the edge protected application on the split screen, because the enhanced edge-swipe gesture criteria only require one edge-swipe gesture that meets the enhanced location requirement and does not require a second edge-swipe gesture that meets the standard edge-swipe gesture criteria. In some embodiments, the first edge-swipe gesture is the second edge-swipe gesture of two consecutive edge-swipe gestures detected at locations corresponding to a location of an edge protected application, and both need to meet the standard edge-swipe gesture criteria (and optionally, the enhanced location requirement) in order to meet the enhanced edge-swipe gesture criteria for the edge protected application on the split screen.

In some embodiments, performing the system operation includes (1226): ceasing to concurrently display the first application and the second application (e.g., the user interfaces of the first application and the second applications are no longer interactive, even if they are still visible on the touch-screen display (e.g., as representations of the first and second applications in the application-switcher user interface, or a transitional user interface leading to the application-switcher user interface or home screen)); and displaying a home screen user interface that includes a plurality of application launch icons representing a plurality of applications installed on the electronic device, wherein a respective application launch icon of the plurality of application launch icons, when activated, causes the electronic device to launch a corresponding application of the respective application launch icon. In some embodiments, prior to displaying the home screen user interface, the electronic device displays a user interface object that includes a subset of application launch icons included in the home screen (e.g., an application dock including application launch icons for a set of frequently used or recommended applications is dragged up from the bottom edge of the touch-sensitive display in response to an initial portion of the upward edge-swipe gesture that meets the standard edge-swipe gesture for an unprotected application or that meets the enhanced edge-swipe gesture for an edge protected application). In some embodiments, prior to displaying the home screen user interface, the electronic device displays a transitional user interface that concurrently displays representations of the first application and second application (and optionally, one or more other recently open applications) that is dynamically updated to indicate whether the criteria for displaying the home screen user interface is met (e.g., representations of other applications cease to be displayed, leaving only the representation of the application on which the upward edge swipe gesture was detected). This is illustrated in FIGS. 5D1, 5D2, and 5D5-5D6, and FIGS. 5D15-5D21, where the home screen is displayed at the end of the system operation, for example.

In some embodiments, performing the system operation includes (1228): ceasing to concurrently display the first application and the second application (e.g., the user interfaces of the first application and the second applications are no longer interactive, even if they are still visible on the touch-screen display (e.g., as representations of the first and second applications in the application-switcher user interface, or a transitional user interface leading to the application-switcher user interface or home screen)); and displaying an application-switcher user interface that includes a plurality of representations of applications respectively corresponding to a plurality recently used applications (e.g., a respective application representation in the application-switcher user interface, when selected, causes the electronic device to redisplay the application in its last active state). This is illustrated in FIGS. 5D1-5D4, and 5D9-5D12, for example, wherein the application-switcher user interface is displayed at the end of the system operation. In some embodiments, prior to displaying the application-switcher user interface, the electronic device displays a user interface object that includes a subset of application launch icons included in the home screen (e.g., an application dock including application launch icons for a set of frequently used or recommended applications is dragged up from the bottom edge of the touch-sensitive display in response to an initial portion of the upward edge-swipe gesture that meets the standard edge-swipe gesture for an unprotected application or that meets the enhanced edge-swipe gesture for an edge protected application). In some embodiments, prior to displaying the application-switcher user interface, the electronic device displays a transitional user interface that concurrently displays representations of the first application and second application (and optionally, one or more other recently open applications) that is dynamically updated to indicate whether the criteria for displaying the application-switcher user interface would met and/or if the criteria for displaying home screen user interface would be met (e.g., representations of other applications cease to be displayed, leaving only the representation of the application on which the upward edge swipe gesture was detected, if lift-off of the contact were detected at that time).

In some embodiments, performing the system operation includes (1230): selectively displaying one of a plurality of system user interfaces in accordance with one or more characteristic parameters (e.g., movement parameters, such as instant and/or cumulative speed, current and lift-off locations of contact, movement distances, movement paths, movement acceleration, or parameters derived from one or more of the above, etc.) of the first edge-swipe gesture, including: in accordance with a determination that the one or more characteristic parameters of the first edge-swipe gesture meets first criteria (e.g., home-display criteria, as described above with reference to FIGS. 9A-9C and 10A-10D), displaying a home screen user interface that includes a plurality of application launch icons representing a plurality of applications installed on the electronic device, wherein a respective application launch icon of the plurality of application launch icons, when activated, causes the electronic device to launch a corresponding application of the respective application launch icon; and ceasing to concurrently display the first application and the second application. In some embodiments, the home screen user interface replaces display of the user interfaces of the first application and the second applications. In some embodiments, immediately after the first edge swipe gesture meets the enhanced edge-swipe gesture criteria, the user interfaces of the first and second applications are no longer interactive, even if they are still visible on the touch-screen display (e.g., as representations of the first and second applications in the application-switcher user interface, or a transitional user interface leading to the application-switcher user interface or home screen). Performing the system operation further includes (1230): in accordance with a determination that the one or more characteristic parameters of the first edge-swipe gesture meets second criteria (e.g., app-switcher-display criteria, as described above with reference to FIGS. 9A-9C and 10A-10D), displaying an application-switcher user interface that includes a plurality of representations of applications respectively corresponding to a plurality recently used applications (e.g., a respective application representation in the application-switcher user interface, when selected, causes the electronic device to redisplay the application in its last active state). In some embodiments, the application-switcher user interface replaces display of the user interfaces of the first application and the second applications. In some embodiments, immediately after the edge protection is temporarily removed by the first edge swipe gesture, the user interfaces of the first and second applications are no longer interactive, even if they are still visible on the touch-screen display (e.g., as representations of the first and second applications in the application-switcher user interface, or a transitional user interface leading to the application-switcher user interface or home screen). In some embodiments, in accordance with a determination that the one or more characteristic parameters of the first edge-swipe gesture meets third criteria (e.g., previous-app-display criteria, as described above with reference to FIGS. 9A-9C and 10A-10D), the electronic device displays a third application within a respective portion of the touch-sensitive display that is occupied by the respective application (e.g., an edge-protected application whose edge protection has been defeated by the first edge swipe gesture) over which the first edge swipe gesture has been detected.

In some embodiments, the device displays (1232) a user interface element (e.g., a system-level user interface element (e.g., a home affordance 4802) as opposed to a user interface element that corresponds to an application-level function with a respective application (e.g., a piano key or a menu)) that spans across at least a portion of the first user interface of the first application and at least a portion of the second user interface of the second application (e.g., in at least some of the arrangement configurations of the first and second applications on the touch screen display (e.g., with a 1:1 width ratio as shown in FIG. 5D1)), wherein a respective location of the user interface element indicates a reactive region on the touch-sensitive display from which a gesture satisfying the standard edge-swipe gesture criteria (and from which a gesture satisfying the enhanced edge-swipe gesture criteria) is started. In some embodiments, the user interface element is wide in the direction along the respective edge of the touch-sensitive display, and narrow in the direction perpendicular to the respective edge of the touch-sensitive display. A display property of the user interface element (e.g., a gray value, a luminance, and/or other display properties) is dynamically updated (e.g., blurred, desaturated, inverted, and/or tinted with one or more colors) in accordance with the display property of the content underlying the user interface element. For example, when first application and the second application are resized (e.g., in response to a drag input directed to the divider object between the first application and the second application on the split screen in the direction along the respective edge of the touch-sensitive display to expand the display area occupied by the first application and reduce the display area occupied by the second application, or vice versa), the appearance of the user interface element changes in accordance with the changes in the appearance of the portion of the content directly underlying the user interface element, but the position and size of the user interface element remains unchanged on the touch-sensitive display. In some embodiment, the device concurrently displays a first user interface element (e.g., a first home affordance) within a portion of the first user interface of the first application (e.g., a bottom portion of the first user interface close to the bottom edge of the touch-sensitive display), and a second user interface element (e.g., a second home affordance that is separate and distinct from the first home affordance) within a portion of the second user interface of the second application (e.g., a bottom portion of the second user interface close to the bottom edge of the touch-sensitive display), wherein respective locations of the first user interface element and the second user interface element indicate a reactive region on the touch-sensitive display from which a gesture satisfying the standard edge-swipe gesture criteria is started. In some embodiments, even though the first user interface element and the second user interface element do not overlap with each other, and if an upward edge swipe gesture meeting the standard edge swipe criteria is detected in a region between the first user interface element and the second user interface element (e.g., the standard edge swipe criteria do not require that the swipe gesture to necessarily touch the home affordances in order for the swipe gesture to meet the standard edge swipe criteria), the above-disclosed rules for providing edge protection on the split-screen still applies.

In some embodiments, while concurrently displaying the first user interface of the first application and the second user interface of the second application (and prior to detecting the first edge-swipe gesture), the device displays (1234) the first user interface element with a respective appearance corresponding to whether edge protection is currently enabled for at least one of the first application and the second application, including: in accordance with a determination that at least one of the first application and the second application is currently associated with the enhanced edge-swipe gesture criteria (e.g., one or both of the applications are currently edge protected), displaying the first user interface element with a first appearance property (e.g., displaying the home affordance with a translucent or enhanced translucency state (as compared to the state when neither application is edge protected)); and in accordance with a determination that neither of the first application and the second application is currently associated with the enhanced edge-swipe gesture criteria (e.g., neither applications are currently edge protected), displaying the first user interface element with a second appearance property that is distinct from the first appearance property (e.g., displaying the home affordance in a solid or reduced translucency state (e.g., as compared to the state when at least one of the two applications is edge protected)). For example, as shown in FIG. 5D1, neither of the first application and the second application is associated with enhanced edge-swipe gesture criteria, the affordance is displayed with the first appearance state (e.g., the second appearance property (e.g., opaque, and standard visibility)); and as shown in FIGS. 5D15 and 5D25, one of the first and second applications is associated with enhanced edge-swipe gesture criteria, the affordance is displayed with the second appearance state (e.g., the first appearance property (e.g., translucent, with reduced visibility as compared to the standard visibility)).

In some embodiments, while displaying the first user interface element with a respective appearance corresponding to whether edge protection is currently enabled for at least one of the first application and the second application (and prior to detecting the first edge-swipe gesture), including while displaying the first user interface element with the first appearance property in accordance with a determination that at least one of the first and second applications is currently associated with the enhanced edge-swipe gesture criteria (e.g., when the home affordance is displayed in a translucent or enhanced translucency state because one of the two applications on the split-screen is edge protected): in response to detecting the first edge-swipe gesture, the device replaces (1236) display of the first user interface element with the first appearance property (e.g., the home affordance displayed in a translucent or enhanced translucency state) with display of the first user interface element with the second appearance property (e.g., the home affordance displayed in a solid or reduced translucency state). This is illustrated in FIGS. 5D15-5D16, and FIGS. 5D25-5D26, for example. In some embodiments, when the home affordance is displayed over a split screen that includes at least one edge protected application, the home affordance is displayed with enhanced translucency to indicate that enhanced edge-swipe gesture criteria need to be met on the side of the split-screen showing the edge-protected application to meet the enhanced edge-swipe gesture criteria for the edge protected application. In some embodiments, when edge protection is activated (e.g., in response to an application starting a full-screen immersive experience) on one side of the split-screen, the home affordance transitions from a solid and reduced translucency state to a translucent or enhanced translucency state, to indicate that edge protection is enabled for that side of the split-screen. In some embodiments, the appearance of the home affordance reflects the appearance of the portion of content directly underlying the home affordance. For example, across the span of the long home affordance, the color and luminance of the home affordance at each pixel location reflects the color and luminance of a small portion of the content directly underlying and immediately surrounding that pixel of the home affordance. In some embodiments, the display properties (e.g., color and luminance) of the home affordance at each pixel location reflect a cumulative history of the display properties (e.g., color and luminance) of the small portion of the content directly underlying and immediately surrounding that pixel of the home affordance.

In some embodiments, while displaying the first user interface element overlaying at least a portion of the first application and at least a portion of the second application, the device detects (1238) a request from the first application to cease to display at least a portion of the first user interface element (e.g., the request is sent to the operating system when a full-screen video playback is started within the first application, or when a presentation mode is started within the first application). In response to receiving the request to cease to display at least a portion of the first user interface element, the device ceases to display at least a portion of the first user interface element that is over the first application and at a portion of the first user interface element that is over the second application (e.g., ceasing to display the entire first user interface element) (e.g., without requiring a request to cease to display the first user interface element to be received from the second application within the threshold amount of time). In some embodiments, the first application determines whether to send the request based on whether a threshold amount of time has elapsed since user input was detected at the device or detected by the first application. For example, when a video player application and a web browser application are displayed side-by-side on a split screen, if the video player started full-screen video playback in response to a user input, the video player application sends a request to the operating system to cease to display the home affordance (e.g., to provide the user with a more immersive and less distracting video viewing experience), but the browser application does not send such a request to the operating system.

In some embodiments, while displaying the first user interface element overlaying at least a portion of the first application and at least a portion of the second application, the device detects (1240) a request from the first application to cease to display at least a portion of the first user interface element (e.g., the request is sent to the operating system when a full-screen video playback is started within the first application, or when a presentation mode is started within the first application). In response to receiving the request to cease to display the first user interface element: the device ceases to display the first user interface element in accordance with a determination that a request to cease to display at least a portion of the first user interface element has also been received from the second application; and the device maintains display of the first user interface element after the threshold amount of time, in accordance with a determination that a request to cease to display at least a portion of the first user interface element has not been received from the second application. For example, when a video player application and a web browser application are displayed side-by-side on a split screen, if the video player started full-screen video playback in response to a user input, the video player application sends a request to the operating system to cease to display the home affordance (e.g., to provide the user with a more immersive and less distracting video viewing experience), but the browser application does not send such a request to the operating system, the operation system maintains display of the home affordance over both applications. If the browser application also sends a request to cease to display the home affordance with a threshold amount of time after the request was received from the video application, the operating system of the electronic device ceases to display the home affordance after the timeout period.

In some embodiments, while displaying the first user interface element overlaying at least a portion of the first application and at least a portion of the second application, the device detects (1242) a user input resizing (e.g., adjusting a boundary between) the first application and the second application on the touch-sensitive display. In response to detecting the user input resizing (e.g., adjusting the boundary between) the first application and the second application on the touch-sensitive display: the device updates a portion of content underlying the first user interface element from a portion of a respective user interface of one of the first and second applications to a portion of a respective user interface of the other of the first and second applications (e.g., replacing a portion of the first user interface with a portion of the second user interface when the second user interface is expanded in response to the user input; or replacing a portion of the second user interface with a portion of the first user interface when the first user interface is expanded in response to the user input); and the device maintains a location of the first user interface element on the touch-sensitive display without regard to the update to the portion of content underlying the first user interface element (e.g., the home affordance remains in the center of the screen, regardless of how the split screen is divided between the first and second applications, even though the appearance of the home affordance may change to reflect the change in the underlying content resulted from the adjusted of the boundary between the first and second applications). This is illustrated in FIGS. 5D65-5D67, and FIGS. 5D68-5D70, for example.

It should be understood that the particular order in which the operations in FIGS. 12A-12F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, and 1300) are also applicable in an analogous manner to method 1200 described above with respect to FIGS. 12A-12F. For example, the contacts, gestures, user interface objects, tactile outputs, intensity thresholds, focus selectors, and animations described above with reference to method 1200 optionally have one or more of the characteristics of the contacts, gestures, user interface objects, tactile outputs, intensity thresholds, focus selectors, animations described herein with reference to other methods described herein (e.g., methods 600, 700, 800, 900, 1000, 1100, and 1300). For brevity, these details are not repeated here.

The operations described above with reference to FIGS. 12A-12F are, optionally, implemented by components depicted in FIGS. 1A-1B. For example, displaying operation 1202, detecting operation 1204, performing operations 1208 and 1210, and forgoing operations 1212 and 1214 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 13A-13E are flow diagrams illustrating a method 1300 for displaying a system user interface element with an appearance state that depends on the behaviors associated with the application(s) underlying the system user interface element, when the system user interface element is displayed on a split screen in various configurations. Method 1300 is performed at an electronic device (e.g., device 300, FIG. 3, or portable multifunction device 100, FIG. 1A, device 11 in FIGS. 5D1-5D98) with a touch-sensitive display (e.g., touch screen 112).

As described below, the system user interface element that is displayed on a split screen user interface and overlays two applications with distinct behaviors associated with the system user interface element takes on different appearances depending on the behaviors of the application underlying the system user interface element, as the applications are resized on the split screen user interface. The appearance of the system user interface element provides useful visual feedback to help the user provide the proper input to achieve a desired outcome and reduce user mistakes when operating with the device, thereby creating a more efficient human-machine interface. For battery-operated electronic devices, providing useful visual feedback and reducing user mistakes when navigating between user interfaces within and/or in and out of a split-screen display mode faster and more efficiently conserves power and increases the time between battery charges.

The device concurrently displays (1302), on the touch-sensitive display: a system user interface element (e.g., home affordance 5802) that indicates a location for performing a gesture that triggers a system operation (e.g., indicating a particular edge of the device at which an edge-swipe gesture that meets standard edge-swipe gesture criteria or enhanced edge-swipe gesture criteria will cause the device to perform the system operation, or indicating a particular portion of the edge of the device at which a gesture can be used to temporarily enable the device to respond to inputs such as edge-swipe gestures that meet standard edge-swipe gesture criteria to perform the system operation); a first application that currently has a first set of one or more behaviors (e.g., none, one, or both of an auto-hide and edge protection behaviors) associated with the system user interface element; a second application that currently has a second set of one or more behaviors (e.g., none, one, or both of an auto-hide and edge protection behaviors) associated with the system user interface element that are different from the first set of one or more behaviors (e.g., the first application and the second application are displayed side by side on the display in response to a user request to switch from a single screen display mode to a split-screen display mode), wherein (1304): the first application and the second application are both displayed along at least a portion of a respective edge of the touch-sensitive display (e.g., a first user interface of the first application and a second user interface of the second application are displayed side by side on the display (e.g., without overlap between the first user interface and the second user interface), with respective bottom portions of the first user interface and the second user interface displayed adjacent to a bottom edge of the touch-sensitive display). The system user interface element overlaps the first application without overlapping the second application (e.g., when the first and second applications are arranged on the split screen with a first width ratio (e.g., 2:1)). An appearance of the system user interface element is determined based on the first set of one or more behaviors (e.g., the appearance state of the home affordance (e.g., a first appearance state indicating that edge protection behavior is active, a second appearance state indicating that edge protection behavior is not active, a third appearance state (e.g., hidden) indicating auto-hide behavior is active) is determined entirely based on which behaviors associated with the home affordance are currently active for the first application). This is illustrated in FIGS. 5D68, 5D70, 5D73, 5D76, 5D79, 5D80, 5D83, 5D84, 5D86, 5D88, for example.

While concurrently displaying the first application, the second application and the system user interface element, the device detects (1306) an input corresponding to a request to resize the second application (and, optionally, the first application).

In response to detecting the input (1308): the device resizes (1310) the second application (and, optionally, the first application) in accordance with the input; and in accordance with a determination that the system affordance overlaps the second application without overlapping the first application, the device changes (1312) the appearance of the system user interface element to an appearance based on the second set of one or more behaviors associated with the system user interface element (e.g., the appearance state of the home affordance (e.g., a first appearance state indicating that edge protection behavior is active, a second appearance state indicating that edge protection behavior is not active, a third appearance state (e.g., hidden) indicating auto-hide behavior is active) is determined based on which behaviors associated with the home affordance are currently active for the second application without regard to which behaviors associated with the home affordance are currently active for the first application). This is illustrated in FIGS. 5D68-5D70, FIGS. 5D74-5D76, FIGS. 5D76-5D79, FIGS. 5D80-5D83, FIGS. 5D86-5D88, for example.

In some embodiments, the first set of one or more behaviors include (1314) enhanced edge-swipe gesture criteria (e.g., criteria imposed in addition to standard edge-swipe gesture criteria to implement edge protection for the application; the criteria including gesture-repeat requirement and/or enhanced location requirement, that, if not met, cause interception of a swipe input detected on an application and prevent the swipe input from being passed to the application as an application-level input) for the gesture that triggers the system operation; and the second set of one or more behaviors include standard edge-swipe gesture criteria (e.g., criteria, if met, cause interception of a swipe input detected on an application and prevent the swipe input from being passed to the application as an application-level input) for the gesture that triggers the system operation. In one example, if the screen is split between a first application that currently has edge protection enabled and a second application that does not currently have edge protection enabled, and the home affordance is entirely displayed over the first application, the appearance state of the home affordance is determined based on the edge protection behavior of the first application (e.g., displayed in a translucent or enhanced translucency state to indicate that edge protection is active for the first application). This is illustrated in FIGS. 5D68-5D70, for example.

In some embodiments, the first set of one or more behaviors include (1316) a request to hide the system user interface element when predetermined criteria are met (e.g., when full screen content is displayed on the display in an immersive mode of operation); and the second set of one or more behaviors do not include a request to hide the system user interface element when the predetermined criteria are met. In one example, if the screen is split between a first application that has requested to auto-hide the home affordance and a second application has not requested to auto-hide the home affordance, and the home affordance is entirely displayed over the first application, the appearance state of the home affordance is determined based on request of the first application (e.g., displayed in a reduced visibility state (a state that is less visible than the appearance states associated with edge protection and non-edge-protection) or entirely hidden to indicate that auto-hide is active for the first application). This is illustrated in FIGS. 5D73-5D76, and FIGS. 5D76-5D79, for example.

In some embodiments, in response to detecting the input, in accordance with a determination that the system user interface element overlaps the second application and the first application (e.g., the user interface is displayed above the central region along the bottom edge of the display and the display is evenly split between the first and second applications (e.g., with a 1:1 width ratio), the device determines (1318) the appearance of the system user interface element based on a combination of the first set of one or more behaviors associated with the system user interface element and the second set of one or more behaviors associated with the system user interface element. In one example, when the relative spatial configuration between the home affordance and the two applications on the screen transitions (A) from home affordance overlapping only an edge-protected application to home affordance overlapping both the edge protected application (e.g., an application with the enhanced edge-swipe gesture criteria active) and a non-edge-protected application (e.g., an application without the enhanced edge-swipe gesture criteria active), (B) from home affordance overlapping only a non-edge-protected application to home affordance overlapping both the non-edge-protected application and an edge-protected application, (C) from home affordance overlapping only an edge-protected application to home affordance overlapping both the edge-protected application and an application that has requested to auto-hide the home affordance, (D) from home affordance overlapping only a non-edge protected application to home affordance overlapping both the non-edge protected application to home affordance overlapping an application that has requested to auto-hide the home affordance, (E) from home affordance overlapping only an application that has requested to auto hide the home affordance to home affordance overlapping both the application that has requested to auto-hide the home affordance and an edge-protected application, (F) from home affordance overlapping only an application that has requested to auto hide the home affordance to home affordance overlapping both the application that has requested to auto hide the home affordance and a non-edge-protected application, (G) from home affordance overlapping an application that has requested to auto-hide the home affordance to overlapping both the application that has requested to auto-hide the home affordance and another application that has not requested to auto-hide the home affordance, or (H) from home affordance overlapping an application that has not requested to auto-hide the home affordance to home affordance overlapping both the application that has not requested to auto-hide the home affordance and an application that has requested to auto-hide the home affordance, the appearance state of the home affordance may be changed to reflect the behavior(s) of the other application that is now also underlying the home affordance, depending on the compatibility and priority of the two applications and/or their respective behaviors associated with the home affordance.

In some embodiments, in response to the detecting input: in accordance with a determination that the system user interface element overlaps both the second application and the first application and that the first set of one or more behaviors includes a behavior that has a higher priority than the second set of one or more behaviors, the device determines (1320) the appearance of the system user interface element based on the first set of one or more behaviors associated with the system user interface element; and in accordance with a determination that the system affordance overlaps both the second application and the first application and that the second set of one or more behaviors includes a behavior that has a higher priority than the second set of one or more behaviors, the device determines the appearance of the system user interface element based on the second set of one or more behaviors associated with the system user interface element. In some embodiments, edge protection is given a higher priority than non-edge protection. In one example, when home affordance is initially displayed only on an edge protected application, and now is displayed on both the edge protected application and a non-edge protected application due to resizing of the applications, the home affordance does not change its appearance state (e.g., remains in a translucent state). However, when the home affordance is initially displayed only on a non-edge-protected application, and now is displayed on both the non-edge-protected application and an edge-protected application due to resizing of the applications, the home affordance changes its appearance state (e.g., from an opaque state to a translucent state) to reflect that at least one application underlying the home affordance currently has edge protection enabled. This is illustrated in FIGS. 5D68-5D70, for example. In some embodiments, edge protection is given a higher priority than auto-hide. In some embodiments, auto-hide is given higher priority than edge-protection (in addition to non-edge protection).}

In some embodiments, the first set of behaviors require (1322) that enhanced edge-swipe gesture criteria be met in order for an edge-swipe gesture detected at a location occupied by the first application to perform the system operation (e.g., edge protection is currently enabled for the first application); and the second set of behaviors require that standard edge-swipe gesture criteria bet met in order for an edge-swipe gesture detected at a location occupied by the first application to perform the system operation (e.g., edge protection is not currently enabled for the first application (and auto-hide may or may not be requested by the first application)). In response to detecting the input: in accordance with a determination that the system user interface element overlaps the first application without overlapping the second application, the device displays the system user interface element with a first appearance (e.g., a lower visual distinction appearance, such as lower opacity, lower brightness, lower contrast, and/or saturation that is closer to the saturation of the underlying user interface content); and in accordance with a determination that the system user interface element overlaps both the first application and the second application, the device displays the system user interface element with the first appearance (e.g., a lower visual distinction appearance, such as lower opacity, lower brightness, lower contrast, and/or saturation that is closer to the saturation of the underlying user interface content); and in accordance with a determination that the system user interface element overlaps the second application without overlapping the first application, the device displays the system user interface element with a second appearance (e.g., a higher visual distinction appearance, such as higher opacity, higher brightness, higher contrast, and/or saturation that is further away from the saturation of the underlying user interface content). In one example where the applications are resized, when the home affordance initially overlaps only an application that is edge protected, the home affordance is displayed in a translucent state; and when the home affordance then overlaps with both the edge protected application and another application that is not edge protected (e.g., an application that has requested to auto-hide the home affordance, or an application that has not requested to auto-hide the home affordance) as a result of resizing the applications, the home affordance remains displayed in the translucent state to indicate that at least one of the underlying applications is edge protected. When the home affordance then overlaps only the application that is not edge protected, such as an application that has not requested to auto-hide the home affordance, the home affordance is displayed in an opaque state. Alternatively, if the application that is not edge protected has requested to auto-hide the home affordance, the home affordance is displayed in a hidden or reduced visibility state (e.g., less visible than the translucent state indicating edge protection). This is illustrated in FIGS. 5D68-5D70, and accompanying descriptions, for example.

In some embodiments, the first set of behaviors require (1324) that enhanced edge-swipe gesture criteria bet met in order for an edge-swipe gesture detected at a location occupied by the first application to perform the system operation (e.g., edge protection is currently enabled for the first application); and the second set of behaviors require that standard edge-swipe gesture criteria bet met in order for an edge-swipe gesture detected at a location occupied by the first application to perform the system operation (e.g., edge protection is not currently enabled for the first application (and auto-hide may or may not be requested by the first application)). In response to detecting the input: in accordance with a determination that the system user interface element overlaps the first application without overlapping the second application, the device displays the system user interface element with a first appearance (e.g., a lower visual distinction appearance, such as lower opacity, lower brightness, lower contrast, and/or saturation that is closer to the saturation of the underlying user interface content); in accordance with a determination that the system user interface element overlaps both the first application and the second application, the device displays the system user interface element with a second appearance (e.g., a higher visual distinction appearance, such as higher opacity, higher brightness, higher contrast, and/or saturation that is further away from the saturation of the underlying user interface content); and in accordance with a determination that the system user interface element overlaps the second application without overlapping the first application, the device displays the system user interface element with the second appearance. In one example where the applications are resized, when the home affordance initially overlaps only an application that is edge protected, the home affordance is displayed in a translucent state; and when the home affordance then overlaps with both the edge protected application and another application that is not edge protected (e.g., an application that has requested to auto-hide the home affordance, or an application that has not requested to auto-hide the home affordance) as a result of resizing the applications, the home affordance changes from the translucent state to an opaque state (e.g., the second application has not requested to auto-hide the home affordance) or a hidden state (e.g., the second application has requested to auto-hide the home affordance). When the home affordance then overlaps only the application that is not edge protected, such as an application that has not requested to auto-hide the home affordance, the home affordance remains in the opaque state. Alternatively, if the application that is not edge protected has requested to auto-hide the home affordance, the home affordance remains displayed in the hidden or reduced visibility state (e.g., less visible than the translucent state indicating edge protection).

In some embodiments, the first set of one or more behaviors include (1326) requesting reduction of the visual distinction of the system user interface element relative to the rest of the user interface displayed on the display (e.g., requesting to auto-hide the system user interface element) (e.g., the translucence of the system user interface element is increased, the contrast of the system user interface element is decreased, the brightness of the system user interface element is decreased, the saturation of the user interface element is reduced, or the system user interface element ceases to be displayed) when predetermined criteria are met (e.g., when full screen or immersive content is displayed in the first application); and the second set of one or more behaviors do not include requesting reduction of the visual distinction of the system user interface element relative to the rest of the user interface displayed on the display (e.g., the translucence of the system user interface element is increased, the contrast of the system user interface element is decreased, the brightness of the system user interface element is decreased, the saturation of the user interface element is reduced, and/or the system user interface element ceases to be displayed) when the predetermined criteria are met (e.g., when full screen or immersive content is displayed in the second application). In response to a determination that the predetermined criteria are met for the first application (e.g., and the predetermine criteria are not met of the second application): in accordance with a determination that the system user interface element overlaps the first application without overlapping the second application, the device reduces the visual distinction of the system user interface element relative to the rest of the user interface displayed on the display (e.g., increasing a translucence of the system user interface element, decreasing a contrast of the system user interface element, decreasing the brightness of the system use interface element, reducing the saturation of the system user interface element and/or ceasing to display the system user interface element); in accordance with a determination that the system user interface element overlaps both the first application and the second application, the device reduces the visual distinction of the system user interface element relative to the rest of the user interface displayed on the display (e.g., displaying the home affordance 4802 in the third appearance state (e.g., hidden, or with further reduced visibility)) (e.g., increasing a translucence of the system user interface element, decreasing a contrast of the system user interface element, decreasing the brightness of the system use interface element, reducing the saturation of the system user interface element and/or ceasing to display the system user interface element); an in accordance with a determination that the system user interface element overlaps the second application without overlapping the first application, forgoing reduction of the visual distinction of the system user interface element relative to the rest of the user interface displayed on the display. In one example where the applications are resized, when the home affordance initially overlaps only an application that has requested to auto-hide the home affordance, the home affordance is displayed in a reduced visibility state or hidden state; and when the home affordance then overlaps with both the application that has requested to auto-hide the home affordance and another application that has not requested to auto-hide the home affordance (e.g., an edge-protected application, or an non-edge protected application) as a result of resizing the applications, the home affordance remains displayed in the reduced visibility state or hidden state comply with the auto-hide request of the first application. When the home affordance then overlaps only the application that has not requested to auto-hide the home affordance, such as an edge-protected application, the home affordance is displayed in a translucent state to indicate edge protection of the underlying application. Alternatively, if the application that has not requested to auto-hide the home affordance is also not edge protected, the home affordance is displayed in an opaque state (e.g., more visible than the translucent state indicating edge protection) to indicate that the underlying application is not edge protected. This is illustrated in FIGS. 5D74-5D76, FIGS. 5D76-5D79, FIGS. 5D80-5D83, 5D86-5D88, for example.

In some embodiments, the first set of one or more behaviors include (1328) requesting reduction of the visual distinction of the system user interface element relative to the rest of the user interface displayed on the display (e.g., requesting to auto-hide the system user interface element) (e.g., the translucence of the system user interface element is increased, the contrast of the system user interface element is decreased, the brightness of the system user interface element is decreased, the saturation of the user interface element is reduced, or the system user interface element ceases to be displayed) when predetermined criteria are met (e.g., when full screen or immersive content is displayed in the first application); and the second set of one or more behaviors do not include requesting reduction of the visual distinction of the system user interface element relative to the rest of the user interface displayed on the display (e.g., the translucence of the system user interface element is increased, the contrast of the system user interface element is decreased, the brightness of the system user interface element is decreased, the saturation of the user interface element is reduced, and/or the system user interface element ceases to be displayed) when the predetermined criteria are met (e.g., when full screen or immersive content is displayed in the second application). In response to a determination that the predetermined criteria are met for the first application (e.g., and the predetermine criteria are not met of the second application): in accordance with a determination that the system user interface element overlaps the first application without overlapping the second application, the electronic device reduces the visual distinction of the system user interface element relative to the rest of the user interface displayed on the display (e.g., displaying the home affordance 5802 with the third appearance state (e.g., hidden, or with further reduced visibility)) (e.g., increasing a translucence of the system user interface element, decreasing a contrast of the system user interface element, decreasing the brightness of the system use interface element, reducing the saturation of the system user interface element and/or ceasing to display the system user interface element); in accordance with a determination that the system user interface element overlaps both the first application and the second application, forgoing reduction of the visual distinction of the system user interface element relative to the rest of the user interface displayed on the display; and in accordance with a determination that the system user interface element overlaps the second application without overlapping the first application, the device forgoes reduction of the visual distinction of the system user interface element relative to the rest of the user interface displayed on the display. In one example where the applications are resized, when the home affordance initially overlaps only an application that has requested to auto-hide the home affordance, the home affordance is displayed in a reduced visibility state or hidden state; and when the home affordance then overlaps with both the application that has requested to auto-hide the home affordance and another application that has not requested to auto-hide the home affordance (e.g., an edge protected application or a non-edge protected application) as a result of resizing the applications, the home affordance changes from the reduced visibility state or hidden state to an opaque state (e.g., the second application is not edge protected) or a translucent state (e.g., the second application is edge protected). When the home affordance then overlaps only the application that has not requested to auto-hide the home affordance, such as a non-edge-protected application, the home affordance remains in the opaque state. Alternatively, if the application that has not requested to auto-hide the home affordance is edge protected, the home affordance remains displayed in the translucent state (e.g., more visible than the reduced visibility state or hidden state).

In some embodiments, while the first application is (1330) associated with enhanced edge-swipe gesture criteria, the device detects an edge-swipe input at a location corresponding to the system user interface element; and in response to detecting the edge-swipe input, the device changes an appearance of the system user interface element from a first appearance (e.g., the second appearance state (e.g., translucent, reduced visibility)) (e.g., a more translucent appearance) to a second user appearance (e.g., the first appearance state (e.g., opaque, standard visibility)) (e.g., a more opaque appearance that is more opaque than the first appearance). In some embodiments, the first appearance indicates that enhanced edge-swipe gesture criteria are active and the second appearance indicates that an edge swipe input that meets the standard edge-swipe gesture criteria will cause the device to perform the system operation. This is illustrated in FIGS. 5D15-5D16, 5D25-5D26, 5D50-5D51, 5D95-5D96, for example.

In some embodiments, the first application is (1332) associated with enhanced edge-swipe gesture criteria (e.g., first application is edge-protected) and the second application is associated with standard edge-swipe gesture criteria (e.g., second application is not edge-protected) (e.g., as described above with reference to method 1200).

In some embodiments, the appearance of the system user interface element is influenced by the underlying content in the user interface (e.g., the system user interface element is based on an inverted, blurred, or otherwise modified version of the content underlying the system user interface element). In some embodiments, changing the appearance of the system user interface element includes changing the rules that are used to generate the system user interface element based on the underlying content in the user interface (e.g., changing rules for inverting, desaturating, inverting, or otherwise modifying the underlying content to generate the system user interface element.). This is illustrated in FIG. 5D99, for example.

In some embodiments, the system operation is selected from a plurality of different a system operations based on one or more parameters (e.g., distance, speed, direction) of the gesture. For example, a long or fast swipe upward will trigger display of a home screen user interface, a slow swipe upward that is not very long will trigger display of a multitasking user interface, and a swipe that moves to the left or to the right will trigger display of one or more a recently used applications without displaying the home screen or the multitasking user interface (e.g., as described in greater detail with reference to FIGS. 9A-9C and FIGS. 10A-10D)

It should be understood that the particular order in which the operations in FIGS. 13A-13E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, and 1200) are also applicable in an analogous manner to method 1200 described above with respect to FIGS. 13A-13E. For example, the contacts, gestures, user interface objects, tactile outputs, intensity thresholds, focus selectors, and animations described above with reference to method 1300 optionally have one or more of the characteristics of the contacts, gestures, user interface objects, tactile outputs, intensity thresholds, focus selectors, animations described herein with reference to other methods described herein (e.g., methods 600, 700, 800, 900, 1000, 1100, and 1200). For brevity, these details are not repeated here.

The operations described above with reference to FIGS. 13A-13E are, optionally, implemented by components depicted in FIGS. 1A-1B. For example, displaying operation 1302, detecting operation 1304, resizing operation 1310, and changing operation 1312 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a touch-sensitive display:

concurrently displaying, on the touch-sensitive display:

a system user interface element that indicates a location for performing a gesture that triggers a system operation;

a first application that currently has a first set of one or more behaviors associated with the system user interface element; and a second application that currently has a second set of one or more behaviors associated with the system user interface element that is different from the first set of one or more behaviors, wherein:

the first application and the second application are both displayed along at least a portion of a respective edge of the touch-sensitive display;

the system user interface element overlaps the first application without overlapping the second application; and an appearance of the system user interface element is determined based on the first set of one or more behaviors;

while concurrently displaying the first application, the second application and the system user interface element, detecting an input corresponding to a request to resize the second application; and in response to detecting the input:

resizing the second application in accordance with the input; and in accordance with a determination that the system user interface element overlaps the second application without overlapping the first application, changing the appearance of the system user interface element to an appearance based on the second set of one or more behaviors associated with the system user interface element.

2. The method of claim 1, wherein:

the first set of one or more behaviors includes enhanced edge-swipe gesture criteria for the gesture that triggers the system operation; and the second set of one or more behaviors includes standard edge-swipe gesture criteria for the gesture that triggers the system operation.

3. The method of claim 1, wherein:

the first set of one or more behaviors includes a request to hide the system user interface element when predetermined criteria are met; and the second set of one or more behaviors does not include a request to hide the system user interface element when the predetermined criteria are met.

4. The method of claim 1, including, in response to detecting the input, in accordance with a determination that the system user interface element overlaps the second application and the first application, determining the appearance of the system user interface element based on a combination of the first set of one or more behaviors associated with the system user interface element and the second set of one or more behaviors associated with the system user interface element.

5. The method of claim 1, including, in response to detecting the input:

in accordance with a determination that the system user interface element overlaps both the second application and the first application and that the first set of one or more behaviors includes a behavior that has a higher priority than the second set of one or more behaviors, determining the appearance of the system user interface element based on the first set of one or more behaviors associated with the system user interface element; and in accordance with a determination that the system user interface element overlaps both the second application and the first application and that the second set of one or more behaviors includes a behavior that has a higher priority than the second set of one or more behaviors, determining the appearance of the system user interface element based on the second set of one or more behaviors associated with the system user interface element.

6. The method of claim 1, wherein:

the first set of behaviors requires that enhanced edge-swipe gesture criteria be met in order for an edge-swipe gesture detected at a location occupied by the first application to perform the system operation;

the second set of behaviors requires that standard edge-swipe gesture criteria be met in order for an edge-swipe gesture detected at a location occupied by the first application to perform the system operation; and the method includes, in response to detecting the input:

in accordance with a determination that the system user interface element overlaps the first application without overlapping the second application, displaying the system user interface element with a first appearance;

in accordance with a determination that the system user interface element overlaps both the first application and the second application, displaying the system user interface element with the first appearance; and in accordance with a determination that the system user interface element overlaps the second application without overlapping the first application, displaying the system user interface element with a second appearance.

7. The method of claim 1, wherein:

the first set of behaviors requires that enhanced edge-swipe gesture criteria be met in order for an edge-swipe gesture detected at a location occupied by the first application to perform the system operation;

the second set of behaviors requires that standard edge-swipe gesture criteria be met in order for an edge-swipe gesture detected at a location occupied by the first application to perform the system operation; and the method includes, in response to detecting the input:

in accordance with a determination that the system user interface element overlaps the first application without overlapping the second application, displaying the system user interface element with a first appearance;

in accordance with a determination that the system user interface element overlaps both the first application and the second application, displaying the system user interface element with a second appearance; and in accordance with a determination that the system user interface element overlaps the second application without overlapping the first application, displaying the system user interface element with the second appearance.

8. The method of claim 1, wherein:

the first set of one or more behaviors includes requesting reduction of a visual distinction of the system user interface element relative to the rest of a user interface displayed on the touch-sensitive display when predetermined criteria are met;

the second set of one or more behaviors does not include requesting reduction of the visual distinction of the system user interface element relative to the rest of the user interface displayed on the touch-sensitive display when the predetermined criteria are met; and the method includes, in response to a determination that the predetermined criteria are met for the first application:

in accordance with a determination that the system user interface element overlaps the first application without overlapping the second application, reducing the visual distinction of the system user interface element relative to the rest of the user interface displayed on the touch-sensitive display;

in accordance with a determination that the system user interface element overlaps both the first application and the second application, reducing the visual distinction of the system user interface element relative to the rest of the user interface displayed on the touch-sensitive display; and in accordance with a determination that the system user interface element overlaps the second application without overlapping the first application, forgoing reduction of the visual distinction of the system user interface element relative to the rest of the user interface displayed on the touch-sensitive display.

9. The method of claim 1, wherein:

the first set of one or more behaviors includes requesting reduction of a visual distinction of the system user interface element relative to the rest of a user interface displayed on the touch-sensitive display when predetermined criteria are met;

the second set of one or more behaviors does not include requesting reduction of the visual distinction of the system user interface element relative to the rest of the user interface displayed on the touch-sensitive display when the predetermined criteria are met; and the method includes, in response to a determination that the predetermined criteria are met for the first application:

in accordance with a determination that the system user interface element overlaps the first application without overlapping the second application, reducing the visual distinction of the system user interface element relative to the rest of the user interface displayed on the touch-sensitive display;

in accordance with a determination that the system user interface element overlaps both the first application and the second application, forgoing reduction of the visual distinction of the system user interface element relative to the rest of the user interface displayed on the touch-sensitive display; and in accordance with a determination that the system user interface element overlaps the second application without overlapping the first application, forgoing reduction of the visual distinction of the system user interface element relative to the rest of the user interface displayed on the touch-sensitive display.

10. The method of claim 1, including:

while the first application is associated with enhanced edge-swipe gesture criteria, detecting an edge-swipe input at a location corresponding to the system user interface element; and in response to detecting the edge-swipe input, changing an appearance of the system user interface element from a first appearance to a second user appearance.

11. The method of claim 1, wherein the first application is associated with enhanced edge-swipe gesture criteria and the second application is associated with standard edge-swipe gesture criteria.

12. The method of claim 1, wherein the appearance of the system user interface element is influenced by underlying content of a user interface displayed on the touch-sensitive display.

13. The method of claim 1, wherein the system operation is selected from a plurality of different system operations based on one or more parameters of the gesture.

14. An electronic device, comprising:

a touch-sensitive display;

one or more processors; and memory storing one or more programs, wherein the one or more programs are configured to be executed by the one or more processors, the one or more programs including instructions for:

concurrently displaying, on the touch-sensitive display:

a system user interface element that indicates a location for performing a gesture that triggers a system operation;

a first application that currently has a first set of one or more behaviors associated with the system user interface element; and a second application that currently has a second set of one or more behaviors associated with the system user interface element that is different from the first set of one or more behaviors, wherein:

the first application and the second application are both displayed along at least a portion of a respective edge of the touch-sensitive display;

the system user interface element overlaps the first application without overlapping the second application; and an appearance of the system user interface element is determined based on the first set of one or more behaviors;

while concurrently displaying the first application, the second application and the system user interface element, detecting an input corresponding to a request to resize the second application; and in response to detecting the input:

resizing the second application in accordance with the input; and in accordance with a determination that the system user interface element overlaps the second application without overlapping the first application, changing the appearance of the system user interface element to an appearance based on the second set of one or more behaviors associated with the system user interface element.

15. The electronic device of claim 14, wherein:

the first set of one or more behaviors includes enhanced edge-swipe gesture criteria for the gesture that triggers the system operation; and the second set of one or more behaviors includes standard edge-swipe gesture criteria for the gesture that triggers the system operation.

16. The electronic device of claim 14, wherein:

the first set of one or more behaviors includes a request to hide the system user interface element when predetermined criteria are met; and the second set of one or more behaviors does not include a request to hide the system user interface element when the predetermined criteria are met.

17. The electronic device of claim 14, the one or more programs including instructions for, in response to detecting the input, in accordance with a determination that the system user interface element overlaps the second application and the first application, determining the appearance of the system user interface element based on a combination of the first set of one or more behaviors associated with the system user interface element and the second set of one or more behaviors associated with the system user interface element.

18. The electronic device of claim 14, the one or more programs including instructions for, in response to detecting the input:

in accordance with a determination that the system user interface element overlaps both the second application and the first application and that the first set of one or more behaviors includes a behavior that has a higher priority than the second set of one or more behaviors, determining the appearance of the system user interface element based on the first set of one or more behaviors associated with the system user interface element; and in accordance with a determination that the system user interface element overlaps both the second application and the first application and that the second set of one or more behaviors includes a behavior that has a higher priority than the second set of one or more behaviors, determining the appearance of the system user interface element based on the second set of one or more behaviors associated with the system user interface element.

19. The electronic device of claim 14, wherein:

the first set of behaviors requires that enhanced edge-swipe gesture criteria be met in order for an edge-swipe gesture detected at a location occupied by the first application to perform the system operation;

the second set of behaviors requires that standard edge-swipe gesture criteria be met in order for an edge-swipe gesture detected at a location occupied by the first application to perform the system operation; and the one or more programs include instructions for, in response to detecting the input:

in accordance with a determination that the system user interface element overlaps the first application without overlapping the second application, displaying the system user interface element with a first appearance;

in accordance with a determination that the system user interface element overlaps both the first application and the second application, displaying the system user interface element with the first appearance; and in accordance with a determination that the system user interface element overlaps the second application without overlapping the first application, displaying the system user interface element with a second appearance.

20. The electronic device of claim 14, wherein:

the first set of behaviors requires that enhanced edge-swipe gesture criteria be met in order for an edge-swipe gesture detected at a location occupied by the first application to perform the system operation;

the second set of behaviors requires that standard edge-swipe gesture criteria be met in order for an edge-swipe gesture detected at a location occupied by the first application to perform the system operation; and the one or more programs include instructions for, in response to detecting the input:

in accordance with a determination that the system user interface element overlaps the first application without overlapping the second application, displaying the system user interface element with a first appearance;

in accordance with a determination that the system user interface element overlaps both the first application and the second application, displaying the system user interface element with a second appearance; and in accordance with a determination that the system user interface element overlaps the second application without overlapping the first application, displaying the system user interface element with the second appearance.

21. The electronic device of claim 14, wherein:

the first set of one or more behaviors includes requesting reduction of a visual distinction of the system user interface element relative to the rest of a user interface displayed on the touch-sensitive display when predetermined criteria are met;

the second set of one or more behaviors does not include requesting reduction of the visual distinction of the system user interface element relative to the rest of the user interface displayed on the touch-sensitive display when the predetermined criteria are met; and the one or more programs include instructions for, in response to a determination that the predetermined criteria are met for the first application:

in accordance with a determination that the system user interface element overlaps the first application without overlapping the second application, reducing the visual distinction of the system user interface element relative to the rest of the user interface displayed on the display;

in accordance with a determination that the system user interface element overlaps both the first application and the second application, reducing the visual distinction of the system user interface element relative to the rest of the user interface displayed on the touch-sensitive display; and in accordance with a determination that the system user interface element overlaps the second application without overlapping the first application, forgoing reduction of the visual distinction of the system user interface element relative to the rest of the user interface displayed on the touch-sensitive display.

22. The electronic device of claim 14, wherein:

the first set of one or more behaviors includes requesting reduction of a visual distinction of the system user interface element relative to the rest of a user interface displayed on the touch-sensitive display when predetermined criteria are met;

the second set of one or more behaviors does not include requesting reduction of the visual distinction of the system user interface element relative to the rest of the user interface displayed on the touch-sensitive display when the predetermined criteria are met; and the one or more programs include instructions for, in response to a determination that the predetermined criteria are met for the first application:

in accordance with a determination that the system user interface element overlaps the first application without overlapping the second application, reducing the visual distinction of the system user interface element relative to the rest of the user interface displayed on the touch-sensitive display;

in accordance with a determination that the system user interface element overlaps both the first application and the second application, forgoing reduction of the visual distinction of the system user interface element relative to the rest of the user interface displayed on the touch-sensitive display; and in accordance with a determination that the system user interface element overlaps the second application without overlapping the first application, forgoing reduction of the visual distinction of the system user interface element relative to the rest of the user interface displayed on the touch-sensitive display.

23. The electronic device of claim 14, the one or more programs including instructions for:

while the first application is associated with enhanced edge-swipe gesture criteria, detecting an edge-swipe input at a location corresponding to the system user interface element; and in response to detecting the edge-swipe input, changing an appearance of the system user interface element from a first appearance to a second user appearance.

24. The electronic device of claim 14, wherein the first application is associated with enhanced edge-swipe gesture criteria and the second application is associated with standard edge-swipe gesture criteria.

25. The electronic device of claim 14, wherein the appearance of the system user interface element is influenced by underlying content of a user interface displayed on the touch-sensitive display.

26. The electronic device of claim 14, wherein the system operation is selected from a plurality of different system operations based on one or more parameters of the gesture.

27. A non-transitory computer readable storage medium storing one or more programs, the one or more programs comprising instructions, which, when executed by an electronic device with a touch-sensitive display, cause the electronic device to:

concurrently display, on the touch-sensitive display:

a system user interface element that indicates a location for performing a gesture that triggers a system operation;

a first application that currently has a first set of one or more behaviors associated with the system user interface element; and a second application that currently has a second set of one or more behaviors associated with the system user interface element that is different from the first set of one or more behaviors, wherein:

the first application and the second application are both displayed along at least a portion of a respective edge of the touch-sensitive display;

the system user interface element overlaps the first application without overlapping the second application; and an appearance of the system user interface element is determined based on the first set of one or more behaviors;

while concurrently displaying the first application, the second application and the system user interface element, detect an input corresponding to a request to resize the second application; and in response to detecting the input:

resize the second application in accordance with the input; and in accordance with a determination that the system user interface element overlaps the second application without overlapping the first application, change the appearance of the system user interface element to an appearance based on the second set of one or more behaviors associated with the system user interface element.

28. The non-transitory computer readable storage medium of claim 27, wherein:

the first set of one or more behaviors includes enhanced edge-swipe gesture criteria for the gesture that triggers the system operation; and the second set of one or more behaviors includes standard edge-swipe gesture criteria for the gesture that triggers the system operation.

29. The non-transitory computer readable storage medium of claim 27, wherein:

the first set of one or more behaviors includes a request to hide the system user interface element when predetermined criteria are met; and the second set of one or more behaviors does not include a request to hide the system user interface element when the predetermined criteria are met.

30. The non-transitory computer readable storage medium of claim 27, the one or more programs including instructions, which, when executed by the electronic device, cause the electronic device to, in response to detecting the input, in accordance with a determination that the system user interface element overlaps the second application and the first application, determine the appearance of the system user interface element based on a combination of the first set of one or more behaviors associated with the system user interface element and the second set of one or more behaviors associated with the system user interface element.

31. The non-transitory computer readable storage medium of claim 27, the one or more programs including instructions, which, when executed by the electronic device, cause the electronic device to, in response to detecting the input:

in accordance with a determination that the system user interface element overlaps both the second application and the first application and that the first set of one or more behaviors includes a behavior that has a higher priority than the second set of one or more behaviors, determine the appearance of the system user interface element based on the first set of one or more behaviors associated with the system user interface element; and in accordance with a determination that the system user interface element overlaps both the second application and the first application and that the second set of one or more behaviors includes a behavior that has a higher priority than the second set of one or more behaviors, determine the appearance of the system user interface element based on the second set of one or more behaviors associated with the system user interface element.

32. The non-transitory computer readable storage medium of claim 27, wherein:

the first set of behaviors requires that enhanced edge-swipe gesture criteria be met in order for an edge-swipe gesture detected at a location occupied by the first application to perform the system operation;

the second set of behaviors requires that standard edge-swipe gesture criteria be met in order for an edge-swipe gesture detected at a location occupied by the first application to perform the system operation; and the one or more programs include instructions, which, when executed by the electronic device, cause the electronic device to, in response to detecting the input:

in accordance with a determination that the system user interface element overlaps the first application without overlapping the second application, display the system user interface element with a first appearance;

in accordance with a determination that the system user interface element overlaps both the first application and the second application, display the system user interface element with the first appearance; and in accordance with a determination that the system user interface element overlaps the second application without overlapping the first application, display the system user interface element with a second appearance.

33. The non-transitory computer readable storage medium of claim 27, wherein:

the first set of behaviors requires that enhanced edge-swipe gesture criteria be met in order for an edge-swipe gesture detected at a location occupied by the first application to perform the system operation;

the second set of behaviors requires that standard edge-swipe gesture criteria be met in order for an edge-swipe gesture detected at a location occupied by the first application to perform the system operation; and the one or more programs include instructions, which, when executed by the electronic device, cause the electronic device to, in response to detecting the input:

in accordance with a determination that the system user interface element overlaps the first application without overlapping the second application, display the system user interface element with a first appearance;

in accordance with a determination that the system user interface element overlaps both the first application and the second application, display the system user interface element with a second appearance; and in accordance with a determination that the system user interface element overlaps the second application without overlapping the first application, display the system user interface element with the second appearance.

34. The non-transitory computer readable storage medium of claim 27, wherein:

the first set of one or more behaviors includes requesting reduction of a visual distinction of the system user interface element relative to the rest of a user interface displayed on the touch-sensitive display when predetermined criteria are met;

the second set of one or more behaviors does not include requesting reduction of the visual distinction of the system user interface element relative to the rest of the user interface displayed on the touch-sensitive display when the predetermined criteria are met; and the one or more programs include instructions, which, when executed by the electronic device, cause the electronic device to, in response to a determination that the predetermined criteria are met for the first application:

in accordance with a determination that the system user interface element overlaps the first application without overlapping the second application, reduce the visual distinction of the system user interface element relative to the rest of the user interface displayed on the touch-sensitive display;

in accordance with a determination that the system user interface element overlaps both the first application and the second application, reduce the visual distinction of the system user interface element relative to the rest of the user interface displayed on the touch-sensitive display; and in accordance with a determination that the system user interface element overlaps the second application without overlapping the first application, forgo reduction of the visual distinction of the system user interface element relative to the rest of the user interface displayed on the touch-sensitive display.

35. The non-transitory computer readable storage medium of claim 27, wherein:

the first set of one or more behaviors includes requesting reduction of a visual distinction of the system user interface element relative to the rest of a user interface displayed on the touch-sensitive display when predetermined criteria are met;

the second set of one or more behaviors does not include requesting reduction of the visual distinction of the system user interface element relative to the rest of the user interface displayed on the touch-sensitive display when the predetermined criteria are met; and the one or more programs include instructions, which, when executed by the electronic device, cause the electronic device to, in response to a determination that the predetermined criteria are met for the first application:

in accordance with a determination that the system user interface element overlaps the first application without overlapping the second application, reduce the visual distinction of the system user interface element relative to the rest of the user interface displayed on the touch-sensitive display;

in accordance with a determination that the system user interface element overlaps both the first application and the second application, forgo reduction of the visual distinction of the system user interface element relative to the rest of the user interface displayed on the touch-sensitive display; and in accordance with a determination that the system user interface element overlaps the second application without overlapping the first application, forgo reduction of the visual distinction of the system user interface element relative to the rest of the user interface displayed on the touch-sensitive display.

36. The non-transitory computer readable storage medium of claim 27, the one or more programs including instructions, which, when executed by the electronic device, cause the electronic device to:

while the first application is associated with enhanced edge-swipe gesture criteria, detect an edge-swipe input at a location corresponding to the system user interface element; and in response to detecting the edge-swipe input, change an appearance of the system user interface element from a first appearance to a second user appearance.

37. The non-transitory computer readable storage medium of claim 27, wherein the first application is associated with enhanced edge-swipe gesture criteria and the second application is associated with standard edge-swipe gesture criteria.

38. The non-transitory computer readable storage medium of claim 27, wherein the appearance of the system user interface element is influenced by underlying content of a user interface displayed in the touch-sensitive display.

39. The non-transitory computer readable storage medium of claim 27, wherein the system operation is selected from a plurality of different system operations based on one or more parameters of the gesture.

* * * * *